US011762136B2

(12) United States Patent
Schmeder et al.

(10) Patent No.: US 11,762,136 B2
(45) Date of Patent: Sep. 19, 2023

(54) MULTI-BAND COLOR VISION FILTERS AND METHOD BY LP-OPTIMIZATION

(71) Applicant: EnChroma, Inc., Berkeley, CA (US)

(72) Inventors: Andrew W. Schmeder, Oakland, CA (US); Donald M. McPherson, Oakland, CA (US)

(73) Assignee: EnChroma, Inc., Berkeley, CA (US)

( * ) Notice: Subject to any disclaimer, the term of this patent is extended or adjusted under 35 U.S.C. 154(b) by 288 days.

(21) Appl. No.: 17/098,666

(22) Filed: Nov. 16, 2020

(65) Prior Publication Data

US 2021/0141132 A1 May 13, 2021

Related U.S. Application Data

(63) Continuation of application No. 15/643,366, filed on Jul. 6, 2017, now Pat. No. 10,852,461, which is a (Continued)

(51) Int. Cl.
*G02B 5/20* (2006.01)
*G01J 3/46* (2006.01)
(Continued)

(52) U.S. Cl.
CPC .............. *G02B 5/201* (2013.01); *G01J 3/465* (2013.01); *G01J 3/51* (2013.01); *G02B 5/223* (2013.01);
(Continued)

(58) Field of Classification Search
CPC ........ G02B 5/201; G02B 5/223; G02B 5/226; G02B 5/285; G02C 7/10; G02C 7/12;
(Continued)

(56) References Cited

U.S. PATENT DOCUMENTS 3,877,797 A 4/1975 Thornton, Jr.
4,176,299 A 11/1979 Thornton, Jr.
(Continued)

FOREIGN PATENT DOCUMENTS

CN 1165967 A 11/1997
CN 1875638 A 12/2006
(Continued)

OTHER PUBLICATIONS

ANSI Z80.Mar. 2010; The Accredited Committee Z80 for Ophthalmic Standards; American Standard for Ophthalmics—Monprescription Sunglass and Fashion Eyewear Requirements; Jun. 7, 2010; pp. 1-24 (34 pages.
(Continued)

*Primary Examiner* — Marin Pichler
(74) *Attorney, Agent, or Firm* — Schmidt Patent Law, Inc.

(57) ABSTRACT

The invention generally relates to optical filters that provide regulation and/or enhancement of chromatic and luminous aspects of the color appearance of light to human vision, generally to applications of such optical filters, to therapeutic applications of such optical filters, to industrial and safety applications of such optical filters when incorporated, for example, in radiation-protective eyewear, to methods of designing such optical filters, to methods of manufacturing such optical filters, and to designs and methods of incorporating such optical filters into apparatus including, for example, eyewear and illuminants.

43 Claims, 124 Drawing Sheets

Related U.S. Application Data continuation of application No. 14/014,991, filed on Aug. 30, 2013, now Pat. No. 10,338,286, which is a continuation of application No. PCT/US2012/027790, filed on Mar. 5, 2012.

(60) Provisional application No. 61/449,049, filed on Mar. 3, 2011.

(51) Int. Cl.

| | |
|---|---|
| ***G02B 5/22*** | (2006.01) |
| ***G02B 5/28*** | (2006.01) |
| ***G02C 7/10*** | (2006.01) |
| ***G01J 3/51*** | (2006.01) |
| ***G02C 7/12*** | (2006.01) |

(52) U.S. Cl.

CPC ............. *G02B 5/226* (2013.01); *G02B 5/285* (2013.01); *G02C 7/102* (2013.01); *G02C 7/104* (2013.01); *G02C 7/107* (2013.01); *G02C 7/12* (2013.01)

(58) Field of Classification Search

CPC ........ G02C 7/102; G02C 7/104; G02C 7/105; G02C 7/108

USPC .......... 359/590, 589, 359, 491.01, 722, 723; 351/159.6, 159.62, 159.63, 159.65, 351/159.66

See application file for complete search history.

(56) References Cited

U.S. PATENT DOCUMENTS

| | | | |
|---|---|---|---|
| 4,300,819 | A | 11/1981 | Taylor |
| 4,826,286 | A | 5/1989 | Thornton, Jr. |
| 5,218,386 | A | 6/1993 | Levien |
| 5,235,358 | A | 8/1993 | Mutzhas et al. |
| 5,369,453 | A | 11/1994 | Chen et al. |
| 5,408,278 | A | 4/1995 | Christman |
| 5,646,781 | A | 7/1997 | Johnson, Jr. |
| 5,774,202 | A | 6/1998 | Abraham et al. |
| 6,132,044 | A | 10/2000 | Sternbergh |
| 6,145,984 | A | 11/2000 | Farwig |
| 6,149,270 | A | 11/2000 | Hayashi |
| 6,450,652 | B1 | 9/2002 | Karpen |
| 7,106,509 | B2 | 9/2006 | Sharp |
| 7,284,856 | B2 | 10/2007 | Duha et al. |
| 7,393,100 | B2 | 7/2008 | Mertz |
| 7,506,977 | B1 | 3/2009 | Aiiso |
| 7,583,863 | B2 | 9/2009 | Forquet et al. |
| 7,597,441 | B1 | 10/2009 | Farwig |
| 8,134,618 | B2 | 3/2012 | Ajito et al. |
| 8,210,678 | B1 | 7/2012 | Farwig |
| 2002/0126256 | A1 | 9/2002 | Larson |
| 2004/0075810 | A1 | 4/2004 | Duha et al. |
| 2004/0114242 | A1 | 6/2004 | Sharp |
| 2005/0224703 | A1 | 10/2005 | Harada et al. |
| 2005/0249377 | A1 | 11/2005 | Fouquet et al. |
| 2006/0146275 | A1 | 7/2006 | Mertz |
| 2010/0179790 | A1 | 7/2010 | Nakauchi et al. |
| 2010/0182678 | A1 | 7/2010 | Southwell |
| 2011/0255051 | A1 | 10/2011 | McCabe et al. |
| 2012/0287117 | A1 | 11/2012 | Weber et al. |
| 2013/0141693 | A1 | 6/2013 | McCabe et al. |
| 2014/0233105 | A1 | 8/2014 | Schmeder et al. |

FOREIGN PATENT DOCUMENTS

| | | | |
|---|---|---|---|
| CN | 101203777 | A | 6/2008 |
| CN | 101690248 | A | 3/2010 |
| CN | 101866481 | A | 10/2010 |
| EP | 1519660 | A1 | 12/1992 |
| EP | 1939329 | A1 | 9/1999 |
| EP | 1986024 | A1 | 10/2008 |
| EP | 1340115 | B1 | 5/2009 |
| JP | 2005511457 | A | 4/2005 |
| JP | 2006145683 | A | 6/2006 |
| JP | 2008282757 | A | 11/2008 |
| TW | 200619795 | A | 6/2006 |
| TW | 201304513 | A | 1/2013 |
| WO | 15/05621 | A1 | 2/1995 |
| WO | 12/42829 | A1 | 5/2002 |
| WO | 02/094595 | | 11/2002 |
| WO | 2006/071734 | A2 | 7/2006 |
| WO | 2007094338 | A1 | 8/2007 |
| WO | 2013/022744 | A2 | 2/2013 |

OTHER PUBLICATIONS

British Standard BS EN 1836:2005, Technical Committee CEN/TC 85 "Eye-protective equipment" Personal eye equipment—Sunglasses and sunglare filters for general use and filters for direct observation of the sun; Sep. 2007; pp. 1-34 (46 pages).

Rea, M.S. et al., Color Rendering: Beyond Pride and Prejudice; Color Research and Application, Dec. 2010 pp. 401-409; vol. 35; No. 6, 2010 Wiley Periodical, Inc.

DRUM, Bruce; FDA regulation of labeling and promotional claims in the therapeutic color vision devices; A tutorial Visual Neuroscience (2004), 21; pp. 461-463.

Tilsch, Markus K., et al., Manufacturing of precision optical coatings; Chinese Optics Letters, vol. 8, Supplement; Apr. 30, 2010; pp. 38-43.

Moreland, Jack D., et al., Quantitative assessment of commercial filter 'aids' for red-green colour defectives Dphthal. Physiol. Opt. 2010 30: No. 5; pp. 685-692.

Vorobyev, Misha, et al., Receptor noise as a determinant of colour thresholds; Proc. R. Soc. Lond. B (1998) 265 pgs. 351-358.

Sharp, G.D., et al., Retarder Stack Technology for Color Manipulation; 1999 SID International Symposium Digest of Technical Papers; May 1999; pp. 1072-1075.

PCT/US2012/027790; filed Mar. 5, 2012; Written Opinion of the International Searching Authority and International Search Report; 20 pages; dated Jul. 27, 2012.

PCT/US2012/027790; filed Mar. 5, 2012; International Preliminary Report on Patentability (1 pg.) dated Sep. 3, 2013 and Written Opinion (14 pgs.); dated Jul. 27, 2012.

Kirkpatrick, S., et al., Optimization By Simulated Annealing; Science, vol. 22, No. 4598, May 13, 1983, pp. 671-680.

Linear Programming; Feb. 28, 2011 (Feb. 28, 2011); XP055027872; Retrieved from the Internet: [on May 23, 2012] URL: http://en.wikipedia.org/w/index.php?title=Linear_programming&oldid=416428507.

Swillam, Mohammed A., et al., Multilayer Optical Coatings Using Convex Optimization; Journal of Lightwave Technology, IEEE Service Center, New York, NY, US; vol. 25, No. 4, Apr. 1, 2007; pp. 1078-1085.

European Extended Search Report corresponding to EP 14165905.2; dated Jan. 2015; 15 pages.

The extended European search report EP21190365.3, dated Nov. 25, 2021, 9 pages.

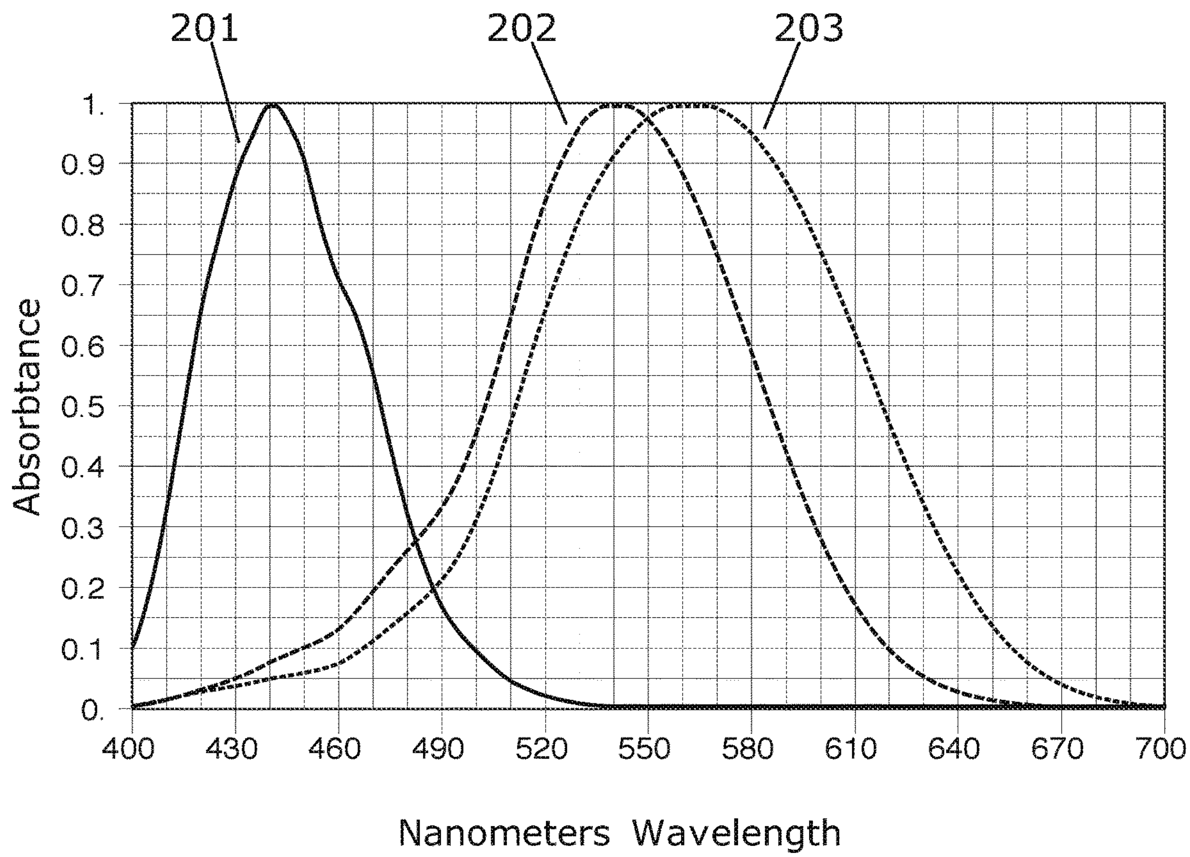

FIG. 2A 204 205 206 207 208

| Genotype | Classification | S-cone Peak | M-cone Peak | L-cone Peak |
|---|---|---|---|---|
| M1(N)-L1(N) | Normal | 426 nm | 532 nm | 555 nm |
| M1(N)-L2(N) | Normal | 426 nm | 532 nm | 563 nm |
| L1(N)-M1(230) | Mild Deuteranomaly | 426 nm | 538 nm | 555 nm |
| L2(N)-M1(230) | Mild Deuteranomaly | 426 nm | 538 nm | 563 nm |
| L1(N)-M1(277) | Moderate Deuteranomaly | 426 nm | 546 nm | 555 nm |
| L2(N)-M1(277) | Moderate Deuteranomaly | 426 nm | 546 nm | 563 nm |
| L1(N)-M1(285) | Severe Deuteranomaly | 426 nm | 561 nm | 555 nm |
| L2(N)-M1(285) | Severe Deuteranomaly | 426 nm | 561 nm | 563 nm |
| L1(116)-M1(N) | Mild Protananomaly | 426 nm | 532 nm | 559 nm |
| L1(230)-M1(N) | Moderate Protananomaly | 426 nm | 532 nm | 551 nm |
| L1(277)-M1(N) | Severe Protananomaly | 426 nm | 532 nm | 543 nm |

FIG. 2B

FIG. 10A
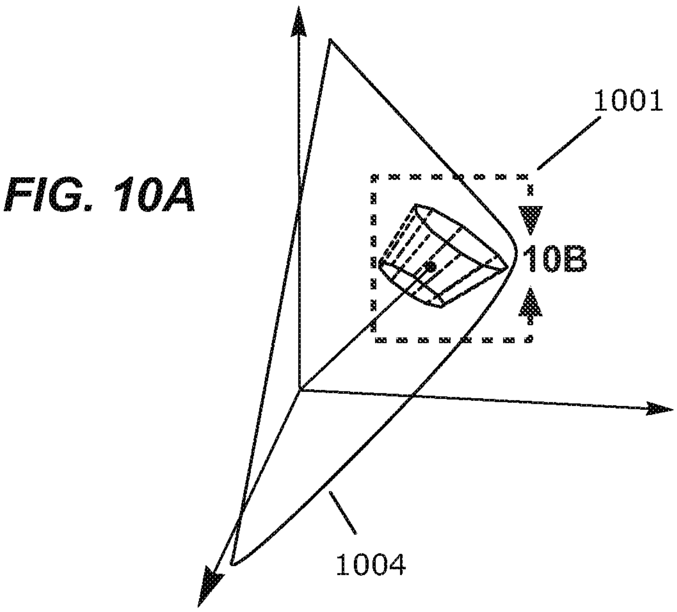
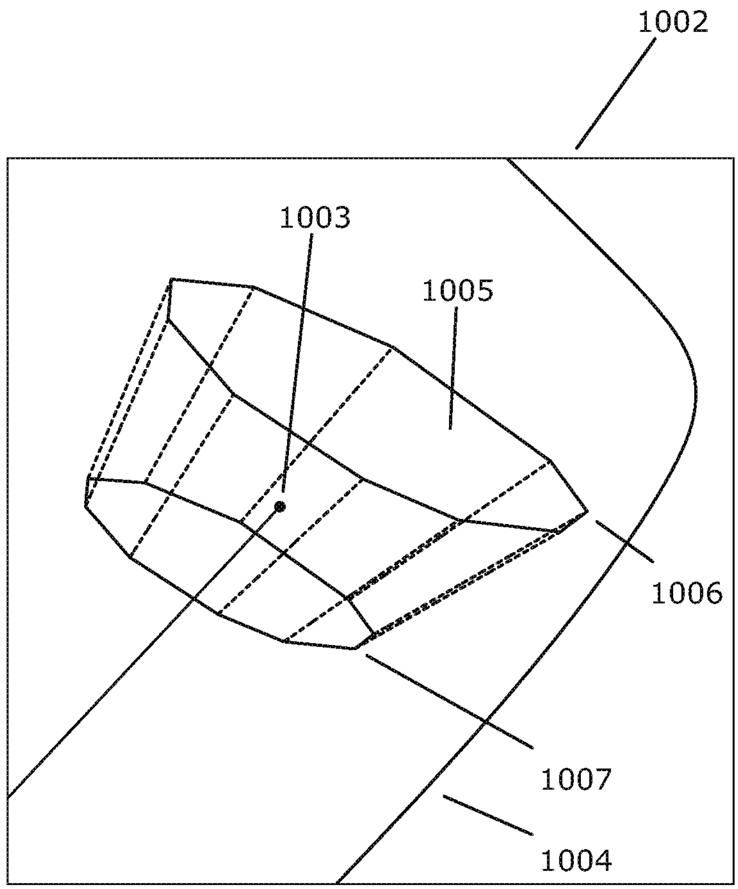
FIG. 10B

| | |
|---|---|
| Best-fit Munsell Reference Filter | 10BG 9/2 |
| Wavelength Maxima | (452 530 613) |
| Transmittance at Maxima | (0.33 0.36 0.35) |
| Wavelength Minima | (484 574) |
| Transmittance at Minima | (0.04 0.04) |
| PGAI D-15 | 24.78 |
| $PGAI_{IW}$ D-15 | 10.83 |
| PGAI NWS | 25.97 |
| $PGAI_{IW}$ NWS | 3.71 |
| Luminous Transmittance of Daylight | 0.18 |
| Luminous Transmittance of Red Traffic Signal | 0.15 |
| Luminous Transmittance of Yellow Traffic Signal | 0.15 |
| Luminous Transmittance of Green Traffic Signal | 0.19 |
| Minimum Transmittance between 475-650nm | 0.04 |
| Solar Blue Light Transmittance | 0.16 |
| Ganglion Cell Transmittance | 0.16 |
| Luminous Transmittance of Primary Lights (R,G,B) | (0.24 0.19 0.21) |
| D65 Chromaticity Coordinate (x,y) | (0.317 0.34) |
| Yellow Traffic Signal Chromaticity Coordinate (x,y) | (0.613 0.386) |
| Green Traffic Signal Chromaticity Coordinate (x,y) | (0.183 0.461) |
| Passes ANSI Z80.3-2010 | True |

FIG. 59A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.4 | 0. | 0. | 1. | 0.5 |
| 395. | 0. | 0. | 0.02 | 0. | 0. | 0.4 | 0. | 0. | 1. | 0.5 |
| 400. | 0. | 0. | 0.05 | 0. | 0. | 0.4 | 0. | 0. | 1. | 0.5 |
| 405. | 0. | 0. | 0.05 | 0. | 0. | 0.4 | 0. | 0. | 1. | 0.5 |
| 410. | 0. | 0. | 0.05 | 0. | 0. | 0.4 | 0. | 0. | 1. | 0.5 |
| 415. | 0. | 0. | 0.05 | 0.01 | 0. | 0.4 | 0. | 0. | 1. | 0.5 |
| 420. | 0.01 | 0.02 | 0.08 | 0.05 | 0. | 0.4 | 0. | 0. | 1. | 0.48 |
| 425. | 0.03 | 0.05 | 0.13 | 0.15 | 0. | 0.4 | 0. | 0. | 1. | 0.44 |
| 430. | 0.07 | 0.12 | 0.21 | 0.31 | 0. | 0.4 | 0. | 0. | 1. | 0.36 |
| 435. | 0.14 | 0.19 | 0.29 | 0.52 | 0. | 0.4 | 0. | 0. | 1. | 0.24 |
| 440. | 0.21 | 0.27 | 0.36 | 0.72 | 1. | 0.4 | 0.4 | 0.04 | 1. | 0.1 |
| 445. | 0.28 | 0.32 | 0.4 | 0.87 | 1. | 0.4 | 0.4 | 0.04 | 1. | 0.01 |
| 450. | 0.31 | 0.34 | 0.4 | 0.92 | 1. | 0.4 | 0.4 | 0.04 | 1. | 0.01 |
| 455. | 0.27 | 0.32 | 0.39 | 0.85 | 1. | 0.4 | 0.4 | 0.04 | 1. | 0.08 |
| 460. | 0.21 | 0.26 | 0.35 | 0.7 | 0.77 | 0.4 | 0.31 | 0.04 | 1. | 0.2 |
| 465. | 0.15 | 0.19 | 0.29 | 0.52 | 0.77 | 0.4 | 0.31 | 0.04 | 1. | 0.32 |
| 470. | 0.09 | 0.13 | 0.21 | 0.35 | 0.09 | 0.4 | 0.04 | 0.04 | 1. | 0.4 |
| 475. | 0.06 | 0.08 | 0.15 | 0.22 | 0.09 | 0.4 | 0.04 | 0.04 | 1. | 0.44 |
| 480. | 0.04 | 0.05 | 0.11 | 0.14 | 0.09 | 0.4 | 0.04 | 0.04 | 1. | 0.46 |
| 485. | 0.03 | 0.04 | 0.09 | 0.1 | 0.09 | 0.4 | 0.04 | 0.04 | 1. | 0.44 |
| 490. | 0.03 | 0.04 | 0.08 | 0.1 | 0.09 | 0.4 | 0.04 | 0.04 | 1. | 0.41 |
| 495. | 0.04 | 0.04 | 0.09 | 0.11 | 0.09 | 0.4 | 0.04 | 0.04 | 1. | 0.35 |
| 500. | 0.04 | 0.06 | 0.12 | 0.15 | 0.09 | 0.4 | 0.04 | 0.04 | 1. | 0.28 |
| 505. | 0.07 | 0.09 | 0.17 | 0.26 | 0.09 | 0.4 | 0.04 | 0.04 | 1. | 0.2 |
| 510. | 0.11 | 0.15 | 0.24 | 0.41 | 0.09 | 0.4 | 0.04 | 0.04 | 1. | 0.13 |
| 515. | 0.17 | 0.22 | 0.32 | 0.6 | 0.24 | 0.4 | 0.1 | 0.04 | 1. | 0.06 |
| 520. | 0.24 | 0.29 | 0.38 | 0.79 | 1. | 0.4 | 0.4 | 0.04 | 1. | 0.02 |
| 525. | 0.3 | 0.35 | 0.42 | 0.94 | 1. | 0.4 | 0.4 | 0.04 | 1. | 0. |
| 530. | 0.34 | 0.37 | 0.43 | 1. | 1. | 0.4 | 0.4 | 0.04 | 1. | 0.01 |
| 535. | 0.31 | 0.35 | 0.43 | 0.95 | 1. | 0.4 | 0.4 | 0.04 | 1. | 0.06 |
| 540. | 0.25 | 0.3 | 0.39 | 0.81 | 1. | 0.4 | 0.4 | 0.04 | 1. | 0.11 |
| 545. | 0.18 | 0.23 | 0.33 | 0.62 | 1. | 0.4 | 0.4 | 0.04 | 1. | 0.18 |
| 550. | 0.11 | 0.16 | 0.25 | 0.43 | 0.15 | 0.4 | 0.06 | 0.04 | 1. | 0.25 |
| 555. | 0.07 | 0.1 | 0.18 | 0.27 | 0.09 | 0.4 | 0.04 | 0.04 | 1. | 0.31 |
| 560. | 0.04 | 0.06 | 0.12 | 0.16 | 0.09 | 0.4 | 0.04 | 0.04 | 1. | 0.36 |

FIG. 59B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.04 | 0.04 | 0.09 | 0.11 | 0.09 | 0.4 | 0.04 | 0.04 | 1. | 0.39 |
| 570. | 0.03 | 0.04 | 0.08 | 0.1 | 0.09 | 0.4 | 0.04 | 0.04 | 1. | 0.41 |
| 575. | 0.04 | 0.04 | 0.09 | 0.11 | 0.09 | 0.4 | 0.04 | 0.04 | 1. | 0.41 |
| 580. | 0.04 | 0.05 | 0.1 | 0.13 | 0.09 | 0.4 | 0.04 | 0.04 | 1. | 0.38 |
| 585. | 0.05 | 0.07 | 0.14 | 0.2 | 0.09 | 0.4 | 0.04 | 0.04 | 1. | 0.34 |
| 590. | 0.08 | 0.11 | 0.2 | 0.31 | 0.09 | 0.4 | 0.04 | 0.04 | 1. | 0.28 |
| 595. | 0.13 | 0.17 | 0.27 | 0.47 | 0.3 | 0.4 | 0.12 | 0.04 | 1. | 0.21 |
| 600. | 0.19 | 0.24 | 0.34 | 0.65 | 0.3 | 0.4 | 0.12 | 0.04 | 1. | 0.14 |
| 605. | 0.25 | 0.3 | 0.39 | 0.82 | 1. | 0.4 | 0.4 | 0.04 | 1. | 0.07 |
| 610. | 0.31 | 0.35 | 0.43 | 0.95 | 1. | 0.4 | 0.4 | 0.04 | 1. | 0.02 |
| 615. | 0.34 | 0.37 | 0.43 | 1. | 1. | 0.4 | 0.4 | 0.04 | 1. | 0. |
| 620. | 0.3 | 0.35 | 0.42 | 0.94 | 1. | 0.4 | 0.4 | 0.04 | 1. | 0.01 |
| 625. | 0.24 | 0.29 | 0.39 | 0.8 | 1. | 0.4 | 0.4 | 0.04 | 1. | 0.04 |
| 630. | 0.17 | 0.23 | 0.32 | 0.61 | 1. | 0.4 | 0.4 | 0.04 | 1. | 0.09 |
| 635. | 0.11 | 0.15 | 0.25 | 0.42 | 0.09 | 0.4 | 0.04 | 0.04 | 1. | 0.15 |
| 640. | 0.06 | 0.09 | 0.18 | 0.26 | 0.09 | 0.4 | 0.04 | 0.04 | 1. | 0.22 |
| 645. | 0.04 | 0.05 | 0.12 | 0.15 | 0.09 | 0.4 | 0.04 | 0.04 | 1. | 0.28 |
| 650. | 0.03 | 0.03 | 0.09 | 0.09 | 0.09 | 0.4 | 0.04 | 0.04 | 1. | 0.34 |
| 655. | 0.02 | 0.03 | 0.07 | 0.07 | 0.09 | 0.4 | 0.04 | 0.04 | 1. | 0.38 |
| 660. | 0.01 | 0.02 | 0.06 | 0.05 | 0.09 | 0.4 | 0.04 | 0. | 1. | 0.42 |
| 665. | 0.01 | 0.01 | 0.06 | 0.03 | 0. | 0.4 | 0. | 0. | 1. | 0.45 |
| 670. | 0. | 0.01 | 0.05 | 0.02 | 0. | 0.4 | 0. | 0. | 1. | 0.47 |
| 675. | 0. | 0. | 0.05 | 0.01 | 0. | 0.4 | 0. | 0. | 1. | 0.48 |
| 680. | 0. | 0. | 0.05 | 0. | 0. | 0.4 | 0. | 0. | 1. | 0.49 |
| 685. | 0. | 0. | 0.05 | 0. | 0. | 0.4 | 0. | 0. | 1. | 0.49 |
| 690. | 0. | 0. | 0.05 | 0. | 0. | 0.4 | 0. | 0. | 1. | 0.5 |
| 695. | 0. | 0. | 0.05 | 0. | 0. | 0.4 | 0. | 0. | 1. | 0.5 |
| 700. | 0. | 0. | 0.05 | 0. | 0. | 0.4 | 0. | 0. | 1. | 0.5 |
| 705. | 0. | 0. | 0.05 | 0. | 0. | 0.4 | 0. | 0. | 1. | 0.5 |
| 710. | 0. | 0. | 0.09 | 0. | 0. | 0.4 | 0. | 0. | 1. | 0.5 |
| 715. | 0. | 0. | 0.09 | 0. | 0. | 0.4 | 0. | 0. | 1. | 0.5 |
| 720. | 0. | 0. | 1. | 0. | 0. | 0.4 | 0. | 0. | 1. | 0.51 |
| 725. | 0. | 0. | 1. | 0. | 0. | 0.4 | 0. | 0. | 1. | 0.51 |
| 730. | 0. | 0. | 1. | 0. | 0. | 0.4 | 0. | 0. | 1. | 0.51 |
| 735. | 0. | 0. | 1. | 0. | 0. | 0.4 | 0. | 0. | 1. | 0.51 |

FIG. 59B-2

| | |
|---|---|
| Best-fit Munsell Reference Filter | 10BG 6/1 |
| Wavelength Maxima | (443 536 647) |
| Transmittance at Maxima | (0.39 0.38 0.4) |
| Wavelength Minima | (479 578) |
| Transmittance at Minima | (0.04 0.04) |
| PGAI D-15 | 34.79 |
| $PGAI_{IW}$ D-15 | 34.71 |
| PGAI NWS | 51.57 |
| $PGAI_{IW}$ NWS | 39.46 |
| Luminous Transmittance of Daylight | 0.18 |
| Luminous Transmittance of Red Traffic Signal | 0.35 |
| Luminous Transmittance of Yellow Traffic Signal | 0.16 |
| Luminous Transmittance of Green Traffic Signal | 0.2 |
| Minimum Transmittance between 475-650nm | 0.04 |
| Solar Blue Light Transmittance | 0.18 |
| Ganglion Cell Transmittance | 0.13 |
| Luminous Transmittance of Primary Lights (R,G,B) | (0.17 0.21 0.17) |
| D65 Chromaticity Coordinate (x,y) | (0.321 0.335) |
| Yellow Traffic Signal Chromaticity Coordinate (x,y) | (0.625 0.374) |
| Green Traffic Signal Chromaticity Coordinate (x,y) | (0.197 0.481) |
| Passes ANSI Z80.3-2010 | True |

FIG. 60A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.4 | 0. | 0. | 1. | 0.65 |
| 395. | 0. | 0. | 0.02 | 0. | 0. | 0.4 | 0. | 0. | 1. | 0.64 |
| 400. | 0. | 0. | 0.05 | 0. | 0. | 0.4 | 0. | 0. | 1. | 0.62 |
| 405. | 0. | 0. | 0.05 | 0. | 0. | 0.4 | 0. | 0. | 1. | 0.59 |
| 410. | 0. | 0. | 0.05 | 0. | 0. | 0.4 | 0. | 0. | 1. | 0.53 |
| 415. | 0. | 0. | 0.06 | 0.01 | 0. | 0.4 | 0. | 0. | 1. | 0.45 |
| 420. | 0.01 | 0.05 | 0.16 | 0.13 | 0. | 0.4 | 0. | 0. | 1. | 0.35 |
| 425. | 0.08 | 0.16 | 0.3 | 0.41 | 0. | 0.4 | 0. | 0. | 1. | 0.25 |
| 430. | 0.21 | 0.29 | 0.41 | 0.73 | 0.82 | 0.4 | 0.33 | 0. | 1. | 0.17 |
| 435. | 0.32 | 0.38 | 0.45 | 0.94 | 1. | 0.4 | 0.4 | 0. | 1. | 0.13 |
| 440. | 0.37 | 0.4 | 0.46 | 0.99 | 1. | 0.4 | 0.4 | 0.04 | 1. | 0.13 |
| 445. | 0.33 | 0.38 | 0.45 | 0.95 | 1. | 0.4 | 0.4 | 0.04 | 1. | 0.17 |
| 450. | 0.24 | 0.31 | 0.42 | 0.78 | 1. | 0.4 | 0.4 | 0.04 | 1. | 0.25 |
| 455. | 0.14 | 0.21 | 0.33 | 0.52 | 0.82 | 0.4 | 0.33 | 0.04 | 1. | 0.33 |
| 460. | 0.07 | 0.11 | 0.21 | 0.27 | 0.09 | 0.4 | 0.04 | 0.04 | 1. | 0.41 |
| 465. | 0.04 | 0.05 | 0.12 | 0.13 | 0.09 | 0.4 | 0.04 | 0.04 | 1. | 0.48 |
| 470. | 0.03 | 0.04 | 0.08 | 0.09 | 0.09 | 0.4 | 0.04 | 0.04 | 1. | 0.53 |
| 475. | 0.03 | 0.04 | 0.08 | 0.09 | 0.09 | 0.4 | 0.04 | 0.04 | 1. | 0.55 |
| 480. | 0.03 | 0.04 | 0.08 | 0.09 | 0.09 | 0.4 | 0.04 | 0.04 | 1. | 0.55 |
| 485. | 0.03 | 0.04 | 0.08 | 0.09 | 0.09 | 0.4 | 0.04 | 0.04 | 1. | 0.53 |
| 490. | 0.03 | 0.04 | 0.08 | 0.09 | 0.09 | 0.4 | 0.04 | 0.04 | 1. | 0.48 |
| 495. | 0.03 | 0.04 | 0.08 | 0.09 | 0.09 | 0.4 | 0.04 | 0.04 | 1. | 0.41 |
| 500. | 0.03 | 0.04 | 0.08 | 0.09 | 0.09 | 0.4 | 0.04 | 0.04 | 1. | 0.32 |
| 505. | 0.04 | 0.05 | 0.11 | 0.12 | 0.09 | 0.4 | 0.04 | 0.04 | 1. | 0.22 |
| 510. | 0.06 | 0.09 | 0.17 | 0.22 | 0.09 | 0.4 | 0.04 | 0.04 | 1. | 0.12 |
| 515. | 0.11 | 0.16 | 0.26 | 0.39 | 0.09 | 0.4 | 0.04 | 0.04 | 1. | 0.03 |
| 520. | 0.18 | 0.24 | 0.34 | 0.6 | 0.4 | 0.4 | 0.16 | 0.04 | 1. | -0.04 |
| 525. | 0.26 | 0.32 | 0.41 | 0.79 | 1. | 0.4 | 0.4 | 0.04 | 1. | -0.08 |
| 530. | 0.32 | 0.37 | 0.44 | 0.92 | 1. | 0.4 | 0.4 | 0.04 | 1. | -0.1 |
| 535. | 0.36 | 0.39 | 0.45 | 0.97 | 1. | 0.4 | 0.4 | 0.04 | 1. | -0.08 |
| 540. | 0.33 | 0.37 | 0.44 | 0.92 | 1. | 0.4 | 0.4 | 0.04 | 1. | -0.05 |
| 545. | 0.27 | 0.32 | 0.41 | 0.8 | 1. | 0.4 | 0.4 | 0.04 | 1. | 0. |
| 550. | 0.2 | 0.25 | 0.35 | 0.63 | 1. | 0.4 | 0.4 | 0.04 | 1. | 0.05 |
| 555. | 0.13 | 0.18 | 0.27 | 0.44 | 0.4 | 0.4 | 0.16 | 0.04 | 1. | 0.11 |
| 560. | 0.08 | 0.11 | 0.2 | 0.28 | 0.09 | 0.4 | 0.04 | 0.04 | 1. | 0.16 |

FIG. 60B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.05 | 0.07 | 0.14 | 0.17 | 0.09 | 0.4 | 0.04 | 0.04 | 1. | 0.2 |
| 570. | 0.04 | 0.04 | 0.1 | 0.11 | 0.09 | 0.4 | 0.04 | 0.04 | 1. | 0.22 |
| 575. | 0.03 | 0.04 | 0.08 | 0.09 | 0.09 | 0.4 | 0.04 | 0.04 | 1. | 0.24 |
| 580. | 0.03 | 0.04 | 0.08 | 0.09 | 0.09 | 0.4 | 0.04 | 0.04 | 1. | 0.25 |
| 585. | 0.03 | 0.04 | 0.08 | 0.09 | 0.09 | 0.4 | 0.04 | 0.04 | 1. | 0.25 |
| 590. | 0.03 | 0.04 | 0.09 | 0.1 | 0.09 | 0.4 | 0.04 | 0.04 | 1. | 0.24 |
| 595. | 0.04 | 0.05 | 0.11 | 0.13 | 0.09 | 0.4 | 0.04 | 0.04 | 1. | 0.22 |
| 600. | 0.06 | 0.08 | 0.15 | 0.19 | 0.09 | 0.4 | 0.04 | 0.04 | 1. | 0.21 |
| 605. | 0.09 | 0.12 | 0.2 | 0.3 | 0.09 | 0.4 | 0.04 | 0.04 | 1. | 0.19 |
| 610. | 0.14 | 0.18 | 0.27 | 0.44 | 0.09 | 0.4 | 0.04 | 0.04 | 1. | 0.17 |
| 615. | 0.19 | 0.24 | 0.33 | 0.6 | 0.48 | 0.4 | 0.19 | 0.04 | 1. | 0.15 |
| 620. | 0.25 | 0.3 | 0.38 | 0.74 | 1. | 0.4 | 0.4 | 0.04 | 1. | 0.13 |
| 625. | 0.3 | 0.34 | 0.42 | 0.86 | 1. | 0.4 | 0.4 | 0.04 | 1. | 0.11 |
| 630. | 0.34 | 0.37 | 0.45 | 0.94 | 1. | 0.4 | 0.4 | 0.04 | 1. | 0.09 |
| 635. | 0.36 | 0.39 | 0.46 | 0.98 | 1. | 0.4 | 0.4 | 0.04 | 1. | 0.07 |
| 640. | 0.38 | 0.4 | 0.46 | 1. | 1. | 0.4 | 0.4 | 0.04 | 1. | 0.06 |
| 645. | 0.38 | 0.4 | 0.46 | 1. | 1. | 0.4 | 0.4 | 0.04 | 1. | 0.04 |
| 650. | 0.38 | 0.4 | 0.46 | 1. | 1. | 0.4 | 0.4 | 0.04 | 1. | 0.03 |
| 655. | 0.38 | 0.4 | 0.46 | 1. | 1. | 0.4 | 0.4 | 0.04 | 1. | 0.02 |
| 660. | 0.37 | 0.4 | 0.46 | 0.99 | 1. | 0.4 | 0.4 | 0. | 1. | 0.01 |
| 665. | 0.35 | 0.38 | 0.45 | 0.96 | 1. | 0.4 | 0.4 | 0. | 1. | 0.01 |
| 670. | 0.32 | 0.36 | 0.44 | 0.9 | 1. | 0.4 | 0.4 | 0. | 1. | 0. |
| 675. | 0.28 | 0.32 | 0.41 | 0.81 | 1. | 0.4 | 0.4 | 0. | 1. | 0. |
| 680. | 0.24 | 0.28 | 0.36 | 0.7 | 1. | 0.4 | 0.4 | 0. | 1. | 0. |
| 685. | 0.18 | 0.23 | 0.31 | 0.57 | 1. | 0.4 | 0.4 | 0. | 1. | 0. |
| 690. | 0.13 | 0.17 | 0.26 | 0.43 | 0.39 | 0.4 | 0.16 | 0. | 1. | 0. |
| 695. | 0.09 | 0.12 | 0.2 | 0.3 | 0. | 0.4 | 0. | 0. | 1. | 0.01 |
| 700. | 0.05 | 0.08 | 0.15 | 0.2 | 0. | 0.4 | 0. | 0. | 1. | 0.02 |
| 705. | 0.03 | 0.04 | 0.11 | 0.11 | 0. | 0.4 | 0. | 0. | 1. | 0.02 |
| 710. | 0.01 | 0.02 | 0.1 | 0.05 | 0. | 0.4 | 0. | 0. | 1. | 0.03 |
| 715. | 0. | 0.01 | 0.1 | 0.02 | 0. | 0.4 | 0. | 0. | 1. | 0.04 |
| 720. | 0. | 0. | 1. | 0. | 0. | 0.4 | 0. | 0. | 1. | 0.05 |
| 725. | 0. | 0. | 1. | 0. | 0. | 0.4 | 0. | 0. | 1. | 0.07 |
| 730. | 0. | 0. | 1. | 0. | 0. | 0.4 | 0. | 0. | 1. | 0.08 |
| 735. | 0. | 0. | 1. | 0. | 0. | 0.4 | 0. | 0. | 1. | 0.09 |

FIG. 60B-2

| | |
|---|---|
| Best fit Munsell Reference Filter | 5BG 4/1 |
| Wavelength Maxima | (449 536 626) |
| Transmittance at Maxima | (0.41 0.4 0.38) |
| Wavelength Minima | (484 580) |
| Transmittance at Minima | (0.04 0.04) |
| PGAI D-15 | 30.6 |
| $PGAI_{IW}$ D-15 | 25.42 |
| PGAI NWS | 43.87 |
| $PGAI_{IW}$ NWS | 27.35 |
| Luminous Transmittance of Daylight | 0.18 |
| Luminous Transmittance of Red Traffic Signal | 0.26 |
| Luminous Transmittance of Yellow Traffic Signal | 0.15 |
| Luminous Transmittance of Green Traffic Signal | 0.2 |
| Minimum Transmittance between 475-650nm | 0.04 |
| Solar Blue Light Transmittance | 0.16 |
| Ganglion Cell Transmittance | 0.15 |
| Luminous Transmittance of Primary Lights (R,G,B) | (0.2 0.21 0.2) |
| D65 Chromaticity Coordinate (x,y) | (0.317 0.337) |
| Yellow Traffic Signal Chromaticity Coordinate (x,y) | (0.616 0.382) |
| Green Traffic Signal Chromaticity Coordinate (x,y) | (0.195 0.466) |
| Passes ANSI Z80.3-2010 | True |

FIG. 61A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.45 | 0. | 0. | 1. | 0.5 |
| 395. | 0. | 0. | 0.02 | 0. | 0. | 0.45 | 0. | 0. | 1. | 0.49 |
| 400. | 0. | 0. | 0.05 | 0. | 0. | 0.45 | 0. | 0. | 1. | 0.47 |
| 405. | 0. | 0. | 0.05 | 0. | 0. | 0.45 | 0. | 0. | 1. | 0.45 |
| 410. | 0. | 0. | 0.05 | 0. | 0. | 0.45 | 0. | 0. | 1. | 0.4 |
| 415. | 0. | 0. | 0.05 | 0. | 0. | 0.45 | 0. | 0. | 1. | 0.33 |
| 420. | 0. | 0. | 0.05 | 0. | 0. | 0.45 | 0. | 0. | 1. | 0.25 |
| 425. | 0. | 0.01 | 0.08 | 0.02 | 0. | 0.45 | 0. | 0. | 1. | 0.16 |
| 430. | 0.03 | 0.08 | 0.2 | 0.18 | 0. | 0.45 | 0. | 0. | 1. | 0.09 |
| 435. | 0.12 | 0.22 | 0.36 | 0.5 | 0.04 | 0.45 | 0.02 | 0. | 1. | 0.04 |
| 440. | 0.26 | 0.35 | 0.47 | 0.83 | 1. | 0.45 | 0.45 | 0.04 | 1. | 0.02 |
| 445. | 0.38 | 0.43 | 0.49 | 0.99 | 1. | 0.45 | 0.45 | 0.04 | 1. | 0.05 |
| 450. | 0.34 | 0.4 | 0.49 | 0.94 | 1. | 0.45 | 0.45 | 0.04 | 1. | 0.1 |
| 455. | 0.25 | 0.33 | 0.44 | 0.76 | 1. | 0.45 | 0.45 | 0.04 | 1. | 0.17 |
| 460. | 0.16 | 0.23 | 0.34 | 0.53 | 0.46 | 0.45 | 0.21 | 0.04 | 1. | 0.24 |
| 465. | 0.09 | 0.14 | 0.24 | 0.32 | 0.42 | 0.45 | 0.19 | 0.04 | 1. | 0.31 |
| 470. | 0.05 | 0.08 | 0.15 | 0.18 | 0.08 | 0.45 | 0.04 | 0.04 | 1. | 0.37 |
| 475. | 0.04 | 0.05 | 0.1 | 0.11 | 0.08 | 0.45 | 0.04 | 0.04 | 1. | 0.41 |
| 480. | 0.03 | 0.04 | 0.08 | 0.09 | 0.08 | 0.45 | 0.04 | 0.04 | 1. | 0.43 |
| 485. | 0.03 | 0.04 | 0.08 | 0.08 | 0.08 | 0.45 | 0.04 | 0.04 | 1. | 0.43 |
| 490. | 0.03 | 0.04 | 0.08 | 0.08 | 0.08 | 0.45 | 0.04 | 0.04 | 1. | 0.42 |
| 495. | 0.03 | 0.04 | 0.08 | 0.08 | 0.08 | 0.45 | 0.04 | 0.04 | 1. | 0.38 |
| 500. | 0.03 | 0.04 | 0.08 | 0.08 | 0.08 | 0.45 | 0.04 | 0.04 | 1. | 0.33 |
| 505. | 0.03 | 0.04 | 0.09 | 0.09 | 0.08 | 0.45 | 0.04 | 0.04 | 1. | 0.26 |
| 510. | 0.04 | 0.07 | 0.14 | 0.15 | 0.08 | 0.45 | 0.04 | 0.04 | 1. | 0.19 |
| 515. | 0.08 | 0.13 | 0.23 | 0.3 | 0.08 | 0.45 | 0.04 | 0.04 | 1. | 0.12 |
| 520. | 0.15 | 0.22 | 0.33 | 0.5 | 0.08 | 0.45 | 0.04 | 0.04 | 1. | 0.06 |
| 525. | 0.24 | 0.31 | 0.42 | 0.72 | 0.82 | 0.45 | 0.37 | 0.04 | 1. | 0.02 |
| 530. | 0.33 | 0.38 | 0.47 | 0.9 | 1. | 0.45 | 0.45 | 0.04 | 1. | 0. |
| 535. | 0.38 | 0.41 | 0.48 | 0.96 | 1. | 0.45 | 0.45 | 0.04 | 1. | 0.01 |
| 540. | 0.33 | 0.39 | 0.47 | 0.9 | 1. | 0.45 | 0.45 | 0.04 | 1. | 0.04 |
| 545. | 0.26 | 0.32 | 0.42 | 0.75 | 1. | 0.45 | 0.45 | 0.04 | 1. | 0.09 |
| 550. | 0.18 | 0.24 | 0.34 | 0.55 | 0.82 | 0.45 | 0.37 | 0.04 | 1. | 0.15 |
| 555. | 0.11 | 0.15 | 0.25 | 0.36 | 0.08 | 0.45 | 0.04 | 0.04 | 1. | 0.22 |
| 560. | 0.06 | 0.09 | 0.17 | 0.21 | 0.08 | 0.45 | 0.04 | 0.04 | 1. | 0.28 |

FIG. 61B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.04 | 0.05 | 0.12 | 0.12 | 0.08 | 0.45 | 0.04 | 0.04 | 1. | 0.33 |
| 570. | 0.03 | 0.04 | 0.09 | 0.09 | 0.08 | 0.45 | 0.04 | 0.04 | 1. | 0.38 |
| 575. | 0.03 | 0.04 | 0.08 | 0.08 | 0.08 | 0.45 | 0.04 | 0.04 | 1. | 0.41 |
| 580. | 0.03 | 0.04 | 0.08 | 0.08 | 0.08 | 0.45 | 0.04 | 0.04 | 1. | 0.44 |
| 585. | 0.03 | 0.04 | 0.09 | 0.09 | 0.08 | 0.45 | 0.04 | 0.04 | 1. | 0.46 |
| 590. | 0.04 | 0.05 | 0.1 | 0.11 | 0.08 | 0.45 | 0.04 | 0.04 | 1. | 0.47 |
| 595. | 0.05 | 0.07 | 0.14 | 0.17 | 0.08 | 0.45 | 0.04 | 0.04 | 1. | 0.47 |
| 600. | 0.08 | 0.12 | 0.2 | 0.27 | 0.08 | 0.45 | 0.04 | 0.04 | 1. | 0.45 |
| 605. | 0.13 | 0.17 | 0.26 | 0.4 | 0.08 | 0.45 | 0.04 | 0.04 | 1. | 0.43 |
| 610. | 0.19 | 0.24 | 0.33 | 0.56 | 0.5 | 0.45 | 0.23 | 0.04 | 1. | 0.38 |
| 615. | 0.25 | 0.3 | 0.4 | 0.71 | 0.6 | 0.45 | 0.27 | 0.04 | 1. | 0.32 |
| 620. | 0.31 | 0.36 | 0.44 | 0.84 | 1. | 0.45 | 0.45 | 0.04 | 1. | 0.25 |
| 625. | 0.36 | 0.39 | 0.45 | 0.91 | 1. | 0.45 | 0.45 | 0.04 | 1. | 0.16 |
| 630. | 0.36 | 0.39 | 0.45 | 0.91 | 1. | 0.45 | 0.45 | 0.04 | 1. | 0.09 |
| 635. | 0.31 | 0.36 | 0.44 | 0.84 | 1. | 0.45 | 0.45 | 0.04 | 1. | 0.03 |
| 640. | 0.26 | 0.31 | 0.4 | 0.72 | 1. | 0.45 | 0.45 | 0.04 | 1. | 0. |
| 645. | 0.19 | 0.24 | 0.34 | 0.57 | 0.98 | 0.45 | 0.44 | 0.04 | 1. | 0.01 |
| 650. | 0.13 | 0.18 | 0.27 | 0.41 | 0.08 | 0.45 | 0.04 | 0.04 | 1. | 0.04 |
| 655. | 0.08 | 0.12 | 0.2 | 0.27 | 0.08 | 0.45 | 0.04 | 0.04 | 1. | 0.1 |
| 660. | 0.04 | 0.07 | 0.14 | 0.16 | 0.08 | 0.45 | 0.04 | 0. | 1. | 0.17 |
| 665. | 0.02 | 0.03 | 0.1 | 0.08 | 0. | 0.45 | 0. | 0. | 1. | 0.24 |
| 670. | 0.01 | 0.01 | 0.07 | 0.03 | 0. | 0.45 | 0. | 0. | 1. | 0.31 |
| 675. | 0. | 0.01 | 0.05 | 0.01 | 0. | 0.45 | 0. | 0. | 1. | 0.36 |
| 680. | 0. | 0. | 0.05 | 0.01 | 0. | 0.45 | 0. | 0. | 1. | 0.41 |
| 685. | 0. | 0. | 0.05 | 0. | 0. | 0.45 | 0. | 0. | 1. | 0.44 |
| 690. | 0. | 0. | 0.05 | 0. | 0. | 0.45 | 0. | 0. | 1. | 0.46 |
| 695. | 0. | 0. | 0.05 | 0. | 0. | 0.45 | 0. | 0. | 1. | 0.48 |
| 700. | 0. | 0. | 0.05 | 0. | 0. | 0.45 | 0. | 0. | 1. | 0.49 |
| 705. | 0. | 0. | 0.05 | 0. | 0. | 0.45 | 0. | 0. | 1. | 0.5 |
| 710. | 0. | 0. | 0.09 | 0. | 0. | 0.45 | 0. | 0. | 1. | 0.5 |
| 715. | 0. | 0. | 0.09 | 0. | 0. | 0.45 | 0. | 0. | 1. | 0.5 |
| 720. | 0. | 0. | 1. | 0. | 0. | 0.45 | 0. | 0. | 1. | 0.5 |
| 725. | 0. | 0. | 1. | 0. | 0. | 0.45 | 0. | 0. | 1. | 0.51 |
| 730. | 0. | 0. | 1. | 0. | 0. | 0.45 | 0. | 0. | 1. | 0.51 |
| 735. | 0. | 0. | 1. | 0. | 0. | 0.45 | 0. | 0. | 1. | 0.51 |

FIG. 61B-2

| | |
|---|---|
| Best-fit Munsell Reference Filter | 5B 8/4 |
| Wavelength Maxima | (458 561 668) |
| Transmittance at Maxima | (0.43 0.42 0.33) |
| Wavelength Minima | (506 622) |
| Transmittance at Minima | (0.04 0.04) |
| PGAI D-15 | -38.78 |
| $PGAI_{IW}$ D-15 | -16.73 |
| PGAI NWS | -32.23 |
| $PGAI_{IW}$ NWS | 0.36 |
| Luminous Transmittance of Daylight | 0.18 |
| Luminous Transmittance of Red Traffic Signal | 0.11 |
| Luminous Transmittance of Yellow Traffic Signal | 0.19 |
| Luminous Transmittance of Green Traffic Signal | 0.18 |
| Minimum Transmittance between 475-650nm | 0.04 |
| Solar Blue Light Transmittance | 0.18 |
| Ganglion Cell Transmittance | 0.18 |
| Luminous Transmittance of Primary Lights (R,G,B) | (0.06 0.21 0.19) |
| D65 Chromaticity Coordinate (x,y) | (0.288 0.322) |
| Yellow Traffic Signal Chromaticity Coordinate (x,y) | (0.496 0.502) |
| Green Traffic Signal Chromaticity Coordinate (x,y) | (0.244 0.368) |
| Passes ANSI Z80.3-2010 | True |

FIG. 62A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.45 | 0. | 0. | 1. | 1. |
| 395. | 0. | 0. | 0.02 | 0. | 0. | 0.45 | 0. | 0. | 1. | 1. |
| 400. | 0. | 0. | 0.05 | 0. | 0. | 0.45 | 0. | 0. | 1. | 0.94 |
| 405. | 0. | 0. | 0.05 | 0. | 0. | 0.45 | 0. | 0. | 1. | 0.84 |
| 410. | 0. | 0. | 0.05 | 0. | 0. | 0.45 | 0. | 0. | 1. | 0.71 |
| 415. | 0. | 0. | 0.05 | 0. | 0. | 0.45 | 0. | 0. | 1. | 0.59 |
| 420. | 0. | 0. | 0.05 | 0. | 0. | 0.45 | 0. | 0. | 1. | 0.49 |
| 425. | 0. | 0. | 0.05 | 0. | 0. | 0.45 | 0. | 0. | 1. | 0.41 |
| 430. | 0. | 0.01 | 0.09 | 0.03 | 0. | 0.45 | 0. | 0. | 1. | 0.36 |
| 435. | 0.03 | 0.08 | 0.2 | 0.18 | 0. | 0.45 | 0. | 0. | 1. | 0.32 |
| 440. | 0.12 | 0.21 | 0.35 | 0.48 | 0.08 | 0.45 | 0.04 | 0.04 | 1. | 0.3 |
| 445. | 0.26 | 0.35 | 0.46 | 0.78 | 0.92 | 0.45 | 0.41 | 0.04 | 1. | 0.28 |
| 450. | 0.37 | 0.43 | 0.51 | 0.96 | 1. | 0.45 | 0.45 | 0.04 | 1. | 0.27 |
| 455. | 0.42 | 0.45 | 0.51 | 1. | 1. | 0.45 | 0.45 | 0.04 | 1. | 0.26 |
| 460. | 0.38 | 0.43 | 0.51 | 0.96 | 1. | 0.45 | 0.45 | 0.04 | 1. | 0.26 |
| 465. | 0.3 | 0.37 | 0.47 | 0.83 | 1. | 0.45 | 0.45 | 0.04 | 1. | 0.25 |
| 470. | 0.23 | 0.29 | 0.39 | 0.64 | 0.84 | 0.45 | 0.38 | 0.04 | 1. | 0.25 |
| 475. | 0.16 | 0.21 | 0.31 | 0.46 | 0.27 | 0.45 | 0.12 | 0.04 | 1. | 0.25 |
| 480. | 0.1 | 0.14 | 0.23 | 0.31 | 0.44 | 0.45 | 0.2 | 0.04 | 1. | 0.26 |
| 485. | 0.07 | 0.09 | 0.17 | 0.21 | 0.25 | 0.45 | 0.11 | 0.04 | 1. | 0.28 |
| 490. | 0.05 | 0.06 | 0.12 | 0.14 | 0.08 | 0.45 | 0.04 | 0.04 | 1. | 0.32 |
| 495. | 0.04 | 0.04 | 0.1 | 0.1 | 0.08 | 0.45 | 0.04 | 0.04 | 1. | 0.38 |
| 500. | 0.03 | 0.04 | 0.08 | 0.08 | 0.08 | 0.45 | 0.04 | 0.04 | 1. | 0.46 |
| 505. | 0.03 | 0.04 | 0.08 | 0.08 | 0.08 | 0.45 | 0.04 | 0.04 | 1. | 0.56 |
| 510. | 0.03 | 0.04 | 0.08 | 0.08 | 0.08 | 0.45 | 0.04 | 0.04 | 1. | 0.66 |
| 515. | 0.03 | 0.04 | 0.08 | 0.08 | 0.08 | 0.45 | 0.04 | 0.04 | 1. | 0.74 |
| 520. | 0.03 | 0.04 | 0.08 | 0.08 | 0.08 | 0.45 | 0.04 | 0.04 | 1. | 0.81 |
| 525. | 0.03 | 0.04 | 0.09 | 0.09 | 0.08 | 0.45 | 0.04 | 0.04 | 1. | 0.83 |
| 530. | 0.04 | 0.06 | 0.13 | 0.13 | 0.08 | 0.45 | 0.04 | 0.04 | 1. | 0.82 |
| 535. | 0.07 | 0.11 | 0.2 | 0.24 | 0.08 | 0.45 | 0.04 | 0.04 | 1. | 0.78 |
| 540. | 0.13 | 0.18 | 0.29 | 0.41 | 0.08 | 0.45 | 0.04 | 0.04 | 1. | 0.7 |
| 545. | 0.2 | 0.27 | 0.38 | 0.6 | 0.44 | 0.45 | 0.2 | 0.04 | 1. | 0.62 |
| 550. | 0.29 | 0.35 | 0.45 | 0.78 | 1. | 0.45 | 0.45 | 0.04 | 1. | 0.52 |
| 555. | 0.36 | 0.41 | 0.49 | 0.91 | 1. | 0.45 | 0.45 | 0.04 | 1. | 0.43 |
| 560. | 0.4 | 0.43 | 0.49 | 0.96 | 1. | 0.45 | 0.45 | 0.04 | 1. | 0.35 |

FIG. 62B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.36 | 0.41 | 0.49 | 0.92 | 1. | 0.45 | 0.45 | 0.04 | 1. | 0.29 |
| 570. | 0.3 | 0.36 | 0.45 | 0.81 | 1. | 0.45 | 0.45 | 0.04 | 1. | 0.24 |
| 575. | 0.23 | 0.29 | 0.39 | 0.65 | 1. | 0.45 | 0.45 | 0.04 | 1. | 0.2 |
| 580. | 0.16 | 0.21 | 0.31 | 0.48 | 0.52 | 0.45 | 0.23 | 0.04 | 1. | 0.17 |
| 585. | 0.11 | 0.14 | 0.23 | 0.33 | 0.08 | 0.45 | 0.04 | 0.04 | 1. | 0.15 |
| 590. | 0.07 | 0.09 | 0.17 | 0.21 | 0.08 | 0.45 | 0.04 | 0.04 | 1. | 0.14 |
| 595. | 0.05 | 0.06 | 0.12 | 0.14 | 0.16 | 0.45 | 0.07 | 0.04 | 1. | 0.14 |
| 600. | 0.04 | 0.05 | 0.1 | 0.1 | 0.08 | 0.45 | 0.04 | 0.04 | 1. | 0.15 |
| 605. | 0.04 | 0.04 | 0.09 | 0.09 | 0.08 | 0.45 | 0.04 | 0.04 | 1. | 0.2 |
| 610. | 0.04 | 0.04 | 0.08 | 0.09 | 0.08 | 0.45 | 0.04 | 0.04 | 1. | 0.3 |
| 615. | 0.03 | 0.04 | 0.08 | 0.08 | 0.08 | 0.45 | 0.04 | 0.04 | 1. | 0.44 |
| 620. | 0.03 | 0.04 | 0.08 | 0.08 | 0.08 | 0.45 | 0.04 | 0.04 | 1. | 0.59 |
| 625. | 0.03 | 0.04 | 0.08 | 0.08 | 0.08 | 0.45 | 0.04 | 0.04 | 1. | 0.71 |
| 630. | 0.03 | 0.04 | 0.09 | 0.09 | 0.08 | 0.45 | 0.04 | 0.04 | 1. | 0.75 |
| 635. | 0.04 | 0.05 | 0.11 | 0.11 | 0.08 | 0.45 | 0.04 | 0.04 | 1. | 0.69 |
| 640. | 0.06 | 0.08 | 0.15 | 0.17 | 0.08 | 0.45 | 0.04 | 0.04 | 1. | 0.57 |
| 645. | 0.09 | 0.12 | 0.2 | 0.27 | 0.08 | 0.45 | 0.04 | 0.04 | 1. | 0.42 |
| 650. | 0.13 | 0.17 | 0.26 | 0.39 | 0.08 | 0.45 | 0.04 | 0.04 | 1. | 0.28 |
| 655. | 0.19 | 0.24 | 0.32 | 0.53 | 0.08 | 0.45 | 0.04 | 0.04 | 1. | 0.19 |
| 660. | 0.25 | 0.29 | 0.37 | 0.65 | 1. | 0.45 | 0.45 | 0. | 1. | 0.13 |
| 665. | 0.29 | 0.33 | 0.4 | 0.74 | 1. | 0.45 | 0.45 | 0. | 1. | 0.09 |
| 670. | 0.32 | 0.34 | 0.4 | 0.77 | 1. | 0.45 | 0.45 | 0. | 1. | 0.08 |
| 675. | 0.29 | 0.33 | 0.4 | 0.74 | 1. | 0.45 | 0.45 | 0. | 1. | 0.07 |
| 680. | 0.25 | 0.29 | 0.37 | 0.65 | 1. | 0.45 | 0.45 | 0. | 1. | 0.06 |
| 685. | 0.19 | 0.24 | 0.33 | 0.54 | 1. | 0.45 | 0.45 | 0. | 1. | 0.06 |
| 690. | 0.14 | 0.18 | 0.27 | 0.4 | 0.13 | 0.45 | 0.06 | 0. | 1. | 0.06 |
| 695. | 0.09 | 0.12 | 0.2 | 0.28 | 0.05 | 0.45 | 0.02 | 0. | 1. | 0.06 |
| 700. | 0.05 | 0.08 | 0.15 | 0.17 | 0. | 0.45 | 0. | 0. | 1. | 0.06 |
| 705. | 0.03 | 0.04 | 0.1 | 0.09 | 0. | 0.45 | 0. | 0. | 1. | 0.05 |
| 710. | 0.01 | 0.02 | 0.1 | 0.04 | 0. | 0.45 | 0. | 0. | 1. | 0.06 |
| 715. | 0. | 0.01 | 0.09 | 0.01 | 0. | 0.45 | 0. | 0. | 1. | 0.06 |
| 720. | 0. | 0. | 1. | 0. | 0. | 0.45 | 0. | 0. | 1. | 0.06 |
| 725. | 0. | 0. | 1. | 0. | 0. | 0.45 | 0. | 0. | 1. | 0.06 |
| 730. | 0. | 0. | 1. | 0. | 0. | 0.45 | 0. | 0. | 1. | 0.07 |
| 735. | 0. | 0. | 1. | 0. | 0. | 0.45 | 0. | 0. | 1. | 0.07 |

FIG. 62B-2

| | |
|---|---|
| Best-fit Munsell Reference Filter | 10Y 6/4 |
| Wavelength Maxima | (458 556 632) |
| Transmittance at Maxima | (0.47 0.55 0.55) |
| Wavelength Minima | (476 587) |
| Transmittance at Minima | (0.07 0.08) |
| PGAI D-15 | 10.98 |
| $PGAI_{IW}$ D-15 | 19.35 |
| PGAI NWS | 19.02 |
| $PGAI_{IW}$ NWS | 24.07 |
| Luminous Transmittance of Daylight | 0.32 |
| Luminous Transmittance of Red Traffic Signal | 0.5 |
| Luminous Transmittance of Yellow Traffic Signal | 0.36 |
| Luminous Transmittance of Green Traffic Signal | 0.31 |
| Minimum Transmittance between 475-650nm | 0.07 |
| Solar Blue Light Transmittance | 0.13 |
| Ganglion Cell Transmittance | 0.15 |
| Luminous Transmittance of Primary Lights (R,G,B) | (0.32 0.35 0.21) |
| D65 Chromaticity Coordinate (x,y) | (0.391 0.414) |
| Yellow Traffic Signal Chromaticity Coordinate (x,y) | (0.581 0.418) |
| Green Traffic Signal Chromaticity Coordinate (x,y) | (0.258 0.514) |
| Passes ANSI Z80.3-2010 | True |

FIG. 63A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.55 | 0. | 0. | 1. | 1. |
| 395. | 0. | 0. | 0.02 | 0. | 0. | 0.55 | 0. | 0. | 1. | 0.96 |
| 400. | 0. | 0. | 0.05 | 0. | 0. | 0.55 | 0. | 0. | 1. | 0.94 |
| 405. | 0. | 0. | 0.05 | 0. | 0. | 0.55 | 0. | 0. | 1. | 0.91 |
| 410. | 0. | 0. | 0.05 | 0. | 0. | 0.55 | 0. | 0. | 1. | 0.9 |
| 415. | 0. | 0. | 0.05 | 0. | 0. | 0.55 | 0. | 0. | 1. | 0.89 |
| 420. | 0. | 0. | 0.05 | 0. | 0. | 0.55 | 0. | 0. | 1. | 0.89 |
| 425. | 0. | 0. | 0.05 | 0. | 0. | 0.55 | 0. | 0. | 1. | 0.9 |
| 430. | 0. | 0. | 0.05 | 0. | 0. | 0.55 | 0. | 0. | 1. | 0.9 |
| 435. | 0. | 0. | 0.05 | 0. | 0. | 0.55 | 0. | 0. | 1. | 0.9 |
| 440. | 0. | 0.01 | 0.1 | 0.02 | 0. | 0.55 | 0. | 0.06 | 1. | 0.89 |
| 445. | 0.04 | 0.12 | 0.32 | 0.23 | 0.35 | 0.55 | 0.19 | 0.06 | 1. | 0.88 |
| 450. | 0.21 | 0.38 | 0.57 | 0.69 | 0.82 | 0.55 | 0.45 | 0.06 | 1. | 0.84 |
| 455. | 0.44 | 0.53 | 0.6 | 0.97 | 1. | 0.55 | 0.55 | 0.06 | 1. | 0.8 |
| 460. | 0.28 | 0.43 | 0.58 | 0.77 | 0.96 | 0.55 | 0.53 | 0.06 | 1. | 0.76 |
| 465. | 0.13 | 0.22 | 0.4 | 0.4 | 0.51 | 0.55 | 0.28 | 0.06 | 1. | 0.71 |
| 470. | 0.07 | 0.1 | 0.21 | 0.18 | 0.16 | 0.55 | 0.09 | 0.06 | 1. | 0.66 |
| 475. | 0.07 | 0.07 | 0.12 | 0.13 | 0.13 | 0.55 | 0.07 | 0.06 | 1. | 0.62 |
| 480. | 0.07 | 0.07 | 0.11 | 0.13 | 0.13 | 0.55 | 0.07 | 0.06 | 1. | 0.59 |
| 485. | 0.07 | 0.07 | 0.11 | 0.13 | 0.13 | 0.55 | 0.07 | 0.06 | 1. | 0.55 |
| 490. | 0.07 | 0.07 | 0.11 | 0.13 | 0.13 | 0.55 | 0.07 | 0.06 | 1. | 0.53 |
| 495. | 0.07 | 0.07 | 0.11 | 0.13 | 0.13 | 0.55 | 0.07 | 0.06 | 1. | 0.51 |
| 500. | 0.07 | 0.07 | 0.11 | 0.13 | 0.13 | 0.55 | 0.07 | 0.06 | 1. | 0.5 |
| 505. | 0.07 | 0.07 | 0.11 | 0.13 | 0.13 | 0.55 | 0.07 | 0.06 | 1. | 0.5 |
| 510. | 0.07 | 0.07 | 0.11 | 0.13 | 0.13 | 0.55 | 0.07 | 0.06 | 1. | 0.5 |
| 515. | 0.07 | 0.07 | 0.11 | 0.13 | 0.13 | 0.55 | 0.07 | 0.06 | 1. | 0.52 |
| 520. | 0.07 | 0.07 | 0.12 | 0.13 | 0.13 | 0.55 | 0.07 | 0.06 | 1. | 0.53 |
| 525. | 0.07 | 0.11 | 0.25 | 0.2 | 0.13 | 0.55 | 0.07 | 0.06 | 1. | 0.54 |
| 530. | 0.15 | 0.28 | 0.47 | 0.51 | 0.37 | 0.55 | 0.2 | 0.06 | 1. | 0.55 |
| 535. | 0.35 | 0.47 | 0.6 | 0.86 | 0.91 | 0.55 | 0.5 | 0.06 | 1. | 0.55 |
| 540. | 0.49 | 0.54 | 0.62 | 0.99 | 1. | 0.55 | 0.55 | 0.06 | 1. | 0.54 |
| 545. | 0.52 | 0.55 | 0.62 | 1. | 1. | 0.55 | 0.55 | 0.06 | 1. | 0.52 |
| 550. | 0.52 | 0.55 | 0.62 | 1. | 1. | 0.55 | 0.55 | 0.06 | 1. | 0.48 |
| 555. | 0.52 | 0.55 | 0.62 | 1. | 1. | 0.55 | 0.55 | 0.06 | 1. | 0.44 |
| 560. | 0.52 | 0.55 | 0.62 | 1. | 1. | 0.55 | 0.55 | 0.06 | 1. | 0.39 |

FIG. 63B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.45 | 0.53 | 0.61 | 0.96 | 1. | 0.55 | 0.55 | 0.06 | 1. | 0.35 |
| 570. | 0.29 | 0.42 | 0.56 | 0.76 | 0.91 | 0.55 | 0.5 | 0.06 | 1. | 0.3 |
| 575. | 0.14 | 0.24 | 0.4 | 0.43 | 0.13 | 0.55 | 0.07 | 0.06 | 1. | 0.26 |
| 580. | 0.07 | 0.1 | 0.22 | 0.19 | 0.13 | 0.55 | 0.07 | 0.06 | 1. | 0.23 |
| 585. | 0.07 | 0.07 | 0.13 | 0.13 | 0.13 | 0.55 | 0.07 | 0.06 | 1. | 0.2 |
| 590. | 0.07 | 0.07 | 0.12 | 0.13 | 0.13 | 0.55 | 0.07 | 0.06 | 1. | 0.18 |
| 595. | 0.07 | 0.08 | 0.16 | 0.15 | 0.13 | 0.55 | 0.07 | 0.06 | 1. | 0.16 |
| 600. | 0.1 | 0.16 | 0.29 | 0.28 | 0.13 | 0.55 | 0.07 | 0.06 | 1. | 0.14 |
| 605. | 0.2 | 0.3 | 0.46 | 0.55 | 0.3 | 0.55 | 0.16 | 0.06 | 1. | 0.13 |
| 610. | 0.35 | 0.45 | 0.58 | 0.82 | 0.99 | 0.55 | 0.54 | 0.06 | 1. | 0.11 |
| 615. | 0.47 | 0.53 | 0.62 | 0.97 | 1. | 0.55 | 0.55 | 0.06 | 1. | 0.1 |
| 620. | 0.52 | 0.55 | 0.62 | 1. | 1. | 0.55 | 0.55 | 0.06 | 1. | 0.09 |
| 625. | 0.52 | 0.55 | 0.62 | 1. | 1. | 0.55 | 0.55 | 0.06 | 1. | 0.08 |
| 630. | 0.52 | 0.55 | 0.62 | 1. | 1. | 0.55 | 0.55 | 0.06 | 1. | 0.08 |
| 635. | 0.52 | 0.55 | 0.62 | 1. | 1. | 0.55 | 0.55 | 0.06 | 1. | 0.07 |
| 640. | 0.52 | 0.55 | 0.62 | 1. | 1. | 0.55 | 0.55 | 0.06 | 1. | 0.06 |
| 645. | 0.52 | 0.55 | 0.62 | 1. | 1. | 0.55 | 0.55 | 0.06 | 1. | 0.06 |
| 650. | 0.52 | 0.55 | 0.62 | 1. | 1. | 0.55 | 0.55 | 0.06 | 1. | 0.05 |
| 655. | 0.51 | 0.55 | 0.62 | 0.99 | 1. | 0.55 | 0.55 | 0.06 | 1. | 0.05 |
| 660. | 0.45 | 0.52 | 0.61 | 0.94 | 1. | 0.55 | 0.55 | 0. | 1. | 0.05 |
| 665. | 0.34 | 0.43 | 0.56 | 0.79 | 1. | 0.55 | 0.55 | 0. | 1. | 0.04 |
| 670. | 0.21 | 0.3 | 0.44 | 0.55 | 0.69 | 0.55 | 0.38 | 0. | 1. | 0.04 |
| 675. | 0.12 | 0.18 | 0.3 | 0.33 | 0.13 | 0.55 | 0.07 | 0. | 1. | 0.04 |
| 680. | 0.07 | 0.1 | 0.19 | 0.18 | 0.13 | 0.55 | 0.07 | 0. | 1. | 0.04 |
| 685. | 0.05 | 0.07 | 0.13 | 0.12 | 0.13 | 0.55 | 0.07 | 0. | 1. | 0.04 |
| 690. | 0.04 | 0.05 | 0.1 | 0.09 | 0.13 | 0.55 | 0.07 | 0. | 1. | 0.03 |
| 695. | 0.02 | 0.03 | 0.08 | 0.06 | 0. | 0.55 | 0. | 0. | 1. | 0.03 |
| 700. | 0.01 | 0.01 | 0.06 | 0.02 | 0. | 0.55 | 0. | 0. | 1. | 0.03 |
| 705. | 0. | 0. | 0.05 | 0.01 | 0. | 0.55 | 0. | 0. | 1. | 0.03 |
| 710. | 0. | 0. | 0.09 | 0. | 0. | 0.55 | 0. | 0. | 1. | 0.03 |
| 715. | 0. | 0. | 0.09 | 0. | 0. | 0.55 | 0. | 0. | 1. | 0.03 |
| 720. | 0. | 0. | 1. | 0. | 0. | 0.55 | 0. | 0. | 1. | 0.02 |
| 725. | 0. | 0. | 1. | 0. | 0. | 0.55 | 0. | 0. | 1. | 0.02 |
| 730. | 0. | 0. | 1. | 0. | 0. | 0.55 | 0. | 0. | 1. | 0.02 |
| 735. | 0. | 0. | 1. | 0. | 0. | 0.55 | 0. | 0. | 1. | 0.02 |

FIG. 63B-2

| | |
|---|---|
| Best-fit Munsell Reference Filter | 10G 3/2 |
| Wavelength Maxima | (450 536 632) |
| Transmittance at Maxima | (0.44 0.45 0.43) |
| Wavelength Minima | (483 584) |
| Transmittance at Minima | (0.04 0.04) |
| PGAI D-15 | 32.87 |
| $PGAI_{IW}$ D-15 | 32.71 |
| PGAI NWS | 52.54 |
| $PGAI_{IW}$ NWS | 38.72 |
| Luminous Transmittance of Daylight | 0.18 |
| Luminous Transmittance of Red Traffic Signal | 0.3 |
| Luminous Transmittance of Yellow Traffic Signal | 0.14 |
| Luminous Transmittance of Green Traffic Signal | 0.22 |
| Minimum Transmittance between 475-650nm | 0.04 |
| Solar Blue Light Transmittance | 0.15 |
| Ganglion Cell Transmittance | 0.15 |
| Luminous Transmittance of Primary Lights (R,G,B) | (0.16 0.23 0.21) |
| D65 Chromaticity Coordinate (x,y) | (0.309 0.352) |
| Yellow Traffic Signal Chromaticity Coordinate (x,y) | (0.62 0.378) |
| Green Traffic Signal Chromaticity Coordinate (x,y) | (0.193 0.488) |
| Passes ANSI Z80.3-2010 | True |

FIG. 64A

| λ (nm) | $f_{MIN}$ | $f_T$ | $f_{MAX}$ | q'(λ) | q(λ) | p(λ) | f(λ) | $t_{MIN}(\lambda)$ | $t_{MAX}(\lambda)$ | c(λ) |
|---|---|---|---|---|---|---|---|---|---|---|
| 390. | 0. | 0. | 0.02 | 0. | 0. | 0.45 | 0. | 0. | 1. | 1. |
| 395. | 0. | 0. | 0.02 | 0. | 0. | 0.45 | 0. | 0. | 1. | 0.91 |
| 400. | 0. | 0. | 0.05 | 0. | 0. | 0.45 | 0. | 0. | 1. | 0.83 |
| 405. | 0. | 0. | 0.05 | 0. | 0. | 0.45 | 0. | 0. | 1. | 0.75 |
| 410. | 0. | 0. | 0.05 | 0. | 0. | 0.45 | 0. | 0. | 1. | 0.65 |
| 415. | 0. | 0. | 0.05 | 0. | 0. | 0.45 | 0. | 0. | 1. | 0.55 |
| 420. | 0. | 0. | 0.05 | 0. | 0. | 0.45 | 0. | 0. | 1. | 0.43 |
| 425. | 0. | 0. | 0.05 | 0. | 0. | 0.45 | 0. | 0. | 1. | 0.3 |
| 430. | 0. | 0. | 0.07 | 0. | 0. | 0.45 | 0. | 0. | 1. | 0.19 |
| 435. | 0.01 | 0.1 | 0.3 | 0.23 | 0. | 0.45 | 0. | 0. | 1. | 0.11 |
| 440. | 0.19 | 0.33 | 0.48 | 0.74 | 0.55 | 0.45 | 0.25 | 0.04 | 1. | 0.07 |
| 445. | 0.38 | 0.45 | 0.51 | 0.99 | 1. | 0.45 | 0.45 | 0.04 | 1. | 0.08 |
| 450. | 0.41 | 0.45 | 0.51 | 1. | 1. | 0.45 | 0.45 | 0.04 | 1. | 0.12 |
| 455. | 0.31 | 0.4 | 0.51 | 0.9 | 1. | 0.45 | 0.45 | 0.04 | 1. | 0.19 |
| 460. | 0.15 | 0.26 | 0.42 | 0.58 | 0.76 | 0.45 | 0.34 | 0.04 | 1. | 0.26 |
| 465. | 0.05 | 0.1 | 0.24 | 0.23 | 0.32 | 0.45 | 0.14 | 0.04 | 1. | 0.33 |
| 470. | 0.03 | 0.04 | 0.11 | 0.09 | 0.08 | 0.45 | 0.04 | 0.04 | 1. | 0.39 |
| 475. | 0.03 | 0.04 | 0.08 | 0.08 | 0.08 | 0.45 | 0.04 | 0.04 | 1. | 0.43 |
| 480. | 0.03 | 0.04 | 0.08 | 0.08 | 0.08 | 0.45 | 0.04 | 0.04 | 1. | 0.45 |
| 485. | 0.03 | 0.04 | 0.08 | 0.08 | 0.08 | 0.45 | 0.04 | 0.04 | 1. | 0.45 |
| 490. | 0.03 | 0.04 | 0.08 | 0.08 | 0.08 | 0.45 | 0.04 | 0.04 | 1. | 0.44 |
| 495. | 0.03 | 0.04 | 0.08 | 0.08 | 0.08 | 0.45 | 0.04 | 0.04 | 1. | 0.4 |
| 500. | 0.03 | 0.04 | 0.08 | 0.08 | 0.08 | 0.45 | 0.04 | 0.04 | 1. | 0.35 |
| 505. | 0.03 | 0.04 | 0.08 | 0.08 | 0.08 | 0.45 | 0.04 | 0.04 | 1. | 0.28 |
| 510. | 0.03 | 0.04 | 0.08 | 0.08 | 0.08 | 0.45 | 0.04 | 0.04 | 1. | 0.2 |
| 515. | 0.04 | 0.05 | 0.18 | 0.12 | 0.08 | 0.45 | 0.04 | 0.04 | 1. | 0.13 |
| 520. | 0.09 | 0.22 | 0.42 | 0.5 | 0.1 | 0.45 | 0.05 | 0.04 | 1. | 0.06 |
| 525. | 0.3 | 0.42 | 0.51 | 0.93 | 1. | 0.45 | 0.45 | 0.04 | 1. | 0.02 |
| 530. | 0.42 | 0.45 | 0.51 | 1. | 1. | 0.45 | 0.45 | 0.04 | 1. | 0. |
| 535. | 0.43 | 0.45 | 0.51 | 1. | 1. | 0.45 | 0.45 | 0.04 | 1. | 0.01 |
| 540. | 0.43 | 0.45 | 0.51 | 1. | 1. | 0.45 | 0.45 | 0.04 | 1. | 0.05 |
| 545. | 0.34 | 0.43 | 0.51 | 0.96 | 1. | 0.45 | 0.45 | 0.04 | 1. | 0.11 |
| 550. | 0.16 | 0.28 | 0.45 | 0.63 | 1. | 0.45 | 0.45 | 0.04 | 1. | 0.18 |
| 555. | 0.05 | 0.1 | 0.25 | 0.22 | 0.18 | 0.45 | 0.08 | 0.04 | 1. | 0.25 |
| 560. | 0.03 | 0.04 | 0.11 | 0.09 | 0.08 | 0.45 | 0.04 | 0.04 | 1. | 0.31 |

FIG. 64B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.03 | 0.04 | 0.08 | 0.08 | 0.08 | 0.45 | 0.04 | 0.04 | 1. | 0.36 |
| 570. | 0.03 | 0.04 | 0.08 | 0.08 | 0.08 | 0.45 | 0.04 | 0.04 | 1. | 0.4 |
| 575. | 0.03 | 0.04 | 0.08 | 0.08 | 0.08 | 0.45 | 0.04 | 0.04 | 1. | 0.43 |
| 580. | 0.03 | 0.04 | 0.08 | 0.08 | 0.08 | 0.45 | 0.04 | 0.04 | 1. | 0.46 |
| 585. | 0.03 | 0.04 | 0.08 | 0.08 | 0.08 | 0.45 | 0.04 | 0.04 | 1. | 0.47 |
| 590. | 0.03 | 0.04 | 0.08 | 0.08 | 0.08 | 0.45 | 0.04 | 0.04 | 1. | 0.48 |
| 595. | 0.03 | 0.04 | 0.08 | 0.08 | 0.08 | 0.45 | 0.04 | 0.04 | 1. | 0.48 |
| 600. | 0.03 | 0.04 | 0.09 | 0.08 | 0.08 | 0.45 | 0.04 | 0.04 | 1. | 0.47 |
| 605. | 0.04 | 0.06 | 0.15 | 0.13 | 0.08 | 0.45 | 0.04 | 0.04 | 1. | 0.46 |
| 610. | 0.08 | 0.15 | 0.28 | 0.33 | 0.08 | 0.45 | 0.04 | 0.04 | 1. | 0.43 |
| 615. | 0.19 | 0.27 | 0.4 | 0.61 | 0.59 | 0.45 | 0.26 | 0.04 | 1. | 0.39 |
| 620. | 0.3 | 0.37 | 0.45 | 0.82 | 0.75 | 0.45 | 0.34 | 0.04 | 1. | 0.34 |
| 625. | 0.37 | 0.41 | 0.48 | 0.9 | 1. | 0.45 | 0.45 | 0.04 | 1. | 0.28 |
| 630. | 0.39 | 0.42 | 0.49 | 0.94 | 0.84 | 0.45 | 0.38 | 0.04 | 1. | 0.21 |
| 635. | 0.41 | 0.44 | 0.51 | 0.97 | 1. | 0.45 | 0.45 | 0.04 | 1. | 0.14 |
| 640. | 0.41 | 0.45 | 0.51 | 0.99 | 1. | 0.45 | 0.45 | 0.04 | 1. | 0.08 |
| 645. | 0.31 | 0.4 | 0.5 | 0.88 | 1. | 0.45 | 0.45 | 0.04 | 1. | 0.03 |
| 650. | 0.16 | 0.26 | 0.41 | 0.59 | 1. | 0.45 | 0.45 | 0.04 | 1. | 0.01 |
| 655. | 0.05 | 0.11 | 0.25 | 0.25 | 0.08 | 0.45 | 0.04 | 0.04 | 1. | 0. |
| 660. | 0.01 | 0.03 | 0.11 | 0.06 | 0.08 | 0.45 | 0.04 | 0. | 1. | 0.02 |
| 665. | 0. | 0.01 | 0.06 | 0.02 | 0. | 0.45 | 0. | 0. | 1. | 0.06 |
| 670. | 0. | 0. | 0.05 | 0. | 0. | 0.45 | 0. | 0. | 1. | 0.11 |
| 675. | 0. | 0. | 0.05 | 0. | 0. | 0.45 | 0. | 0. | 1. | 0.16 |
| 680. | 0. | 0. | 0.05 | 0. | 0. | 0.45 | 0. | 0. | 1. | 0.23 |
| 685. | 0. | 0. | 0.05 | 0. | 0. | 0.45 | 0. | 0. | 1. | 0.28 |
| 690. | 0. | 0. | 0.05 | 0. | 0. | 0.45 | 0. | 0. | 1. | 0.33 |
| 695. | 0. | 0. | 0.05 | 0. | 0. | 0.45 | 0. | 0. | 1. | 0.38 |
| 700. | 0. | 0. | 0.05 | 0. | 0. | 0.45 | 0. | 0. | 1. | 0.41 |
| 705. | 0. | 0. | 0.05 | 0. | 0. | 0.45 | 0. | 0. | 1. | 0.44 |
| 710. | 0. | 0. | 0.09 | 0. | 0. | 0.45 | 0. | 0. | 1. | 0.46 |
| 715. | 0. | 0. | 0.09 | 0. | 0. | 0.45 | 0. | 0. | 1. | 0.48 |
| 720. | 0. | 0. | 1. | 0. | 0. | 0.45 | 0. | 0. | 1. | 0.49 |
| 725. | 0. | 0. | 1. | 0. | 0. | 0.45 | 0. | 0. | 1. | 0.5 |
| 730. | 0. | 0. | 1. | 0. | 0. | 0.45 | 0. | 0. | 1. | 0.5 |
| 735. | 0. | 0. | 1. | 0. | 0. | 0.45 | 0. | 0. | 1. | 0.51 |

FIG. 64B-2

| | |
|---|---|
| Best-Fit Munsell Reference Filter | 10G 3/2 |
| Wavelength Maxima | (446 534 631) |
| Transmittance at Maxima | (0.5 0.49 0.49) |
| Wavelength Minima | (478 583) |
| Transmittance at Minima | (0.04 0.04) |
| PGAI D-15 | 33.86 |
| $PGAI_{IW}$ D-15 | 35.35 |
| PGAI NWS | 56.76 |
| $PGAI_{IW}$ NWS | 42.22 |
| Luminous Transmittance of Daylight | 0.18 |
| Luminous Transmittance of Red Traffic Signal | 0.32 |
| Luminous Transmittance of Yellow Traffic Signal | 0.14 |
| Luminous Transmittance of Green Traffic Signal | 0.22 |
| Minimum Transmittance between 475-650nm | 0.04 |
| Solar Blue Light Transmittance | 0.15 |
| Ganglion Cell Transmittance | 0.14 |
| Luminous Transmittance of Primary Lights (R,G,B) | (0.16 0.23 0.2) |
| D65 Chromaticity Coordinate (x,y) | (0.308 0.356) |
| Yellow Traffic Signal Chromaticity Coordinate (x,y) | (0.628 0.37) |
| Green Traffic Signal Chromaticity Coordinate (x,y) | (0.189 0.507) |
| Passes ANSI Z80.3-2010 | True |

FIG. 65A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.5 | 0. | 0. | 1. | 1. |
| 395. | 0. | 0. | 0.02 | 0. | 0. | 0.5 | 0. | 0. | 1. | 0.91 |
| 400. | 0. | 0. | 0.05 | 0. | 0. | 0.5 | 0. | 0. | 1. | 0.83 |
| 405. | 0. | 0. | 0.05 | 0. | 0. | 0.5 | 0. | 0. | 1. | 0.75 |
| 410. | 0. | 0. | 0.05 | 0. | 0. | 0.5 | 0. | 0. | 1. | 0.66 |
| 415. | 0. | 0. | 0.05 | 0. | 0. | 0.5 | 0. | 0. | 1. | 0.56 |
| 420. | 0. | 0. | 0.05 | 0. | 0. | 0.5 | 0. | 0. | 1. | 0.44 |
| 425. | 0. | 0. | 0.05 | 0. | 0. | 0.5 | 0. | 0. | 1. | 0.32 |
| 430. | 0. | 0. | 0.11 | 0. | 0. | 0.5 | 0. | 0. | 1. | 0.21 |
| 435. | 0.02 | 0.19 | 0.47 | 0.39 | 0. | 0.5 | 0. | 0. | 1. | 0.13 |
| 440. | 0.33 | 0.48 | 0.56 | 0.95 | 0.94 | 0.5 | 0.47 | 0.04 | 1. | 0.1 |
| 445. | 0.47 | 0.5 | 0.57 | 1. | 1. | 0.5 | 0.5 | 0.04 | 1. | 0.1 |
| 450. | 0.39 | 0.49 | 0.56 | 0.97 | 1. | 0.5 | 0.5 | 0.04 | 1. | 0.15 |
| 455. | 0.1 | 0.29 | 0.51 | 0.57 | 0.94 | 0.5 | 0.47 | 0.04 | 1. | 0.21 |
| 460. | 0.03 | 0.05 | 0.2 | 0.09 | 0.07 | 0.5 | 0.04 | 0.04 | 1. | 0.28 |
| 465. | 0.03 | 0.04 | 0.08 | 0.07 | 0.07 | 0.5 | 0.04 | 0.04 | 1. | 0.35 |
| 470. | 0.03 | 0.04 | 0.08 | 0.07 | 0.07 | 0.5 | 0.04 | 0.04 | 1. | 0.41 |
| 475. | 0.03 | 0.04 | 0.08 | 0.07 | 0.07 | 0.5 | 0.04 | 0.04 | 1. | 0.44 |
| 480. | 0.03 | 0.04 | 0.08 | 0.07 | 0.07 | 0.5 | 0.04 | 0.04 | 1. | 0.46 |
| 485. | 0.03 | 0.04 | 0.08 | 0.07 | 0.07 | 0.5 | 0.04 | 0.04 | 1. | 0.47 |
| 490. | 0.03 | 0.04 | 0.08 | 0.07 | 0.07 | 0.5 | 0.04 | 0.04 | 1. | 0.45 |
| 495. | 0.03 | 0.04 | 0.08 | 0.07 | 0.07 | 0.5 | 0.04 | 0.04 | 1. | 0.42 |
| 500. | 0.03 | 0.04 | 0.08 | 0.07 | 0.07 | 0.5 | 0.04 | 0.04 | 1. | 0.37 |
| 505. | 0.03 | 0.04 | 0.08 | 0.07 | 0.07 | 0.5 | 0.04 | 0.04 | 1. | 0.3 |
| 510. | 0.03 | 0.04 | 0.09 | 0.08 | 0.07 | 0.5 | 0.04 | 0.04 | 1. | 0.22 |
| 515. | 0.04 | 0.07 | 0.22 | 0.15 | 0.07 | 0.5 | 0.04 | 0.04 | 1. | 0.15 |
| 520. | 0.12 | 0.27 | 0.47 | 0.53 | 0.18 | 0.5 | 0.09 | 0.04 | 1. | 0.08 |
| 525. | 0.35 | 0.47 | 0.57 | 0.94 | 1. | 0.5 | 0.5 | 0.04 | 1. | 0.04 |
| 530. | 0.47 | 0.5 | 0.57 | 1. | 1. | 0.5 | 0.5 | 0.04 | 1. | 0.02 |
| 535. | 0.46 | 0.5 | 0.57 | 0.99 | 1. | 0.5 | 0.5 | 0.04 | 1. | 0.04 |
| 540. | 0.4 | 0.46 | 0.55 | 0.93 | 1. | 0.5 | 0.5 | 0.04 | 1. | 0.07 |
| 545. | 0.27 | 0.38 | 0.5 | 0.76 | 0.86 | 0.5 | 0.43 | 0.04 | 1. | 0.13 |
| 550. | 0.11 | 0.21 | 0.38 | 0.43 | 0.68 | 0.5 | 0.34 | 0.04 | 1. | 0.19 |
| 555. | 0.04 | 0.07 | 0.19 | 0.14 | 0.07 | 0.5 | 0.04 | 0.04 | 1. | 0.25 |
| 560. | 0.03 | 0.04 | 0.09 | 0.07 | 0.07 | 0.5 | 0.04 | 0.04 | 1. | 0.31 |

FIG. 65B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.03 | 0.04 | 0.08 | 0.07 | 0.07 | 0.5 | 0.04 | 0.04 | 1. | 0.35 |
| 570. | 0.03 | 0.04 | 0.08 | 0.07 | 0.07 | 0.5 | 0.04 | 0.04 | 1. | 0.39 |
| 575. | 0.03 | 0.04 | 0.08 | 0.07 | 0.07 | 0.5 | 0.04 | 0.04 | 1. | 0.41 |
| 580. | 0.03 | 0.04 | 0.08 | 0.07 | 0.07 | 0.5 | 0.04 | 0.04 | 1. | 0.42 |
| 585. | 0.03 | 0.04 | 0.08 | 0.07 | 0.07 | 0.5 | 0.04 | 0.04 | 1. | 0.41 |
| 590. | 0.03 | 0.04 | 0.08 | 0.07 | 0.07 | 0.5 | 0.04 | 0.04 | 1. | 0.4 |
| 595. | 0.03 | 0.04 | 0.08 | 0.07 | 0.07 | 0.5 | 0.04 | 0.04 | 1. | 0.39 |
| 600. | 0.03 | 0.04 | 0.08 | 0.07 | 0.07 | 0.5 | 0.04 | 0.04 | 1. | 0.37 |
| 605. | 0.03 | 0.04 | 0.09 | 0.07 | 0.07 | 0.5 | 0.04 | 0.04 | 1. | 0.34 |
| 610. | 0.04 | 0.08 | 0.21 | 0.16 | 0.07 | 0.5 | 0.04 | 0.04 | 1. | 0.31 |
| 615. | 0.12 | 0.23 | 0.4 | 0.45 | 0.07 | 0.5 | 0.04 | 0.04 | 1. | 0.28 |
| 620. | 0.29 | 0.4 | 0.53 | 0.8 | 0.88 | 0.5 | 0.44 | 0.04 | 1. | 0.25 |
| 625. | 0.43 | 0.49 | 0.56 | 0.97 | 1. | 0.5 | 0.5 | 0.04 | 1. | 0.21 |
| 630. | 0.47 | 0.5 | 0.57 | 1. | 1. | 0.5 | 0.5 | 0.04 | 1. | 0.18 |
| 635. | 0.46 | 0.5 | 0.57 | 1. | 1. | 0.5 | 0.5 | 0.04 | 1. | 0.15 |
| 640. | 0.38 | 0.46 | 0.56 | 0.92 | 1. | 0.5 | 0.5 | 0.04 | 1. | 0.12 |
| 645. | 0.26 | 0.35 | 0.49 | 0.71 | 1. | 0.5 | 0.5 | 0.04 | 1. | 0.1 |
| 650. | 0.14 | 0.21 | 0.35 | 0.43 | 0.4 | 0.5 | 0.2 | 0.04 | 1. | 0.07 |
| 655. | 0.06 | 0.11 | 0.21 | 0.21 | 0.28 | 0.5 | 0.14 | 0.04 | 1. | 0.05 |
| 660. | 0.02 | 0.04 | 0.12 | 0.08 | 0.07 | 0.5 | 0.04 | 0. | 1. | 0.04 |
| 665. | 0. | 0.01 | 0.07 | 0.02 | 0. | 0.5 | 0. | 0. | 1. | 0.03 |
| 670. | 0. | 0. | 0.05 | 0. | 0. | 0.5 | 0. | 0. | 1. | 0.03 |
| 675. | 0. | 0. | 0.05 | 0. | 0. | 0.5 | 0. | 0. | 1. | 0.03 |
| 680. | 0. | 0. | 0.05 | 0. | 0. | 0.5 | 0. | 0. | 1. | 0.03 |
| 685. | 0. | 0. | 0.05 | 0. | 0. | 0.5 | 0. | 0. | 1. | 0.04 |
| 690. | 0. | 0. | 0.05 | 0. | 0. | 0.5 | 0. | 0. | 1. | 0.05 |
| 695. | 0. | 0. | 0.05 | 0. | 0. | 0.5 | 0. | 0. | 1. | 0.06 |
| 700. | 0. | 0. | 0.05 | 0. | 0. | 0.5 | 0. | 0. | 1. | 0.08 |
| 705. | 0. | 0. | 0.05 | 0. | 0. | 0.5 | 0. | 0. | 1. | 0.1 |
| 710. | 0. | 0. | 0.09 | 0. | 0. | 0.5 | 0. | 0. | 1. | 0.13 |
| 715. | 0. | 0. | 0.09 | 0. | 0. | 0.5 | 0. | 0. | 1. | 0.15 |
| 720. | 0. | 0. | 1. | 0. | 0. | 0.5 | 0. | 0. | 1. | 0.18 |
| 725. | 0. | 0. | 1. | 0. | 0. | 0.5 | 0. | 0. | 1. | 0.2 |
| 730. | 0. | 0. | 1. | 0. | 0. | 0.5 | 0. | 0. | 1. | 0.23 |
| 735. | 0. | 0. | 1. | 0. | 0 | 0.5 | 0. | 0. | 1. | 0.25 |

FIG. 65B-2

| | |
|---|---|
| Best-fit Munsell Reference Filter | 10G 3/2 |
| Wavelength Maxima | (446 536 633) |
| Transmittance at Maxima | (0.54 0.55 0.54) |
| Wavelength Minima | (480 583) |
| Transmittance at Minima | (0.01 0.03) |
| PGAI D-15 | 48.93 |
| $PGAI_{IW}$ D-15 | 40.27 |
| PGAI NWS | 81.18 |
| $PGAI_{IW}$ NWS | 51.75 |
| Luminous Transmittance of Daylight | 0.18 |
| Luminous Transmittance of Red Traffic Signal | 0.34 |
| Luminous Transmittance of Yellow Traffic Signal | 0.14 |
| Luminous Transmittance of Green Traffic Signal | 0.22 |
| Minimum Transmittance between 475-650nm | 0.01 |
| Solar Blue Light Transmittance | 0.15 |
| Ganglion Cell Transmittance | 0.12 |
| Luminous Transmittance of Primary Lights (R,G,B) | (0.15 0.24 0.19) |
| D65 Chromaticity Coordinate (x,y) | (0.309 0.359) |
| Yellow Traffic Signal Chromaticity Coordinate (x,y) | (0.626 0.373) |
| Green Traffic Signal Chromaticity Coordinate (x,y) | (0.197 0.516) |
| Passes ANSI Z80.3-2010 | False |

FIG. 66A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.55 | 0. | 0. | 1. | 1. |
| 395. | 0. | 0. | 0.02 | 0. | 0. | 0.55 | 0. | 0. | 1. | 0.91 |
| 400. | 0. | 0. | 0.05 | 0. | 0. | 0.55 | 0. | 0. | 1. | 0.83 |
| 405. | 0. | 0. | 0.05 | 0. | 0. | 0.55 | 0. | 0. | 1. | 0.75 |
| 410. | 0. | 0. | 0.05 | 0. | 0. | 0.55 | 0. | 0. | 1. | 0.66 |
| 415. | 0. | 0. | 0.05 | 0. | 0. | 0.55 | 0. | 0. | 1. | 0.55 |
| 420. | 0. | 0. | 0.05 | 0. | 0. | 0.55 | 0. | 0. | 1. | 0.43 |
| 425. | 0. | 0. | 0.05 | 0. | 0. | 0.55 | 0. | 0. | 1. | 0.3 |
| 430. | 0. | 0. | 0.06 | 0. | 0. | 0.55 | 0. | 0. | 1. | 0.19 |
| 435. | 0. | 0.11 | 0.4 | 0.2 | 0. | 0.55 | 0. | 0. | 1. | 0.11 |
| 440. | 0.25 | 0.46 | 0.6 | 0.83 | 0.86 | 0.55 | 0.47 | 0. | 1. | 0.07 |
| 445. | 0.49 | 0.54 | 0.62 | 0.99 | 1. | 0.55 | 0.55 | 0. | 1. | 0.08 |
| 450. | 0.45 | 0.53 | 0.62 | 0.97 | 1. | 0.55 | 0.55 | 0.01 | 1. | 0.12 |
| 455. | 0.15 | 0.37 | 0.57 | 0.68 | 0.88 | 0.55 | 0.48 | 0.01 | 1. | 0.19 |
| 460. | 0.01 | 0.06 | 0.28 | 0.1 | 0.02 | 0.55 | 0.01 | 0.01 | 1. | 0.27 |
| 465. | 0.01 | 0.01 | 0.05 | 0.02 | 0.02 | 0.55 | 0.01 | 0.01 | 1. | 0.33 |
| 470. | 0.01 | 0.01 | 0.05 | 0.02 | 0.02 | 0.55 | 0.01 | 0.01 | 1. | 0.39 |
| 475. | 0.01 | 0.01 | 0.05 | 0.02 | 0.02 | 0.55 | 0.01 | 0.01 | 1. | 0.43 |
| 480. | 0.01 | 0.01 | 0.05 | 0.02 | 0.02 | 0.55 | 0.01 | 0.01 | 1. | 0.46 |
| 485. | 0.01 | 0.01 | 0.05 | 0.02 | 0.02 | 0.55 | 0.01 | 0.01 | 1. | 0.47 |
| 490. | 0.01 | 0.01 | 0.05 | 0.02 | 0.02 | 0.55 | 0.01 | 0.01 | 1. | 0.46 |
| 495. | 0.01 | 0.01 | 0.05 | 0.02 | 0.02 | 0.55 | 0.01 | 0.01 | 1. | 0.44 |
| 500. | 0.01 | 0.01 | 0.05 | 0.02 | 0.02 | 0.55 | 0.01 | 0.01 | 1. | 0.4 |
| 505. | 0.01 | 0.01 | 0.05 | 0.02 | 0.02 | 0.55 | 0.01 | 0.01 | 1. | 0.34 |
| 510. | 0.01 | 0.01 | 0.05 | 0.02 | 0.02 | 0.55 | 0.01 | 0.01 | 1. | 0.27 |
| 515. | 0.01 | 0.01 | 0.09 | 0.02 | 0.02 | 0.55 | 0.01 | 0.01 | 1. | 0.19 |
| 520. | 0.02 | 0.1 | 0.29 | 0.19 | 0.02 | 0.55 | 0.01 | 0.01 | 1. | 0.12 |
| 525. | 0.18 | 0.34 | 0.53 | 0.63 | 0.67 | 0.55 | 0.37 | 0.01 | 1. | 0.05 |
| 530. | 0.41 | 0.51 | 0.61 | 0.93 | 1. | 0.55 | 0.55 | 0.01 | 1. | 0.01 |
| 535. | 0.51 | 0.55 | 0.62 | 1. | 1. | 0.55 | 0.55 | 0.01 | 1. | 0. |
| 540. | 0.51 | 0.55 | 0.62 | 1. | 1. | 0.55 | 0.55 | 0.01 | 1. | 0.02 |
| 545. | 0.43 | 0.52 | 0.61 | 0.94 | 1. | 0.55 | 0.55 | 0.01 | 1. | 0.05 |
| 550. | 0.22 | 0.37 | 0.54 | 0.67 | 0.8 | 0.55 | 0.44 | 0.01 | 1. | 0.11 |
| 555. | 0.05 | 0.15 | 0.33 | 0.27 | 0.13 | 0.55 | 0.07 | 0.01 | 1. | 0.17 |
| 560. | 0.01 | 0.03 | 0.12 | 0.05 | 0.02 | 0.55 | 0.01 | 0.01 | 1. | 0.24 |

FIG. 66B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.01 | 0.01 | 0.06 | 0.02 | 0.02 | 0.55 | 0.01 | 0.01 | 1. | 0.29 |
| 570. | 0.01 | 0.01 | 0.05 | 0.02 | 0.02 | 0.55 | 0.01 | 0.01 | 1. | 0.34 |
| 575. | 0.01 | 0.01 | 0.05 | 0.02 | 0.02 | 0.55 | 0.01 | 0.01 | 1. | 0.36 |
| 580. | 0.01 | 0.02 | 0.06 | 0.03 | 0.02 | 0.55 | 0.01 | 0.01 | 1. | 0.38 |
| 585. | 0.02 | 0.03 | 0.08 | 0.05 | 0.07 | 0.55 | 0.04 | 0.04 | 1. | 0.38 |
| 590. | 0.03 | 0.04 | 0.08 | 0.06 | 0.07 | 0.55 | 0.04 | 0.04 | 1. | 0.37 |
| 595. | 0.03 | 0.04 | 0.08 | 0.07 | 0.07 | 0.55 | 0.04 | 0.04 | 1. | 0.36 |
| 600. | 0.03 | 0.04 | 0.08 | 0.07 | 0.07 | 0.55 | 0.04 | 0.04 | 1. | 0.33 |
| 605. | 0.03 | 0.04 | 0.08 | 0.07 | 0.07 | 0.55 | 0.04 | 0.04 | 1. | 0.3 |
| 610. | 0.03 | 0.04 | 0.1 | 0.07 | 0.07 | 0.55 | 0.04 | 0.04 | 1. | 0.26 |
| 615. | 0.05 | 0.09 | 0.22 | 0.16 | 0.07 | 0.55 | 0.04 | 0.04 | 1. | 0.22 |
| 620. | 0.13 | 0.24 | 0.41 | 0.43 | 0.37 | 0.55 | 0.2 | 0.04 | 1. | 0.18 |
| 625. | 0.3 | 0.42 | 0.57 | 0.77 | 1. | 0.55 | 0.55 | 0.04 | 1. | 0.14 |
| 630. | 0.45 | 0.53 | 0.62 | 0.96 | 1. | 0.55 | 0.55 | 0.04 | 1. | 0.1 |
| 635. | 0.52 | 0.55 | 0.62 | 1. | 1. | 0.55 | 0.55 | 0.04 | 1. | 0.07 |
| 640. | 0.5 | 0.54 | 0.62 | 0.99 | 1. | 0.55 | 0.55 | 0.04 | 1. | 0.04 |
| 645. | 0.4 | 0.49 | 0.6 | 0.89 | 1. | 0.55 | 0.55 | 0.04 | 1. | 0.02 |
| 650. | 0.22 | 0.35 | 0.51 | 0.63 | 0.71 | 0.55 | 0.39 | 0. | 1. | 0.01 |
| 655. | 0.07 | 0.16 | 0.33 | 0.3 | 0.03 | 0.55 | 0.02 | 0. | 1. | 0. |
| 660. | 0.01 | 0.04 | 0.15 | 0.07 | 0. | 0.55 | 0. | 0. | 1. | 0. |
| 665. | 0. | 0. | 0.06 | 0. | 0. | 0.55 | 0. | 0. | 1. | 0.01 |
| 670. | 0. | 0. | 0.05 | 0. | 0. | 0.55 | 0. | 0. | 1. | 0.03 |
| 675. | 0. | 0. | 0.05 | 0. | 0. | 0.55 | 0. | 0. | 1. | 0.05 |
| 680. | 0. | 0. | 0.05 | 0. | 0. | 0.55 | 0. | 0. | 1. | 0.07 |
| 685. | 0. | 0. | 0.05 | 0. | 0. | 0.55 | 0. | 0. | 1. | 0.1 |
| 690. | 0. | 0. | 0.05 | 0. | 0. | 0.55 | 0. | 0. | 1. | 0.13 |
| 695. | 0. | 0. | 0.05 | 0. | 0. | 0.55 | 0. | 0. | 1. | 0.16 |
| 700. | 0. | 0. | 0.05 | 0. | 0. | 0.55 | 0. | 0. | 1. | 0.2 |
| 705. | 0. | 0. | 0.05 | 0. | 0. | 0.55 | 0. | 0. | 1. | 0.23 |
| 710. | 0. | 0. | 0.09 | 0. | 0. | 0.55 | 0. | 0. | 1. | 0.26 |
| 715. | 0. | 0. | 0.09 | 0. | 0. | 0.55 | 0. | 0. | 1. | 0.29 |
| 720. | 0. | 0. | 1. | 0. | 0. | 0.55 | 0. | 0. | 1. | 0.32 |
| 725. | 0. | 0. | 1. | 0. | 0. | 0.55 | 0. | 0. | 1. | 0.35 |
| 730. | 0. | 0. | 1. | 0. | 0. | 0.55 | 0. | 0. | 1. | 0.37 |
| 735. | 0. | 0. | 1. | 0. | 0. | 0.55 | 0. | 0. | 1. | 0.39 |

FIG. 66B-2

| | |
|---|---|
| Best-fit Munsell Reference Filter | 10GY 7/1 |
| Wavelength Maxima | (442 532 615) |
| Transmittance at Maxima | (0.53 0.53 0.52) |
| Wavelength Minima | (477 574) |
| Transmittance at Minima | (0.04 0.04) |
| PGAI D-15 | 39.24 |
| $PGAI_{IW}$ D-15 | 19.59 |
| PGAI NWS | 47.03 |
| $PGAI_{IW}$ NWS | 13.92 |
| Luminous Transmittance of Daylight | 0.18 |
| Luminous Transmittance of Red Traffic Signal | 0.17 |
| Luminous Transmittance of Yellow Traffic Signal | 0.15 |
| Luminous Transmittance of Green Traffic Signal | 0.2 |
| Minimum Transmittance between 475-650nm | 0.03 |
| Solar Blue Light Transmittance | 0.16 |
| Ganglion Cell Transmittance | 0.13 |
| Luminous Transmittance of Primary Lights (R,G,B) | (0.27 0.21 0.17) |
| D65 Chromaticity Coordinate (x,y) | (0.333 0.344) |
| Yellow Traffic Signal Chromaticity Coordinate (x,y) | (0.629 0.37) |
| Green Traffic Signal Chromaticity Coordinate (x,y) | (0.191 0.495) |
| Passes ANSI Z80.3-2010 | False |

FIG. 67A

| λ (nm) | $f_{MIN}$ | $f_T$ | $f_{MAX}$ | q′(λ) | q(λ) | p(λ) | f(λ) | $t_{MIN}$(λ) | $t_{MAX}$(λ) | c(λ) |
|---|---|---|---|---|---|---|---|---|---|---|
| 390. | 0. | 0. | 0.02 | 0. | 0. | 0.55 | 0. | 0. | 1. | 1. |
| 395. | 0. | 0. | 0.02 | 0. | 0. | 0.55 | 0. | 0. | 1. | 0.89 |
| 400. | 0. | 0. | 0.05 | 0. | 0. | 0.55 | 0. | 0. | 1. | 0.79 |
| 405. | 0. | 0. | 0.05 | 0. | 0. | 0.55 | 0. | 0. | 1. | 0.7 |
| 410. | 0. | 0. | 0.05 | 0. | 0. | 0.55 | 0. | 0. | 1. | 0.6 |
| 415. | 0. | 0. | 0.05 | 0. | 0. | 0.55 | 0. | 0. | 1. | 0.49 |
| 420. | 0. | 0. | 0.05 | 0. | 0. | 0.55 | 0. | 0. | 1. | 0.37 |
| 425. | 0. | 0. | 0.08 | 0. | 0. | 0.55 | 0. | 0. | 1. | 0.25 |
| 430. | 0.01 | 0.12 | 0.34 | 0.22 | 0. | 0.55 | 0. | 0. | 1. | 0.15 |
| 435. | 0.21 | 0.39 | 0.58 | 0.71 | 0.51 | 0.55 | 0.28 | 0. | 1. | 0.07 |
| 440. | 0.46 | 0.55 | 0.62 | 1. | 1. | 0.55 | 0.55 | 0.04 | 1. | 0.04 |
| 445. | 0.39 | 0.5 | 0.61 | 0.92 | 1. | 0.55 | 0.55 | 0.04 | 1. | 0.06 |
| 450. | 0.17 | 0.33 | 0.52 | 0.59 | 0.81 | 0.55 | 0.44 | 0.04 | 1. | 0.11 |
| 455. | 0.05 | 0.11 | 0.28 | 0.21 | 0.29 | 0.55 | 0.16 | 0.04 | 1. | 0.18 |
| 460. | 0.03 | 0.04 | 0.11 | 0.07 | 0.07 | 0.55 | 0.04 | 0.04 | 1. | 0.25 |
| 465. | 0.03 | 0.04 | 0.08 | 0.07 | 0.07 | 0.55 | 0.04 | 0.04 | 1. | 0.32 |
| 470. | 0.03 | 0.04 | 0.08 | 0.07 | 0.07 | 0.55 | 0.04 | 0.04 | 1. | 0.38 |
| 475. | 0.03 | 0.04 | 0.08 | 0.07 | 0.07 | 0.55 | 0.04 | 0.04 | 1. | 0.42 |
| 480. | 0.03 | 0.04 | 0.08 | 0.07 | 0.07 | 0.55 | 0.04 | 0.04 | 1. | 0.45 |
| 485. | 0.03 | 0.04 | 0.08 | 0.07 | 0.07 | 0.55 | 0.04 | 0.04 | 1. | 0.47 |
| 490. | 0.03 | 0.04 | 0.08 | 0.07 | 0.07 | 0.55 | 0.04 | 0.04 | 1. | 0.48 |
| 495. | 0.03 | 0.04 | 0.08 | 0.07 | 0.07 | 0.55 | 0.04 | 0.04 | 1. | 0.49 |
| 500. | 0.03 | 0.04 | 0.08 | 0.07 | 0.07 | 0.55 | 0.04 | 0.04 | 1. | 0.47 |
| 505. | 0.03 | 0.04 | 0.08 | 0.07 | 0.07 | 0.55 | 0.04 | 0.04 | 1. | 0.43 |
| 510. | 0.03 | 0.04 | 0.08 | 0.07 | 0.07 | 0.55 | 0.04 | 0.04 | 1. | 0.36 |
| 515. | 0.03 | 0.05 | 0.18 | 0.09 | 0.07 | 0.55 | 0.04 | 0.04 | 1. | 0.25 |
| 520. | 0.09 | 0.22 | 0.44 | 0.41 | 0.07 | 0.55 | 0.04 | 0.04 | 1. | 0.13 |
| 525. | 0.31 | 0.46 | 0.59 | 0.84 | 0.82 | 0.55 | 0.45 | 0.04 | 1. | 0.04 |
| 530. | 0.49 | 0.54 | 0.62 | 0.99 | 1. | 0.55 | 0.55 | 0.04 | 1. | 0. |
| 535. | 0.46 | 0.54 | 0.62 | 0.98 | 1. | 0.55 | 0.55 | 0.04 | 1. | 0.03 |
| 540. | 0.28 | 0.41 | 0.57 | 0.75 | 1. | 0.55 | 0.55 | 0.04 | 1. | 0.12 |
| 545. | 0.13 | 0.22 | 0.39 | 0.41 | 0.47 | 0.55 | 0.26 | 0.04 | 1. | 0.23 |
| 550. | 0.06 | 0.1 | 0.21 | 0.18 | 0.22 | 0.55 | 0.12 | 0.04 | 1. | 0.33 |
| 555. | 0.03 | 0.05 | 0.11 | 0.08 | 0.07 | 0.55 | 0.04 | 0.04 | 1. | 0.4 |
| 560. | 0.03 | 0.04 | 0.08 | 0.07 | 0.07 | 0.55 | 0.04 | 0.04 | 1. | 0.44 |

FIG. 67B-1

| λ (nm) | $f_{MIN}$ | $f_T$ | $f_{MAX}$ | q'(λ) | q(λ) | p(λ) | f(λ) | $t_{MIN}$(λ) | $t_{MAX}$(λ) | c(λ) |
|---|---|---|---|---|---|---|---|---|---|---|
| 565. | 0.03 | 0.04 | 0.08 | 0.07 | 0.07 | 0.55 | 0.04 | 0.04 | 1. | 0.46 |
| 570. | 0.03 | 0.04 | 0.08 | 0.07 | 0.07 | 0.55 | 0.04 | 0.04 | 1. | 0.46 |
| 575. | 0.03 | 0.04 | 0.08 | 0.07 | 0.07 | 0.55 | 0.04 | 0.04 | 1. | 0.44 |
| 580. | 0.03 | 0.04 | 0.08 | 0.07 | 0.07 | 0.55 | 0.04 | 0.04 | 1. | 0.42 |
| 585. | 0.03 | 0.04 | 0.08 | 0.07 | 0.07 | 0.55 | 0.04 | 0.04 | 1. | 0.39 |
| 590. | 0.03 | 0.04 | 0.09 | 0.07 | 0.07 | 0.55 | 0.04 | 0.04 | 1. | 0.35 |
| 595. | 0.04 | 0.06 | 0.17 | 0.11 | 0.07 | 0.55 | 0.04 | 0.04 | 1. | 0.3 |
| 600. | 0.09 | 0.18 | 0.36 | 0.34 | 0.07 | 0.55 | 0.04 | 0.04 | 1. | 0.25 |
| 605. | 0.25 | 0.38 | 0.54 | 0.69 | 0.56 | 0.55 | 0.31 | 0.04 | 1. | 0.2 |
| 610. | 0.42 | 0.51 | 0.61 | 0.93 | 1. | 0.55 | 0.55 | 0.04 | 1. | 0.15 |
| 615. | 0.51 | 0.55 | 0.62 | 1. | 1. | 0.55 | 0.55 | 0.04 | 1. | 0.1 |
| 620. | 0.44 | 0.52 | 0.61 | 0.95 | 1. | 0.55 | 0.55 | 0.04 | 1. | 0.06 |
| 625. | 0.28 | 0.41 | 0.55 | 0.74 | 1. | 0.55 | 0.55 | 0.04 | 1. | 0.03 |
| 630. | 0.12 | 0.22 | 0.39 | 0.41 | 0.56 | 0.55 | 0.31 | 0.04 | 1. | 0.01 |
| 635. | 0.05 | 0.08 | 0.2 | 0.15 | 0.07 | 0.55 | 0.04 | 0.04 | 1. | 0. |
| 640. | 0.03 | 0.04 | 0.1 | 0.07 | 0.07 | 0.55 | 0.04 | 0.04 | 1. | 0. |
| 645. | 0.03 | 0.04 | 0.08 | 0.07 | 0.07 | 0.55 | 0.04 | 0.04 | 1. | 0.02 |
| 650. | 0.03 | 0.04 | 0.08 | 0.07 | 0.07 | 0.55 | 0.04 | 0.04 | 1. | 0.05 |
| 655. | 0.02 | 0.03 | 0.08 | 0.06 | 0.07 | 0.55 | 0.04 | 0.04 | 1. | 0.08 |
| 660. | 0.01 | 0.02 | 0.07 | 0.04 | 0.07 | 0.55 | 0.04 | 0. | 1. | 0.12 |
| 665. | 0. | 0.01 | 0.05 | 0.01 | 0. | 0.55 | 0. | 0. | 1. | 0.16 |
| 670. | 0. | 0. | 0.05 | 0. | 0. | 0.55 | 0. | 0. | 1. | 0.21 |
| 675. | 0. | 0. | 0.05 | 0. | 0. | 0.55 | 0. | 0. | 1. | 0.25 |
| 680. | 0. | 0. | 0.05 | 0. | 0. | 0.55 | 0. | 0. | 1. | 0.29 |
| 685. | 0. | 0. | 0.05 | 0. | 0. | 0.55 | 0. | 0. | 1. | 0.33 |
| 690. | 0. | 0. | 0.05 | 0. | 0. | 0.55 | 0. | 0. | 1. | 0.36 |
| 695. | 0. | 0. | 0.05 | 0. | 0. | 0.55 | 0. | 0. | 1. | 0.39 |
| 700. | 0. | 0. | 0.05 | 0. | 0. | 0.55 | 0. | 0. | 1. | 0.41 |
| 705. | 0. | 0. | 0.05 | 0. | 0. | 0.55 | 0. | 0. | 1. | 0.43 |
| 710. | 0. | 0. | 0.09 | 0. | 0. | 0.55 | 0. | 0. | 1. | 0.45 |
| 715. | 0. | 0. | 0.09 | 0. | 0. | 0.55 | 0. | 0. | 1. | 0.46 |
| 720. | 0. | 0. | 1. | 0. | 0. | 0.55 | 0. | 0. | 1. | 0.47 |
| 725. | 0. | 0. | 1. | 0. | 0. | 0.55 | 0. | 0. | 1. | 0.48 |
| 730. | 0. | 0. | 1. | 0. | 0. | 0.55 | 0. | 0. | 1. | 0.49 |
| 735. | 0. | 0. | 1. | 0. | 0. | 0.55 | 0. | 0. | 1. | 0.5 |

FIG. 67B-2

| | |
|---|---|
| Best-fit Munsell Reference Filter | 2.5B 9/2 |
| Wavelength Maxima | (453 540 617 678) |
| Transmittance at Maxima | (0.5 0.49 0.46 0.34) |
| Wavelength Minima | (489 579 657) |
| Transmittance at Minima | (0.04 0.04 0.04) |
| PGAI D-15 | 27.54 |
| $PGAI_{IW}$ D-15 | 22.45 |
| PGAI NWS | 36.43 |
| $PGAI_{IW}$ NWS | 22.17 |
| Luminous Transmittance of Daylight | 0.18 |
| Luminous Transmittance of Red Traffic Signal | 0.18 |
| Luminous Transmittance of Yellow Traffic Signal | 0.15 |
| Luminous Transmittance of Green Traffic Signal | 0.2 |
| Minimum Transmittance between 475-650nm | 0.04 |
| Solar Blue Light Transmittance | 0.16 |
| Ganglion Cell Transmittance | 0.15 |
| Luminous Transmittance of Primary Lights (R,G,B) | (0.21 0.21 0.21) |
| D65 Chromaticity Coordinate (x,y) | (0.315 0.335) |
| Yellow Traffic Signal Chromaticity Coordinate (x,y) | (0.605 0.393) |
| Green Traffic Signal Chromaticity Coordinate (x,y) | (0.202 0.447) |
| Passes ANSI Z80.3-2010 | True |

FIG. 68A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.5 | 0. | 0. | 1. | 0.65 |
| 395. | 0. | 0. | 0.02 | 0. | 0. | 0.5 | 0. | 0. | 1. | 0.61 |
| 400. | 0. | 0. | 0.05 | 0. | 0. | 0.5 | 0. | 0. | 1. | 0.5 |
| 405. | 0. | 0. | 0.05 | 0. | 0. | 0.5 | 0. | 0. | 1. | 0.36 |
| 410. | 0. | 0. | 0.05 | 0. | 0. | 0.5 | 0. | 0. | 1. | 0.22 |
| 415. | 0. | 0. | 0.05 | 0. | 0. | 0.5 | 0. | 0. | 1. | 0.09 |
| 420. | 0. | 0. | 0.05 | 0. | 0. | 0.5 | 0. | 0. | 1. | 0.01 |
| 425. | 0. | 0. | 0.05 | 0. | 0. | 0.5 | 0. | 0. | 1. | 0.01 |
| 430. | 0. | 0. | 0.05 | 0. | 0. | 0.5 | 0. | 0. | 1. | 0.06 |
| 435. | 0. | 0.02 | 0.13 | 0.03 | 0. | 0.5 | 0. | 0. | 1. | 0.16 |
| 440. | 0.04 | 0.19 | 0.42 | 0.37 | 0.07 | 0.5 | 0.04 | 0.04 | 1. | 0.27 |
| 445. | 0.29 | 0.43 | 0.55 | 0.86 | 0.78 | 0.5 | 0.39 | 0.04 | 1. | 0.39 |
| 450. | 0.45 | 0.5 | 0.57 | 1. | 1. | 0.5 | 0.5 | 0.04 | 1. | 0.51 |
| 455. | 0.44 | 0.5 | 0.57 | 1. | 1. | 0.5 | 0.5 | 0.04 | 1. | 0.62 |
| 460. | 0.26 | 0.39 | 0.55 | 0.79 | 1. | 0.5 | 0.5 | 0.04 | 1. | 0.72 |
| 465. | 0.12 | 0.2 | 0.37 | 0.4 | 0.51 | 0.5 | 0.25 | 0.04 | 1. | 0.79 |
| 470. | 0.05 | 0.08 | 0.19 | 0.17 | 0.22 | 0.5 | 0.11 | 0.04 | 1. | 0.83 |
| 475. | 0.03 | 0.04 | 0.1 | 0.08 | 0.07 | 0.5 | 0.04 | 0.04 | 1. | 0.85 |
| 480. | 0.03 | 0.04 | 0.08 | 0.07 | 0.07 | 0.5 | 0.04 | 0.04 | 1. | 0.83 |
| 485. | 0.03 | 0.04 | 0.08 | 0.07 | 0.07 | 0.5 | 0.04 | 0.04 | 1. | 0.79 |
| 490. | 0.03 | 0.04 | 0.08 | 0.07 | 0.07 | 0.5 | 0.04 | 0.04 | 1. | 0.73 |
| 495. | 0.03 | 0.04 | 0.08 | 0.07 | 0.07 | 0.5 | 0.04 | 0.04 | 1. | 0.65 |
| 500. | 0.03 | 0.04 | 0.08 | 0.07 | 0.07 | 0.5 | 0.04 | 0.04 | 1. | 0.57 |
| 505. | 0.03 | 0.04 | 0.08 | 0.07 | 0.07 | 0.5 | 0.04 | 0.04 | 1. | 0.47 |
| 510. | 0.03 | 0.04 | 0.08 | 0.07 | 0.07 | 0.5 | 0.04 | 0.04 | 1. | 0.38 |
| 515. | 0.04 | 0.05 | 0.13 | 0.1 | 0.07 | 0.5 | 0.04 | 0.04 | 1. | 0.3 |
| 520. | 0.07 | 0.11 | 0.19 | 0.21 | 0.13 | 0.5 | 0.07 | 0.04 | 1. | 0.24 |
| 525. | 0.13 | 0.18 | 0.31 | 0.36 | 0.32 | 0.5 | 0.16 | 0.04 | 1. | 0.2 |
| 530. | 0.21 | 0.32 | 0.49 | 0.65 | 0.38 | 0.5 | 0.19 | 0.04 | 1. | 0.2 |
| 535. | 0.38 | 0.47 | 0.56 | 0.95 | 1. | 0.5 | 0.5 | 0.04 | 1. | 0.23 |
| 540. | 0.47 | 0.5 | 0.57 | 1. | 1. | 0.5 | 0.5 | 0.04 | 1. | 0.3 |
| 545. | 0.38 | 0.48 | 0.57 | 0.96 | 1. | 0.5 | 0.5 | 0.04 | 1. | 0.39 |
| 550. | 0.17 | 0.32 | 0.49 | 0.63 | 1. | 0.5 | 0.5 | 0.04 | 1. | 0.49 |
| 555. | 0.05 | 0.11 | 0.28 | 0.22 | 0.19 | 0.5 | 0.09 | 0.04 | 1. | 0.6 |
| 560. | 0.03 | 0.04 | 0.11 | 0.08 | 0.07 | 0.5 | 0.04 | 0.04 | 1. | 0.7 |

FIG. 68B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.03 | 0.04 | 0.08 | 0.07 | 0.07 | 0.5 | 0.04 | 0.04 | 1. | 0.8 |
| 570. | 0.03 | 0.04 | 0.08 | 0.07 | 0.07 | 0.5 | 0.04 | 0.04 | 1. | 0.88 |
| 575. | 0.03 | 0.04 | 0.08 | 0.07 | 0.07 | 0.5 | 0.04 | 0.04 | 1. | 0.94 |
| 580. | 0.03 | 0.04 | 0.08 | 0.07 | 0.07 | 0.5 | 0.04 | 0.04 | 1. | 0.98 |
| 585. | 0.03 | 0.04 | 0.08 | 0.07 | 0.07 | 0.5 | 0.04 | 0.04 | 1. | 1. |
| 590. | 0.03 | 0.04 | 0.08 | 0.07 | 0.07 | 0.5 | 0.04 | 0.04 | 1. | 0.99 |
| 595. | 0.03 | 0.04 | 0.09 | 0.07 | 0.07 | 0.5 | 0.04 | 0.04 | 1. | 0.96 |
| 600. | 0.04 | 0.08 | 0.21 | 0.15 | 0.07 | 0.5 | 0.04 | 0.04 | 1. | 0.91 |
| 605. | 0.12 | 0.23 | 0.41 | 0.46 | 0.07 | 0.5 | 0.04 | 0.04 | 1. | 0.84 |
| 610. | 0.3 | 0.41 | 0.54 | 0.83 | 0.92 | 0.5 | 0.46 | 0.04 | 1. | 0.75 |
| 615. | 0.44 | 0.49 | 0.56 | 0.98 | 1. | 0.5 | 0.5 | 0.04 | 1. | 0.66 |
| 620. | 0.38 | 0.47 | 0.56 | 0.93 | 1. | 0.5 | 0.5 | 0.04 | 1. | 0.57 |
| 625. | 0.25 | 0.35 | 0.49 | 0.7 | 1. | 0.5 | 0.5 | 0.04 | 1. | 0.47 |
| 630. | 0.12 | 0.2 | 0.35 | 0.4 | 0.39 | 0.5 | 0.19 | 0.04 | 1. | 0.38 |
| 635. | 0.06 | 0.1 | 0.2 | 0.19 | 0.24 | 0.5 | 0.12 | 0.04 | 1. | 0.3 |
| 640. | 0.04 | 0.05 | 0.12 | 0.1 | 0.07 | 0.5 | 0.04 | 0.04 | 1. | 0.22 |
| 645. | 0.03 | 0.04 | 0.09 | 0.07 | 0.07 | 0.5 | 0.04 | 0.04 | 1. | 0.16 |
| 650. | 0.03 | 0.04 | 0.08 | 0.07 | 0.07 | 0.5 | 0.04 | 0.04 | 1. | 0.11 |
| 655. | 0.03 | 0.04 | 0.08 | 0.07 | 0.07 | 0.5 | 0.04 | 0.04 | 1. | 0.07 |
| 660. | 0.03 | 0.03 | 0.1 | 0.07 | 0.07 | 0.5 | 0.04 | 0. | 1. | 0.05 |
| 665. | 0.04 | 0.08 | 0.19 | 0.16 | 0.07 | 0.5 | 0.04 | 0. | 1. | 0.04 |
| 670. | 0.11 | 0.2 | 0.34 | 0.4 | 0. | 0.5 | 0. | 0. | 1. | 0.04 |
| 675. | 0.24 | 0.34 | 0.46 | 0.67 | 0.84 | 0.5 | 0.42 | 0. | 1. | 0.05 |
| 680. | 0.36 | 0.41 | 0.48 | 0.83 | 0.84 | 0.5 | 0.42 | 0. | 1. | 0.07 |
| 685. | 0.29 | 0.37 | 0.47 | 0.74 | 0.9 | 0.5 | 0.45 | 0. | 1. | 0.09 |
| 690. | 0.15 | 0.24 | 0.38 | 0.49 | 0.9 | 0.5 | 0.45 | 0. | 1. | 0.12 |
| 695. | 0.04 | 0.1 | 0.23 | 0.21 | 0. | 0.5 | 0. | 0. | 1. | 0.15 |
| 700. | 0. | 0.02 | 0.1 | 0.04 | 0. | 0.5 | 0. | 0. | 1. | 0.17 |
| 705. | 0. | 0. | 0.05 | 0. | 0. | 0.5 | 0. | 0. | 1. | 0.2 |
| 710. | 0. | 0. | 0.09 | 0. | 0. | 0.5 | 0. | 0. | 1. | 0.23 |
| 715. | 0. | 0. | 0.09 | 0. | 0. | 0.5 | 0. | 0. | 1. | 0.26 |
| 720. | 0. | 0. | 1. | 0. | 0. | 0.5 | 0. | 0. | 1. | 0.29 |
| 725. | 0. | 0. | 1. | 0. | 0. | 0.5 | 0. | 0. | 1. | 0.32 |
| 730. | 0. | 0. | 1. | 0. | 0. | 0.5 | 0. | 0. | 1. | 0.34 |
| 735. | 0. | 0. | 1. | 0. | 0. | 0.5 | 0. | 0. | 1. | 0.37 |

FIG. 68B-2

| | |
|---|---|
| Best-fit Munsell Reference Filter | 10B 8/2 |
| Wavelength Maxima | (442 512 571 633) |
| Transmittance at Maxima | (0.5 0.49 0.46 0.48) |
| Wavelength Minima | (468 544 601) |
| Transmittance at Minima | (0.05 0. 0.05) |
| PGAI D-15 | -1.42 |
| $PGAI_{IW}$ D-15 | -2.35 |
| PGAI NWS | 3.78 |
| $PGAI_{IW}$ NWS | 0.57 |
| Luminous Transmittance of Daylight | 0.19 |
| Luminous Transmittance of Red Traffic Signal | 0.3 |
| Luminous Transmittance of Yellow Traffic Signal | 0.2 |
| Luminous Transmittance of Green Traffic Signal | 0.19 |
| Minimum Transmittance between 475-650nm | 0. |
| Solar Blue Light Transmittance | 0.19 |
| Ganglion Cell Transmittance | 0.19 |
| Luminous Transmittance of Primary Lights (R,G,B) | (0.15 0.17 0.22) |
| D65 Chromaticity Coordinate (x,y) | (0.318 0.326) |
| Yellow Traffic Signal Chromaticity Coordinate (x,y) | (0.589 0.41) |
| Green Traffic Signal Chromaticity Coordinate (x,y) | (0.193 0.433) |
| Passes ANSI Z80.3-2010 | False |

FIG. 69A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.5 | 0. | 0. | 1. | 0.87 |
| 395. | 0. | 0. | 0.02 | 0. | 0. | 0.5 | 0. | 0. | 1. | 0.81 |
| 400. | 0. | 0. | 0.05 | 0. | 0. | 0.5 | 0. | 0. | 1. | 0.7 |
| 405. | 0. | 0. | 0.05 | 0. | 0. | 0.5 | 0. | 0. | 1. | 0.57 |
| 410. | 0. | 0. | 0.05 | 0. | 0. | 0.5 | 0. | 0. | 1. | 0.46 |
| 415. | 0. | 0. | 0.05 | 0. | 0. | 0.5 | 0. | 0. | 1. | 0.39 |
| 420. | 0. | 0. | 0.06 | 0. | 0. | 0.5 | 0. | 0. | 1. | 0.35 |
| 425. | 0.01 | 0.05 | 0.21 | 0.1 | 0. | 0.5 | 0. | 0. | 1. | 0.34 |
| 430. | 0.11 | 0.27 | 0.49 | 0.55 | 0.22 | 0.5 | 0.11 | 0. | 1. | 0.35 |
| 435. | 0.37 | 0.49 | 0.57 | 0.97 | 1. | 0.5 | 0.5 | 0. | 1. | 0.38 |
| 440. | 0.47 | 0.5 | 0.57 | 1. | 1. | 0.5 | 0.5 | 0. | 1. | 0.43 |
| 445. | 0.4 | 0.49 | 0.57 | 0.99 | 1. | 0.5 | 0.5 | 0. | 1. | 0.51 |
| 450. | 0.17 | 0.33 | 0.52 | 0.66 | 1. | 0.5 | 0.5 | 0.05 | 1. | 0.6 |
| 455. | 0.06 | 0.1 | 0.27 | 0.21 | 0.22 | 0.5 | 0.11 | 0.05 | 1. | 0.7 |
| 460. | 0.05 | 0.05 | 0.11 | 0.11 | 0.1 | 0.5 | 0.05 | 0.05 | 1. | 0.8 |
| 465. | 0.05 | 0.05 | 0.09 | 0.1 | 0.1 | 0.5 | 0.05 | 0.05 | 1. | 0.88 |
| 470. | 0.05 | 0.05 | 0.09 | 0.1 | 0.1 | 0.5 | 0.05 | 0.05 | 1. | 0.93 |
| 475. | 0.05 | 0.05 | 0.09 | 0.1 | 0.1 | 0.5 | 0.05 | 0.05 | 1. | 0.94 |
| 480. | 0.05 | 0.05 | 0.09 | 0.1 | 0.1 | 0.5 | 0.05 | 0.05 | 1. | 0.91 |
| 485. | 0.05 | 0.05 | 0.09 | 0.1 | 0.1 | 0.5 | 0.05 | 0.05 | 1. | 0.85 |
| 490. | 0.05 | 0.06 | 0.16 | 0.13 | 0.1 | 0.5 | 0.05 | 0.05 | 1. | 0.77 |
| 495. | 0.09 | 0.18 | 0.32 | 0.35 | 0.1 | 0.5 | 0.05 | 0.05 | 1. | 0.67 |
| 500. | 0.23 | 0.32 | 0.44 | 0.63 | 0.68 | 0.5 | 0.34 | 0.05 | 1. | 0.57 |
| 505. | 0.34 | 0.41 | 0.52 | 0.82 | 0.68 | 0.5 | 0.34 | 0.05 | 1. | 0.47 |
| 510. | 0.42 | 0.48 | 0.56 | 0.96 | 1. | 0.5 | 0.5 | 0.05 | 1. | 0.39 |
| 515. | 0.47 | 0.5 | 0.57 | 1. | 1. | 0.5 | 0.5 | 0. | 1. | 0.32 |
| 520. | 0.31 | 0.46 | 0.56 | 0.93 | 1. | 0.5 | 0.5 | 0. | 1. | 0.27 |
| 525. | 0.01 | 0.16 | 0.45 | 0.33 | 1. | 0.5 | 0.5 | 0. | 1. | 0.24 |
| 530. | 0. | 0. | 0.08 | 0. | 0. | 0.5 | 0. | 0. | 0. | 0.23 |
| 535. | 0. | 0. | 0.05 | 0. | 0. | 0.5 | 0. | 0. | 0. | 0.25 |
| 540. | 0. | 0. | 0.05 | 0. | 0. | 0.5 | 0. | 0. | 0. | 0.28 |
| 545. | 0. | 0. | 0.05 | 0. | 0. | 0.5 | 0. | 0. | 0. | 0.34 |
| 550. | 0. | 0. | 0.05 | 0. | 0. | 0.5 | 0. | 0. | 0. | 0.42 |
| 555. | 0. | 0. | 0.08 | 0. | 0. | 0.5 | 0. | 0. | 0. | 0.51 |
| 560. | 0.01 | 0.13 | 0.39 | 0.27 | 0. | 0.5 | 0. | 0. | 1. | 0.62 |

FIG. 69B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.26 | 0.42 | 0.54 | 0.83 | 1. | 0.5 | 0.5 | 0. | 1. | 0.73 |
| 570. | 0.43 | 0.48 | 0.55 | 0.96 | 1. | 0.5 | 0.5 | 0. | 1. | 0.84 |
| 575. | 0.32 | 0.42 | 0.53 | 0.84 | 0.93 | 0.5 | 0.47 | 0.05 | 1. | 0.92 |
| 580. | 0.17 | 0.28 | 0.43 | 0.55 | 0.93 | 0.5 | 0.47 | 0.05 | 1. | 0.98 |
| 585. | 0.07 | 0.12 | 0.26 | 0.25 | 0.1 | 0.5 | 0.05 | 0.05 | 1. | 1. |
| 590. | 0.05 | 0.06 | 0.13 | 0.11 | 0.1 | 0.5 | 0.05 | 0.05 | 1. | 0.98 |
| 595. | 0.05 | 0.05 | 0.09 | 0.1 | 0.1 | 0.5 | 0.05 | 0.05 | 1. | 0.93 |
| 600. | 0.05 | 0.05 | 0.09 | 0.1 | 0.1 | 0.5 | 0.05 | 0.05 | 1. | 0.84 |
| 605. | 0.05 | 0.05 | 0.1 | 0.1 | 0.1 | 0.5 | 0.05 | 0.05 | 1. | 0.74 |
| 610. | 0.05 | 0.07 | 0.14 | 0.13 | 0.1 | 0.5 | 0.05 | 0.05 | 1. | 0.63 |
| 615. | 0.08 | 0.13 | 0.25 | 0.26 | 0.1 | 0.5 | 0.05 | 0.05 | 1. | 0.51 |
| 620. | 0.17 | 0.26 | 0.4 | 0.52 | 0.25 | 0.5 | 0.13 | 0.05 | 1. | 0.4 |
| 625. | 0.3 | 0.39 | 0.51 | 0.78 | 0.84 | 0.5 | 0.42 | 0.05 | 1. | 0.31 |
| 630. | 0.41 | 0.47 | 0.56 | 0.94 | 1. | 0.5 | 0.5 | 0.05 | 1. | 0.23 |
| 635. | 0.46 | 0.49 | 0.56 | 0.99 | 1. | 0.5 | 0.5 | 0.05 | 1. | 0.16 |
| 640. | 0.41 | 0.47 | 0.56 | 0.94 | 1. | 0.5 | 0.5 | 0.05 | 1. | 0.11 |
| 645. | 0.29 | 0.39 | 0.51 | 0.78 | 1. | 0.5 | 0.5 | 0.05 | 1. | 0.07 |
| 650. | 0.16 | 0.25 | 0.39 | 0.5 | 0.78 | 0.5 | 0.39 | 0.05 | 1. | 0.04 |
| 655. | 0.05 | 0.11 | 0.24 | 0.23 | 0.1 | 0.5 | 0.05 | 0. | 1. | 0.02 |
| 660. | 0.01 | 0.03 | 0.12 | 0.06 | 0. | 0.5 | 0. | 0. | 1. | 0.01 |
| 665. | 0. | 0. | 0.05 | 0.01 | 0. | 0.5 | 0. | 0. | 1. | 0. |
| 670. | 0. | 0. | 0.05 | 0. | 0. | 0.5 | 0. | 0. | 1. | 0. |
| 675. | 0. | 0. | 0.05 | 0. | 0. | 0.5 | 0. | 0. | 1. | 0. |
| 680. | 0. | 0. | 0.05 | 0. | 0. | 0.5 | 0. | 0. | 1. | 0. |
| 685. | 0. | 0. | 0.05 | 0. | 0. | 0.5 | 0. | 0. | 1. | 0.01 |
| 690. | 0. | 0. | 0.05 | 0. | 0. | 0.5 | 0. | 0. | 1. | 0.02 |
| 695. | 0. | 0. | 0.05 | 0. | 0. | 0.5 | 0. | 0. | 1. | 0.02 |
| 700. | 0. | 0. | 0.05 | 0. | 0. | 0.5 | 0. | 0. | 1. | 0.03 |
| 705. | 0. | 0. | 0.05 | 0. | 0. | 0.5 | 0. | 0. | 1. | 0.05 |
| 710. | 0. | 0. | 0.09 | 0. | 0. | 0.5 | 0. | 0. | 1. | 0.06 |
| 715. | 0. | 0. | 0.09 | 0. | 0. | 0.5 | 0. | 0. | 1. | 0.07 |
| 720. | 0. | 0. | 1. | 0. | 0. | 0.5 | 0. | 0. | 1. | 0.09 |
| 725. | 0. | 0. | 1. | 0. | 0. | 0.5 | 0. | 0. | 1. | 0.11 |
| 730. | 0. | 0. | 1. | 0. | 0. | 0.5 | 0. | 0. | 1. | 0.12 |
| 735. | 0. | 0. | 1. | 0. | 0. | 0.5 | 0. | 0. | 1. | 0.14 |

FIG. 69B-2

| | |
|---|---|
| Best-fit Munsell Reference Filter | 10BG 5/2 |
| Wavelength Maxima | (453 539 567 635) |
| Transmittance at Maxima | (0.49 0.36 0.37 0.47) |
| Wavelength Minima | (491 552 602) |
| Transmittance at Minima | (0.06 0.13 0.) |
| PGAI D-15 | -0.15 |
| $PGAI_{IW}$ D-15 | 13.65 |
| PGAI NWS | 19.72 |
| $PGAI_{IW}$ NWS | 29.8 |
| Luminous Transmittance of Daylight | 0.19 |
| Luminous Transmittance of Red Traffic Signal | 0.28 |
| Luminous Transmittance of Yellow Traffic Signal | 0.18 |
| Luminous Transmittance of Green Traffic Signal | 0.2 |
| Minimum Transmittance between 475-650nm | 0. |
| Solar Blue Light Transmittance | 0.18 |
| Ganglion Cell Transmittance | 0.17 |
| Luminous Transmittance of Primary Lights (R,G,B) | (0.09 0.22 0.21) |
| D65 Chromaticity Coordinate (x,y) | (0.303 0.332) |
| Yellow Traffic Signal Chromaticity Coordinate (x,y) | (0.562 0.436) |
| Green Traffic Signal Chromaticity Coordinate (x,y) | (0.226 0.42) |
| Passes ANSI Z80.3-2010 | False |

FIG. 70A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.5 | 0. | 0. | 1. | 1. |
| 395. | 0. | 0. | 0.02 | 0. | 0. | 0.5 | 0. | 0. | 1. | 0.96 |
| 400. | 0. | 0. | 0.05 | 0. | 0. | 0.5 | 0. | 0. | 1. | 0.87 |
| 405. | 0. | 0. | 0.05 | 0. | 0. | 0.5 | 0. | 0. | 1. | 0.75 |
| 410. | 0. | 0. | 0.05 | 0. | 0. | 0.5 | 0. | 0. | 1. | 0.63 |
| 415. | 0. | 0. | 0.05 | 0. | 0. | 0.5 | 0. | 0. | 1. | 0.52 |
| 420. | 0. | 0. | 0.05 | 0. | 0. | 0.5 | 0. | 0. | 1. | 0.45 |
| 425. | 0. | 0. | 0.05 | 0. | 0. | 0.5 | 0. | 0. | 1. | 0.43 |
| 430. | 0. | 0.01 | 0.09 | 0.02 | 0. | 0.5 | 0. | 0. | 1. | 0.46 |
| 435. | 0.03 | 0.1 | 0.26 | 0.21 | 0. | 0.5 | 0. | 0. | 1. | 0.52 |
| 440. | 0.17 | 0.29 | 0.44 | 0.58 | 0.44 | 0.5 | 0.22 | 0. | 1. | 0.59 |
| 445. | 0.34 | 0.43 | 0.54 | 0.87 | 0.81 | 0.5 | 0.41 | 0.06 | 1. | 0.66 |
| 450. | 0.44 | 0.49 | 0.56 | 0.99 | 1. | 0.5 | 0.5 | 0.06 | 1. | 0.74 |
| 455. | 0.43 | 0.49 | 0.56 | 0.98 | 1. | 0.5 | 0.5 | 0.06 | 1. | 0.8 |
| 460. | 0.28 | 0.4 | 0.53 | 0.8 | 1. | 0.5 | 0.5 | 0.06 | 1. | 0.86 |
| 465. | 0.12 | 0.22 | 0.39 | 0.44 | 0.63 | 0.5 | 0.31 | 0.06 | 1. | 0.9 |
| 470. | 0.06 | 0.09 | 0.2 | 0.18 | 0.12 | 0.5 | 0.06 | 0.06 | 1. | 0.92 |
| 475. | 0.06 | 0.06 | 0.11 | 0.12 | 0.12 | 0.5 | 0.06 | 0.06 | 1. | 0.92 |
| 480. | 0.06 | 0.06 | 0.1 | 0.12 | 0.12 | 0.5 | 0.06 | 0.06 | 1. | 0.9 |
| 485. | 0.06 | 0.06 | 0.1 | 0.12 | 0.12 | 0.5 | 0.06 | 0.06 | 1. | 0.86 |
| 490. | 0.06 | 0.06 | 0.1 | 0.12 | 0.12 | 0.5 | 0.06 | 0.06 | 1. | 0.8 |
| 495. | 0.06 | 0.06 | 0.1 | 0.12 | 0.12 | 0.5 | 0.06 | 0.06 | 1. | 0.73 |
| 500. | 0.06 | 0.06 | 0.1 | 0.12 | 0.12 | 0.5 | 0.06 | 0.06 | 1. | 0.66 |
| 505. | 0.06 | 0.06 | 0.1 | 0.12 | 0.12 | 0.5 | 0.06 | 0.06 | 1. | 0.58 |
| 510. | 0.06 | 0.06 | 0.1 | 0.12 | 0.12 | 0.5 | 0.06 | 0.06 | 1. | 0.5 |
| 515. | 0.06 | 0.06 | 0.11 | 0.12 | 0.12 | 0.5 | 0.06 | 0.06 | 1. | 0.44 |
| 520. | 0.06 | 0.08 | 0.17 | 0.16 | 0.12 | 0.5 | 0.06 | 0.06 | 1. | 0.38 |
| 525. | 0.1 | 0.17 | 0.31 | 0.34 | 0.12 | 0.5 | 0.06 | 0.06 | 1. | 0.34 |
| 530. | 0.22 | 0.32 | 0.45 | 0.64 | 0.44 | 0.5 | 0.22 | 0.06 | 1. | 0.33 |
| 535. | 0.35 | 0.41 | 0.47 | 0.82 | 1. | 0.5 | 0.5 | 0.06 | 1. | 0.34 |
| 540. | 0.27 | 0.36 | 0.47 | 0.72 | 1. | 0.5 | 0.5 | 0.06 | 1. | 0.38 |
| 545. | 0.14 | 0.22 | 0.36 | 0.45 | 0.56 | 0.5 | 0.28 | 0.06 | 1. | 0.44 |
| 550. | 0.1 | 0.12 | 0.22 | 0.23 | 0.12 | 0.5 | 0.06 | 0.06 | 1. | 0.5 |
| 555. | 0.1 | 0.12 | 0.23 | 0.25 | 0.12 | 0.5 | 0.06 | 0.06 | 1. | 0.57 |
| 560. | 0.15 | 0.23 | 0.36 | 0.45 | 0.12 | 0.5 | 0.06 | 0.06 | 1. | 0.64 |

FIG. 70B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.26 | 0.35 | 0.47 | 0.7 | 0.82 | 0.5 | 0.41 | 0.06 | 1. | 0.7 |
| 570. | 0.37 | 0.43 | 0.49 | 0.86 | 0.82 | 0.5 | 0.41 | 0. | 1. | 0.75 |
| 575. | 0.3 | 0.39 | 0.49 | 0.79 | 1. | 0.5 | 0.5 | 0. | 1. | 0.79 |
| 580. | 0. | 0.19 | 0.41 | 0.38 | 1. | 0.5 | 0.5 | 0. | 1. | 0.81 |
| 585. | 0. | 0. | 0.05 | 0. | 0. | 0.5 | 0. | 0. | 0. | 0.81 |
| 590. | 0. | 0. | 0.05 | 0. | 0. | 0.5 | 0. | 0. | 0. | 0.8 |
| 595. | 0. | 0. | 0.05 | 0. | 0. | 0.5 | 0. | 0. | 0. | 0.77 |
| 600. | 0. | 0. | 0.05 | 0. | 0. | 0.5 | 0. | 0. | 0. | 0.72 |
| 605. | 0. | 0. | 0.05 | 0. | 0. | 0.5 | 0. | 0. | 0. | 0.66 |
| 610. | 0. | 0. | 0.05 | 0. | 0. | 0.5 | 0. | 0. | 0. | 0.6 |
| 615. | 0. | 0. | 0.05 | 0. | 0. | 0.5 | 0. | 0. | 0. | 0.52 |
| 620. | 0. | 0.16 | 0.37 | 0.33 | 0. | 0.5 | 0. | 0. | 1. | 0.45 |
| 625. | 0.28 | 0.37 | 0.49 | 0.74 | 1. | 0.5 | 0.5 | 0. | 1. | 0.37 |
| 630. | 0.39 | 0.46 | 0.55 | 0.92 | 1. | 0.5 | 0.5 | 0. | 1. | 0.3 |
| 635. | 0.46 | 0.49 | 0.56 | 0.99 | 1. | 0.5 | 0.5 | 0.06 | 1. | 0.23 |
| 640. | 0.4 | 0.47 | 0.56 | 0.94 | 1. | 0.5 | 0.5 | 0. | 1. | 0.17 |
| 645. | 0.3 | 0.39 | 0.5 | 0.78 | 1. | 0.5 | 0.5 | 0. | 1. | 0.11 |
| 650. | 0.18 | 0.27 | 0.4 | 0.54 | 1. | 0.5 | 0.5 | 0. | 1. | 0.07 |
| 655. | 0.08 | 0.14 | 0.27 | 0.29 | 0. | 0.5 | 0. | 0. | 1. | 0.04 |
| 660. | 0.02 | 0.05 | 0.15 | 0.11 | 0. | 0.5 | 0. | 0. | 1. | 0.02 |
| 665. | 0. | 0.01 | 0.07 | 0.02 | 0. | 0.5 | 0. | 0. | 1. | 0. |
| 670. | 0. | 0. | 0.05 | 0. | 0. | 0.5 | 0. | 0. | 1. | 0. |
| 675. | 0. | 0. | 0.05 | 0. | 0. | 0.5 | 0. | 0. | 1. | 0. |
| 680. | 0. | 0. | 0.05 | 0. | 0. | 0.5 | 0. | 0. | 1. | 0.01 |
| 685. | 0. | 0. | 0.05 | 0. | 0. | 0.5 | 0. | 0. | 1. | 0.02 |
| 690. | 0. | 0. | 0.05 | 0. | 0. | 0.5 | 0. | 0. | 1. | 0.04 |
| 695. | 0. | 0. | 0.05 | 0. | 0. | 0.5 | 0. | 0. | 1. | 0.05 |
| 700. | 0. | 0. | 0.05 | 0. | 0. | 0.5 | 0. | 0. | 1. | 0.07 |
| 705. | 0. | 0. | 0.05 | 0. | 0. | 0.5 | 0. | 0. | 1. | 0.08 |
| 710. | 0. | 0. | 0.09 | 0. | 0. | 0.5 | 0. | 0. | 1. | 0.1 |
| 715. | 0. | 0. | 0.09 | 0. | 0. | 0.5 | 0. | 0. | 1. | 0.12 |
| 720. | 0. | 0. | 1. | 0. | 0. | 0.5 | 0. | 0. | 1. | 0.13 |
| 725. | 0. | 0. | 1. | 0. | 0. | 0.5 | 0. | 0. | 1. | 0.15 |
| 730. | 0. | 0. | 1. | 0. | 0. | 0.5 | 0. | 0. | 1. | 0.17 |
| 735. | 0. | 0. | 1. | 0. | 0. | 0.5 | 0. | 0. | 1. | 0.19 |

FIG. 70B-2

| | |
|---|---|
| Best-fit Munsell Reference Filter | 7.5Y 5/4 |
| Wavelength Maxima | (464 551 600 664) |
| Transmittance at Maxima | (0.83 0.92 0.96 1.) |
| Wavelength Minima | (480 562 613) |
| Transmittance at Minima | (0.17 0.41 0.51) |
| PGAI D-15 | 4.27 |
| $PGAI_{IW}$ D-15 | 7.36 |
| PGAI NWS | 1.24 |
| $PGAI_{IW}$ NWS | 7.43 |
| Luminous Transmittance of Daylight | 0.66 |
| Luminous Transmittance of Red Traffic Signal | 0.85 |
| Luminous Transmittance of Yellow Traffic Signal | 0.74 |
| Luminous Transmittance of Green Traffic Signal | 0.6 |
| Minimum Transmittance between 475-650nm | 0.16 |
| Solar Blue Light Transmittance | 0.24 |
| Ganglion Cell Transmittance | 0.33 |
| Luminous Transmittance of Primary Lights (R,G,B) | (0.81 0.68 0.44) |
| D65 Chromaticity Coordinate (x,y) | (0.398 0.416) |
| Yellow Traffic Signal Chromaticity Coordinate (x,y) | (0.588 0.41) |
| Green Traffic Signal Chromaticity Coordinate (x,y) | (0.243 0.512) |
| Passes ANSI Z80.3-2010 | True |

FIG. 71A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 1. | 0. | 0. | 0. | 1. |
| 395. | 0. | 0. | 0.02 | 0. | 0. | 1. | 0. | 0. | 0. | 1. |
| 400. | 0. | 0. | 0.05 | 0. | 0. | 1. | 0. | 0. | 0. | 1. |
| 405. | 0. | 0. | 0.05 | 0. | 0. | 1. | 0. | 0. | 0. | 1. |
| 410. | 0. | 0. | 0.05 | 0. | 0. | 1. | 0. | 0. | 0. | 1. |
| 415. | 0. | 0. | 0.05 | 0. | 0. | 1. | 0. | 0. | 0. | 1. |
| 420. | 0. | 0. | 0.05 | 0. | 0. | 1. | 0. | 0. | 0. | 0.99 |
| 425. | 0. | 0. | 0.05 | 0. | 0. | 1. | 0. | 0. | 0. | 0.97 |
| 430. | 0. | 0. | 0.05 | 0. | 0. | 1. | 0. | 0. | 1. | 0.95 |
| 435. | 0. | 0. | 0.05 | 0. | 0. | 1. | 0. | 0. | 1. | 0.93 |
| 440. | 0. | 0. | 0.05 | 0. | 0. | 1. | 0. | 0. | 1. | 0.91 |
| 445. | 0. | 0.03 | 0.27 | 0.03 | 0. | 1. | 0. | 0. | 1. | 0.89 |
| 450. | 0.13 | 0.4 | 0.76 | 0.4 | 0.5 | 1. | 0.5 | 0. | 1. | 0.87 |
| 455. | 0.56 | 0.84 | 1. | 0.84 | 1. | 1. | 1. | 0. | 1. | 0.85 |
| 460. | 0.87 | 1. | 1. | 1. | 1. | 1. | 1. | 0. | 1. | 0.83 |
| 465. | 0.54 | 0.79 | 1. | 0.79 | 0.94 | 1. | 0.94 | 0. | 1. | 0.82 |
| 470. | 0.25 | 0.42 | 0.71 | 0.42 | 0.52 | 1. | 0.52 | 0. | 1. | 0.8 |
| 475. | 0.16 | 0.2 | 0.37 | 0.2 | 0.18 | 1. | 0.18 | 0.11 | 1. | 0.78 |
| 480. | 0.15 | 0.16 | 0.22 | 0.16 | 0.16 | 1. | 0.16 | 0.16 | 1. | 0.76 |
| 485. | 0.15 | 0.16 | 0.21 | 0.16 | 0.16 | 1. | 0.16 | 0.16 | 1. | 0.74 |
| 490. | 0.15 | 0.16 | 0.21 | 0.16 | 0.16 | 1. | 0.16 | 0.16 | 1. | 0.72 |
| 495. | 0.15 | 0.16 | 0.21 | 0.16 | 0.16 | 1. | 0.16 | 0.16 | 1. | 0.71 |
| 500. | 0.15 | 0.16 | 0.21 | 0.16 | 0.16 | 1. | 0.16 | 0.16 | 1. | 0.69 |
| 505. | 0.15 | 0.16 | 0.21 | 0.16 | 0.16 | 1. | 0.16 | 0.16 | 1. | 0.67 |
| 510. | 0.15 | 0.16 | 0.21 | 0.16 | 0.16 | 1. | 0.16 | 0.16 | 1. | 0.66 |
| 515. | 0.15 | 0.16 | 0.22 | 0.16 | 0.16 | 1. | 0.16 | 0.16 | 1. | 0.64 |
| 520. | 0.15 | 0.22 | 0.48 | 0.22 | 0.16 | 1. | 0.16 | 0.16 | 1. | 0.62 |
| 525. | 0.32 | 0.6 | 0.92 | 0.6 | 0.89 | 1. | 0.89 | 0.16 | 1. | 0.61 |
| 530. | 0.73 | 0.93 | 1. | 0.93 | 0.94 | 1. | 0.94 | 0.16 | 1. | 0.59 |
| 535. | 0.92 | 0.99 | 1. | 0.99 | 1. | 1. | 1. | 0.16 | 1. | 0.58 |
| 540. | 0.95 | 1. | 1. | 1. | 1. | 1. | 1. | 0.16 | 1. | 0.56 |
| 545. | 0.94 | 1. | 1. | 1. | 1. | 1. | 1. | 0.16 | 1. | 0.54 |
| 550. | 0.86 | 0.97 | 1. | 0.97 | 1. | 1. | 1. | 0.16 | 1. | 0.53 |
| 555. | 0.61 | 0.83 | 0.99 | 0.83 | 0.77 | 1. | 0.77 | 0.16 | 1. | 0.51 |
| 560. | 0.29 | 0.5 | 0.78 | 0.5 | 0.66 | 1. | 0.66 | 0.16 | 1. | 0.5 |

FIG. 71B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.2 | 0.23 | 0.42 | 0.23 | 0.16 | 1. | 0.16 | 0.16 | 1. | 0.49 |
| 570. | 0.2 | 0.27 | 0.48 | 0.27 | 0.16 | 1. | 0.16 | 0.16 | 1. | 0.47 |
| 575. | 0.34 | 0.54 | 0.8 | 0.54 | 0.57 | 1. | 0.57 | 0.16 | 1. | 0.46 |
| 580. | 0.63 | 0.83 | 0.99 | 0.83 | 0.98 | 1. | 0.98 | 0.16 | 1. | 0.44 |
| 585. | 0.86 | 0.97 | 1. | 0.97 | 1. | 1. | 1. | 1. | 1. | 0.43 |
| 590. | 0.94 | 1. | 1. | 1. | 1. | 1. | 1. | 1. | 1. | 0.42 |
| 595. | 0.95 | 1. | 1. | 1. | 1. | 1. | 1. | 1. | 1. | 0.4 |
| 600. | 0.9 | 0.99 | 1. | 0.99 | 1. | 1. | 1. | 1. | 1. | 0.39 |
| 605. | 0.71 | 0.89 | 1. | 0.89 | 1. | 1. | 1. | 1. | 1. | 0.38 |
| 610. | 0.43 | 0.62 | 0.88 | 0.62 | 0.42 | 1. | 0.42 | 0.33 | 1. | 0.36 |
| 615. | 0.32 | 0.37 | 0.57 | 0.37 | 0.31 | 1. | 0.31 | 0.16 | 1. | 0.35 |
| 620. | 0.32 | 0.38 | 0.58 | 0.38 | 0.16 | 1. | 0.16 | 0.16 | 1. | 0.34 |
| 625. | 0.44 | 0.62 | 0.86 | 0.62 | 0.58 | 1. | 0.58 | 0.16 | 1. | 0.33 |
| 630. | 0.7 | 0.87 | 1. | 0.87 | 1. | 1. | 1. | 0.16 | 1. | 0.32 |
| 635. | 0.88 | 0.98 | 1. | 0.98 | 1. | 1. | 1. | 0.16 | 1. | 0.31 |
| 640. | 0.95 | 1. | 1. | 1. | 1. | 1. | 1. | 0.16 | 1. | 0.29 |
| 645. | 0.95 | 1. | 1. | 1. | 1. | 1. | 1. | 0.16 | 1. | 0.28 |
| 650. | 0.95 | 1. | 1. | 1. | 1. | 1. | 1. | 0.16 | 1. | 0.27 |
| 655. | 0.95 | 1. | 1. | 1. | 1. | 1. | 1. | 0.16 | 1. | 0.26 |
| 660. | 0.95 | 1. | 1. | 1. | 1. | 1. | 1. | 0.16 | 1. | 0.25 |
| 665. | 0.95 | 1. | 1. | 1. | 1. | 1. | 1. | 0.16 | 1. | 0.24 |
| 670. | 0.95 | 1. | 1. | 1. | 1. | 1. | 1. | 0.16 | 1. | 0.23 |
| 675. | 0.95 | 1. | 1. | 1. | 1. | 1. | 1. | 0.16 | 1. | 0.22 |
| 680. | 0.95 | 1. | 1. | 1. | 1. | 1. | 1. | 0.16 | 1. | 0.21 |
| 685. | 0.95 | 1. | 1. | 1. | 1. | 1. | 1. | 0.16 | 1. | 0.2 |
| 690. | 0.95 | 1. | 1. | 1. | 1. | 1. | 1. | 0.16 | 1. | 0.19 |
| 695. | 0.95 | 1. | 1. | 1. | 1. | 1. | 1. | 0.16 | 1. | 0.18 |
| 700. | 0.95 | 1. | 1. | 1. | 1. | 1. | 1. | 0.16 | 1. | 0.17 |
| 705. | 0.95 | 1. | 1. | 1. | 1. | 1. | 1. | 0.16 | 1. | 0.16 |
| 710. | 0.95 | 1. | 1. | 1. | 1. | 1. | 1. | 0.16 | 1. | 0.15 |
| 715. | 0.95 | 1. | 1. | 1. | 1. | 1. | 1. | 0.16 | 1. | 0.15 |
| 720. | 0.95 | 1. | 1. | 1. | 1. | 1. | 1. | 0.16 | 1. | 0.14 |
| 725. | 0.94 | 1. | 1. | 1. | 1. | 1. | 1. | 0.16 | 1. | 0.13 |
| 730. | 0.87 | 0.97 | 1. | 0.97 | 1. | 1. | 1. | 0.16 | 1. | 0.12 |
| 735. | 0.71 | 0.86 | 1. | 0.86 | 1. | 1. | 1. | 0. | 1. | 0.11 |

FIG. 71B-2

| | |
|---|---|
| Best-fit Munsell Reference Filter | 5BG 4/1 |
| Wavelength Maxima | (446 535 635) |
| Transmittance at Maxima | (0.27 0.21 0.28) |
| Wavelength Minima | (477 579) |
| Transmittance at Minima | (0.03 0.01) |
| PGAI D-15 | 30.06 |
| $PGAI_{IW}$ D-15 | 26.24 |
| PGAI NWS | 41.66 |
| $PGAI_{IW}$ NWS | 28.91 |
| Luminous Transmittance of Daylight | 0.18 |
| Luminous Transmittance of Red Traffic Signal | 0.31 |
| Luminous Transmittance of Yellow Traffic Signal | 0.16 |
| Luminous Transmittance of Green Traffic Signal | 0.2 |
| Minimum Transmittance between 475-650nm | 0.04 |
| Solar Blue Light Transmittance | 0.23 |
| Ganglion Cell Transmittance | 0.21 |
| Luminous Transmittance of Primary Lights (R,G,B) | (0.27 0.29 0.27) |
| D65 Chromaticity Coordinate (x,y) | (0.317 0.336) |
| Yellow Traffic Signal Chromaticity Coordinate (x,y) | (0.62 0.379) |
| Green Traffic Signal Chromaticity Coordinate (x,y) | (0.187 0.473) |
| Passes ANSI Z80.3-2010 | True |

*FIG. 72A*

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.17 | 0. | 0. | 1. | 0.74 |
| 395. | 0. | 0. | 0.02 | 0. | 0. | 0.2 | 0. | 0. | 1. | 0.74 |
| 400. | 0. | 0. | 0.05 | 0. | 0. | 0.22 | 0. | 0. | 1. | 0.72 |
| 405. | 0. | 0. | 0.05 | 0. | 0. | 0.24 | 0. | 0. | 1. | 0.69 |
| 410. | 0. | 0. | 0.05 | 0. | 0. | 0.27 | 0. | 0. | 1. | 0.64 |
| 415. | 0. | 0. | 0.06 | 0.01 | 0. | 0.28 | 0. | 0. | 1. | 0.56 |
| 420. | 0.01 | 0.05 | 0.15 | 0.15 | 0. | 0.3 | 0. | 0. | 1. | 0.45 |
| 425. | 0.08 | 0.15 | 0.26 | 0.47 | 0. | 0.31 | 0. | 0. | 1. | 0.33 |
| 430. | 0.18 | 0.25 | 0.36 | 0.79 | 1. | 0.31 | 0.31 | 0. | 1. | 0.22 |
| 435. | 0.27 | 0.32 | 0.4 | 0.97 | 1. | 0.33 | 0.33 | 0. | 1. | 0.14 |
| 440. | 0.32 | 0.34 | 0.41 | 1. | 1. | 0.34 | 0.34 | 0.04 | 1. | 0.11 |
| 445. | 0.31 | 0.35 | 0.41 | 0.98 | 1. | 0.35 | 0.35 | 0.04 | 1. | 0.14 |
| 450. | 0.26 | 0.31 | 0.4 | 0.88 | 1. | 0.35 | 0.35 | 0.04 | 1. | 0.21 |
| 455. | 0.18 | 0.24 | 0.34 | 0.68 | 1. | 0.36 | 0.36 | 0.04 | 1. | 0.3 |
| 460. | 0.11 | 0.16 | 0.26 | 0.45 | 0.33 | 0.36 | 0.12 | 0.04 | 1. | 0.4 |
| 465. | 0.07 | 0.1 | 0.18 | 0.26 | 0.34 | 0.37 | 0.12 | 0.04 | 1. | 0.49 |
| 470. | 0.04 | 0.06 | 0.12 | 0.16 | 0.1 | 0.36 | 0.04 | 0.04 | 1. | 0.55 |
| 475. | 0.04 | 0.04 | 0.09 | 0.12 | 0.1 | 0.36 | 0.04 | 0.04 | 1. | 0.59 |
| 480. | 0.03 | 0.04 | 0.08 | 0.1 | 0.1 | 0.37 | 0.04 | 0.04 | 1. | 0.59 |
| 485. | 0.03 | 0.04 | 0.08 | 0.1 | 0.1 | 0.37 | 0.04 | 0.04 | 1. | 0.56 |
| 490. | 0.03 | 0.04 | 0.09 | 0.1 | 0.1 | 0.37 | 0.04 | 0.04 | 1. | 0.49 |
| 495. | 0.04 | 0.06 | 0.13 | 0.16 | 0.1 | 0.37 | 0.04 | 0.04 | 1. | 0.4 |
| 500. | 0.07 | 0.11 | 0.2 | 0.31 | 0.1 | 0.37 | 0.04 | 0.04 | 1. | 0.29 |
| 505. | 0.13 | 0.19 | 0.28 | 0.52 | 0.1 | 0.36 | 0.04 | 0.04 | 1. | 0.19 |
| 510. | 0.2 | 0.25 | 0.32 | 0.74 | 1. | 0.33 | 0.33 | 0.04 | 1. | 0.09 |
| 515. | 0.22 | 0.26 | 0.32 | 0.9 | 1. | 0.31 | 0.31 | 0.04 | 1. | 0.03 |
| 520. | 0.21 | 0.22 | 0.3 | 0.98 | 1. | 0.22 | 0.22 | 0.04 | 1. | 0. |
| 525. | 0.23 | 0.27 | 0.33 | 1. | 1. | 0.27 | 0.27 | 0.04 | 1. | 0.01 |
| 530. | 0.26 | 0.28 | 0.34 | 0.99 | 1. | 0.28 | 0.28 | 0.04 | 1. | 0.05 |
| 535. | 0.27 | 0.3 | 0.37 | 0.97 | 1. | 0.31 | 0.31 | 0.04 | 1. | 0.11 |
| 540. | 0.28 | 0.31 | 0.37 | 0.9 | 1. | 0.35 | 0.35 | 0.04 | 1. | 0.17 |
| 545. | 0.24 | 0.28 | 0.36 | 0.79 | 1. | 0.36 | 0.36 | 0.04 | 1. | 0.24 |
| 550. | 0.19 | 0.23 | 0.32 | 0.63 | 0.7 | 0.37 | 0.26 | 0.04 | 1. | 0.3 |
| 555. | 0.14 | 0.18 | 0.26 | 0.47 | 0.7 | 0.37 | 0.26 | 0.04 | 1. | 0.34 |
| 560. | 0.1 | 0.13 | 0.2 | 0.35 | 0.1 | 0.37 | 0.04 | 0.04 | 1. | 0.37 |

FIG. 72B-1

| λ (nm) | $f_{MIN}$ | $f_T$ | $f_{MAX}$ | q′(λ) | q(λ) | p(λ) | f(λ) | $t_{MIN}(λ)$ | $t_{MAX}(λ)$ | c(λ) |
|---|---|---|---|---|---|---|---|---|---|---|
| 565. | 0.06 | 0.09 | 0.16 | 0.27 | 0.1 | 0.36 | 0.04 | 0.04 | 1. | 0.38 |
| 570. | 0.03 | 0.05 | 0.12 | 0.25 | 0.23 | 0.16 | 0.04 | 0.04 | 1. | 0.38 |
| 575. | 0.03 | 0.04 | 0.08 | 0.26 | 0.29 | 0.14 | 0.04 | 0.04 | 1. | 0.38 |
| 580. | 0.03 | 0.04 | 0.09 | 0.27 | 0.25 | 0.17 | 0.04 | 0.04 | 1. | 0.37 |
| 585. | 0.03 | 0.03 | 0.08 | 0.28 | 0.37 | 0.1 | 0.04 | 0.04 | 1. | 0.35 |
| 590. | 0.03 | 0.04 | 0.1 | 0.29 | 0.34 | 0.15 | 0.05 | 0.04 | 1. | 0.33 |
| 595. | 0.05 | 0.07 | 0.14 | 0.34 | 0.23 | 0.21 | 0.05 | 0.04 | 1. | 0.32 |
| 600. | 0.08 | 0.11 | 0.19 | 0.42 | 0.16 | 0.27 | 0.04 | 0.04 | 1. | 0.3 |
| 605. | 0.13 | 0.16 | 0.25 | 0.54 | 0.13 | 0.31 | 0.04 | 0.04 | 1. | 0.28 |
| 610. | 0.18 | 0.22 | 0.31 | 0.67 | 0.74 | 0.32 | 0.24 | 0.04 | 1. | 0.26 |
| 615. | 0.23 | 0.27 | 0.36 | 0.79 | 1. | 0.35 | 0.35 | 0.04 | 1. | 0.24 |
| 620. | 0.28 | 0.32 | 0.39 | 0.89 | 1. | 0.35 | 0.35 | 0.04 | 1. | 0.22 |
| 625. | 0.31 | 0.34 | 0.4 | 0.96 | 1. | 0.35 | 0.35 | 0.04 | 1. | 0.21 |
| 630. | 0.33 | 0.35 | 0.41 | 0.99 | 1. | 0.35 | 0.35 | 0.04 | 1. | 0.19 |
| 635. | 0.33 | 0.35 | 0.41 | 1. | 1. | 0.35 | 0.35 | 0.04 | 1. | 0.18 |
| 640. | 0.33 | 0.35 | 0.41 | 1. | 1. | 0.35 | 0.35 | 0.04 | 1. | 0.17 |
| 645. | 0.32 | 0.34 | 0.41 | 0.99 | 1. | 0.35 | 0.35 | 0.04 | 1. | 0.16 |
| 650. | 0.3 | 0.33 | 0.4 | 0.95 | 1. | 0.34 | 0.34 | 0.04 | 1. | 0.15 |
| 655. | 0.28 | 0.31 | 0.38 | 0.89 | 1. | 0.35 | 0.35 | 0.04 | 1. | 0.14 |
| 660. | 0.25 | 0.28 | 0.36 | 0.8 | 1. | 0.35 | 0.35 | 0. | 1. | 0.13 |
| 665. | 0.21 | 0.25 | 0.32 | 0.68 | 1. | 0.36 | 0.36 | 0. | 1. | 0.13 |
| 670. | 0.16 | 0.2 | 0.28 | 0.55 | 0.77 | 0.37 | 0.28 | 0. | 1. | 0.12 |
| 675. | 0.12 | 0.15 | 0.23 | 0.41 | 0.47 | 0.37 | 0.18 | 0. | 1. | 0.12 |
| 680. | 0.08 | 0.11 | 0.18 | 0.28 | 0. | 0.38 | 0. | 0. | 1. | 0.12 |
| 685. | 0.05 | 0.07 | 0.13 | 0.17 | 0. | 0.38 | 0. | 0. | 1. | 0.12 |
| 690. | 0.02 | 0.04 | 0.1 | 0.09 | 0. | 0.39 | 0. | 0. | 1. | 0.12 |
| 695. | 0.01 | 0.02 | 0.07 | 0.04 | 0. | 0.4 | 0. | 0. | 1. | 0.12 |
| 700. | 0. | 0.01 | 0.05 | 0.01 | 0. | 0.41 | 0. | 0. | 1. | 0.12 |
| 705. | 0. | 0. | 0.05 | 0. | 0. | 0.42 | 0. | 0. | 1. | 0.13 |
| 710. | 0. | 0. | 0.09 | 0. | 0. | 0.42 | 0. | 0. | 1. | 0.13 |
| 715. | 0. | 0. | 0.09 | 0. | 0. | 0.42 | 0. | 0. | 1. | 0.14 |
| 720. | 0. | 0. | 1. | 0. | 0. | 0.42 | 0. | 0. | 1. | 0.15 |
| 725. | 0. | 0. | 1. | 0. | 0. | 0.42 | 0. | 0. | 1. | 0.16 |
| 730. | 0. | 0. | 1. | 0. | 0. | 0.41 | 0. | 0. | 1. | 0.17 |
| 735. | 0. | 0. | 1. | 0. | 0. | 0.33 | 0. | 0. | 1. | 0.18 |

FIG. 72B-2

| | |
|---|---|
| Best-fit Munsell Reference Filter | 5B 8/4 |
| Wavelength Maxima | (468 556 669) |
| Transmittance at Maxima | (0.33 0.33 0.25) |
| Wavelength Minima | (513 629) |
| Transmittance at Minima | (0.03 0.03) |
| PGAI D-15 | -25.31 |
| $PGAI_{IW}$ D-15 | -15.73 |
| PGAI NWS | -21.73 |
| $PGAI_{IW}$ NWS | -4.14 |
| Luminous Transmittance of Daylight | 0.18 |
| Luminous Transmittance of Red Traffic Signal | 0.11 |
| Luminous Transmittance of Yellow Traffic Signal | 0.18 |
| Luminous Transmittance of Green Traffic Signal | 0.18 |
| Minimum Transmittance between 475-650nm | 0.03 |
| Solar Blue Light Transmittance | 0.22 |
| Ganglion Cell Transmittance | 0.27 |
| Luminous Transmittance of Primary Lights (R,G,B) | (0.21 0.29 0.26) |
| D65 Chromaticity Coordinate (x,y) | (0.286 0.321) |
| Yellow Traffic Signal Chromaticity Coordinate (x,y) | (0.52 0.478) |
| Green Traffic Signal Chromaticity Coordinate (x,y) | (0.221 0.361) |
| Passes ANSI Z80.3-2010 | False |

FIG. 73A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.19 | 0. | 0. | 1. | 1. |
| 395. | 0. | 0. | 0.02 | 0. | 0. | 0.22 | 0. | 0. | 1. | 1. |
| 400. | 0. | 0. | 0.05 | 0. | 0. | 0.25 | 0. | 0. | 1. | 0.94 |
| 405. | 0. | 0. | 0.05 | 0. | 0. | 0.27 | 0. | 0. | 1. | 0.83 |
| 410. | 0. | 0. | 0.05 | 0. | 0. | 0.3 | 0. | 0. | 1. | 0.7 |
| 415. | 0. | 0. | 0.05 | 0. | 0. | 0.32 | 0. | 0. | 1. | 0.57 |
| 420. | 0. | 0. | 0.05 | 0. | 0. | 0.33 | 0. | 0. | 1. | 0.46 |
| 425. | 0. | 0. | 0.05 | 0. | 0. | 0.35 | 0. | 0. | 1. | 0.38 |
| 430. | 0. | 0.01 | 0.06 | 0.02 | 0. | 0.34 | 0. | 0. | 1. | 0.32 |
| 435. | 0.01 | 0.04 | 0.12 | 0.1 | 0. | 0.37 | 0. | 0. | 1. | 0.28 |
| 440. | 0.06 | 0.12 | 0.23 | 0.3 | 0.09 | 0.38 | 0.04 | 0.04 | 1. | 0.26 |
| 445. | 0.15 | 0.23 | 0.35 | 0.59 | 0.34 | 0.39 | 0.13 | 0.04 | 1. | 0.24 |
| 450. | 0.26 | 0.33 | 0.43 | 0.84 | 1. | 0.39 | 0.39 | 0.04 | 1. | 0.23 |
| 455. | 0.34 | 0.39 | 0.46 | 0.97 | 1. | 0.4 | 0.4 | 0.04 | 1. | 0.22 |
| 460. | 0.38 | 0.4 | 0.47 | 1. | 1. | 0.4 | 0.4 | 0.04 | 1. | 0.21 |
| 465. | 0.38 | 0.41 | 0.47 | 1. | 1. | 0.41 | 0.41 | 0.04 | 1. | 0.21 |
| 470. | 0.37 | 0.4 | 0.47 | 1. | 1. | 0.4 | 0.4 | 0.04 | 1. | 0.2 |
| 475. | 0.34 | 0.39 | 0.46 | 0.96 | 1. | 0.4 | 0.4 | 0.04 | 1. | 0.21 |
| 480. | 0.27 | 0.34 | 0.43 | 0.82 | 1. | 0.41 | 0.41 | 0.04 | 1. | 0.22 |
| 485. | 0.18 | 0.25 | 0.36 | 0.6 | 1. | 0.41 | 0.41 | 0.04 | 1. | 0.24 |
| 490. | 0.1 | 0.15 | 0.26 | 0.37 | 0.24 | 0.41 | 0.1 | 0.04 | 1. | 0.28 |
| 495. | 0.05 | 0.08 | 0.17 | 0.19 | 0.09 | 0.41 | 0.04 | 0.04 | 1. | 0.35 |
| 500. | 0.04 | 0.05 | 0.11 | 0.11 | 0.09 | 0.41 | 0.04 | 0.04 | 1. | 0.43 |
| 505. | 0.04 | 0.04 | 0.08 | 0.1 | 0.09 | 0.4 | 0.04 | 0.04 | 1. | 0.53 |
| 510. | 0.04 | 0.04 | 0.08 | 0.11 | 0.1 | 0.36 | 0.04 | 0.04 | 1. | 0.64 |
| 515. | 0.03 | 0.04 | 0.08 | 0.12 | 0.1 | 0.35 | 0.04 | 0.04 | 1. | 0.73 |
| 520. | 0.03 | 0.03 | 0.08 | 0.13 | 0.15 | 0.24 | 0.04 | 0.04 | 1. | 0.8 |
| 525. | 0.03 | 0.04 | 0.1 | 0.15 | 0.15 | 0.3 | 0.04 | 0.04 | 1. | 0.82 |
| 530. | 0.05 | 0.07 | 0.14 | 0.22 | 0.12 | 0.31 | 0.04 | 0.04 | 1. | 0.81 |
| 535. | 0.08 | 0.13 | 0.23 | 0.37 | 0.12 | 0.35 | 0.04 | 0.04 | 1. | 0.76 |
| 540. | 0.15 | 0.21 | 0.32 | 0.55 | 0.16 | 0.39 | 0.06 | 0.04 | 1. | 0.69 |
| 545. | 0.23 | 0.29 | 0.39 | 0.74 | 1. | 0.4 | 0.4 | 0.04 | 1. | 0.59 |
| 550. | 0.31 | 0.36 | 0.45 | 0.88 | 1. | 0.41 | 0.41 | 0.04 | 1. | 0.49 |
| 555. | 0.36 | 0.4 | 0.47 | 0.96 | 1. | 0.42 | 0.42 | 0.04 | 1. | 0.4 |
| 560. | 0.37 | 0.4 | 0.47 | 0.97 | 1. | 0.41 | 0.41 | 0.04 | 1. | 0.32 |

FIG. 73B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.25 | 0.36 | 0.45 | 0.94 | 1. | 0.4 | 0.4 | 0.04 | 1. | 0.25 |
| 570. | 0.12 | 0.18 | 0.36 | 0.87 | 1. | 0.17 | 0.17 | 0.04 | 1. | 0.19 |
| 575. | 0.12 | 0.13 | 0.18 | 0.81 | 0.78 | 0.16 | 0.12 | 0.04 | 1. | 0.15 |
| 580. | 0.1 | 0.13 | 0.18 | 0.76 | 1. | 0.19 | 0.19 | 0.04 | 1. | 0.12 |
| 585. | 0.09 | 0.09 | 0.16 | 0.72 | 0.33 | 0.11 | 0.04 | 0.04 | 1. | 0.1 |
| 590. | 0.09 | 0.11 | 0.18 | 0.68 | 0.44 | 0.17 | 0.07 | 0.04 | 1. | 0.09 |
| 595. | 0.12 | 0.14 | 0.21 | 0.62 | 1. | 0.24 | 0.24 | 0.04 | 1. | 0.09 |
| 600. | 0.15 | 0.16 | 0.21 | 0.53 | 1. | 0.3 | 0.3 | 0.04 | 1. | 0.11 |
| 605. | 0.12 | 0.15 | 0.21 | 0.43 | 0.5 | 0.34 | 0.17 | 0.04 | 1. | 0.16 |
| 610. | 0.09 | 0.12 | 0.18 | 0.32 | 0.1 | 0.36 | 0.04 | 0.04 | 1. | 0.26 |
| 615. | 0.06 | 0.08 | 0.15 | 0.22 | 0.1 | 0.39 | 0.04 | 0.04 | 1. | 0.4 |
| 620. | 0.04 | 0.06 | 0.12 | 0.14 | 0.09 | 0.39 | 0.04 | 0.04 | 1. | 0.57 |
| 625. | 0.04 | 0.04 | 0.09 | 0.11 | 0.09 | 0.39 | 0.04 | 0.04 | 1. | 0.69 |
| 630. | 0.04 | 0.04 | 0.09 | 0.1 | 0.09 | 0.39 | 0.04 | 0.04 | 1. | 0.73 |
| 635. | 0.04 | 0.05 | 0.1 | 0.13 | 0.09 | 0.39 | 0.04 | 0.04 | 1. | 0.67 |
| 640. | 0.05 | 0.07 | 0.14 | 0.18 | 0.09 | 0.39 | 0.04 | 0.04 | 1. | 0.54 |
| 645. | 0.08 | 0.11 | 0.18 | 0.28 | 0.09 | 0.39 | 0.04 | 0.04 | 1. | 0.38 |
| 650. | 0.12 | 0.15 | 0.23 | 0.4 | 0.09 | 0.38 | 0.04 | 0.04 | 1. | 0.24 |
| 655. | 0.16 | 0.2 | 0.29 | 0.53 | 0.09 | 0.39 | 0.04 | 0.04 | 1. | 0.14 |
| 660. | 0.21 | 0.26 | 0.34 | 0.65 | 1. | 0.39 | 0.39 | 0. | 1. | 0.07 |
| 665. | 0.26 | 0.3 | 0.37 | 0.75 | 1. | 0.4 | 0.4 | 0. | 1. | 0.04 |
| 670. | 0.3 | 0.32 | 0.38 | 0.79 | 1. | 0.41 | 0.41 | 0. | 1. | 0.02 |
| 675. | 0.29 | 0.32 | 0.38 | 0.77 | 1. | 0.41 | 0.41 | 0. | 1. | 0.01 |
| 680. | 0.26 | 0.3 | 0.37 | 0.71 | 1. | 0.42 | 0.42 | 0. | 1. | 0.01 |
| 685. | 0.21 | 0.25 | 0.33 | 0.6 | 1. | 0.42 | 0.42 | 0. | 1. | 0.01 |
| 690. | 0.16 | 0.2 | 0.29 | 0.47 | 0.39 | 0.44 | 0.17 | 0. | 1. | 0. |
| 695. | 0.12 | 0.15 | 0.23 | 0.34 | 0.3 | 0.45 | 0.13 | 0. | 1. | 0. |
| 700. | 0.08 | 0.11 | 0.18 | 0.23 | 0. | 0.46 | 0. | 0. | 1. | 0. |
| 705. | 0.04 | 0.07 | 0.13 | 0.14 | 0. | 0.46 | 0. | 0. | 1. | 0. |
| 710. | 0.02 | 0.04 | 0.11 | 0.08 | 0. | 0.47 | 0. | 0. | 1. | 0. |
| 715. | 0.01 | 0.02 | 0.11 | 0.03 | 0. | 0.47 | 0. | 0. | 1. | 0. |
| 720. | 0. | 0.01 | 1. | 0.01 | 0. | 0.47 | 0. | 0. | 1. | 0. |
| 725. | 0. | 0. | 1. | 0. | 0. | 0.47 | 0. | 0. | 1. | 0.01 |
| 730. | 0. | 0. | 1. | 0. | 0. | 0.45 | 0. | 0. | 1. | 0.01 |
| 735. | 0. | 0. | 1. | 0. | 0. | 0.37 | 0. | 0. | 1. | 0.02 |

FIG. 73B-2

| | |
|---|---|
| Best-fit Munsell Reference Filter | 10G 3/2 |
| Wavelength Maxima | (448 537 634) |
| Transmittance at Maxima | (0.31 0.27 0.31) |
| Wavelength Minima | (477 583) |
| Transmittance at Minima | (0.03 0.01) |
| PGAI D-15 | 30.16 |
| $PGAI_{IW}$ D-15 | 30.76 |
| PGAI NWS | 48.6 |
| $PGAI_{IW}$ NWS | 36.8 |
| Luminous Transmittance of Daylight | 0.18 |
| Luminous Transmittance of Red Traffic Signal | 0.31 |
| Luminous Transmittance of Yellow Traffic Signal | 0.15 |
| Luminous Transmittance of Green Traffic Signal | 0.22 |
| Minimum Transmittance between 475-650nm | 0.04 |
| Solar Blue Light Transmittance | 0.2 |
| Ganglion Cell Transmittance | 0.2 |
| Luminous Transmittance of Primary Lights (R,G,B) | (0.23 0.32 0.29) |
| D65 Chromaticity Coordinate (x,y) | (0.308 0.353) |
| Yellow Traffic Signal Chromaticity Coordinate (x,y) | (0.619 0.379) |
| Green Traffic Signal Chromaticity Coordinate (x,y) | (0.186 0.495) |
| Passes ANSI Z80.3-2010 | True |

FIG. 74A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.19 | 0. | 0. | 1. | 1. |
| 395. | 0. | 0. | 0.02 | 0. | 0. | 0.22 | 0. | 0. | 1. | 0.91 |
| 400. | 0. | 0. | 0.05 | 0. | 0. | 0.25 | 0. | 0. | 1. | 0.83 |
| 405. | 0. | 0. | 0.05 | 0. | 0. | 0.27 | 0. | 0. | 1. | 0.75 |
| 410. | 0. | 0. | 0.05 | 0. | 0. | 0.3 | 0. | 0. | 1. | 0.65 |
| 415. | 0. | 0. | 0.05 | 0. | 0. | 0.32 | 0. | 0. | 1. | 0.55 |
| 420. | 0. | 0. | 0.05 | 0. | 0. | 0.33 | 0. | 0. | 1. | 0.43 |
| 425. | 0. | 0. | 0.07 | 0. | 0. | 0.35 | 0. | 0. | 1. | 0.3 |
| 430. | 0.01 | 0.09 | 0.27 | 0.26 | 0. | 0.34 | 0. | 0. | 1. | 0.19 |
| 435. | 0.16 | 0.29 | 0.42 | 0.77 | 0.63 | 0.37 | 0.23 | 0. | 1. | 0.11 |
| 440. | 0.32 | 0.38 | 0.45 | 0.99 | 1. | 0.38 | 0.38 | 0.04 | 1. | 0.07 |
| 445. | 0.37 | 0.39 | 0.46 | 1. | 1. | 0.39 | 0.39 | 0.04 | 1. | 0.08 |
| 450. | 0.36 | 0.39 | 0.46 | 1. | 1. | 0.39 | 0.39 | 0.04 | 1. | 0.12 |
| 455. | 0.23 | 0.34 | 0.45 | 0.84 | 1. | 0.4 | 0.4 | 0.04 | 1. | 0.19 |
| 460. | 0.07 | 0.16 | 0.33 | 0.41 | 0.63 | 0.4 | 0.25 | 0.04 | 1. | 0.26 |
| 465. | 0.03 | 0.04 | 0.14 | 0.1 | 0.09 | 0.41 | 0.04 | 0.04 | 1. | 0.33 |
| 470. | 0.03 | 0.04 | 0.08 | 0.09 | 0.09 | 0.4 | 0.04 | 0.04 | 1. | 0.39 |
| 475. | 0.03 | 0.04 | 0.08 | 0.09 | 0.09 | 0.4 | 0.04 | 0.04 | 1. | 0.42 |
| 480. | 0.03 | 0.04 | 0.08 | 0.09 | 0.09 | 0.41 | 0.04 | 0.04 | 1. | 0.43 |
| 485. | 0.03 | 0.04 | 0.08 | 0.09 | 0.09 | 0.41 | 0.04 | 0.04 | 1. | 0.42 |
| 490. | 0.03 | 0.04 | 0.08 | 0.09 | 0.09 | 0.41 | 0.04 | 0.04 | 1. | 0.38 |
| 495. | 0.03 | 0.04 | 0.08 | 0.09 | 0.09 | 0.41 | 0.04 | 0.04 | 1. | 0.32 |
| 500. | 0.03 | 0.04 | 0.12 | 0.1 | 0.09 | 0.41 | 0.04 | 0.04 | 1. | 0.24 |
| 505. | 0.05 | 0.11 | 0.25 | 0.29 | 0.09 | 0.4 | 0.04 | 0.04 | 1. | 0.15 |
| 510. | 0.16 | 0.26 | 0.37 | 0.7 | 0.52 | 0.36 | 0.19 | 0.04 | 1. | 0.07 |
| 515. | 0.25 | 0.31 | 0.38 | 0.97 | 1. | 0.35 | 0.35 | 0.04 | 1. | 0.02 |
| 520. | 0.24 | 0.25 | 0.34 | 1. | 1. | 0.24 | 0.24 | 0.04 | 1. | 0. |
| 525. | 0.25 | 0.3 | 0.36 | 1. | 1. | 0.3 | 0.3 | 0.04 | 1. | 0.02 |
| 530. | 0.29 | 0.31 | 0.38 | 1. | 1. | 0.31 | 0.31 | 0.04 | 1. | 0.08 |
| 535. | 0.3 | 0.34 | 0.43 | 1. | 1. | 0.35 | 0.35 | 0.04 | 1. | 0.15 |
| 540. | 0.35 | 0.39 | 0.46 | 1. | 1. | 0.39 | 0.39 | 0.04 | 1. | 0.23 |
| 545. | 0.33 | 0.39 | 0.46 | 0.97 | 1. | 0.4 | 0.4 | 0.04 | 1. | 0.3 |
| 550. | 0.19 | 0.3 | 0.42 | 0.73 | 1. | 0.41 | 0.41 | 0.04 | 1. | 0.36 |
| 555. | 0.07 | 0.14 | 0.29 | 0.34 | 0.43 | 0.42 | 0.18 | 0.04 | 1. | 0.41 |
| 560. | 0.05 | 0.06 | 0.14 | 0.13 | 0.09 | 0.41 | 0.04 | 0.04 | 1. | 0.45 |

FIG. 74B-1

| λ (nm) | $f_{MIN}$ | $f_T$ | $f_{MAX}$ | q′(λ) | q(λ) | p(λ) | f(λ) | $t_{MIN}$(λ) | $t_{MAX}$(λ) | c(λ) |
|---|---|---|---|---|---|---|---|---|---|---|
| 565. | 0.05 | 0.06 | 0.1 | 0.15 | 0.09 | 0.4 | 0.04 | 0.04 | 1. | 0.47 |
| 570. | 0.03 | 0.05 | 0.1 | 0.22 | 0.21 | 0.17 | 0.04 | 0.04 | 1. | 0.48 |
| 575. | 0.03 | 0.04 | 0.09 | 0.25 | 0.26 | 0.16 | 0.04 | 0.04 | 1. | 0.49 |
| 580. | 0.04 | 0.05 | 0.09 | 0.27 | 0.22 | 0.19 | 0.04 | 0.04 | 1. | 0.49 |
| 585. | 0.04 | 0.04 | 0.09 | 0.3 | 0.33 | 0.11 | 0.04 | 0.04 | 1. | 0.5 |
| 590. | 0.04 | 0.04 | 0.09 | 0.26 | 0.31 | 0.17 | 0.05 | 0.04 | 1. | 0.5 |
| 595. | 0.04 | 0.04 | 0.09 | 0.19 | 0.2 | 0.24 | 0.05 | 0.04 | 1. | 0.5 |
| 600. | 0.04 | 0.04 | 0.09 | 0.14 | 0.14 | 0.3 | 0.04 | 0.04 | 1. | 0.49 |
| 605. | 0.04 | 0.06 | 0.15 | 0.18 | 0.11 | 0.34 | 0.04 | 0.04 | 1. | 0.48 |
| 610. | 0.08 | 0.15 | 0.27 | 0.41 | 0.1 | 0.36 | 0.04 | 0.04 | 1. | 0.46 |
| 615. | 0.18 | 0.26 | 0.37 | 0.68 | 0.76 | 0.39 | 0.3 | 0.04 | 1. | 0.42 |
| 620. | 0.29 | 0.34 | 0.42 | 0.87 | 0.76 | 0.39 | 0.3 | 0.04 | 1. | 0.36 |
| 625. | 0.34 | 0.38 | 0.45 | 0.96 | 1. | 0.39 | 0.39 | 0.04 | 1. | 0.29 |
| 630. | 0.37 | 0.39 | 0.45 | 1. | 1. | 0.39 | 0.39 | 0.04 | 1. | 0.21 |
| 635. | 0.37 | 0.39 | 0.45 | 1. | 1. | 0.39 | 0.39 | 0.04 | 1. | 0.12 |
| 640. | 0.37 | 0.39 | 0.45 | 1. | 1. | 0.39 | 0.39 | 0.04 | 1. | 0.05 |
| 645. | 0.36 | 0.39 | 0.45 | 1. | 1. | 0.39 | 0.39 | 0.04 | 1. | 0.01 |
| 650. | 0.34 | 0.38 | 0.44 | 0.99 | 1. | 0.38 | 0.38 | 0.04 | 1. | 0. |
| 655. | 0.26 | 0.33 | 0.43 | 0.86 | 1. | 0.39 | 0.39 | 0.04 | 1. | 0.03 |
| 660. | 0.13 | 0.22 | 0.35 | 0.56 | 1. | 0.39 | 0.39 | 0. | 1. | 0.08 |
| 665. | 0.03 | 0.09 | 0.21 | 0.22 | 0.07 | 0.4 | 0.03 | 0. | 1. | 0.16 |
| 670. | 0. | 0.01 | 0.09 | 0.04 | 0. | 0.41 | 0. | 0. | 1. | 0.23 |
| 675. | 0. | 0. | 0.05 | 0. | 0. | 0.41 | 0. | 0. | 1. | 0.31 |
| 680. | 0. | 0. | 0.05 | 0. | 0. | 0.42 | 0. | 0. | 1. | 0.37 |
| 685. | 0. | 0. | 0.05 | 0. | 0. | 0.42 | 0. | 0. | 1. | 0.41 |
| 690. | 0. | 0. | 0.05 | 0. | 0. | 0.44 | 0. | 0. | 1. | 0.45 |
| 695. | 0. | 0. | 0.05 | 0. | 0. | 0.45 | 0. | 0. | 1. | 0.47 |
| 700. | 0. | 0. | 0.05 | 0. | 0. | 0.46 | 0. | 0. | 1. | 0.48 |
| 705. | 0. | 0. | 0.05 | 0. | 0. | 0.46 | 0. | 0. | 1. | 0.49 |
| 710. | 0. | 0. | 0.09 | 0. | 0. | 0.47 | 0. | 0. | 1. | 0.5 |
| 715. | 0. | 0. | 0.09 | 0. | 0. | 0.47 | 0. | 0. | 1. | 0.5 |
| 720. | 0. | 0. | 1. | 0. | 0. | 0.47 | 0. | 0. | 1. | 0.5 |
| 725. | 0. | 0. | 1. | 0. | 0. | 0.47 | 0. | 0. | 1. | 0.51 |
| 730. | 0. | 0. | 1. | 0. | 0. | 0.45 | 0. | 0. | 1. | 0.51 |
| 735. | 0. | 0. | 1. | 0. | 0. | 0.37 | 0. | 0. | 1. | 0.51 |

FIG. 74B-2

| | |
|---|---|
| Best-fit Munsell Reference Filter | 10G 3/2 |
| Wavelength Maxima | (447 536 639) |
| Transmittance at Maxima | (0.34 0.28 0.34) |
| Wavelength Minima | (476 583) |
| Transmittance at Minima | (0.03 0.01) |
| PGAI D-15 | 30.82 |
| $PGAI_{IW}$ D-15 | 34.01 |
| PGAI NWS | 51.74 |
| $PGAI_{IW}$ NWS | 41.44 |
| Luminous Transmittance of Daylight | 0.18 |
| Luminous Transmittance of Red Traffic Signal | 0.35 |
| Luminous Transmittance of Yellow Traffic Signal | 0.14 |
| Luminous Transmittance of Green Traffic Signal | 0.22 |
| Minimum Transmittance between 475-650nm | 0.04 |
| Solar Blue Light Transmittance | 0.2 |
| Ganglion Cell Transmittance | 0.2 |
| Luminous Transmittance of Primary Lights (R,G,B) | (0.21 0.33 0.3) |
| D65 Chromaticity Coordinate (x,y) | (0.307 0.355) |
| Yellow Traffic Signal Chromaticity Coordinate (x,y) | (0.626 0.373) |
| Green Traffic Signal Chromaticity Coordinate (x,y) | (0.185 0.503) |
| Passes ANSI Z80.3-2010 | True |

FIG. 75A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.2 | 0. | 0. | 1. | 1. |
| 395. | 0. | 0. | 0.02 | 0. | 0. | 0.24 | 0. | 0. | 1. | 0.91 |
| 400. | 0. | 0. | 0.05 | 0. | 0. | 0.27 | 0. | 0. | 1. | 0.83 |
| 405. | 0. | 0. | 0.05 | 0. | 0. | 0.29 | 0. | 0. | 1. | 0.75 |
| 410. | 0. | 0. | 0.05 | 0. | 0. | 0.32 | 0. | 0. | 1. | 0.66 |
| 415. | 0. | 0. | 0.05 | 0. | 0. | 0.35 | 0. | 0. | 1. | 0.55 |
| 420. | 0. | 0. | 0.05 | 0. | 0. | 0.37 | 0. | 0. | 1. | 0.43 |
| 425. | 0. | 0. | 0.06 | 0. | 0. | 0.38 | 0. | 0. | 1. | 0.3 |
| 430. | 0.01 | 0.06 | 0.2 | 0.15 | 0. | 0.37 | 0. | 0. | 1. | 0.19 |
| 435. | 0.11 | 0.25 | 0.44 | 0.62 | 0.35 | 0.41 | 0.14 | 0. | 1. | 0.11 |
| 440. | 0.33 | 0.42 | 0.49 | 0.99 | 1. | 0.42 | 0.42 | 0.04 | 1. | 0.07 |
| 445. | 0.4 | 0.43 | 0.5 | 1. | 1. | 0.43 | 0.43 | 0.04 | 1. | 0.08 |
| 450. | 0.37 | 0.43 | 0.5 | 1. | 1. | 0.43 | 0.43 | 0.04 | 1. | 0.12 |
| 455. | 0.17 | 0.32 | 0.48 | 0.72 | 1. | 0.44 | 0.44 | 0.04 | 1. | 0.19 |
| 460. | 0.05 | 0.11 | 0.28 | 0.25 | 0.35 | 0.44 | 0.16 | 0.04 | 1. | 0.26 |
| 465. | 0.03 | 0.04 | 0.11 | 0.09 | 0.08 | 0.45 | 0.04 | 0.04 | 1. | 0.33 |
| 470. | 0.03 | 0.04 | 0.08 | 0.08 | 0.08 | 0.44 | 0.04 | 0.04 | 1. | 0.38 |
| 475. | 0.03 | 0.04 | 0.08 | 0.08 | 0.08 | 0.44 | 0.04 | 0.04 | 1. | 0.42 |
| 480. | 0.03 | 0.04 | 0.08 | 0.08 | 0.08 | 0.45 | 0.04 | 0.04 | 1. | 0.43 |
| 485. | 0.03 | 0.04 | 0.08 | 0.08 | 0.08 | 0.45 | 0.04 | 0.04 | 1. | 0.41 |
| 490. | 0.03 | 0.04 | 0.08 | 0.08 | 0.08 | 0.45 | 0.04 | 0.04 | 1. | 0.37 |
| 495. | 0.03 | 0.04 | 0.08 | 0.08 | 0.08 | 0.45 | 0.04 | 0.04 | 1. | 0.32 |
| 500. | 0.03 | 0.04 | 0.08 | 0.08 | 0.08 | 0.45 | 0.04 | 0.04 | 1. | 0.24 |
| 505. | 0.04 | 0.06 | 0.18 | 0.13 | 0.08 | 0.44 | 0.04 | 0.04 | 1. | 0.16 |
| 510. | 0.09 | 0.21 | 0.37 | 0.51 | 0.14 | 0.4 | 0.06 | 0.04 | 1. | 0.09 |
| 515. | 0.27 | 0.34 | 0.39 | 0.94 | 1. | 0.38 | 0.38 | 0.04 | 1. | 0.03 |
| 520. | 0.26 | 0.28 | 0.36 | 1. | 1. | 0.26 | 0.26 | 0.04 | 1. | 0. |
| 525. | 0.28 | 0.33 | 0.4 | 1. | 1. | 0.34 | 0.34 | 0.04 | 1. | 0. |
| 530. | 0.32 | 0.34 | 0.41 | 1. | 1. | 0.34 | 0.34 | 0.04 | 1. | 0.03 |
| 535. | 0.33 | 0.38 | 0.47 | 1. | 1. | 0.38 | 0.38 | 0.04 | 1. | 0.09 |
| 540. | 0.38 | 0.43 | 0.5 | 1. | 1. | 0.43 | 0.43 | 0.04 | 1. | 0.15 |
| 545. | 0.33 | 0.42 | 0.5 | 0.95 | 1. | 0.44 | 0.44 | 0.04 | 1. | 0.22 |
| 550. | 0.14 | 0.27 | 0.44 | 0.61 | 1. | 0.45 | 0.45 | 0.04 | 1. | 0.28 |
| 555. | 0.04 | 0.09 | 0.24 | 0.2 | 0.12 | 0.46 | 0.06 | 0.04 | 1. | 0.33 |
| 560. | 0.04 | 0.04 | 0.1 | 0.09 | 0.08 | 0.46 | 0.04 | 0.04 | 1. | 0.37 |

FIG. 75B-1

| λ (nm) | $f_{MIN}$ | $f_T$ | $f_{MAX}$ | q'(λ) | q(λ) | p(λ) | f(λ) | $t_{MIN}$(λ) | $t_{MAX}$(λ) | c(λ) |
|---|---|---|---|---|---|---|---|---|---|---|
| 565. | 0.04 | 0.06 | 0.1 | 0.13 | 0.08 | 0.44 | 0.04 | 0.04 | 1. | 0.4 |
| 570. | 0.03 | 0.05 | 0.1 | 0.2 | 0.19 | 0.19 | 0.04 | 0.04 | 1. | 0.41 |
| 575. | 0.03 | 0.04 | 0.09 | 0.22 | 0.24 | 0.17 | 0.04 | 0.04 | 1. | 0.42 |
| 580. | 0.04 | 0.05 | 0.09 | 0.25 | 0.2 | 0.21 | 0.04 | 0.04 | 1. | 0.41 |
| 585. | 0.04 | 0.04 | 0.09 | 0.27 | 0.3 | 0.12 | 0.04 | 0.04 | 1. | 0.4 |
| 590. | 0.04 | 0.04 | 0.09 | 0.23 | 0.28 | 0.18 | 0.05 | 0.04 | 1. | 0.38 |
| 595. | 0.04 | 0.04 | 0.09 | 0.17 | 0.18 | 0.26 | 0.05 | 0.04 | 1. | 0.36 |
| 600. | 0.04 | 0.04 | 0.09 | 0.13 | 0.13 | 0.33 | 0.04 | 0.04 | 1. | 0.34 |
| 605. | 0.04 | 0.04 | 0.09 | 0.1 | 0.1 | 0.38 | 0.04 | 0.04 | 1. | 0.31 |
| 610. | 0.04 | 0.07 | 0.17 | 0.17 | 0.09 | 0.39 | 0.04 | 0.04 | 1. | 0.27 |
| 615. | 0.1 | 0.18 | 0.32 | 0.42 | 0.09 | 0.43 | 0.04 | 0.04 | 1. | 0.24 |
| 620. | 0.23 | 0.32 | 0.44 | 0.74 | 0.78 | 0.43 | 0.34 | 0.04 | 1. | 0.21 |
| 625. | 0.34 | 0.4 | 0.48 | 0.93 | 0.92 | 0.43 | 0.4 | 0.04 | 1. | 0.17 |
| 630. | 0.39 | 0.43 | 0.49 | 0.99 | 1. | 0.43 | 0.43 | 0.04 | 1. | 0.14 |
| 635. | 0.41 | 0.43 | 0.49 | 1. | 1. | 0.43 | 0.43 | 0.04 | 1. | 0.11 |
| 640. | 0.41 | 0.43 | 0.49 | 1. | 1. | 0.43 | 0.43 | 0.04 | 1. | 0.08 |
| 645. | 0.4 | 0.43 | 0.49 | 1. | 1. | 0.42 | 0.42 | 0.04 | 1. | 0.06 |
| 650. | 0.4 | 0.42 | 0.49 | 1. | 1. | 0.42 | 0.42 | 0.04 | 1. | 0.04 |
| 655. | 0.38 | 0.42 | 0.48 | 0.99 | 1. | 0.42 | 0.42 | 0.04 | 1. | 0.02 |
| 660. | 0.3 | 0.38 | 0.47 | 0.88 | 1. | 0.43 | 0.43 | 0. | 1. | 0.01 |
| 665. | 0.17 | 0.27 | 0.4 | 0.6 | 1. | 0.44 | 0.44 | 0. | 1. | 0. |
| 670. | 0.06 | 0.12 | 0.26 | 0.27 | 0.23 | 0.45 | 0.1 | 0. | 1. | 0. |
| 675. | 0.01 | 0.03 | 0.12 | 0.07 | 0. | 0.46 | 0. | 0. | 1. | 0. |
| 680. | 0. | 0. | 0.05 | 0.01 | 0. | 0.46 | 0. | 0. | 1. | 0.01 |
| 685. | 0. | 0. | 0.05 | 0. | 0. | 0.46 | 0. | 0. | 1. | 0.02 |
| 690. | 0. | 0. | 0.05 | 0. | 0. | 0.48 | 0. | 0. | 1. | 0.04 |
| 695. | 0. | 0. | 0.05 | 0. | 0. | 0.49 | 0. | 0. | 1. | 0.05 |
| 700. | 0. | 0. | 0.05 | 0. | 0. | 0.51 | 0. | 0. | 1. | 0.07 |
| 705. | 0. | 0. | 0.05 | 0. | 0. | 0.51 | 0. | 0. | 1. | 0.1 |
| 710. | 0. | 0. | 0.09 | 0. | 0. | 0.51 | 0. | 0. | 1. | 0.12 |
| 715. | 0. | 0. | 0.09 | 0. | 0. | 0.52 | 0. | 0. | 1. | 0.15 |
| 720. | 0. | 0. | 1. | 0. | 0. | 0.52 | 0. | 0. | 1. | 0.17 |
| 725. | 0. | 0. | 1. | 0. | 0. | 0.51 | 0. | 0. | 1. | 0.2 |
| 730. | 0. | 0. | 1. | 0. | 0. | 0.5 | 0. | 0. | 1. | 0.23 |
| 735. | 0. | 0. | 1. | 0. | 0. | 0.4 | 0. | 0. | 1. | 0.25 |

FIG. 75B-2

| | |
|---|---|
| Best-fit Munsell Reference Filter | 10G 3/2 |
| Wavelength Maxima | (443 536 637) |
| Transmittance at Maxima | (0.33 0.28 0.31) |
| Wavelength Minima | (476 581) |
| Transmittance at Minima | (0.01 0.01) |
| PGAI D-15 | 31.76 |
| $PGAI_{IW}$ D-15 | 35.69 |
| PGAI NWS | 55.63 |
| $PGAI_{IW}$ NWS | 43.13 |
| Luminous Transmittance of Daylight | 0.18 |
| Luminous Transmittance of Red Traffic Signal | 0.34 |
| Luminous Transmittance of Yellow Traffic Signal | 0.14 |
| Luminous Transmittance of Green Traffic Signal | 0.22 |
| Minimum Transmittance between 475-650nm | 0.01 |
| Solar Blue Light Transmittance | 0.21 |
| Ganglion Cell Transmittance | 0.19 |
| Luminous Transmittance of Primary Lights (R,G,B) | (0.22 0.33 0.28) |
| D65 Chromaticity Coordinate (x,y) | (0.307 0.356) |
| Yellow Traffic Signal Chromaticity Coordinate (x,y) | (0.627 0.372) |
| Green Traffic Signal Chromaticity Coordinate (x,y) | (0.185 0.517) |
| Passes ANSI Z80.3-2010 | False |

FIG. 76A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.2 | 0. | 0. | 1. | 1. |
| 395. | 0. | 0. | 0.02 | 0. | 0. | 0.24 | 0. | 0. | 1. | 0.91 |
| 400. | 0. | 0. | 0.05 | 0. | 0. | 0.27 | 0. | 0. | 1. | 0.82 |
| 405. | 0. | 0. | 0.05 | 0. | 0. | 0.29 | 0. | 0. | 1. | 0.72 |
| 410. | 0. | 0. | 0.05 | 0. | 0. | 0.32 | 0. | 0. | 1. | 0.61 |
| 415. | 0. | 0. | 0.05 | 0. | 0. | 0.35 | 0. | 0. | 1. | 0.48 |
| 420. | 0. | 0. | 0.05 | 0. | 0. | 0.37 | 0. | 0. | 1. | 0.35 |
| 425. | 0. | 0.04 | 0.17 | 0.1 | 0. | 0.38 | 0. | 0. | 1. | 0.24 |
| 430. | 0.08 | 0.21 | 0.42 | 0.56 | 0.25 | 0.37 | 0.09 | 0. | 1. | 0.15 |
| 435. | 0.3 | 0.4 | 0.48 | 0.99 | 1. | 0.41 | 0.41 | 0. | 1. | 0.11 |
| 440. | 0.39 | 0.42 | 0.49 | 1. | 1. | 0.42 | 0.42 | 0. | 1. | 0.12 |
| 445. | 0.38 | 0.43 | 0.49 | 1. | 1. | 0.43 | 0.43 | 0. | 1. | 0.16 |
| 450. | 0.25 | 0.35 | 0.48 | 0.81 | 1. | 0.43 | 0.43 | 0.01 | 1. | 0.22 |
| 455. | 0.13 | 0.21 | 0.35 | 0.47 | 0.56 | 0.44 | 0.25 | 0.01 | 1. | 0.3 |
| 460. | 0.03 | 0.09 | 0.21 | 0.2 | 0.32 | 0.44 | 0.14 | 0.01 | 1. | 0.36 |
| 465. | 0.01 | 0.01 | 0.09 | 0.03 | 0.02 | 0.45 | 0.01 | 0.01 | 1. | 0.42 |
| 470. | 0.01 | 0.01 | 0.05 | 0.02 | 0.02 | 0.44 | 0.01 | 0.01 | 1. | 0.45 |
| 475. | 0.01 | 0.01 | 0.05 | 0.02 | 0.02 | 0.44 | 0.01 | 0.01 | 1. | 0.47 |
| 480. | 0.01 | 0.01 | 0.05 | 0.02 | 0.02 | 0.45 | 0.01 | 0.01 | 1. | 0.47 |
| 485. | 0.01 | 0.01 | 0.05 | 0.02 | 0.02 | 0.45 | 0.01 | 0.01 | 1. | 0.46 |
| 490. | 0.01 | 0.01 | 0.05 | 0.02 | 0.02 | 0.45 | 0.01 | 0.01 | 1. | 0.42 |
| 495. | 0.01 | 0.01 | 0.05 | 0.02 | 0.02 | 0.45 | 0.01 | 0.01 | 1. | 0.36 |
| 500. | 0.01 | 0.01 | 0.09 | 0.03 | 0.02 | 0.45 | 0.01 | 0.01 | 1. | 0.29 |
| 505. | 0.03 | 0.09 | 0.24 | 0.2 | 0.02 | 0.44 | 0.01 | 0.01 | 1. | 0.21 |
| 510. | 0.15 | 0.26 | 0.4 | 0.64 | 0.41 | 0.4 | 0.17 | 0.01 | 1. | 0.14 |
| 515. | 0.28 | 0.34 | 0.41 | 0.96 | 1. | 0.38 | 0.38 | 0.01 | 1. | 0.08 |
| 520. | 0.26 | 0.28 | 0.36 | 1. | 1. | 0.26 | 0.26 | 0.01 | 1. | 0.04 |
| 525. | 0.28 | 0.33 | 0.4 | 1. | 1. | 0.34 | 0.34 | 0.01 | 1. | 0.03 |
| 530. | 0.32 | 0.34 | 0.41 | 1. | 1. | 0.34 | 0.34 | 0.01 | 1. | 0.04 |
| 535. | 0.33 | 0.38 | 0.47 | 1. | 1. | 0.38 | 0.38 | 0.01 | 1. | 0.08 |
| 540. | 0.38 | 0.43 | 0.5 | 1. | 1. | 0.43 | 0.43 | 0.01 | 1. | 0.14 |
| 545. | 0.36 | 0.43 | 0.5 | 0.97 | 1. | 0.44 | 0.44 | 0.01 | 1. | 0.21 |
| 550. | 0.2 | 0.32 | 0.46 | 0.71 | 1. | 0.45 | 0.45 | 0.01 | 1. | 0.27 |
| 555. | 0.05 | 0.13 | 0.3 | 0.29 | 0.39 | 0.46 | 0.18 | 0.01 | 1. | 0.32 |
| 560. | 0.01 | 0.03 | 0.12 | 0.06 | 0.02 | 0.46 | 0.01 | 0.01 | 1. | 0.36 |

FIG. 76B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.01 | 0.01 | 0.06 | 0.03 | 0.02 | 0.44 | 0.01 | 0.01 | 1. | 0.39 |
| 570. | 0.01 | 0.01 | 0.06 | 0.05 | 0.05 | 0.19 | 0.01 | 0.01 | 1. | 0.41 |
| 575. | 0.01 | 0.01 | 0.06 | 0.07 | 0.06 | 0.17 | 0.01 | 0.01 | 1. | 0.42 |
| 580. | 0.02 | 0.03 | 0.08 | 0.16 | 0.05 | 0.21 | 0.01 | 0.01 | 1. | 0.41 |
| 585. | 0.03 | 0.04 | 0.08 | 0.25 | 0.3 | 0.12 | 0.04 | 0.04 | 1. | 0.4 |
| 590. | 0.04 | 0.04 | 0.09 | 0.24 | 0.28 | 0.18 | 0.05 | 0.04 | 1. | 0.38 |
| 595. | 0.04 | 0.05 | 0.09 | 0.18 | 0.18 | 0.26 | 0.05 | 0.04 | 1. | 0.36 |
| 600. | 0.04 | 0.05 | 0.09 | 0.14 | 0.17 | 0.33 | 0.05 | 0.04 | 1. | 0.33 |
| 605. | 0.04 | 0.04 | 0.09 | 0.11 | 0.1 | 0.38 | 0.04 | 0.04 | 1. | 0.3 |
| 610. | 0.04 | 0.08 | 0.2 | 0.19 | 0.1 | 0.39 | 0.04 | 0.04 | 1. | 0.27 |
| 615. | 0.11 | 0.21 | 0.37 | 0.51 | 0.09 | 0.43 | 0.04 | 0.04 | 1. | 0.24 |
| 620. | 0.27 | 0.37 | 0.48 | 0.85 | 1. | 0.43 | 0.43 | 0.04 | 1. | 0.2 |
| 625. | 0.38 | 0.43 | 0.49 | 0.99 | 1. | 0.43 | 0.43 | 0.04 | 1. | 0.17 |
| 630. | 0.38 | 0.42 | 0.49 | 0.96 | 1. | 0.43 | 0.43 | 0.04 | 1. | 0.14 |
| 635. | 0.37 | 0.39 | 0.47 | 0.91 | 0.98 | 0.43 | 0.42 | 0.04 | 1. | 0.11 |
| 640. | 0.37 | 0.39 | 0.46 | 0.91 | 0.75 | 0.43 | 0.33 | 0.04 | 1. | 0.09 |
| 645. | 0.38 | 0.41 | 0.48 | 0.96 | 1. | 0.42 | 0.42 | 0.04 | 1. | 0.06 |
| 650. | 0.39 | 0.42 | 0.48 | 0.99 | 1. | 0.42 | 0.42 | 0. | 1. | 0.05 |
| 655. | 0.35 | 0.4 | 0.48 | 0.95 | 1. | 0.42 | 0.42 | 0. | 1. | 0.04 |
| 660. | 0.23 | 0.32 | 0.44 | 0.75 | 1. | 0.43 | 0.43 | 0. | 1. | 0.03 |
| 665. | 0.1 | 0.19 | 0.33 | 0.42 | 0.68 | 0.44 | 0.3 | 0. | 1. | 0.02 |
| 670. | 0.02 | 0.06 | 0.18 | 0.14 | 0. | 0.45 | 0. | 0. | 1. | 0.03 |
| 675. | 0. | 0.01 | 0.07 | 0.02 | 0. | 0.46 | 0. | 0. | 1. | 0.03 |
| 680. | 0. | 0. | 0.05 | 0. | 0. | 0.46 | 0. | 0. | 1. | 0.04 |
| 685. | 0. | 0. | 0.05 | 0. | 0. | 0.46 | 0. | 0. | 1. | 0.06 |
| 690. | 0. | 0. | 0.05 | 0. | 0. | 0.48 | 0. | 0. | 1. | 0.07 |
| 695. | 0. | 0. | 0.05 | 0. | 0. | 0.49 | 0. | 0. | 1. | 0.09 |
| 700. | 0. | 0. | 0.05 | 0. | 0. | 0.51 | 0. | 0. | 1. | 0.12 |
| 705. | 0. | 0. | 0.05 | 0. | 0. | 0.51 | 0. | 0. | 1. | 0.14 |
| 710. | 0. | 0. | 0.09 | 0. | 0. | 0.51 | 0. | 0. | 1. | 0.16 |
| 715. | 0. | 0. | 0.09 | 0. | 0. | 0.52 | 0. | 0. | 1. | 0.19 |
| 720. | 0. | 0. | 1. | 0. | 0. | 0.52 | 0. | 0. | 1. | 0.22 |
| 725. | 0. | 0. | 1. | 0. | 0. | 0.51 | 0. | 0. | 1. | 0.24 |
| 730. | 0. | 0. | 1. | 0. | 0. | 0.5 | 0. | 0. | 1. | 0.27 |
| 735. | 0. | 0. | 1. | 0. | 0. | 0.4 | 0. | 0. | 1. | 0.29 |

FIG. 76B-2

| | |
|---|---|
| Best-fit Munsell Reference Filter | 5R 7/1 |
| Wavelength Maxima | (446 530 627) |
| Transmittance at Maxima | (0.34 0.21 0.34) |
| Wavelength Minima | (473 569) |
| Transmittance at Minima | (0.03 0.02) |
| PGAI D-15 | 38.23 |
| $PGAI_{IW}$ D-15 | 24.77 |
| PGAI NWS | 40.3 |
| $PGAI_{IW}$ NWS | 19.51 |
| Luminous Transmittance of Daylight | 0.19 |
| Luminous Transmittance of Red Traffic Signal | 0.35 |
| Luminous Transmittance of Yellow Traffic Signal | 0.18 |
| Luminous Transmittance of Green Traffic Signal | 0.2 |
| Minimum Transmittance between 475-650nm | 0.04 |
| Solar Blue Light Transmittance | 0.21 |
| Ganglion Cell Transmittance | 0.21 |
| Luminous Transmittance of Primary Lights (R,G,B) | (0.4 0.29 0.3) |
| D65 Chromaticity Coordinate (x,y) | (0.346 0.338) |
| Yellow Traffic Signal Chromaticity Coordinate (x,y) | (0.648 0.351) |
| Green Traffic Signal Chromaticity Coordinate (x,y) | (0.173 0.487) |
| Passes ANSI Z80.3-2010 | True |

FIG. 77A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.2 | 0. | 0. | 1. | 0.28 |
| 395. | 0. | 0. | 0.02 | 0. | 0. | 0.24 | 0. | 0. | 1. | 0.23 |
| 400. | 0. | 0. | 0.05 | 0. | 0. | 0.27 | 0. | 0. | 1. | 0.14 |
| 405. | 0. | 0. | 0.05 | 0. | 0. | 0.29 | 0. | 0. | 1. | 0.06 |
| 410. | 0. | 0. | 0.05 | 0. | 0. | 0.32 | 0. | 0. | 1. | 0.02 |
| 415. | 0. | 0. | 0.05 | 0. | 0. | 0.35 | 0. | 0. | 1. | 0. |
| 420. | 0. | 0. | 0.05 | 0. | 0. | 0.37 | 0. | 0. | 1. | 0. |
| 425. | 0. | 0.05 | 0.15 | 0.12 | 0. | 0.38 | 0. | 0. | 1. | 0. |
| 430. | 0.08 | 0.13 | 0.25 | 0.35 | 0.3 | 0.37 | 0.11 | 0. | 1. | 0. |
| 435. | 0.16 | 0.27 | 0.44 | 0.67 | 0.43 | 0.41 | 0.18 | 0. | 1. | 0. |
| 440. | 0.33 | 0.42 | 0.49 | 0.99 | 1. | 0.42 | 0.42 | 0.04 | 1. | 0.01 |
| 445. | 0.4 | 0.43 | 0.49 | 1. | 1. | 0.43 | 0.43 | 0.04 | 1. | 0.03 |
| 450. | 0.34 | 0.42 | 0.49 | 0.97 | 1. | 0.43 | 0.43 | 0.04 | 1. | 0.08 |
| 455. | 0.09 | 0.25 | 0.45 | 0.58 | 0.94 | 0.44 | 0.42 | 0.04 | 1. | 0.17 |
| 460. | 0.03 | 0.05 | 0.19 | 0.1 | 0.08 | 0.44 | 0.04 | 0.04 | 1. | 0.31 |
| 465. | 0.03 | 0.04 | 0.08 | 0.08 | 0.08 | 0.45 | 0.04 | 0.04 | 1. | 0.46 |
| 470. | 0.03 | 0.04 | 0.08 | 0.08 | 0.08 | 0.44 | 0.04 | 0.04 | 1. | 0.58 |
| 475. | 0.03 | 0.04 | 0.08 | 0.08 | 0.08 | 0.44 | 0.04 | 0.04 | 1. | 0.63 |
| 480. | 0.03 | 0.04 | 0.08 | 0.08 | 0.08 | 0.45 | 0.04 | 0.04 | 1. | 0.59 |
| 485. | 0.03 | 0.04 | 0.08 | 0.08 | 0.08 | 0.45 | 0.04 | 0.04 | 1. | 0.47 |
| 490. | 0.03 | 0.04 | 0.08 | 0.08 | 0.08 | 0.45 | 0.04 | 0.04 | 1. | 0.34 |
| 495. | 0.03 | 0.04 | 0.08 | 0.08 | 0.08 | 0.45 | 0.04 | 0.04 | 1. | 0.21 |
| 500. | 0.03 | 0.04 | 0.16 | 0.1 | 0.08 | 0.45 | 0.04 | 0.04 | 1. | 0.12 |
| 505. | 0.08 | 0.21 | 0.39 | 0.48 | 0.08 | 0.44 | 0.04 | 0.04 | 1. | 0.06 |
| 510. | 0.28 | 0.38 | 0.44 | 0.93 | 1. | 0.4 | 0.4 | 0.04 | 1. | 0.03 |
| 515. | 0.24 | 0.33 | 0.44 | 0.91 | 1. | 0.38 | 0.38 | 0.04 | 1. | 0.02 |
| 520. | 0.24 | 0.25 | 0.35 | 0.9 | 0.79 | 0.26 | 0.21 | 0.04 | 1. | 0.01 |
| 525. | 0.26 | 0.32 | 0.4 | 0.98 | 1. | 0.34 | 0.34 | 0.04 | 1. | 0.02 |
| 530. | 0.32 | 0.34 | 0.41 | 1. | 1. | 0.34 | 0.34 | 0.04 | 1. | 0.03 |
| 535. | 0.33 | 0.37 | 0.44 | 0.99 | 1. | 0.38 | 0.38 | 0.04 | 1. | 0.06 |
| 540. | 0.26 | 0.36 | 0.44 | 0.84 | 1. | 0.43 | 0.43 | 0.04 | 1. | 0.12 |
| 545. | 0.1 | 0.2 | 0.36 | 0.46 | 0.71 | 0.44 | 0.31 | 0.04 | 1. | 0.22 |
| 550. | 0.04 | 0.07 | 0.18 | 0.14 | 0.08 | 0.45 | 0.04 | 0.04 | 1. | 0.37 |
| 555. | 0.03 | 0.04 | 0.09 | 0.08 | 0.08 | 0.46 | 0.04 | 0.04 | 1. | 0.55 |
| 560. | 0.03 | 0.04 | 0.09 | 0.09 | 0.08 | 0.46 | 0.04 | 0.04 | 1. | 0.74 |

FIG. 77B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.04 | 0.06 | 0.1 | 0.13 | 0.08 | 0.44 | 0.04 | 0.04 | 1. | 0.9 |
| 570. | 0.03 | 0.05 | 0.1 | 0.2 | 0.19 | 0.19 | 0.04 | 0.04 | 1. | 0.99 |
| 575. | 0.03 | 0.04 | 0.09 | 0.22 | 0.24 | 0.17 | 0.04 | 0.04 | 1. | 0.99 |
| 580. | 0.04 | 0.05 | 0.09 | 0.25 | 0.2 | 0.21 | 0.04 | 0.04 | 1. | 0.91 |
| 585. | 0.04 | 0.04 | 0.09 | 0.27 | 0.3 | 0.12 | 0.04 | 0.04 | 1. | 0.77 |
| 590. | 0.04 | 0.05 | 0.1 | 0.25 | 0.28 | 0.18 | 0.05 | 0.04 | 1. | 0.59 |
| 595. | 0.05 | 0.08 | 0.19 | 0.31 | 0.18 | 0.26 | 0.05 | 0.04 | 1. | 0.43 |
| 600. | 0.11 | 0.2 | 0.34 | 0.6 | 0.28 | 0.33 | 0.09 | 0.04 | 1. | 0.29 |
| 605. | 0.24 | 0.33 | 0.44 | 0.89 | 1. | 0.38 | 0.38 | 0.04 | 1. | 0.18 |
| 610. | 0.35 | 0.4 | 0.48 | 1. | 1. | 0.39 | 0.39 | 0.04 | 1. | 0.1 |
| 615. | 0.39 | 0.42 | 0.49 | 1. | 1. | 0.43 | 0.43 | 0.04 | 1. | 0.06 |
| 620. | 0.41 | 0.43 | 0.5 | 1. | 1. | 0.43 | 0.43 | 0.04 | 1. | 0.03 |
| 625. | 0.41 | 0.43 | 0.5 | 1. | 1. | 0.43 | 0.43 | 0.04 | 1. | 0.01 |
| 630. | 0.41 | 0.43 | 0.49 | 1. | 1. | 0.43 | 0.43 | 0.04 | 1. | 0.01 |
| 635. | 0.41 | 0.43 | 0.49 | 1. | 1. | 0.43 | 0.43 | 0.04 | 1. | 0. |
| 640. | 0.4 | 0.43 | 0.49 | 1. | 1. | 0.43 | 0.43 | 0.04 | 1. | 0. |
| 645. | 0.38 | 0.42 | 0.49 | 0.98 | 1. | 0.42 | 0.42 | 0.04 | 1. | 0. |
| 650. | 0.31 | 0.38 | 0.47 | 0.89 | 1. | 0.42 | 0.42 | 0.04 | 1. | 0. |
| 655. | 0.2 | 0.29 | 0.41 | 0.68 | 0.84 | 0.42 | 0.36 | 0.04 | 1. | 0. |
| 660. | 0.09 | 0.16 | 0.29 | 0.38 | 0.61 | 0.43 | 0.26 | 0. | 1. | 0. |
| 665. | 0.02 | 0.06 | 0.16 | 0.13 | 0. | 0.44 | 0. | 0. | 1. | 0. |
| 670. | 0. | 0.01 | 0.07 | 0.01 | 0. | 0.45 | 0. | 0. | 1. | 0. |
| 675. | 0. | 0. | 0.05 | 0. | 0. | 0.46 | 0. | 0. | 1. | 0. |
| 680. | 0. | 0. | 0.05 | 0. | 0. | 0.46 | 0. | 0. | 1. | 0. |
| 685. | 0. | 0. | 0.05 | 0. | 0. | 0.46 | 0. | 0. | 1. | 0. |
| 690. | 0. | 0. | 0.05 | 0. | 0. | 0.48 | 0. | 0. | 1. | 0.01 |
| 695. | 0. | 0. | 0.05 | 0. | 0. | 0.49 | 0. | 0. | 1. | 0.01 |
| 700. | 0. | 0. | 0.05 | 0. | 0. | 0.51 | 0. | 0. | 1. | 0.01 |
| 705. | 0. | 0. | 0.05 | 0. | 0. | 0.51 | 0. | 0. | 1. | 0.02 |
| 710. | 0. | 0. | 0.09 | 0. | 0. | 0.51 | 0. | 0. | 1. | 0.02 |
| 715. | 0. | 0. | 0.09 | 0. | 0. | 0.52 | 0. | 0. | 1. | 0.03 |
| 720. | 0. | 0. | 1. | 0. | 0. | 0.52 | 0. | 0. | 1. | 0.03 |
| 725. | 0. | 0. | 1. | 0. | 0. | 0.51 | 0. | 0. | 1. | 0.04 |
| 730. | 0. | 0. | 1. | 0. | 0. | 0.5 | 0. | 0. | 1. | 0.05 |
| 735. | 0. | 0. | 1. | 0. | 0. | 0.4 | 0. | 0. | 1. | 0.06 |

FIG. 77B-2

| | |
|---|---|
| Best-fit Munsell Reference Filter | 10BG 3/4 |
| Wavelength Maxima | (489 579 627) |
| Transmittance at Maxima | (0.55 0.42 0.43) |
| Wavelength Minima | (560 612) |
| Transmittance at Minima | (0.06 0.08) |
| PGAI D-15 | -4.56 |
| $PGAI_{IW}$ D-15 | -14.21 |
| PGAI NWS | -10.94 |
| $PGAI_{IW}$ NWS | -20.1 |
| Luminous Transmittance of Daylight | 0.25 |
| Luminous Transmittance of Red Traffic Signal | 0.23 |
| Luminous Transmittance of Yellow Traffic Signal | 0.2 |
| Luminous Transmittance of Green Traffic Signal | 0.28 |
| Minimum Transmittance between 475-650nm | 0.05 |
| Solar Blue Light Transmittance | 0.28 |
| Ganglion Cell Transmittance | 0.46 |
| Luminous Transmittance of Primary Lights (R,G,B) | (0.18 0.22 0.45) |
| D65 Chromaticity Coordinate (x,y) | (0.255 0.309) |
| Yellow Traffic Signal Chromaticity Coordinate (x,y) | (0.591 0.408) |
| Green Traffic Signal Chromaticity Coordinate (x,y) | (0.145 0.368) |
| Passes ANSI Z80.3-2010 | True |

FIG. 78A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.55 | 0. | 0. | 0. | 1. |
| 395. | 0. | 0. | 0.02 | 0. | 0. | 0.55 | 0. | 0. | 0. | 0.99 |
| 400. | 0. | 0. | 0.05 | 0. | 0. | 0.55 | 0. | 0. | 0. | 0.99 |
| 405. | 0. | 0. | 0.05 | 0. | 0. | 0.55 | 0. | 0. | 0. | 0.97 |
| 410. | 0. | 0. | 0.05 | 0. | 0. | 0.55 | 0. | 0. | 1. | 0.94 |
| 415. | 0. | 0. | 0.05 | 0. | 0. | 0.55 | 0. | 0. | 1. | 0.9 |
| 420. | 0. | 0. | 0.05 | 0. | 0. | 0.55 | 0. | 0. | 1. | 0.84 |
| 425. | 0. | 0. | 0.05 | 0. | 0. | 0.55 | 0. | 0. | 1. | 0.77 |
| 430. | 0. | 0. | 0.05 | 0. | 0. | 0.55 | 0. | 0. | 1. | 0.67 |
| 435. | 0. | 0.02 | 0.12 | 0.04 | 0. | 0.55 | 0. | 0. | 1. | 0.57 |
| 440. | 0.05 | 0.14 | 0.32 | 0.25 | 0.09 | 0.55 | 0.05 | 0.05 | 1. | 0.46 |
| 445. | 0.21 | 0.38 | 0.57 | 0.68 | 0.46 | 0.55 | 0.25 | 0.05 | 1. | 0.36 |
| 450. | 0.45 | 0.54 | 0.62 | 0.99 | 1. | 0.55 | 0.55 | 0.05 | 1. | 0.27 |
| 455. | 0.52 | 0.55 | 0.62 | 1. | 1. | 0.55 | 0.55 | 0.05 | 1. | 0.2 |
| 460. | 0.52 | 0.55 | 0.62 | 1. | 1. | 0.55 | 0.55 | 0.05 | 1. | 0.13 |
| 465. | 0.52 | 0.55 | 0.62 | 1. | 1. | 0.55 | 0.55 | 0.05 | 1. | 0.06 |
| 470. | 0.52 | 0.55 | 0.62 | 1. | 1. | 0.55 | 0.55 | 0.05 | 1. | 0.02 |
| 475. | 0.52 | 0.55 | 0.62 | 1. | 1. | 0.55 | 0.55 | 0.05 | 1. | 0. |
| 480. | 0.52 | 0.55 | 0.62 | 1. | 1. | 0.55 | 0.55 | 0.05 | 1. | 0.01 |
| 485. | 0.52 | 0.55 | 0.62 | 1. | 1. | 0.55 | 0.55 | 0.05 | 1. | 0.05 |
| 490. | 0.52 | 0.55 | 0.62 | 1. | 1. | 0.55 | 0.55 | 0.05 | 1. | 0.1 |
| 495. | 0.52 | 0.55 | 0.62 | 1. | 1. | 0.55 | 0.55 | 0.05 | 1. | 0.18 |
| 500. | 0.52 | 0.55 | 0.62 | 1. | 1. | 0.55 | 0.55 | 0.05 | 1. | 0.26 |
| 505. | 0.52 | 0.55 | 0.62 | 1. | 1. | 0.55 | 0.55 | 0.05 | 1. | 0.35 |
| 510. | 0.52 | 0.55 | 0.62 | 1. | 1. | 0.55 | 0.55 | 0.05 | 1. | 0.45 |
| 515. | 0.52 | 0.55 | 0.62 | 1. | 1. | 0.55 | 0.55 | 0.05 | 1. | 0.55 |
| 520. | 0.47 | 0.54 | 0.62 | 0.98 | 1. | 0.55 | 0.55 | 0.05 | 1. | 0.65 |
| 525. | 0.29 | 0.43 | 0.58 | 0.77 | 1. | 0.55 | 0.55 | 0.05 | 1. | 0.74 |
| 530. | 0.12 | 0.22 | 0.4 | 0.4 | 0.52 | 0.55 | 0.29 | 0.05 | 1. | 0.81 |
| 535. | 0.06 | 0.09 | 0.2 | 0.16 | 0.15 | 0.55 | 0.08 | 0.05 | 1. | 0.87 |
| 540. | 0.05 | 0.05 | 0.11 | 0.1 | 0.09 | 0.55 | 0.05 | 0.05 | 1. | 0.91 |
| 545. | 0.05 | 0.05 | 0.09 | 0.09 | 0.09 | 0.55 | 0.05 | 0.05 | 1. | 0.94 |
| 550. | 0.05 | 0.05 | 0.09 | 0.09 | 0.09 | 0.55 | 0.05 | 0.05 | 1. | 0.96 |
| 555. | 0.05 | 0.05 | 0.09 | 0.09 | 0.09 | 0.55 | 0.05 | 0.05 | 1. | 0.98 |
| 560. | 0.05 | 0.05 | 0.1 | 0.09 | 0.09 | 0.55 | 0.05 | 0.05 | 1. | 0.98 |

FIG. 78B-1

| λ (nm) | $f_{MIN}$ | $f_T$ | $f_{MAX}$ | q′(λ) | q(λ) | p(λ) | f(λ) | $t_{MIN}(λ)$ | $t_{MAX}(λ)$ | c(λ) |
|---|---|---|---|---|---|---|---|---|---|---|
| 565. | 0.05 | 0.08 | 0.2 | 0.14 | 0.09 | 0.55 | 0.05 | 0.05 | 1. | 0.99 |
| 570. | 0.12 | 0.23 | 0.39 | 0.41 | 0.09 | 0.55 | 0.05 | 0.05 | 1. | 0.99 |
| 575. | 0.28 | 0.38 | 0.49 | 0.7 | 0.82 | 0.55 | 0.45 | 0.05 | 1. | 1. |
| 580. | 0.4 | 0.44 | 0.52 | 0.8 | 0.73 | 0.55 | 0.4 | 0.05 | 1. | 1. |
| 585. | 0.35 | 0.44 | 0.52 | 0.8 | 0.85 | 0.55 | 0.47 | 0.05 | 1. | 1. |
| 590. | 0.17 | 0.3 | 0.46 | 0.54 | 0.94 | 0.55 | 0.52 | 0.05 | 1. | 1. |
| 595. | 0.06 | 0.11 | 0.27 | 0.21 | 0.09 | 0.55 | 0.05 | 0.05 | 1. | 1. |
| 600. | 0.05 | 0.05 | 0.12 | 0.09 | 0.09 | 0.55 | 0.05 | 0.05 | 1. | 1. |
| 605. | 0.05 | 0.05 | 0.09 | 0.09 | 0.09 | 0.55 | 0.05 | 0.05 | 1. | 1. |
| 610. | 0.05 | 0.05 | 0.11 | 0.09 | 0.09 | 0.55 | 0.05 | 0.05 | 1. | 1. |
| 615. | 0.05 | 0.09 | 0.22 | 0.17 | 0.09 | 0.55 | 0.05 | 0.05 | 1. | 1. |
| 620. | 0.13 | 0.24 | 0.42 | 0.44 | 0.09 | 0.55 | 0.05 | 0.05 | 1. | 1. |
| 625. | 0.3 | 0.43 | 0.56 | 0.78 | 0.81 | 0.55 | 0.45 | 0.05 | 1. | 1. |
| 630. | 0.45 | 0.51 | 0.57 | 0.92 | 1. | 0.55 | 0.55 | 0.05 | 1. | 1. |
| 635. | 0.32 | 0.43 | 0.56 | 0.78 | 1. | 0.55 | 0.55 | 0.05 | 1. | 1. |
| 640. | 0.15 | 0.26 | 0.43 | 0.47 | 0.72 | 0.55 | 0.4 | 0.05 | 1. | 1. |
| 645. | 0.06 | 0.11 | 0.24 | 0.2 | 0.09 | 0.55 | 0.05 | 0.05 | 1. | 1. |
| 650. | 0.04 | 0.05 | 0.12 | 0.1 | 0.09 | 0.55 | 0.05 | 0.05 | 1. | 1. |
| 655. | 0.03 | 0.04 | 0.09 | 0.08 | 0.09 | 0.55 | 0.05 | 0.05 | 1. | 1. |
| 660. | 0.02 | 0.03 | 0.08 | 0.05 | 0.09 | 0.55 | 0.05 | 0. | 1. | 1. |
| 665. | 0. | 0.01 | 0.06 | 0.02 | 0. | 0.55 | 0. | 0. | 1. | 1. |
| 670. | 0. | 0. | 0.05 | 0. | 0. | 0.55 | 0. | 0. | 1. | 1. |
| 675. | 0. | 0. | 0.05 | 0. | 0. | 0.55 | 0. | 0. | 1. | 1. |
| 680. | 0. | 0. | 0.05 | 0. | 0. | 0.55 | 0. | 0. | 1. | 1. |
| 685. | 0. | 0. | 0.05 | 0. | 0. | 0.55 | 0. | 0. | 1. | 1. |
| 690. | 0. | 0. | 0.05 | 0. | 0. | 0.55 | 0. | 0. | 1. | 1. |
| 695. | 0. | 0. | 0.05 | 0. | 0. | 0.55 | 0. | 0. | 1. | 1. |
| 700. | 0. | 0. | 0.05 | 0. | 0. | 0.55 | 0. | 0. | 1. | 1. |
| 705. | 0. | 0. | 0.05 | 0. | 0. | 0.55 | 0. | 0. | 1. | 1. |
| 710. | 0. | 0. | 0.09 | 0. | 0. | 0.55 | 0. | 0. | 1. | 1. |
| 715. | 0. | 0. | 0.09 | 0. | 0. | 0.55 | 0. | 0. | 1. | 1. |
| 720. | 0. | 0. | 1. | 0. | 0. | 0.55 | 0. | 0. | 1. | 1. |
| 725. | 0. | 0. | 1. | 0. | 0. | 0.55 | 0. | 0. | 1. | 1. |
| 730. | 0. | 0. | 1. | 0. | 0. | 0.55 | 0. | 0. | 1. | 1. |
| 735. | 0. | 0. | 1. | 0. | 0. | 0.55 | 0. | 0. | 1. | 1. |

FIG. 78B-2

| | |
|---|---|
| Best-fit Munsell Reference Filter | 5B 6/6 |
| Wavelength Maxima | (430 498 557 633 798) |
| Transmittance at Maxima | (0.55 0.52 0.51 0.42 0.55) |
| Wavelength Minima | (467 538 608 689) |
| Transmittance at Minima | (0.05 0.07 0.05 0.) |
| PGAI D-15 | -11.02 |
| $PGAI_{IW}$ D-15 | -1.62 |
| PGAI NWS | -2.9 |
| $PGAI_{IW}$ NWS | 5.72 |
| Luminous Transmittance of Daylight | 0.25 |
| Luminous Transmittance of Red Traffic Signal | 0.23 |
| Luminous Transmittance of Yellow Traffic Signal | 0.22 |
| Luminous Transmittance of Green Traffic Signal | 0.29 |
| Minimum Transmittance between 475-650nm | 0.05 |
| Solar Blue Light Transmittance | 0.36 |
| Ganglion Cell Transmittance | 0.33 |
| Luminous Transmittance of Primary Lights (R,G,B) | (0.11 0.27 0.3) |
| D65 Chromaticity Coordinate (x,y) | (0.256 0.309) |
| Yellow Traffic Signal Chromaticity Coordinate (x,y) | (0.531 0.467) |
| Green Traffic Signal Chromaticity Coordinate (x,y) | (0.188 0.415) |
| Passes ANSI Z80.3-2010 | True |

FIG. 79A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.55 | 0. | 0. | 0. | 1. |
| 395. | 0. | 0. | 0.02 | 0. | 0. | 0.55 | 0. | 0. | 0. | 0.99 |
| 400. | 0. | 0. | 0.05 | 0. | 0. | 0.55 | 0. | 0. | 0. | 0.99 |
| 405. | 0. | 0. | 0.1 | 0. | 0. | 0.55 | 0. | 0. | 0. | 0.97 |
| 410. | 0.02 | 0.22 | 0.56 | 0.41 | 0. | 0.55 | 0. | 0. | 1. | 0.94 |
| 415. | 0.4 | 0.55 | 0.62 | 1. | 1. | 0.55 | 0.55 | 0. | 1. | 0.9 |
| 420. | 0.52 | 0.55 | 0.62 | 1. | 1. | 0.55 | 0.55 | 0. | 1. | 0.84 |
| 425. | 0.52 | 0.55 | 0.62 | 1. | 1. | 0.55 | 0.55 | 0. | 1. | 0.77 |
| 430. | 0.52 | 0.55 | 0.62 | 1. | 1. | 0.55 | 0.55 | 0. | 1. | 0.67 |
| 435. | 0.52 | 0.55 | 0.62 | 1. | 1. | 0.55 | 0.55 | 0. | 1. | 0.57 |
| 440. | 0.5 | 0.54 | 0.62 | 0.98 | 1. | 0.55 | 0.55 | 0.05 | 1. | 0.46 |
| 445. | 0.45 | 0.53 | 0.6 | 0.97 | 0.95 | 0.55 | 0.52 | 0.05 | 1. | 0.36 |
| 450. | 0.12 | 0.34 | 0.58 | 0.61 | 1. | 0.55 | 0.55 | 0.05 | 1. | 0.27 |
| 455. | 0.05 | 0.06 | 0.24 | 0.11 | 0.09 | 0.55 | 0.05 | 0.05 | 1. | 0.2 |
| 460. | 0.05 | 0.05 | 0.09 | 0.09 | 0.09 | 0.55 | 0.05 | 0.05 | 1. | 0.13 |
| 465. | 0.05 | 0.05 | 0.09 | 0.09 | 0.09 | 0.55 | 0.05 | 0.05 | 1. | 0.06 |
| 470. | 0.05 | 0.05 | 0.1 | 0.09 | 0.09 | 0.55 | 0.05 | 0.05 | 1. | 0.02 |
| 475. | 0.05 | 0.07 | 0.22 | 0.13 | 0.09 | 0.55 | 0.05 | 0.05 | 1. | 0. |
| 480. | 0.12 | 0.29 | 0.53 | 0.53 | 0.16 | 0.55 | 0.09 | 0.05 | 1. | 0.01 |
| 485. | 0.39 | 0.53 | 0.61 | 0.96 | 1. | 0.55 | 0.55 | 0.05 | 1. | 0.05 |
| 490. | 0.46 | 0.51 | 0.61 | 0.92 | 1. | 0.55 | 0.55 | 0.05 | 1. | 0.1 |
| 495. | 0.46 | 0.49 | 0.6 | 0.9 | 0.81 | 0.55 | 0.44 | 0.05 | 1. | 0.18 |
| 500. | 0.49 | 0.54 | 0.62 | 0.99 | 1. | 0.55 | 0.55 | 0.05 | 1. | 0.26 |
| 505. | 0.52 | 0.55 | 0.62 | 1. | 1. | 0.55 | 0.55 | 0.05 | 1. | 0.35 |
| 510. | 0.49 | 0.54 | 0.62 | 0.99 | 1. | 0.55 | 0.55 | 0.05 | 1. | 0.45 |
| 515. | 0.32 | 0.46 | 0.59 | 0.84 | 1. | 0.55 | 0.55 | 0.05 | 1. | 0.55 |
| 520. | 0.12 | 0.24 | 0.45 | 0.44 | 0.68 | 0.55 | 0.37 | 0.05 | 1. | 0.65 |
| 525. | 0.05 | 0.08 | 0.21 | 0.14 | 0.09 | 0.55 | 0.05 | 0.05 | 1. | 0.74 |
| 530. | 0.05 | 0.05 | 0.1 | 0.09 | 0.09 | 0.55 | 0.05 | 0.05 | 1. | 0.81 |
| 535. | 0.05 | 0.05 | 0.09 | 0.09 | 0.09 | 0.55 | 0.05 | 0.05 | 1. | 0.87 |
| 540. | 0.05 | 0.06 | 0.15 | 0.11 | 0.09 | 0.55 | 0.05 | 0.05 | 1. | 0.91 |
| 545. | 0.08 | 0.16 | 0.34 | 0.29 | 0.09 | 0.55 | 0.05 | 0.05 | 1. | 0.94 |
| 550. | 0.22 | 0.37 | 0.54 | 0.67 | 0.47 | 0.55 | 0.26 | 0.05 | 1. | 0.96 |
| 555. | 0.42 | 0.52 | 0.62 | 0.94 | 1. | 0.55 | 0.55 | 0.05 | 1. | 0.98 |
| 560. | 0.52 | 0.55 | 0.62 | 1. | 1. | 0.55 | 0.55 | 0.05 | 1. | 0.98 |

FIG. 79B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.45 | 0.53 | 0.62 | 0.96 | 1. | 0.55 | 0.55 | 0.05 | 1. | 0.99 |
| 570. | 0.27 | 0.4 | 0.56 | 0.74 | 1. | 0.55 | 0.55 | 0.05 | 1. | 0.99 |
| 575. | 0.11 | 0.2 | 0.38 | 0.36 | 0.47 | 0.55 | 0.26 | 0.05 | 1. | 1. |
| 580. | 0.05 | 0.08 | 0.18 | 0.14 | 0.09 | 0.55 | 0.05 | 0.05 | 1. | 1. |
| 585. | 0.05 | 0.05 | 0.1 | 0.09 | 0.09 | 0.55 | 0.05 | 0.05 | 1. | 1. |
| 590. | 0.05 | 0.05 | 0.09 | 0.09 | 0.09 | 0.55 | 0.05 | 0.05 | 1. | 1. |
| 595. | 0.05 | 0.05 | 0.09 | 0.09 | 0.09 | 0.55 | 0.05 | 0.05 | 1. | 1. |
| 600. | 0.05 | 0.05 | 0.09 | 0.09 | 0.09 | 0.55 | 0.05 | 0.05 | 1. | 1. |
| 605. | 0.05 | 0.05 | 0.09 | 0.09 | 0.09 | 0.55 | 0.05 | 0.05 | 1. | 1. |
| 610. | 0.05 | 0.05 | 0.09 | 0.09 | 0.09 | 0.55 | 0.05 | 0.05 | 1. | 1. |
| 615. | 0.05 | 0.05 | 0.11 | 0.09 | 0.09 | 0.55 | 0.05 | 0.05 | 1. | 1. |
| 620. | 0.05 | 0.09 | 0.22 | 0.17 | 0.09 | 0.55 | 0.05 | 0.05 | 1. | 1. |
| 625. | 0.13 | 0.24 | 0.42 | 0.44 | 0.09 | 0.55 | 0.05 | 0.05 | 1. | 1. |
| 630. | 0.3 | 0.42 | 0.56 | 0.77 | 0.8 | 0.55 | 0.44 | 0.05 | 1. | 1. |
| 635. | 0.45 | 0.51 | 0.58 | 0.93 | 1. | 0.55 | 0.55 | 0.05 | 1. | 1. |
| 640. | 0.33 | 0.45 | 0.57 | 0.81 | 1. | 0.55 | 0.55 | 0.05 | 1. | 1. |
| 645. | 0.17 | 0.28 | 0.45 | 0.51 | 0.8 | 0.55 | 0.44 | 0.05 | 1. | 1. |
| 650. | 0.07 | 0.12 | 0.26 | 0.22 | 0.09 | 0.55 | 0.05 | 0.05 | 1. | 1. |
| 655. | 0.03 | 0.05 | 0.13 | 0.09 | 0.09 | 0.55 | 0.05 | 0.05 | 1. | 1. |
| 660. | 0.02 | 0.03 | 0.08 | 0.05 | 0.09 | 0.55 | 0.05 | 0. | 1. | 1. |
| 665. | 0. | 0.01 | 0.06 | 0.02 | 0. | 0.55 | 0. | 0. | 1. | 1. |
| 670. | 0. | 0. | 0.05 | 0. | 0. | 0.55 | 0. | 0. | 1. | 1. |
| 675. | 0. | 0. | 0.05 | 0. | 0. | 0.55 | 0. | 0. | 1. | 1. |
| 680. | 0. | 0. | 0.05 | 0. | 0. | 0.55 | 0. | 0. | 1. | 1. |
| 685. | 0. | 0. | 0.05 | 0. | 0. | 0.55 | 0. | 0. | 1. | 1. |
| 690. | 0. | 0. | 0.05 | 0. | 0. | 0.55 | 0. | 0. | 1. | 1. |
| 695. | 0. | 0. | 0.05 | 0. | 0. | 0.55 | 0. | 0. | 1. | 1. |
| 700. | 0. | 0. | 0.05 | 0. | 0. | 0.55 | 0. | 0. | 1. | 1. |
| 705. | 0. | 0. | 0.05 | 0. | 0. | 0.55 | 0. | 0. | 1. | 1. |
| 710. | 0. | 0. | 0.09 | 0. | 0. | 0.55 | 0. | 0. | 1. | 1. |
| 715. | 0. | 0. | 0.09 | 0. | 0. | 0.55 | 0. | 0. | 1. | 1. |
| 720. | 0. | 0. | 1. | 0. | 0. | 0.55 | 0. | 0. | 1. | 1. |
| 725. | 0. | 0. | 1. | 0. | 0. | 0.55 | 0. | 0. | 1. | 1. |
| 730. | 0. | 0. | 1. | 0. | 0. | 0.55 | 0. | 0. | 1. | 1. |
| 735. | 0. | 0. | 1. | 0. | 0. | 0.55 | 0. | 0. | 1. | 1. |

FIG. 79B-2

| | |
|---|---|
| Best-fit Munsell Reference Filter | 2.5B 4/4 |
| Wavelength Maxima | (488 558 638) |
| Transmittance at Maxima | (0.36 0.2 0.32) |
| Wavelength Minima | (617) |
| Transmittance at Minima | (0.05) |
| PGAI D-15 | 0.33 |
| $PGAI_{IW}$ D-15 | -7.84 |
| PGAI NWS | 1.27 |
| $PGAI_{IW}$ NWS | -2.61 |
| Luminous Transmittance of Daylight | 0.25 |
| Luminous Transmittance of Red Traffic Signal | 0.24 |
| Luminous Transmittance of Yellow Traffic Signal | 0.2 |
| Luminous Transmittance of Green Traffic Signal | 0.29 |
| Minimum Transmittance between 475-650nm | 0.05 |
| Solar Blue Light Transmittance | 0.38 |
| Ganglion Cell Transmittance | 0.51 |
| Luminous Transmittance of Primary Lights (R,G,B) | (0.31 0.41 0.52) |
| D65 Chromaticity Coordinate (x,y) | (0.256 0.309) |
| Yellow Traffic Signal Chromaticity Coordinate (x,y) | (0.576 0.423) |
| Green Traffic Signal Chromaticity Coordinate (x,y) | (0.165 0.383) |
| Passes ANSI Z80.3-2010 | True |

FIG. 80A

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 390. | 0. | 0. | 0.02 | 0. | 0. | 0.2 | 0. | 0. | 0. | 1. |
| 395. | 0. | 0. | 0.02 | 0. | 0. | 0.24 | 0. | 0. | 0. | 0.99 |
| 400. | 0. | 0. | 0.05 | 0. | 0. | 0.27 | 0. | 0. | 0. | 0.99 |
| 405. | 0. | 0. | 0.05 | 0. | 0. | 0.29 | 0. | 0. | 0. | 0.97 |
| 410. | 0. | 0. | 0.05 | 0. | 0. | 0.32 | 0. | 0. | 1. | 0.94 |
| 415. | 0. | 0. | 0.05 | 0. | 0. | 0.35 | 0. | 0. | 1. | 0.9 |
| 420. | 0. | 0. | 0.05 | 0. | 0. | 0.37 | 0. | 0. | 1. | 0.84 |
| 425. | 0. | 0. | 0.09 | 0. | 0. | 0.38 | 0. | 0. | 1. | 0.77 |
| 430. | 0.02 | 0.14 | 0.37 | 0.38 | 0. | 0.37 | 0. | 0. | 1. | 0.67 |
| 435. | 0.25 | 0.37 | 0.46 | 0.92 | 0.91 | 0.41 | 0.37 | 0. | 1. | 0.57 |
| 440. | 0.37 | 0.41 | 0.49 | 0.97 | 0.95 | 0.42 | 0.4 | 0.05 | 1. | 0.46 |
| 445. | 0.4 | 0.43 | 0.5 | 1. | 1. | 0.43 | 0.43 | 0.05 | 1. | 0.36 |
| 450. | 0.41 | 0.43 | 0.5 | 1. | 1. | 0.43 | 0.43 | 0.05 | 1. | 0.27 |
| 455. | 0.41 | 0.44 | 0.5 | 1. | 1. | 0.44 | 0.44 | 0.05 | 1. | 0.2 |
| 460. | 0.42 | 0.44 | 0.51 | 1. | 1. | 0.44 | 0.44 | 0.05 | 1. | 0.13 |
| 465. | 0.42 | 0.45 | 0.51 | 1. | 1. | 0.45 | 0.45 | 0.05 | 1. | 0.06 |
| 470. | 0.42 | 0.44 | 0.51 | 1. | 1. | 0.44 | 0.44 | 0.05 | 1. | 0.02 |
| 475. | 0.42 | 0.44 | 0.51 | 1. | 1. | 0.44 | 0.44 | 0.05 | 1. | 0. |
| 480. | 0.42 | 0.45 | 0.51 | 1. | 1. | 0.45 | 0.45 | 0.05 | 1. | 0.01 |
| 485. | 0.42 | 0.45 | 0.51 | 1. | 1. | 0.45 | 0.45 | 0.05 | 1. | 0.05 |
| 490. | 0.42 | 0.45 | 0.52 | 1. | 1. | 0.45 | 0.45 | 0.05 | 1. | 0.1 |
| 495. | 0.43 | 0.45 | 0.52 | 1. | 1. | 0.45 | 0.45 | 0.05 | 1. | 0.18 |
| 500. | 0.42 | 0.45 | 0.52 | 1. | 1. | 0.45 | 0.45 | 0.05 | 1. | 0.26 |
| 505. | 0.4 | 0.43 | 0.51 | 1. | 1. | 0.44 | 0.44 | 0.05 | 1. | 0.35 |
| 510. | 0.37 | 0.4 | 0.49 | 1. | 1. | 0.4 | 0.4 | 0.05 | 1. | 0.45 |
| 515. | 0.28 | 0.36 | 0.45 | 1. | 1. | 0.38 | 0.38 | 0.05 | 1. | 0.55 |
| 520. | 0.26 | 0.28 | 0.37 | 1. | 1. | 0.26 | 0.26 | 0.05 | 1. | 0.65 |
| 525. | 0.28 | 0.33 | 0.4 | 1. | 1. | 0.34 | 0.34 | 0.05 | 1. | 0.74 |
| 530. | 0.32 | 0.34 | 0.41 | 1. | 1. | 0.34 | 0.34 | 0.05 | 1. | 0.81 |
| 535. | 0.31 | 0.36 | 0.42 | 0.96 | 1. | 0.38 | 0.38 | 0.05 | 1. | 0.87 |
| 540. | 0.13 | 0.26 | 0.41 | 0.6 | 1. | 0.43 | 0.43 | 0.05 | 1. | 0.91 |
| 545. | 0.04 | 0.08 | 0.23 | 0.19 | 0.12 | 0.44 | 0.05 | 0.05 | 1. | 0.94 |
| 550. | 0.04 | 0.05 | 0.13 | 0.12 | 0.09 | 0.45 | 0.04 | 0.05 | 1. | 0.96 |
| 555. | 0.07 | 0.14 | 0.29 | 0.3 | 0.09 | 0.46 | 0.04 | 0.05 | 1. | 0.98 |
| 560. | 0.19 | 0.31 | 0.44 | 0.67 | 0.48 | 0.46 | 0.22 | 0.05 | 1. | 0.98 |

FIG. 80B-1

| λ (nm) | $f_{MIN}$ | $f_T$ | $f_{MAX}$ | $q'(\lambda)$ | $q(\lambda)$ | $p(\lambda)$ | $f(\lambda)$ | $t_{MIN}(\lambda)$ | $t_{MAX}(\lambda)$ | $c(\lambda)$ |
|---|---|---|---|---|---|---|---|---|---|---|
| 565. | 0.3 | 0.39 | 0.46 | 0.94 | 1. | 0.44 | 0.44 | 0.05 | 1. | 0.99 |
| 570. | 0.16 | 0.23 | 0.41 | 1. | 1. | 0.19 | 0.19 | 0.05 | 1. | 0.99 |
| 575. | 0.16 | 0.17 | 0.24 | 1. | 1. | 0.17 | 0.17 | 0.05 | 1. | 1. |
| 580. | 0.15 | 0.19 | 0.24 | 1. | 1. | 0.21 | 0.21 | 0.05 | 1. | 1. |
| 585. | 0.13 | 0.14 | 0.22 | 1. | 1. | 0.12 | 0.12 | 0.05 | 1. | 1. |
| 590. | 0.14 | 0.18 | 0.27 | 1. | 1. | 0.18 | 0.18 | 0.05 | 1. | 1. |
| 595. | 0.2 | 0.24 | 0.31 | 0.94 | 1. | 0.26 | 0.26 | 0.05 | 1. | 1. |
| 600. | 0.17 | 0.23 | 0.31 | 0.7 | 1. | 0.33 | 0.33 | 0.05 | 1. | 1. |
| 605. | 0.07 | 0.13 | 0.25 | 0.35 | 0.4 | 0.38 | 0.15 | 0.05 | 1. | 1. |
| 610. | 0.04 | 0.06 | 0.14 | 0.14 | 0.09 | 0.39 | 0.04 | 0.05 | 1. | 1. |
| 615. | 0.04 | 0.04 | 0.09 | 0.09 | 0.09 | 0.43 | 0.04 | 0.05 | 1. | 1. |
| 620. | 0.04 | 0.06 | 0.15 | 0.14 | 0.09 | 0.43 | 0.04 | 0.05 | 1. | 1. |
| 625. | 0.09 | 0.15 | 0.29 | 0.36 | 0.09 | 0.43 | 0.04 | 0.05 | 1. | 1. |
| 630. | 0.2 | 0.3 | 0.43 | 0.69 | 0.56 | 0.43 | 0.24 | 0.05 | 1. | 1. |
| 635. | 0.33 | 0.4 | 0.48 | 0.92 | 1. | 0.43 | 0.43 | 0.05 | 1. | 1. |
| 640. | 0.4 | 0.43 | 0.49 | 1. | 1. | 0.43 | 0.43 | 0.05 | 1. | 1. |
| 645. | 0.38 | 0.42 | 0.49 | 0.99 | 1. | 0.42 | 0.42 | 0.05 | 1. | 1. |
| 650. | 0.3 | 0.38 | 0.47 | 0.89 | 1. | 0.42 | 0.42 | 0.05 | 1. | 1. |
| 655. | 0.18 | 0.27 | 0.4 | 0.64 | 0.94 | 0.42 | 0.4 | 0.05 | 1. | 1. |
| 660. | 0.07 | 0.14 | 0.27 | 0.32 | 0.38 | 0.43 | 0.16 | 0. | 1. | 1. |
| 665. | 0.01 | 0.04 | 0.13 | 0.09 | 0. | 0.44 | 0. | 0. | 1. | 1. |
| 670. | 0. | 0. | 0.06 | 0.01 | 0. | 0.45 | 0. | 0. | 1. | 1. |
| 675. | 0. | 0. | 0.05 | 0. | 0. | 0.46 | 0. | 0. | 1. | 1. |
| 680. | 0. | 0. | 0.05 | 0. | 0. | 0.46 | 0. | 0. | 1. | 1. |
| 685. | 0. | 0. | 0.05 | 0. | 0. | 0.46 | 0. | 0. | 1. | 1. |
| 690. | 0. | 0. | 0.05 | 0. | 0. | 0.48 | 0. | 0. | 1. | 1. |
| 695. | 0. | 0. | 0.05 | 0. | 0. | 0.49 | 0. | 0. | 1. | 1. |
| 700. | 0. | 0. | 0.05 | 0. | 0. | 0.51 | 0. | 0. | 1. | 1. |
| 705. | 0. | 0. | 0.05 | 0. | 0. | 0.51 | 0. | 0. | 1. | 1. |
| 710. | 0. | 0. | 0.09 | 0. | 0. | 0.51 | 0. | 0. | 1. | 1. |
| 715. | 0. | 0. | 0.09 | 0. | 0. | 0.52 | 0. | 0. | 1. | 1. |
| 720. | 0. | 0. | 1. | 0. | 0. | 0.52 | 0. | 0. | 1. | 1. |
| 725. | 0. | 0. | 1. | 0. | 0. | 0.51 | 0. | 0. | 1. | 1. |
| 730. | 0. | 0. | 1. | 0. | 0. | 0.5 | 0. | 0. | 1. | 1. |
| 735. | 0. | 0. | 1. | 0. | 0. | 0.4 | 0. | 0. | 1. | 1. |

FIG. 80B-2

MULTI-BAND COLOR VISION FILTERS AND METHOD BY LP-OPTIMIZATION

CROSS REFERENCE TO RELATED APPLICATIONS

This application is a continuation of U.S. patent application Ser. No. 15/643,366 filed Jul. 6, 2017, which is a continuation of U.S. patent application Ser. No. 14/014,991 filed Aug. 30, 2013 and issued as U.S. Pat. No. 10,338,286, which is a continuation of International Patent Application No. PCT/US2012/027790 filed Mar. 5, 2012 and titled "MULTI-BAND COLOR VISION FILTERS AND METHOD BY LP-OPTIMIZATION," which claims benefit of priority to Provisional U.S. Patent Application No. 61/449,049 filed Mar. 3, 2011 and titled "MULTI-BAND OPTICAL FILTERS FOR GOOD COLOR APPEARANCE". Each of these applications is incorporated herein by reference in its entirety.

FIELD OF THE INVENTION

The invention generally relates to optical filters that provide regulation and/or enhancement of chromatic and luminous aspects of the color appearance of light to human vision, generally to applications of such optical filters, to applications of such optical filters in ophthalmic lenses, to therapeutic applications of such optical filters, to industrial and safety applications of such optical filters when incorporated, for example, in radiation-protective eyewear, to methods of designing such optical filters, to methods of manufacturing such optical filters, and to designs and methods of incorporating such optical filters into apparatus including, for example, eyewear and illuminants.

BACKGROUND

Optical filters having wavelength-selective transmission acting on sources or receivers of light may transform aspects of color appearance. Optical filters that improve color vision may provide therapeutic benefit to persons with color vision deficiency. Optical filters may provide eye-protection from high-energy radiation in the ultra-violet, visible, and/or infrared spectra. Apparatus incorporating optical filters include eyewear, windows and illuminants.

SUMMARY

Disclosed herein is a filter generating method for designing optical filters that, for example, provide enhancement and/or regulation to the appearance of color with respect to human color perception. The optical filter designs produced by the method may be used as the basis for manufacturing specifications used to fabricate the optical filters as, for example, interference filters by, for example, physical vapor deposition of multiple layers of dielectric materials onto an optical substrate. The interference filters may further comprise layers of metal materials that are absorptive. Such metal attenuation coatings may be fabricated by physical vapor deposition, for example. The optical substrate may be transparent or may incorporate absorptive, photochromic or polarizing filter materials, where the incorporation is achieved by doping of the substrate with such materials, by lamination of such materials between multiple substrates, or by coating of such materials on one or both sides of the substrate. Boundary surfaces both internal and external to the assembly may be index-matched, for example by incorporation of appropriate anti-reflection filters, to reduce transmission losses and generally improve optical quality of the assembled filter. The filters may, for example, be incorporated into eyewear (e.g., eye glasses, sun lenses, eye shields, monocles, safety lenses, contact lenses, or any other suitable ophthalmic lenses), or may be incorporated into illuminants (e.g., lamp assemblies). An ophthalmic lens is a lens for use with an eye. An ophthalmic lens may provide optical (focusing) correction to the eye, or it may be of zero power and provide no such correction. Eyeglass lenses (e.g., sunglass lenses) and contact lenses are examples of ophthalmic lenses.

In one aspect, a computer implemented method for designing an optical filter that affects color vision in a desired manner comprises using a computer to solve a linear program given by the expression:

$$\text{minimize } c^T x,$$

$$\text{subject to the constraint that } Ax \leq b, \text{ and}$$

$$\text{subject to the constraint that } 1 \geq x \geq 0;$$

where, in this method, the linear program is solved for the vector x and the transmittance of the filter per wavelength, f(λ), is computed by the expression:

$$\text{given } E=[e_1 \ldots e_i \ldots e_N], \text{ and}$$

$$\text{given } p, \text{ then,}$$

$$q(\lambda)=\Sigma_{i=1 \ldots N} x_i e_i(\lambda), \text{ and}$$

$$f(\lambda)=p(\lambda)\times q(\lambda);$$

where, in this method, f is the designed optical filter, f(λ) is the transmittance of f per wavelength λ, E is a matrix of elementary filters such that the columns of the matrix $e_i$ are the transmittance of light as a function of wavelength per elementary filter and the number of elementary filters is N. The expression defining q(λ) is a weighted summation of the elementary filters, where the weighting coefficients are the corresponding elements $x_i$. The weighted sum is equivalent to the matrix-vector product expression, q=Ex, between elementary filter matrix E and linear program solution vector x. Further, p(λ)×q(λ) denotes the composition in series of two optical filters by multiplication per wavelength of the first filter q with second filter p, where p(λ) is the transmittance of p per wavelength λ, and p is also generally referred to as a "pre-filter" in this disclosure, although the component filters may generally be composed in any order. The linear program constraint 1≥x≥0 is equivalent to the constraint that $1 \geq x_i \geq 0$ for i between 1 and N. Further, c in the above expression is a cost vector that guides the linear program solver toward a solution that provides a filter f that affects color vision in the desired manner. The total cost associated with the solution is computed by $c^T x$, which denotes the vector dot product between the transpose of c and x. Solutions x providing a lower total cost are generally more preferable with respect to the desired function of the filter (e.g. color discrimination enhancement), although other measures of quality may also be employed to determine the adequacy of a particular solution. A in the above expression is a matrix and b in the above expression is a vector. Ax is the matrix product between the matrix A and vector x. At least some of the elements of matrix A and at least some of the elements of vector b are related to minimum or maximum levels of transmission by the filter f at one or more wavelengths of light, to a constraint on the filter white-point, or to constraints on the color appearance of one or more reference lights as viewed or illuminated through the filter, and/or to such transmission constraints by the filter f at one or more angles of incidence.

The specification of transmittance of filters ($e_i$, p, f), per wavelength λ in the above expression may be tabulated by uniform sampling on a wavelength scale (e.g., using a step size of 1 nanometer), or on another scale that is substantially equivalent (e.g., frequency or log wavenumber). The sampling may also be defined on an arbitrary scale with non-uniform intervals between sample points.

The filters f designed by the method have a spectral transmittance that can be essentially described as a multi-band filter, where a multi-band filter is a plurality of pass-bands interleaved with stop-bands. In particular, filters for affecting color vision have three or more pass-bands separated by two or more stop-bands, each stop-band and each pass-band has a center and a width, where the center is located in the visible spectrum, between about 400 nanometers and about 700 nanometers, and the widths may range between about 10 nanometers and about 110 nanometers. The lower boundary of a band is defined as the center minus half the width, and the upper boundary of a band is defined as the center plus half the width. The mean transmittance of a band is the average spectral transmittance of light within the band boundaries. The interleaved stop-bands share upper and lower boundaries with the complementary boundaries of adjacent pass-bands. A multi-band filter may be characterized by a minimum contrast ratio with respect to the mean transmittance of stop-bands and their adjacent pass-bands. For example, a multi-band filter may be compliant with a lower bound on the contrast ratio such that each interleaved stop-band has a mean transmittance that is less than or equal to, for example, one half of the mean transmittance of an adjacent pass-band. A multi-band filter may be further characterized by compliance with an upper bound on the contrast ratio, which is desirable for some embodiments of multi-band filters for use with color vision.

Filters that are incorporated into apparatus such as ophthalmic lenses may be further characterized by a luminous transmittance, which is defined as the average spectral transmittance of light through the filter weighted by the CIE 1924 photopic luminosity function. Filters for use in ophthalmic lenses (such as sunglasses) typically have a luminous transmittance of at least 8 percent. Additionally, the filter white-point is defined as the chromaticity coordinate of average daylight (i.e., Illuminant D65) in a suitable color space, wherein a (u',v') chromaticity coordinate refers to a location in the CIELUV color space and an (x,y) chromaticity coordinate refers to a location in the CIE xyY color space. The white-point of a filter subjectively corresponds with the apparent color tint that the filter imposes over the visual field, wherein a white-point that is described as neutral imposes an insignificant amount of such tinting.

In some variations, the filter pass-bands are essentially rectangular, i.e., the change in transmittance per wavelength at the band boundaries is instantaneous or nearly instantaneous. The width of a rectangular pass-band may be characterized by the distance between the short wavelength boundary and the long wavelength boundary. The rectangular band-width may be equivalently measured on a frequency scale.

In some variations, the filter pass-bands are essentially Gaussian, i.e., the change in transmittance per wavelength at the band boundaries is gradual or essentially smooth. The width of a Gaussian pass-band may be characterized by the distance between the half-maximum transmittance on the short wavelength boundary to the half-maximum transmittance on the long wavelength boundary (also called the full-width at half-maximum (FWHM)). The half-maximum band-width may be equivalently measured on a frequency scale.

In some variations, one or more of the pass-bands may have an irregular shape (i.e., not rectangular and not Gaussian). For example the pass-band may have a bimodal distribution, or may have a shoulder on one or more sides of the pass-band, or may be described as a skewed distribution, where the slope ratio between the two sides of the pass-band, in transmittance per wavelength, is between about 4:1 and about 1:4.

In variations with non-Gaussian pass-bands, such pass-bands may be smoothed with a Gaussian kernel that is, for example, just wide enough to essentially remove the irregularity and/or sharp slope transitions, in which case the pass-band may be described as essentially having a band center and half-maximum width of the corresponding smoothed pass-band.

The elementary filters may be, for example, single pass-band filters having a pass-band width of about one nanometer and each elementary filter having a different pass-band center wavelength. Such filters may also be called monochromatic filters, and defined as having the spectral transmittance:

$$e_\mu(\lambda)=\delta(\lambda-\mu);$$

where δ is the Dirac-delta function and μ is the wavelength transmitted by the filter, which typically varies between about 400 nanometers to about 700 nanometers over the set of elementary filters, and the number of such elementary filters in the set is about 300. Alternatively, the elementary filters may be single pass-band filters each having width greater than about one nanometer and each elementary filter having a different pass-band center wavelength. In some such variations the pass-bands may be rectangular (also called a boxcar function) and the spectral transmittance of an elementary filter is defined:

$$e_{(\mu,\sigma)}(\lambda)=H(\lambda-(\mu-\sigma/2))-H(\lambda-(\mu+\sigma/2));$$

where μ is the center wavelength, σ is the rectangular band-width and H is the Heaviside step function. In such variations the pass-bands may have, for example, a width of about 10 nanometers and the band location varies, for example, between about 400 nanometers and about 700 nanometers on a step size of about 5 nanometers, so that the number of such elementary filters is, for example, about 60. In some variations the pass-bands may have a spectral transmittance that is Gaussian or essentially Gaussian, for example having spectral transmittance defined by:

$$e_{(\mu,\sigma)}(\lambda)=\exp(-(\lambda-\mu)^2/(2\sigma^2));$$

where μ is the center wavelength and the half-maximum band-width is:

$$2\sigma\ \mathrm{sqrt}(2\ \ln(2)),$$

where exp( ) is the exponential function, sqrt( ) is the square-root function and ln( ) is the natural logarithm. In yet other variations, the elementary filters may be multi-band filters having two or more pass-bands and each elementary filter has a different combination of center locations and/or band widths of the two or more pass-bands. Any suitable set of elementary filters may be used in the filter design method.

The cost vector c may be selected, for example, to guide the linear program solver toward a filter that improves color discrimination. In some variations, the cost vector is selected to enhance the discrimination between red and green colors by increasing the apparent chromatic purity of red and green colors. Such red-green color enhancing filters may also increase the apparent purity of blue colors, and therefore may be described as increasing color discrimination in general. Alternatively, the cost vector may be selected to enhance the discrimination between blue and yellow colors by increasing the apparent chromatic purity of blue and yellow colors. Such blue-yellow color enhancing filters may also tend to decrease the apparent purity of red and green colors. In addition, or alternatively, the cost vector may be selected to reduce the transmission of short-wavelength blue light between about 380 nanometers and about 450 nanometers. In addition, or alternatively, the cost vector may be selected to increase the transmission of short-wavelength cyan light between about 450 nanometers and about 500 nanometers. Any suitable cost vector may be used in the filter design method.

In some variations the cost vector c and/or elements of A and b may be selected so that the discrimination of colors provided by the filter is normal (i.e., the appearance of colors are substantially the same as would be provided by a neutral density filter).

In some variations, the filter design method comprises solving the linear program to generate a trial filter f and then evaluating the trial filter against performance criteria, manufacturing criteria, or performance and manufacturing criteria. Some such variations may also comprise adjusting matrix A, vector b, cost vector c, elementary filter matrix E, pre-filter p, or any combination thereof and then again solving the linear program expression to provide another trial filter. Cost vector c may be adjusted, for example, to further improve color discrimination (i.e., of the next trial filter compared to the current trial filter).

Evaluating the performance of the filter may include assessing its affect on color discrimination by determining a first gamut area by computing the area enclosed by a first contour in a chromaticity plane in a color space where the first contour corresponds to the appearance to an observer of a set of reference colors viewed or illuminated through the trial filter, determining a second gamut area by computing the area enclosed by a second contour in a chromaticity plane in a color space where the second contour corresponds to the appearance to the observer of the set of reference colors viewed or illuminated through a reference filter, and comparing the first gamut area to the second gamut area.

Evaluating the performance of the filter may alternatively, or in addition, include assessing its affect on color discrimination by determining a first standard deviation of a first distribution projected onto an axis in a chromaticity plane in a color space where the first distribution corresponds to the appearance to an observer of a set of reference colors viewed or illuminated through the trial filter, determining a second standard deviation of a second distribution projected onto an axis in the chromaticity plane in the color space where the second distribution corresponds to the appearance to an observer of the set of reference colors viewed or illuminated through a reference filter, and comparing the first standard deviation to the second standard deviation. Useful axes for analysis include those defined by the protan confusion line, the deutan confusion line and the tritan confusion line.

In some variations, evaluating the performance of the filter may comprise taking an average or a weighted average of the performance of the filter over a range of angles of incidence away from normal incidence. The range of angles may be, for example, between about zero degrees and at least about 20 degrees, or, for example, between about zero degrees and at least about 30 degrees.

In some variations, colors to be regulated and/or enhanced by the filter are specified by the spectral reflectance of color swatches from the Munsell book of color.

In some variations, colors to be regulated and/or enhanced by the filter are specified by the spectral reflectance of color caps from the Farnsworth D-15, in alternative to or in addition to swatches from the Munsell book of color.

In some variations, colors to be regulated and/or enhanced by the filter are specified by the spectral reflectance of natural objects including, for example, leaves and flowers, in alternative to or in addition to swatches from the Munsell book of color.

In some variations at least some of the elements of matrix A and vector b in the above linear program expression are related to constraints on the appearance of blue, red, green, or yellow traffic signals as viewed through the filter. These constraints may be based on industrial or regulatory standards, for example, and may require, for example, that the traffic light colors fall within specific chromatic and luminous bounds when viewed through the filter. The method may provide a filter satisfying such constraints while improving color discrimination or otherwise enhancing the appearance of colors.

In some variations at least some of the elements of matrix A and vector b in the above linear program expression are related to constraints providing stability of color appearances, as viewed or illuminated through the filter, with respect to changes in the angle of incidence of light on the filter. The stability is provided by configuration of the constraints so that the white-point of the designed filter is invariant, or substantially invariant, at two or more angles of incidence. Further, in such variations the filter f may comprise a composition of an absorptive pre-filter p with an interference filter q, where the change in transmittance per angle of incidence of p is in accordance with the Beer-Lambert Law, and the change in transmittance per angle of incidence of Ex is in accordance with Snell's Law, so that the transmittance of f at an angle of incidence θ radians away from the surface normal vector may be denoted $f_\theta(\lambda)$ and approximated by the expression:

$$f_\theta(\lambda)=p(\lambda)^{(1/cos(\theta))}\Sigma_{i=1 \ldots N} x_i e_i(\lambda/\mathrm{sqrt}(1-\sin^2(\theta)/n^2));$$

where the effective refractive index of $e_i$ is n which has a value of about 1.85, and the approximation is sufficient for θ between about 0 degrees and about 45 degrees.

In some variations at least some of the elements of matrix A and vector b in the above linear program expression relate to constraints on the transmission of blue light between about 380 nanometers and about 450 nanometers by the filter, e.g., minimizing such transmission.

In some variations at least some of the elements of matrix A and vector b in the above expressions relate to constraints specifying a minimum transmittance by the filter between about 450 nanometers and about 650 nanometers.

In some variations at least some of the elements of matrix A and vector b in the above expressions relate to constraints specifying a minimum transmittance by the filter between about 580 nanometers and about 620 nanometers.

In some variations at least some of the elements of matrix A and vector b in the above expressions relate to constraints on the luminous transmission of primary lights emitted by an electronic visual display, for example by a liquid crystal display (LCD) with a light-emitting diode (LED) backlight.

In some variations at least some of the elements of matrix A and vector b in the above expressions relate to constraints that provide radiation eye-protection from a visible laser, for example a frequency-doubled Nd:YAG laser (having laser output power at 532 nanometers and 1064 nanometers), in combination with normal color discrimination and stable color appearances over angles of incidence on the filter between, for example, about 0 degrees and about 30 degrees.

In some variations at least some of the elements of matrix A and vector b in the above expressions relate to constraints that provide radiation eye-protection from a sodium flare (having power concentrated at about 589 nanometers) in combination with stable color appearance over angles of incidence on the filter between, for example, about 0 degrees and about 30 degrees.

In some variations at least some of the elements of matrix A and vector b in the above expressions relate to constraints that provide that for a selected illuminant the color appearance of the illuminant as viewed after transmission through the filter is matched to the color appearance of the illuminant when viewed after reflection by the filter, and where the filtered illuminant transmitted by the filter provides an enhanced discrimination of selected reference colors, and where the portion of light not transmitted by the filter is reflected by the filter.

In another aspect, the linear program in the method summarized above is replaced with an equivalent numerical optimization procedure. In such variations the equivalent procedure may comprise tabulating all combinations of band locations and band widths over a range of probable values, then evaluating each multi-band filter against constraint criteria and performance criteria, and then selecting the subset of filters that pass the constraint criteria, and then selecting the best performing filter among the subset to be the trial filter. Such variations may further include evaluating the trial filter against performance criteria, manufacturing criteria, or performance and manufacturing criteria. Some such variations may also comprise adjusting constraint criteria, performance criteria or any combination thereof and then again executing the numerical optimization procedure to provide another trial filter. The constraint criteria or performance criteria may be adjusted, for example, to further improve color discrimination (i.e., of the next trial filter compared to the current trial filter).

In another aspect, a computer implemented method for evaluating the effect on color vision of a trial filter comprises, using a computer, determining a first gamut area by computing the area enclosed by a first contour in a chromaticity plane in a color space where the first contour corresponds to the appearance to an observer of a set of reference colors viewed or illuminated through the trial filter, determining a second gamut area by computing the area enclosed by a second contour in a chromaticity plane in a color space where the second contour corresponds to the appearance to the observer of the set of reference colors viewed or illuminated through a reference filter, and comparing the first gamut area to the second gamut area.

In some variations, evaluating the performance of the filter may comprise taking an average or a weighted average of the gamut area provided by the filter over a range of angles of incidence away from normal incidence. The range of angles may be, for example, from about zero degrees to at least about 20 degrees. In some such variations the importance weighting function is derived by estimating the probability that the filter is viewed at a particular angle according to a geometric model of the human eye and the filter situated on the face in a typical eyeglass frame.

In some variations, comparing the first gamut area to the second gamut area comprises taking the ratio of the first gamut area to the second gamut area.

In some variations, at least some of the reference colors are selected from the Munsell colors. Alternatively, or additionally, at least some of the reference colors are selected from the Farnsworth D-15. Alternatively, or additionally, at least some of the reference colors are selected from colors present in the environment in which the trial filter is to be used to affect color vision. In the latter case, in some variations at least some of the reference colors are selected from colors occurring naturally in an outdoor environment.

In some variations, the reference colors are selected to form a contour of moderate saturation around the white point in the chromaticity plane. In addition, or alternatively, reference colors are selected to form a contour of high saturation around the white point in the chromaticity plane.

The reference filter may be selected, for example, to have a broad-band transmittance. In some variations, the reference filter is selected to have the same white-point as the trial filter with respect to a selected illuminant, for example with respect to daylight. In some variations, a Munsell color having the best fit to the trial filter is used to define the reference filter, where the measured spectral reflectance of the Munsell color swatch is defined to be the spectral transmittance of the reference filter.

In another aspect, a computer implemented method for evaluating the effect on color vision of a trial filter comprises, using a computer, determining a first standard deviation of a first distribution projected onto an axis in a chromaticity plane in a color space where the first distribution corresponds to the appearance to an observer of a set of reference colors viewed or illuminated through the trial filter, determining a second standard deviation of a second distribution projected along an axis in the chromaticity plane in the color space where the second distribution corresponds to the appearance to an observer of the set of reference colors viewed or illuminated through a reference filter, and comparing the first standard deviation to the second standard deviation.

In some variations, the axis is defined to be the protan confusion line.

In some variations, the axis is defined to be the deutan confusion line.

In some variations, the axis is defined to be the tritan confusion line.

In some variations, evaluating the performance of the filter may comprise taking an average or a weighted average of the standard deviation of the distribution provided by the filter over a range of angles of incidence away from the normal incidence. The range of angles may be, for example, from about zero degrees to at least about 20 degrees. In some such variations the importance weighting function is derived by estimating the probability that the filter is viewed at a particular angle according to a geometric model of the human eye and the filter situated on the face in a typical eyeglass frame.

In some variations, comparing the first standard deviation to the second standard deviation comprises taking the ratio of the first standard deviation to the second standard deviation.

In some variations, at least some of the reference colors are selected from the Munsell colors. Alternatively, or additionally, at least some of the reference colors are selected from the Farnsworth D-15. Alternatively, or additionally, at least some of the reference colors are selected from colors present in the environment in which the trial filter is to be used to affect color vision. In the latter case, in some variations at least some of the reference colors are selected from colors occurring naturally in an outdoor environment.

In some variations, the reference colors are selected to form a contour of moderate saturation around the white point in the chromaticity plane. In addition, or alternatively, reference colors are selected to form a contour of high saturation around the white point in the chromaticity plane.

The reference filter may be selected, for example, to have a broad-band transmittance. In some variations, the reference filter is selected to have the same white point as the trial filter with respect to a selected illuminant, for example daylight. In some variations, a Munsell color having the best fit to the trial filter is used to define the reference filter, where the measured spectral reflectance of the Munsell color swatch is defined to be the spectral transmittance of the reference filter.

In another aspect, a multi-band filter for affecting color vision comprises first, second and third pass-bands bands separated by two stop-bands. The pass-bands and the stop-bands are configured to increase color discrimination for a normal observer (e.g., functional performance evaluation of the filter may consider its affect on color vision with respect to CIE 1931 2-degree Standard Observer). The first pass-band has a center located between about 435 nanometers and about 465 nanometers, the second pass-band has a center located between about 525 nanometers and about 555 nanometers, and the third pass-band has a center located between about 610 nanometers and about 660 nanometers. The pass-band widths are each between about 20 nanometers and about 80 nanometers, and the stop-band widths are each at least about 40 nanometers.

In some variations, the pass-bands are configured (e.g., appropriately positioned and/or shaped) so that the filter provides stable color appearances for angles of incidence between about 0 degrees and at least about 30 degrees away from the surface normal vector such that the white-point of average daylight is contained in a region with a radius of about 0.02 units on the CIELUV (u',v') color space and the CIE 1931 2-degree Standard Observer for all, or nearly all, of the angles of incidence. In some such variations the region has a radius of about 0.01 units. In further variations the chromaticity coordinates may be calculated using the CIE 1964 10-degree Standard Observer in addition or in alternative to the CIE 1931 2-degree Standard Observer.

In some variations, the pass bands are configured so that the filter provides stable color appearances for angles of incidence between about 0 degrees and at least about 30 degrees away from the surface normal vector such that the white-point of average daylight is contained in a region with a radius of about 0.02 units on the CIELUV (u',v') 1964 2-degree standard observer chromaticity scale for all, or nearly all, of the angles of incidence. In some such variations the region has a radius of about 0.01 units.

In some variations, the multi-band filter is configured to increase blue-yellow color discrimination. In such variations, the first pass-band has a center located between about 450 nanometers and about 475 nanometers, the second pass-band has a center located between about 545 nanometers and about 580 nanometers, and the third pass-band has a center located between about 650 nanometers and about 690 nanometers. In such variations the pass-band widths are each between about 20 nanometers and about 60 nanometers.

In some such variations, the filter is configured to provide a chromaticity coordinate for a green traffic signal defined by industrial standard ANSI Z80.3-2010 that is as desaturated, or nearly as desaturated, as allowed by that standard.

In some variations, the multi-band filter has a luminous transmittance between about 8 percent and about 40 percent and the bands are configured so that the filter is considered "not strongly colored" according to the industrial standard ANSI Z80.3-2010.

In some variations, the multi-band filter is configured so that the white-point of the filter is neutral or nearly neutral, so that the filter provides an (x,y) chromaticity coordinate that is at least about 0.05 units away from any point on the boundary of the average daylight color limit region defined according to industrial standard ANSI Z80.3-2010 section 4.6.3.1. In further variations the filter is configured so that the white-point is on or nearly on the average daylight color limit region.

In some variations, the stop-bands have a minimum transmittance that is about one fifth of the luminous transmittance. The minimum transmittance is the lowest value of the spectral transmittance within the boundaries of the stop-bands.

In some variations, the filter is configured to increase color discrimination in combination with suppression of short-wavelength light below at least about 440 nanometers. In such variations the first pass-band has a center located between about 450 nanometers and about 470 nanometers and has a width of between about 10 nanometers and about 40 nanometers, the second pass-band has a center located between about 545 nanometers and about 575 nanometers and a width between about 30 nanometers and about 60 nanometers, the third pass-band has a center location between about 630 nanometers and about 670 nanometers and a width between about 40 nanometers and about 90 nanometers. In some such variations the filter has a luminous transmittance between about 20 percent and about 35 percent. In some such variations the percent gamut area increase with respect to the Farnsworth D-15 colors is greater than zero for angles between zero degrees and at least about 25 degrees. In some such variations wherein the white-point is neutral the importance-weighted percent gamut area increase with respect to the Farnsworth D-15 colors may be at least 20 percent. In some variations, the multi-band filter has a luminous transmittance between about 8 percent and about 40 percent and the bands are configured so that the white-point of the filter is on or nearly on the boundary defining the limit for a filter considered not strongly colored according to the industrial standard ANSI Z80.3-2010.

In some variations the filter is manufactured by incorporation of a neutral density absorptive filter in combination with an interference filter. In some variations the spectral transmittance of the interference filter is significantly smoothed and the interference filter comprises fewer than about 50 layers of dielectric material, and/or has a total thickness of less than about 3 microns. In further variations the filter is manufactured by incorporation of a neodymium-containing substrate in addition to the interference filter. The filter may further comprise a neutral density filter. In some variations the neutral density absorptive filter comprises a metal attenuation coating, which may be incorporated within the layers of the interference filter. As neutral density filters have a generally flat spectral transmittance, filters configured for use with a neutral density filter may be composed with many essentially equivalent options. For example a circular polarizing filter may be exchanged for a metal attenuation coating to achieve a filter with the same, or nearly the same spectral transmittance.

As suitable, the filter of any of the above variations may be incorporated into eyewear. Such eyewear may include, for example, eyeglasses (e.g., sunglasses), goggles, contact lenses, or any other suitable ophthalmic lens.

In another aspect, a multi-band filter for affecting color vision comprises first, second and third pass-bands bands separated by two stop-bands. The pass-bands and the stop-bands are configured to provide normal color discrimination in combination with suppression of short-wavelength below about 450 nanometers.

In some variations the filter has three pass-bands, the first pass-band has a center wavelength of about 465 nanometers and a half-maximum width of about 20 nanometers, the first stop-band has a minimum transmittance of about 14 percent, the second pass-band has a center wavelength of about 550 nanometers and a half-maximum width of about 40 nanometers, the second stop-band has a minimum transmittance of about 50 percent between about 580 nanometers and about 610 nanometers, and the third pass-band has a center wavelength of about 660 nanometers and a half-maximum width of about 80 nanometers.

In some variations the filter has four pass-bands, the first pass-band has a center wavelength of about 465 nanometers and a half-maximum width of about 20 nanometers, the first stop-band has a minimum transmittance of about 17 percent, the second pass-band has a center wavelength of about 550 nanometers and a half-maximum width of about 35 nanometers, the second stop-band is located at about 560 nanometers and has a minimum transmittance of about 40 percent, the third pass-band is located at about 595 nanometers and has a half-maximum width of about 35 nanometers, and the fourth pass-band is located at about 660 nanometers and has a half-maximum width of about 80 nanometers.

In some variations, the pass bands are positioned and/or shaped so that the filter provides stable color appearances for angles of incidence between about 0 degrees and about 40 degrees away from the surface normal vector such that the (u', v') chromaticity coordinate of average daylight is contained in a region with a radius of about 0.01 units on the CIELUV color space 1931 2-degree Standard Observer chromaticity (u', v') scale for all, or nearly all, of the angles of incidence.

In some variations the percent gamut area increase with respect to the Farnsworth D-15 colors is greater than zero for angles between zero degrees and at least about 25 degrees. In some variations the white-point is neutral and the importance-weighted percent gamut area increase with respect to the Farnsworth D-15 colors is between about 0 percent and about 10 percent.

In some variations, the multi-band filter has a luminous transmittance between about 8 percent and about 40 percent and the bands are configured so that the white-point of the filter is on or nearly on the boundary defining the limit for a filter considered not strongly colored according to the industrial standard ANSI Z80.3-2010.

In some variations the filter is manufactured by incorporation of a neutral density absorptive filter in combination with an interference filter. In some such variations the neutral density absorptive filter is a linear polarizer. In further variations the filter is manufactured without an absorptive element. In some variations the filter is manufactured by deposition of an interference filter onto a photochromic substrate.

As suitable, the filter of any of the above variations may be incorporated into eyewear. Such eyewear may include, for example, eyeglasses (e.g., sunglasses), goggles, contact lenses, or any other suitable ophthalmic lens.

In another aspect, a multi-band filter for affecting color vision comprises first, second, and third pass-bands separated by two stop-bands. The pass-bands and the stop-bands are configured to increase red-green color discrimination for an observer with red-green color vision deficiency. Correspondingly, the evaluation of performance metrics of such a filter may account for the physiological characteristics of such an observer. The first pass-band has a center wavelength between about 440 nanometers and about 455 nanometers, the second pass-band has a center wavelength between about 530 nanometers and about 545 nanometers, and the third pass-band has a center wavelength between about 610 nanometers and about 640 nanometers. The pass-band widths are each between about 10 nanometers and about 60 nanometers, and the stop-band widths are each at least about 40 nanometers, where the widths of the bands may be selected according to the desired luminous transmittance and white point tint of the filter.

In some variations, the pass bands are positioned and/or shaped so that the filter provides stable color appearances for angles of incidence between about 0 degrees and about 30 degrees away from the surface normal vector such that the white-point of daylight is contained in a region with a radius of about 0.02 units on the CIELUV 1931 2-degree standard observer chromaticity (u', v') scale for all, or nearly all, of the angles of incidence.

In some variations, the pass bands are positioned and/or shaped so that the filter provides stable color appearances for angles of incidence between about 0 degrees and about 35 degrees away from the surface normal vector such that the white-point of daylight is contained in a region with a radius of about 0.04 units on the CIELUV 1931 2-degree standard observer chromaticity (u', v') scale for all, or nearly all, of the angles of incidence.

In some variations, the pass bands are positioned and/or shaped so that the filter provides stable color appearances such that the angle of incidence—dependent distance by which the white point shifts from its position for zero degrees angle of incidence has a local minimum at an angle between about 20 and about 40 degrees angle of incidence, where the white-point shift at the local minimum is less than 0.02 units on the CIELUV 1931 2-degree standard observer chromaticity (u', v') scale.

In some variations, the pass bands are positioned and/or shaped so that the filter provides stable color appearances such that the angle of incidence—dependent distance by which the white point shifts from its position for zero degrees angle of incidence has a local minimum at an angle between about 20 and about 40 degrees where the white-point shift at the local minimum is less than 0.01 units on the CIELUV 1931 2-degree standard observer chromaticity (u', v') scale.

In some variations, the multi-band filter has a luminous transmittance between about 8 percent and about 40 percent and the bands are configured so that the filter is considered not strongly colored according to the industrial standard ANSI Z80.3-2010.

In some variations, the multi-band filter has a luminous transmittance between about 8 percent and about 40 percent and the bands are configured so that the white-point of the filter is neutral or nearly neutral, such that the (x,y) chromaticity coordinate of the white-point is within about 0.05 units of (0.31, 0.33) with respect to Illuminant D65 and the on the CIE xyY 1931 2-degree standard observer color space.

In some variations, the stop-bands have a minimum transmittance that is about one fifth of the luminous transmittance between about 450 nanometers and about 650 nanometers.

In some variations, the stop-bands have a minimum transmittance that is about one fifth of the luminous transmittance between about 580 nanometers and about 650 nanometers.

In some variations, one or more of the pass-bands has a skewed distribution, where the slope ratio, in transmittance per wavelength, between the two sides of the pass-band is between 4:1 and 1:4.

In some variations, one or more of the pass-bands has an irregular distribution where the pass-band may be described as essentially having a shoulder on one side or on both sides of the pass-bands.

In some variations, one or more of the pass-bands has a bimodal distribution, where the center wavelengths of the two modes are within about +/−10 percent and the distribution around the modes are partially overlapping. Such a configuration may also be described as splitting the pass-band into adjacent partially overlapping sub-bands.

In some variations, the first pass-band has a bimodal distribution, where the first mode is at around 435 nanometers and the second mode is around 455 nanometers. In such variations the peak transmittance of the first mode may be equal to or greater than the peak transmittance of the second mode.

In some variations, with respect to an angle of incidence where the second pass-band center wavelength is between about 525 nanometers and about 535 nanometers, the filter is configured to provide a chromaticity coordinate for a yellow traffic signal defined by industrial standard ANSI Z80.3-2010 that is as reddish, or nearly as reddish, as allowed by that standard.

In some variations, the filter is configured to increase red-green color discrimination for an observer with deuteranomaly. In preferable variations the third pass-band has center wavelength between about 620 nanometers and about 640 nanometers. In some such variations the first pass-band has a center located at about 445 nanometers, the second pass-band has a center wavelength of about 535 nanometers and the third pass-band has a center wavelength of about 635 nanometers.

In some variations, the filter is configured to increase red-green color discrimination for an observer with mild deuteranomaly. In some such variations the white-point is neutral and the importance-weighted percent gamut area increase with respect to the Farnsworth D-15 colors is at least about 30 percent. In further such variations the percent gamut area increase with respect to the Farnsworth D-15 colors is greater than zero for angles between zero degrees and at least about 25 degrees.

In some variations, the filter is configured to increase red-green color discrimination for an observer with moderate deuteranomaly. In some such variations the white-point is neutral and the importance-weighted percent gamut area increase with respect to the Farnsworth D-15 colors is at least about 35 percent. In further such variations the percent gamut area increase with respect to the Farnsworth D-15 colors is greater than zero for angles between zero degrees and at least about 25 degrees.

In some variations, the filter is configured to increase red-green color discrimination for an observer with severe deuteranomaly. In such variations, the stop-bands may have a minimum transmittance that is about one fifth of the luminous transmittance between about 580 nanometers and about 650 nanometers, and less than about one fifth, for example about one tenth, of the luminous transmittance between about 475 nanometers and about 580 nanometers. In some such variations the white-point is neutral and the importance-weighted percent gamut area increase with respect to the Farnsworth D-15 colors is at least about 40 percent. In further such variations the percent gamut area increase with respect to the Farnsworth D-15 colors is greater than zero for angles between zero degrees and at least about 25 degrees.

In some variations, the filter is configured to increase red-green color discrimination for an observer with protanomaly. In some such variations the third pass-band has center wavelength between about 605 nanometers and about 620 nanometers. In some such variations the first pass-band has a center wavelength of about 440 nanometers, the second pass-band has a center wavelength of about 530 nanometers, and the third pass-band has a center wavelength of about 615 nanometers. In some such variations the white-point is neutral and the percent gamut area increase with respect to the Farnsworth D-15 colors provided by the filter at normal incidence is at least about 40 percent. In further such variations the percent gamut area increase with respect to the Farnsworth D-15 colors is greater than zero for angles between zero degrees and at least about 25 degrees.

In some variations the filter is manufactured by incorporation of a neutral density absorptive filter in combination with an interference filter. In further variations the filter is manufactured by incorporation of a neodymium-containing substrate in addition to the neutral density absorptive filter in combination with an interference filter.

As suitable, the filter of any of the above variations may be incorporated into eyewear. Such eyewear may include, for example, eyeglasses (e.g., sunglasses), goggles, contact lenses, or any other suitable ophthalmic lens.

In another aspect, a multi-band filter comprises three or more pass-bands separated by two or more stop-bands. The pass-bands and the stop-bands are configured to transmit blue, red, and green primary lights of an electronic visual display so that the lights appear with about equal luminance and where the luminous transmittance of the primary lights is at least about 15% greater than the luminous transmittance of daylight. In some such variations the white-point is neutral and the percent gamut area increase with respect to the Farnsworth D-15 colors is greater than zero for angles between zero degrees and at least about 25 degrees. In some such variations the importance-weighted percent gamut area increase with respect to the Farnsworth D-15 colors is at least about 20 percent.

In some variations, the multi-band filter has a luminous transmittance between about 8 percent and about 40 percent and the bands are configured so that the white-point of the filter is neutral or nearly neutral, such that the (x,y) chromaticity coordinate of the white-point is within about 0.05 units of (0.31, 0.33) with respect to Illuminant D65 on the CIE xyY 1931 2-degree standard observer color space.

In some variations, the filter has three pass-bands and the first pass-band has a center wavelength at about 450 nanometers and a width of about 20 nanometers, the second pass-band has a center wavelength at about 535 nanometers and a width of about 25 nanometers, and the third pass-band has a center wavelength at about 615 nanometers and a width of about 30 nanometers.

In some variations the filter has four pass-bands, the first pass-band has a center wavelength at about 455 nanometers and a width of about 20 nanometers, the second pass-band has a center wavelength at about 540 nanometers and a width of about 25 nanometers, the third pass-band has a center wavelength at about 615 nanometers and a half-maximum width of about 25 nanometers, and the fourth pass-band has a center wavelength at about 680 nanometers and a half-maximum width of about 25 nanometers.

In some variations, the pass bands are positioned and/or shaped so that the filter provides stable color appearances for angles of incidence between about 0 degrees and about 40 degrees away from the surface normal vector such that the white-point of average daylight is contained in a region with a radius of about 0.01 units on the CIELUV 1931 2-degree standard observer chromaticity (u', v') scale for all, or nearly all, of the angles of incidence.

In some variations, the computer display for which the filter is configured is a liquid crystal display (LCD) with a light emitting diode (LED) backlight.

In some variations the white-point is neutral and the importance-weighted percent gamut area increase with respect to the Farnsworth D-15 colors provided by the filter is at least about 20 percent.

In some variations the filter is manufactured by incorporation of a neutral density absorptive filter in combination with an interference filter.

As suitable, the filter of any of the above variations may be incorporated into eyewear. Such eyewear may include, for example, eyeglasses (e.g., sunglasses), goggles, contact lenses, or any other suitable ophthalmic lens.

In another aspect, a multi-band filter providing enhanced eye safety is configured to provide normal color appearances and also to provide a blocking band, where the blocking band protects the eye from visible radiation at one or more wavelengths between about 450 nanometers and about 650 nanometers, and to provide the blocking over a range of angles of incidence between about 0 degrees and about 30 degrees away from the surface normal vector of the filter.

In some variations, the multi-band filter has a luminous transmittance between about 8 percent and about 40 percent and the bands are configured so that the white-point of the filter is neutral or nearly neutral, such that the (x,y) chromaticity coordinate of the white-point is within about 0.05 units of (0.31, 0.33) with respect to Illuminant D65 on the CIE xyY 1931 2-degree standard observer color space.

In some variations, the protective blocking band has a short wavelength boundary at about 530 nanometers and has a long wavelength boundary at about 560 nanometers, providing the protection from visible radiation at about 532 nanometers. In such variations the filter may comprise four pass-bands separated by three stop-bands, where the middle stop band is the protective band. The first pass-band has a center wavelength of about 440 nanometers and a width of about 20 nanometers, the second pass-band has a center wavelength of about 515 nanometers and a width of about 25 nanometers, the third pass-band has a center wavelength of about 570 nanometers and a width of about 25 nanometers, and the fourth pass-band has a center wavelength of about 635 nanometers and a width of about 25 nanometers.

In such variations the importance-weighted percent gamut area increase with respect to the Farnsworth D-15 colors is about zero. In some variations the percent gamut area increase with respect to the Farnsworth D-15 colors is about zero for angles between zero degrees and at least about 25 degrees.

In some variations, the blocking band has a short wavelength boundary at about 585 nanometers and a long wavelength boundary at about 620 nanometers, and thus provides protection from visible radiation at about 589 nanometers. In such variations the filter may comprise four pass-bands separated by two stop-bands, where the long-wavelength stop band provides the protection. In some variations the first pass-band has a center wavelength of about 455 nanometers and a width of about 20 nanometers, the second pass-band has a center wavelength of about 540 nanometers and a width of about 20 nanometers, the third pass-band has a center wavelength of about 570 nanometers and a width of about 20 nanometers the fourth pass-band has a center wavelength of about 635 nanometers and a width of about 30 nanometers.

In some such variations the white-point is neutral and the importance-weighted percent gamut area increase with respect to the Farnsworth D-15 colors is between about 0 percent and about 15 percent. In some such variations the percent gamut area increase with respect to the Farnsworth D-15 colors is greater than zero for angles between zero degrees and at least about 25 degrees.

In some variations the pass bands are positioned and/or shaped so that the filter provides stable color appearances for angles of incidence between about 0 degrees and about 35 degrees away from the surface normal vector such that the white-point of average daylight is contained in a region with a radius of about 0.01 units on the CIELUV 1931 2-degree standard observer chromaticity (u', v') scale for all, or nearly all, of the angles of incidence.

In some variations the filter is manufactured by incorporation of a neutral density absorptive filter in combination with an interference filter.

As suitable, the filter of any of the above variations may be incorporated into eyewear. Such eyewear may include, for example, eyeglasses (e.g., sunglasses), goggles, contact lenses, or any other suitable ophthalmic lens.

In another aspect, a multi-band filter for affecting color vision comprises three or more pass-bands separated by two or more stop-bands. The pass-bands and the stop-bands are configured to maximize reception of blue light by the retinal ganglion cells in combination with normal color discrimination.

In some variations the multi-band filter has three pass-bands separated by two stop-bands wherein the first pass-band has a center located at about 485 nanometers and a half-maximum width of about 90 nanometers, the second pass-band has a center wavelength of about 580 nanometers and a half-maximum width of about 25 nanometers, and the third pass-band has a center wavelength of about 630 nanometers and a half-maximum width of about 25 nanometers.

In some variations the multi-band filter has four pass-bands separated by three stop-bands wherein the first pass-band has a center wavelength of about 430 nanometers and a half-maximum width of about 30 nanometers, the second pass-band has a center wavelength of about 495 nanometers and a half-maximum width of about 50 nanometers, the third pass-band has a center wavelength of about 565 nanometers and a half-maximum width of about 20 nanometers, and the fourth pass-band has a center wavelength of about 630 nanometers and a half-maximum width of about 20 nanometers.

In some variations, the pass bands are positioned and/or shaped so that the filter provides stable color appearances for angles of incidence between about 0 degrees and about 30 degrees away from the surface normal vector such that the white-point of average daylight is contained in a region with a radius of about 0.01 units on the CIELUV 1931 2-degree standard observer chromaticity (u', v') scale for all, or nearly all, of the angles of incidence.

In some variations the white-point is neutral and the importance-weighted percent gamut area increase with respect to the Farnsworth D-15 colors is between about 0 percent and about −10 percent.

In some variations, the multi-band filter has a luminous transmittance between about 8 percent and about 40 percent and the bands are configured so that the white-point of the filter is on or nearly on the boundary defining the limit for a filter considered not strongly colored according to the industrial standard ANSI Z80.3-2010.

In some variations the filter is manufactured by incorporation of a neutral density absorptive filter in combination with an interference filter. In further variations the filter is manufactured by incorporation of a neodymium-containing substrate in addition to the neutral density absorptive filter in combination with an interference filter. In some variations the filter specification is significantly smoothed so that the interference filter can be manufactured with fewer than about 50 material layers.

As suitable, the filter of any of the above variations may be incorporated into eyewear. Such eyewear may include, for example, eyeglasses (e.g., sunglasses), goggles, contact lenses, or any other suitable ophthalmic lens.

In another aspect, a multi-band filter comprises three or more pass-bands and two or more stop-bands and the bands are configured to regulate and/or enhance the color appearance of light by human vision. The spectral transmittance of the filter f per wavelength λ, f(λ), may be substantially approximated by the expression:

$$f(\lambda)=\varepsilon+\Sigma_{i=1 \ldots N} w_i u_i(\lambda);$$

where, in the above expression, $u_i$ are the pass-bands and $w_i$ are weighting coefficients that scale the pass-bands, and ε is the minimum transmittance of the filter.

The specification of transmittance of filters (f, u), per wavelength λ in the above expression may be tabulated by uniform sampling on a wavelength scale (e.g., using a step size of 1 nanometer), or on another scale that is substantially equivalent (e.g., frequency or log wavenumber). The sampling may also be defined on an arbitrary scale with non-uniform intervals between sample points.

In some variations the filter comprises three pass-bands and two stop-bands (i.e., N=3 in the above expression).

In some variations the filter comprises four pass-bands and three stop-bands (i.e., N=4 in the above expression).

In some variations, the filter pass-bands are essentially rectangular, i.e., the change in transmittance per wavelength at the band boundaries is instantaneous or nearly instantaneous. The width of a rectangular pass-band may be characterized by the distance between the short wavelength boundary and the long wavelength boundary. The rectangular band-width may be equivalently measured on a frequency scale. The spectral transmittance of a rectangular pass-band may be defined by the expression:

$$u_{(\mu,\sigma)}(\lambda)=H(\lambda-(\mu-\sigma/2))-H(\lambda-(\mu+\sigma/2));$$

where μ is the center wavelength, σ is the rectangular band-width and H is the Heaviside step function.

In some variations, the filter pass-bands are essentially Gaussian, i.e., the change in transmittance per wavelength at the band boundaries is gradual or essentially smooth. The width of a Gaussian pass-band may be characterized by the distance between the half-maximum transmittance on the short wavelength side to the half-maximum transmittance on the long wavelength boundary (also called the full-width at half-maximum (FWHM)). The half-maximum band-width may be equivalently measured on a frequency scale. The spectral transmittance of a Gaussian pass-band may be defined by the expression:

$$e_{(\mu,\sigma)}(\lambda)=\exp(-(\lambda-\mu)^2)/(2\sigma^2));$$

where μ is the center wavelength and the half-maximum band-width is:

$$2\sigma\ \mathrm{sqrt}(2\ \ln(2)).$$

In some variations, one or more of the pass-bands may have an irregular shape (i.e., not rectangular and not Gaussian). For example the pass-band may have a bimodal distribution, or may have a shoulder on one or more sides of the pass-band, or may be described as a skewed distribution, where the slope ratio between the two sides of the pass-band, in transmittance per wavelength, is between about 4:1 and about 1:4.

In variations with non-Gaussian pass-bands, such pass-bands may be smoothed with a Gaussian kernel that is wide enough to essentially remove the irregularity and/or sharp transitions, in which case the pass-band may be described as having a band center and half-maximum width of the corresponding smoothed pass-band.

In some variations, the pass-bands are positioned and/or shaped so that the filter provides stable color appearances for angles of incidence between about 0 degrees and about 35 degrees away from the surface normal vector such that the white-point of daylight is contained in a region with a radius of about 0.01 units on the CIELUV 1931 2-degree standard observer chromaticity diagram for all, or nearly all, of the angles of incidence.

In some variations, the pass-bands are positioned and/or shaped so that the filter provides stable color appearances for angles of incidence between about 0 degrees and about 40 degrees away from the surface normal vector such that the white-point of daylight is contained in a region with a radius of about 0.01 units on the CIELUV 1931 2-degree standard observer chromaticity diagram for all, or nearly all, of the angles of incidence.

In some variations, the pass-bands are positioned and/or shaped so that the filter provides stable color appearances for angles of incidence between about 0 degrees and about 45 degrees away from the surface normal vector such that the white-point of daylight is contained in a region with a radius of about 0.01 units on the CIELUV 1931 2-degree standard observer chromaticity diagram for all, or nearly all, of the angles of incidence.

In some variations, the pass bands are positioned and/or shaped so that the filter provides stable color appearances such that the angle of incidence—dependent distance by which the white point shifts from its position for zero degrees angle of incidence has a local minimum at an angle between about 20 and about 45 degrees angle of incidence, where the white-point shift at the local minimum is less than 0.02 units on the CIELUV 1931 2-degree standard observer chromaticity (u', v') scale.

In some variations, the pass bands are positioned and/or shaped so that the filter provides stable color appearances such that the angle of incidence—dependent distance by which the white point shifts from its position for zero degrees angle of incidence has a local minimum at an angle between about 20 and about 45 degrees angle of incidence, where the white-point shift at the local minimum is less than 0.01 units on the CIELUV 1931 2-degree standard observer chromaticity (u', v') scale.

In some variations, the multi-band filter is manufactured as an interference filter.

In some variations, the multi-band filter is manufactured comprising an interference filter and one or more neutral-density absorptive filters and the interference filter provides the pass-bands and stop-bands.

In some variations, the multi-band filter is manufactured comprising an interference filter and one or more broad-band absorptive filters and the interference filter provides the pass-bands and stop-bands.

In some variations, the multi-band filter is manufactured comprising an interference filter and one or more narrow-band absorptive filters where the interference filter and absorptive filter are jointly configured to provide the pass-bands and stop-bands.

In any of the above variations the multi-band filter f may comprise an absorptive filter p with an interference filter q, where the change in transmittance per angle of incidence of p is in accordance with the Beer-Lambert Law, and the change in transmittance per angle of incidence of q is in accordance with Snell's Law, so that the transmittance of f at an angle of incidence θ radians away from the surface normal vector may be denoted $f_\theta(\lambda)$ and approximated by the expression:

$$q(\lambda)=f(\lambda)/p(\lambda),$$

$$f_\theta(\lambda)=p(\lambda)^{(1/cos(\theta))}q(\lambda/\text{sqrt}(1-\sin^2(\theta)/n^2));$$

where the effective refractive index of interference filter q is n which has a value of about 1.85, the spectral transmittance of p at normal incidence is p(λ), the spectral transmittance of f at normal incidence is f(λ), the spectral transmittance of q at normal incidence is q(λ), and the approximation is sufficient for θ between about 0 degrees and about 30 degrees.

In some such variations the spectral transmittance of q may be shifted towards longer wavelengths, as computed by the expression:

$$q'(\lambda)=q(\alpha\lambda), \text{ and}$$

$$1.0>\alpha>1.03;$$

where α is a coefficient determining the amount of shift, and α is selected to maximize a performance criteria of the filter over a range of angles of incidence.

In some variations, the filter comprises an interference filter where the spectral transmittance of the interference filter is significantly smoothed, where the width of the smoothing kernel is selected to not unduly compromise the performance of the filter while also enabling the filter to be manufactured as a low-order stack of dielectric materials.

As suitable, the filter of any of the above variations may be incorporated into eyewear. Such eyewear may include, for example, eyeglasses (e.g., sunglasses), goggles, contact lenses, or any other suitable ophthalmic lens.

In another aspect, a computer-implemented method for determining the distribution of the physical thickness of a filter on a surface comprises, using a computer, defining the spectral transmittance of the filter, defining the spectral transmittance of the filter over a range of angles of incidence, defining a geometric model of the surface, defining a geometric model of a human eye, configuring the geometric models to approximate the geometry of an eyewear frame where the surface is a lens mounted in the frame and situated in front of the eye, computing for each location on the surface the angle of incidence of light passing through the location that is imaged on the retina of the eye, and specifying a physical thickness per each location, where the physical thickness is configured so that the spectral transmittance is invariant, or substantially invariant at all, or nearly all locations on the surface with respect to the computed angles of incidence.

In another aspect, a computer-implemented method for determining the distribution of the physical thickness of a filter on a surface comprises, using a computer, defining a spectral transmittance of a filter, defining the spectral transmittance of the filter over a range of angles of incidence, defining a geometric model of the surface, defining a geometric model of the relative physical thickness of the filter deposited onto the surface (for example, as the result of prediction or measurement of the physical thickness distribution achieved by a particular manufacturing process), defining a geometric model of a human eye, configuring the geometric models to approximate the geometry of an eyewear frame where the surface is a lens mounted in the frame and situated in front of the eye, computing the location on the surface corresponding to the center of the field of view, computing the angle of incidence of light passing through the central location, defining an importance distribution per location relative to the central location, specifying a physical thickness at the central location where the physical thickness is selected so that light passing through the central location and imaged onto the retina is filtered according to the defined spectral transmittance, computing the importance-weighted average effect on color vision over the surface of the lens associated with a range of changes in physical thickness within +/−10 percent of the specified central physical thickness, and then selecting a biased central physical thickness within the range such that the importance-weighted average effect on color vision is maximized.

In another aspect a lens for eyewear incorporating a multi-band filter comprises an optical substrate, one or more reflective interference filters, and one or more absorptive filters positioned on one side or both sides of the reflective filters, where the absorptive filters are configured to reduce the luminosity of reflected light on one side or on both sides of the lens.

In some variations, the interference filter comprises a low-order stack having between about 12 and about 50 dielectric material layers, or is between about 1 and about 3 microns thick, or comprises a low-order stack having between about 12 and about 50 dielectric material layers and is between about 1 and about 3 microns thick.

In some variations, the interference filter comprises a high-order stack having between about 50 and at least about 200 dielectric material layers, or is between about 6 and at least about 12 microns thick, or comprises a high-order stack having between about 50 and at least about 200 dielectric material layers and is between about 6 at least about 12 microns thick.

The dielectric material layers comprising the interference filter may include, for example, thin films of titanium dioxide and silicon dioxide. The material layers may be fabricated, for example, by physical vapor deposition in, for example, a magnetron sputtering machine. Alternatively, or in addition, the dielectric material layers may be fabricated, for example, by spin-coat deposition.

In some variations a neutral density absorptive filter is provided by a metal attenuation coating. The metal material layers may be fabricated, for example, by physical vapor deposition. In such variations the metal layers may be interleaved, or partially interleaved with the dielectric layers of the interference filter.

In some variations a photo-activated neutral density absorptive filter is provided by incorporation of photochromic materials into a glass or polymer substrate. In such variations the interference filter may be deposited on the convex surface of the lens.

In some variations a linear polarizing neutral density absorptive filter is provided by incorporating a polarizing filter into a laminated composite lens or by coating onto the surface of the lens. In such variations the polarizer may be situated between the interference filter and the side of the lens facing the eye.

In some variations an absorptive filter is provided by organic dyes in a polymer substrate. The polymer material may be incorporated into the lens by any suitable means, such as, for example, by incorporation into the optical substrate media, lamination of a film between two optical substrates, or by spin-coating or dip-dying the surface of an optical substrate.

In some variations an absorptive filter is provided by incorporation of inorganic materials into a glass or polymer substrate. In some of such variations the inorganic materials may include the rare-earth ions of praseodymium, holmium, neodymium, or a mixture of any thereof.

In some variations the one or more absorptive filters are configured to affect the color appearance of daylight reflected by the outer surface of the lens (the surface furthest from the eye), where the color appearance is configured for aesthetic reasons.

In some variations, absorptive filters comprise a first circular polarizer positioned on one side of the interference filter and configured to absorb light reflected by the interference filter, and a second circular polarizer position on the opposite side of the interference filter from the first circular polarizer and configured to absorb light reflected by the interference filter, and the first and second circular polarizers configured to transmit light through the interference filter.

In some variations, an absorptive filter on the side of the lens nearest to the eye is provided by a first circular polarizer fixed to one side of the interference filter and configured to absorb light reflected by the interference filter.

In variations incorporating one or more circular polarizers, a circular polarizer comprising a linear polarizer and a quarter-wave retarder, the linear polarizer element may be configured to provide partial polarization efficiency, e.g., between about 60 percent and about 90 percent.

In variations containing a linear polarizer, the linear polarizer may be configured to attenuate horizontally polarized light, as to reduce glare from sunlight reflected by horizontal surfaces in accordance with the Brewster's angle phenomenon.

In some variations, all functional layers of the filter are positioned on one side of the optical substrate, and the opposite side of the substrate has an anti-reflection coating that reduces scattering and resonance of reflected light within the optical substrate, and the luminosity-weighted reflectance of the anti-reflection coating is less than about 0.5 percent.

In some variations, all functional layers of the filter are sandwiched between two optical substrates, the outer surfaces of the optical substrates are anti-reflection coated to reduce scattering and resonance of reflected light within the optical substrates.

In some variations, the edge of the lens may be sealed with an index-matched absorptive polymer coating, the edge coating reducing transmission of and scattering of stray light within the optical substrate and additionally protecting the layers of the filter from contamination (e.g. from penetration of water or solvents into the dielectric or metal material layers).

In some variations, all functional layers of the filter are metal or metal-oxide coatings as compatible with fabrication by physical vapor deposition.

In some variations the optical substrate is chemically strengthened glass. In such variations the glass may absorb ultraviolet light between about 280 nanometers and about 400 nanometers, for example.

In some variations, the interference filter is deposited on a surface such that the physical thickness of the dielectric material layers is configured so that the optical thickness is invariant, or substantially invariant, at two or more locations on the surface, where the effective angle of incidence of light to the filter at the two or more locations are different by at least 20 degrees, and where the effective angle of incidence of light corresponds to a ray of light passing through the lens and imaged onto the retina of the eye.

In some variations, the optical substrate is curved, where the radius of curvature is between about 50 millimeters and about 200 millimeters. In such variations the interference filter and/or attenuation coatings may be positioned on the concave side of the surface.

As suitable, the lens of any of the above variations may be incorporated into eyewear including, for example, eyeglasses (e.g., sunglasses), goggles, or contact lenses.

In another aspect, a light source comprises an illuminant, a first beam-forming element, a multi-band interference filter, and a second beam-forming element. Light radiated from the illuminant is substantially collimated by the first beam-forming element. The collimated beam is incident to the multi-band filter where it is split into a transmitted and a reflected portion. The transmitted and reflected portions of the light have identical or substantially identical white points with respect to the selected illuminant. The transmitted portion of the light provides illumination that enhances the apparent purity of red and green colors, and the reflected portion of the light provides illumination that enhances the apparent purity of blue and yellow colors. The second beam-forming element combines the transmitted and reflected portions of the light into an output beam, with the transmitted and reflected light at least partially spatially separated in the output beam.

In some variations, the output beam has a central portion comprising primarily light transmitted by the multi-band filter and an outer portion comprising primarily light reflected by the multi-band filter.

In some variations the functions of the first and second beam forming elements are combined in a single beam-forming element.

In some variations, the beam collimation angle of light incident on the multi-band filter from the illuminant is about 20 degrees. In such variations the white-point of the filter with respect to the illuminant may be contained, for example, in a region with a radius of about 0.01 units on the CIELUV 1931 2-degree standard observer chromaticity scale for all, or nearly all, of the locations within the collimated beam.

In some variations, the multi-band filter comprises three pass-bands separated by two stops-bands, where the first pass-band has a center wavelength at about 450 nanometers and a band-width of about 15 nanometers, the second pass-band has a center wavelength at about 535 nanometers and a band-width of about 20 nanometers, and the third pass-band has a center wavelength at about 625 nanometers and a band width of about 30 nanometers.

In some variations, the stop-bands have a minimum transmittance of about 10 percent. In further variations the stop-bands have a minimum transmittance of about 1 percent.

In some variations, the illuminant comprises one or more phosphor-based white light-emitting diodes and one or more red light emitting diodes. A broad-band combination of light from the white light-emitting diode and the red light-emitting diode emitted by the illuminant has an equivalent color temperature between about 5000K and about 7000K and a CRI between about 80 and 90.

In some variations, the illuminant comprises a phosphor-based white light-emitting diode, a cyan light emitting diode, and a red light emitting diode. The light emitted by the combined diodes has a broad-band spectral radiant flux with a correlated color temperature between about 5000K and about 7000K and a CRI between about 90 and 100. In some such variations the spectral radiant flux of the illuminant is configured to be a best-fit approximation of average daylight (D65).

All of the methods and their variations disclosed herein for designing, evaluating, or otherwise assessing optical filters, eyewear, ophthalmic lenses, illuminants, and other optical components or devices may include the step of manufacturing such an article, of having another manufacture such an article, or of providing a manufacturing specification for the article to another, whether or not a such step is expressly stated in the description of the particular method, article, or variation thereof.

These and other aspects, embodiments, variations, features and advantages of the present invention will become more apparent to those skilled in the art when taken with reference to the following more detailed description of the invention in conjunction with the accompanying drawings that are first briefly described.

BRIEF DESCRIPTION OF THE DRAWINGS

FIGS. 2A, 2B: Graph of the spectral absorptance of retinal photopigments for a normal human (FIG. 2A) and a table of retinal photopigment spectral absorptance peak variants corresponding to known genotypes in the human population (FIG. 2B).

FIGS. 10A, 10B: Tristimulus diagram showing a tristimulus value corresponding to a color appearance and the boundary of a constraining convex polyhedron (FIG. 10A), expanded view of the boundary of the tristimulus value and constraining convex polyhedron (FIG. 10B).

(FIG. 17A), a graph of the spectral radiant flux of daylight (FIG. 17B), and a graph of the spectral transmittance of the filter and of the filter wavelength shifted by −2.5 percent and by −5 percent (FIG. 17C).

(FIG. 43A). Graph of a filter compliant with the constraints and of the filter smoothed with a smoothing kernel (FIG. 43B).

(FIG. 54A). Graph of a blue-tinted broad-band reference filter and of a multi-band filter that maximizes photonic energy absorbed by the retinal ganglion cell (FIG. 54B).

FIGS. 59A,-59B-1, 59B-2: Table of evaluated performance criteria for the filter of FIGS. 31A-31E for enhancing color discrimination for a normal observer (FIG. 59A). Table of transmittance of filter components, cost function, transmittance constraints and manufacturing specification for the filter (FIGS. 59B-1 and 59B-2).

FIGS. 60A, 60B-1, 60B-2: Table of evaluated performance criteria for the filter of FIGS. 32A-32E for enhancing red-green color discrimination for a normal observer (FIG. 60A). Table of transmittance of filter components, cost function, transmittance constraints and manufacturing specification for the filter (FIGS. 60B-1 and 60B-2).

FIGS. 61A, 61B-1, 61B-2: Table of evaluated performance criteria for the filter of FIGS. 33A-33E for enhancing red-green color discrimination for a normal observer and providing stable color appearance over a range of angles of incidence (FIG. 61A). Table of transmittance of filter components, cost function, transmittance constraints and manufacturing specification for the filter (FIGS. 61B-1 and 61B-2).

FIGS. 62A, 62B-1, 62B-2: Table of evaluated performance criteria for the filter of FIGS. 34A-34E for enhancing blue-yellow color discrimination for a normal observer and providing stable color appearance over a range of angles of incidence (FIG. 62A). Table of transmittance of filter components, cost function, transmittance constraints and manufacturing specification for the filter (FIGS. 62B-1 and 62B-2).

FIGS. 63A, 63B-1, 63B-2: Table of evaluated performance criteria for the filter of FIGS. 35A-35E for enhancing red-green color discrimination for a normal observer and providing suppression of short-wavelength blue light and providing stable color appearance over a range of angles of incidence (FIG. 63A). Table of transmittance of filter components, cost function, transmittance constraints and manufacturing specification for the filter (FIGS. 63B-1 and 63B-2).

FIGS. 64A, 64B-1, 64B-2: Table of evaluated performance criteria for the filter of FIGS. 36A-36E for enhancing red-green color discrimination for an observer with mild deuteranomaly and providing stable color appearance over a range of angles of incidence (FIG. 64A). Table of transmittance of filter components, cost function, transmittance constraints and manufacturing specification for the filter (FIGS. 64B-1 and 64B-2).

FIGS. 65A, 65B-1, 65B-2: Table of evaluated performance criteria for the filter of FIGS. 37A-37E for enhancing red-green color discrimination for an observer with moderate deuteranomaly and providing stable color appearance over a range of angles of incidence (FIG. 65A). Table of transmittance of filter components, cost function, transmittance constraints and manufacturing specification for the filter (FIGS. 65B-1 and 65B-2).

FIGS. 66A, 66B-1, 66B-2: Table of evaluated performance criteria for the filter of FIGS. 38A-38E for enhancing red-green color discrimination for an observer with severe deuteranomaly and providing stable color appearance over a range of angles of incidence (FIG. 66A). Table of transmittance of filter components, cost function, transmittance constraints and manufacturing specification for the filter (FIGS. 66B-1 and 66B-2).

FIGS. 67A, 67B-1, 67B-2: Table of evaluated performance criteria for the filter of FIGS. 39A-39E for enhancing red-green color discrimination for an observer with protanomaly and providing stable color appearance over a range of angles of incidence (FIG. 67A). Table of transmittance of filter components, cost function, transmittance constraints and manufacturing specification for the filter (FIGS. 67B-1 and 67B-2).

FIGS. 68A, 68B-1, 68B-2: Table of evaluated performance criteria for the filter of FIGS. 40A-40E for enhancing the luminosity of primary lights emitted by an electronic visual display for a normal observer and providing stable color appearance over a range of angles of incidence (FIG. 68A). Table of transmittance of filter components, cost function, transmittance constraints and manufacturing specification for the filter (FIGS. 68B-1 and 68B-2).

FIGS. 69A, 69B-1, 69B-2: Table of evaluated performance criteria for the filter of FIGS. 41A-41E for providing eye protection from a 532 nanometer frequency-doubled Nd:YAG laser and providing stable color appearance over a range of angles of incidence (FIG. 69A). Table of transmittance of filter components, cost function, transmittance constraints and manufacturing specification for the filter (FIGS. 69B-1 and 69B-2).

FIGS. 70A, 70B-1, 70B-2: Table of evaluated performance criteria for the filter of FIGS. 42A-42E for providing eye protection from a 589 nanometer sodium flare and providing stable color appearance over a range of angles of incidence (FIG. 70A). Table of transmittance of filter components, cost function, transmittance constraints and manufacturing specification for the filter (FIGS. 70B-1 and 70B-2).

FIGS. 71A, 71B-1, 71B-2: Table of evaluated performance criteria for the filter of FIGS. 45A-45E for providing suppression of short-wavelength blue light and high luminous transmittance (FIG. 71A). Table of transmittance of filter components, cost function, transmittance constraints and manufacturing specification for the filter (FIGS. 71-B1 and 71-B2).

FIGS. 72A, 72B-1, 72B-2: Table of evaluated performance criteria for the neodymium-containing filter of FIGS. 48A-48E for enhancing red-green color discrimination for a normal observer and providing stable color appearance over a range of angles of incidence (FIG. 72A). Table of transmittance of filter components, cost function, transmittance constraints and manufacturing specification for the filter (FIGS. 72B-1 and 72B-2).

FIGS. 73A, 73B-1, 73B-2: Table of evaluated performance criteria for the neodymium-containing filter of FIGS. 49A-49E for enhancing blue-yellow color discrimination for a normal observer and providing stable color appearance over a range of angles of incidence (FIG. 73A). Table of transmittance of filter components, cost function, transmittance constraints and manufacturing specification for the filter (FIGS. 73B-1 and 73B-2).

FIGS. 74A, 74B-1, 74B-2: Table of evaluated performance criteria for the neodymium-containing filter of FIGS. 50A-50E for enhancing red-green color discrimination for an observer with mild deuteranomaly and providing stable color appearance over a range of angles of incidence (FIG. 74A). Table of transmittance of filter components, cost function, transmittance constraints and manufacturing specification for the filter (FIGS. 74B-1 and 74B-2).

FIGS. 75A, 75B-1, 75B-2: Table of evaluated performance criteria for the neodymium-containing filter of FIGS. 51A-51E for enhancing red-green color discrimination for an observer with moderate deuteranomaly and providing stable color appearance over a range of angles of incidence (FIG. 75A). Table of transmittance of filter components, cost function, transmittance constraints and manufacturing specification for the filter (FIGS. 75B-1 and 75B-2).

FIGS. 76A, 76B-1, 76B-2: Table of evaluated performance criteria for the neodymium-containing filter of FIGS. 52A-52E for enhancing red-green color discrimination for an observer with severe deuteranomaly and providing stable color appearance over a range of angles of incidence (FIG. 76A). Table of transmittance of filter components, cost function, transmittance constraints and manufacturing specification for the filter (FIGS. 76B-1 and 76B-2).

FIGS. 77A, 77B-1, 77B-2: Table of evaluated performance criteria for the neodymium-containing filter of FIGS. 53A-53E for enhancing red-green color discrimination for an observer with protanomaly and providing stable color appearance over a range of angles of incidence (FIG. 77A). Table of transmittance of filter components, cost function, transmittance constraints and manufacturing specification for the filter (FIGS. 77B-1 and 77B-2).

FIGS. 78A, 78B-1, 78B-2: Table of evaluated performance criteria for the three pass-band filter of FIGS. 55A-55E for enhancing reception of optical power by the retinal ganglion cells (FIG. 78A). Table of transmittance of filter components, cost function, transmittance constraints and manufacturing specification for the filter (FIGS. 78B-1 and 78B-2).

FIGS. 79A, 79B-1, 79B-2: Table of evaluated performance criteria for the four pass-band filter of FIGS. 56A-56E for enhancing absorption of optical power by the retinal ganglion cells and providing stable color appearance over a range of angles of incidence (FIG. 79A). Table of transmittance of filter components, cost function, transmittance constraints and manufacturing specification for the filter (FIGS. 79B-1 and 79B-2).

FIGS. 80A, 80B-1, 80B-2: Table of evaluated performance criteria for the neodymium-containing thee pass-band filter of FIGS. 57A-57E for enhancing reception of optical power by the retinal ganglion cells and providing stable color appearance over a range of angles of incidence (FIG. 80A). Table of transmittance of filter components, cost function, transmittance constraints and manufacturing specification for the filter (FIGS. 80B-1 and 80-B2).

DETAILED DESCRIPTION

Figure 1:
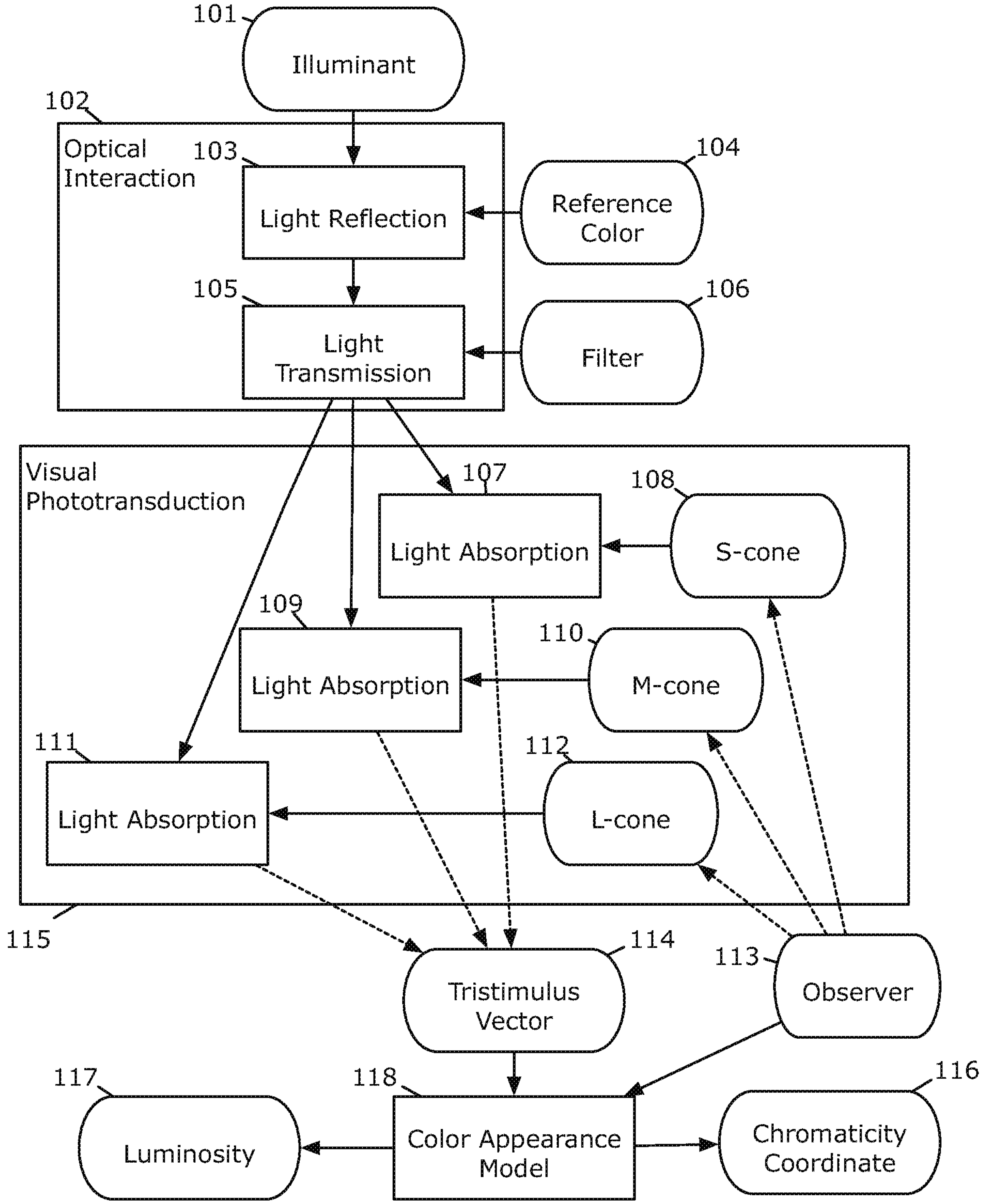
FIG. 1: Process flow diagram depicting photopic observation and color perception by the human eye.

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used in this specification and the appended claims, the singular forms "a," "an," and "the" include plural referents unless the context clearly indicates otherwise.

The teachings of the present disclosure may be beneficially read along with a general understanding of the science of optics, the science of human color vision, the science of colorimetry and related topics. For a general reference on these topics see, for example, Gunter Wyszecki and W. S. Stiles, "Color Science: Concepts and Methods, Quantitative Data and Formulae", Wiley, 1982, ISBN #0471021067.

Without loss of generality, the present disclosure may presume a conventional configuration of the human visual system: specifically, unless stated otherwise, that of the photopic color vision of a normal human observer having a 2-degree field of view. Photopic color vision occurs when the level of illumination is high enough that the rod photoreceptor cells are not active, e.g. when mean surface illumination is about 10 lux or greater. In this disclosure color appearance models are calculated using the CIE 1976 L*u'v' (LUV) color space using the CIE 1931 Standard Observer with a 2-degree field of view, unless stated otherwise. The details of this calculation are given by CIE Standard S 014-5/E:2009. Chromaticity diagrams are shown in figures using the CIE 1976 Uniform Chromaticity Scale (UCS) where the chromaticity coordinates are the (u', v') values as computed by that standard. For the practitioner with ordinary skill in the art, these teachings provide sufficient instruction to apply the teachings to alternative conditions, including, for example, use of the CIE 1964 10-degree Standard Observer, and furthermore, variations of the eye and retinal physiology of the observer (for example to account for color deficiency, age and/or ocular pathology, for example by introducing a variance in the photopigment spectral absorptance and/or pre-receptoral ocular components including the ocular media and the macular pigment, of the angular size of the field of view, and of the choice of color appearance model used in analysis.

In the present disclosure, Illuminant D65 (D65) refers to light having the typical spectral radiant flux of daylight with a correlated color temperature of 6500 Kelvin, and is defined by joint ISO/CIE standard ISO 10526:1999/CIE 5005/E-1998. References to "daylight", "sunlight" or "average daylight" in this disclosure refer to Illuminant D65. Illuminant E refers to an ideal light defined as having equal power per wavelength. Illuminant A refers to a light, typical of incandescent bulbs, defined as having the spectral radiant flux of an ideal black-body radiator according to Planck's law with a correlated color temperature of 2848K. The family of lights comprising Illuminant FL1 through FL12, which represent the spectral radiant flux of typical types of fluorescent lamps, is defined by CIE Publication 15:2004. The Munsell colors are a set of color swatches that are formulated with specific pigments to establish a standard for colors that is defined at the spectral domain. The Munsell colors are available in printed form in The Munsell Book of Color, Glossy Edition, ISBN #9994678620, 1980. Measurement of the spectral reflectance of the Munsell colors are published by Parkkinen J. P. S., Hallikainen J. and Jaaskelainen T., "Characteristic spectra of Munsell colors.", Journal of the Optical Society of America A, vol. 6, no. 2, 1989, pp. 318-322. The Farnsworth D-15 is a standardized color discrimination test comprising 15 Munsell color samples that form a contour with chroma of between 2 and 4 on the Munsell scale. The Farnsworth D-15 is described by the publication "The Farnsworth dichotomous test for color blindness panel D15 manual.", New York: Psych Corp; 1947, Farnsworth D.

Figure 58:
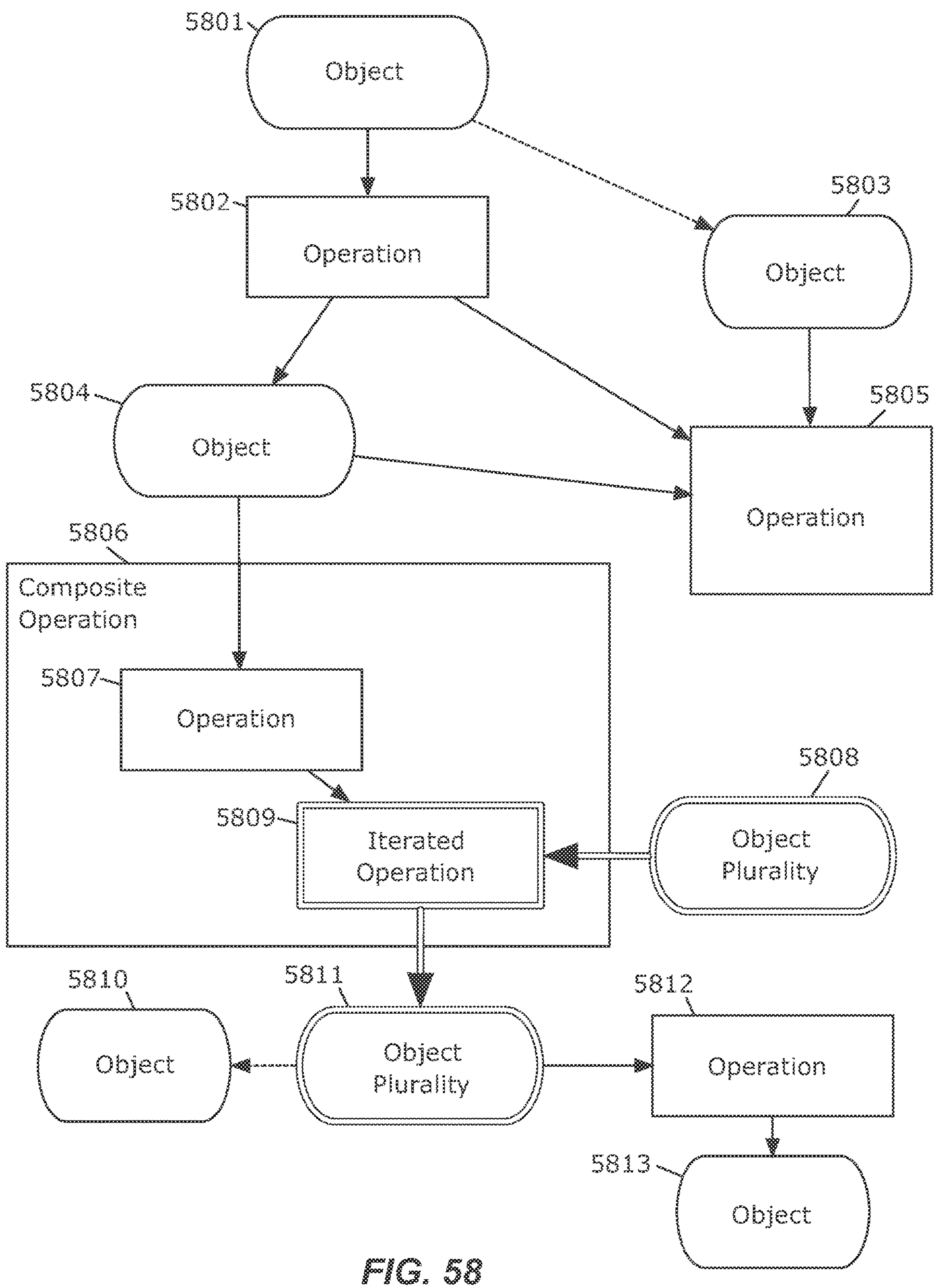
FIG. 58: Example process flow diagram for describing and demonstrating the syntax and structure of process flow diagrams as they appear in other figures.

Figures included in this disclosure may be process flow diagrams that visually depict the flow of generalized objects and operations that process and generate those objects. FIG. 58 depicts an example of a process flow diagram to aid in understanding the visual language. In this diagram, rounded boxes (e.g. at 5801 and 5803) depict objects, which may be understood as physical entities, virtual entities such as numerical data, or composite objects containing a heterogeneous aggregation of component objects. A composite object containing a homogeneous aggregation of objects is depicted by a rounded box with a double-lined boundary, e.g. as shown at 5808 and 5811. A component object extracted from a composite object is depicted with a dotted arrow, e.g. as shown connecting entities 5801 and 5803. The flow of objects in the process is shown by a solid arrow, e.g. as shown connecting entities 5801 and 5802. A squared box (e.g., at 5802 and 5805) represents an operation. Operations may generate objects, transform objects or analyze objects. The outputs of an operation are shown by arrows pointing away from its box. The output of an operation is dependent on its inputs, which may be traced by following all arrows leading into its box. Operations may be formed as a composite operation by encapsulating another process diagram, e.g. as shown at 5806. This construction enables process flow diagrams to be extended over multiple pages whereby a composite operation defined in one diagram may be invoked by reference in another diagram. Operations may be connected together in series or in parallel, the details of the order in which specific operations are performed is not necessarily defined by the process flow diagram syntax and must be inferred by accompanying description. A double-lined arrow, e.g. as shown connecting 5808 and 5809, represents iteration of the flow of a plurality of homogeneous objects. Operations that are iterated are shown with a doubled-lined squared boundary, e.g. at 5809. An iterated operation varies its input with respect to each iterated object, but may hold constant inputs with respect to non-iterated objects, e.g. as shown along the flow arrow connecting 5807 and 5809. The process flow diagrams used in this disclosure are provided to aid understanding when interpreted along with the accompanying detailed description.

The sense of color may be generally understood to arise from the interaction of the spectral radiant flux of light incident to the retina with the spectral absorptance of the retinal photoreceptor cells. The process of photopic color vision and the application of an optical filter to affect the sense of color are depicted in the process flow diagram of FIG. 1. Herein, an illuminant 101 (such as daylight) is radiated into an optical system 102. Light emitted by an illuminant may generally be considered white light. Within the optical system 102, the white light is reflected 103 from the surface of a reference color 104. The reflected light may then be described as a colored light, assuming the reference color is not neutral (i.e., not a shade of gray). The colored light may thereafter be transformed by wavelength selective transmission 105 by means of passing through an optical filter 106. Since conservation of energy must hold, the portion of light that is not transmitted must be either reflected or absorbed by the filter at this junction. The optical system at 102 is invariant with respect to reordering of its internal operations, i.e., the filter may be equivalently applied before or after the reference color is illuminated.

Subsequently the filtered light may be perceived by an observer by means of the process of visual phototransduction 115. In visual phototransduction under photopic conditions, light is absorbed, at 107, 109, and 111, by three classes of retinal photoreceptor cells including the S-cones 108, the M-cones 110, and the L-cones 112. The total amount of energy absorbed by each cell is converted into neural excitations that are transmitted via the optic nerves into the visual cortex eventually resulting in the sense of color. For the purposes of color appearance modeling it is sufficient to assume that the input-output response of the cone cells is linearly proportional to the amount of energy absorbed. This linear response may be called the tristimulus value, which may be considered as a vector in three-dimensional space with non-negative components. The space of tristimulus values as described is sometimes called the SML color space, or the cone excitation space.

Distances between points in the tristimulus space do not necessarily correspond well with the perceived dissimilarity between pairs of color stimuli, so it is useful (as further discussed below with reference to FIG. 3) to employ a color appearance model 118 that transforms the three-dimensional tristimulus vector into a one-dimensional component of luminosity 117, also called the brightness or intensity, and a two-dimensional component of chromaticity 116 which represents the apparent color of the stimulus independent of luminosity. The chromaticity may be considered as a vector-value in two dimensions in which case it may be called a chromaticity coordinate. The chromaticity may be further separated into hue, and saturation (also called purity, which is essentially the perceived dissimilarity between the color stimulus and a white stimulus). It may be noted that the spectral absorptance of the retinal photoreceptor cells at 108, 110 and 112 (FIG. 1) depend on the observer, and that significant variation exists in the human population. Furthermore the formulation of a color appearance model 118 may also depend on the observer 113, however standard models may be used in subsequent descriptions without loss of generality.

Graphs of the spectral absorptance of the retinal cone cell photopigments for a normal human eye are shown in FIG. 2A, including of the S-cone 201, M-cone 202, and L-cone 203 cells. However, as previously noted the spectral absorptance of retinal photoreceptor cells may vary significantly in the human population. These variations are the underlying cause of some forms of color vision deficiency. For example, an individual with deuteranomaly has an M-cone photopigment with a spectral absorptance shifted towards longer wavelengths, and an individual with protanomaly has an L-cone photopigment with a spectral absorptance shifted towards shorter wavelengths. Individuals with deuteranomaly experience more difficulty discriminating between red and green colors when compared to normal individuals. Individuals with protanomaly also experience greater than normal difficulty discriminating between red and green colors, and also tend to see red colors as less luminous. The spectral absorptance of anomalous retinal photopigments may be approximated by shifting a photopigment template on a log-wavenumber scale, for example by using the template published by Stockman, A., & Sharpe, L. T., "Spectral sensitivities of the middle- and long-wavelength sensitive cones derived from measurements in observers of known genotype." in Vision Research, Issue 40, 2000, pp. 1711-1737.

The table in FIG. 2B enumerates known genotype variants in the human population and the associated wavelength of maximum photopigment absorptance, where the left-most column of the table contains a designation of the genotype 204 (for details see Asenjo, A. B. and Rim, J. and Oprian, D. D., "Molecular determinants of human red/green color discrimination" in Neuron, 1994, volume 12, pages 1131-1138), the next column indicates the classification 205 which may be normal, deuteranomaly, or protanomaly, and where the anomalous types are further classified by severity which may be mild, moderate, or severe, and the remaining columns indicate the wavelength in nanometers of maximum absorptance of the of the S-cone 206, of the M-cone 207 and of the L-cone 208 photopigments. This table includes the most common types of genetic color deficiency: deuteranomaly occurs with a global prevalence of about 4 percent (and about 8 percent in men and less than one percent in women), protanomaly with a prevalence of about 0.5 percent (about 1 percent in men and less than 0.1 percent in women). The increased prevalence of color vision deficiency in men is due to the X-linked recessive nature of the inherited anomalous genes. An anomaly of the S-cone photopigment is called tritanomaly. Genetic tritanomaly is rare, however acquired tritanomalous color deficiency may occur when the retinal cone cells are damaged (in particular the S-cones), for example by exposure to certain toxins such as mercury. Individuals with tritanomaly may experience greater than normal difficulty discriminating between blue and yellow colors.

Standard observer models for color vision may be formulated to be a best fit for the normal population and do not necessarily provide a good model of the color perception of any particular individual or subpopulation. However, physiologically relevant observer models can be constructed for any individual provided that an adequate characterization of their physiology is available.

Figure 3:
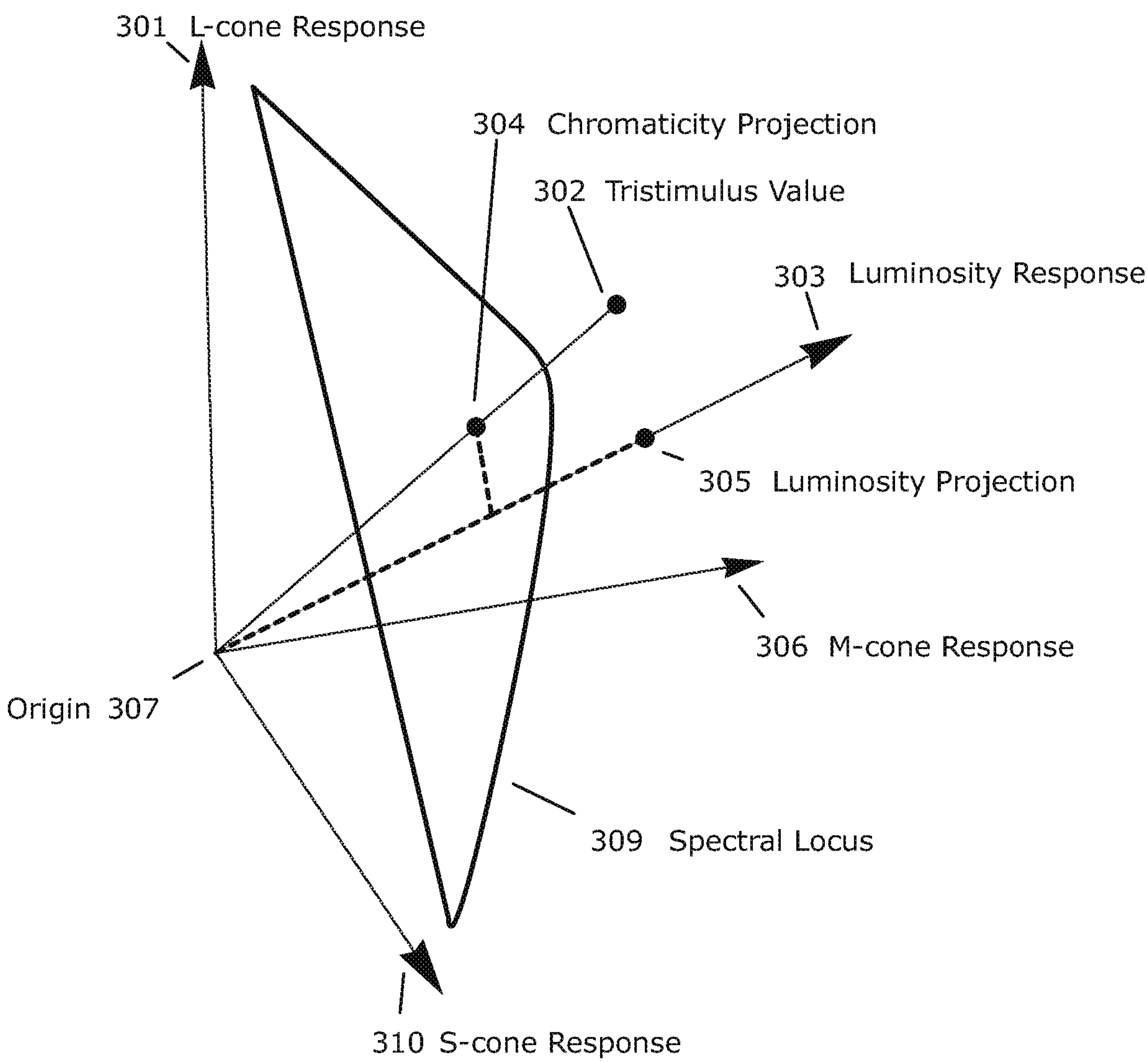
FIG. 3: Tristimulus diagram showing a tristimulus value corresponding to a color appearance and its projections into luminous and chromatic components.

The perceived color appearance of a light according to the tristimulus model may be represented graphically as shown in FIG. 3, wherein the axes of the graph correspond to the neural excitation of the S-cones 310, M-cones 306, and L-cones 301, and the tristimulus value is a point 302 that corresponds to the color appearance of a specified light (e.g., as reflected by a reference color or emitted by an illuminant). The tristimulus value is a three-dimensional point whose dimensions correspond to the portion of optical energy absorbed by each class of cone cell. Light itself may be considered an essentially infinite dimensional vector, and its spectrum may be measured using a spectrophotometer, however the tristimulus value is only three dimensional. Therefore, many different lights may map to the same point in tristimulus space, and a set of lights that map to the same point in a tristimulus space are called metamers.

The projection from the spectral domain of light to the tristimulus domain of color appearance is a linear map, thus the addition and scalar multiplication of light is preserved. This property has implications on the geometry of tristimulus values. For example, if a composite light is formed by the non-negative additive mixture (i.e. a convex linear combination) of a collection of lights, then the tristimulus value of the composite light must be contained inside the convex polyhedron whose corners are the tristimulus values of the component lights.

Referring again to FIG. 3, the point at the origin of the axes 307 corresponds to the appearance of black (i.e., absence of light and zero neural excitation). The spectral locus is a set of tristimulus values forming a contour 309 corresponding to the color appearance of the set of monochromatic lights (i.e., ideal lights having energy at only a single wavelength). Since any light can be considered a convex linear combination of the set of monochromatic lights, the tristimulus value is always contained in the generalized cone whose apex is the origin 307 and whose boundary is defined by the spectral locus 309.

For the purpose of subsequent analyses of optical filters, and as briefly discussed above, the tristimulus representation may be usefully separated into a one-dimensional component of luminosity and a two-dimensional component of chromaticity. These transformations are also linear maps. The luminosity response is a line in the tristimulus space that is coincident with the origin and the tristimulus value of Illuminant E. The perceived luminosity of a light may be calculated by projecting the tristimulus value onto the luminosity response line 303, and then measuring the vector norm of the projection 305. The luminosity line is also normal (perpendicular) to a plane of equiluminant tristimulus values, which in this diagram is also outlined by the spectral locus 309, and the perceived chromaticity of a light may be calculated by projecting the tristimulus value onto this plane 304. Subsequently the chromaticity projection may be further transformed by an affine map to yield a chromaticity coordinate that is a two-dimensional value in a space wherein distances between chromaticity coordinates are approximately proportional to perceived dissimilarities between equiluminant lights, which is called a uniform chromaticity scale, for example as in the CIE 1974 Uniform Chromaticity Scale (UCS).

In a uniform chromaticity scale it may be observed that the distance from white (e.g. Illuminant E) to the spectral locus varies with wavelength. In particular, yellow monochromatic light (e.g., having a spectral radiant flux at a single wavelength, nominally of about 585 nanometers), and cyan monochromatic light (e.g., a monochromatic light having characteristic wavelength about 490 nanometers) may appear subjectively more similar to, and correspondingly closer on the UCS diagram to, white than monochromatic lights that are blue, green or red. Therefore, filters that substantially block yellow and/or cyan wavelengths may improve the apparent purity of colors, and the general form of such filters comprise at least three pass-bands and at least two stop-bands.

The spectral transmittance of a multi-band filter f per wavelength λ, f(λ), may be substantially approximated by the expression:

$$f(\lambda)=\varepsilon+\Sigma_{i=1\ldots N} w_i d_i(\lambda);$$

where, in the above expression, $d_i$ are the pass-bands and $w_i$ are weighting coefficients that scale the pass-bands, ε is the minimum transmittance of the filter, and N is the number of pass-bands which is equal to three or more.

The specification of transmittance of filters (f, d), per wavelength λ in the above expression may be tabulated by uniform sampling on a wavelength scale (e.g., using a step size of 1 nanometer), or on another scale that is substantially equivalent (e.g., frequency or log wavenumber). The sampling may also be defined on an arbitrary scale with non-uniform intervals between sample points.

In some variations, the filter pass-bands (d) are essentially rectangular, i.e., the change in transmittance per wavelength at the band boundaries is instantaneous or nearly instantaneous. The width of a rectangular pass-band may be characterized by the distance between the short wavelength boundary and the long wavelength boundary. The rectangular band-width may be equivalently measured on a frequency scale. The spectral transmittance of a rectangular pass-band may be defined by the expression:

$$d_{(\mu,\sigma)}(\lambda)=H(\lambda-(\mu-\sigma/2))-H(\lambda-(\mu+\sigma/2));$$

where μ is the center wavelength, σ is the rectangular band-width and H is the Heaviside step function.

In some variations, the filter pass-bands are essentially Gaussian, i.e., the change in transmittance per wavelength at the band boundaries is gradual or essentially smooth. The width of a Gaussian pass-band may be characterized by the distance between the half-maximum transmittance on the short wavelength side to the half-maximum transmittance on the long wavelength boundary (also called the full-width at half-maximum (FWHM)). The half-maximum band-width may be equivalently measured on a frequency scale. The spectral transmittance of a Gaussian pass-band may be defined by the expression:

$$e_{(\mu,\sigma)}(\lambda)=\exp(-(\lambda-\mu)^2/(2\sigma^2));$$

where μ is the center wavelength and the half-maximum band-width is:

$$2\sigma\ \mathrm{sqrt}(2\ \ln(2)).$$

In some variations, one or more of the pass-bands may have an irregular shape (i.e., not rectangular and not Gaussian). For example the pass-band may have a bimodal distribution, or may have a shoulder on one or more sides of the pass-band, or may be described as a skewed distribution, where the slope ratio between the two sides of the pass-band, in transmittance per wavelength, is between about 4:1 and about 1:4.

In variations with non-Gaussian pass-bands, such pass-bands may be smoothed with a Gaussian kernel that is wide enough to essentially remove the irregularity and/or sharp transitions, in which case the pass-band may be described as having (essentially) a band center and half-maximum width of the corresponding smoothed pass-band.

A general method for evaluating the performance of filters is useful for determining which possible filter configurations are preferable for a specific application involving color vision. Such a ranking method is possible by measuring the relative gamut area, with respect to a set of reference colors, between two filters. As used herein, a gamut area is the area inside a contour defined by the coordinates of a set of reference colors in a chromaticity diagram. The locations of the reference colors in the chromaticity diagram, and hence the gamut area, are filter-dependent. A process flow diagram for the calculation of relative gamut area appears in FIG. 4.

Figure 4:
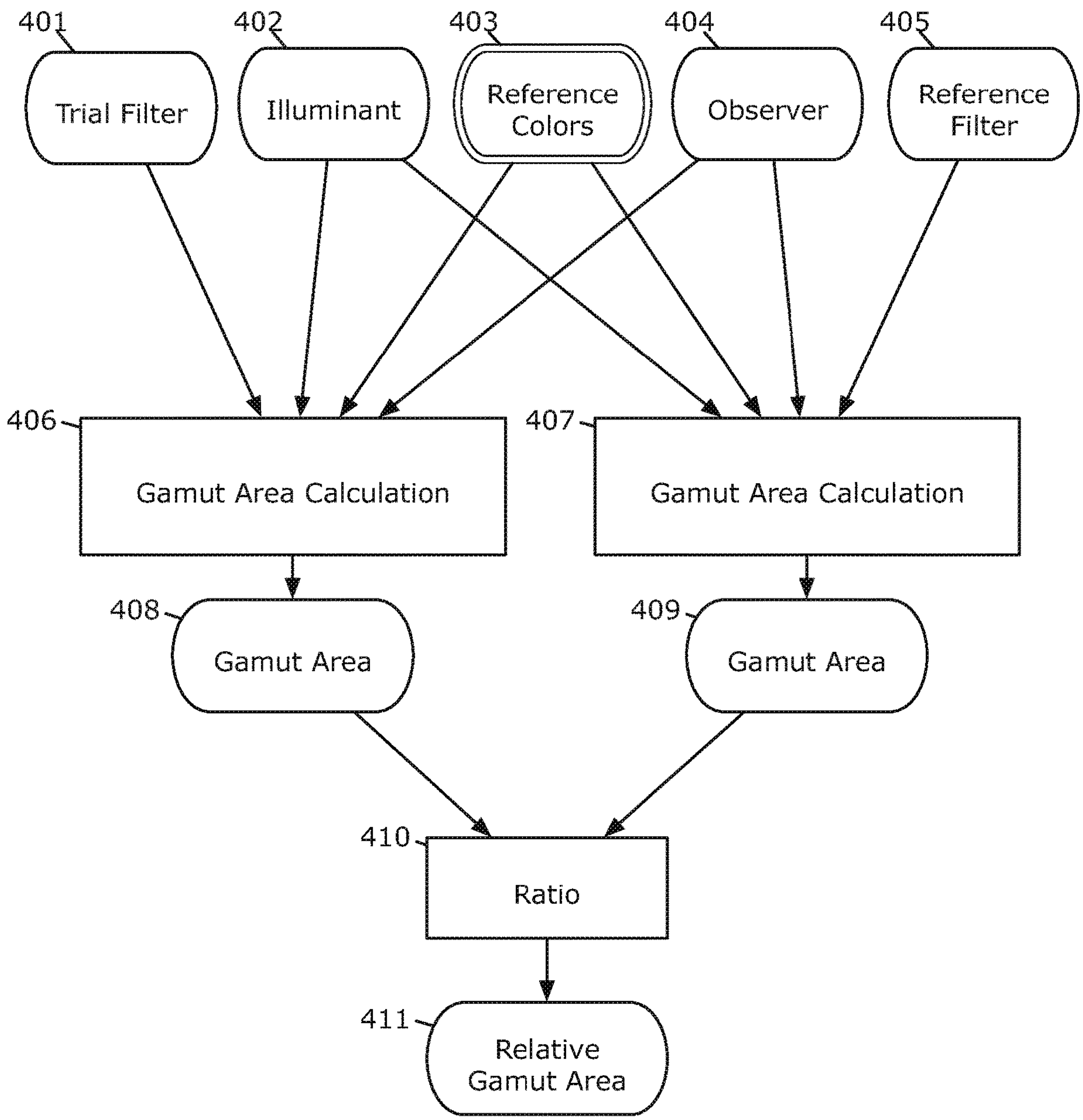
FIG. 4: Process flow diagram of relative gamut area calculation for comparing the effect on color discrimination of two filters.

In the method depicted in FIG. 4, the relative gamut area is defined with respect to a trial filter 401, a reference filter 405, an illuminant 402, an observer 404 and a set of reference colors 403. The trial filter and the reference filter preferably have the same white-point, i.e., the tristimulus value of the filtered illuminant is the same for both filters. This restriction obviates the need to employ a model of chromatic adaptation (such as the von Kries model), which may bias the results. The method may benefit from a suitable choice of the set of reference colors, as described later in this disclosure with reference to FIG. 6A and FIG. 6B. Additionally, the reference filter is preferably selected to have a broad-band spectral transmittance, so that the reference filter provides minimal, or little, distortion of color appearance. For any given trial filter, a suitable reference filter can be found, for example, by comparing the trial filter against the set of spectral reflectances of the Munsell colors, and then taking the best fit Munsell color to be the reference filter (for example the one that has the most similar white-point with respect to the selected illuminant), where the reflectance of the selected Munsell color is defined to be the transmittance of the reference filter. The gamut area is calculated for the trial filter at operation 406, and for the reference filter at operation 407. The resulting gamut areas, 408 and 409, are compared, for example, using a ratio 410 to arrive at the relative gamut area 411. A relative gamut area of 1.0 implies that the trial filter provides no distortion of color appearance, and the trial filter may be said to provide normal color discrimination. A relative gamut area greater than 1.0 implies that the trial filter increases the perceived dissimilarity among the reference colors. Generally such increases in dissimilarity are greater between red and green colors, therefore the trial filter may be said to provide enhanced red-green color discrimination. A relative gamut area of less than 1.0 implies that the trial filter decreases the perceived dissimilarity among the reference colors, generally such action is associated with an increase in dissimilarity between blue and yellow colors, therefore the trial filter may be said to provide enhanced blue-yellow color discrimination. It may be appreciated that the relative gamut area measure, being based on analysis of the chromaticity coordinates of reference colors, is independent of the perceived luminosity of the reference colors, for example, the increase in apparent dissimilarity between color stimuli is not based on the fact that one color appears unusually dark and the other appears unusually bright.

Alternatively, such increases or decreases may be stated in terms of the percent gamut area increase (PGAI), defined by the expression:

$$\gamma=GA(f,S,I,O),\text{ and}$$

$$\gamma_{REF}=GA(f_{REF},S,I,O),\text{ and}$$

$$\mathrm{PGAI}(f,f_{REF})=100\times(\gamma/\gamma_{REF}-1.0);$$

where GA( ) is the gamut area calculation (as described below along with FIG. 5) with respect to the trial filter f, reference colors S, illuminant I and observer O, and $\gamma_{REF}$ is the gamut area with respect to the reference filter $f_{REF}$ and likewise conditions. For the purpose of evaluating filters hereafter in this disclosure, one or the other of two methods for calculating percent gamut area increase is used. In one method, the illuminant I is defined to be Illuminant D65, the observer O the CIE 1931 2-degree standard observer in combination with the CIELUV (u',v') uniform chromaticity scale, the reference colors S are specified as either those of the Farnsworth D-15 Panel, and the percent gamut area increase is given by the expression $$\mathrm{PGAI}(f,f_{REF},D15)=100\times(\gamma/\gamma_{REF}-1.0).$$

Figure 6A:
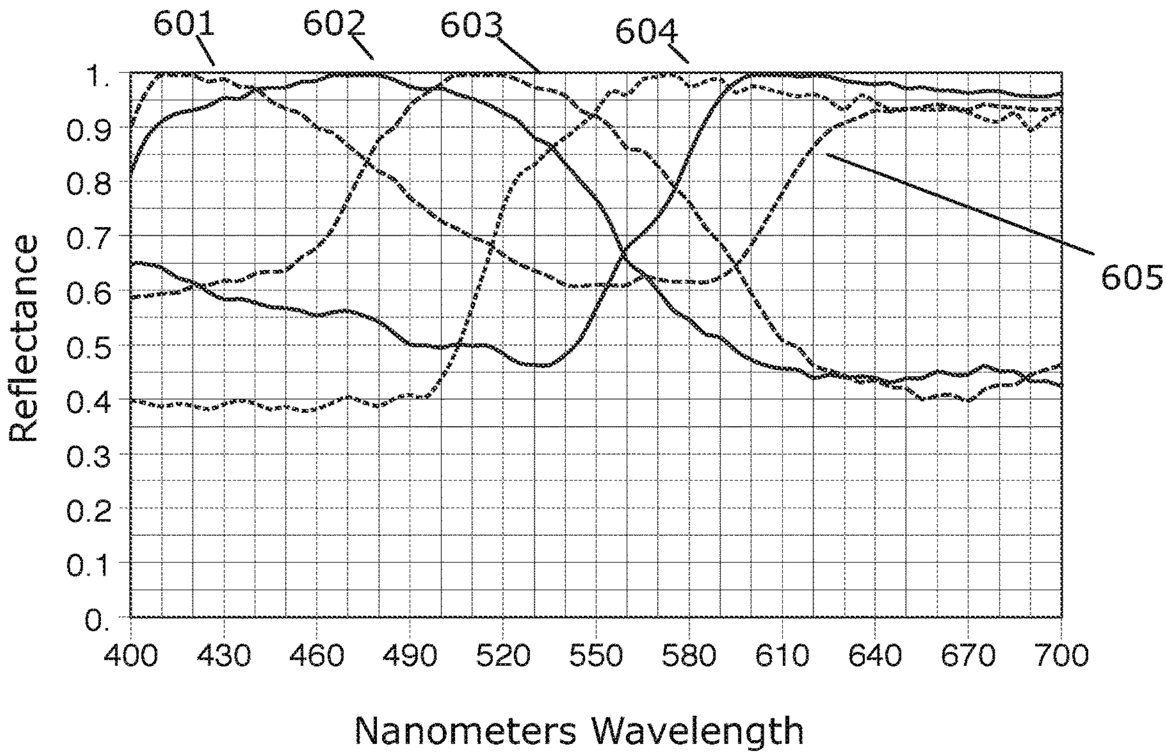
FIGS. 6A, 6B: Graph of the spectral reflectance of selected Munsell colors (FIG. 6A), and graph of the spectral reflectance of selected colors from natural objects (FIG. 6B).
Figure 6B:
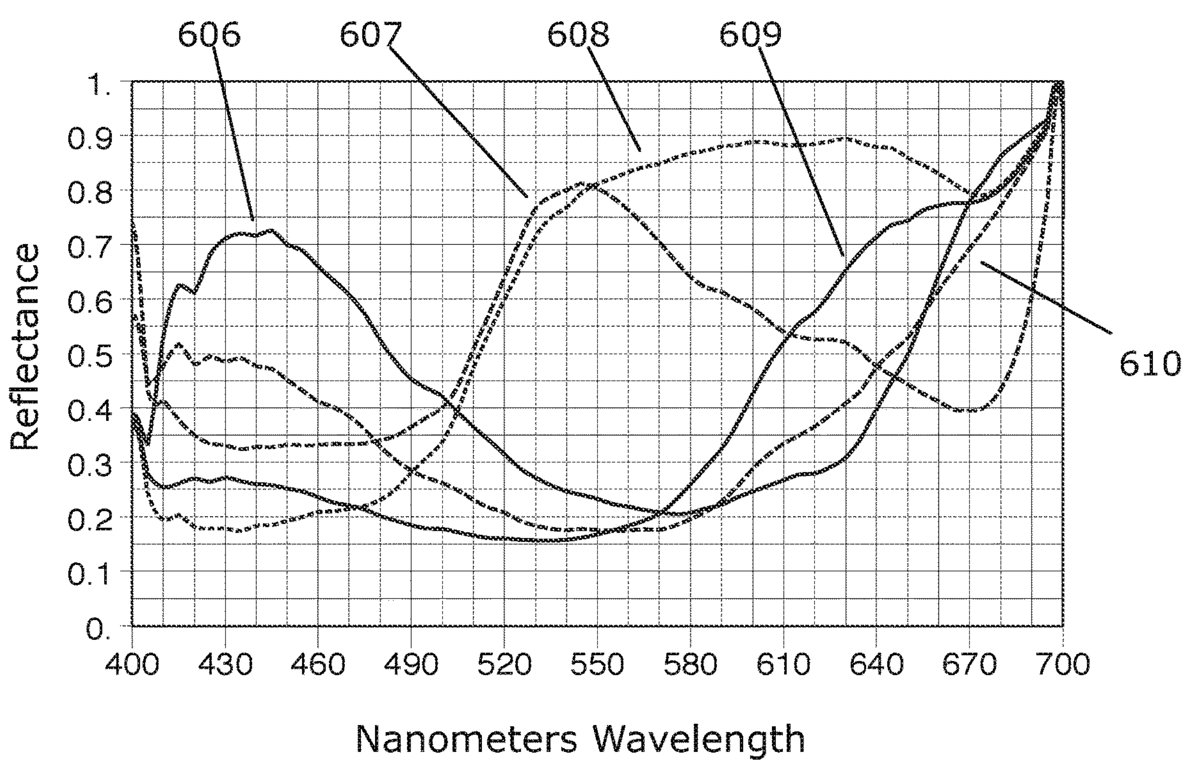

In the other method, the reference colors are given by the selected natural world samples as disclosed along with FIG. 6B, and the percent gamut area increase is given by the expression:

$$\mathrm{PGAI}(f,f_{REF},NWS)=100\times(\gamma/\gamma_{REF}-1.0).$$

In both of the above expressions the gamut areas are computed with respect to the given conditions.

Figure 5:
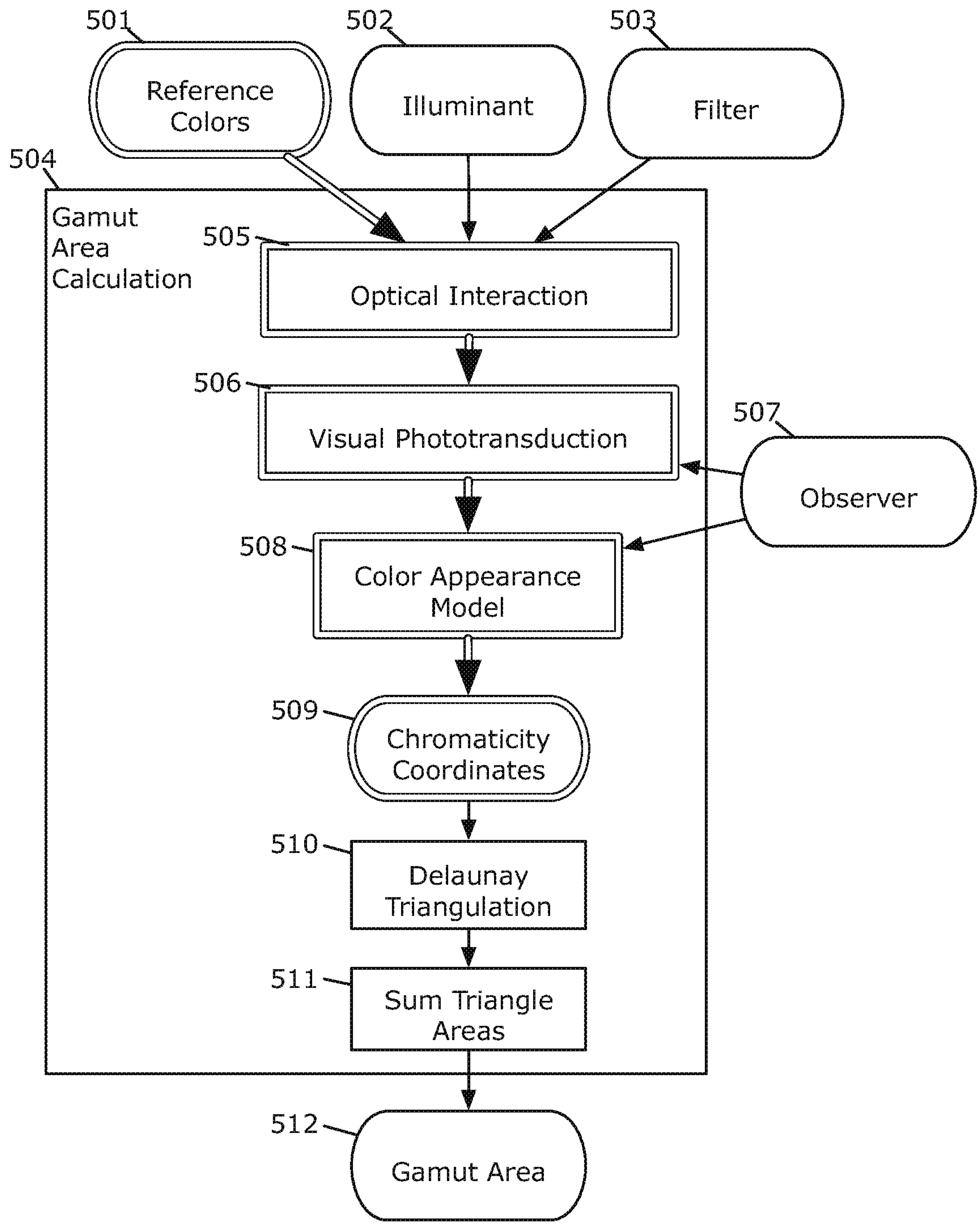
FIG. 5: Process flow diagram of gamut area calculation with respect to a specified set of reference colors, an illuminant, a filter, and an observer.

The calculation of gamut area at operations 406 and 407 in FIG. 4 may be implemented, for example, as detailed in the process flow diagram of FIG. 5. Given a specified illuminant 502, a filter 503, and a set of reference colors 501, an optical interaction 505 takes place for each reference color. As explained above with respect to FIG. 1 operation 102, the optical interaction may be, for example, the reference color reflecting filtered light from the illuminant, or the filter filtering light from the illuminant that has been reflected by the reference color. The optical interactions result in a set of colored and filtered lights which are received by an observer 507 (i.e., observer model) and converted to a set of tristimulus values by visual phototransduction 506, as explained above, for example, with respect to FIG. 1 operation 115. The set of tristimulus values are further transformed by means of a color appearance model 508 and reduced to a set of chromaticity coordinates 509. Given these coordinates, which are points on a two-dimensional chromaticity diagram, a mesh may be formed using, for example, the Delaunay triangulation algorithm 510. The resulting mesh may be converted into an area by summing the area of each triangle in the mesh, and the final result of the calculation is the gamut area 512.

The calculation of gamut area benefits from suitable specification of the set of reference colors, which in turn depends at least partially on the intended use of the filter. The reference colors should include at least three members whose chromaticity coordinates form a triangle that encloses the white-point (i.e. the chromaticity coordinate of the illuminant). Preferably the set of reference colors comprise a sufficiently large number (for example, at least five) and comprise sufficient diversity of spectral reflectance so that the gamut area calculation is stable with respect to changes in transmittance of the filter, which reduces the risk of over-specializing a filter design. In some cases it may be preferable to smooth the spectral transmittance of the reference colors to achieve the desired stability.

For example, a set of Munsell colors may be chosen for the gamut area calculations so that their chromaticity coordinates approximately form a circle of moderate saturation around the white-point. The spectral reflectance of the Munsell colors are broad-band and vary in a controlled fashion with respect to hue. This may be readily seen in the graphs of FIG. 6A wherein a selection of Munsell colors is shown including Munsell 5B 5/4 at 601, Munsell 5G 5/4 at 602, Munsell 5Y 5/4 at 603, Munsell 5R 5/4 at 604, and Munsell 5P 5/4 at 605. In further variations it may be preferable to select a set of Munsell colors with high saturation.

Alternatively, or in addition, some or all of the reference colors may be taken from the Farnsworth D-15, also referred to herein as the D-15. The D-15 comprises a set of 15 Munsell reference colors forming a contour of moderate saturation around the white-point. A filter that provides increase in gamut area with respect to the D-15 colors will also tend to provide increase score according to the D-15 cap arrangement test when an observer performs the test while viewing the samples through the filter.

Alternatively, or in addition, some or all of the reference colors may be sampled directly from the environment where the filter will be used. In particular several embodiments shown subsequently may be usefully incorporated in sunglasses, and because sunglasses are generally worn outdoors under illumination by daylight, the reference colors may be preferably found by measuring the spectral reflectance of naturally colored objects such as leaves and flowers. The graphs of FIG. 6B show the spectral reflectance of such natural objects, including that of a blue flower 606, a green leaf 607, a yellow flower 608, a red flower 609, and a purple flower 610. These natural colors are drawn from a database of 218 measured samples published by Parkkinen, J., Jaaskelainen, T. and Kuittinen, M., "Spectral representation of color images", IEEE 9th International Conference on Pattern Recognition, Rome, Italy, 14-17 Nov. 1988, Vol. 2, pp. 933-935.

From the graphs of FIG. 6A and FIG. 6B it may be readily observed that colors of the natural world have a more varied distribution as compared to the Munsell colors, and furthermore contain certain notable features: for example, the color green in the natural world 607 is determined by the spectral reflectance of chlorophyll which has a characteristic peak at about 540 nanometers, whereas with respect to the Munsell colors which are artificially created pigments, colors described as green typically have a peak reflectance at around 525 nanometers.

Figure 7A:
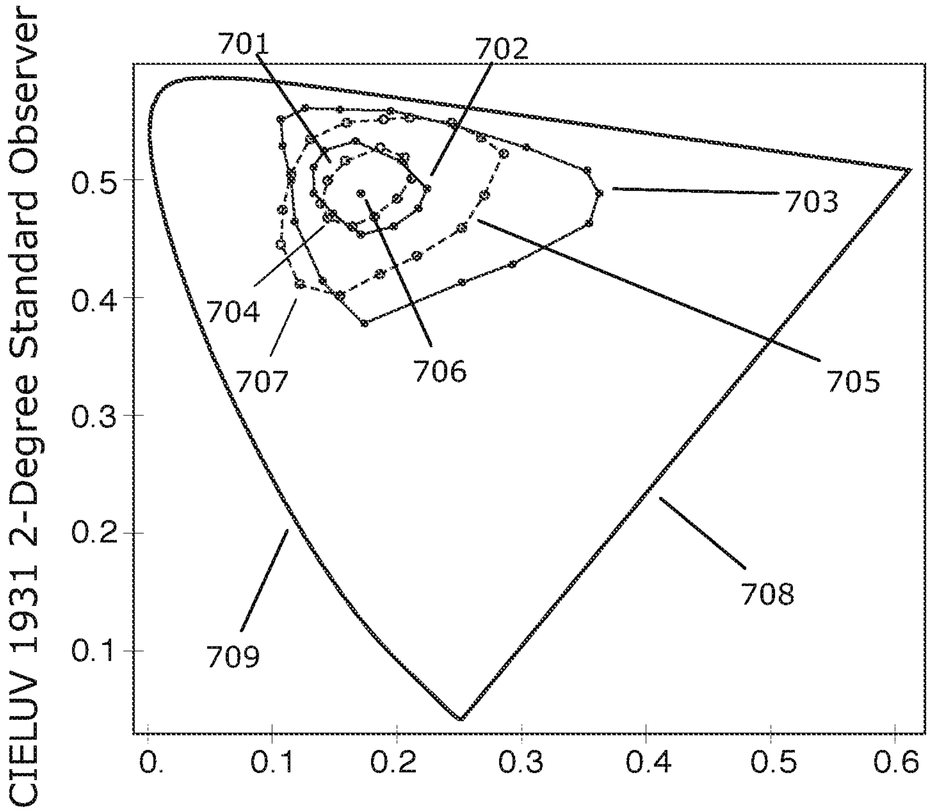
FIGS. 7A, 7B, 7C: Chromaticity diagram of the color appearance of selected Munsell colors under illumination by daylight as viewed through a first filter, and as viewed through a second filter (FIG. 7A), a graph of the spectral radiant flux of daylight (FIG. 7B), and a graph of the spectral transmittance of the filters (FIG. 7C).
Figure 7B:
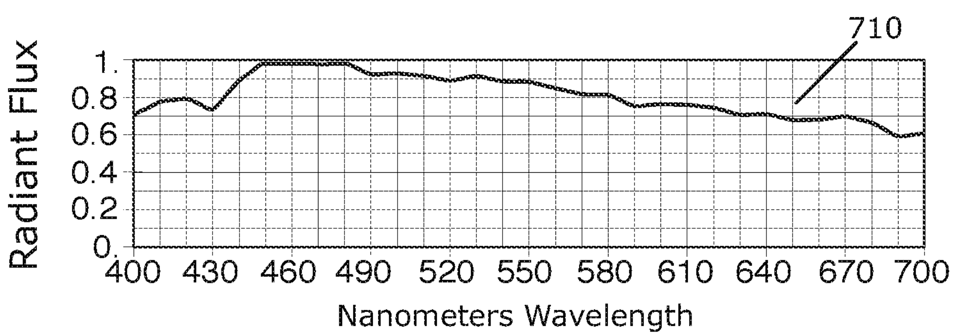
Figure 7C:
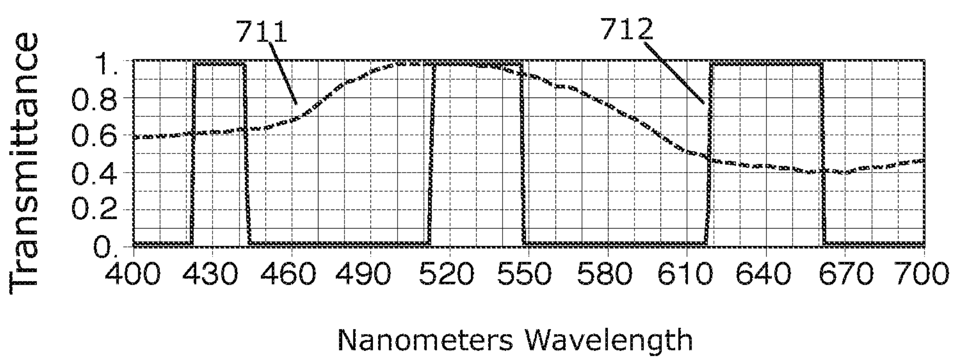

The calculation of relative gamut area as described above, and the effect of multi-band filters on the chromatic aspects of color appearance may be conveniently visualized as shown in the diagrams of FIGS. 7A-7C and FIGS. 8A-8C. In FIG. 7C, the spectral transmittance of a reference filter is shown at 711, which is also a Munsell color selected as a best-fit match to the white-point of the trial filter shown at 712. The illuminant is specified to be Illuminant D65, and its spectral radiant flux 710 is graphed in FIG. 7B.

In FIG. 7A, a chromaticity diagram is used to plot the chromaticity coordinates of selected Munsell colors as viewed under the given illuminant and the different filter conditions. In the chromaticity diagram, the solid enclosing line at 709 is the spectral locus corresponding to the chromaticity coordinates of the monochromatic spectral lights, and the line segment at 708 is called the purple join. The white-points of the filters are substantially identical and shown at the point at 706. The chromaticity coordinates of the selected Munsell colors as viewed through the reference filter 711 are shown at the open circles along the dashed contours 701 and 705. The chromaticity coordinates of the selected Munsell colors as viewed through the trial filter 712 are shown at the solid circles along the solid contours 702 and 703. The inner contours correspond with selected Munsell colors of moderate saturation, and the outer contours correspond with selected Munsell colors of high saturation. By inspection of the contours it may be appreciated that the chromaticity coordinates of the colors as viewed through the trial filter cover a larger area of the chromaticity diagram, and in particular show a significant increase in the separation of chromaticity coordinates along the axis of red to green (green colors occurring mainly around the "nose" of the locus in the upper left corner (at around (0, 0.5) and red colors occurring essentially at the upper right corner of the locus (0.5, 0.5)). The trial filter, having a relative gamut area greater than 1.0 compared to the reference filter, may therefore be described as increasing red-green color discrimination.

In the example of FIG. 7A, the reference colors of the inner contour, starting from the point at 704 and proceeding clockwise, are: Munsell 10B 5/4, Munsell 10BG 5/4, Munsell 10G 5/4, Munsell 10GY 5/4, Munsell 10Y 5/4, Munsell 10YR 5/4, Munsell 10R 5/4, Munsell 10RP 5/4, Munsell 10P 5/4, Munsell 10P 5/4 and Munsell 10PB 5/4. The reference colors of the outer contour, starting from the point at 807 and proceeding clockwise, are: Munsell 7.5B 5/10, Munsell 10BG 5/8, Munsell 2.5BG 6/10, Munsell 2.5G 6/10, Munsell 7.5GP 7/10, Munsell 7.5GY 7/10, Munsell 2.5GY 8/10, Munsell 5Y 8.5/12, Munsell 10YR 7/12, Munsell 5YR 6/12, Munsell 10R 6/12, Munsell 2.5R 4/10, Munsell 7.5RP 4/12, Munsell 2.5RP 4/10, Munsell 7.5P 4/10, Munsell 10PB 4/10 and Munsell 5PB 4/10.

Figure 8A:
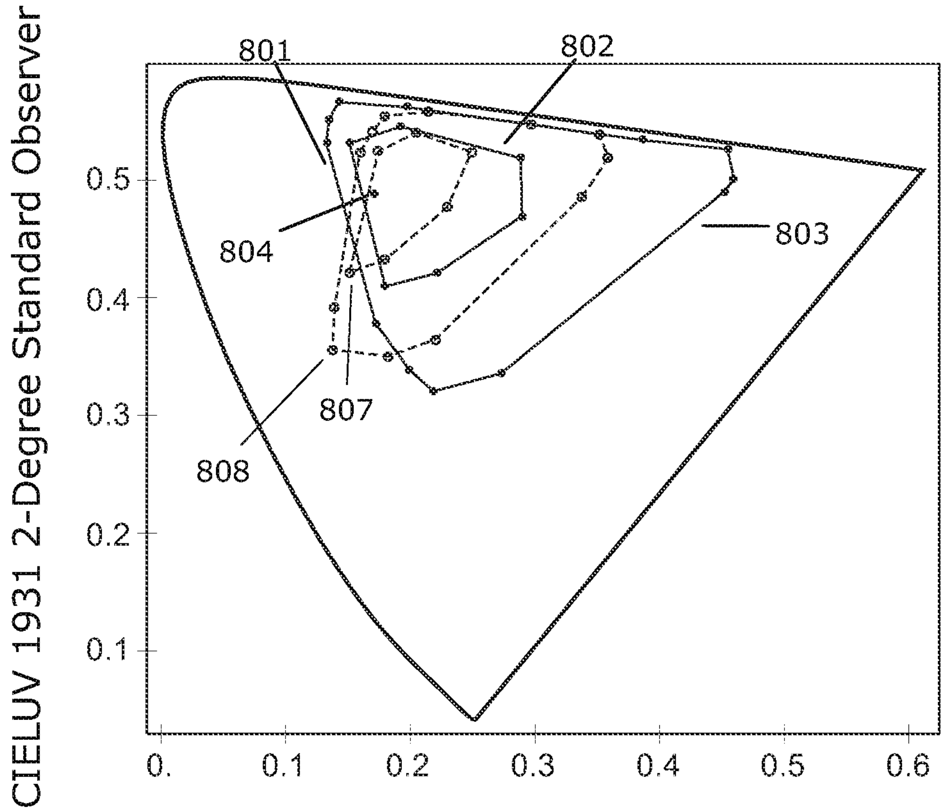
FIGS. 8A, 8B, 8C: Chromaticity diagram of the color appearance of selected natural colors under illumination by daylight as viewed through a first filter and as viewed through a second filter (FIG. 8A), a graph of the spectral radiant flux of daylight (FIG. 8B), and a graph of the spectral transmittance of the filters (FIG. 8C).
Figure 8B:
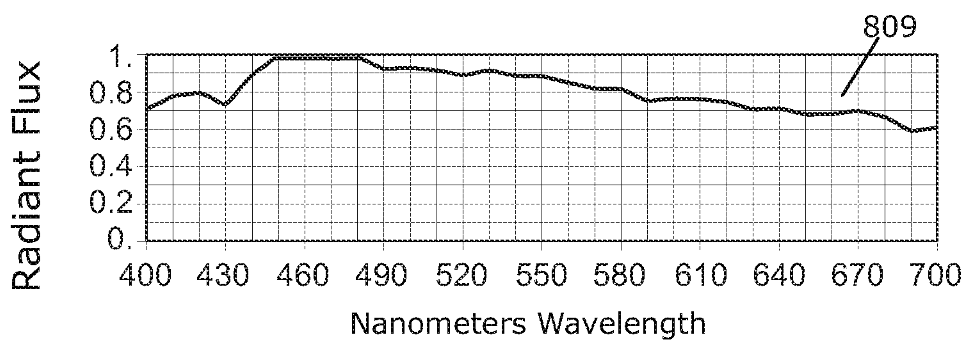
Figure 8C:
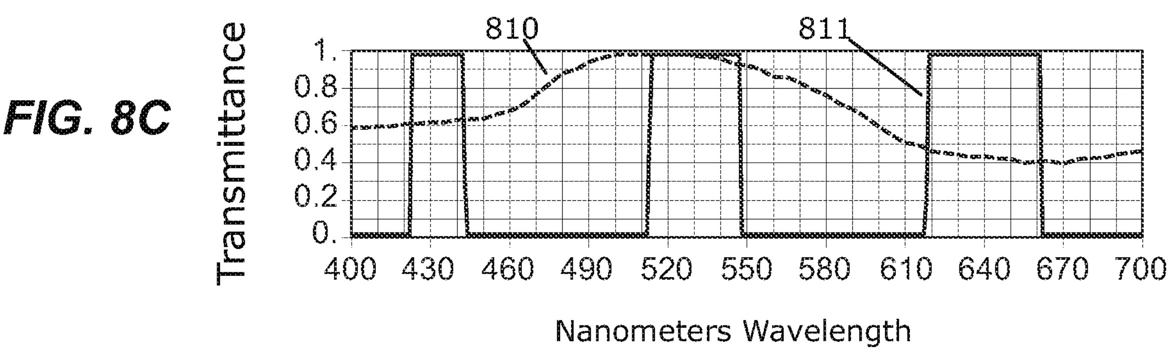

Continuing the visualization of gamut area, the diagrams of FIGS. 8A-8C show the effect of the same trial filter and reference filter with respect to colors of the natural world. In FIG. 8C, the spectral transmittance of the reference filter appears at 810, and the spectral transmittance of the trial filter at 811. The spectral radiant flux 809 of the illuminant is shown in FIG. 8B.

In FIG. 8A, the white-point of the filters is shown at 804. The dotted contours at 807 and 808 correspond to the chromaticity coordinates of selected natural colors as viewed through the reference filter, and the solid contours 802 and 803 correspond to the chromaticity of the same natural colors as viewed the trial filter. The inner contours correspond to the appearance of the five natural colors whose spectral reflectances also appear in the graphs of FIG. 6B at 606, 607, 608, 609, and 610, in counter-clockwise order, respectively, from the point 807. The outer contour corresponds to the appearance of the most saturated examples of natural colors available in the database previously cited. While the natural colors may be a more preferable choice for analysis of the utility of a filter in an outdoor context (e.g., for incorporation in sunglasses), the Munsell colors provide for a more easily interpreted visualization, and so the remaining figures in this disclosure employ the Munsell colors to this end.

Thus far, the examples of multi-band filters for enhancing color appearance, for example in FIGS. 7C and 8C, have structure with three rectangular pass-bands and two stop-bands. Such a filter may be uniquely specified by enumerating the start and end wavelengths of each band, which gives 6 degrees of freedom. As such, a computer may be used to completely enumerate the entire set of possible filters, to then rank the performance of every such filter using the relative gamut area metric as described above, and then to select the best filter for a desired effect (such as enhancing of red-green color discrimination, or as enhancing blue-yellow color discrimination, or as maintaining normal color discrimination). Increasing the number of degrees of freedom characterizing the filters may expand the search to a larger set, for example by allowing the transmittance to vary within bands, or increasing the number of possible bands.

Along these lines, one computer-implemented approach to designing an optical filter that affects color vision in a desired manner is as follows. The desired filter is assumed to comprise a pre-filter and a multiband interference filter in optical composition. As an initial matter, the following are specified: the transmittance of the pre-filter throughout the visible spectrum, a desired white point for the optical filter, a desired minimum total luminous transmission of the optical filter, an illuminant, a plurality of reference colors, and an initial trial multiband interference filter comprising a plurality of contiguous stop and pass wavelength bands covering the visible spectrum. Next, one or more new trial multiband interference filters are generated by varying the boundaries, the transmittances, or the boundaries and the transmittances of the stop and pass wavelength bands of the initial trial multiband interference filter. Next, the white point and the total luminous transmission of the optical filter are determined for each combination of the pre-filter with one of the new trial multiband interference filters. Next, the effect on color vision of the optical filter for each combination of the pre-filter with one of the new trial multiband filters is evaluated using the specified illuminant and reference colors. Next, one of the new trial multiband interference filters, for which the optical filter satisfies the specified white point and the specified minimum total luminous transmission and affects color vision in the desired manner, is selected for use in the optical filter as the multiband interference filter.

In this method, the pre-filter may have a transmittance of about 100% throughout the visible spectrum. That is, the pre-filter is optional. The initial trial interference filter may comprise, for example, a total of five or more stop and pass bands. Generating the new trial interference filters may comprises, for example, varying the number of pass bands, the number of stop bands, or the number of pass bands and the number of stop bands in the initial trial interference filter. In addition, or alternatively, generating the new trial interference filters may comprises varying the shape of one or more of the stop or pass bands. Evaluating the effect on color vision may comprise any of the evaluation methods disclosed in this specification. The method may also comprise specifying a color constraint constraining the appearance of a reference color as viewed or illuminated through the optical filter, evaluating the effect on the color appearance of the reference color of each combination of the pre-filter with one of the new trial multiband filters, and selecting for use in the optical filter as the multiband interference filter one of the new trial multiband interference filters for which the optical filter satisfies the specified color constraint. Any of the color constraints disclosed in this specification may be used with this method.

As a possible drawback to the above method, the best filter for achieving the desired effects may in some cases not be a member of the set of filters investigated. Further, the above strategy may become intractable as the number of possible filters to evaluate increases multiplicatively with each additional free variable.

Another related approach is to use a quasi-Newton adaptive method to search among a subset of possible filters and incrementally move along an estimated optimal direction towards the desired filter. The solution found by this type of method may in some cases be only locally optimal, however.

A further difficulty with such methods including direct enumeration and local search is that it is difficult or impossible to impose constraints on the filter, for example such as specification of the filter white-point with respect to a selected illuminant. Instead, typically each trial filter must be evaluated to determine whether it satisfies such constraints.

In order to constrain the white-point it is possible to represent a filter as a linear combination of metamers of the white-point, e.g., as a weighted combination over the set of tri-chromatic metamers (i.e. comprising essentially three distinct wavelengths of light), however this may require a representation having thousands of degrees of freedom because the number of such metamers is large, and quasi-Newton search methods generally may be unreasonably slow when the search space has such a large number of dimensions. Further, such a method does not readily enable specification of additional constraints beyond the filter white-point.

A method of filter design that is computationally efficient and enables specification of multiple constraining criteria (described in detail below) is to employ the method of linear programming. This method may present a number of distinct advantages: a linear program solver uses a sequence of incremental steps to locate the optimal solution quickly, however the solution to a linear program is unique and globally optimal with respect to the inputs. Further the solution can be constrained to satisfy useful criteria regarding chromatic and luminous aspects of color appearance. Commercially available linear program solvers can rapidly determine if a set of given constraints has no solution (is infeasible), and such solvers can also quickly determine the optimal solutions to linear programs having thousands of free variables and hundreds of constraints. Linear programming may be employed where a problem that can be expressed as a linear system subject to linear constraints and a linear cost function. The details regarding how to formulate the design criteria for a filter affecting color vision and to translate that design criteria into a linear program are elaborated next.

The filter generating method disclosed below incorporates a linear program solver (abbreviated: LP), which may be generally described as a method for determining the optimal solution to a resource allocation problem with respect to a linear cost function and subject to linear constraints. As applied to the problem of designing filters for color vision, the resources to be allocated may be understood to be the transmittances per wavelength of the filter, the linear constraints are derived from use requirements of the filter, and the linear cost function is essentially a mechanism by which the linear program solver can be guided towards a preferable solution within the space of feasible solutions. The filter generating method by linear programming may be practiced by using a computer to solve a linear program given by the expression:

$$\text{minimize } c^T x,$$

$$\text{subject to the constraint that } Ax \leq b, \text{ and}$$

$$\text{subject to the constraint that } 1 \geq x \geq 0;$$

where, in this method, the linear program is solved for the vector x and the transmittance of the filter per wavelength, f(λ), is computed by the expression:

$$\text{given } E=[e_1 \ldots e_i \ldots e_N], \text{ and}$$

$$\text{given } p, \text{ then,}$$

$$q(\lambda)=\Sigma_{i=1 \ldots N} x_i e_i(\lambda), \text{ and}$$

$$f(\lambda)=p(\lambda)\times q(\lambda);$$

where, in this method, f is the designed optical filter, f(λ) is the transmittance of f per wavelength λ. E is a matrix of elementary filters such that the columns of the matrix $e_i$ are the transmittance of light as a function of wavelength per elementary filter and the number of elementary filters is N. The expression defining q(λ) is a weighted summation of the elementary filters, where the weighting coefficients are the corresponding elements $x_i$. The weighted sum is equivalent to the matrix-vector product q=Ex between elementary filter matrix E and linear program solution vector q. Further, p(λ)×q(λ) denotes the composition in series of two optical filters by multiplication per wavelength of the first filter q with second filter p, where p(λ) is the transmittance of p per wavelength λ, and p is also generally referred to as a "pre-filter" in this disclosure, although the filters may generally be composed in any order. The linear program constraint 1≥x≥0 is equivalent to the constraint that $1 \geq x_i \geq 0$ for i between 1 and N. Further, c in the above expression is a cost vector that guides the linear program solver toward a solution that provides a filter f that affects color vision in the desired manner. The total cost associated with the solution is computed by $c^T x$, which denotes the vector dot product between the transpose of c and x. Solutions x providing a lower total cost are generally more preferable with respect to the desired function, although other measures of quality may also be employed to determine the adequacy of a particular solution. A in the above expression is a matrix and b in the above expression is a vector. Ax is the matrix product between the matrix A and vector x. At least some of the elements of matrix A and at least some of the elements of vector b are related to minimum or maximum levels of transmission by the filter f at one or more wavelengths of light, to a constraint on the filter white point, or to constraints on the color appearance of one or more reference lights as viewed or illuminated through the filter, and/or to such transmission constraints by the filter f at one or more angles of incidence.

The specification of transmittance of filters ($e_i$, p, f), per wavelength λ in the above expression may be tabulated by uniform sampling on a wavelength scale (e.g., using a step size of 1 nanometer), or on another scale that is substantially equivalent (e.g., frequency or log wavenumber). The sampling may also be defined on an arbitrary scale with non-uniform intervals between sample points.

The elementary filters may be, for example, single pass-band filters having a pass-band width of about one-nanometer and each elementary filter having a different pass-band center wavelength. Such filters may also be called monochromatic filters, and defined as having the spectral transmittance:

$$e_\mu(\lambda)=\delta(\lambda-\mu);$$

where δ is the Dirac-delta function and μ is the wavelength transmitted by the filter, which typically varies between 400 nanometers to 700 nanometers over the set of elementary filters. In this case the elementary filter matrix E is essentially an identity matrix of dimension 301×301. Alternatively, the elementary filters may be single pass-band filters each having width greater than about one nanometer and each elementary filter having a different pass-band center wavelength. In some such variations the pass-bands may be rectangular (also called a boxcar function) and the spectral transmittance of an elementary filter is defined:

$$e_{(\mu,\sigma)}(\lambda)=H(\lambda-(\mu-\sigma/2))-H(\lambda-(\mu+\sigma/2));$$

where μ is the center wavelength, σ is the rectangular band-width and H is the Heaviside step function. A typical choice of rectangular band-width is about 10 nanometers, in which case the number of elementary filters may also be reduced so that there is a 5 nanometer interval between adjacent filters. In some variations the pass-bands may have a spectral transmittance that is Gaussian or essentially Gaussian, for example as defined by:

$$e_{(\mu,\sigma)}(\lambda)=\exp(-(\lambda-\mu)^2)/(2\sigma^2));$$

where μ is the center wavelength and the half-maximum band-width is:

$$2\sigma\ \mathrm{sqrt}(2\ \ln(2)).$$

Figure 9:
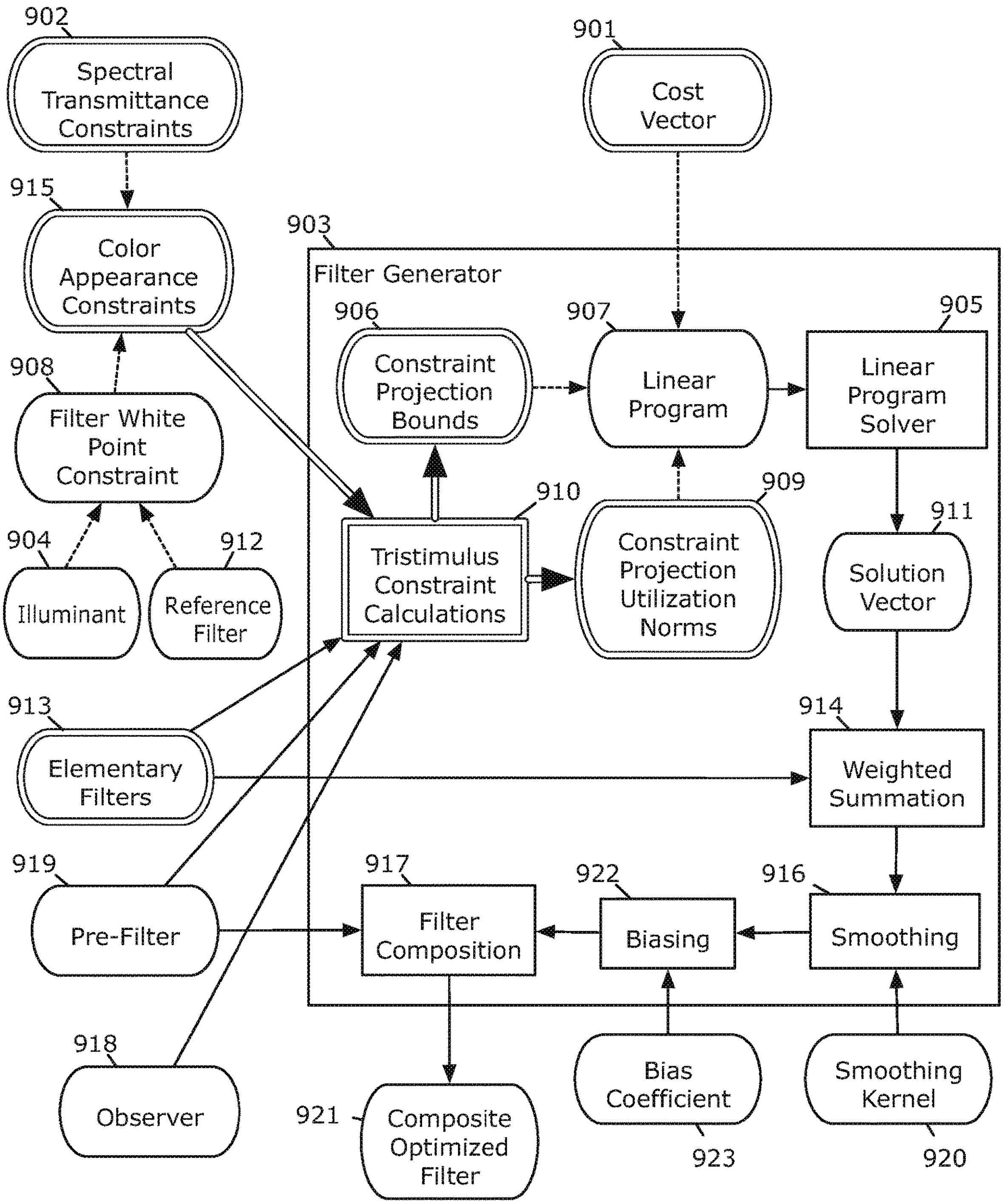
FIG. 9: Process flow diagram of filter generation by the method of linear programming.

In yet other variations, the elementary filters may be multi-band filters having two or more pass-bands and each elementary filter has a different combination of center wavelengths and/or band-widths of the two or more pass-bands, in which case the number of elementary filters can be large (e.g., many thousands of combinations). The multi band-pass elementary filters may be configured, for example, by adjustment of the band widths and/or band transmittance levels to be metameric with respect to the illuminant 904 and the reference filter 912 (FIG. 9). Any suitable set of elementary filters may be used in the filter design method, where a suitable elementary filter must at least have a physically realizable transmittance spectrum (e.g., having transmittance values between zero and one), and must further enable the computation of a cost associated with the filter, which is described later along with the discussion of FIGS. 12A and 12B. Preferably the elementary filters have compact support, i.e., the transmittance is zero outside a finite interval, so that numerical computation methods for sparse linear algebra may be applied, including the interior point method for solving a linear program.

Observing that f as defined in the above expression comprises a weighted summation of elementary filters, where the elementary filters are generally single or multi pass-band filters (e.g., comprising one or more rectangular or Gaussian pass-bands as previously described), it may be concluded that the designed filters/can be understood as multi-band filters, however where the number of pass-bands is essentially very large (e.g., at least 60) and the component pass-bands may be partially overlapping. Therefore, the range of possible filters/that can be designed by the method include multi-band filters with three or four bands as well as those with more complex transmittance curves. However in practice it will be shown that the most useful filter designs typically have three or four features essentially describable as bands, although the essential shape of those bands may be, in some instances, irregular, i.e., not rectangular and not Gaussian. For example one or more pass-bands may be described as having a bimodal distribution, or may have a shoulder on one or more sides of the pass-band, or may be described as a skewed distribution, where the slope ratio between the two sides of the pass-band, in transmittance per wavelength, is between about 4:1 and 1:4.

In variations with non-Gaussian pass-bands, such pass-bands may be smoothed with a Gaussian kernel that is, for example, just wide enough to essentially remove the irregularity and/or sharp slope transitions, in which case the pass-band may be described as essentially having a band center and half-maximum width of the corresponding smoothed pass-band.

FIG. 9 contains a process flow diagram describing a process of filter generation given a specification of design criteria. The computer implemented filter generator operation, described in more detail below, appears in box 903. Design criteria input into the filter generator operation, also described in more detail below, may include, for example, cost vector 901 (vector c in the linear program expression provided above), spectral transmittance constraints 902, color appearance constraints 915, filter white point constraint 908, illuminant 904, reference filter 912, observer 918, elementary filters 913 (matrix E in the expression provided above), optional pre-filter (p in the expression provided above which can be set to unity to effectively bypass) 919, optional smoothing kernel 920, and optional bias coefficient 923.

Still referring to FIG. 9, the elementary filters and various of the other design criteria are input to tristimulus constraint calculation operation 910 (described in further detail below with respect to FIG. 11), which generates constraint projection bounds 906 (vector b in the linear program expression) and constraint projection norms 909 (matrix A in the linear program expression). A linear program 907 (as described by the linear program expression provided above) is then formulated from constraint projection bounds 906, constraint projection norms 909, and cost vector 901. The linear program is then solved by a linear program solver 905, which provides the solution of the linear program as a solution vector 911. Solution vector 911 is the optimized vector x in the linear program expression provided above. The elements of solution vector 911 are coefficients $x_i$ providing weighting factors for corresponding elementary filters e that are columns of the matrix E that represents the set of elementary filters 913. Operation 914 then performs a summation of the elementary filters, weighted by the corresponding elements of solution vector 911, to provide a first filter q(λ) which is then (optionally) smoothed 916, then (optionally) biased 922, and combined 917 with a second filter (the pre-filter) p(λ) 919 to produce the designed filter specification f(λ) 921.

The composite designed filter f(λ) 921 may be manufactured, for example, by combining an absorptive pre-filter p(λ) with an interference filter q(λ), where the interference filter component is specified by the output of operation 914 and/or operation 916. The pre-filter may be essentially transparent, i.e., p(λ) is unity or nearly unity, or may be neutral density, i.e., p(λ) is a constant or nearly constant, or may have a broad-band transmittance, i.e., p(λ) varies smoothly and slowly per wavelength, or may have narrow-band and/or multi-band transmittance. The method accounts for such properties of p in the specification of q(λ) so that the resulting filter f satisfies the input design criteria. The selection of preferable pre-filters p(λ) is described in detail along with FIGS. 24A, 24B, 28A, and 28B. In particular, the use of pre-filters with narrow-band absorptance may be preferable for some applications and is demonstrated and described in detail along with FIGS. 20A and 20B.

Contemporary methods for design and manufacture of interference filters (for example using non-quarter wave optical monitoring) make it possible to fabricate a filter with nearly any spectral transmittance curve. However, the number of dielectric material layers required to implement a particular filter specification varies. Any required limit on the total number of dielectric material layers, for example, may require that the spectral transmittance curve have a limited complexity. For example, it may be necessary that the slope of transmittance per wavelength be continuous and bounded.

To improve manufacturability, a smoothing operation 916 may be performed on the filter specification provided by weighted summation operation 914. For example, a smoothing kernel 920 may be applied to the optimized filter provided at operation 914 by frequency-domain convolution in 916. The smoothing kernel may be, for example, a Gaussian kernel with a half-maximum width of 2 percent of the center wavelength. In further examples the smoothing kernel may be a Gaussian kernel with a half-maximum width of about 10 percent of the center wavelength, so that the filter specification can be realized with a low-order dielectric stack (e.g., less than about 50 material layers). Alternatively, or in addition, the elementary filters may be smoothed (e.g. by specification as Gaussian filters rather than rectangular filters). The smoothed filter description output from smoothing operation 916 may then be utilized as a specification for the manufacture of a (e.g., interference) filter. In general the amount of smoothing may be regulated to improve manufacturability subject to a requirement that the desired function of the filter (e.g., its affect on color vision) is not significantly degraded by the smoothing. For example, the width of the smoothing kernel may be selected to be the widest kernel such that the peak transmission within the pass-bands of the filter is not significantly decreased. Although smoothing is optional, all filter embodiments described herein as designed by the above linear program methods employ a smoothing kernel having a half-maximum width between about 10 nanometers and about 25 nanometers.

To improve filter performance, in particular under conditions where the angle of incidence of light passing through the filter varies over some range, a biasing coefficient 923 may be used to bias the filter specification towards longer wavelengths 922. The selection of biasing coefficient is described in further detail along with FIGS. 29A-29B and FIGS. 30A-30B.

Returning now to the various inputs to filter generator operation 903 (FIG. 9), the cost vector 901 (c in the linear programming expression above) must be specified such that a cost can be associated with each elementary filter. If, for example, the elementary filters are each single pass-band filters, then a cost per wavelength may be specified by a function c(λ), and then the cost per elementary filter computed by the expression:

$$c_i = \int_{\lambda=400 \ldots 700} c(\lambda) e_i(\lambda) p(\lambda) d\lambda.$$

Alternatively, if the elementary filters are triple band-pass filters wherein each elementary filter has three or more pass-bands, cost vector 901 may be, for example, a function of the relative gamut area of the elementary filters, for example the cost associated with an elementary filter may be defined as:

$$c_i = (\gamma_i / \gamma_{REF})^{-2};$$

where $\gamma_i$ is the gamut area provided by the elementary filter and $\gamma_{REF}$ is the gamut area provided by a best-fit reference filter. Cost vector 901 may be specified at the outset of the filter design process and not further changed during design of the filter. Alternatively, cost vector 901 may be varied during the design process in iterative design processes such as that described, for example, in more detail below with respect FIG. 12.

Figure 12A:
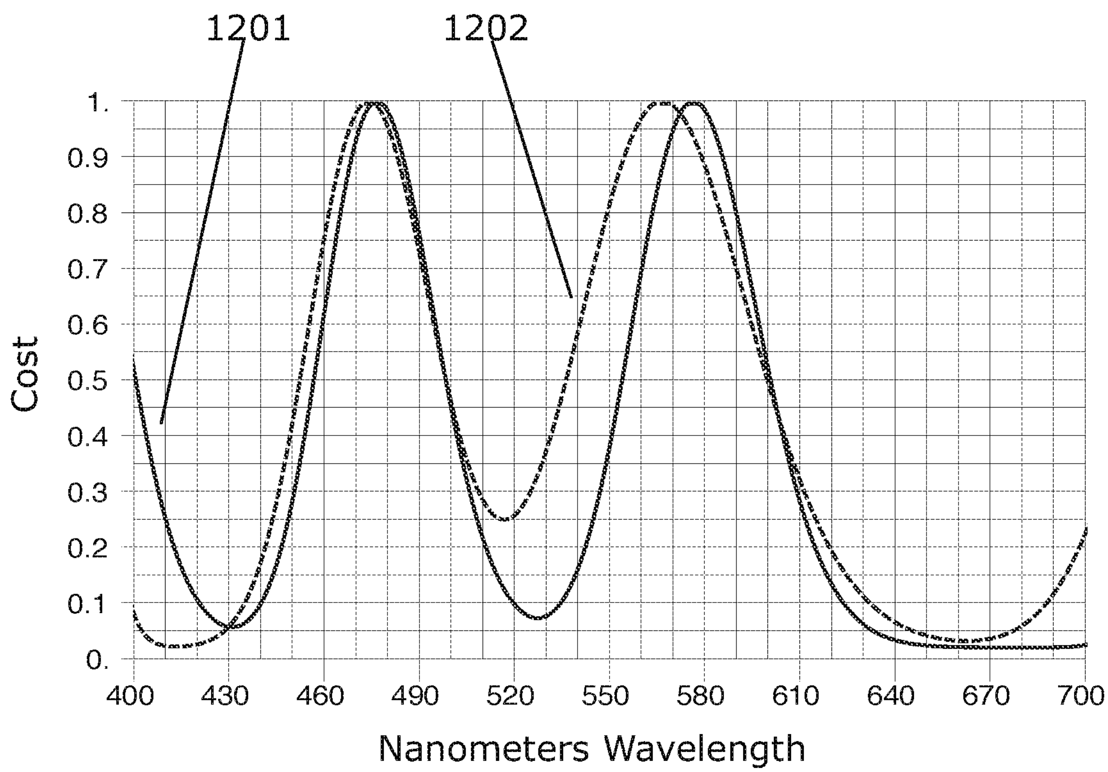
FIGS. 12A, 12B: Graph of a cost function designed to enhance red-green color discrimination for Munsell colors and graph of a cost function designed to enhance red-green color discrimination for natural colors (FIG. 12A), and graphs of the spectral transmittance of two filters designed with the corresponding cost functions (FIG. 12B).
Figure 12B:
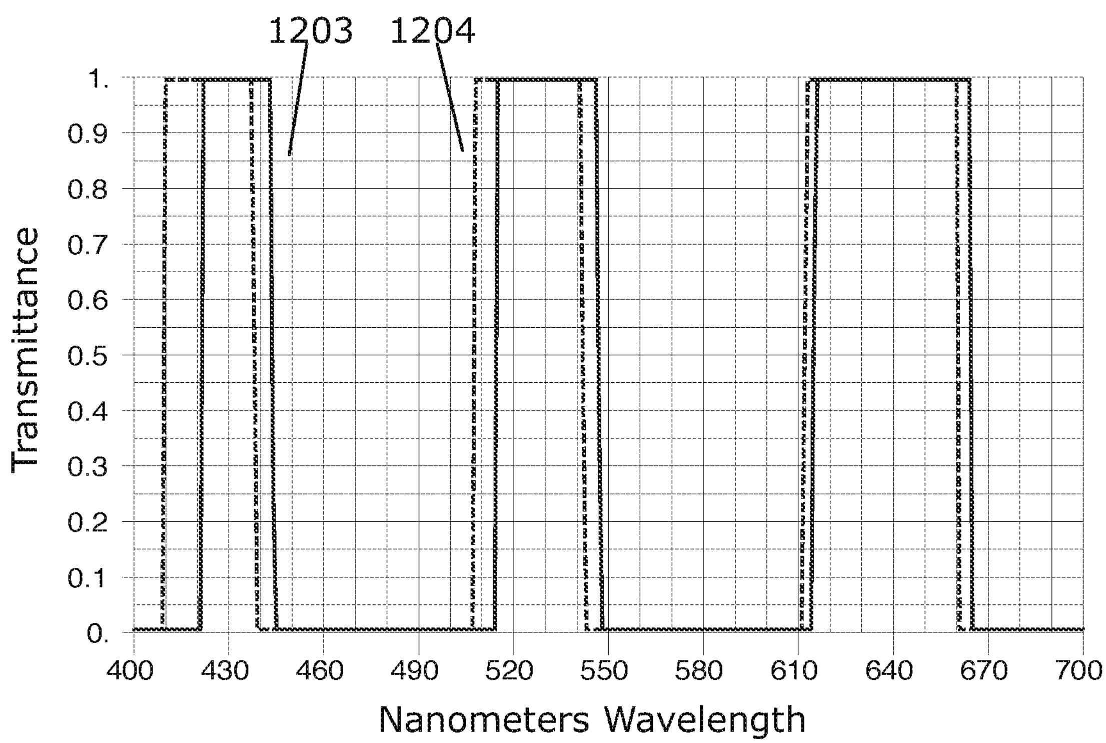

The specification of a cost vector provides a means by which the filter generating method can guide the linear program solver towards a preferable filter design, as the linear program solver will avoid the incorporation of (i.e. positive weighting of) elementary filters with a high relative cost unless necessary to satisfy one or more constraints. What is preferable may vary depending on the target application of the filter, and so the specification of the cost function should also vary appropriately. For example, FIG. 12A shows two functions of cost per wavelength (e.g., for use with a set of single pass-band elementary filters as previously described), where the cost functions are selected to maximize relative gamut area of the filter design, thereby causing the method to design a filter that increases red-green color discrimination. To design a filter that increases blue-yellow color discrimination these cost functions may be inverted, e.g., by multiplication by negative one. The cost function at 1201 is configured to maximize relative gamut area with respect to the selected Munsell colors as shown in FIG. 6A at 601, 602, 603, 604 and 605. The cost function at 1202 is configured to maximize relative gamut area with respect to selected colors of the natural world as shown in FIG. 6B at 606, 607, 608, 609 and 610. Given otherwise identical design criteria, the cost function for the Munsell colors results in the filter at 1204 (FIG. 12B) and the cost function for the natural colors results in the filter at 1203 (also FIG. 12B). It may be noted that the middle pass-band for the natural world filter 1203 is red-shifted by about 10 nanometers compared to the filter for the Munsell colors 1204, and a similar preference for longer wavelengths is also found in the short wavelength pass-band. These details are not insignificant, for example the natural world filter 1203 causes less hue distortion of green colors whose spectral reflectance is determined largely by the containment of chlorophyll in plant matter, and chlorophyll has a distinctly longer peak wavelength of reflectance as compared to the green colors of artificial pigments, which is consistent with the analysis of the two different sets of reference colors as discussion previously along with FIGS. 6A and 6B.

Referring again to FIG. 9, observer 918 is generally a standard observer having normal vision. If the filter design is intended to correct a sufficiently extreme deficiency, a particular deficient observer may be selected. Illuminant 904 is selected depending on the intended use and environment for the filter, and may be, for example, any suitable illuminant disclosed herein. Reference filter 912 is selected to set the intended white point of the designed filter, where the white point is the chromaticity coordinate of the selected illuminant as viewed through the reference filter, and the designed filter will be characterized by the same white point. The reference filter may also be used in a relative gamut area calculation (as described above) comparing the designed filter to the reference filter, described below with respect to FIG. 13, for example.

The remaining design criteria inputs shown in FIG. 9 are spectral transmittance constraints 902, filter white point constraint 908, and color appearance constraints 915. Each color appearance constraint comprises a reference light (defined by its spectral radiant flux), a luminosity constraint such that the resulting filter must provide that the luminosity of the reference light as viewed through the filter is within a bounding interval, and an optional chromaticity constraint such that the resulting filter must provide that the chromaticity coordinates of the reference light as viewed through the filter are contained within the convex hull of the bounding chromaticity coordinates. The aforementioned viewing conditions are also specified with respect to the observer 918 and pre-filter 919.

Further, constraints on spectral transmittance 902 and on the filter white-point 908 are special cases of a color appearance constraint 915 as indicated by the dotted flow arrows. A spectral transmittance constraint may be expressed as a color appearance constraint wherein the reference light is a monochromatic light at a specified wavelength, and the luminosity of the monochromatic light is bounded within some luminosity interval (note that the chromaticity of a monochromatic light cannot be changed by any filter). Some spectral transmittance constraints are required, e.g., the transmittance must be bounded between 0.0 percent and 100.0 percent at each visible wavelength to produce a passive optical filter. The white-point constraint of the filter comprises a reference light that is the selected illuminant, and further provides a luminous equality constraint and a chromaticity boundary. Generally the chromaticity boundary may have essentially infinitesimal size, so that the white-point is set exactly. Alternatively, the chromaticity boundary may have a wider boundary, for example including an approximately circular region that is centered on the white-point of the reference filter. For color vision needs, the filter white-point is generally set or otherwise constrained to be within a central region of the chromaticity diagram corresponding to colors that are considered not strongly colored. For design of filters to be used in sunglasses the illuminant is preferably representative of daylight (e.g. Illuminant D65) and the luminosity bound on the illuminant is between about 8 percent and about 40 percent.

A color appearance constraint, as noted above, is specified as a boundary on the chromaticity coordinate and a bounding interval on the luminosity of the color appearance of a reference light. These data may be understood geometrically as a constraining polyhedron in the tristimulus model, as shown in the diagrams of FIG. 10A and FIG. 10B. More specifically a filter that provides a color appearance that satisfies the constraint is configured so that the tristimulus value of the reference light as viewed through the filter is contained in a convex polyhedron (1001, 1002) that is essentially cone-shaped, where the chromaticity boundary forms a closed contour of wall-like surfaces (e.g. 1005), and the luminosity bounding interval defines two cap-like surfaces including the lower luminosity bound 1007 and the upper luminosity bound 1006. The cap-like surfaces are parallel to the equiluminant plane 1004 and are each contained in planes that are displaced from the origin by the corresponding upper and lower luminosity bounds, respectively. The wall-like surfaces each are contained in planes that intersect the origin. The chromaticity boundary is specified by the convex hull of a set of chromaticity coordinates, which when converted to tristimulus values, define the walls of the cone 1005. The example tristimulus value at 1003 satisfies the chromaticity boundary if and only if the vector norm of the projection of the tristimulus value onto the inward-pointing surface normal vectors (not shown) of all the walls is non-negative. Further, the example tristimulus value at 1003 satisfies the luminosity bounds if and only if the vector norm of the projection of the tristimulus value onto the inward-pointing surface normal vectors (not shown) of the upper and lower caps is greater than/lesser than the lower and upper luminosity bounds, respectively. The surface normal vectors are vectors in tristimulus space that, by definition, are perpendicular to the plane containing a surface. If the lower bound on luminosity is zero, then the cone reaches an apex at the origin. If there is no upper bound on luminosity then the cone extends infinitely in the same direction as the luminosity response line. The geometric structure of this generalized cone allows conversion of a color appearance constraint into a system of linear constraints, as described in additional detail below.

Referring again to FIG. 9, the color appearance constraints 915 are converted into a set of linear constraints via the calculation at 910, which operates iteratively with respect to each color appearance constraint 915 and each elementary filter 913, resulting in the vector of linear constraint projection bounds 906 and the matrix of constraint projection norms 909.

Figure 11:
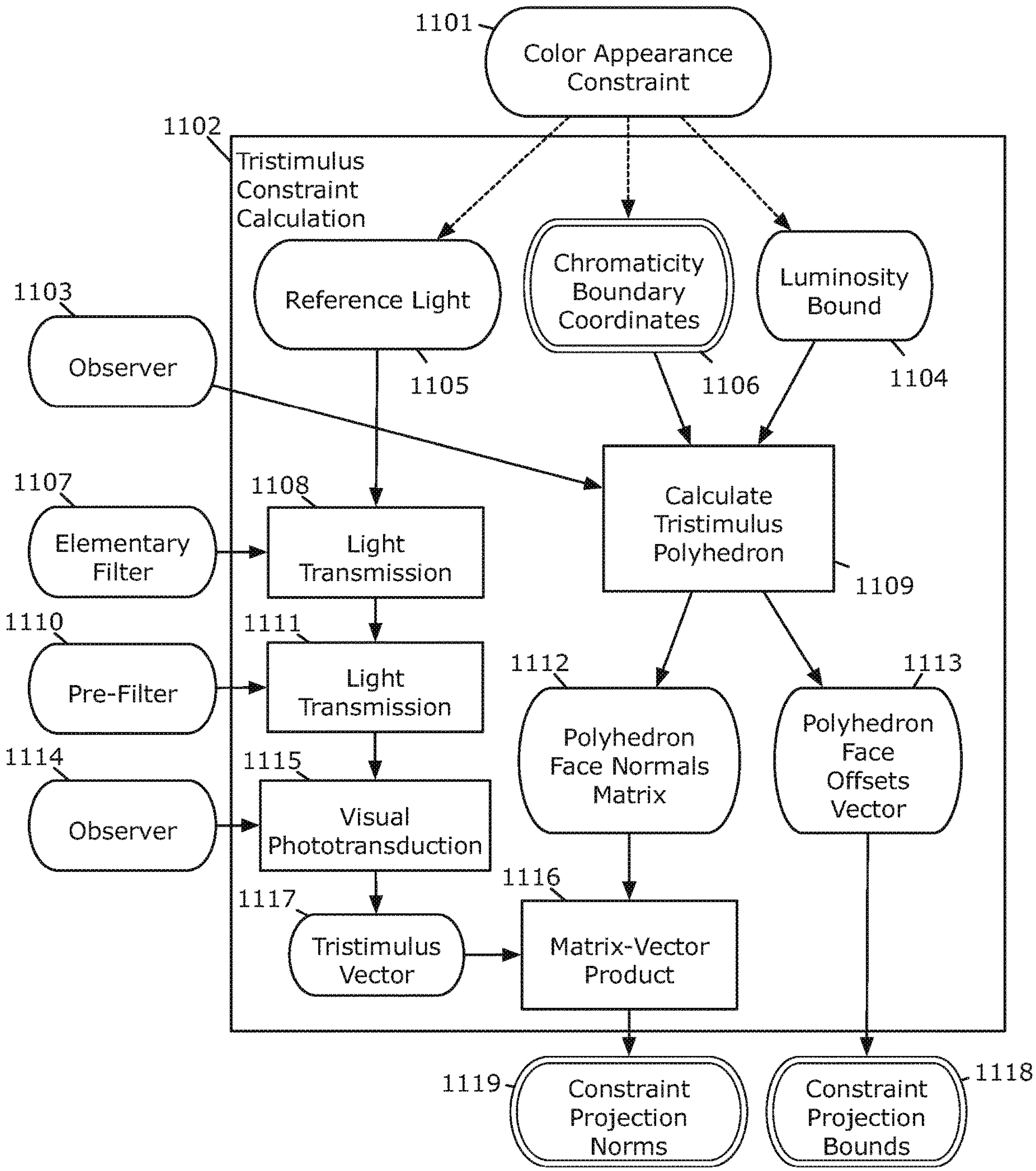
FIG. 11: Process flow diagram of the calculation of constraint projection norms and constraint projection bounds with respect to a specified reference light, a convex chromaticity boundary, a luminosity bound, a first observer, an elementary filter, a pre-filter, and a second observer.

The conversion of a color appearance constraint into a system of linear constraints is further detailed by the process flow diagram of FIG. 11, where tristimulus constraint calculation 1102 corresponds to operation 910 in FIG. 9. Herein a color appearance constraint 1101 may be specified as a reference light 1105, a chromaticity boundary 1106, and a luminosity bounding interval 1104. These bounds may be converted into a generalized polyhedral cone (operation 1109) in the tristimulus space of the observer 1103 as elaborated along with the description of FIG. 10A and FIG. 10B. Operation 1109 provides, from the resulting geometry, a matrix 1112 comprising the vectors normal (perpendicular) to and pointing inward from the faces of the polyhedron, and a vector of the offsets from the origin of the each plane containing a face 1113, which is zero for the wall-like faces and equal to the upper and lower luminosities for the cap-like faces as described previously.

Next, the interaction between the bounding geometry for the color constraint and each elementary filter 1107 is determined as follows. The transmittance 1108 of the reference light 1105 through the elementary filter 1107 is calculated, then the transmittance 1111 through the pre-filter 1210 is calculated, then the retinal photopigment absorptance 1115 (i.e., visual phototransduction) of the filtered light received by the observer 1114 is calculated, resulting in a tristimulus value 1117 corresponding to the reference light as viewed through the elementary filter in combination with the pre-filter. The tristimulus value 1117 is then projected onto the surface normal vectors (in matrix 1112) of the constraining polyhedron using a matrix-vector product 1116, resulting in a set of vector lengths (norms) 1119 of the tristimulus value per face of the constraining polyhedron, and the corresponding bounds 1118 that would ensure containment with respect to the color appearance constraint. These constraint projection norms are linear attributes of the elementary filter with respect to the constraints. For example, if the tristimulus value projected onto a face normal vector has length zero, then that elementary filter is effectively orthogonal to the constraint and any amount of the filter may be incorporated in the solution without causing a violation of that particular boundary. If the constraint projection norm is non-zero, then the magnitude of the norm gives the rate per linear weighting of the elementary filter that causes the designed filter to move toward or away from the constraint boundary.

Referring again to FIG. 9, these results are accumulated in the constraint projection norms matrix (A in the above linear program expression) 909 and the constraint projection bounds vector (b in the above linear program expression) 906, where they are now in a suitable format that is compatible for incorporation in linear program 907.

Figure 16A:
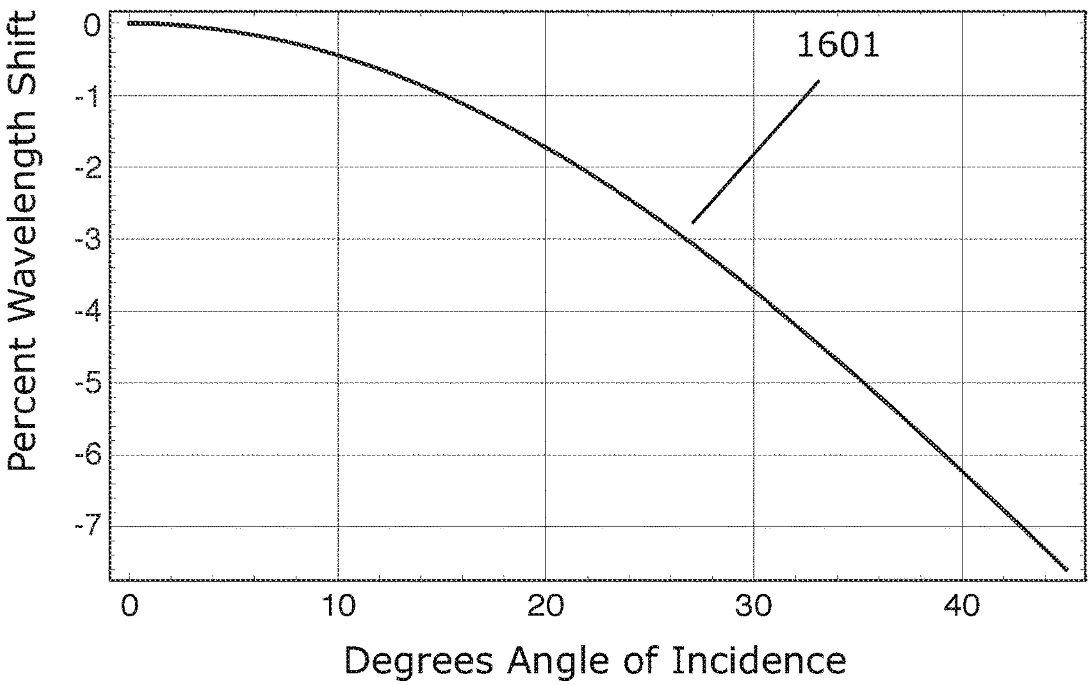
FIGS. 16A, 16B: Graph of the shift in percent wavelength per angle of incidence of an interference filter with a refractive index of 1.85 in accordance with Snell's Law (FIG. 16A), and a graph of the spectral transmittance of a filter that provides enhanced red-green color discrimination and a graph of a spectral transmittance of a filter that additionally provides stable color appearances for a range of wavelength shifts (FIG. 16B).

In some embodiments a color appearance constraint 1101 (FIG. 11) may also include an angle of incidence of the reference light 1105 with respect to the elementary filter 1107, in which case an appropriate transformation may be applied to correctly calculate the resulting transmission of light in 1108 and 1111 so that the tristimulus value of the reference light as viewed through the elementary filter in combination with the pre-filter also accounts for the angle of incidence of the reference light. For example, if the filter is to be manufactured as an interference filter, the angle of incidence may be used to shift the elementary filter on a percent basis in wavelength according to Snell's Law. (See, e.g., curve 1601 in FIG. 16A). Further, if the pre-filter is an absorptive type the calculation may account for path-length differences according to the Beer-Lambert Law. The composite filter f may then be expressed by the composition of components q=Ex and p, so that the transmittance off at an angle of incidence θ radians away from the surface normal vector may be denoted $f_\theta(\lambda)$ and approximated by the expression:

$$f_\theta(\lambda)=p(\lambda)^{(1/cos(\theta))}\Sigma_{i=1\ldots N}x_ie_i(\lambda/\mathrm{sqrt}(1-\sin^2(\theta)/n^2));$$

where the effective refractive index of $e_i$ is n which has a value of about 1.85 and the approximation is sufficient for θ between about 0 degrees and about 45 degrees. Incorporation of color appearance constraints at non-zero angles of incidence are particularly useful to provide filter designs that have improved color stability under non-ideal viewing conditions. For the purpose of evaluating filters in the present disclosure, the white-point shift of a filter f with respect to angle of incidence θ is defined by the expression:

$$WPS(f,\theta)=\mathrm{sqrt}((u_0-u_\theta)^2+(v_0-v_\theta)^2),$$

where, in the above expression, ($u_0$, $v_0$) and ($u_0$, $v_0$) are the CIELUV (u',v') chromaticity coordinates, with respect to the CIE 1931 2-degree Standard Observer, of Illuminant D65 as viewed through the filter at normal incidence and at θ degrees off-normal incidence. Alternatively, the white-point shift be calculated with respect to the CIE 1964 10-degree Standard Observer.

Figure 13:
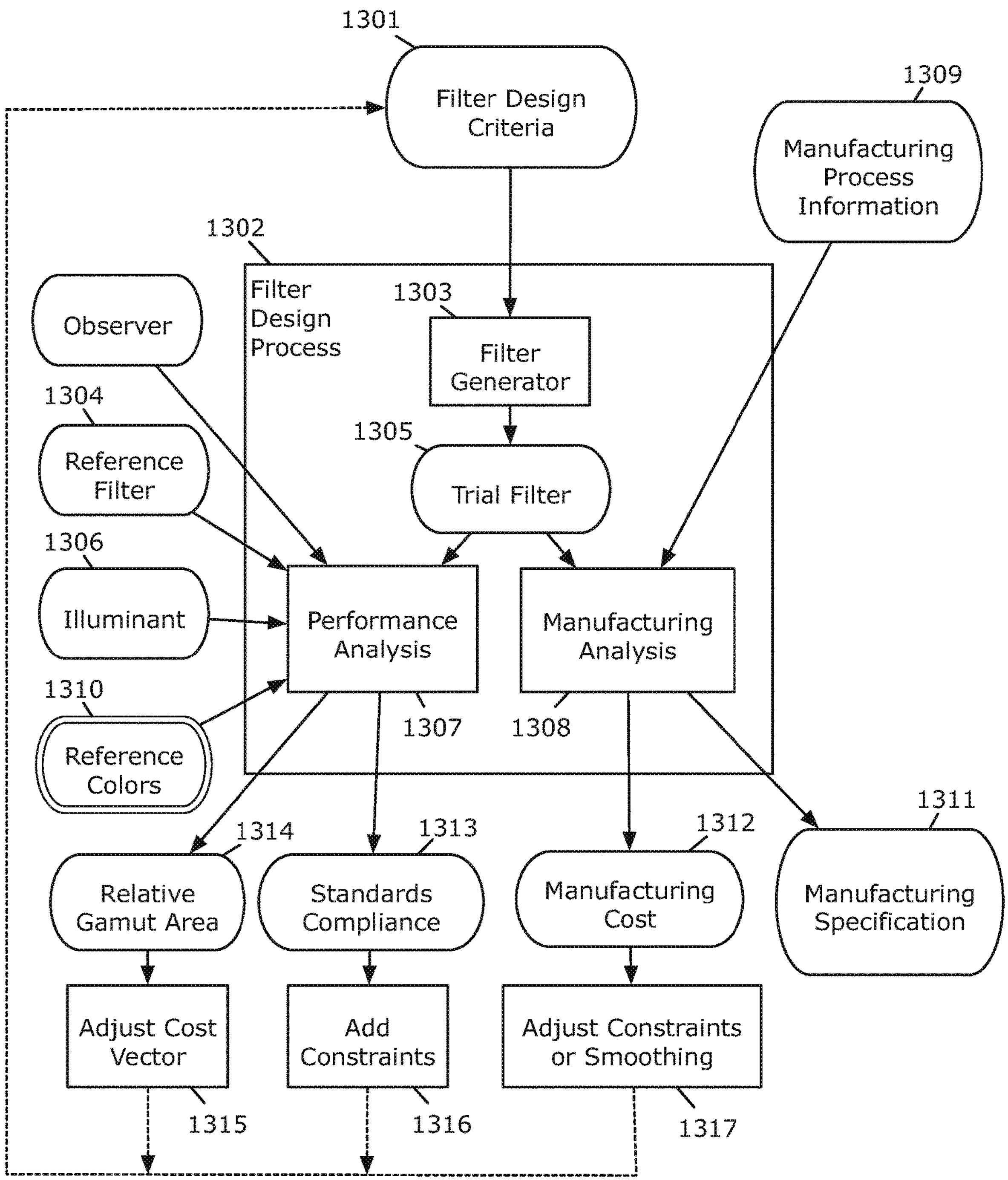
FIG. 13: Process flow diagram of iterative filter design process accounting for design criteria, use criteria and manufacturing criteria.

Referring now to the process flow diagram of FIG. 13, in some embodiments a filter design process is iterative. Such an iterative process may begin with an initial specification of filter design criteria 1301 input into filter generator 1303 in design process 1302. Design criteria 1301 may include, for example, some or all of the design inputs shown in FIG. 9. Additional information 1309 regarding the manufacturing process may also be input to optional manufacturing analysis process 1308 (further described below), also in design process 1302. Such manufacturing information may include, for example, time limits on manufacturing equipment use, manufacturing cost or budget, and physical limits on filter structures such as, for example, limits on thickness, uniformity of thickness, composition, or uniformity of composition of material layers utilized to manufacture a filter.

Filter generator 1303 may be, for example, identical or substantially identical to filter generator 903 described above with reference to FIG. 9. Filter generator 1303 generates trial filter 1305, which may be, for example, an optimized filter description in terms of transmission as a function of wavelength or frequency (as output by operation 914 in FIG. 9, for example), a smoothed optimized filter description in terms of transmission as a function of wavelength or frequency (as output by operation 916 in FIG. 9, for example), or a composite filter design incorporating an optional pre-filter (as output by operation 917 in FIG. 9, for example).

Optionally, the optical performance of trial filter 1305 (FIG. 13) may be analyzed at operation 1307. Such performance analysis may include, for example, calculation of the relative gamut area 1314 with respect to a reference filter 1304, an illuminant 1306, and a set of reference colors 1301 (all of which are optional additional inputs to design process 1302). The relative gamut area may be calculated, for example, using the process described above with reference to FIG. 4. If the relative gamut area is undesirable (i.e., either too high or too low), then the cost vector may be adjusted at operation 1315 and the filter design criteria 1301 updated accordingly prior to another iteration through design process 1302.

In embodiments in which the cost function is adjusted as just described, the first iteration of design process 1302 may utilize, for example, an initial function of cost per wavelength in the form of the sum of (for example, two) Gaussian functions each characterized by a center wavelength, a width, and an amplitude. The cost function may further include a monotonic bias incorporated by addition of, or multiplication by, any monotonic function. The monotonic function may be linear, for example. As the design process is iterated, with relative gamut area calculated at each iteration, the cost function may be adjusted using any suitable conventional maximization method that adjusts the cost function to increase (or, alternatively, decrease) the gamut area. Adjusting the cost function may include, for example, altering parameters characterizing the Gaussians, altering parameters characterizing any monotonic bias present, or altering parameters characterizing the Gaussians and altering parameters characterizing a bias. Any other suitable form for the cost function or parameterization of the cost function, and any other suitable method for adjusting the cost function, may also be used.

As an alternative to using relative gamut area to assess performance of a trial filter with respect to color discrimination, in some embodiments the distribution of the reference colors in chromaticity space is characterized by calculating one or more standard deviations of the distribution. The standard deviations may be calculated for the projection of the distribution along the red-green and blue-yellow axes of the chromaticity space, or along any other suitable choice of directions or axes. Projection onto the deutan confusion line may be preferable for evaluating filters to be used by deuteranomalous observers. Projection onto the protan confusion line may be preferable for evaluating filters to be used by protanomalous observers. Projection onto the tritan confusion line may be preferable for evaluating filters to be used by tritanomalous observers, or may be useful for evaluating filters to ensure that blue-yellow color discrimination is not adversely affected by complementary increase in standard deviation along a perpendicular or nearly perpendicular axis of red-green color discrimination. Trial filters that increase one or more such standard deviations, compared to the reference filter, may be viewed as increasing color discrimination along the one or more corresponding directions in chromaticity space. Trial filters that decrease one or more such standard deviations, compared to the reference filter, may be viewed as decreasing color discrimination along the one or more corresponding directions in chromaticity space. Similarly to as described above with respect to relative gamut area, in some embodiments the cost function used in design process 1302 may be iteratively adjusted to maximize or minimize one or more standard deviations of the reference color distribution in chromaticity space as viewed through the trial filter.

Returning now to performance analysis operation 1307 in design process 1302 (FIG. 13), operation 1307 may optionally also assess the trial filter for compliance with industrial or government regulatory standards such as, for example, American National Standards Institute, Inc. ANSI Z80.3-2010 (approved Jun. 7, 2010) or ANSI Z87.1-2010 (approved Apr. 13, 2010), both of which are incorporated herein by reference in their entirety. This analysis may be performed, for example, to ensure that the trial filter is safe for use by a human observer for the intended application, for example while operating a motor vehicle. Based on result 1313 of this standards compliance analysis, operation 1316 may formulate additional or modified color appearance constraints for the filter design criteria 1301 to direct design filter process 1302 toward compliance with the standards.

In addition to or as an alternative to performance analysis 1307, trial function 1305 may be analyzed for manufacturability at operation 1308. This operation may generate, for example, an estimated manufacturing cost 1312 and a manufacturing specification 1311 that provides tolerances and/or machining instructions. Estimated manufacturing cost 1312 may be expressed, for example, as a total manufacturing time, a total financial cost, or both. Based on estimated manufacturing cost 1312, operation 1317 may optionally adjust color constraints, smoothing (e.g., operation 916 in FIG. 9), or color constraints and smoothing to direct design filter process 1302 to a filter with a lower estimated manufacturing cost. For example, the width of smoothing kernel 920 (FIG. 9) may be increased, or constraints on the spectral transmittance in certain regions may be relaxed or tightened as appropriate.

If constraints added or modified at operations 1316 or 1317 produce infeasible design criteria (i.e., design criteria for which there is no solution to the linear programming problem), the linear program solver (e.g., 905 in FIG. 9) may detect this situation. Constraints may then be relaxed or revised until feasibility is restored.

The entire filter design and analysis process 1302 may be repeated until a satisfactory (e.g., the most preferable) filter design is reached, at which point the manufacturing specification 1311 may be taken and used to manufacture the optical filter.

Filters as disclosed herein may filter light based, for example, on absorption, reflection, or absorption and reflection of light. Filters may include, for example, any suitable combination of interference filters, absorption filters, and polarization filters (polarization filters typically include a pair of linear polarizers enclosing a wavelength-selective polarization rotator). Interference filters, and interference filter portions of composite filters, as disclosed herein may be fabricated, for example, as dielectric coatings using about 12 to 200 layers and having a total thickness of about 6 microns per 100 layers and a typical effective refractive index of between about 1.8 and about 1.9. These multi-layer interference coatings may be applied, for example, on glass or optical polymer substrates with a base curve between zero and about ten diopter, where diopter is defined as the measure of spherical curvature by a lens clock calibrated to an index of 1.523.

Figure 24A:
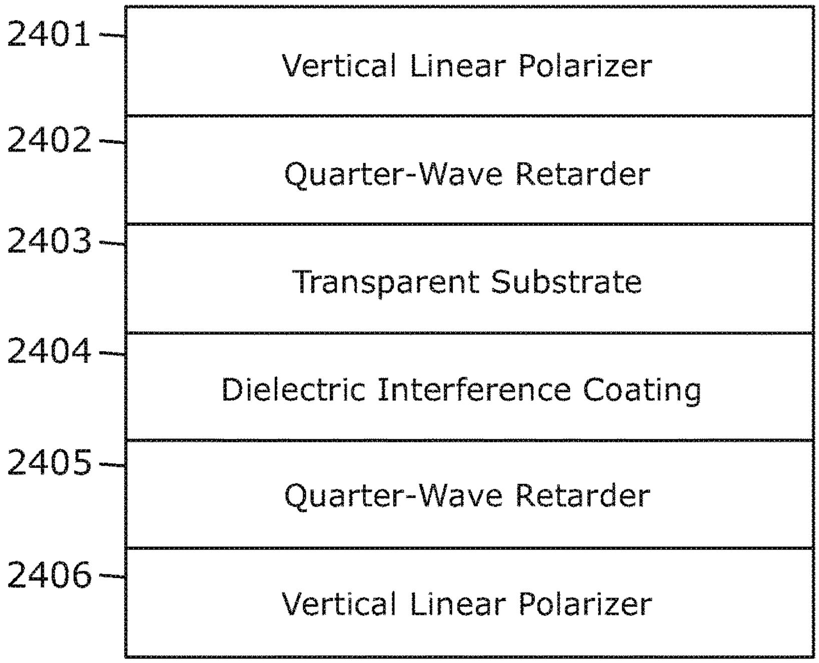
FIGS. 24A, 24B: Schematic diagram of a composite lens containing an interference filter and a circular polarizer that absorbs light reflected by the interference filter (FIG. 24A), and a diagram showing the operation of the composite filter (FIG. 24B).
Figure 24B:
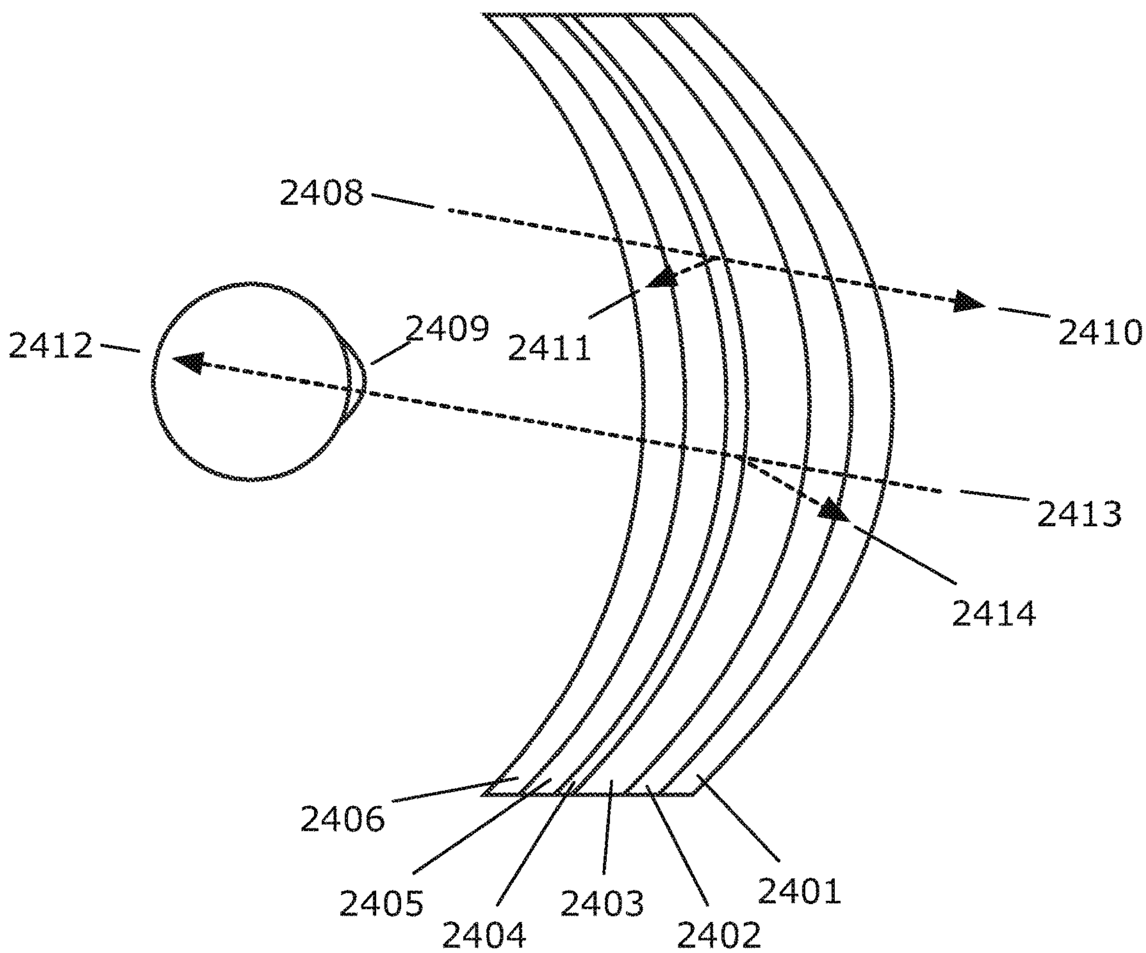

Interference filter designs disclosed herein and intended for eyewear may also be specified for use in composition with a circular polarizer, the details of which are given in FIG. 24A and FIG. 24B and accompanying description.

Figure 20A:
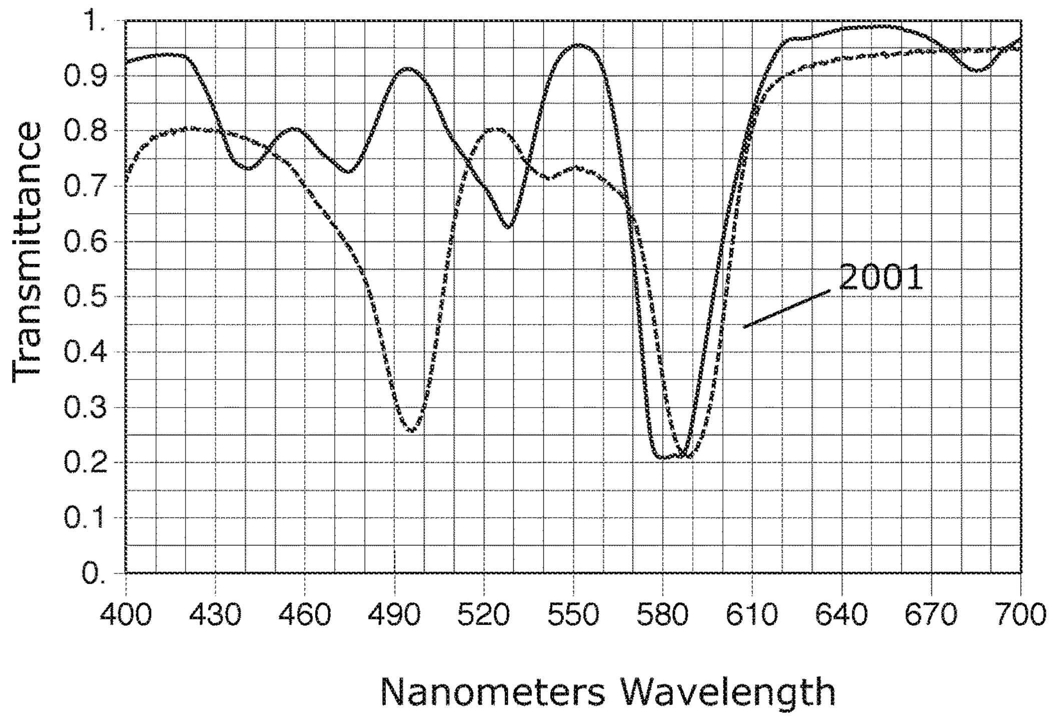
FIG. 20A, 20B: Graph of the spectral transmittance of two narrow-band selective absorptive filters (FIG. 20A), and graphs of the spectral transmittance of two multi-band interference filters that provide red-green color discrimination enhancement in composition with the absorptive filters (FIG. 20B).
Figure 20B:
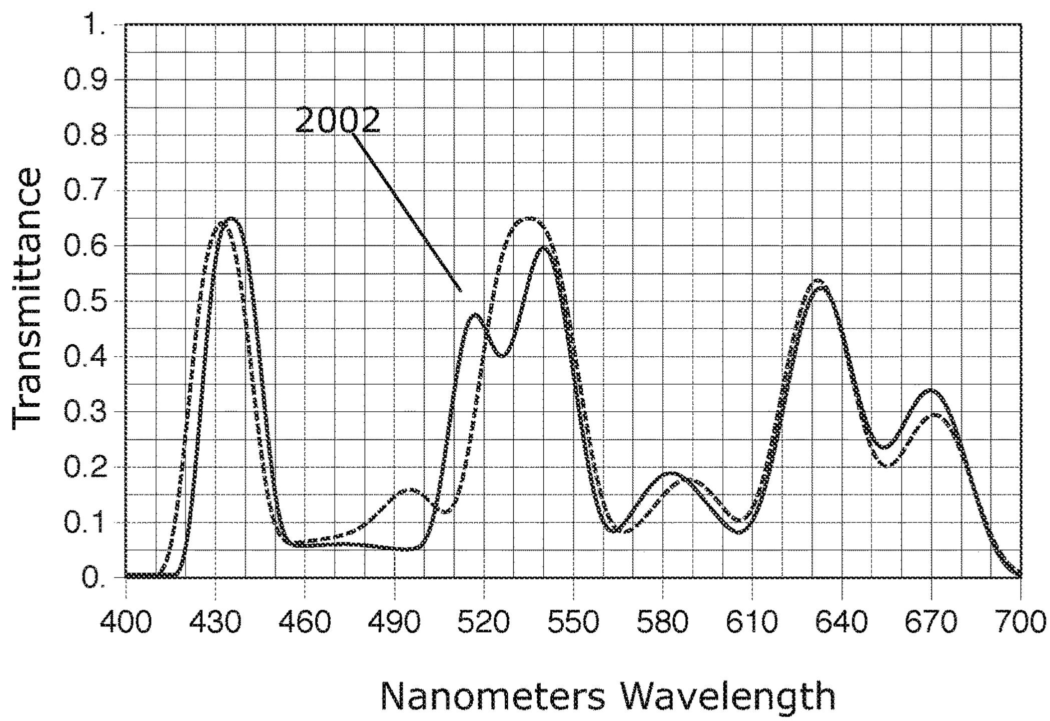
Figure 28A:
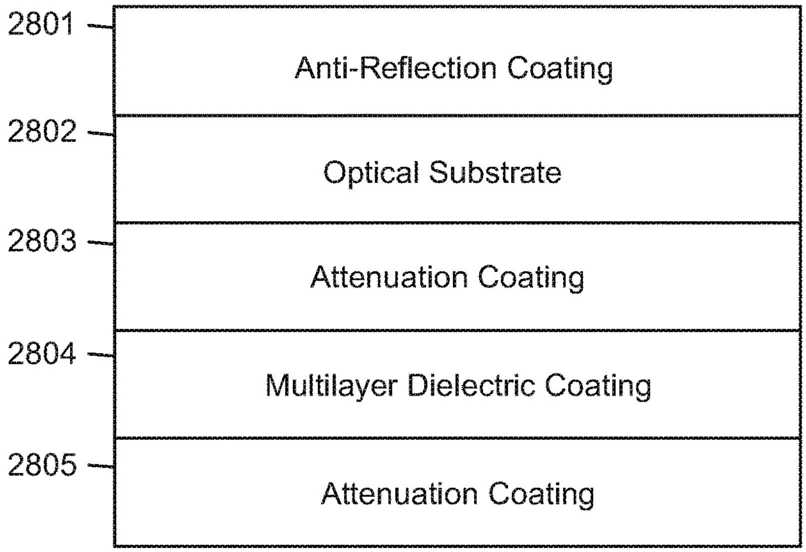
FIGS. 28A, 28B: Schematic diagram of a composite filter containing an interference filter and absorptive filters where the absorptive filters attenuate light reflected by the interference filter (FIG. 28A), and a diagram showing the operation of the composite filter incorporated into eyewear (FIG. 28B).
Figure 28B:
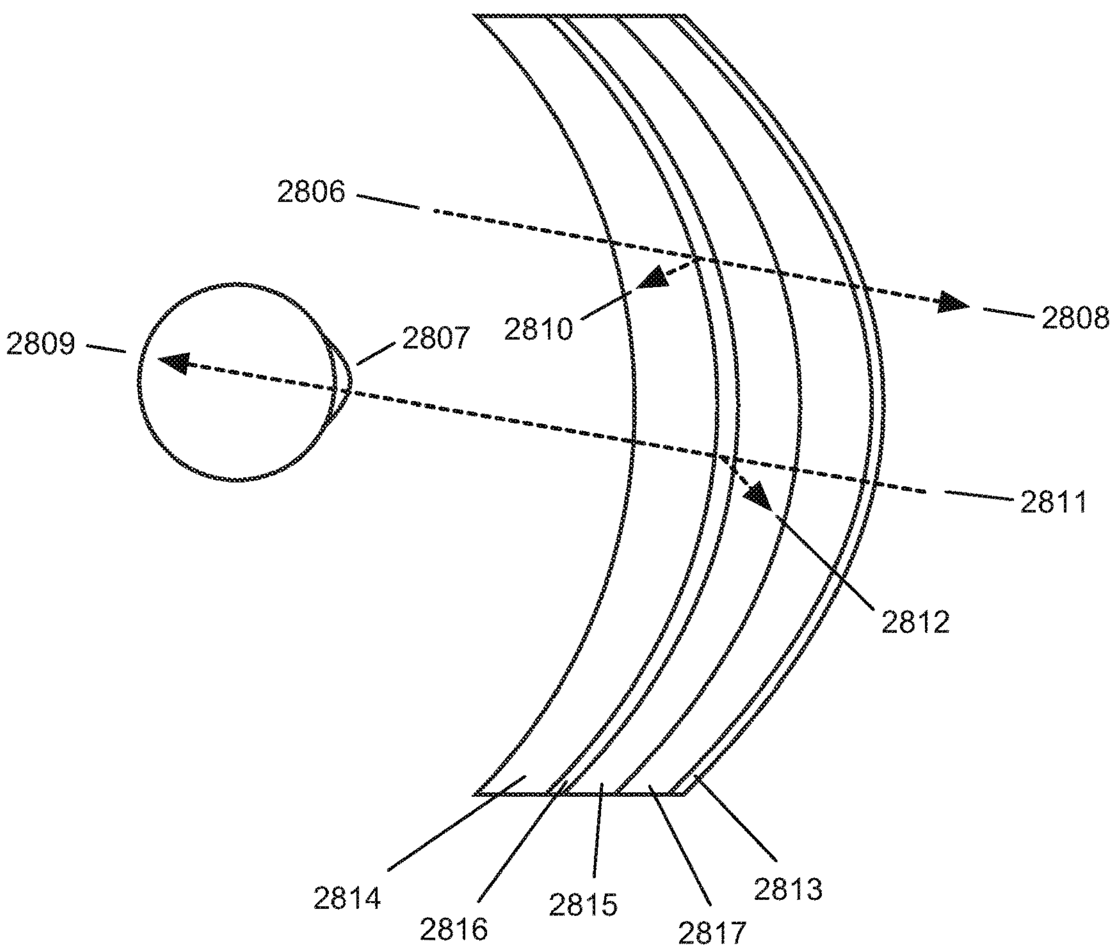

Further designs for interference filters disclosed herein and intended for eyewear may also be specified for use in composition with a neutral density absorber, or a broad-band absorber, or a narrow band absorber, the details of which are given in FIG. 28A and FIG. 28B and accompanying description, and specific examples of which are disclosed along with discussion of FIG. 20A and FIG. 20B.

Generally hereafter the manufacturing process is assumed to include (at least) physical vapor deposition of dielectric material in a sequence of coating layers of varying thickness and index of refraction to form an interference filter. Industrial machines and processes are readily available and enable high-throughput high-precision manufacturing of such filters, including for filters with regions of partial transmittance and/or irregular configurations of pass-bands. Any other suitable manufacturing processes may be used instead, or in combination with such a physical vapor deposition process, as well.

Unless otherwise constrained, filters that are designed to increase red-green color discrimination may tend to lower the transmission of yellow light, which may cause a yellow traffic signal to appear darker and more similar to red (e.g., orange or reddish). Similarly, filters that increase blue-yellow color discrimination may tend to cause green lights to appear more similar to blue or to white (e.g., desaturated). To avoid this and similar potential problems, filters that are to be incorporated in general purpose eyewear such as sunglasses, for example, may be configured so that the resulting eyewear provide a regulated appearance of certain colors, in particular those of average daylight and traffic signal lights. For some eyewear this may be necessary, for example, to satisfy industrial or government regulatory standards. Satisfactory configurations may be designed using the methods described above, for example, by applying suitable constraints to the filter design. A luminosity constraint may ensure that such lights (e.g., daylight, traffic signal lights) appear reasonably bright when viewed through the filtering eyewear. A chromaticity constraint, specified as convex boundary in chromaticity coordinates, may ensure that such lights fall within the constraint boundaries and consequently will be regarded by the observer as having a color hue with the correct canonical color name, i.e., that daylight is essentially white, and that traffic signals are correctly identified, e.g., as traffic signal green, traffic signal yellow, and traffic signal red indicator lights.

Figure 14A:
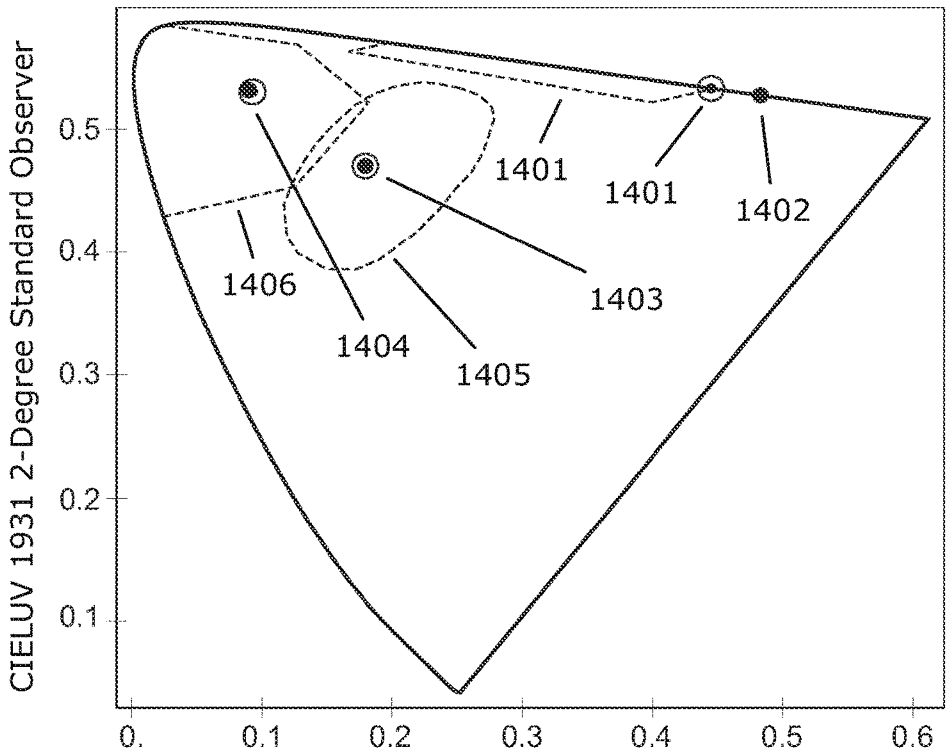
FIGS. 14A, 14B, 14C: Chromaticity diagram of the color appearance of green and yellow traffic signals and of daylight as viewed through a first filter and as viewed through a second filter (FIG. 14A), graphs of the spectral radiant flux of the green and yellow traffic signals and of daylight (FIG. 14B), and graph of the spectral transmittance of the filters (FIG. 14C).

FIG. 14A shows examples of such "general use" constraints for general purpose eyewear. Example chromatic boundary 1401 provides that yellow traffic lights do not appear orange or red. The point 1402 shows the chromaticity of the yellow traffic light as viewed through an unconstrained red-green color discrimination enhancing filter, and the point 1401 shows the chromaticity of the yellow traffic light under a compliant red-green color discrimination enhancing filter. Example chromatic boundary 1406 provides that green traffic lights do not appear yellow, blue, or overly desaturated. The point 1404 shows the chromaticity of the green traffic light, which is essentially identical under both filters. Example chromatic boundary 1405 provides that daylight does not appear strongly colored. The point 1403 shows the chromaticity of daylight is essentially identical under both filters.

Figure 14B:
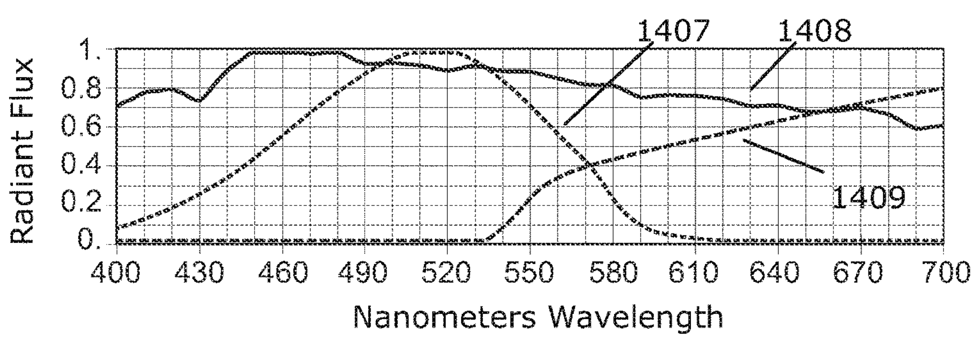
Figure 14C:
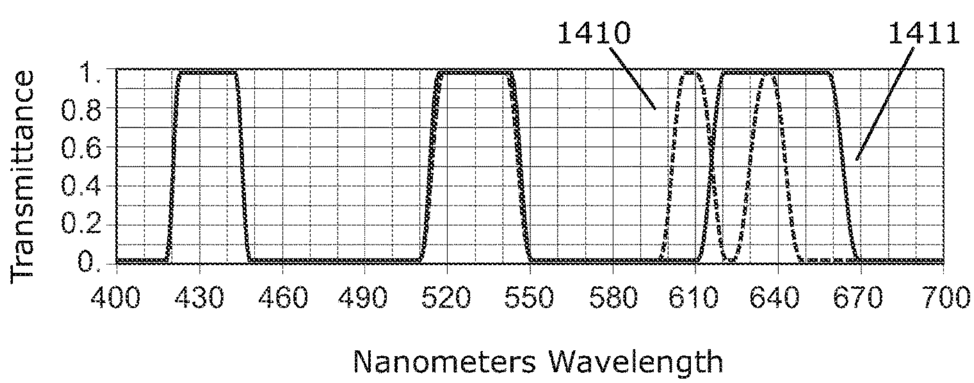

FIG. 14B shows graphs of the spectral radiant flux of daylight 1408, the green traffic signal 1407, and the yellow traffic signal 1409. FIG. 14C shows the transmittance 1411 of the unconstrained filter, and the transmittance 1410 of the constrained filter. In filter 1410, the effect of the constraint is apparent in that the long pass-band has been essentially split into two pass-bands to form a four pass-band filter. The limiting constraint as shown in this example is on the red-most side of the yellow chromaticity boundary. However as will be shown in further description along with FIGS. 15A and 15B the split pass-band may be more preferably forced into a single pass-band with an irregular shape, such as having a shoulder in place of the split sub-band on the short wavelength side, or smoothed with a kernel that is wide enough to essentially merge the sub-bands into a single pass-band.

Figure 15A:
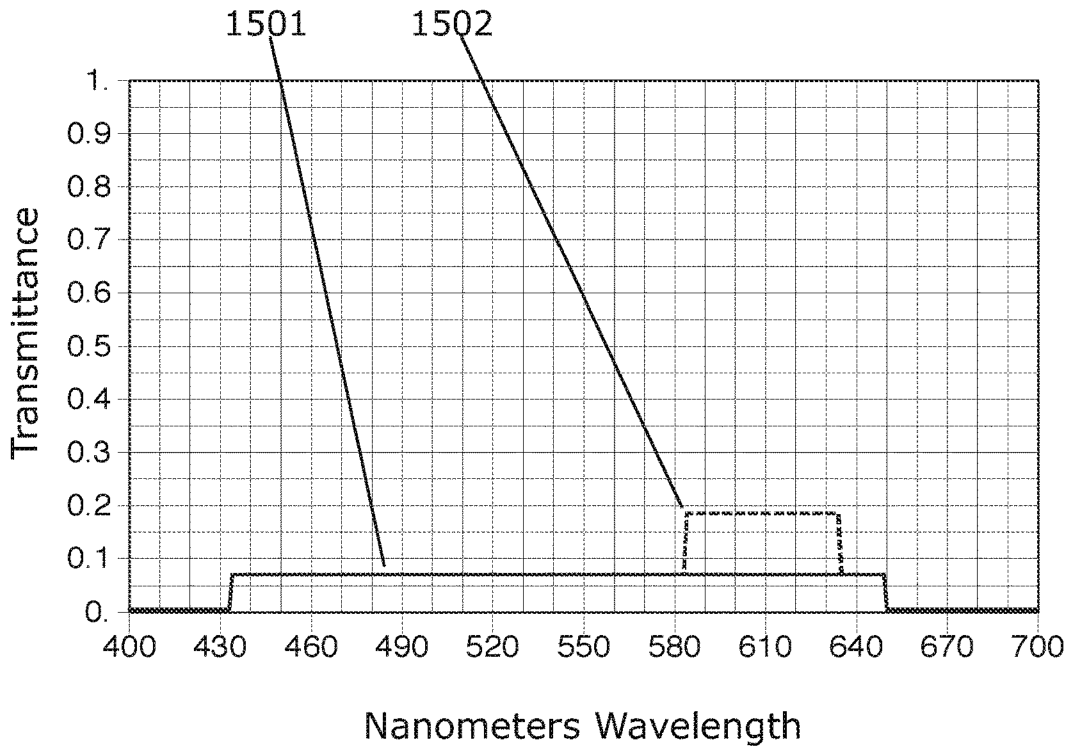
FIGS. 15A-15B: Graphs of two variants of a minimum spectral transmittance constraint (FIG. 15A), and graphs of the spectral transmittance of corresponding color enhancing filters satisfying the constraints (FIG. 15B).
Figure 15B:
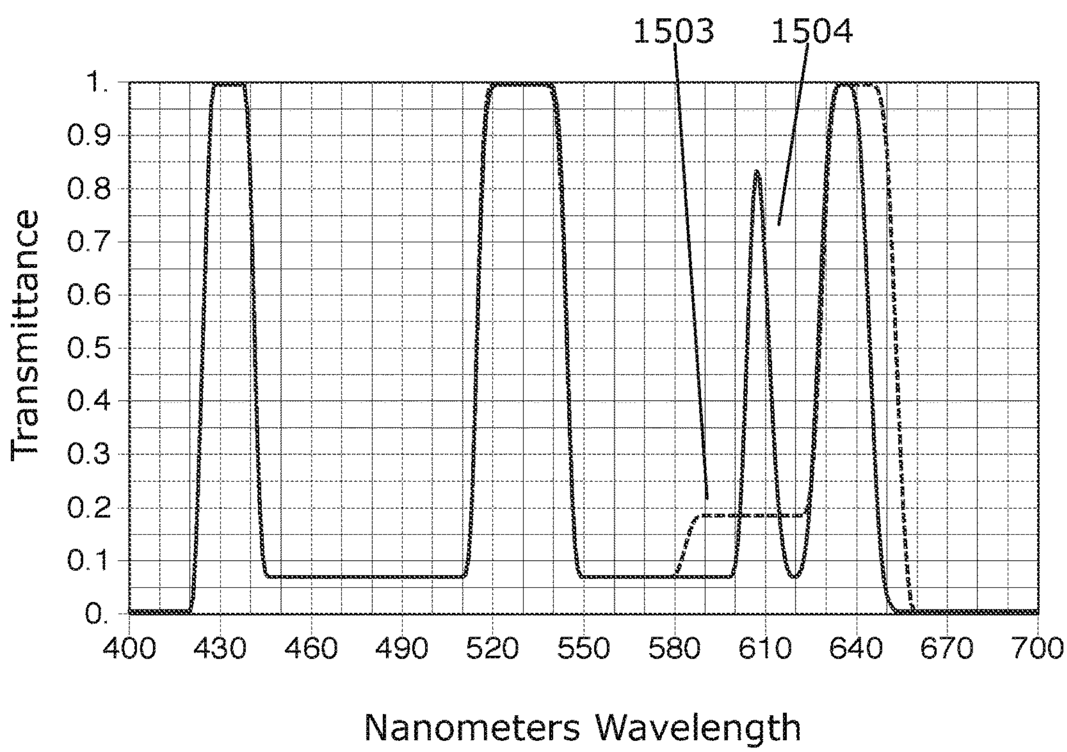

A further concern regarding the incorporation of multi-band filters into eyewear is that the stop-bands may significantly suppress the luminosity of some narrow band lights (such as from light-emitting diodes, lasers and sodium vapor lamps). In some embodiments it is preferable to set a lower bound on the minimum transmittance of a filter to ensure a minimum brightness of all monochromatic lights. In FIG. 15A, for example, the graph at 1501 shows a spectral transmittance lower bound which is about 7 percent transmittance between about 450 nanometers and about 650 nanometers. A filter incorporating the constraint is shown by its spectral transmittance graph at 1504 in FIG. 15B.

Filter 1504 is a four pass-band filter in which the fourth pass-band has been added to satisfy a yellow traffic light constraint (as described along with FIG. 14A-14C). In some embodiments it may be preferable to convert this additional pass-band into a band shoulder on the short-wavelength side of the long wavelength pass-band. This change may be preferable since the resulting filter may provide a more stable appearance of the yellow light (in particular for narrow-band yellow lights) with respect to change in angle of incidence, assuming the multi-band filter incorporates an interference filter that is characterized by a blue-shift of the spectral transmittance at an angle of incidence other than normal incidence, as further described below. Substituting the shoulder for the fourth pass-band may be accomplished, for example, by increasing the minimum spectral transmittance constraint in the desired region as shown, for example, by graph 1502 in FIG. 15A. In graph 1502 the minimum transmittance has been set to about 18 percent between about 580 nanometers and about 635 nanometers. The resulting modified filter transmittance is shown by graph 1503 (FIG. 15B) which shows the described shoulder on the short-wavelength side of the long-wavelength pass-band.

Pass-bands having a shoulder as just described may also be useful at other locations within a three pass-band filter. For example, in some embodiments there may be utility in adding a minimum transmittance constraint causing a shoulder on the long-wavelength side of the middle-wavelength pass-band in order to reduce color-distortion of narrow-band fluorescent lamps (such as FL10-FL12) under angle-of-incidence induced blue-shift. In further examples, some embodiments have a shoulder on the short-wavelength or long-wavelength side of the short-wavelength pass-band, which is described in greater detail along with FIGS. 16A and 16B. In further examples pass-bands may have an irregular shape (i.e., not rectangular and not Gaussian), with a configuration that is essentially a bimodal distribution where the two modes are at least partially overlapping, or may have a shoulder on one or more sides of the pass-band, or may be described as a skewed distribution, where the slope ratio between the two sides of the pass-band, in transmittance per wavelength, is between about 4:1 and 1:4.

A further constraint applicable to such filters pertains to the white-point, i.e., the chromaticity coordinate of a typical illuminant such as daylight. Provided that the white-point is within a reasonable radius of the neutral point (i.e. the chromaticity coordinate corresponding to unfiltered daylight), then the filter may be considered not strongly colored. As such, the visual mechanism of chromatic adaptation will enable the observer to adjust to the new color balance after wearing the eyewear for a few minutes. In some embodiments it is preferable to minimize this adjustment waiting time by, for example, configuring the white point to be neutral, i.e., so that the chromaticity coordinate of daylight is at or nearly at the center of the region 1405 (FIG. 14). In such cases where the white-point is desired to be neutral, a constraining region may be given for the appearance of daylight, for example, the (x,y) chromaticity coordinate of Illuminant D65 is about (0.31, 0.33), and the most preferable filters may provide a white-point within about 0.05 units of that point. In some cases, in particular for example when the cost function is configured to either maximize or minimize transmission of blue light, it may be preferable to allow the white-point to vary within a larger region, for example anywhere within the region 1405 (FIG. 14). In yet further situations, particular tints of the white-point may be specified for other reasons including aesthetics.

As noted above, the transmission spectrum of a multi-band interference filter is sensitive to deviation of the angle of incidence of incident light. Specifically the spectral transmittance undergoes a shift towards shorter wavelengths (a blue-shift) as the effective optical thickness of an interference filter (i.e., the wavelength at which destructive interference occurs at refractive-index boundaries within the filter) decreases as the angle of incident light increases away from normal incidence. Normal incidence is defined by a vector perpendicular to the surface on which the interference filter is deposited. Herein normal incidence may be referred to as zero degrees angle of incidence, i.e., the angle refers to the declination away from the normal vector. Further, a multi-band filter incorporating an absorptive filter may change in transmittance according to the Beer-Lambert Law, where the absorption tends to increase due to the greater effective path-length through the absorbing medium as the angle of incident light increases away from normal incidence. In any of the above variations the multi-band filter f may comprise an absorptive filter p with an interference filter q, where the change in transmittance per angle of p is in accordance with the Beer-Lambert Law, and the change in transmittance per angle of q is in accordance with Snell's Law, so that the transmittance of f at an angle of incidence θ radians away from the surface normal vector may be denoted $f_\theta(\lambda)$ and approximated by the expression:

$$q(\lambda)=f(\lambda)/p(\lambda),$$

$$f_\theta(\lambda)=p(\lambda)^{(1/\cos(\theta))}q(\lambda/\mathrm{sqrt}(1-\sin^2(\theta)/n^2));$$

where, in the above expression, the effective refractive index of q is n which has a typical value of about 1.85, the spectral transmittance of p at normal incidence is p(λ), the spectral transmittance of f at normal incidence is f(λ), the spectral transmittance of q at normal incidence is q(λ), and the approximation is sufficient for θ between about 0 degrees and about 45 degrees. The angle of incidence sensitivity of a filter has implications regarding its incorporation into apparatus such as eyewear, where the effective angle of incidence of light has significant variation per location on the surface of the lens (which is described in detail along with FIGS. 29A-29B and FIGS. 30A-30B), and also has implications regarding the incorporation of such filters into apparatus such as lamp assemblies, where it is not possible to achieve perfect beam collimation of an illuminant.

The change in spectral transmittance of a filter per angle of incidence is a physical property of the filter. However, what is of primary interest is the perceptual implications of such changes, which may be quantified by measuring the amount of chromatic and luminous change of a reference light as viewed through the filter per angle of incidence. In particular it is useful to consider such changes with respect to the chromaticity coordinate of the illuminant, i.e., the filter white-point, as changes to the white-point per angle of incidence are generally correlated with such changes to an entire set of reference colors as viewed under that illuminant. Further, by employing additional color appearance constraints in the filter generation methods as described previously, it is possible to constrain the white-point at two or more angles of incidence (e.g., at 0 degrees and at 25 degrees away from the normal axis, or at 0 degrees, and 25 degrees and 35 degrees), so that the chromaticity coordinate of the illuminant is substantially invariant at the specified angles and intermediate angles.

Figure 17A:
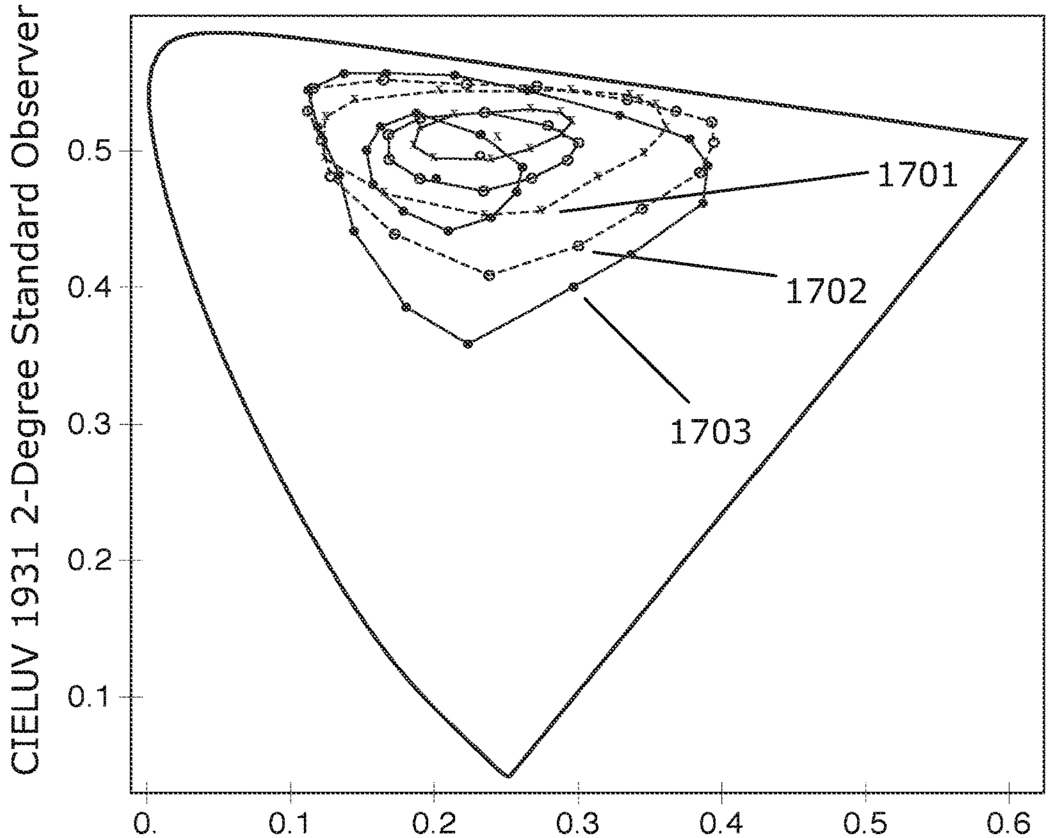
FIGS. 17A, 17B, 17C: Chromaticity diagram of the color appearance of selected Munsell colors under illumination by daylight as viewed through a filter and as viewed by the same filter wavelength shifted by −2.5 percent and by −5 percent.
Figure 17B:
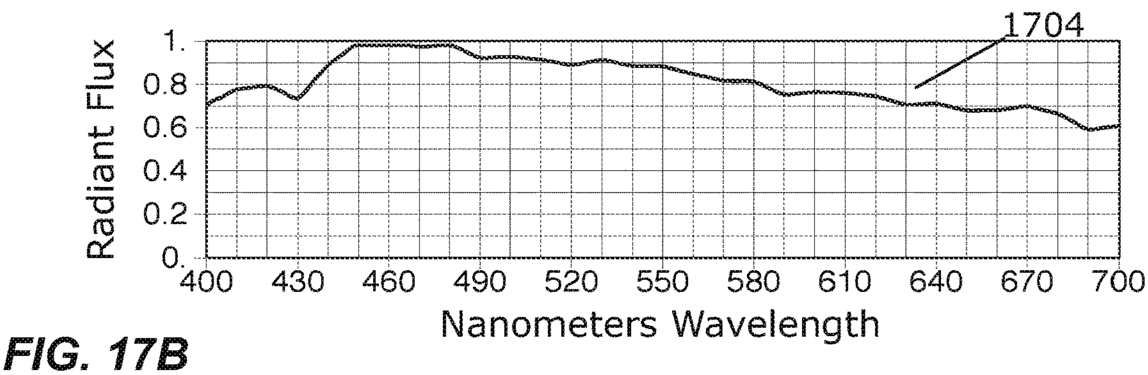
Figure 17C:
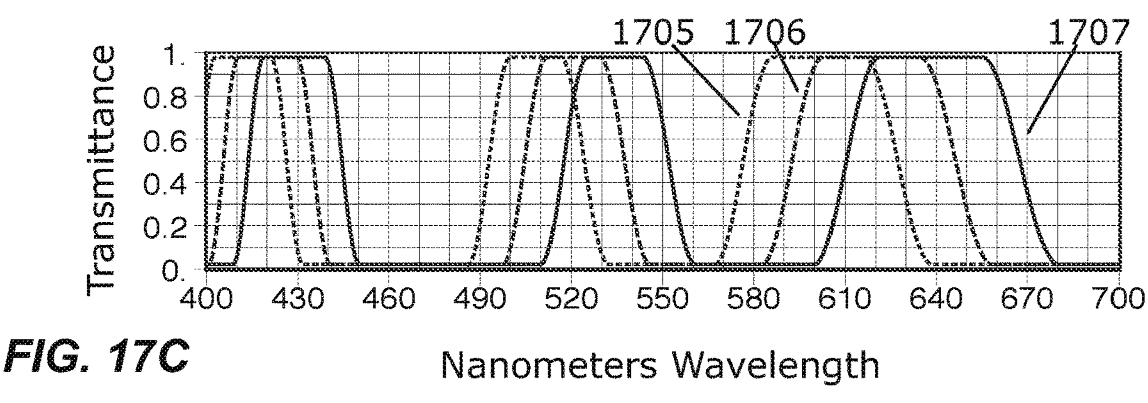

In FIG. 17C graph 1707 (similar to graph 811 of FIG. 8C) shows the spectral transmission of an example filter that provides enhanced red-green color discrimination. Graph 1707 shows the spectral transmission of the filter at normal incidence, and graphs 1706 and 1705 show the (blue-shifted) spectral transmission of the filter at about 20 degrees and 30 degrees, respectively, off normal incidence. FIG. 17A also shows the effect on the appearance of selected contours of the Munsell colors as viewed through the three filters. Contour 1703 corresponds to the normal filter (zero degrees angle of incidence), contour 1702 corresponds to the first shifted filter (about 20 degrees angle of incidence), and contour 1701 corresponds to the second shifted filter (about 30 degrees angle of incidence). It is evident from these contours that the appearance of colors under the filter are not stable with respect to such changes in angle of incidence. Moreover we observe that the filters with the greatest increase in red-green color discrimination tend to position pass-bands where the change in absorptance per wavelength of one or more retinal photopigments is greatest. Thus the most preferable filters for color discrimination enhancement (in particular for red-green enhancement) are also the least preferable for providing stable appearance of colors.

Figure 16B:
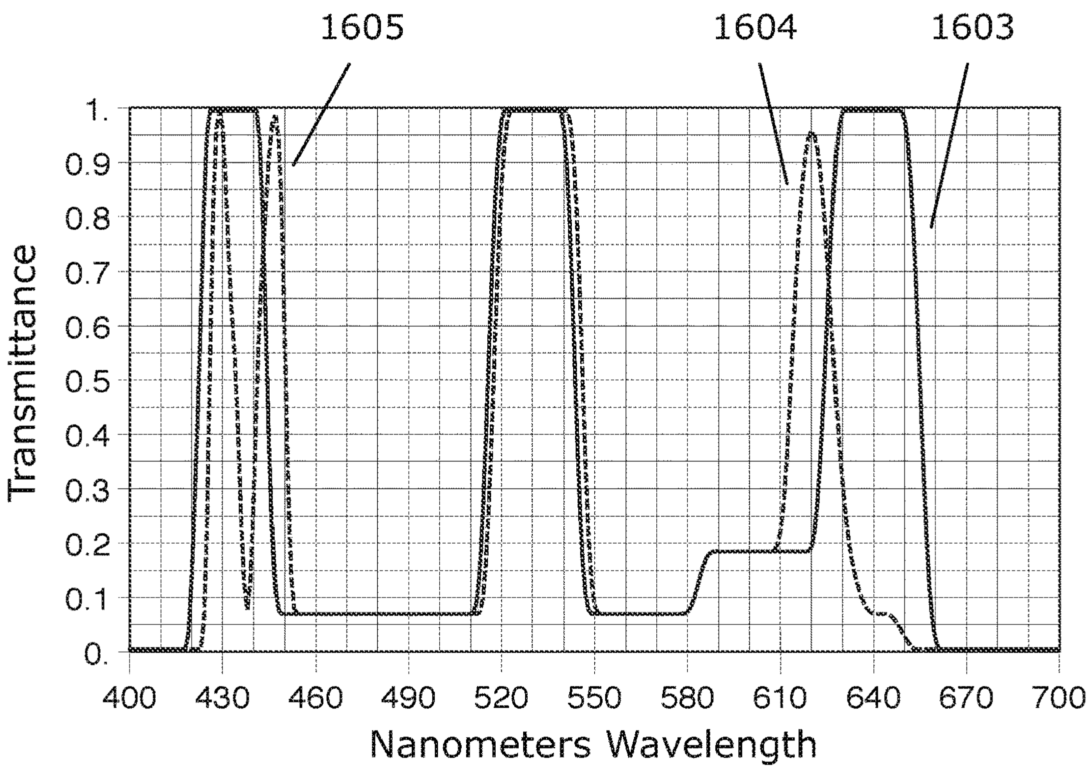

In FIG. 16B graph 1603 (similar to graph 1503 of FIG. 15B) shows the spectral transmission of an example filter that provides enhanced red-green color discrimination. Graph 1604 shows the spectral transmission of an example filter similar to that of 1603 that provides enhanced color appearance and additionally provides stable color appearances by means of constraining the white-point to be substantially identical at normal incidence and at about 30 degrees off-normal incidence. Multi-band filters providing stable color appearances may derive that stability, for example, from having bands that are positioned and/or shaped so that, when viewing the reference light that is stable, the change in stimulus to each of the three classes of retinal cone cells is approximately linear over the range of angles and the changes among the three classes describes, essentially, a system with at most one degree of freedom wherein that degree of freedom acts in the direction of luminosity alone. For example, in some embodiments the bands may be preferably located near the wavelength of peak sensitivity of one or more of the retinal photopigment absorptance, or may have a bimodal distribution or other irregular shape that acts to make the change in stimulus invariant, or nearly invariant, per angle of incidence over the desired range. In further embodiments, the shape of a pass-band (e.g. the long-wavelength pass-band) may be configured so that the change in stimulus to the long-wavelength cones is inversely proportional to the change in stimulus of the middle-wavelength cones per angle of incidence, thus ensuring the necessary limit on degree of freedom to maintain constant chromaticity. However, such band positions and/or shapes are generally found to be sub-optimal for enhancement of color discrimination, therefore a utility of the linear program method may lie in the fact that it provides a solution meeting a color stability constraint that is least antagonistic towards the enabling of color discrimination enhancement. Specifically, such alterations to the filter band positions preferably occur on the outermost bands. For example, the rate of change in stimulus to the S-cone may be made substantially constant by positioning the short wavelength band at about 450 nanometers. Alternatively, in some cases the short wavelength pass-band may preferably be split around the peak of the S-cone absorptance (as shown in graph 1605, for example), whereby the pass-band may be described as having a bimodal distribution with a first mode at around 435 nanometers and second mode at around 455 nanometers. In a further example, the long wavelength pass-band may be characterized by a bimodal distribution having first mode at about 620 nanometers and second mode at about 650 nanometers, or may have a skewed distribution, a shoulder (typically on the short wavelength side) or other irregular (i.e. non-Gaussian) distribution.

Figure 18A:
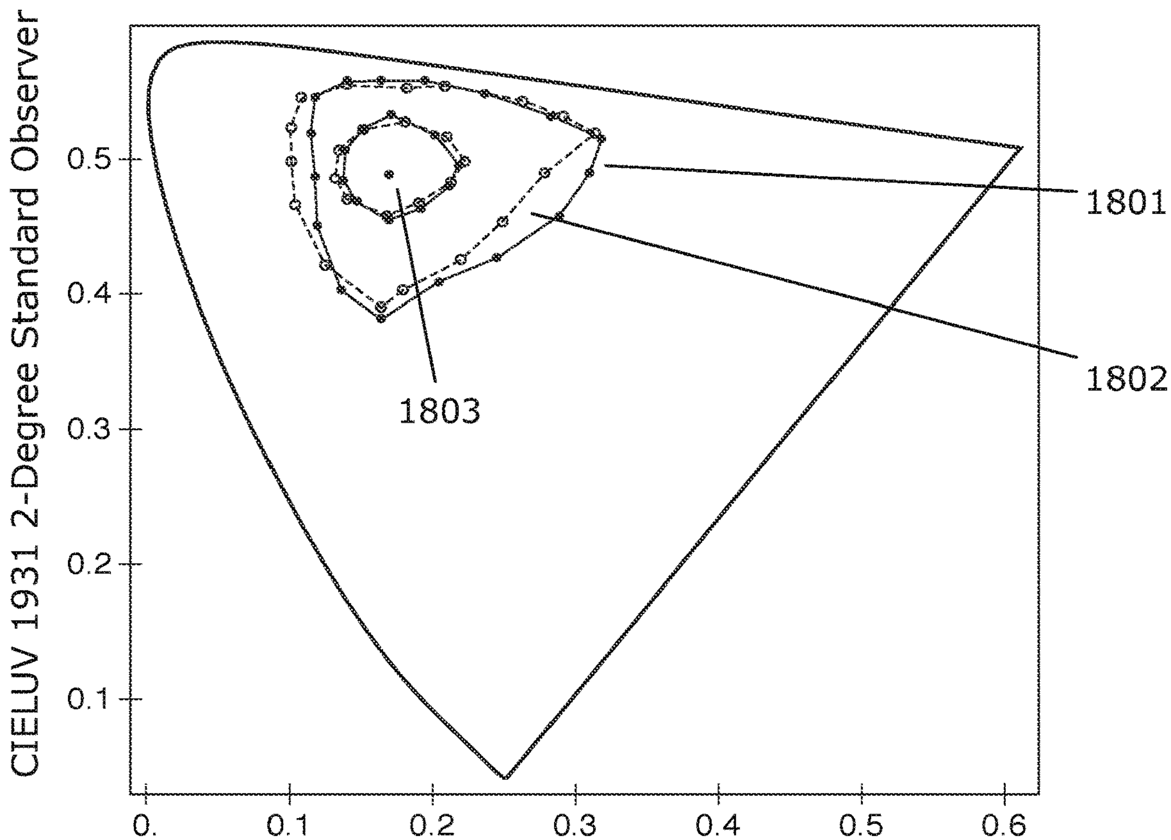
FIGS. 18A, 18B, 18C: Chromaticity diagram of the color appearance of selected Munsell colors under illumination by daylight as viewed through a filter and as viewed by the same filter wavelength shifted by −2.5 percent (FIG. 18A), a graph of the spectral radiant flux of daylight (FIG. 18B), and a graph of the spectral transmittance of the filter and of the filter wavelength shifted by −2.5 percent (FIG. 18C).
Figure 18B:
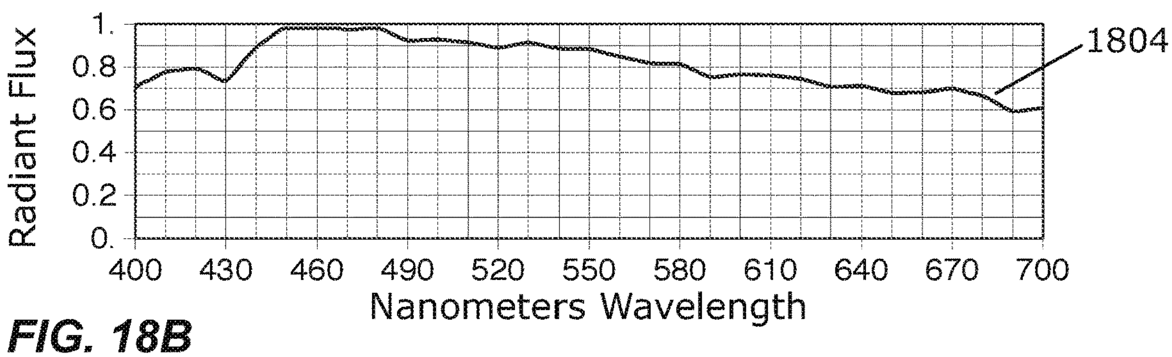
Figure 18C:
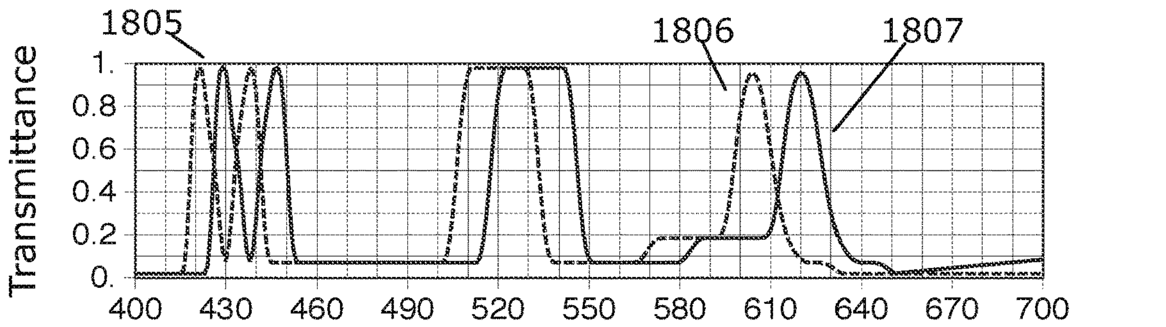

The behavior of a filter having a stable white-point with respect to a range of angles of incidence is shown in the diagram of FIGS. 18A-18C. FIG. 18C shows the transmittance of the filter at normal incidence in graph 1807, and the transmittance of the filter at about 20 degrees incidence in graph 1806. It may be observed in these graphs that the split sub-band structure in the short wavelength region identified by reference number 1805 is behaving essentially as a comb filter that is tuned to be stable given the wavelength shift.

The illuminant whose color appearance has been stabilized is that of daylight as shown in graph 1804 in FIG. 18B. In the chromaticity diagram of FIG. 18A, the illuminant's chromaticity coordinate 1803 is identical under both incident angles. FIG. 18A also shows the effect on the appearance of selected contours of the Munsell colors. Contour 1801 corresponds to the normal filter (zero degrees angle of incidence) and contour 1802 corresponds the shifted filter (about 30 degrees angle of incidence). It may be appreciated from the locations of these contours that the filter provides a reasonably stable appearance of these reference colors, with most of the losses in saturation mainly associated with the most highly saturated colors (e.g., the outer Munsell contour as described previously along with FIG. 8A). The chromatic stability demonstrated by this filter may significantly reduce the appearance of a "hotspot" in the center of the lens (resulting from angle of incidence induced blue shifting) and generally contribute to increased visual comfort.

Filters providing color stability, for example as shown in FIG. 18C, may provide less red-green color enhancement due to the effect of the imposed constraints. In some embodiments it may be preferable to incorporate a pre-filter having a narrow-band absorptance, where the absorption band(s) are located at around where stop-bands are expected in the filter design. Thus, a composite filter comprising the narrow-band absorptive filter in combination with an interference filter may achieve the desired color stability with less degradation of the desired color enhancement. Two examples of such filters are shown in FIGS. 20A and 20B. In FIG. 20A, the solid curve at 2001 shows the spectral transmittance of an absorptive filter comprising neodymium in a glass substrate. Neodymium is a rare-earth material characterized by a strong absorption band at around 590 nanometers, in addition to a secondary absorption band at around 520 nanometers. In FIG. 20B, the solid curve at 2002 shows the transmittance of an interference filter that, when combined with the neodymium absorptive filter, provides enhanced red-green color discrimination in combination with stable color appearance over 0 degrees to 30 degrees angle of incidence. Referring again to FIG. 20A, the dashed curve at 2001 shows the spectral transmittance of an absorptive filter comprising the narrow-band organic pigments Exciton P491 and Exciton ABS584 in a polymer substrate. Exciton P491 is characterized by a strong absorption band at around 491 nanometers, and Exciton ABS584 is characterized by a strong absorption band at around 584 nanometers. In FIG. 20B, the dashed curve at 2002 shows the transmittance of an interference filter that, when combined with the organic pigments filter, and provides enhanced red-green color discrimination in combination with stable color appearance over 0 degrees to 30 degrees angle of incidence. These examples may be designed by the method of linear programming as previously described, by incorporating the absorptive filter transmittance as the pre-filter.

To provide color stability for a normal observer it is generally desirable to constrain the chromaticity coordinate so that the white-point shift is less than about 0.01 units with respect to the CIELUV (u',v') chromaticity space and the CIE 1931 2-degree observer with respect to angles between about 0 and about 35 degrees. In some cases the range of angles may be increased to about 0 to about 45 degrees. For observers with deuteranomaly the shift tolerance can be increased to about 0.02 units, and for observers with protanomaly or severe deuteranomaly the tolerance can be further increased to about 0.04 units, as these observers are both less sensitive to color shifts and their color perception is not necessarily well-characterized by a standard observer model. Further, for such anomalous observers, whose color matching functions differ significantly from that of the CIE 1931 2-degree standard observer, the constraining criteria enabling color stability may be calculated using an observer-specific color matching function. In such cases, the resulting filters when analyzed for white-point shift stability according to the CIE 1931 2-degree observer may have the property that the white-point shift function has a local minimum at an angle between about 20 and about 40 degrees angle of incidence, and the distance to the normal white-point at the local minimum is less than about 0.02 units.

Figure 29A:
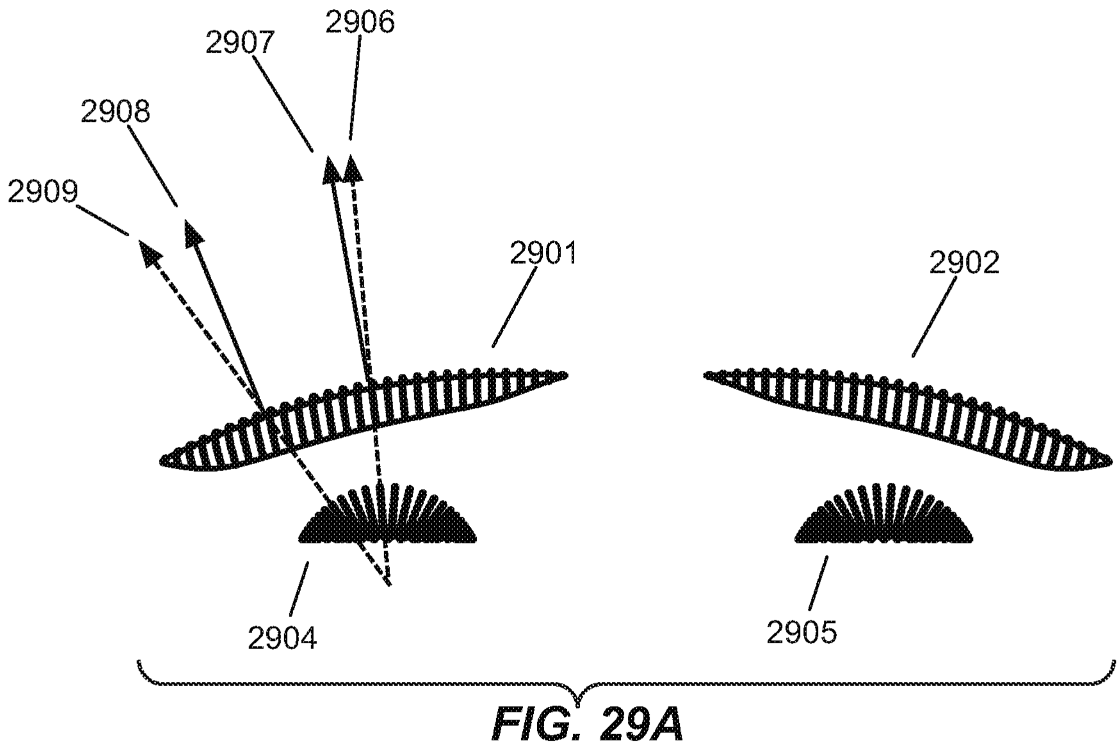
FIGS. 29A, 29B: Diagram showing geometry of a lens in eyewear relative to the eye and two rays of light passing through the lens at different locations and imaged onto the retina of the eye; top view (FIG. 29A) and angled view (FIG. 29B).
Figure 29B:
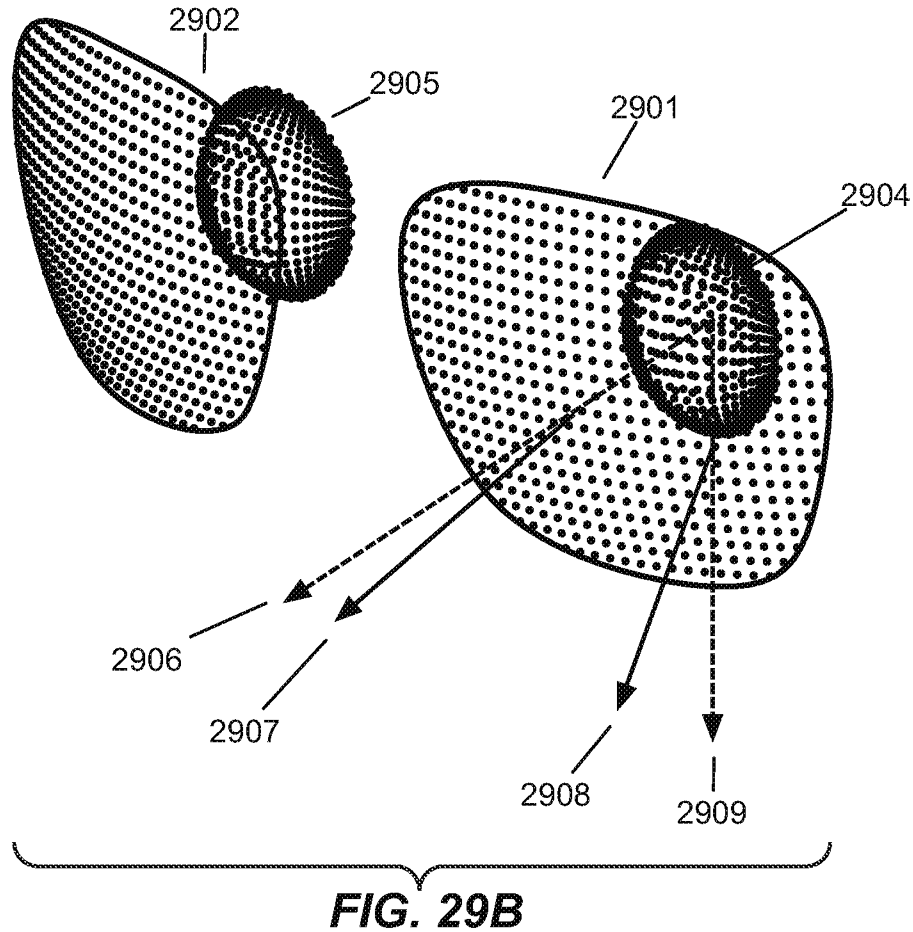

In order to characterize the relative importance of the filter performance at normal incidence and off-normal incidence when such filters are incorporated into eyewear, a geometric model of a lens and eye, e.g., where the lens is incorporated into eyewear and situated in front of the eye, may be used to calculate the effective angle of incidence per lens position, as well as the relative importance per effective angle of incidence. The effective angle of incidence is hereby defined as the angle between the normal vector of the lens at a lens location, and that of a ray of light passing through the lens location that is imaged onto the retina of the eye. The geometric model as previously mentioned is illustrated in FIG. 29A (top view) and FIG. 29B (perspective view). Here the geometry of the left and right eye are represented by the hemispheres at 2904 and 2905, respectively. The human eye (typical of an adult) has a radius of curvature of about 12.5 millimeters, and inter-pupil distance of about 60 millimeters. The sense of color is primarily derived from the central 10 degrees of vision, however the eye may also rotate in its socket, therefore the range of angles over which color perception is needed is greater than 10 degrees. The geometry of the left and right lens (having a shape typical of eyewear) are represented by the spherical sections 2901 and 2902. The dotted arrow 2906 illustrates a ray of light passing through a central location on the lens, and 2909 a ray passing through a distal location on the lens. The rays are also generally imaged onto central and distal locations of the retina. The surface normal vectors of the lens at the locations where the rays pass through are shown at 2907 and 2908. Lenses in eyewear may have a radius of curvature of between about 50 millimeters and about 150 millimeters (in this example the radius of curvature is 87 millimeters). Since this radius is significantly greater than that of the eye, the angle between the incident rays and the surface normal vector at the corresponding lens locations tends to increase as the locations increase in distance from the center, as is illustrated to in FIGS. 29A and 29B by the increase in angle between 2908 and 2909 as compared to that between 2907 and 2906.

Given any frame style (e.g. edge profile of a lens and lens positioning relative to the eye), and any lens curvature, it is possible to calculate (for example using a computer) per lens position the effective angle of incidence from the geometric model just described, by iterating over points situated on the lens, constructing the surface normal vector and retinal image ray, and then calculating the angle between the two vectors at the surface location. The result of such a calculation is shown in the contour plot of FIG. 30A, where the boundary at 3004 indicates the edge of a lens, and the interior contours show the effective angle of incidence as previously described, for example the effective angle of incidence is about 10 degrees along contour 3001, about 20 degrees at contour 3002, and about 30 degrees at contour 3003.

Figure 30A:
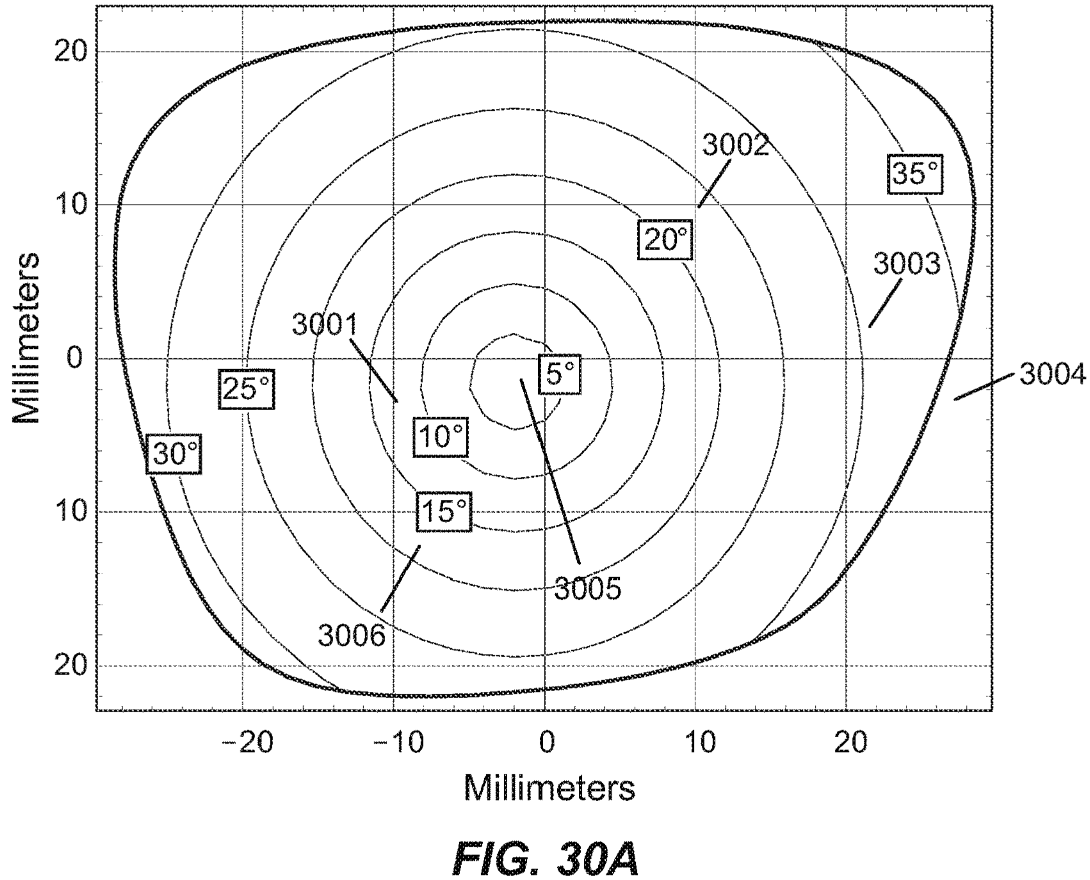
FIGS. 30A, 30B: Contour plot of the effective angle of incidence of light passing through locations on the surface of a lens, where the effective angle of incidence corresponds to the angle between the surface normal of the lens at a location and a ray of light passing through the lens at the location that is imaged onto the retina (FIG. 30A), and graph of the relative importance per effective angle of incidence and components of the relative importance function (FIG. 30B).
Figure 30B:
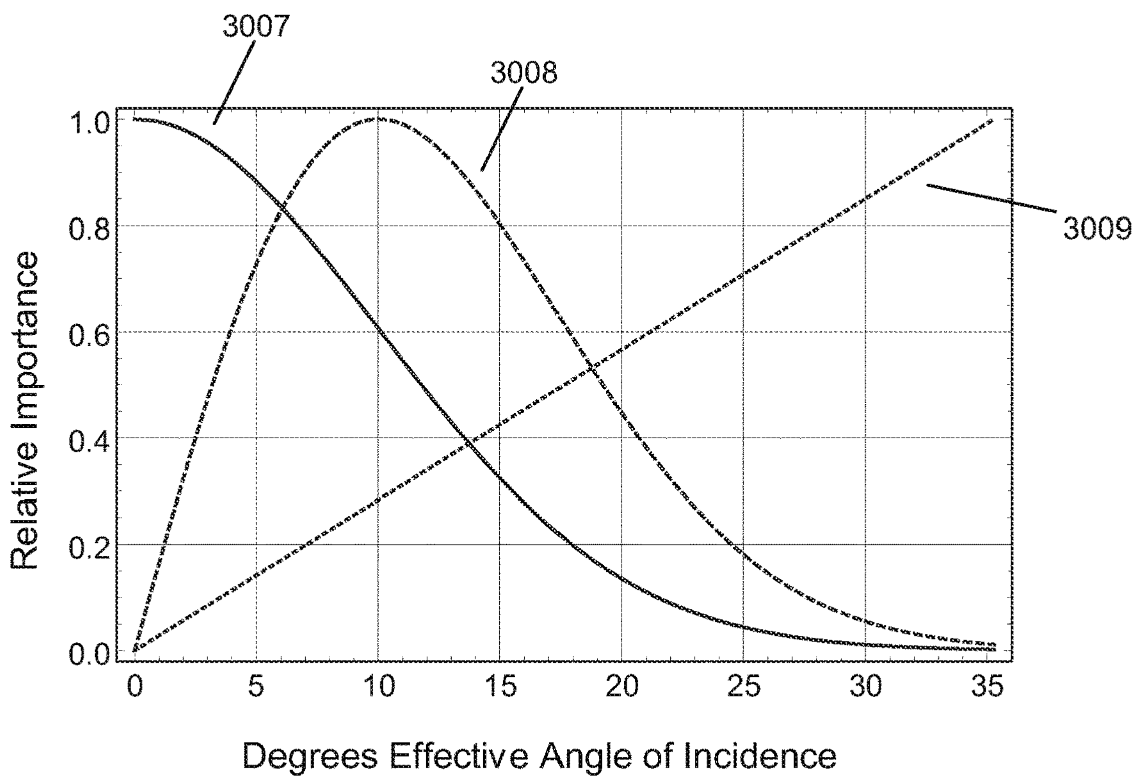

Next, it is useful to calculate the relative importance per effective angle of incidence. Referring now to FIG. 30B, a function of relative importance per effective angle of incidence comprises the multiplicative product of two parts: first, an estimate of the proportion of the lens surface area that is viewed at a particular angle and second, an estimate of the probability that the eye is oriented along an axis such that it is looking through the lens at a particular angle. Herein a Gaussian statistical model is used to estimate the orientation distribution, for example as shown by curve 3007 having a standard deviation of about 10 degrees. As such the eye is most likely looking along the angle of normal incidence. However, it may be noted that there is only a single point on the lens at which the angle of incidence is normal (e.g. point 3005 in FIG. 30A), whereas the surface area of the lens between, for example, 10 degrees and 15 degrees (e.g. between contours 3001 and 3006 in FIG. 30A). Over the surface of a typical lens the angle of incidence is at most about 35 degrees away from normal, and over this range the area proportion of the lens surface per degree increases approximately linearly, as represented by the curve 3009 in FIG. 30B. The product of the area-weighting curve and the orientation-distribution curve gives an importance-weighting function, for example as shown at curve 3008. Thus, the importance-weighted PGAI may be defined by the expression:

$$PGAI_{IW}(f,f_{REF})=(1/k)\theta\ \exp(-(\theta^2/(2\sigma^2)))PGAI(f_\theta, f_{REF}),\ \text{and}$$

$$k=\int_{\theta=0\ldots45}\theta\ \exp(-(\theta^2/(2\sigma^2)))d\theta,$$

wherein, exp( ) is the exponential function, θ is the effective angle of incidence having the range 0 . . . 30 degrees, $PGAI(f_\theta,f_{REF})$ is the PGAI of the trial filter f and reference filter $f_{REF}$ as viewed or illuminated at angle of incidence θ, σ is the standard deviation of the eye orientation distribution which typically has a value of about 10 degrees, and k is a weight normalization factor. For the purpose of evaluating filters in this disclosure, two specific formulations of the importance-weighted percent gamut area increase are given, where the standard deviation in eye orientation angle is set to be about σ=10 degrees and the reference colors are specified as the D15 or the natural world samples. The formulations are respectively given by the expressions:

$$PGAI_{IW}(f,f_{REF},D15)=(1/k)\theta\ \exp(-(\theta^2/(200)))PGAI(f_\theta, f_{REF},D15),$$

$$PGAI_{IW}(f,f_{REF},NWS)=(1/k)\theta\ \exp(-(\theta^2/(200)))PGAI(f_\theta,f_{REF},NWS),$$

and, $$k=\int_{\theta=0\ldots45}\theta\ \exp(-(\theta^2/(200)))d\theta,$$

where the conditions for calculation of $PGAI(f_\theta,f_{REF}, D15)$ and $PGAI(f_\theta,f_{REF}, NWS)$ are stated previously in this disclosure.

In particular, the performance metric defined above by the expression $PGAI_{IW}(f, f_{REF}, D15)$ may be used to classify the properties of a filter f, and provided that the white-point of the filter is neutral, and furthermore that the white-point remains neutral over a reasonable range of angles of incidence, the absolute performance in percent increase or decrease may be compared among a family of such filters. Herein the use of the $PGAI_{IW}$ calculation is restricted to filters having a white point that is neutral and stable with respect to such changes in angle. For values of $PGAI_{IW}$ between about −10 percent to about 10 percent, the filter may be described as providing essentially normal color discrimination. For values between about 10 percent and about 40 percent the filter may be described as increasing red-green color discrimination, wherein greater values correspond to better performance. For values less than about −10 percent the filter may be described as increasing blue-yellow color discrimination. The aforementioned values assume that the filter provides a white-point that is essentially neutral (i.e., the (x,y) chromaticity coordinate of Illuminant D65 is about (0.31, 0.33) for all, or nearly all angles of incidence between 0 and about 30 degrees. As noted previously, evaluation of gamut area may vary with the white-point, thus filters that are not white-point shift stabilized cannot be meaningfully evaluated with an importance-weighted PGAI metric. Further some tints of the white-point (in particular greenish tints) may provide larger values of the PGAI, however such increases do not necessarily correspond to increased color discrimination.

In further embodiments the calculation may also account for changes in physical thickness resulting from a manufacturing process. For example, in physical vapor deposition onto curved substrates, the coating thickness tends to decrease with distance from the sputtering source and/or effective angle of incidence between the ejected particles and the surface normal of the curved substrate. In yet further embodiments the calculation of effective angle of incidence as just described may be used as the basis of a manufacturing specification so that the filter is fabricated on a curved substrate so that the filter has a physical thickness profile that compensates for the effective angle of incidence, for example by having a distribution that increases in thickness towards the edge of the lens (e.g. increasing linearly from normal physical thickness at the center to about +10 percent physical thickness at the edge of the lens). An interference filter may be fabricated to achieve an optical thickness that is invariant, or substantially invariant, with respect to the effective angle of incidence at all or nearly all locations on the lens.

In some embodiments, the performance analysis of a filter may include use of the relative-importance data to determine the importance-weighted average performance of a filter when incorporated in eyewear. The importance-weighted average performance may be improved by adjusting the spectral transmittance specification of the filter, in particular by red-shifting the specification. For example the spectral transmittance of r may be shifted towards longer wavelengths, as computed by the expression:

$$q'(\lambda)=q(\alpha\lambda),\ \text{and}$$

$$\alpha>1.0;$$

where $\alpha$ is a coefficient determining the amount of shift, and $\alpha$ is selected to maximize the importance-weighted average relative gamut area increase and/or decrease and/or standard deviations along an axis of color space. Alternatively, $\alpha$ may be selected to improve some other performance metric, for example, to reduce the importance-weighted average solar blue light transmittance. The optimal bias coefficient $\alpha$ may be efficiently determined by tabulating values between about 1.0 and about 1.1, as the typical amount of bias required is usually on the order of about 1 percent to about 4 percent ($\alpha$=1.01 to 1.04). For example, a red-green color enhancing filter having a middle-wavelength pass-band at around 530 nanometers may be preferably red-shifted to about 535 nanometers ($\alpha$=1.01) to improve the importance-weighted average relative gamut area.

Another aspect relating to the incorporation of multi-band filters into eyewear, in particular such filters comprising an interference filter, is the management of reflectivity on one or both sides of the lens. The reflectivity of an ideal interference filter having transmittance q(λ) is its complement q*(λ), defined by the expression $$q^*(\lambda)=1.0-q(\lambda).$$

A filter incorporated in a sunglass, for example, may have a luminous transmittance of about 20 percent, and therefore if fabricated with only an interference filter would have a luminous reflectance of about 80 percent. Such high reflectivity may cause significant visual discomfort, as the user may see images of objects behind them, or of their own eye, reflected in the lens. For general use the luminous reflectivity on the interior surface of the lens should be at most about one fifth of the luminous transmission of the lens, although in some cases a luminous reflectance of up to about one half of the luminous transmittance may be acceptable. High reflectivity can be partially mitigated by improving shielding around the frame (e.g. with side shields on the temple arms). The incorporation of an absorptive filter (e.g., component p(λ) as previously described) may significantly improve reflectivity on one or both sides of the lens, for example with p(λ) situated on one side of the lens the reflectivity is significantly reduced on that side as the reflected light must pass through the absorptive filter twice, as shown by the following expression for calculating the reflectivity of a filter f composed of interference filter q(λ) and absorptive filter p:

$$f(\lambda)=q(\lambda)\times p(\lambda), \text{ and}$$

$$f'(\lambda)=p(\lambda)\times q^*(\lambda)\times p(\lambda);$$

where in the above expression f'(λ) is the spectral reflectance of the filter. With respect to such composite filters for enhancement of color discrimination, preferably the ratio between the peak transmittance to the mean transmittance of the composite filter f should be as high as possible. In further examples p(λ) may be factored into two component absorptive filters, and then the two absorptive filters situated on opposite sides of the lens, e.g., $$f(\lambda)=p_a(\lambda)\times q(\lambda)\times p_b(\lambda), \text{ and}$$

$$f_a^*(\lambda)=p_a(\lambda)\times q^*(\lambda)\times p_a(\lambda), \text{ and}$$

$$f_b^*(\lambda)=p_b(\lambda)\times q^*(\lambda)\times p_b(\lambda);$$

where in the above expression $f_a^*(\lambda)$ gives the spectral reflectance on one side of the lens (e.g. the exterior surface) and $f_b^*(\lambda)$ gives the spectral reflectance on the other side of the lens (e.g., the interior surface).

In some examples p(λ) may be a neutral density filter, such as a gray glass of about 40 percent transmittance. For example, such a combination may achieve a luminous transmittance of about 20 percent, a peak transmittance of about 40 percent, and a luminous reflectance on one side of the lens of about 8 percent (i.e., q(λ) has a luminous transmittance of about 50 percent). In further examples p(λ) may be a neutral density filter composed of two absorptive filters that are both colored, for example a brownish glass and a bluish glass, which combined create a neutral transmittance of about 40 percent. Such colors may be chosen to affect the color of reflected light on the outer surface of the lens, for example, for aesthetic reasons. Neutral density and colored absorbers may also be formed from organic dyes and incorporated into a polymer substrate, and/or applied as a coating (e.g. by spin-coating or dip-coating) to one or more surfaces of the lens.

Preferably, p(λ) may be formed using narrow-band selective absorbers that are complementary to the spectral transmittance of f(λ), thus enabling a higher ratio of peak to mean transmittance of the composite filter (e.g., higher than would be possible with neutral density absorption). For example, the narrow-band organic dyes Exciton P491 and Exciton ABS584 that absorb at around 491 nanometers and at around 584 nanometers, respectively, may be employed to form such a complementary absorber that is suitable for use with red-green color discrimination enhancing filters as disclosed herein. Alternatively, certain rare-earth elements such as neodymium, praseodymium and holmium have narrow-band absorptance in the visual spectrum, and may be similarly employed. For example, the neodymium-containing glass lens ACE Improved manufactured by Barberini GmbH may be used as an optical substrate for deposition of an interference filter. Additionally, the incorporation of narrow-band absorbers (in combination with an interference filter) may improve the quality of filter designs incorporating a color stability constraint on the white point, as described previously along with FIG. 20A and FIG. 20B, in particular narrow-band absorbers improve color discrimination provided by such filters at angles of incidence greater than 20 degrees away from the normal axis.

Alternatively, or in addition, p(λ) may absorb the reflected light by means of incorporation of one or more circular polarizers. In some embodiments, a circular polarizer is located on the inside face of the lens, to attenuate reflections that would otherwise be visible to the user's eye. A circular polarizer may also be located on the outside face of the lens, to attenuate front-side reflectance. A lens incorporating a circular polarizer may achieve a peak transmittance of about 40 percent, a luminous transmittance of about 20 percent, and a luminous reflectance of about 2 percent on one or both sides of the lens. Circular polarizers with a spherical curve of 6 diopter or greater may be manufactured, for example, by thermoforming, and incorporated into a lens by, for example, lamination. Additionally, the circular polarizers may be formed using linear polarizers that only achieve partial polarization (e.g. about 70 percent polarization efficiency), thereby enabling a higher peak transmittance at the expense of an increased luminous reflectance on one or both sides of the lens.

An example configuration of a lens incorporating circular polarizers is depicted in FIG. 24A and FIG. 24B, where the layers (from front to back) are vertically oriented linear polarizer 2401, quarter wave retarder 2402, optically transparent substrate 2403, multilayer interference coating 2404 deposited on the surface of the substrate, quarter wave retarder 2405, and (e.g., vertically oriented) polarizer 2406.

In FIG. 24B, light incident to the outside of the composite lens is shown along the arrow at 2413. The incident light passes through the polarizing filter, then through the quarter wave retarder (as a result becoming circularly polarized), then is split by the interference filter into a transmitted component which is eventually received by the eye 2409 and absorbed by the retina 2412, and a reflected component 2414 which travels back toward the light source but is absorbed before it can exit the composite lens. The reflected component 2414 is circularly polarized, however the reflection at interference filter 2404, causes its handedness to flip, e.g., from right to left, so that when it travels back through the circular polarizer 2402 it emerges horizontally polarized and is absorbed by the linear polarizer 2401. Still referring to FIG. 24B, a similar process of reflection-absorption may occur for stray light entering the back side of the lens as shown along the ray at 2408, resulting in the absorption of reflected light 2411 before it reaches the eye.

In another embodiment, p(λ) may be a neutral density filter fabricated by a metal attenuation coating using physical vapor deposition. Preferably such absorptive filters may be fabricated by physical vapor deposition along with (i.e., in the same process as) an interference filter, thus the attenuation layers may enclose the dielectric layers and/or be interleaved or partially interleaved with some of the dielectric layers. Due to the properties of metal layers when incorporated into interference filters, such attenuation coatings may provide better reflection attenuation than would the equivalent bulk-medium neutral density absorber. For example, such designs may achieve a peak transmittance of about 35 percent, a luminous transmittance of about 20 percent, and a luminous reflectance of about 2 percent on one side of the lens. Alternatively, such designs may achieve a peak transmittance of about 35 percent, a luminous transmittance of about 20 percent, and a luminous reflectance of about 4 percent on both sides of the lens. Alternatively, such designs may achieve a peak transmittance of about 50 percent, a luminous transmittance of about 20 percent, and a luminous reflectance of about 4 percent on one side of the lens. Alternatively, such designs may achieve a peak transmittance of about 60 percent, a luminous transmittance of about 20 percent, and a luminous reflectance of about 8 percent on one side of the lens. Such designs may additionally be characterized by having all functional layers of the filter (e.g. the interference coating and attenuation coatings(s)) positioned on one side of an optical substrate. In such designs the opposite side of the substrate may be anti-reflection coated to reduce the scattering and resonance (e.g., multiple internal reflections) of light within the optical substrate. In such designs the anti-reflection coating preferably provides a luminous reflectance of not more than 0.5 percent, as lower quality anti-reflection coatings (e.g. having a luminous reflectance of about 1 percent or greater) may reduce but not completely eliminate the visibility of internal reflection artifacts under general use conditions outdoors, in particular when viewing exceptionally bright spots such as glints of sunlight reflected by metallic surfaces in a typical outdoor scene.

An example configuration of a lens incorporating attenuation coatings is depicted in FIG. 28A and FIG. 28B, where the layers (from front to back) are anti-reflection coating 2801, optical substrate (e.g., glass) 2802, first attenuation coating 2803, multilayer interference coating 2804, and second attenuation coating 2805.

In FIG. 28B, light incident to the outside of the lens is shown along the arrow at 2811. The incident light passes through the anti-reflection coating and the optical substrate, then through the first attenuation coating, and then is split by the interference filter into a transmitted component which is eventually received by the eye 2807 and absorbed by the retina 2809, and a reflected component 2812 which travels back toward the light source but is substantially absorbed during the second pass through the first attenuation coating. Still referring to FIG. 28B, a similar process of reflection-absorption may occur for stray light entering the back side of the lens as shown along the ray at 2806, resulting in the absorption of reflected light 2810 before it reaches the eye. In some examples the attenuation coatings are interleaved, or partially interleaved with the dielectric layers of the interference coating. In some examples, the attenuation coating is situated only on the back surface, i.e., first attenuation coating 2815 is not included.

Several embodiments comprising exemplary multi-band filters of utility for incorporation into eyewear are disclosed next, along with the detailed description of FIGS. 31A-42E, FIGS. 45A-45E, FIGS. 48A-53E, and FIGS. 55A-57E. These figures all conform to a general format that is readily apparent by their common layout. The details of the format are first described generally, using FIGS. 31A-31E and FIGS. 59A, 59B-1, and 59-B2 as examples. Details relevant to the design of each corresponding embodiment are then described in further discussion along with references to each particular figure and elements therein.

Figure 31A:
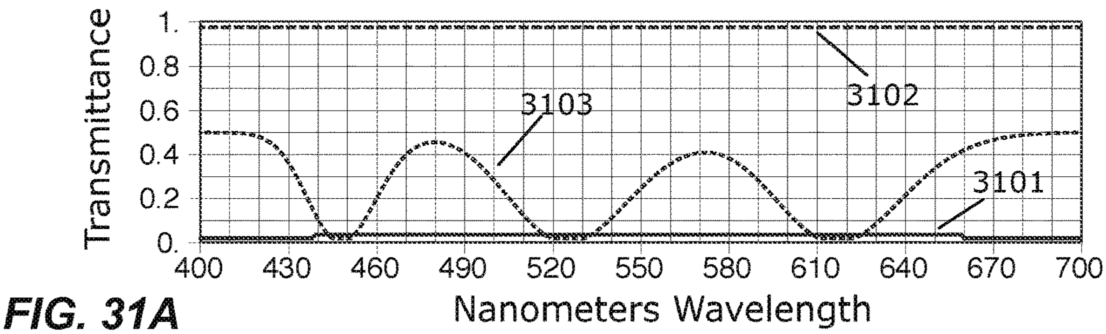
FIGS. 31A, 31B, 31C, 31D, 31E: Graph of the transmittance constraints and cost function used to design a filter for enhancing color discrimination for a normal observer (FIG. 31A). Graph of the spectral transmittance of components of the filter (FIG. 31B). Graph of a manufacturing specification for the filter (FIG. 31C). Graph of the percent gamut area increase with respect to the Farnsworth D-15 reference colors and with respect to selected natural world reference colors provided by the filter per degree angle of incidence (FIG. 31D). Graph of white-point shift of daylight provided by the filter per degree angle of incidence (FIG. 31E).
Figure 31B:
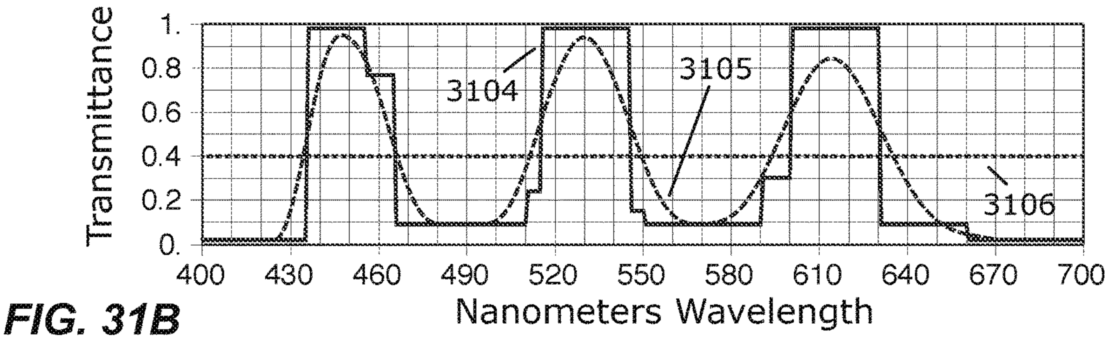

In the graph of FIG. 31A, the curves show transmittance constraints, including the minimum transmittance per wavelength at the solid curve 3101 and the maximum transmittance per wavelength at the dashed curve 3102, and a further curve shows a cost function per wavelength (which is a unitless quantity) at the dashed curve 3103 on the same graph. The transmittance constraints, in combination with additional color appearance constraints (not shown by the graph), and in combination with the cost function form the inputs to a linear program solver, wherein those inputs are processed as described previously in this disclosure regarding the methods of transforming such constraints and cost function into a canonical-form linear program. In the graph of FIG. 31B, the curves show the spectral transmittance of components of a filter f that is designed to affect color vision in a desired manner, wherein the filter was designed in accordance with the constraints and guiding cost function as described along with FIG. 31A. As explained above, the "ideal" filter as generated by the linear program method is specified by f(λ)=q(λ)×p(λ). The solid curve at 3104 defines the weighted combination of elementary filters, q as selected by the method of linear programming as previously disclosed and the dotted curve 3106 defines the transmittance of a selected pre-filter p, which in this example is a neutral density filter. The dashed curve at 3105 shows the (optionally) smoothed and (optionally) biased linear program solution q'. The spectral transmittance of the filter components are tabulated in FIGS. 59B-1 and 59B-2 in the $5^{th}$ thru $8^{th}$ columns (respectively q', q, p and f). The $2^{nd}$, $3^{rd}$ and $4^{th}$ columns tabulated in FIGS. 59B-1 and 59B-2 give the minimum, target, and maximum transmittance per wavelength of a manufacturing specification for producing the filter article (respectively $f_{MIN}$, $f_T$, $f_{MAX}$). The $9^{th}$, $10^{th}$ and $11^{th}$ columns (respectively $t_{MIN}$, $t_{MIN}$, and c), give the minimum spectral transmittance, maximum spectral transmittance and cost function employed in the filter design. The wavelengths corresponding to each row of the table are tabulated in the $1^{st}$ column in steps of 5 nanometers, which provides adequate spectral resolution to reproduce any of the embodiments disclosed herein.

Figure 31C:
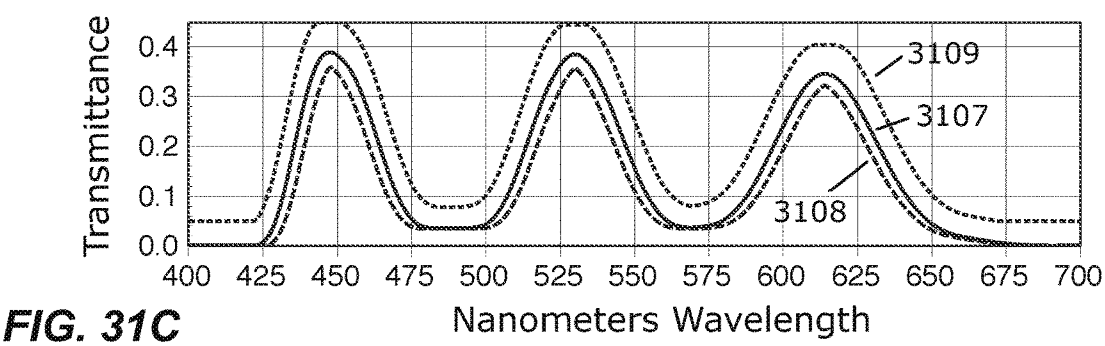

The graph of FIG. 31C comprises three curves, where the solid curve at 3107 is the manufacturing filter design target $f_T=q'(\lambda)\times p(\lambda)$ (substituting the optionally biased and optionally smoothed linear program solution $q'(\lambda)$ for $q(\lambda)$), the dashed curve at 3108 is a minimum transmittance bound, and the dotted curve at 3109 is a maximum transmittance bound. The minimum and maximum transmission bounds are to be employed in the specification of tolerances for fabrication of the target filter. The target, minimum transmittance, and maximum transmittance may be computed by the following expression:

$$f_T(\lambda)=q'(\lambda)\times p(\lambda)=(k(\lambda)\otimes q(\alpha\lambda))\times p(\lambda),$$

$$f_{MIN}(\lambda)=0.97\times\min(f_T(\lambda),f_T(\lambda\pm1),f_T(\lambda\pm2)),\text{ and}$$

$$f_{MAX}(\lambda)=\min(1.0,\max(0.01,0.03+1.03\times\max(f_T(\lambda),f_T(\lambda\pm1),f_T(\lambda\pm2))));$$

where in the above expression the symbol $\otimes$ denotes the frequency-domain convolution between kernel function k and filter $q(\alpha\lambda)$ and $\alpha$ is the biasing coefficient as described previously. The kernel function k is generally characterized by having a half-maximum width of between about 10 nanometers and about 25 nanometers—in the case of the present embodiment the width is about 25 nanometers, although the width may vary in further embodiments within the given range. Further, in the definition of $f_{MIN}$ and $f_{MAX}$, the scaling coefficients (0.97 and 1.03) provide a relative transmittance tolerance of about +/−3 percent, the additive coefficient (0.03) provides an additional absolute tolerance of about +3 percent, and the expressions $\min(f_T(\lambda), f_T(\lambda\pm1), f_T(\lambda\pm2))$ and $\max(f_T(\lambda), f_T(\lambda\pm1), f_T(\lambda\pm2))$ provide for a wavelength shift tolerance of about +/−2 nanometers (equivalent to about +/−0.5 percent at 400 nanometers). These tolerances were selected empirically to produce reasonable results for use with a high-precision physical vapor deposition process, however the specific choices of tolerance are not intended to limit the scope of the present invention. Any suitable values for these parameters and the resulting tolerances may also be used.

Figure 31D:
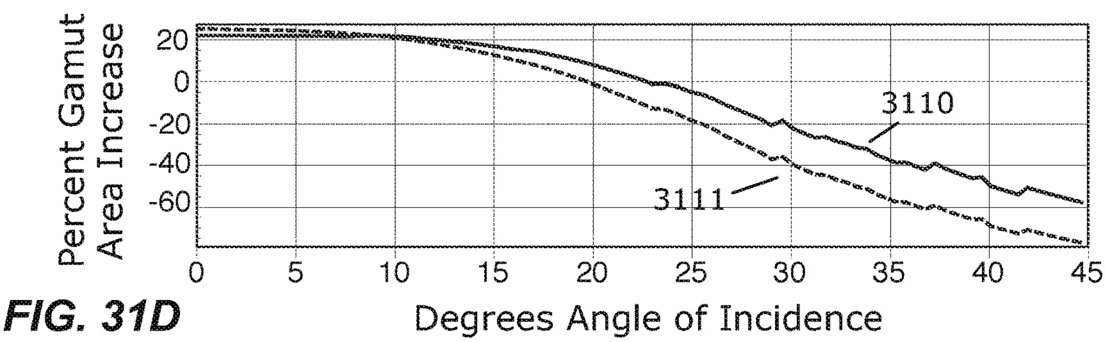
Figure 31E:
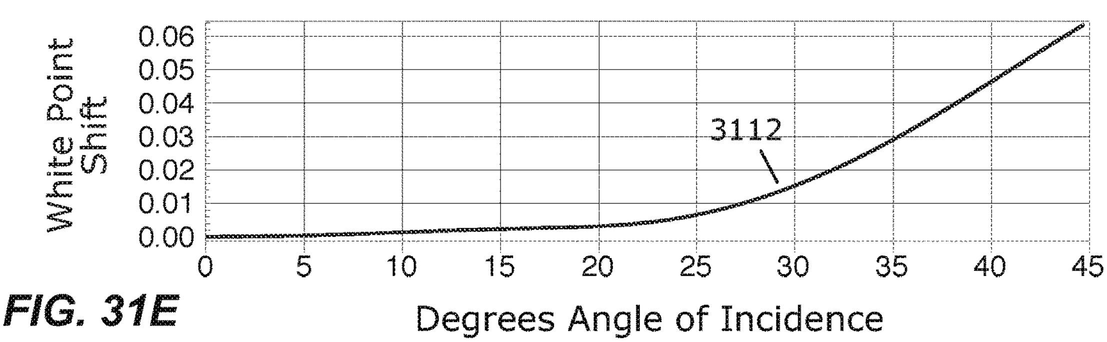

In FIG. 31D the percent relative gamut area increase (PGAI) of the filter compared to a best-fit broad-band reference filter, $f_{REF}$, per angle of incidence θ is shown along the solid curve 3110 and also along the dashed curve 3111, where the solid curve shows PGAI($f_\theta$,$f_{REF}$, D15) computed with respect to the Farnsworth D-15 samples and the dashed curve shows PGAI($f_\theta$,$f_{REF}$, NWS) computed with respect to the natural world samples (NWS). The importance-weighted percent relative gamut area increase (e.g., $PGAI_{IW}$($f_\theta$, $f_{REF}$, D15)) may be computed from either of these data by computing the weighted average PGAI according to the eye-model describe previously along with FIG. 29A-30B and assuming the standard deviation of eye orientation is 10 degrees. FIG. 31E gives a plot at the solid curve 3112 of the white-point shift of the filter per degree angle of incidence, where the white point corresponds to the CIELUV (u', v') chromaticity coordinate of Illuminant D65 as viewed through the filter with respect to the CIE 1931 2-degree Standard Observer, and the white-point shift per degree angle of incidence is defined as the distance between the white-point chromaticity coordinate at 0 degrees angle of incidence (i.e. normal incidence) and the white-point chromaticity coordinate at the off-normal angle of incidence. This calculation is performed assuming the filter component q' is an interference filter having effective index of about 1.85 and component p is an absorptive filter. Further, the table of FIG. 59A enumerates various additional performance criteria evaluated with respect to the filter $f_T$, where the performance criteria include those defined previously in the detailed description of this disclosure as well as selected metrics defined by industrial standard ANSI Z80.3-2010. In particular for some embodiments the row labeled "$PGAI_{IW}$ D15" may be useful for evaluating a robust estimate of the general quality of color enhancement provided by the filter. Increases in this quantity are associated with improved scores on the Farnsworth D-15 cap arrangement test and also generally associated with a visual experience that may be described as color enhancing.

Hereafter, some additional embodiments of filters designed by the method of linear programming disclosed herein are described with reference to FIGS. 31A-42E, 45A-45E, 48A-53E, and 55A-57E, in addition to corresponding tables appearing in FIGS. 59A-80B-2. In these figures, the detailed description of elements indicated by reference numerals xx01-xx12, (where "xx" is the figure number, e.g., 31 in FIGS. 31A-31E) correspond to those given above with respect to FIG. 31A-31E, with further elaboration provided where appropriate for each individual case.

In one embodiment, the design criteria, spectral transmittance of components, components, manufacturing specification and performance evaluations of a three pass-band red-green color discrimination enhancing multi-band filter are shown in the graphs of FIGS. 31A-31E, and tabulated in FIGS. 59A, 59B-1, and 59B-2. The filter manufacturing target, shown in the graph of FIG. 31C at 3107 and tabulated in the column $f_T$ of FIGS. 59B-1 and 59B-2, has a first pass-band center around 450 nanometers with a half-maximum band-width of about 40 nanometers, a second pass-band center at around 530 nanometers with a half-maximum band-width of about 35 nanometers, and a third pass-band center around 615 nanometers with a half-maximum band-width of about 40 nanometers. The filter manufacturing specification may be used to produce the filter. The filter comprises an interference filter (q) in addition to a neutral density absorptive filter (p), where the neutral density absorptive filter has a transmittance of about 40 percent. The filter design was achieved by the method of linear programming as disclosed herein, where the elementary filters are a set of about 60 rectangular pass-band filters each having a single pass-band width of 10 nanometers and having center wavelengths at 5 nanometer increments (which is furthermore the case for all embodiments described hereafter). To improve manufacturability so that the interference filer component may be manufactured with a low-order stack of dielectric materials (e.g. less than about 50 material layers), the filter design (q') has been smoothed with a Gaussian kernel (k) having a half-maximum width of about 20 nanometers. It may be further noted that the resulting filter (f) is compliant with the minimum transmittance bound as shown in FIG. 31A at 3101. The filter design criteria employed in the creation of this embodiment have been configured so that the luminous transmittance of daylight is about 18 percent, which is appropriate for use of the filter in a sunglass having a medium shade. Further embodiments disclosed herein may employ the same or nearly the same luminous transmittance. However, the methods disclosed herein are adequate for fabrication of filters having any reasonable luminous transmittance, for example as low as about 8 percent corresponding to a dark shade of sunglass or as high as 40 percent corresponding to a light shade of sunglass, or in some cases greater than 40 percent. Further, the filter provides a white-point that would be considered to be substantially neutral, as shown in the table of FIG. 59A (D65 Chromaticity Coordinate). Filters having a neutral configuration of the white-point may be preferred for overall visual comfort and a balanced brightness of all colors, however other configurations of the white-point are possible, although strongly tinted white-points should be avoided as such filters generally cannot provide an adequate brightness of the entire color gamut. Regarding the white-point of the present embodiment as viewed over a range of angles of incidence, as demonstrated by the plot of white-point shift per degree angle of incidence at 3112 in FIG. 31E, the white-point moves considerably (e.g. greater than 0.03 units at 35 degrees), thus such a filter when incorporated into eyewear wherein the filter may be viewed through a range of angles, significant color shifts may be observed towards the periphery of the lens. Additionally, as shown in the graph 3110 and 3111 in FIG. 31D, the color-enhancement of the filter falls below zero at about 20 degrees, thus, the filter provides only a relatively narrow field of view over which the desired color enhancing function is effective, for example, greenish colors in the natural world (such as leaves) may tend towards a brownish appearance as the angle of incidence approaches or exceeds 20 degrees.

A further embodiment, related to that shown previously in FIGS. 31A-31E, is characterized in FIGS. 32A-32E with corresponding tables in FIGS. 60A, 60B-1, and 60B-2. This embodiment discloses a filter designed with respect to identical conditions as described previously, except the cost function, shown at 3203 in FIG. 32A, has been modified to further improve color discrimination. The resulting filter design is characterized by an alternate choice of pass-band positions that provides a better performance. This configuration is currently believed to be the choice of pass-band locations giving the best possible performance for any three pass-band filter with respect to the PGAI metric alone (however as shown in further discussion this metric is not necessarily adequate for practical application of such filters in eyewear, for example). The filter manufacturing target, shown in the graph of FIG. 32C at 3207 and tabulated in the column $f_T$ of FIGS. 60B-1 and 60B-2, has a first pass-band at around 440 nanometers with a half-maximum band-width of about 30 nanometers, a second pass-band at around 535 nanometers with a half-maximum band-width of about 35 nanometers, and a third pass-band at around 650 nanometers with a half-maximum band-width of about 80 nanometers. The improved color-enhancing effect of the present embodiment arises, in part, from the wider spacing of the first and third bands. As noted previously, color discrimination benefits from a multi-band filter having the widest possible spectral aperture, thus filters having a first band with a wavelength shorter than 450 nanometers may be preferable, as well as those having a third pass-band with a center wavelength longer than 610 nanometers. However, 440 nanometers and 650 nanometers are about the maximum outer limits for pass-band locations in filters having this desired effect, as band positions beyond those limits may tend to render blue and red colors as unacceptably dark. Further, the present embodiment benefits by positioning of the middle pass-band at a wavelength that is longer than 530 nanometers. The configuration of the middle pass-band at a wavelength less than 530 nanometers may provide a filter that causes greenish colors to appear unacceptably dark. The configuration of the middle pass-band at exactly 530 nanometers tends to maximize the PGAI performance metric with respect to the Farnsworth D-15 samples as well as the Munsell colors, however these colors are based on artificial pigments and such a filter may tend to cause the greenish colors of the natural world to appear unnaturally greenish. The natural coloration of chlorophyll (as previously described) is more accurately considered a yellowish green. The configuration of the middle pass-band at about 540 nanometers tends to maximize the PGAI performance with respect to the natural world samples. The configuration of the middle pass-band at about 545 nanometers or longer wavelengths tends to provide a filter that gives an increase in blue-yellow color discrimination, and correspondingly less increase in red-green color discrimination, and the balance increases towards blue-yellow with selection of still longer wavelengths (which are discussed in greater detail in a further embodiment). Thus, the configuration of the middle pass-band to have a center wavelength of about 535 nanometers may achieve an optimal balance in performance between both the artificial and natural color samples, and the selection of a middle pass-band having a center wavelength of about 545 nanometers may achieve an optimal balance in performance with respect to the red-green and blue-yellow axes of color space. Further embodiments of filters for increasing red-green color discrimination disclosed hereafter are consistent with the choice of center between about 535 nanometers and about 545 nanometers (unless stated otherwise), however the examples shown are not intended to limit the scope of the invention, as the choice of middle band position may usefully vary between about 530 nanometers and about 545 nanometers for such filters that improve color discrimination.

Figure 32A:
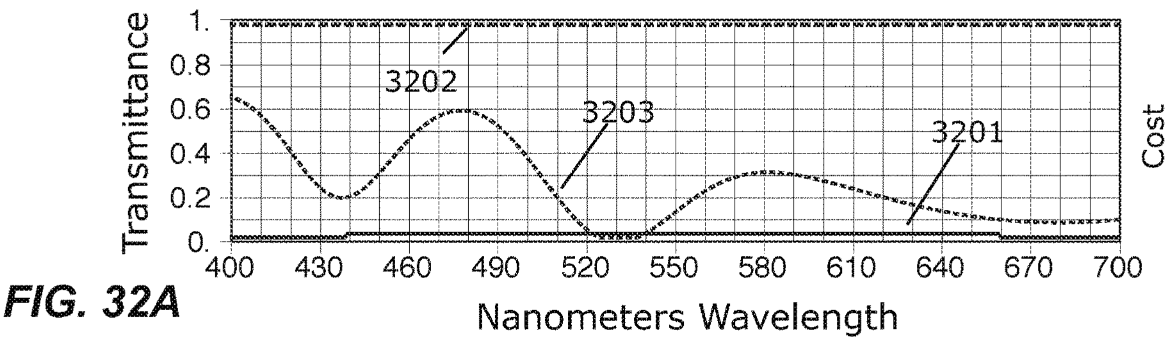
FIGS. 32A, 32B, 32C, 32D, 32E: Graph of the transmittance constraints and cost function used to design a filter for enhancing red-green color discrimination for a normal observer (FIG. 32A). Graph of the spectral transmittance of components of the filter (FIG. 32B). Graph of a manufacturing specification for the filter (FIG. 32C). Graph of the percent gamut area increase with respect to the Farnsworth D-15 reference colors and with respect to selected natural world reference colors provided by the filter per degree angle of incidence (FIG. 32D). Graph of white-point shift of daylight provided by the filter per degree angle of incidence (FIG. 32E).
Figure 32B:
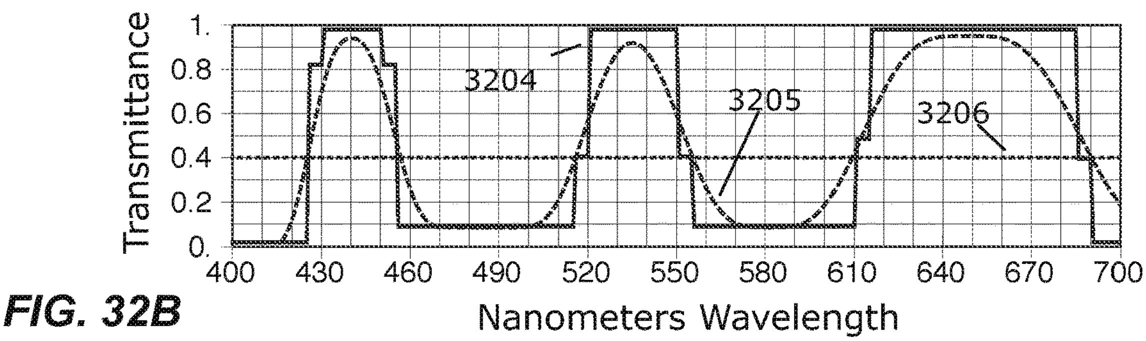
Figure 32C:
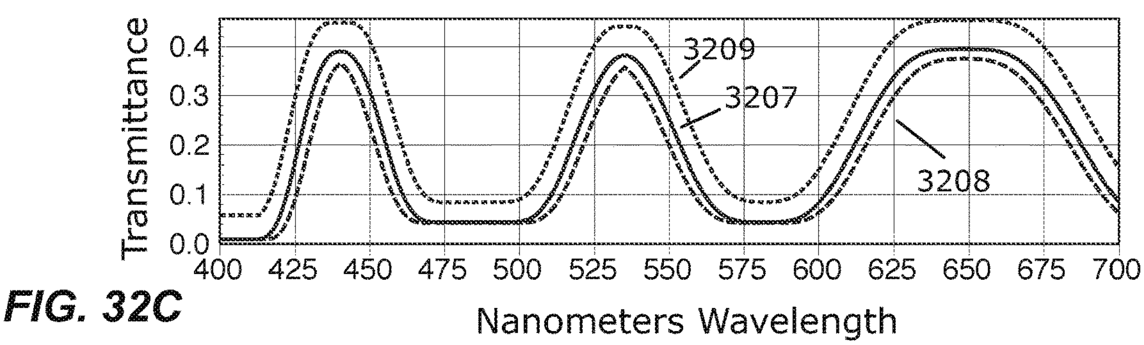
Figure 32D:
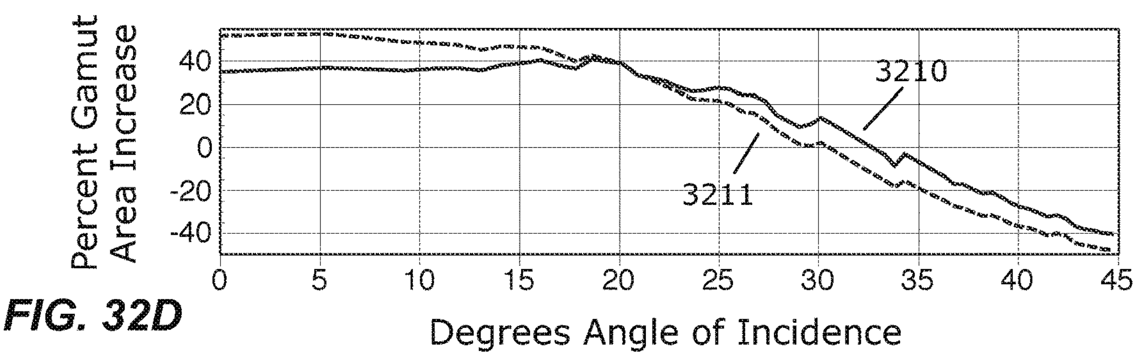
Figure 32E:
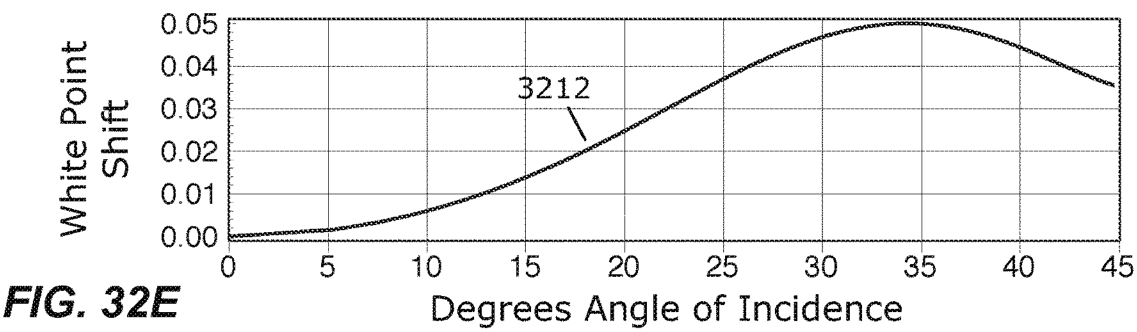

Returning to the discussion of FIGS. 32A-32E, The performance of the filter with respect to the PGAI metric on the Farnsworth D-15 samples and natural world samples, as shown in FIG. 32D at 3210 and 3211, respectively, shows a significant improvement when compared to the previous embodiment. In particular the PGAI is greater than zero for angles of incidence up to about 30 degrees, thus the filter may provide a wider field of view giving the desired color enhancement when incorporated into eyewear. Further, the PGAI at normal incidence is significantly greater than the previous embodiment. However, in contrast the present embodiment exhibits significantly worse performance with respect to stability of the white-point over multiple angles of incidence, as shown in FIG. 32E at 3212, the white-point shift at 35 degrees is about 0.05 units. Due to the wide band-width of the long-wavelength band, the white-point tends to shift rapidly towards a reddish tint. Using available manufacturing methods it is possible to partially mitigate the undesired white-point shift by depositing the interference filter such that the layers have a physical thickness that is intentionally varied over regions of the lens where the viewing angle is expected to be off-normal, however such methods may be cost-prohibitive. For example, with respect to the method of manufacturing by physical vapor deposition, to achieve the necessary thickness gradient requires highly sophisticated tooling arrangements that impede access to high volume production. Further, even with the appropriate physical distribution of the interference coating on a lens, a filter having such sensitivity to angle of incidence may be difficult to reliably align in the frame of an eyewear so that the eyewear performance is robust with respect to variation in frame style, head size and similar geometric factors.

A further embodiment, related to that shown previously in FIGS. 31A-31E, and that of FIGS. 32A-32E, is characterized in FIGS. 33A-33E with corresponding tables in FIGS. 61A, 61B-1, and 61B-2. This embodiment discloses a filter designed with respect to identical conditions as described previously. However, the design criteria further includes a color appearance constraint so that the white-point appears substantially invariant over a wide range of angles, and the cost function is additionally adjusted to maximize the performance of the filter over the widest possible range of angles. The resulting filter design is characterized by a further alternate choice of pass-band positions that provide good performance with respect to the PGAI metric, but additionally ensures consistent appearance of colors over the entire field of view thereby enabling robust performance and improved visual comfort when the filter is incorporated into eyewear. In particular, the middle pass-band remains at about 535 nanometers, but the upper and lower pass-bands are configured with locations intermediate to those of both the embodiment of FIG. 31A-31E and that of the embodiment of FIG. 32A-32E. The filter manufacturing target, shown in the graph of FIG. 32C at 3207 and tabulated in the column $f_T$ of FIGS. 61B-1 and 61B-2, has a first pass-band at around 445 nanometers with a half-maximum band-width of about 25 nanometers, a second pass-band at around 535 nanometers with a half-maximum band-width of about 30 nanometers, and a third pass-band at around 630 nanometers with a half-maximum band-width of about 40 nanometers.

Figure 33A:
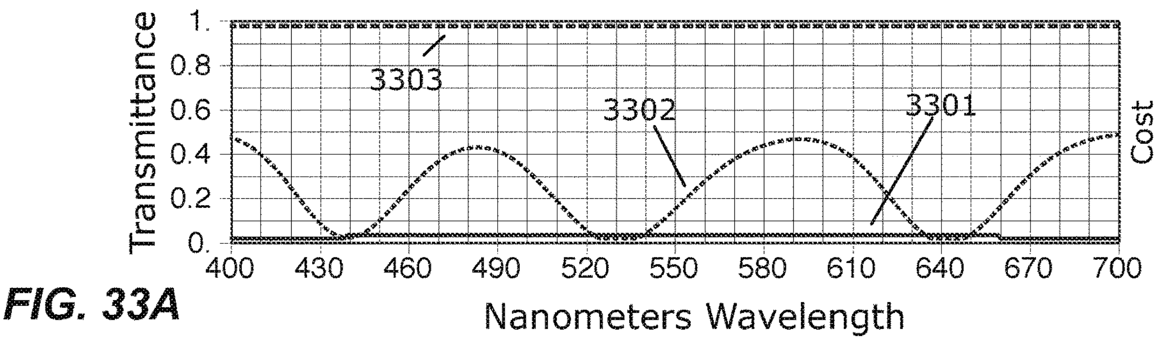
FIGS. 33A, 33B, 33C, 33D, 33E: Graph of the transmittance constraints and cost function used to design a filter for enhancing red-green color discrimination for a normal observer and providing stable color appearance over a range of angles of incidence (FIG. 33A). Graph of the spectral transmittance of components of the filter (FIG. 33B). Graph of a manufacturing specification for the filter (FIG. 33C). Graph of the percent gamut area increase with respect to the Farnsworth D-15 reference colors and with respect to selected natural world reference colors provided by the filter per degree angle of incidence (FIG. 33D). Graph of white-point shift of daylight provided by the filter per degree angle of incidence (FIG. 33E).
Figure 33B:
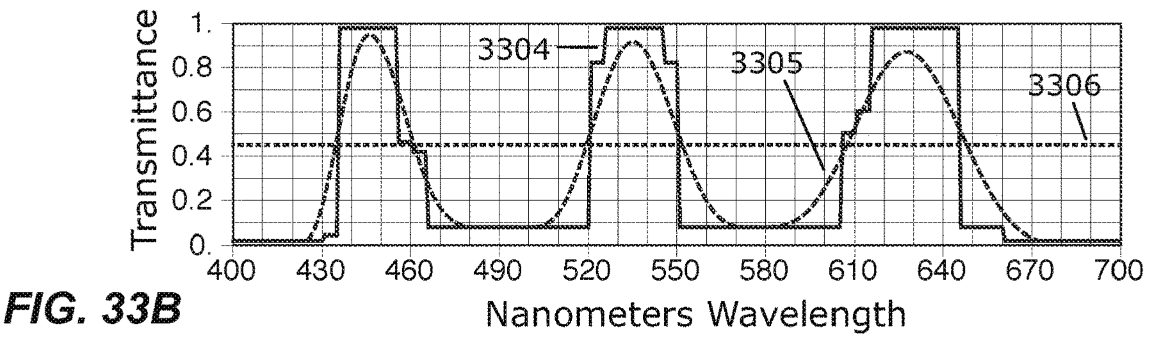
Figure 33C:
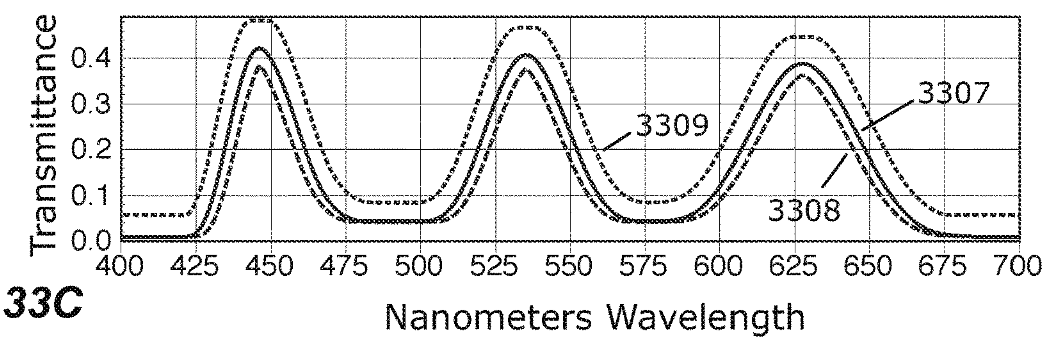
Figure 33D:
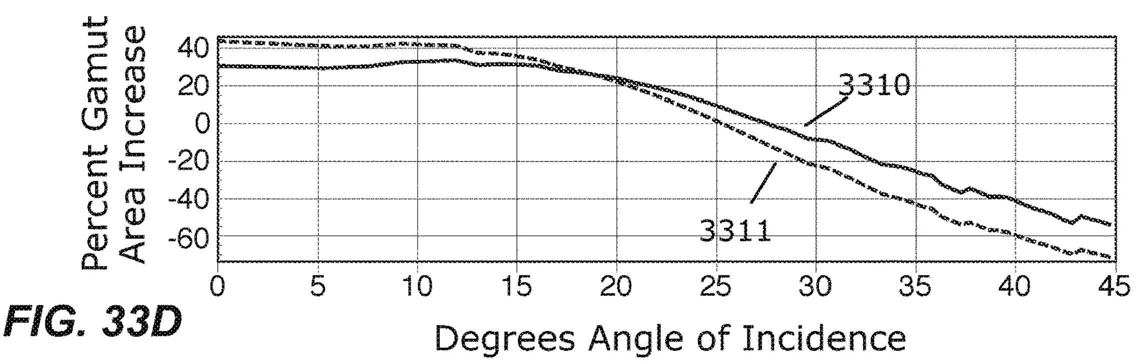
Figure 33E:
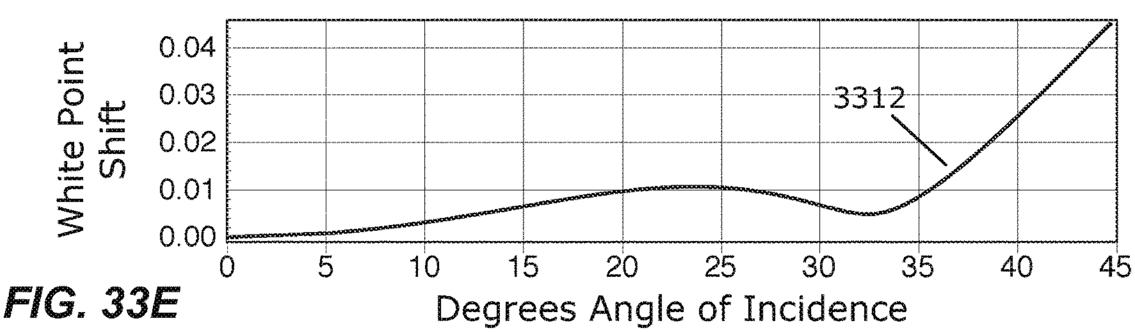

With respect to the performance of the filter, it may be observed in FIG. 33D that the PGAI is greater than zero for angles of incidence up to about 25 degrees. Thus the filter may provide a reasonably wide field of view giving the desired color enhancement when incorporated into eyewear. In comparison to the previous embodiments, the performance of the filter with respect to the stability of the white-point over multiple angles of incidence is significantly improved. As shown in FIG. 33E at 3312, the white-point shift between 0 and 35 degrees is less than about 0.01 units. In further embodiments it is demonstrated that the white-point shift can be extended to angles as large as 45 degrees while retaining the same bound. In all embodiments disclosed hereafter, a white-point stabilizing constraint is employed in some form (unless otherwise stated), as such constraints are generally considered beneficial to the manufacture of any such filter comprising an interference filter component. In practice such filters incorporating a white-point stability constraint have been subjectively observed to provide a comfortable field of view with no significant distortion of colors in the peripheral vision, in spite of the fact that the lens may incorporate a dielectric interference filter that gives a spectral transmittance that varies considerably with respect to angle of incidence. In general red-green color enhancing multi-band filters having three pass-bands configured to provide a stabilized white-point may be found using the methods disclosed herein where the filter has a first pass-band located between about 440 and 450 nanometers, a second pass-band located between about 530 nanometers and about 545 nanometers, and a third pass-band located between about 610 and about 635 nanometers. The preferred embodiments of red-green color enhancing filters are those with the with the least possible center location of the shortest wavelength pass-band, the greatest possible center location of the longest wavelength pass-band, the narrowest possible band widths, and the greatest possible contrast ratio between the mean transmittance of adjacent pass-bands and stop-bands. However all such configurations may be regulated by appropriate constraints to ensure utility of the filter, for example when incorporated into eyewear. The embodiments of filters disclosed herein (for example include those disclosed in FIGS. 36A-36E, 37A-37E, 38A-38E, 39A-39E and their related embodiments, provide guidance regarding the appropriate maximization of such limits subject to practical concern for the intended applications.

Figure 34A:
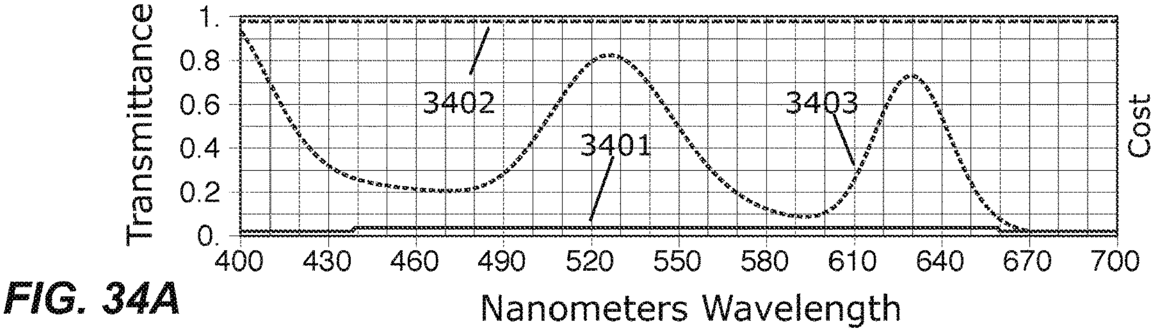
FIGS. 34A, 34B, 34C, 34D, 34E: Graph of the transmittance constraints and cost function used to design a filter for enhancing blue-yellow color discrimination for a normal observer and providing stable color appearance over a range of angles of incidence (FIG. 34A). Graph of the spectral transmittance of components of the filter (FIG. 34B). Graph of a manufacturing specification for the filter (FIG. 34C). Graph of the percent gamut area increase with respect to the Farnsworth D-15 reference colors and with respect to selected natural world reference colors provided by the filter per degree angle of incidence (FIG. 34D). Graph of white-point shift of daylight provided by the filter per degree angle of incidence (FIG. 34E).
Figure 34B:
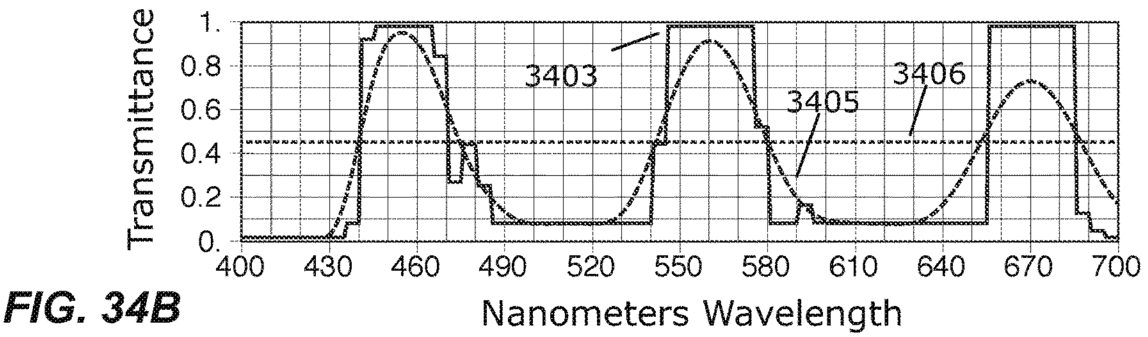
Figure 34C:
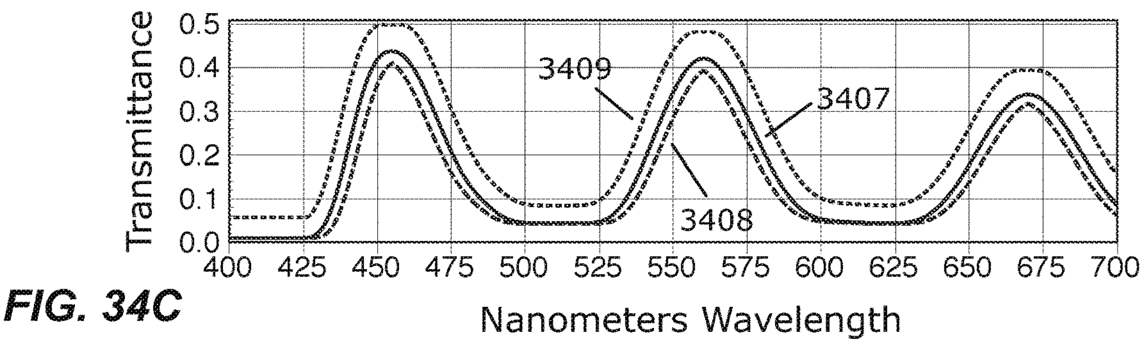
Figure 34D:
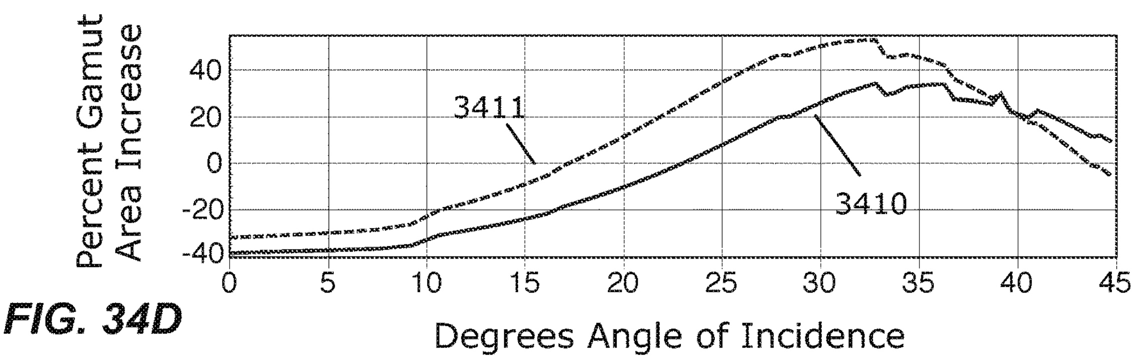
Figure 34E:
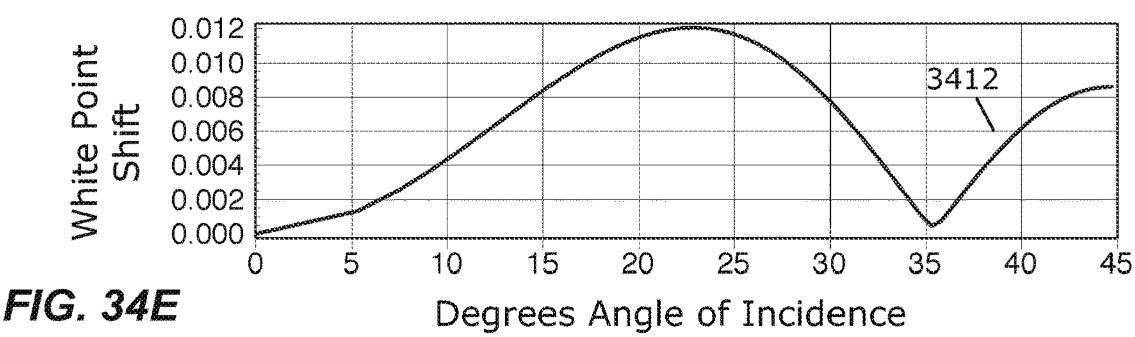

In a further embodiment, which is related to that of FIGS. 33A-33E, a blue-yellow color-enhancing filter is characterized in FIGS. 34A-34E and corresponding tables in FIGS. 62A, 62B-1, and 62B-2. This embodiment discloses a filter designed with respect to essentially identical criteria as those of the related embodiment, except the cost function, as shown in FIG. 34A at 3403, is configured to maximize blue-yellow color discrimination rather than red-green color discrimination. Such filters may be useful for individuals with tritanomaly, which is a form of color vision deficiency characterized by difficulty in discrimination between blue and yellow colors. Such filters may also be preferred for use of eyewear in certain environments having a background of predominantly green colors (for example a golfing green) where some suppression of the green appearance is desired, or for an optical aid in locating camouflaged objects in a forested scene wherein the suppression of variation among green colors may reveal previously unseen features. The filter manufacturing target, shown in the graph of FIG. 34C at 3407 and tabulated in the column $f_T$ of FIGS. 62B-1 and 62B-2, has a first pass-band located at about 455 nanometers having a half-maximum width of about 45 nanometers, the second pass-band is located at about 560 nanometers and has a half-maximum width of about 50 nanometers, and the third pass-band is located at about 675 nanometers and has a half-maximum width of about 60 nanometers. The performance analysis of the filter with respect to the PGAI metrics is shown in FIG. 34D wherein it may be observed that the PGAI is predominantly negative valued for angles of incidence up to about 20 degrees. Further, the white-point shift as shown in FIG. 34E exhibits excellent stability having a total shift of less than about 0.01 units for angles of incidence up to 45 degrees away from normal incidence. Additionally, as noted in the table of FIG. 62A, the filter is compliant with respect to limits on the chromaticity of traffic signals as defined by ANSI Z80.3-2010. In particular, with respect to such blue-yellow enhancing filters, the amount of color discrimination suppression along the red-green axis is limited by the chromaticity coordinate of the green traffic signal. With respect to the present filter that maximally enhances blue-yellow discrimination while remaining compliant, the green traffic signal chromaticity coordinate is essentially on or nearly on the boundary of the compliance region, such that the green traffic signal appears as desaturated (i.e., as whitish) as allowed by that standard.

Figure 35A:
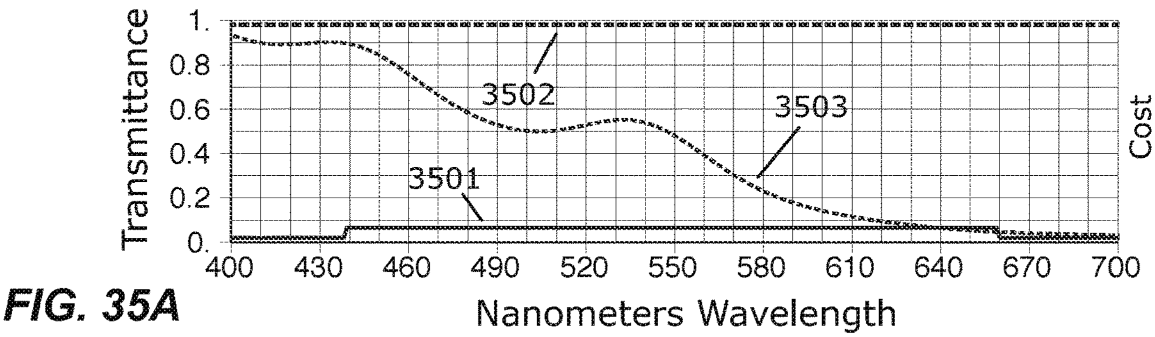
FIGS. 35A, 35B, 35C, 35D, 35E: Graph of the transmittance constraints and cost function used to design a filter for enhancing red-green color discrimination for a normal observer and providing suppression of short-wavelength blue light and providing stable color appearance over a range of angles of incidence (FIG. 35A). Graph of the spectral transmittance of components of the filter (FIG. 35B). Graph of a manufacturing specification for the filter (FIG. 35C). Graph of the percent gamut area increase with respect to the Farnsworth D-15 reference colors and with respect to selected natural world reference colors provided by the filter per degree angle of incidence (FIG. 35D). Graph of white-point shift of daylight provided by the filter per degree angle of incidence (FIG. 35E).
Figure 35B:
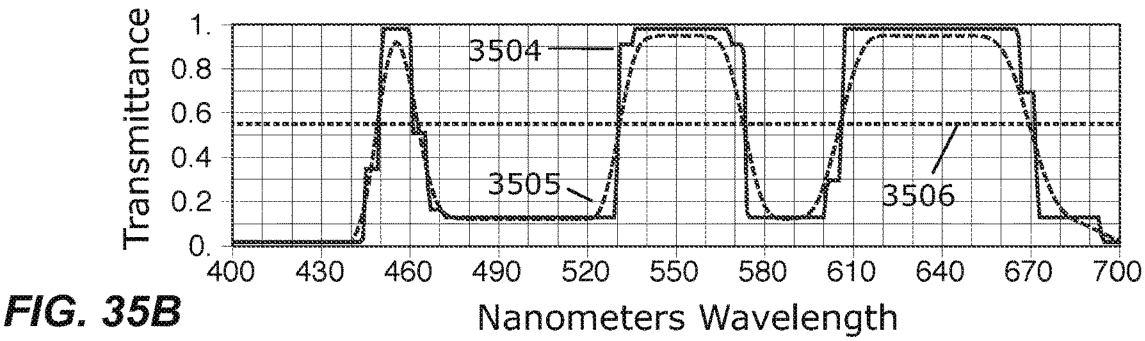
Figure 35C:
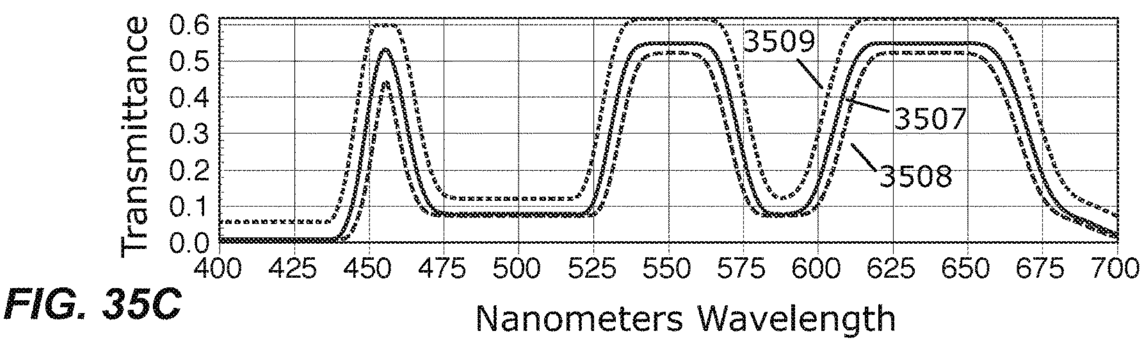
Figure 35D:
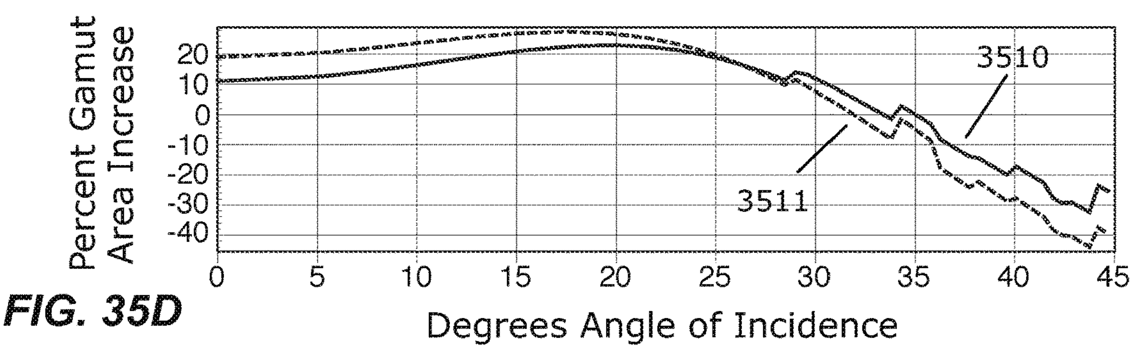
Figure 35E:
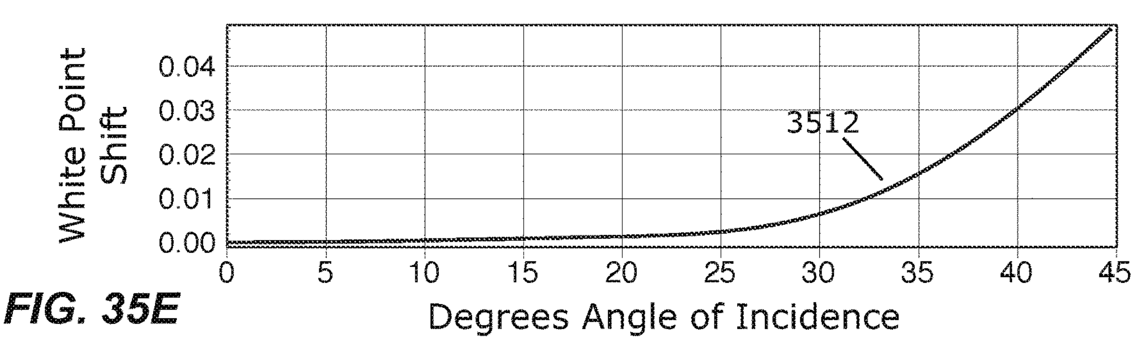

In another embodiment, which is again related to that of FIGS. 33A-33E and of FIGS. 34A-34E, a color-enhancing filter is characterized in FIGS. 35A-35E and corresponding tables in FIGS. 63A, 63B-1, and 63B-2, the filter is further configured to substantially suppress the transmission of short-wavelength light, e.g. light between about 380 nanometers and about 450 nanometers. Such filters generally may provide a balanced improvement in color discrimination along both the red-green and blue-yellow axes. Further, suppression of short wavelength light may improve sharp focus and reduce total energy of photons received by the eye, which increase in energy inversely with respect to the wavelength. This embodiment may be difficult to manufacture using a low-order interference filter, as the design preferably features a rapid onset between reflection and transmission at around 450 nanometers. Thus the interference filter component (q') is smoothed with a kernel having a half-maximum width of about 10 nanometers. In order to achieve the blue-blocking function, the cost function may be configured with an increasing slope as shown in FIG. 35A at 3503. The white-point of the filter may be configured towards a yellowish tint, subject to the constraint that the white-point is not considered "strongly colored" according to ANSI Z80.3-2010. The filter manufacturing target, which assumes the filter is to incorporate a neutral density absorptive filter (p) having a transmittance of about 50 percent, is shown in the graph of FIG. 35C at 3507 and tabulated in the column $f_T$ of FIGS. 63B-1 and 63B-2. The filter manufacturing target has a first pass-band located at about 445 nanometers having a half-maximum width of about 15 nanometers, a second pass-band located at about 550 nanometers having a half-maximum width of about 45 nanometers, and a third pass-band located at about 645 nanometers and having a half-maximum width of about 70 nanometers. The filter has a luminous transmittance of about 35 percent (corresponding to a lightly tinted sunglass), although darker tints are possible by increasing the strength of the absorptive filter element. The filter provides a moderate positive value of the PGAI over angles of incidence up to 30 degrees as shown in FIG. 35D. With respect to color stability performance the white-point shift is limited to less than 0.01 units between 0 and 35 degrees angle of incidence, as demonstrated in FIG. 35E. Additionally, as indicated in the table of FIG. 63A, the solar blue light transmittance (about 15 percent) is less than half of the luminous transmittance, thus the filter may be described as providing an improved blue-blocking function while also maintaining a good quality of color appearance.

In a further series of three embodiments discussed next, red-green color discrimination enhancing multi-band filters are disclosed where the filters are configured for use by observers with deuteranomaly, a form of color vision deficiency characterized by difficulty discriminating between green and red colors. Compared to previously disclosed embodiments of red-green enhancing filters herein, these embodiments provide substantially more increase in color discrimination along the red-green axis. The manufacturing specifications disclosed for these embodiments provide for the filter to be produced as a combination of a neutral density filter with an interference filter, where the neutral density filter has a transmittance between about 40 percent and about 55 percent. Further, the interference filters are generally specified as high-order coating stacks, as steep transitions between adjacent pass-bands and stop-bands are generally preferable for maximizing color discrimination enhancement. Such filters having steep band transitions may provide unstable color appearance of certain narrow-band light sources, such as light-emitting diodes and some types of gas-discharge lamps including sodium vapor lamps and some fluorescent bulbs. To mitigate such instability these filters incorporate a minimum transmittance constraint, which is typically specified as a lower bound equal to about one fifth of the luminous transmittance of the filter, with respect to wavelengths between about 450 nanometers and about 650 nanometers. The stop-bands of these embodiments are limited by this minimum transmittance accordingly. Such filters are also preferably compliant with ANSI Z80.3-2010 regarding the chromaticity coordinate of traffic signals provided by the filter, and in particular some embodiments of such filters maximizing the increase in red-green color discrimination may provide a chromaticity coordinate of the yellow traffic signal that is at a limiting position with respect to its compliance boundary, where the limiting position provides an appearance of that light that is as reddish or nearly as reddish as allowed.

An additional complication regarding the design of such filters is that the color matching functions of deuteranomalous observers are not well characterized by the CIE Standard Observer models. Thus the constraints regarding the white-point stability may preferably be computed with respect to a modified observer model. The details of that calculation are well documented and available to those with ordinary skill in the art. However, the analysis of white-point shift herein retains the use of the CIE 2-degree Standard Observer, and as such the calculated white-point shift per degree angle of incidence in such designs may be characterized by a wider tolerance (e.g. about 0.02 units between 0 to 35 degrees). The white-point shift function of these designs typically exhibits a local minimum at an angle between about 20 degrees and about 40 degrees, with the amount of white point shift measured at the local minimum typically at most about 0.01 units.

Figure 36A:
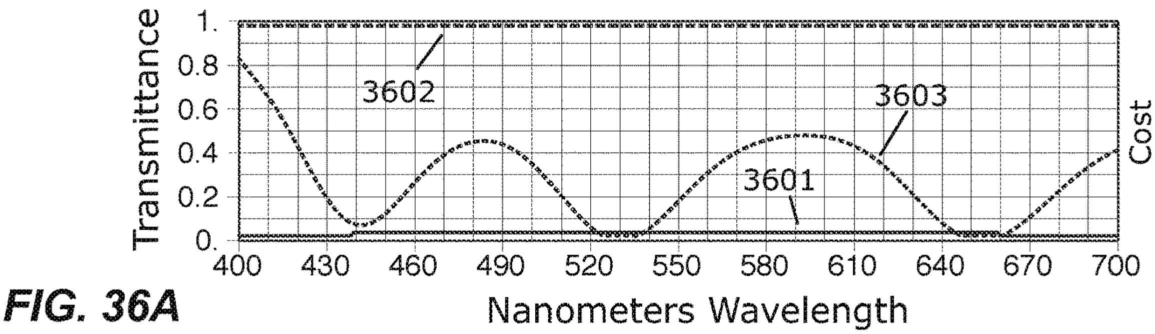
FIGS. 36A, 36B, 36C, 36D, 36E: Graph of the transmittance constraints and cost function used to design a filter for enhancing red-green color discrimination for an observer with mild deuteranomaly and providing stable color appearance over a range of angles of incidence (FIG. 36A). Graph of the spectral transmittance of components of the filter (FIG. 36B). Graph of a manufacturing specification for the filter (FIG. 36C). Graph of the percent gamut area increase with respect to the Farnsworth D-15 reference colors and with respect to selected natural world reference colors provided by the filter per degree angle of incidence (FIG. 36D). Graph of white-point shift of daylight provided by the filter per degree angle of incidence (FIG. 36E).
Figure 36B:
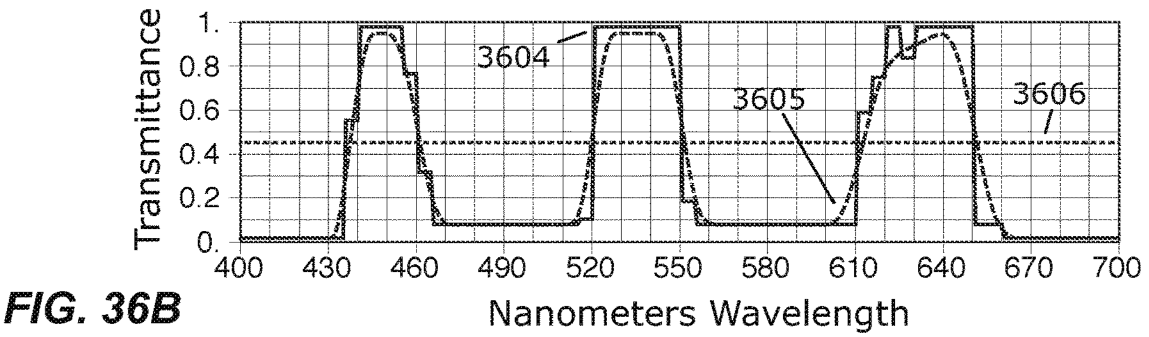
Figure 36C:
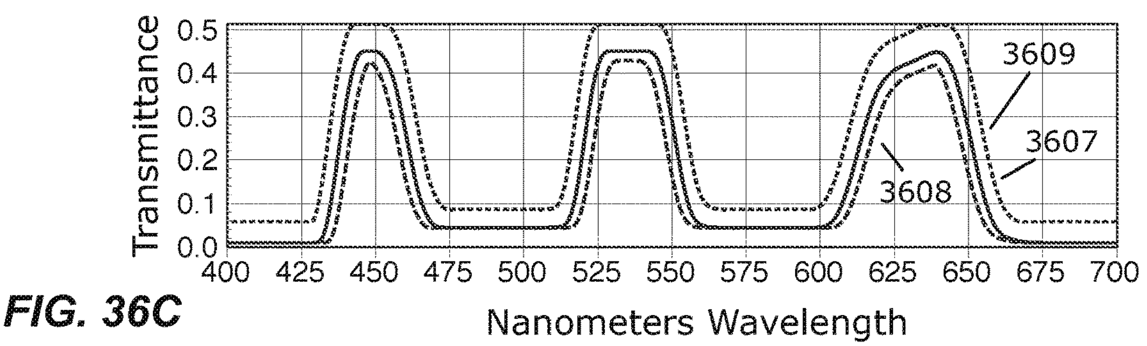
Figure 36D:
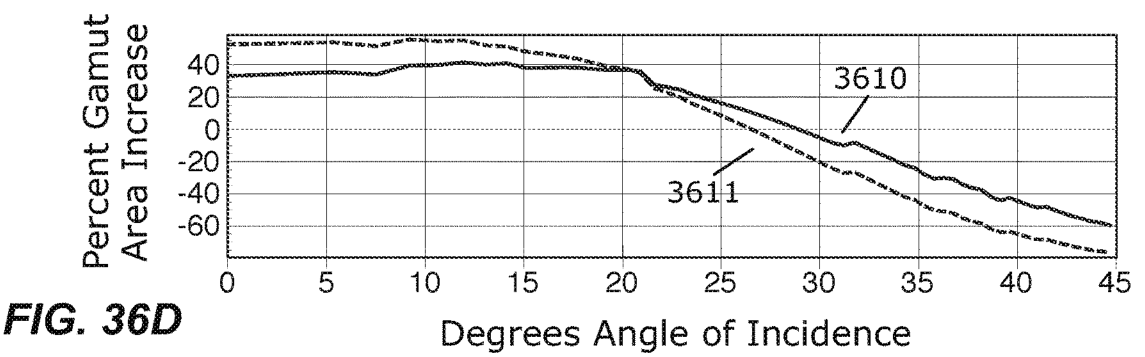
Figure 36E:
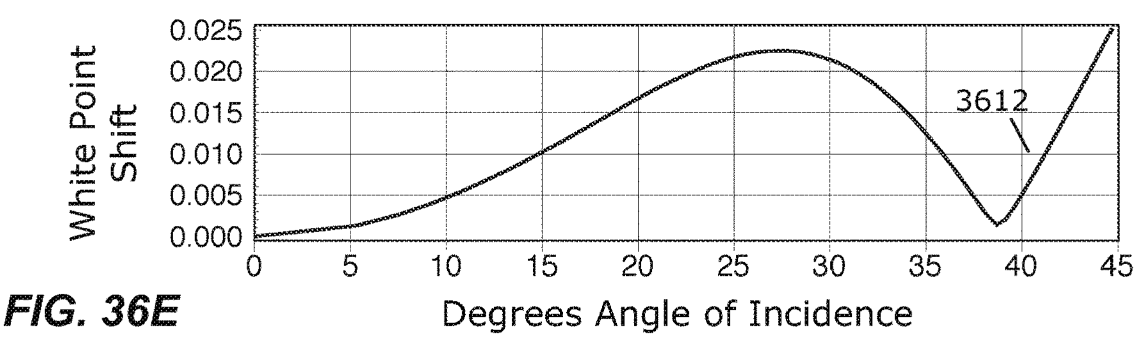

A first embodiment of a filter for a deuteranomalous observer is disclosed along with FIGS. 36A-36E and corresponding tables of FIGS. 64A, 64B-1, and 64B-2. The filter manufacturing target, shown in the graph of FIG. 36C at 3607 and tabulated in the column $f_T$ of FIGS. 64B-1 and 64B-2, has a first pass-band located at about 450 nanometers having a half-maximum width of about 25 nanometers, a second pass-band located at about 535 nanometers having a half-maximum width of about 35 nanometers, and a third pass-band located at about 635 nanometers and having a half-maximum width of about 35 nanometers. The manufacturing specification of the filter is given for incorporation of a neutral density absorber of about 45 percent transmittance. The PGAI provided by the filter is greater than zero for angles of incidence up to about 27 degrees, as shown in FIG. 36D. As noted in the table of FIG. 64A, the importance-weighted PGAI with respect to the Farnsworth D-15 colors is at least about 30 percent, which may be preferable for an observer with mild deuteranomaly. The white-point of the filter, which is essentially neutral tinted, is stabilized with respect to a deuteranomalous observer model and characterized by a local minimum in the white-point shift curve of less than 0.01 units at around 32 degrees, as shown in FIG. 36E at 3612.

Figure 37A:
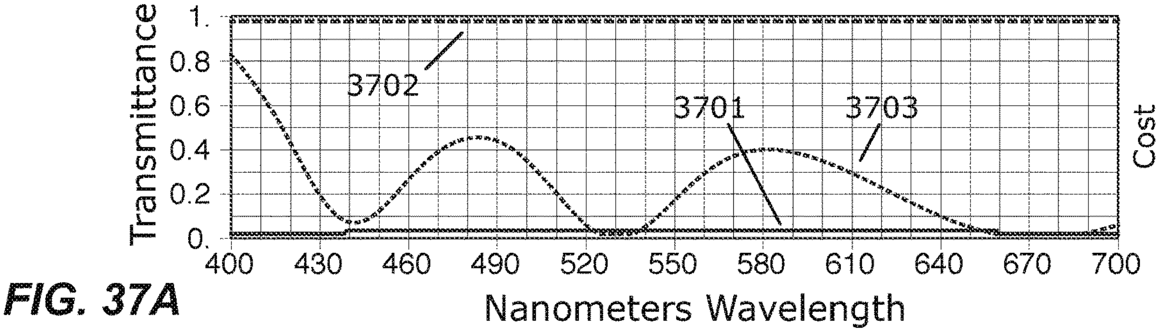
FIGS. 37A, 37B, 37C, 37D, 37E: Graph of the transmittance constraints and cost function used to design a filter for enhancing red-green color discrimination for an observer with moderate deuteranomaly and providing stable color appearance over a range of angles of incidence (FIG. 37A). Graph of the spectral transmittance of components of the filter (FIG. 37B). Graph of a manufacturing specification for the filter (FIG. 37C). Graph of the percent gamut area increase with respect to the Farnsworth D-15 reference colors and with respect to selected natural world reference colors provided by the filter per degree angle of incidence (FIG. 37D). Graph of white-point shift of daylight provided by the filter per degree angle of incidence (FIG. 37E).
Figure 37B:
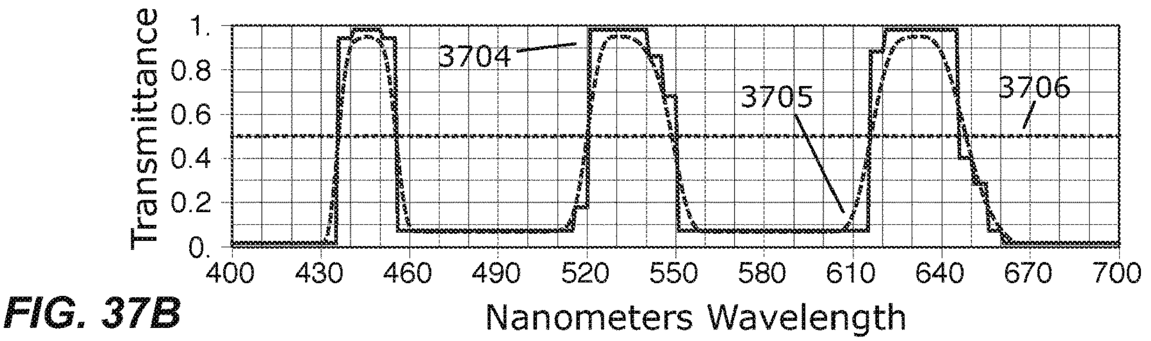
Figure 37C:
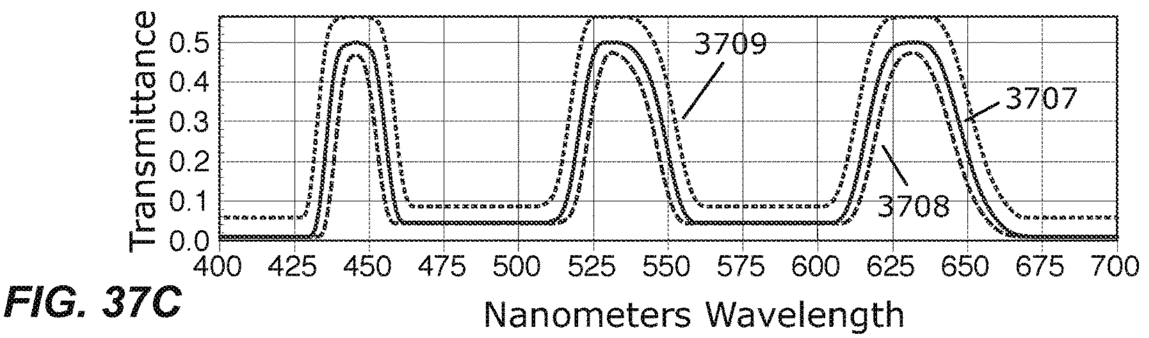
Figure 37D:
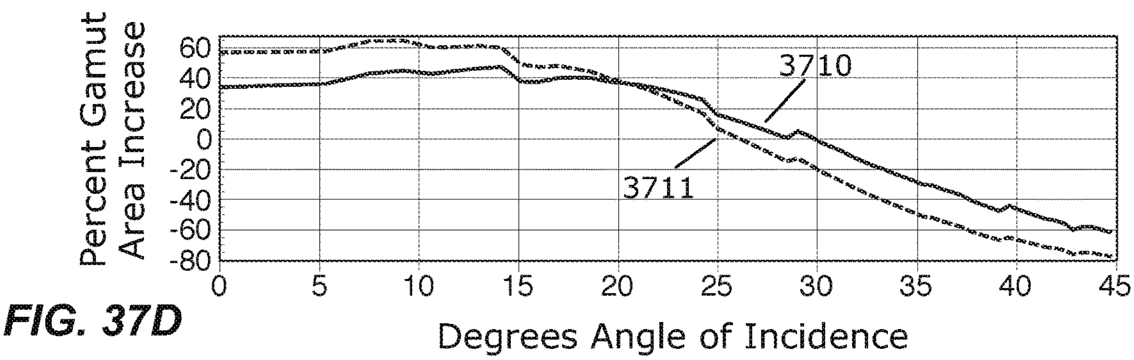
Figure 37E:
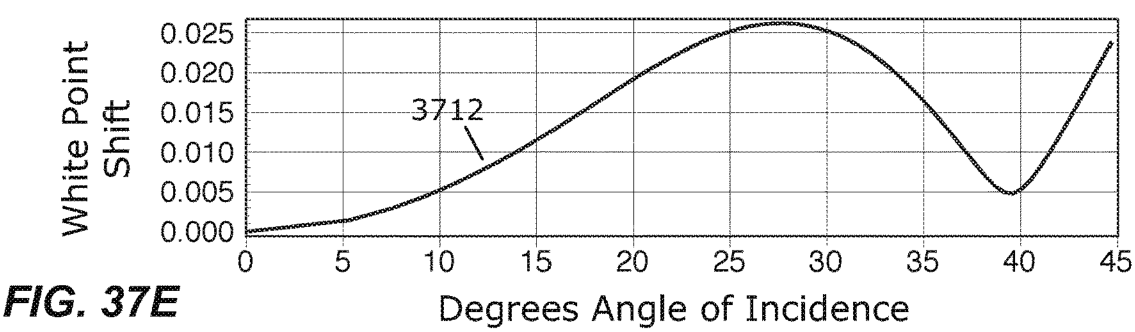

A second embodiment of a filter for a deuteranomalous observer is disclosed along with FIGS. 37A-37E and corresponding tables of FIGS. 65A, 65B-1, and 65B-2. The filter manufacturing target, shown in the graph of FIG. 37C at 3707 and tabulated in the column $f_T$ of FIGS. 65B-1 and 65B-2, has a first pass-band located at about 445 nanometers having a half-maximum width of about 25 nanometers, a second pass-band located at about 535 nanometers having a half-maximum width of about 35 nanometers, and a third pass-band located at about 635 nanometers and having a half-maximum width of about 40 nanometers. The manufacturing specification of the filter is given for incorporation of a neutral density absorber of about 50 percent transmittance. The PGAI provided by the filter is greater than zero for angles of incidence up to about 25 degrees, as shown in FIG. 37D. As noted in the table of FIG. 65A, the importance-weighted PGAI with respect to the Farnsworth D-15 colors is at least about 35 percent, which may be preferable for an observer with moderate deuteranomaly. The white-point of the filter, which is essentially neutral tinted, is stabilized with respect to a deuteranomalous observer model and characterized by a local minimum in the white-point shift curve of less than 0.01 units at around 40 degrees, as shown in FIG. 37E at 3712.

Figure 38A:
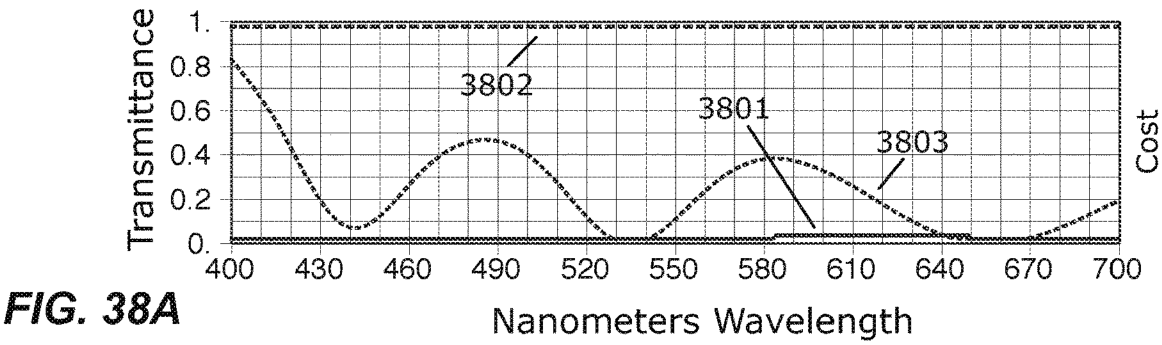
FIGS. 38A, 38B, 38C, 38D, 38E: Graph of the transmittance constraints and cost function used to design a filter for enhancing red-green color discrimination for an observer with severe deuteranomaly and providing stable color appearance over a range of angles of incidence (FIG. 38A). Graph of the spectral transmittance of components of the filter (FIG. 38B). Graph of a manufacturing specification for the filter (FIG. 38C). Graph of the percent gamut area increase with respect to the Farnsworth D-15 reference colors and with respect to selected natural world reference colors provided by the filter per degree angle of incidence (FIG. 38D). Graph of white-point shift of daylight provided by the filter per degree angle of incidence (FIG. 38E).
Figure 38B:
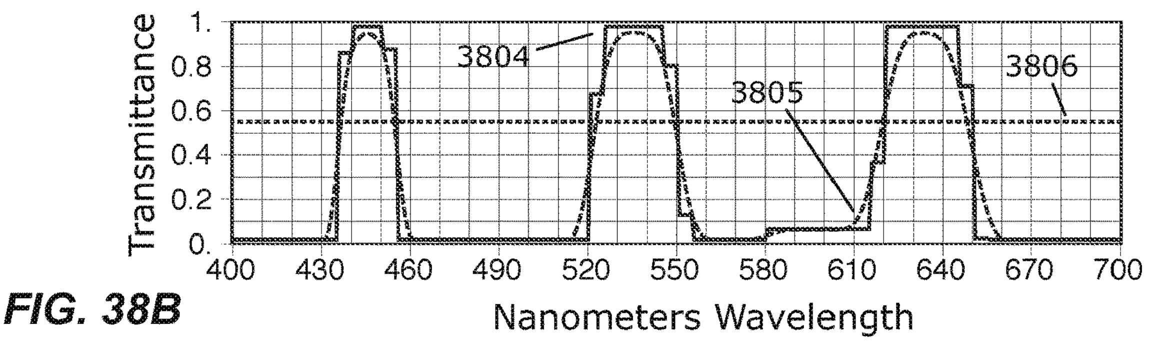
Figure 38C:
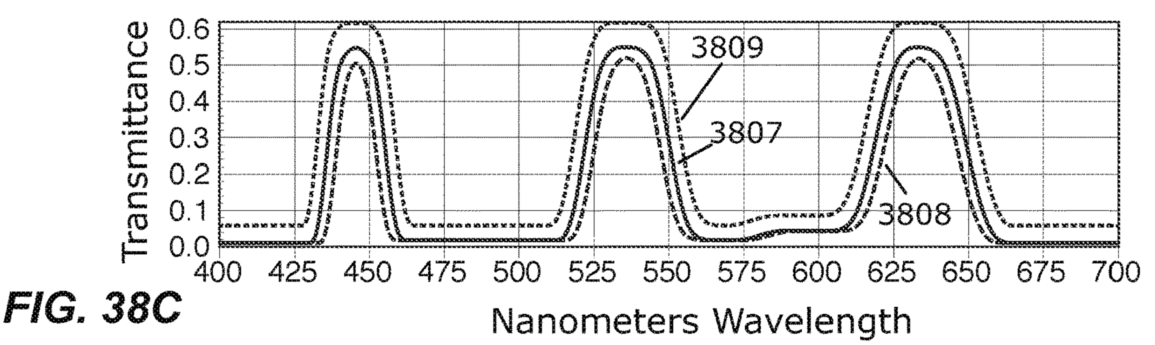
Figure 38D:
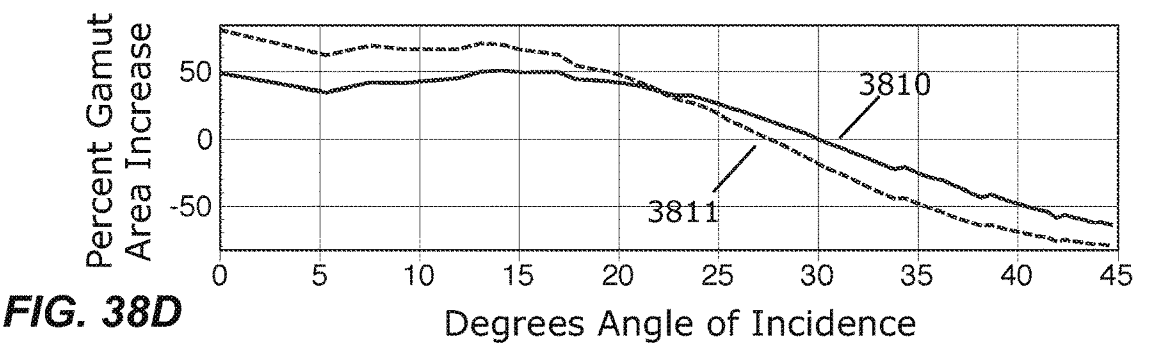
Figure 38E:
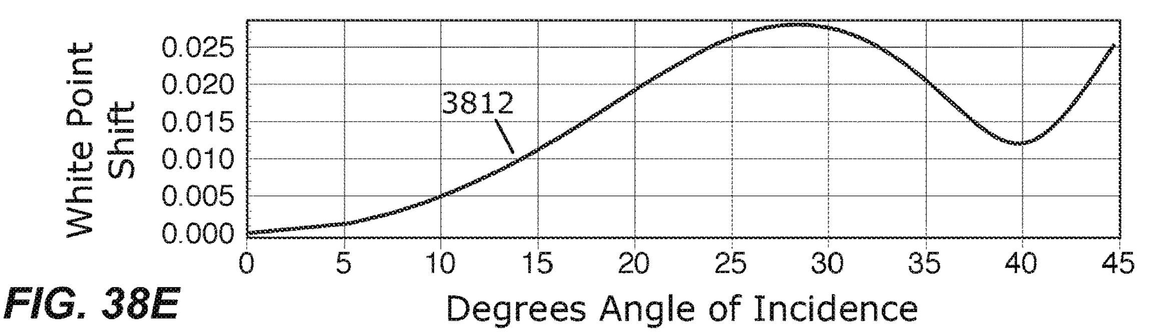

A third embodiment of a filter for a deuteranomalous observer is disclosed along with FIGS. 38A-38E and corresponding tables of FIGS. 66A, 66B-1, and 66B-2. In this embodiment the filter design criteria is modified so that the minimum spectral transmittance bound (equal to one fifth of the luminous transmittance) is only enforced over the yellow to red wavelengths, e.g. from about 580 nanometers to about 650 nanometers, as shown in FIG. 38A at 3801. The resulting filter design may therefore be described as having a third pass-band with a "shoulder" on the short wavelength side of the band. The filter manufacturing target, shown in the graph of FIG. 38C at 3807 and tabulated in the column $f_T$ of FIGS. 66B-1 and 66B-2, has a first pass-band located at about 445 nanometers having a half-maximum width of about 20 nanometers, a second pass-band located at about 535 nanometers having a half-maximum width of about 30 nanometers, and a third pass-band located at about 635 nanometers and having a half-maximum width of about 30 nanometers. The manufacturing specification of the filter is given for incorporation of a neutral density absorber of about 55 percent transmittance. The PGAI provided by the filter is greater than zero for angles of incidence up to about 25 degrees, as shown in FIG. 38D. As noted in the table of FIG. 66A, the importance-weighted PGAI with respect to the Farnsworth D-15 colors is at least about 40 percent, which may be preferable for an observer with severe deuteranomaly. The white-point of the filter, which is essentially neutral tinted, is stabilized with respect to a deuteranomalous observer model and characterized by a local minimum in the white-point shift curve of about 0.01 units at around 40 degrees, as shown in FIG. 38E at 3812.

Figure 39A:
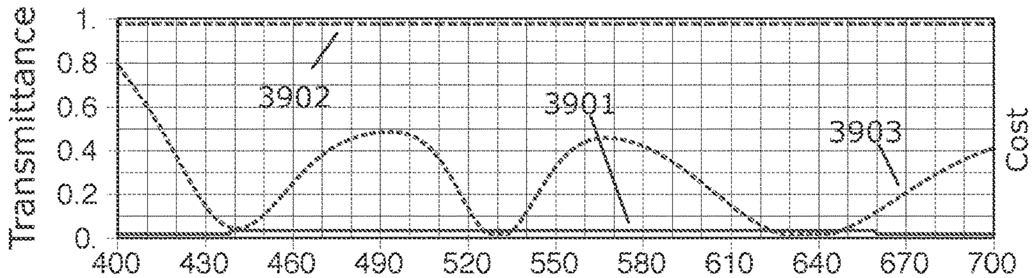
FIGS. 39A, 39B, 39C, 39D, 39E: Graph of the transmittance constraints and cost function used to design a filter for enhancing red-green color discrimination for an observer with protanomaly and providing stable color appearance over a range of angles of incidence (FIG. 39A). Graph of the spectral transmittance of components of the filter (FIG. 39B). Graph of a manufacturing specification for the filter (FIG. 38C). Graph of the percent gamut area increase with respect to the Farnsworth D-15 reference colors and with respect to selected natural world reference colors provided by the filter per degree angle of incidence (FIG. 39D). Graph of white-point shift of daylight provided by the filter per degree angle of incidence (FIG. 39E)
Figure 39B:
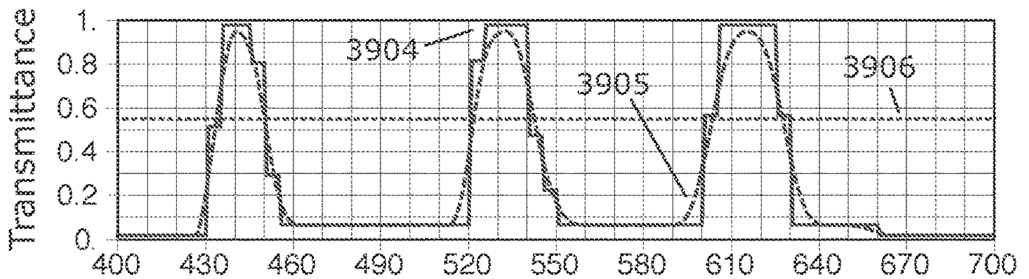
Figure 39C:
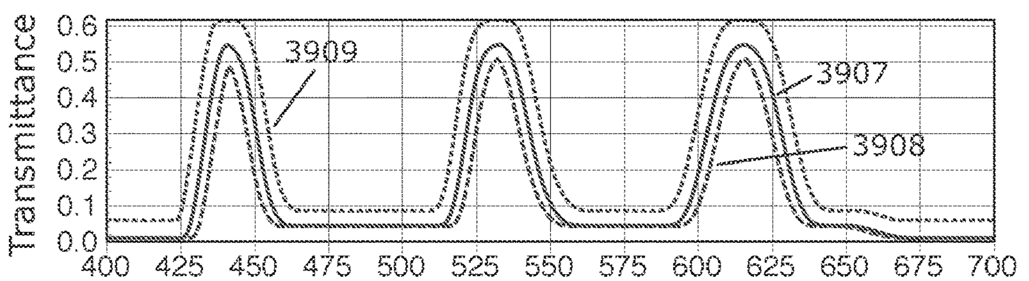
Figure 39D:
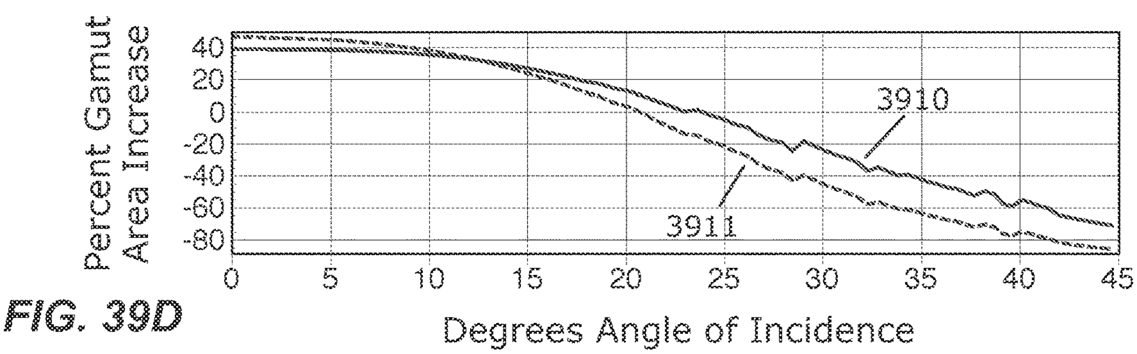
Figure 39E:
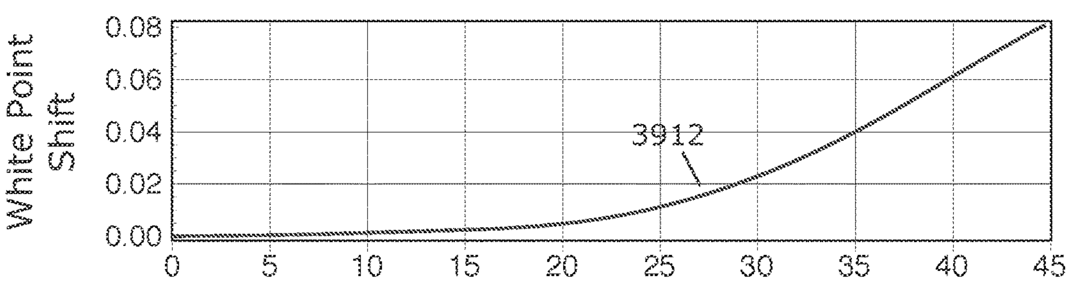

A further embodiment, related to the series shown in FIGS. 36A-38E, is disclosed along with FIGS. 39A-39E and corresponding tables of FIGS. 67A, 67B-1, and 67B-2. The embodiment provides a filter that enhances red-green color discrimination enhancement for a protanomalous observer. Compared to previous examples of red-green color enhancing filters, such filters when designed for protanomalous observers generally prefer a shorter-wavelength configuration of the second and third pass-bands. This is in accordance with the orientation of the tritan confusion line, as well as the fact that protanomaly is associated with a blue-shifting of spectral absorptance of the retinal photopigment in the long-wavelength cone cell. As a consequence of the shorter-wavelength configuration of the second and third pass-bands, the total spectral width of such filters must be correspondingly reduced so that red colors appear reasonably bright. The filter manufacturing target, shown in the graph of FIG. 39C at 3907 and tabulated in the column $f_T$ of FIGS. 67B-1 and 67B-2, has a first pass-band located at about 440 nanometers having a half-maximum width of about 20 nanometers, a second pass-band located at about 530 nanometers having a half-maximum width of about 25 nanometers, and a third pass-band located at about 615 nanometers and having a half-maximum width of about 25 nanometers. The manufacturing specification of the filter is given for incorporation of a neutral density absorber of about 55 percent transmittance. The PGAI provided by the filter is greater than zero for angles of incidence up to about 20 degrees, as shown in FIG. 39D. The white-point stability of such filters may additionally be considered in the design, however the analysis of white-point stability according to a standard observer model may be essentially inadequate for the intended use (e.g. by a protanomalous observer) of this filter.

In another embodiment, a filter that provides color enhancement for normal observers in addition to improving the luminance contrast of the primary lights of an electronic visual display (such as those of a liquid crystal display having a light-emitting diode backlight) is disclosed along with FIGS. 40A-40E and corresponding tables of FIGS. 68A, 68B-1, and 68B-2. The filter is intended for use with electronic displays typically using three primary lights: a red primary having a peak wavelength between about 610 nanometers and about 630 nanometers and having a full width at half maximum of about 20 nanometers to about 50 nanometers, a green primary having a peak wavelength between about 530 nanometers and about 535 nanometers and having a full width at half maximum of about 20 nanometers to about 50 nanometers, and a blue primary having a peak wavelength between about 450 nanometers and about 460 nanometers and having a full width at half maximum of about 20 nanometers. The filter provides a luminous transmittance of the primary lights that is about equal for the red, green and blue primaries (therefore the white-point of the display is preserved). Further, the luminous transmittance is at least about 15 percent greater than the luminous transmittance of daylight provided by the filter. Therefore the filter may provide an improved contrast ratio of such displays when viewed under outdoor conditions, for example.

Figure 40A:
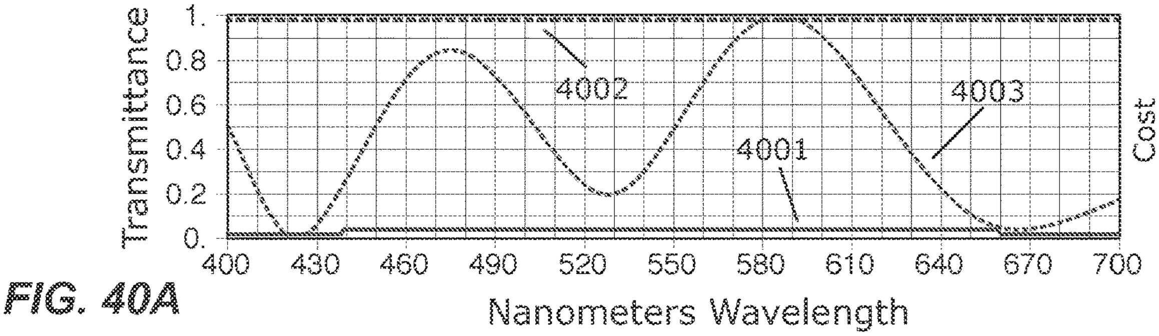
FIGS. 40A, 40B, 40C, 40D, 40E: Graph of the transmittance constraints and cost function used to design a filter for enhancing the luminosity of primary lights emitted by an electronic visual display for a normal observer and providing stable color appearance over a range of angles of incidence (FIG. 40A). Graph of the spectral transmittance of components of the filter (FIG. 40B). Graph of a manufacturing specification for the filter (FIG. 40C). Graph of the percent gamut area increase with respect to the Farnsworth D-15 reference colors and with respect to selected natural world reference colors provided by the filter per degree angle of incidence (FIG. 40D). Graph of white-point shift of daylight provided by the filter per degree angle of incidence (FIG. 40E).
Figure 40B:
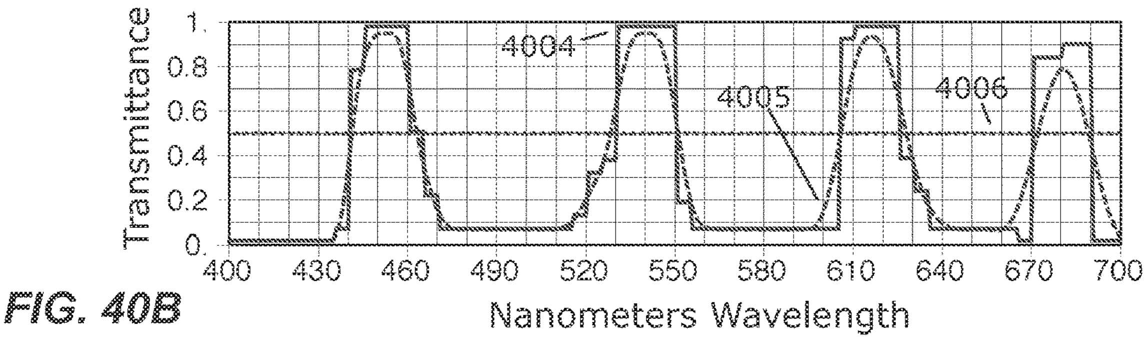
Figure 40C:
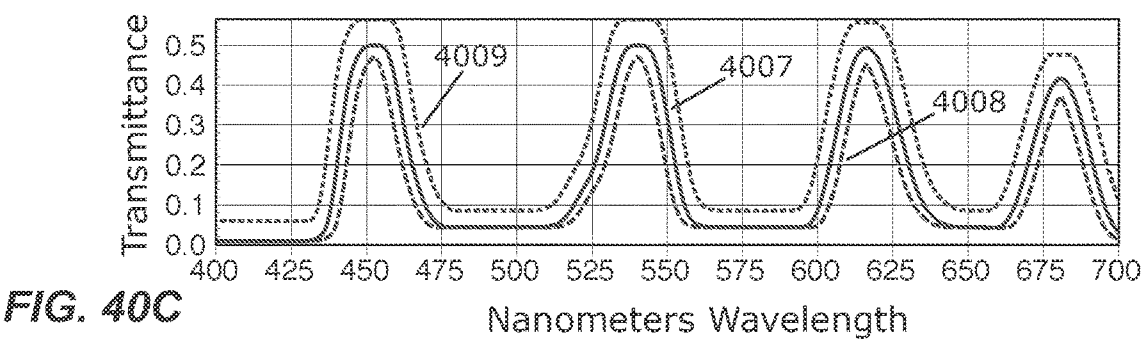
Figure 40D:
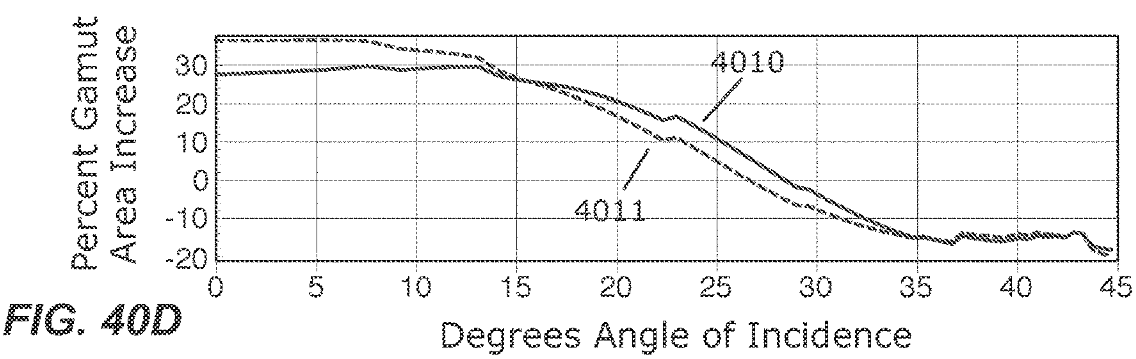
Figure 40E:
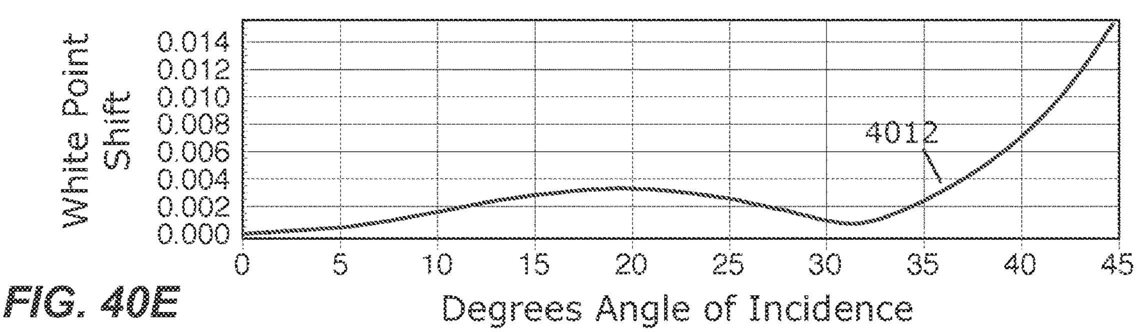

The filter manufacturing target, shown in the graph of FIG. 40C at 4007 and tabulated in the column $f_T$ of FIGS. 68B-1 and 68B-2, is characterized by four pass-bands providing a stabilized white-point up to 45 degrees angle of incidence. The filter achieves color stability of the white point providing a white-point shift that is less than 0.01 units between about 0 degrees and about 45 degrees, as demonstrated by curve 4012 in FIG. 40E. Further, the filter provides a moderate increase to color discrimination, as noted in table 68A the importance-weighted percent gamut area with respect to the Farnsworth D-15 is greater than about 20 percent.

Figure 21A:
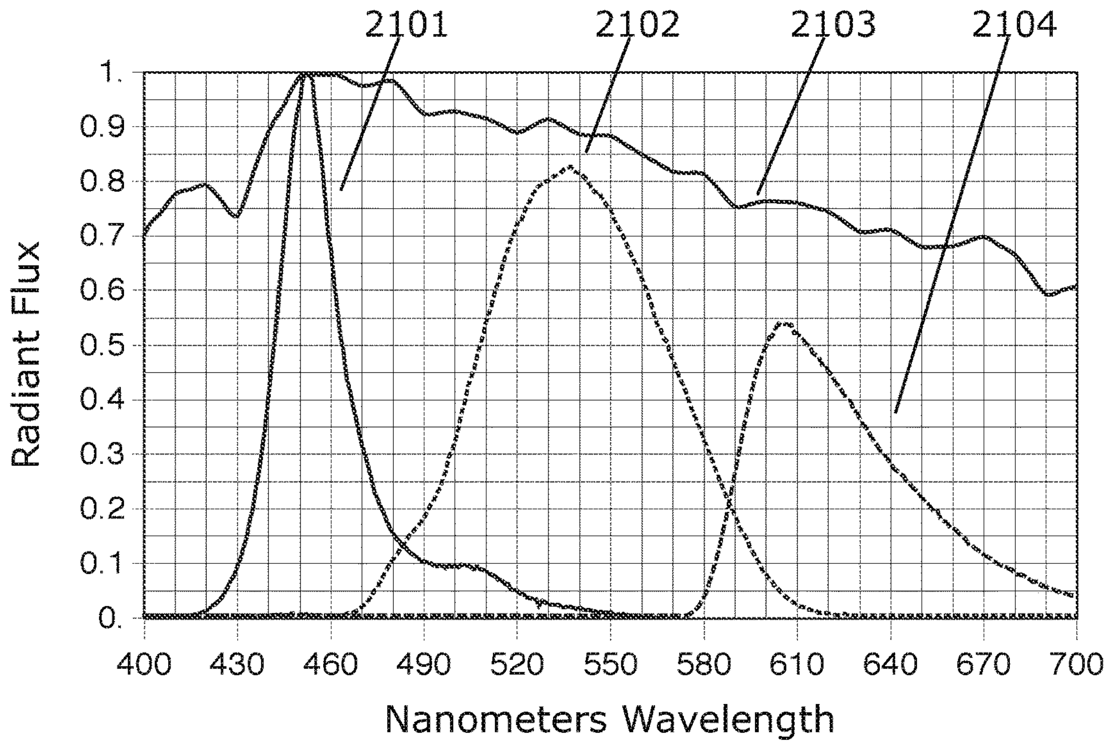
FIGS. 21A, 21B: Graph of a spectral radiant flux of daylight and of the primary lights of a liquid crystal display with a light-emitting diode backlight (FIG. 21A), and a graph of the spectral transmittance of a filter that provides an enhanced luminosity of the display primaries relative to the luminosity of daylight (FIG. 21B).
Figure 21B:
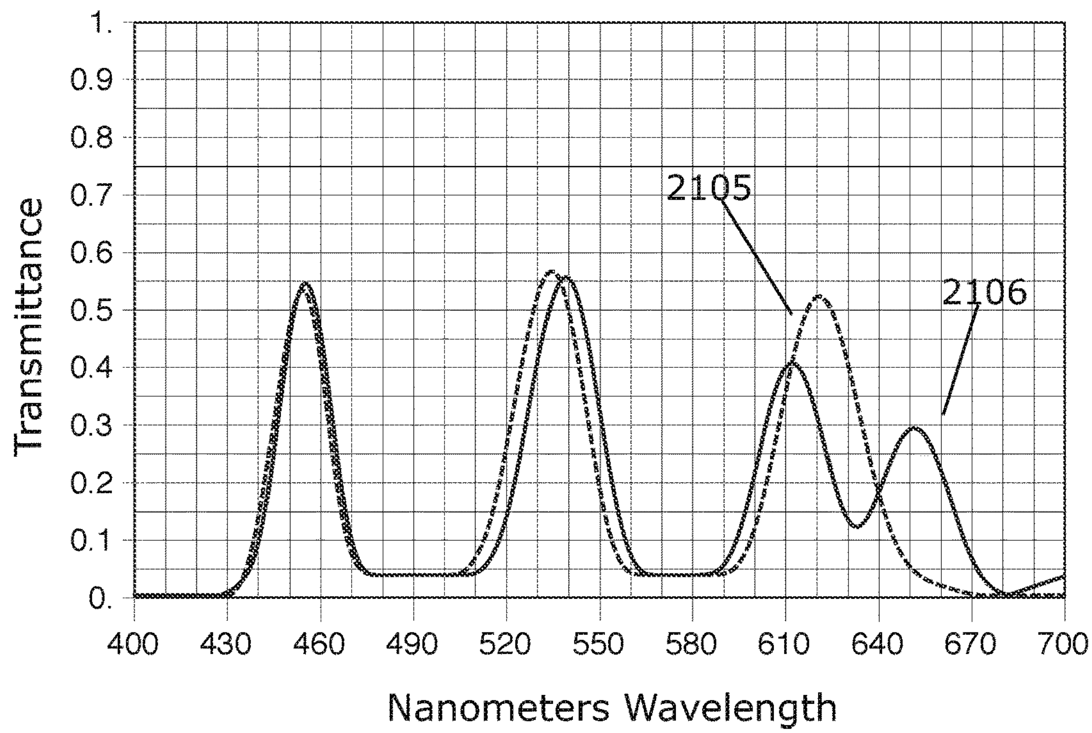

Similarly performing filters may also be designed having three pass-bands, with the range of stable angles extending to about 35 degrees. A variation of a three pass-band filter, and another variation of a four pass-band filter, each achieving such luminance contrast gain are shown in FIG. 21B at 2105 and 2106. The filter at 2105 has three pass-bands with a first pass-band at about 455 nanometers having a half-maximum width of about 15 nanometers, a second pass-band at about 535 nanometers having a half-maximum width of about 20 nanometers, and a third pass-band at about 620 nanometers having a half-maximum width of about 25 nanometers. The filter at 2106 in FIG. 21B, has four pass-bands with a first pass-band at about 455 nanometers having a half-maximum width of about 15 nanometers, a second pass-band at about 540 nanometers halving a half-maximum width of about 20 nanometers, a third pass-band at about 610 having a half-maximum width of about 20 nanometers, and a fourth pass-band at about 650 nanometers halving a full width at half maximum of about 20 nanometers. The filter at 2106 provides improved color stability with respect to changes in angle of incidence when compared to the simple three-band filter 2105. FIG. 21A shows the spectral radiant flux of daylight 2103, and that of the blue 2101, green 2102 and red 2104 primary lights as measured from a LED-backlit LCD display. The spectral flux of organic LED-based displays (OLED) are sufficiently similar so that the filters of this embodiment will also provide the luminance contrast gain for those displays as well.

In another embodiment, a multi-band filter for normal observers is designed to provide substantially normal color discrimination in combination with a blocking band between about 530 nanometers and about 560 nanometers. The blocking band provides protection to the eye from laser radiation at 532 nanometers, for example, as emitted by a frequency-doubled Nd:YAG laser. Such lasers have many applications, including use in various medical procedures. Conventionally designed filters that block visible laser emission, for example at about 532 nanometers, typically also cause poor quality color discrimination when used in eyewear. For example, filters made with absorptive materials cannot achieve sufficient blocking without also absorbing a wide spectral band. Interference filters comprising a single stop-band (e.g. Rugate type filters) can provide sufficient protection for the eye, but causes significant changes to the appearance of colors and exhibit significant shifts of the white-point at off-normal angles of incidence. In contrast, a multi-band interference filter can provide sufficient protection against a visible laser and, designed using the filter generating methods as disclosed previously, can also maintain a normal appearance of colors, maintain the stability of colors at multiple angles, and provide protection to the eye from the visible laser over a wide range of angles.

An embodiment of a 532 nanometer blocking filter is disclosed in FIG. 41A-41E and corresponding tables in FIGS. 69A, 69B-1, and 69B-2. The filter manufacturing target, shown in the graph of FIG. 41C at 4107 and tabulated in the column $f_T$ of FIGS. 69B-1 and 69B-2, is characterized by four pass-bands separated by three stop bands where the middle stop-band is the laser-protective blocking band. The first pass-band is at about 440 nanometers and has a half-maximum width of about 30 nanometers, the second pass-band is at about 510 nanometers and has a half-maximum width of about 30 nanometers, the third pass-band is at about 570 nanometers and has a half-maximum width of about 20 nanometers, and the fourth pass-band is at about 630 nanometers and has a half-maximum width of about 30 nanometers. Generally, similar filters may be found having bands within +/−10 nanometers of the given locations and a variety of band-widths, but all such filters feature at least four pass-bands.

Figure 22A:
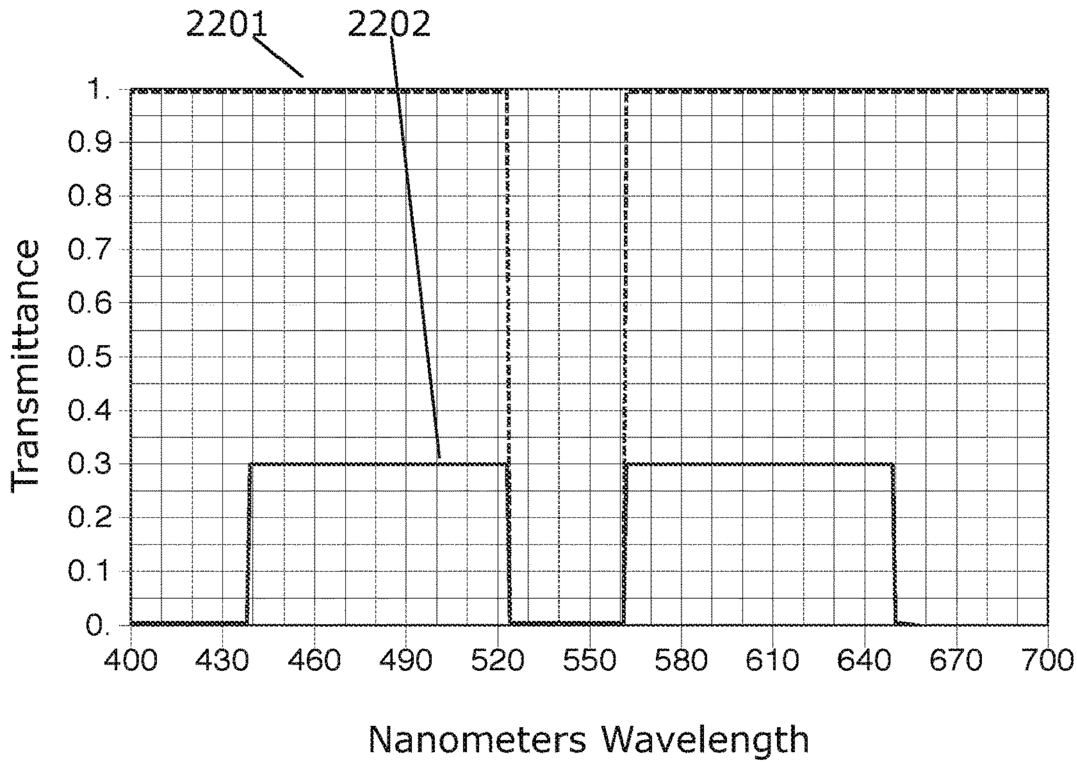
FIGS. 22A, 22B: Graph of spectral transmittance constraints for a filter that protects the eye from 532 nanometer radiation emitted by a frequency-doubled Nd:YAG laser for angles of incidence between 0 degrees and about 30 degrees (FIG. 22A), and a graph of the spectral transmittance of such a filter (FIG. 22B).
Figure 22B:
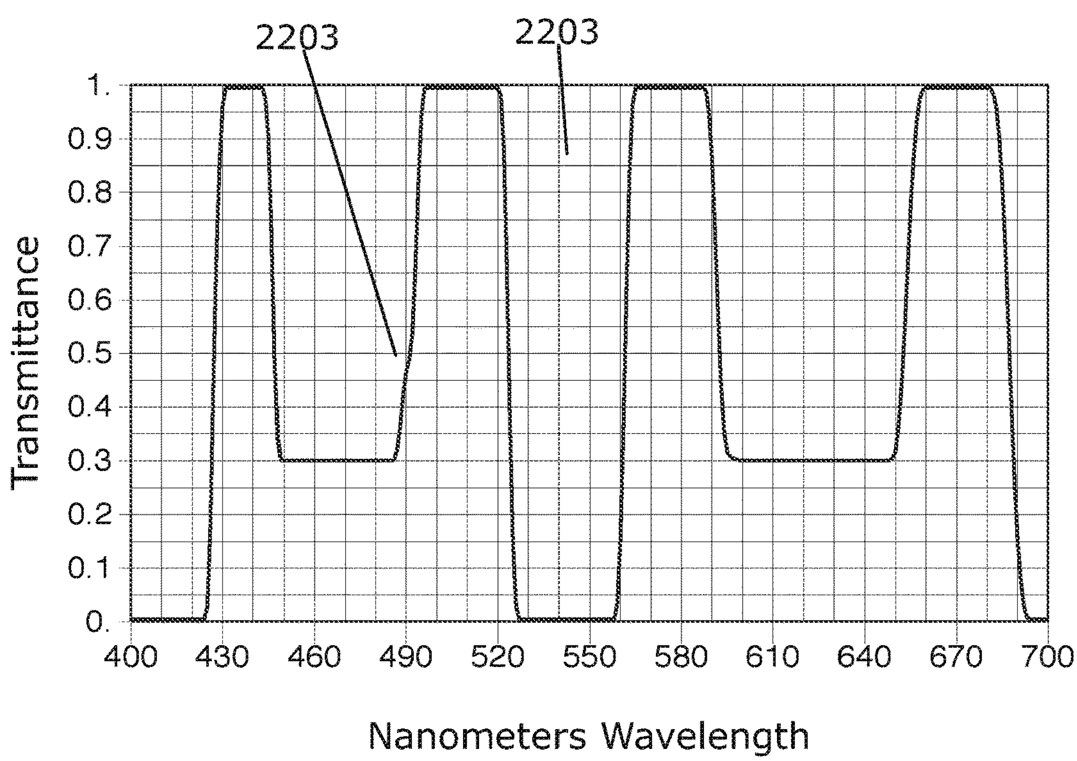
Figure 41A:
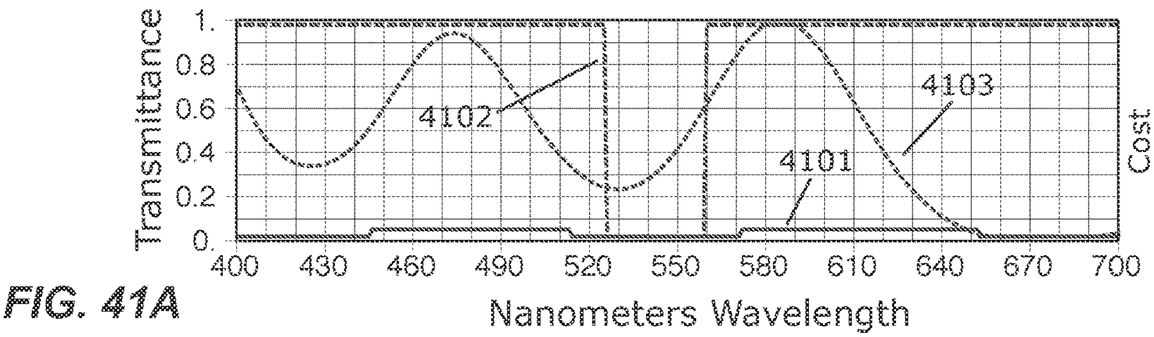
FIGS. 41A, 41B, 41C, 41D, 41E: Graph of the transmittance constraints and cost function used to design a filter for providing eye protection from a 532 nanometer frequency-doubled Nd:YAG laser and providing stable color appearance over a range of angles of incidence (FIG. 41A). Graph of the spectral transmittance of components of the filter (FIG. 41B). Graph of a manufacturing specification for the filter (FIG. 41C). Graph of the percent gamut area increase with respect to the Farnsworth D-15 reference colors and with respect to selected natural world reference colors provided by the filter per degree angle of incidence (FIG. 41D). Graph of white-point shift of daylight provided by the filter per degree angle of incidence (FIG. 41E).
Figure 41B:
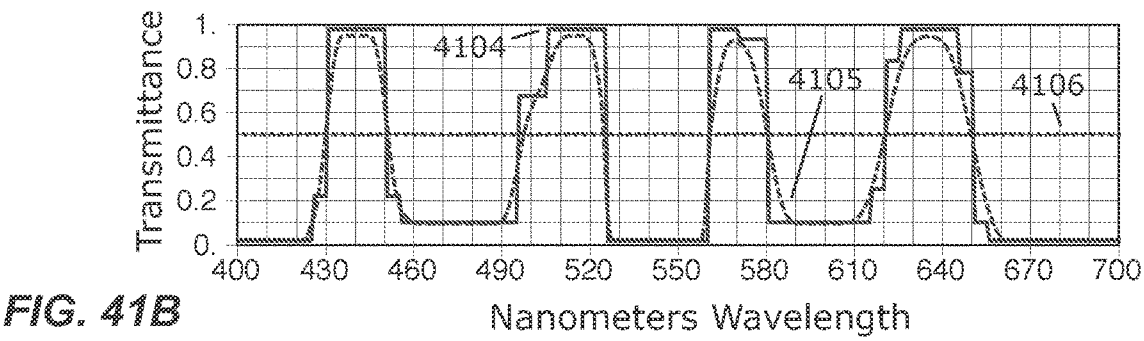
Figure 41C:
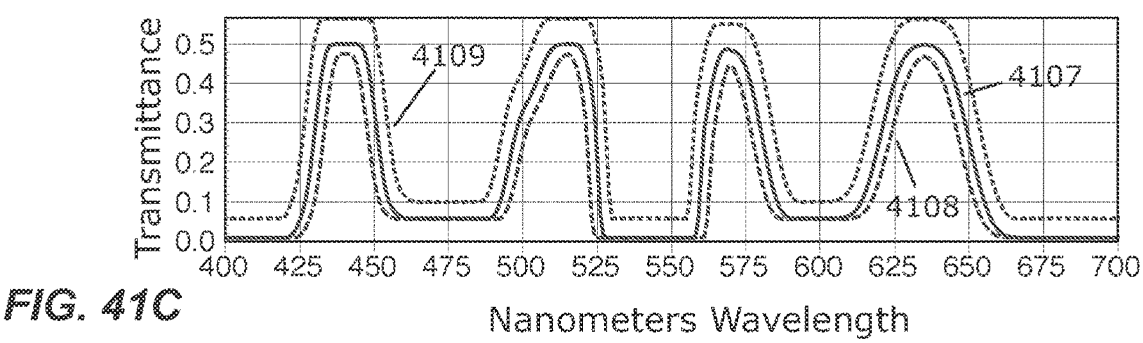
Figure 41D:
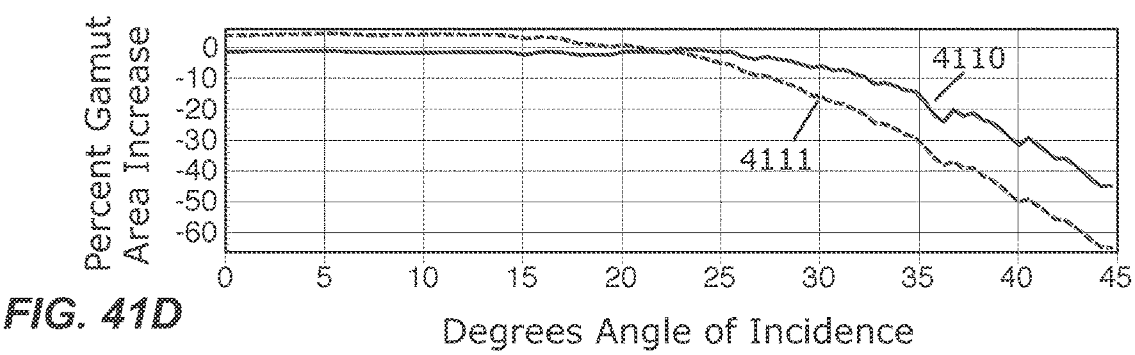
Figure 41E:
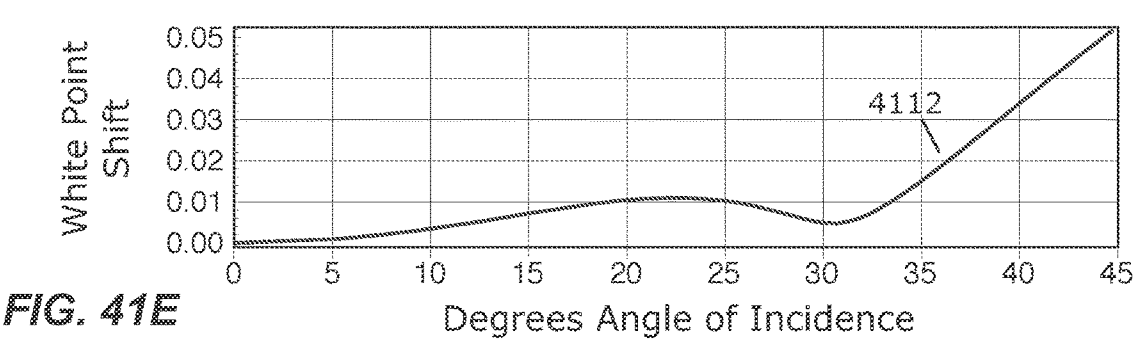
Figure 42A:
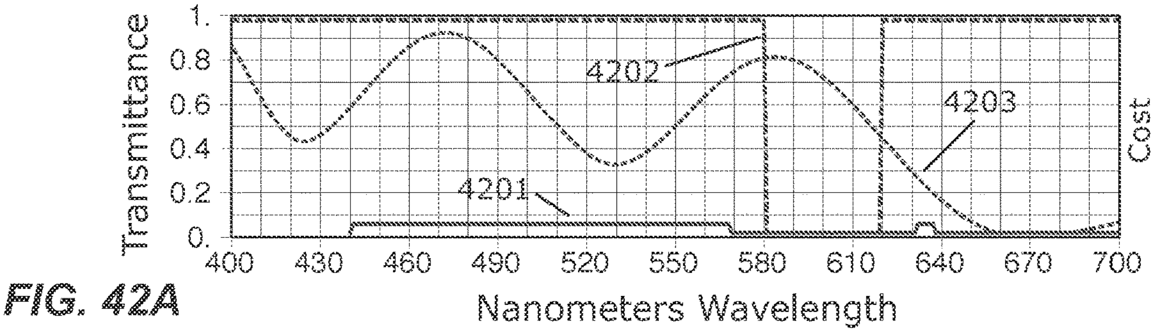
FIGS. 42A, 42B, 42C, 42D, 42E: Graph of the transmittance constraints and cost function used to design a filter for providing eye protection from a 589 nanometer sodium flare and providing stable color appearance over a range of angles of incidence (FIG. 42A). Graph of the spectral transmittance of components of the filter (FIG. 42B). Graph of a manufacturing specification for the filter (FIG. 42C). Graph of the percent gamut area increase with respect to the Farnsworth D-15 reference colors and with respect to selected natural world reference colors provided by the filter per degree angle of incidence (FIG. 42D). Graph of white-point shift of daylight provided by the filter per degree angle of incidence (FIG. 42E).
Figure 42B:
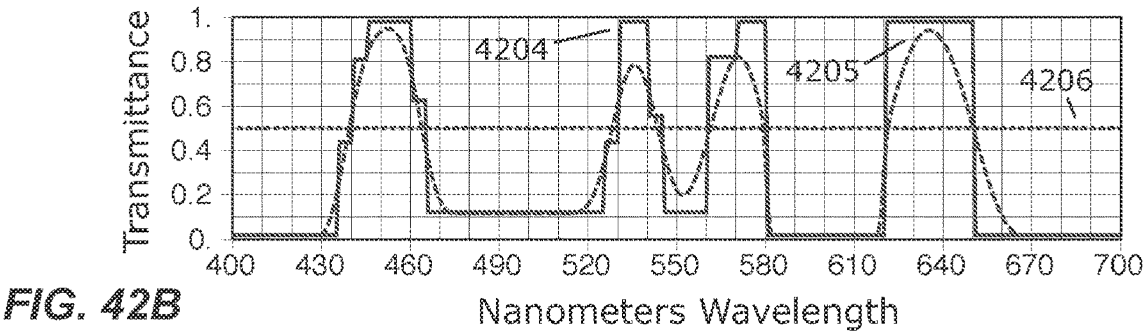
Figure 42C:
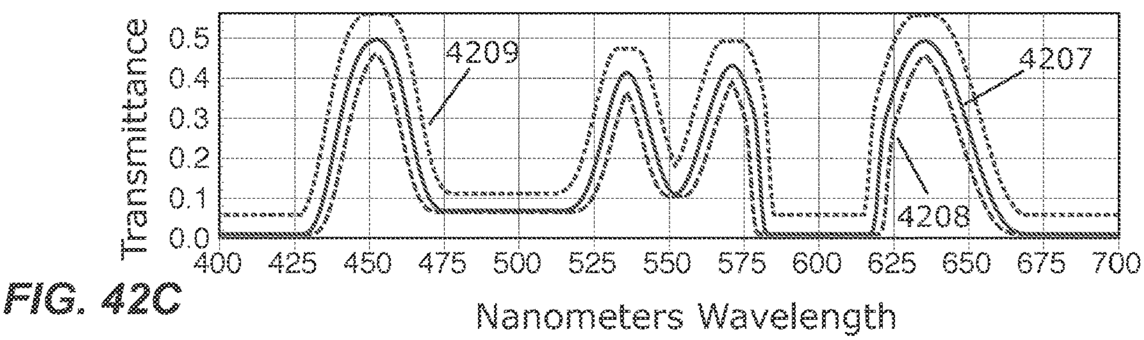
Figure 42D:
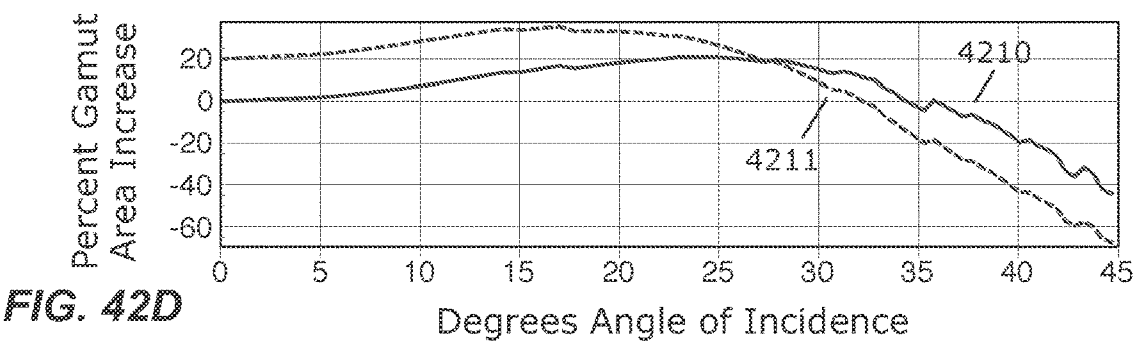
Figure 42E:
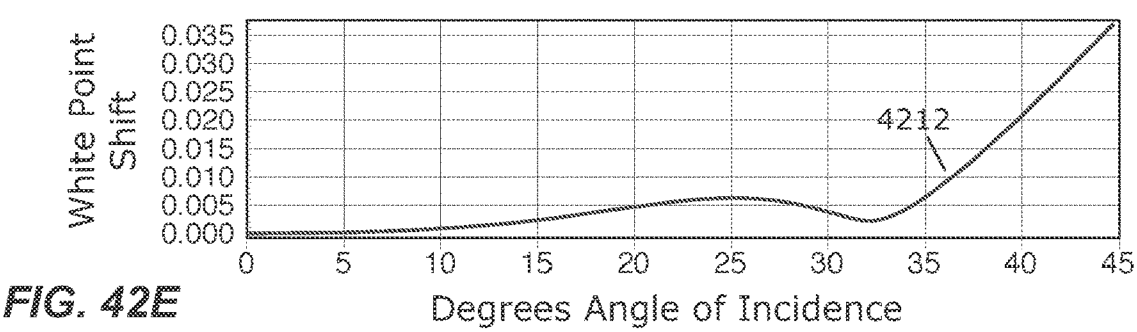

For industrial or medical applications, the blocking band (between about 530 nanometers to about 560 nanometers) may provide a protection level rated OD6 or higher (OD6 indicates an optical density of 6, which results in attenuation of transmitted light by a factor of $10^{-6}$). For nuisance level protection (for example against green laser pointers having a 532 nanometer output) the protection level may be lesser, for example around OD2. This protection may be specified in the filter generator design specification as a maximum transmittance constraint 2201 as shown in FIG. 22A. Additionally, as shown in FIG. 41E, such four pass-band filters may provide good stability of the white-point of less than 0.01 units up to 35 degrees angle of incidence. As shown in FIG. 41D such filters may also provide a color appearance that is essentially normal over a wide range of angles, as evidenced by the fact that the PGAI is nearly zero for angles of incidence up to about 25 degrees.

Such filters may be incorporated into safety eyewear for industrial or medical use. In particular, in some applications of lasers in medical procedures it may be beneficial for the user to be able to accurately perceive the coloration of biological tissues as they are being operated on, and to perceive the correct chromaticity appearance of certain colored lights so that the operator may be able to correctly interpret computer displays and/or indicator lights on equipment. It may be usefully noted that such filters may be incompatible for use under lighting sources with narrow-band spectral output, such as some fluorescent lamps or RGB light emitting diode arrays.

Figure 23A:
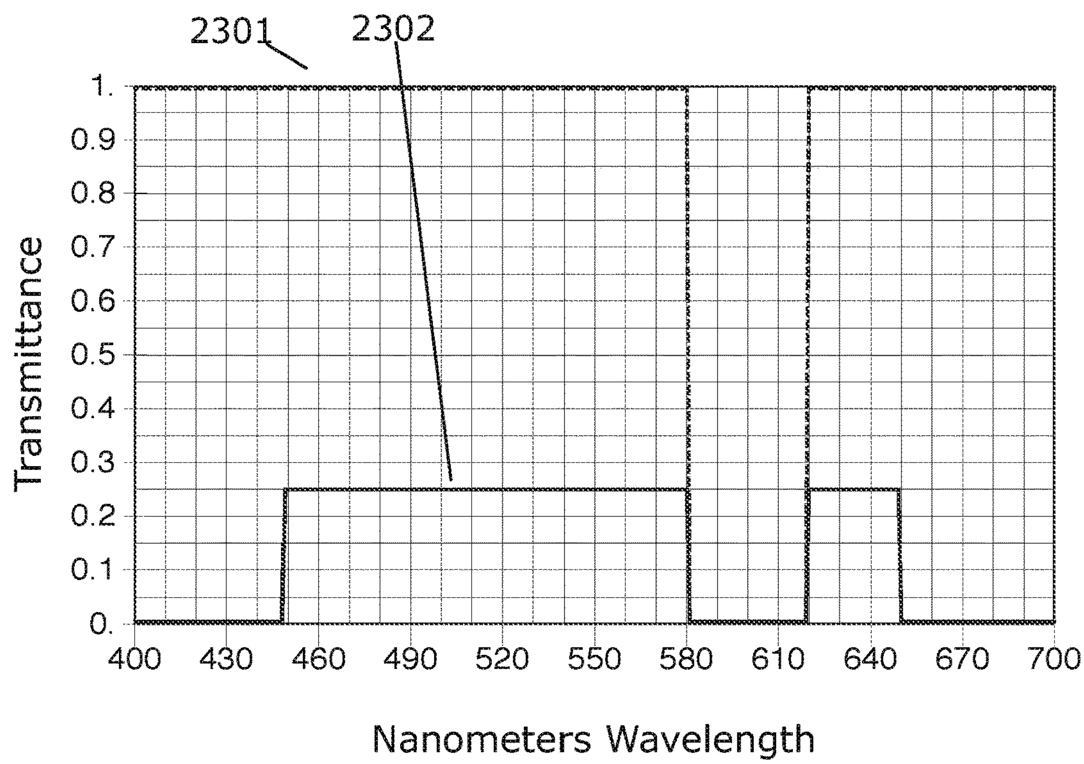
FIGS. 23A, 23B: Graph of spectral transmittance constraints for a filter that protects the eye from 589 nanometer radiation emitted by a sodium flare for angles of incidence between 0 degrees and about 30 degrees (FIG. 23A), and a graph of the spectral transmittance of such a filter (FIG. 23B).
Figure 23B:
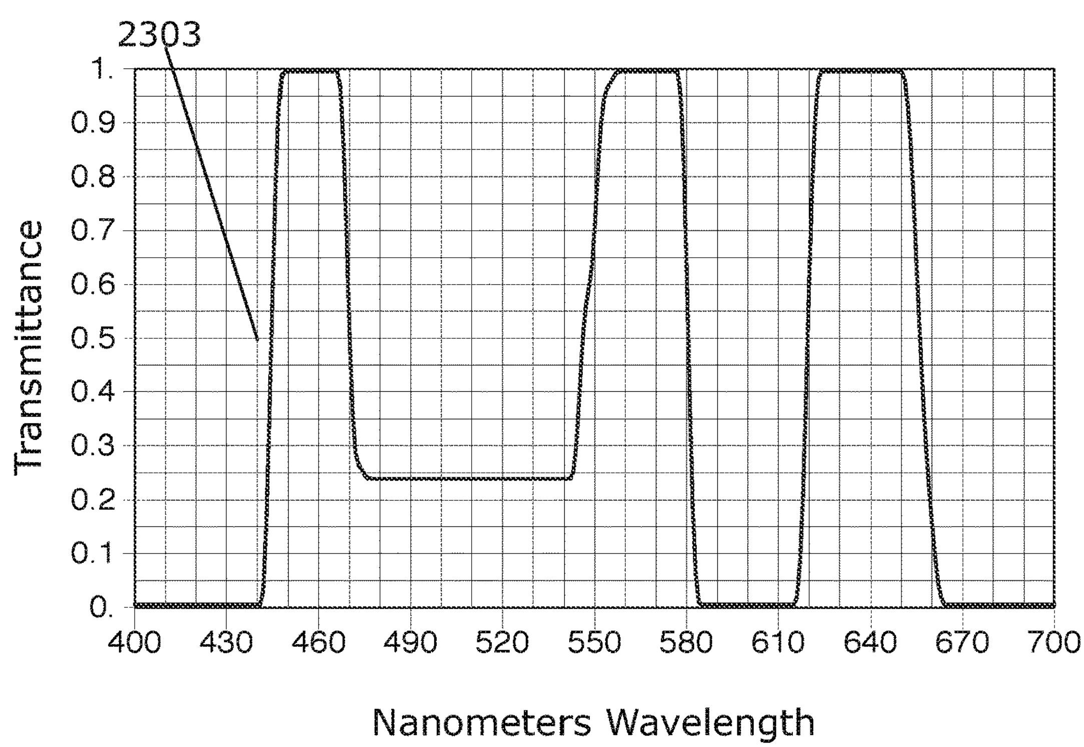

Another embodiment, related to the embodiment shown in FIGS. 41A-41E, is disclosed in FIG. 42A-42E and corresponding tables in FIGS. 70A, 70B-1, and 70B-2. The filter manufacturing target, shown in the graph of FIG. 42C at 4207 and tabulated in the column $f_T$ of FIGS. 70B-1 and 70B-2, is characterized by four pass-bands separated by three stop bands where the long-wavelength stop-band is a blocking band providing protection against a 589 nanometer sodium emission line. Eye protection from this wavelength may have industrial applications in certain processes such as glass-working, or working with lasers having output power at or near the short-wavelength side of the blocking band. The filter design specification incorporates the blocking band as a spectral transmittance constraint, as shown by the maximum transmittance constraint 2301 in FIG. 23A. This embodiment may provide similar quality of color appearance and white-point stability as demonstrated with the prior related embodiment. Variations on this embodiment may comprise only three pass-bands, however such variations tend to provide a substantial decrease with respect to the PGAI metric and are therefore somewhat less preferable for use in applications where normal color discrimination is desired.

Figure 45A:
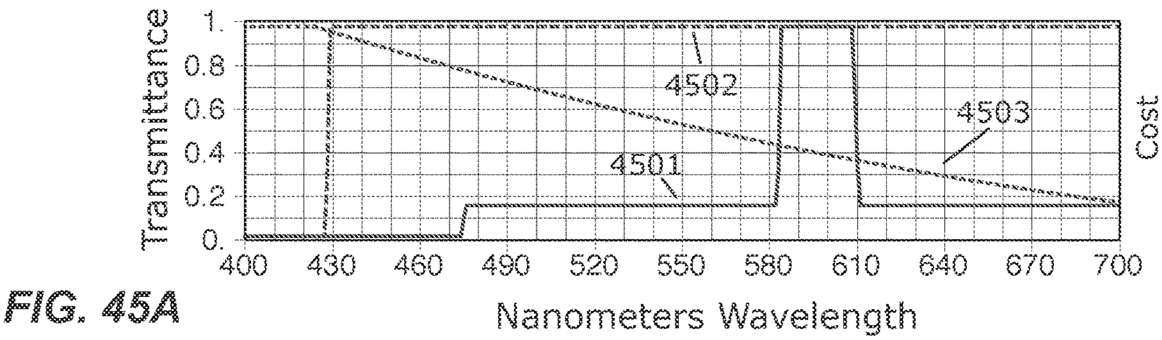
FIGS. 45A, 45B, 45C, 45D, 45E: Graph of the transmittance constraints and cost function used to design a filter for providing suppression of short-wavelength blue light and high luminous transmittance (FIG. 45A). Graph of the spectral transmittance of components of the filter (FIG. 45B). Graph of a manufacturing specification for the filter (FIG. 45C). Graph of the percent gamut area increase with respect to the Farnsworth D-15 reference colors and with respect to selected natural world reference colors provided by the filter per degree angle of incidence (FIG. 45D). Graph of white-point shift of daylight provided by the filter per degree angle of incidence (FIG. 45E).
Figure 45B:
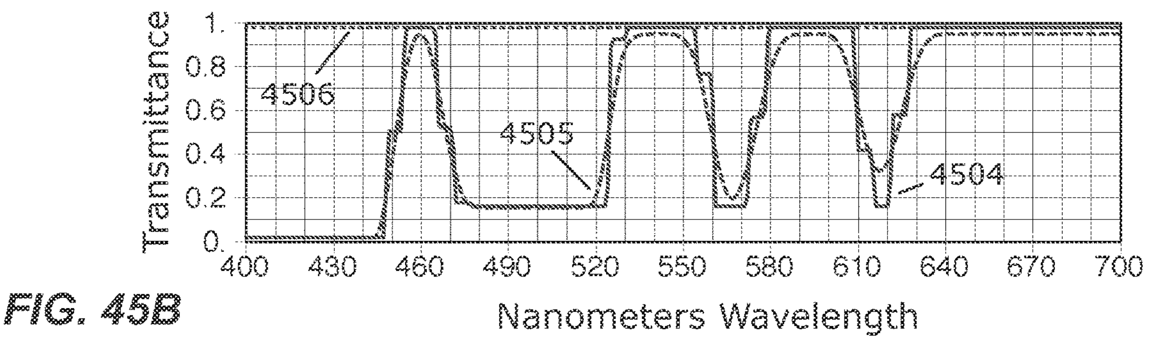
Figure 45C:
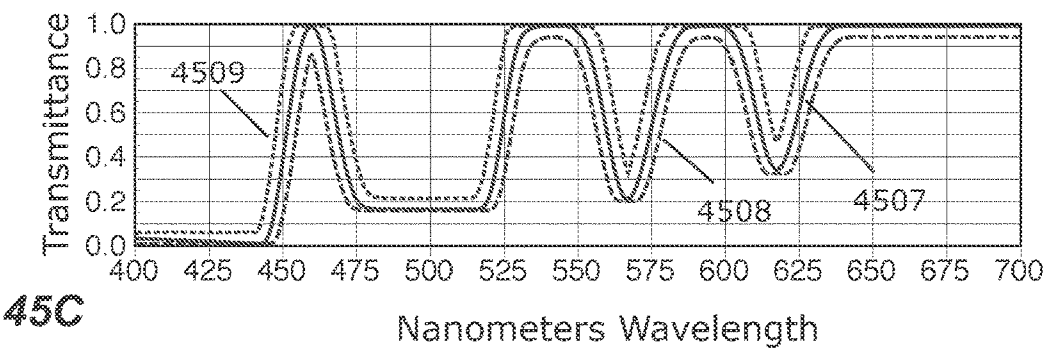
Figure 45D:
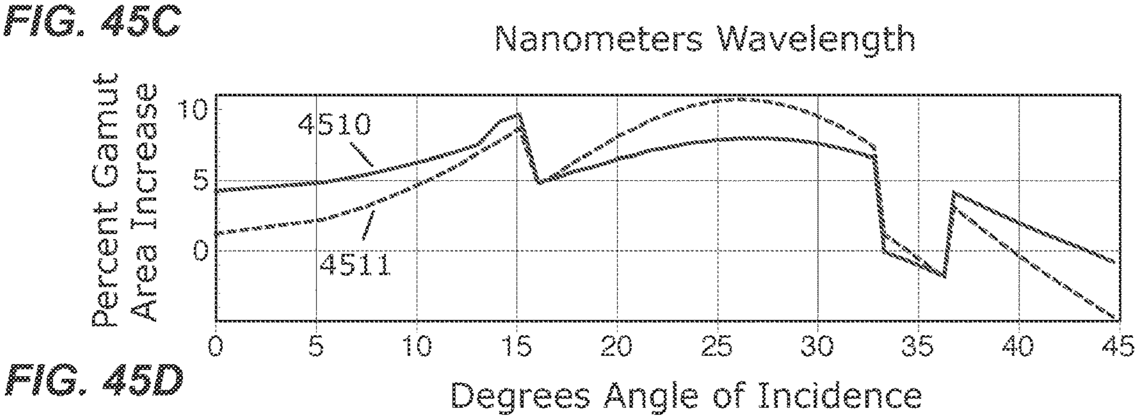
Figure 45E:
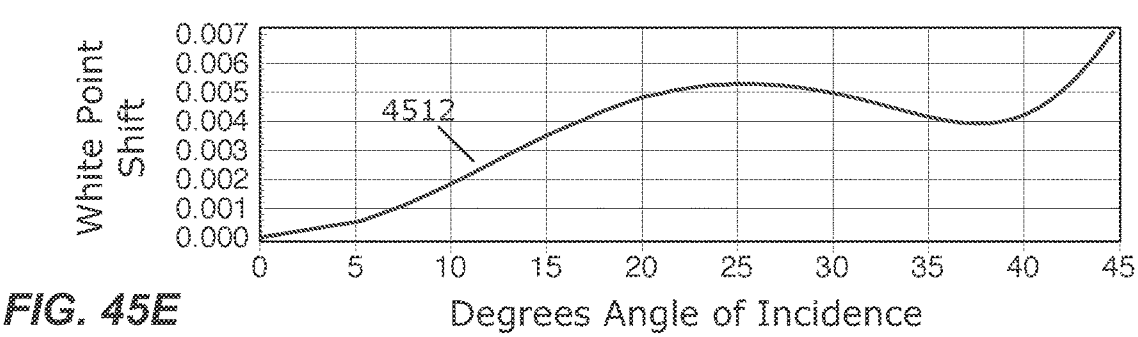

Another embodiment, related to the embodiment shown in FIGS. 35A-35E, is disclosed in FIG. 45A-45E and corresponding tables in FIGS. 71A, 71B-1, and 71B-2. This embodiment again provides a blue-blocking function in combination with substantially normal color appearance. It is also intended to be suitable for use under dim lighting conditions and in particular at night wherein illumination by sodium vapor lamps is expected (e.g., as commonly found in street lamps). The filter design criteria incorporates a minimum transmittance constraint, as shown in FIG. 45A at 4501, that ensures that 589 nanometer light is transmitted by the filter. Such a filter may then be manufactured, for example, in combination with a photochromic element so that the filter when incorporated in eyewear may be used under a range of illumination levels. This embodiment provides substantially normal color appearance, as shown in FIG. 45D where the PGAI is not significantly different from zero over angles of incidence up to 45 degrees.

Figure 43A:
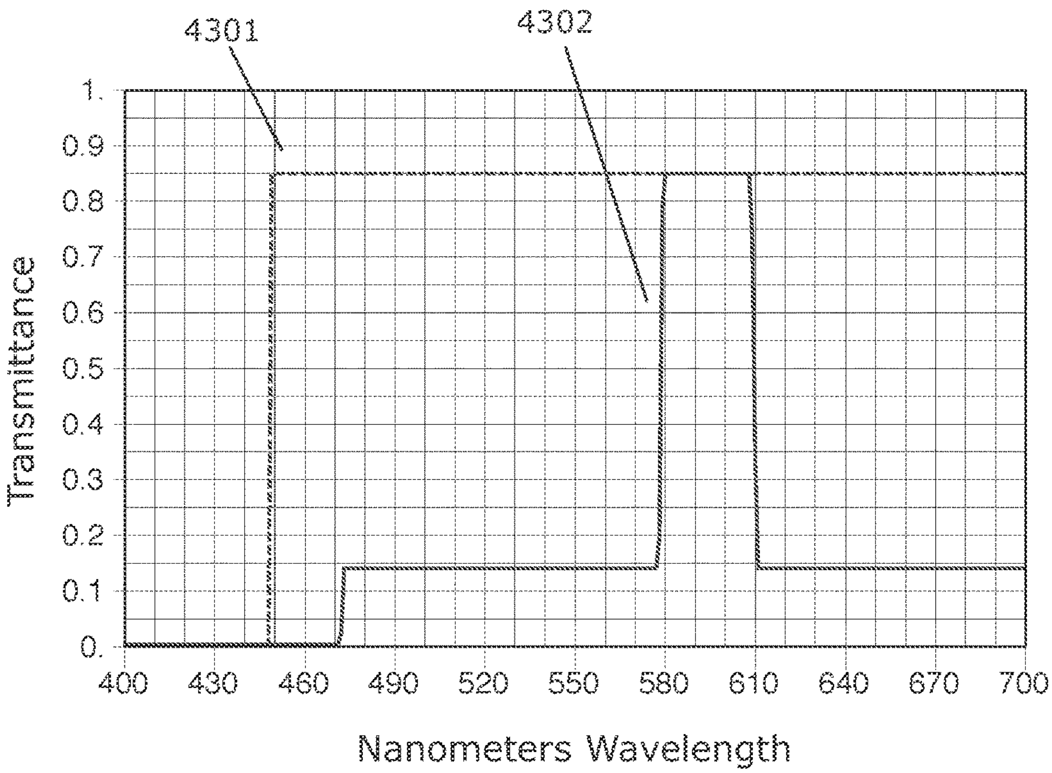
FIGS. 43A, 43B: Graph of spectral transmittance constraints for a filter that blocks short-wavelength light and passes 589 nanometer narrow band light.
Figure 43B:
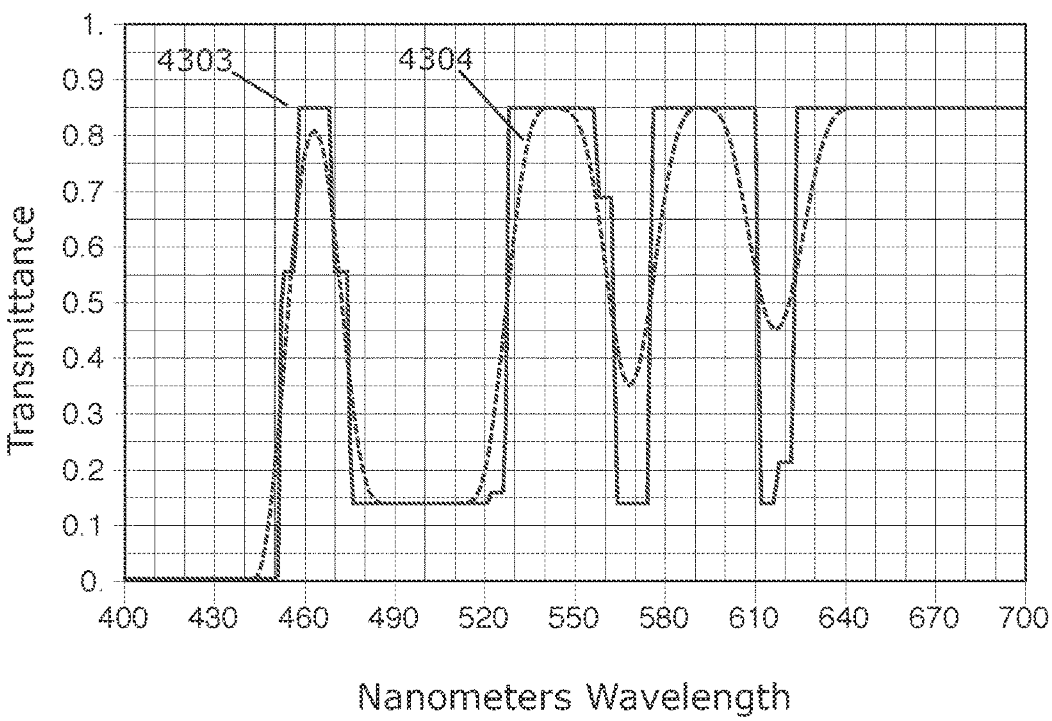

Further, as shown in the graph of FIG. 43A, the filter is compliant with the spectral minimum and maximum transmittance constraints shown at the solid curve 4302 and dashed curve 4301, respectively. The maximum spectral transmittance constraint provides that the designed filter does not transmit light having wavelengths below 450 nanometers. The minimum spectral transmittance constraint provides that the designed filter passes at least 15 percent transmittance over all stop-bands between 450 nanometers and 650 nanometers, and further that the designed filter passes the maximum possible portion of light having wavelength between 580 nanometers and 610 nanometers. The designed filter shown at the solid curve in FIG. 43B at 4303 (which is the same as that shown in FIG. 45A-45D), is compliant with the spectral transmittance constraints of FIG. 43A, and the smoothed filter shown at the dashed curve 4304 is sufficiently compliant with the constraints for the intended application; specifically, that the filter provides a high luminosity of artificial lights based on sodium vapor excitation that concentrate energy at around 589 nanometers, such as low pressure and high pressure sodium lamps, which are commonly used in street lighting.

Figure 19A:
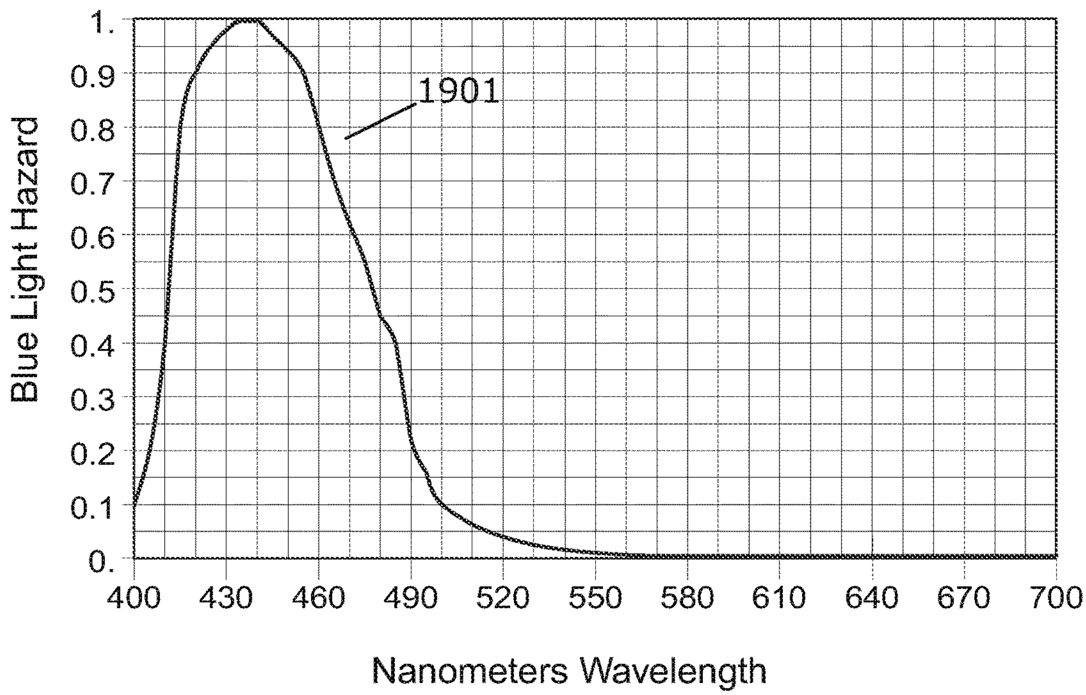
FIG. 19A, 19B: Graph of the blue light hazard function per wavelength (FIG. 19A), and graphs of the spectral transmittance of two multi-band filters that provide blue-blocking and a conventional cut-filter that provides blue-blocking (FIG. 19B).
Figure 19B:
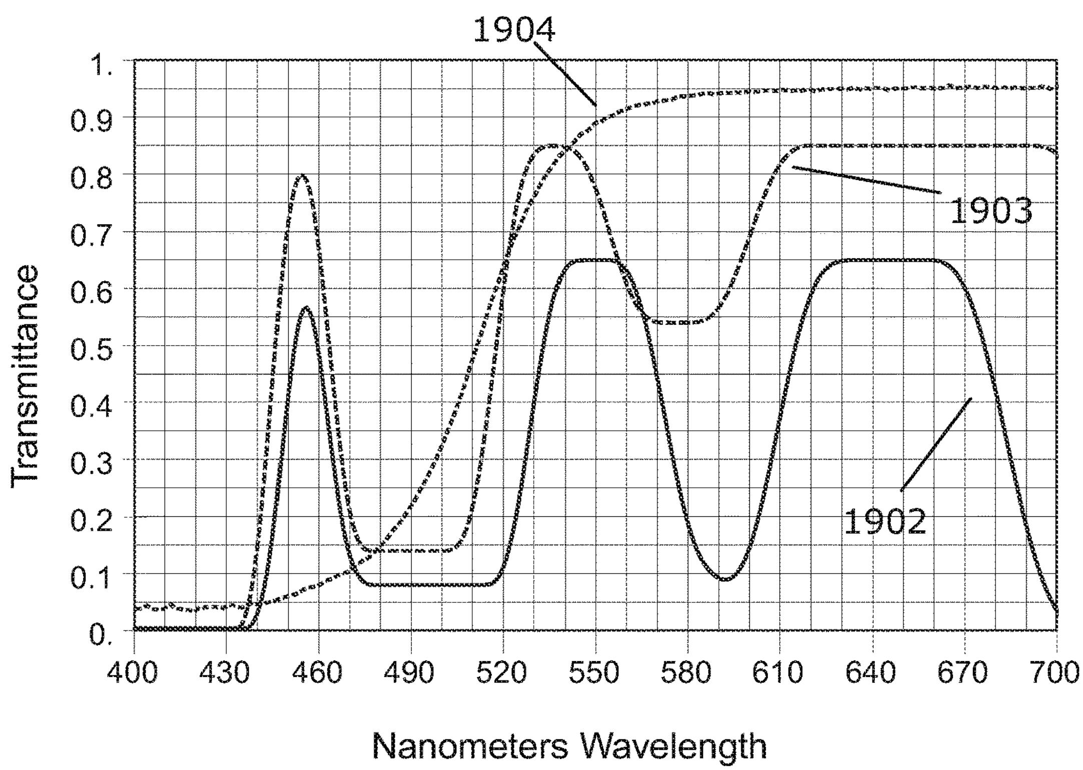
Figure 44A:
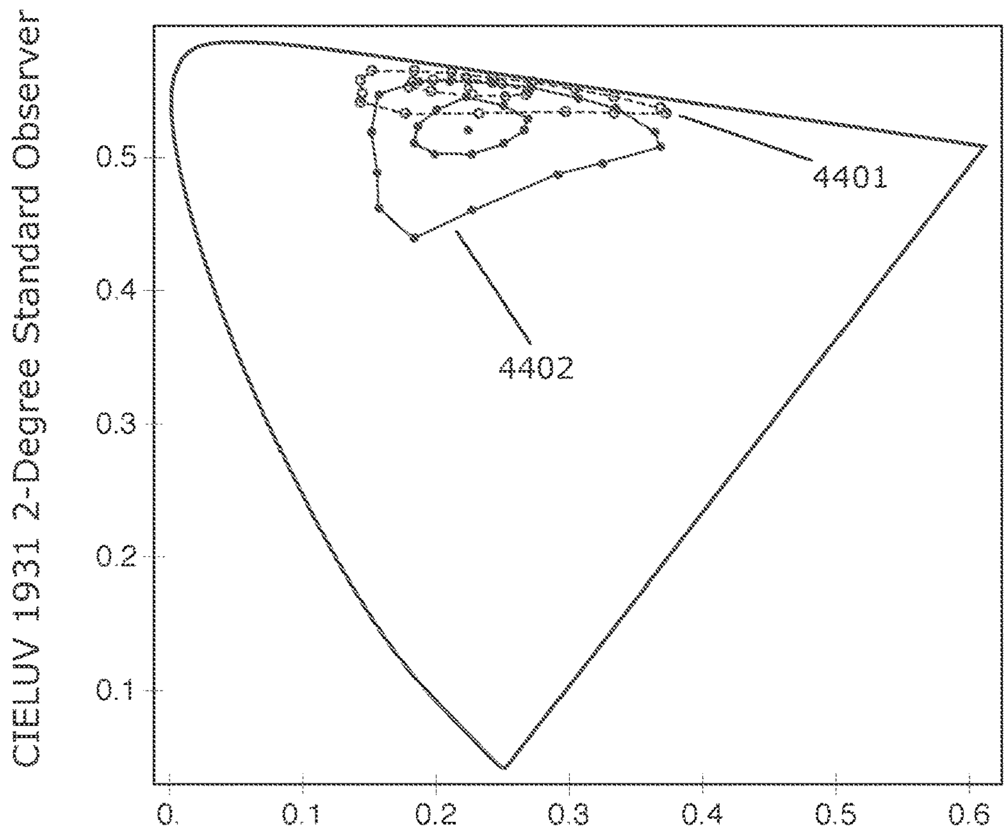
FIGS. 44A, 44B, 44C: Chromaticity diagram of the color appearance of selected Munsell colors under illumination by daylight as viewed through a blue-blocking multi-band filter and as viewed through blue-blocking cut filter (FIG. 44A), the spectral radiant flux of daylight (FIG. 44B), and graphs of the spectral transmittance of the filters (FIG. 44C).
Figure 44B:
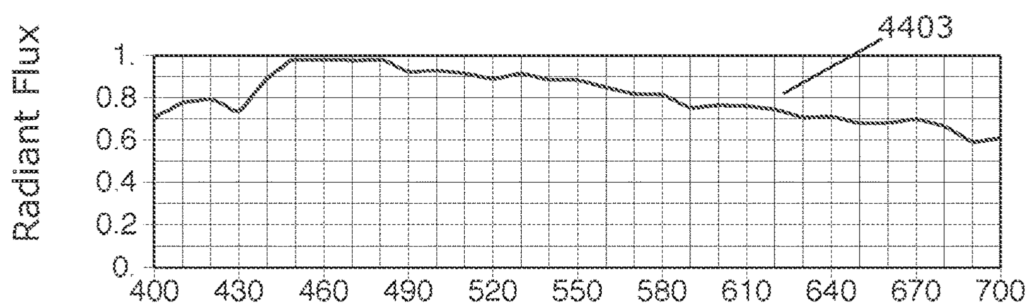
Figure 44C:
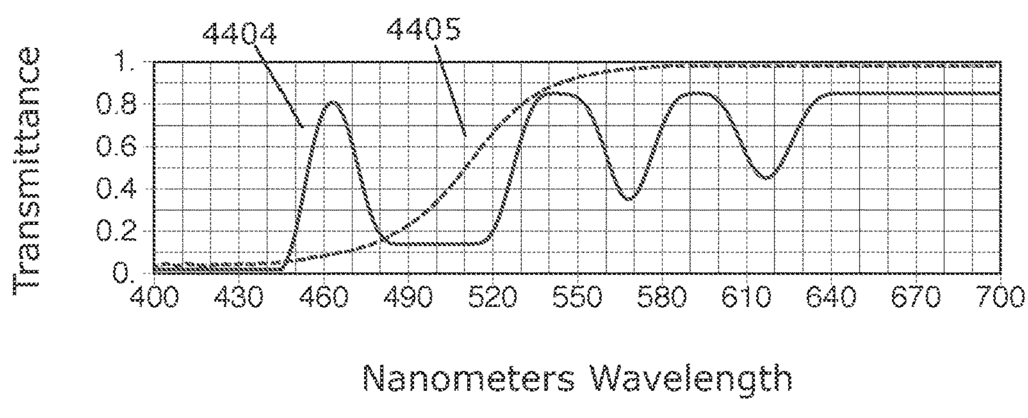

Short-wavelength blue light (e.g., at the near ultra-violet wavelengths between about 380 nanometers and about 450 nanometers) is associated with a range of visual phenomena generally referred to as glare, of which the contributing factors may include fluorescence (in particular of organic materials in the eye that are partially reactive to UV and near-UV light), dispersive scattering by light passing through the ocular media (in particular as the retinal physiology degrades from age-related effects), and chromatic aberration of the ocular lens (in particular that short-wavelength light is less precisely focused onto the retina). Therefore a filter that selectively inhibits the transmission of short-wavelength blue light may have utility for reducing glare and improving visual acuity. A standard blue-blocking filter (also called a cut-off filter) may be produced by incorporation of short-wavelength absorbers into a lens, for example as shown by the transmittance curve in FIG. 19B at dotted curve 1904. However, multi-band blue-blocking filters may provide improved color discrimination, for example shown by the transmittance curve in FIG. 19B at solid curve 1902 (providing about 35 percent luminous transmittance), dashed curve 1903 (providing about 60 percent luminous transmittance), as well as the filter design shown in FIGS. 45A and 43B. The color discrimination provided by such filters is shown in further detail in FIG. 44A-44C. The spectral transmittance of a conventional blue-blocking cut-off filter is shown at FIG. 44C at 4405, and of a blue-blocking multi-band filter at 4404. The color appearance of selected Munsell colors provided by the filters are shown in the chromaticity diagram of FIG. 44A including that provided by the cut-off filter at the dashed contours 4401, and by the multi-band filter at the solid contours 4402. The appearance of color provided by the cut-off filter is essentially dichromatic along the red-green axis, i.e., the contours are collapsed such that the blue-yellow axis of apparent dissimilarity has length zero. In comparison, the appearance of color provided by the multi-band filter is trichromatic (not collapsed).

Figure 46A:
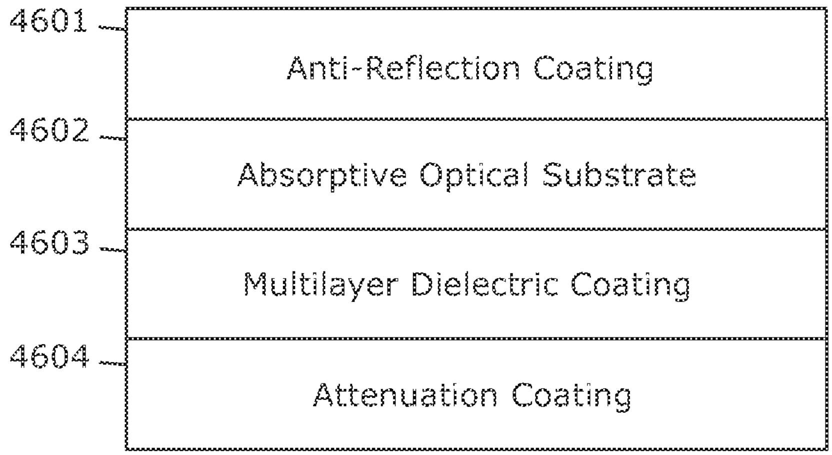
FIGS. 46A, 46B: Schematic diagram of a composite filter containing an interference filter and absorptive filters where the absorptive filters attenuate light reflected by the interference filter (FIG. 46A), and a diagram showing the operation of the composite filter incorporated into eyewear (FIG. 46B).
Figure 46B:
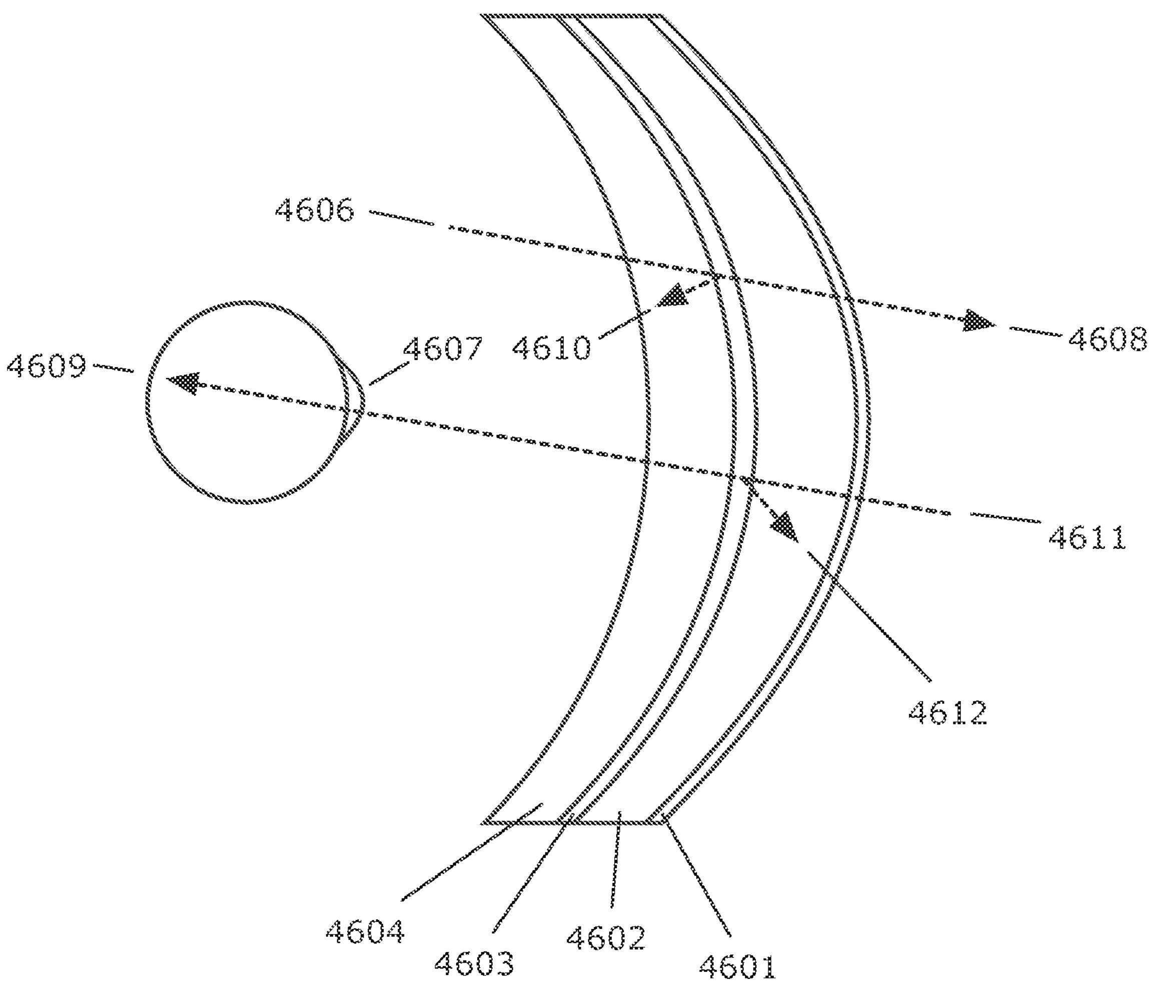

An example configuration of a lens incorporating an attenuation coating and an absorptive optical substrate is depicted in FIG. 46A and FIG. 46B, where the layers (from front to back) are anti-reflection coating 4601, absorptive optical substrate (e.g., glass containing neodymium) 4602, multilayer interference coating 4604, and attenuation coating 4605.

In FIG. 46B, light incident to the outside of the lens is shown along the arrow at 4611. The incident light passes through the anti-reflection coating and the absorptive optical substrate, and then is split by the interference filter into a transmitted component which is eventually received by the eye 4607 and absorbed by the retina 4609, and a reflected component 4612 which travels back toward the light source but is further absorbed during the second pass through the first attenuation coating. Still referring to FIG. 46B, a similar process of reflection-absorption may occur for stray light entering the back side of the lens as shown along the ray at 4606, resulting in the absorption of reflected light 4610 before it reaches the eye. In some examples the attenuation coating is interleaved, or partially interleaved with the dielectric layers of the interference coating.

Figure 47A:
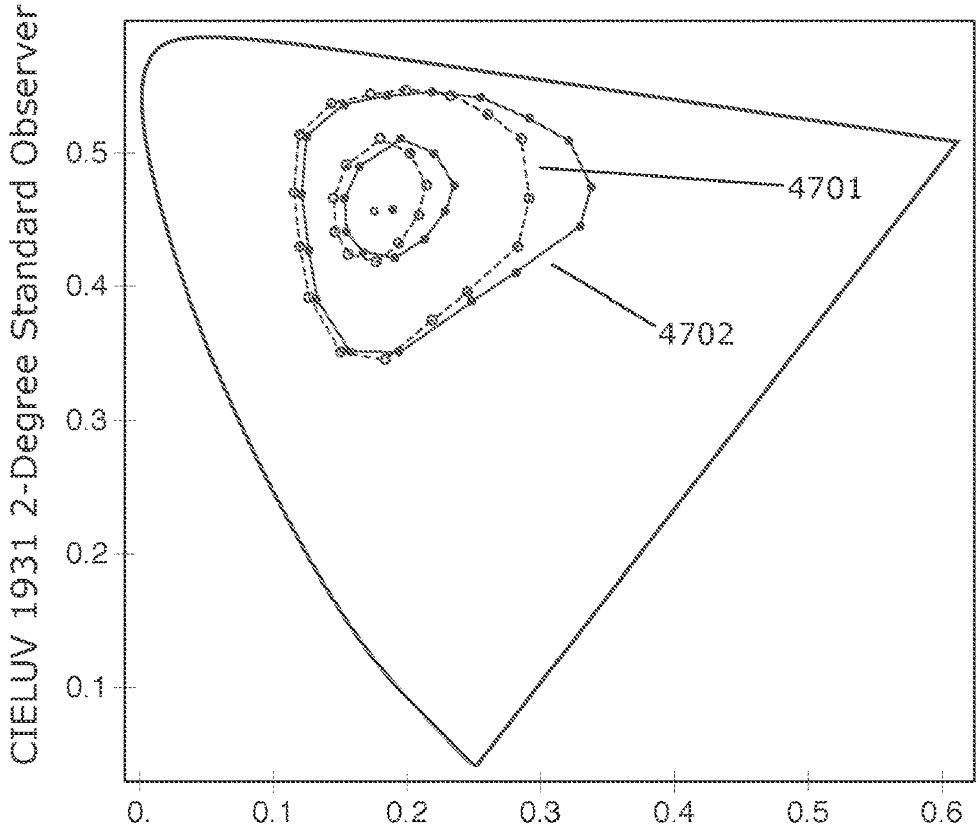
FIGS. 47A, 47B, 47C: Chromaticity diagram of the color appearance of selected Munsell colors under illumination by daylight as viewed through a reference filter and as viewed through a neodymium glass filter (FIG. 47A), the spectral radiant flux of daylight (FIG. 47B), and graphs of the spectral transmittance of the filters (FIG. 47C).
Figure 47B:
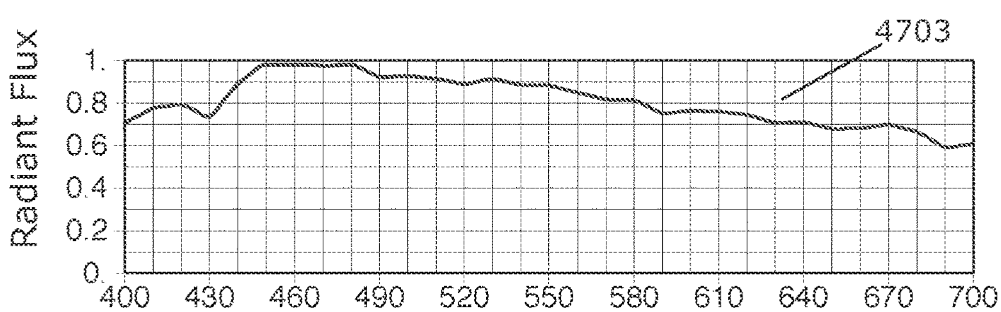
Figure 47C:
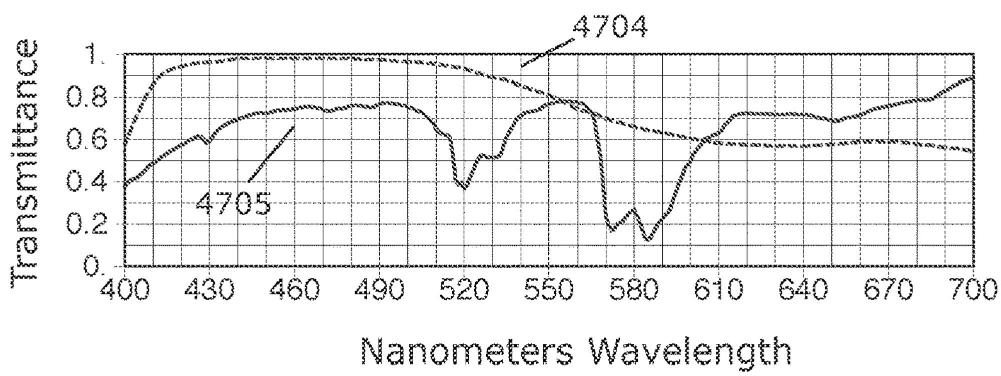
Figure 48A:
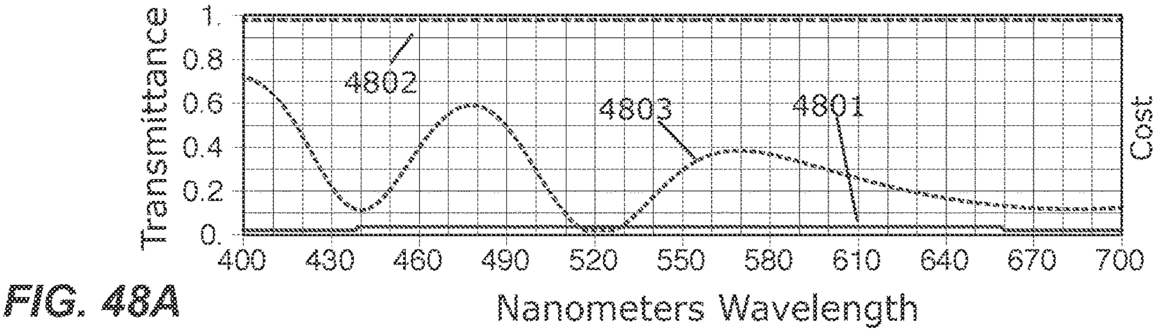
FIGS. 48A, 48B, 48C, 48D, 48E: Graph of the transmittance constraints and cost function used to design a neodymium-containing filter for enhancing red-green color discrimination for a normal observer and providing stable color appearance over a range of angles of incidence (FIG. 48A). Graph of the spectral transmittance of components of the filter (FIG. 48B). Graph of a manufacturing specification for the filter (FIG. 48C). Graph of the percent gamut area increase with respect to the Farnsworth D-15 reference colors and with respect to selected natural world reference colors provided by the filter per degree angle of incidence (FIG. 48D). Graph of white-point shift of daylight provided by the filter per degree angle of incidence (FIG. 48E).
Figure 48B:
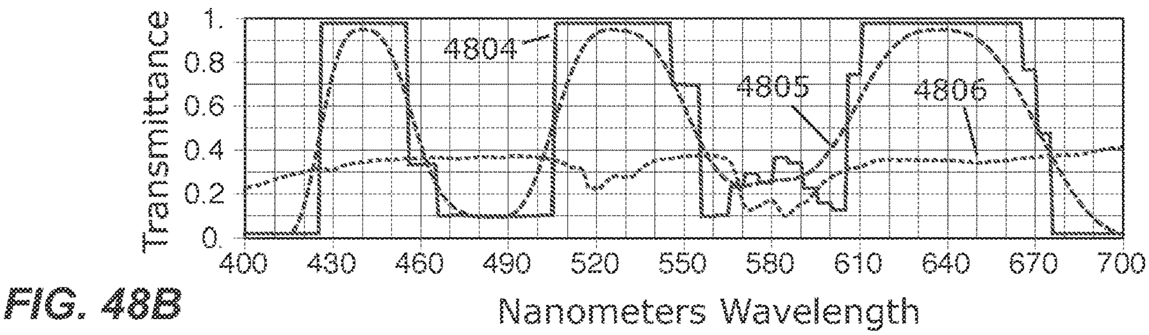
Figure 48C:
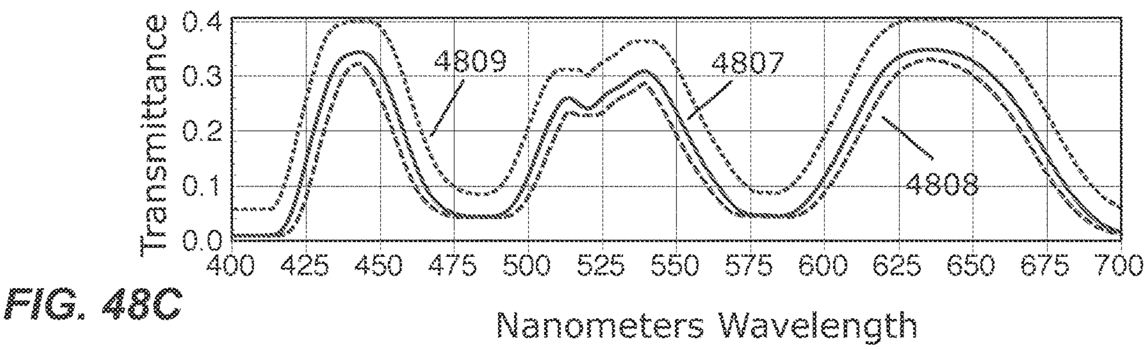
Figure 48D:
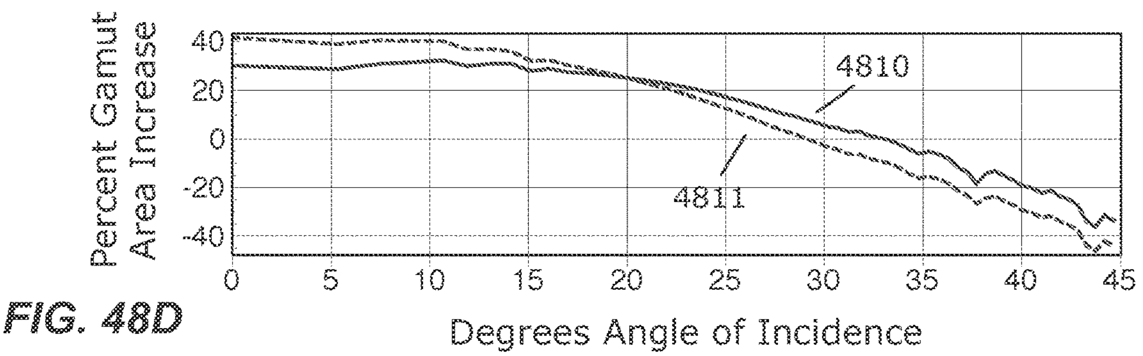
Figure 48E:
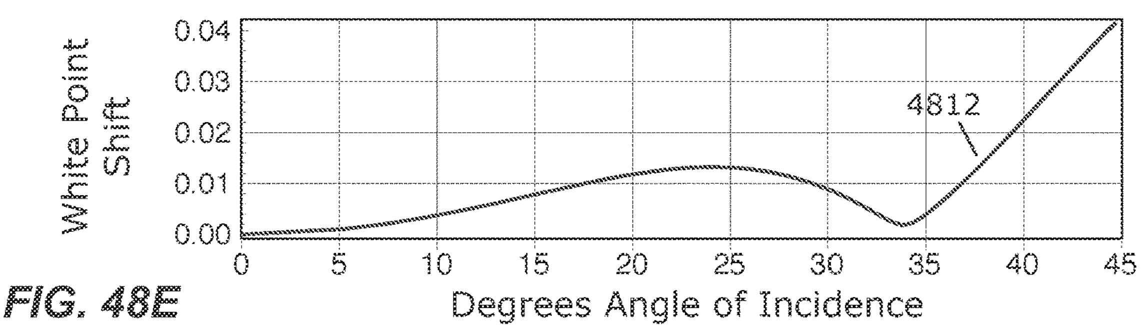
Figure 49A:
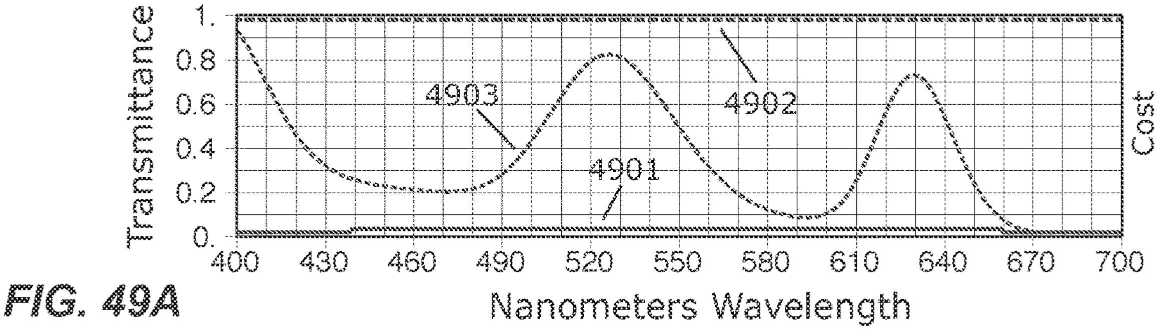
FIGS. 49A, 49B, 49C, 49D, 49E: Graph of the transmittance constraints and cost function used to design a neodymium-containing filter for enhancing blue-yellow color discrimination for a normal observer and providing stable color appearance over a range of angles of incidence (FIG. 49A). Graph of the spectral transmittance of components of the filter (FIG. 49B). Graph of a manufacturing specification for the filter (FIG. 49C). Graph of the percent gamut area increase with respect to the Farnsworth D-15 reference colors and with respect to selected natural world reference colors provided by the filter per degree angle of incidence (FIG. 49D). Graph of white-point shift of daylight provided by the filter per degree angle of incidence (FIG. 49E).
Figure 49B:
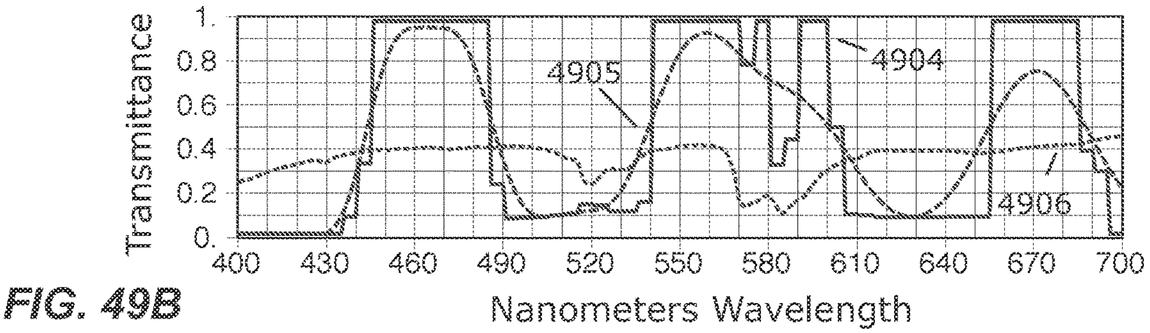
Figure 49C:
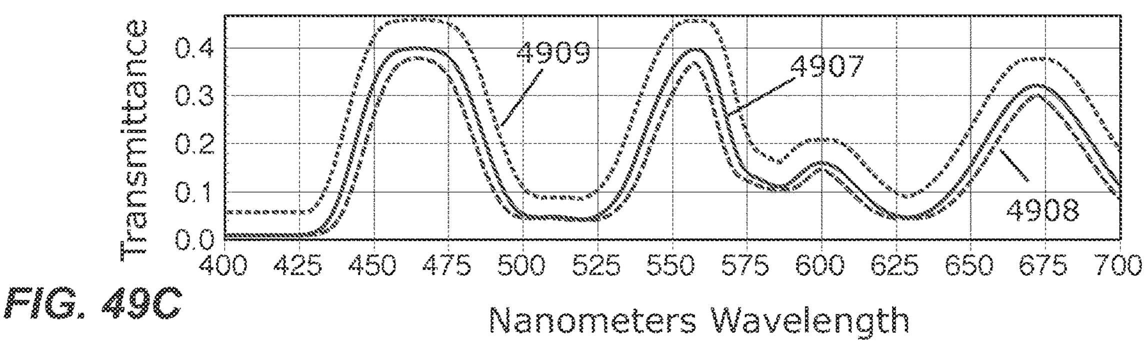
Figure 49D:
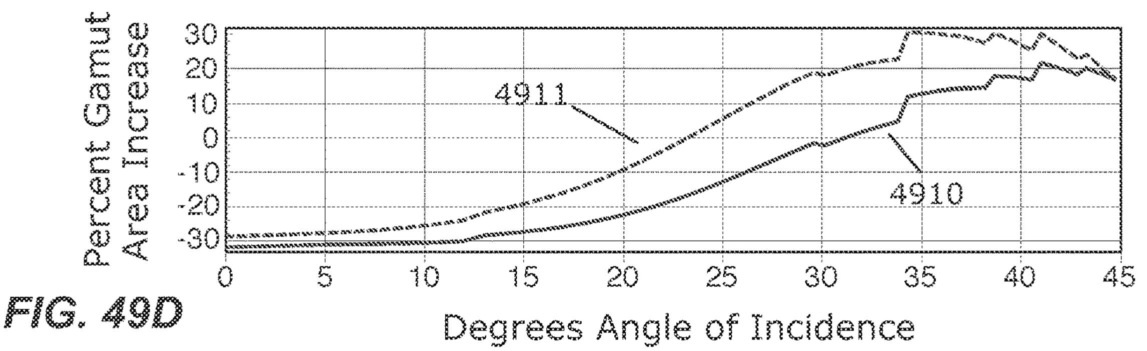
Figure 49E:
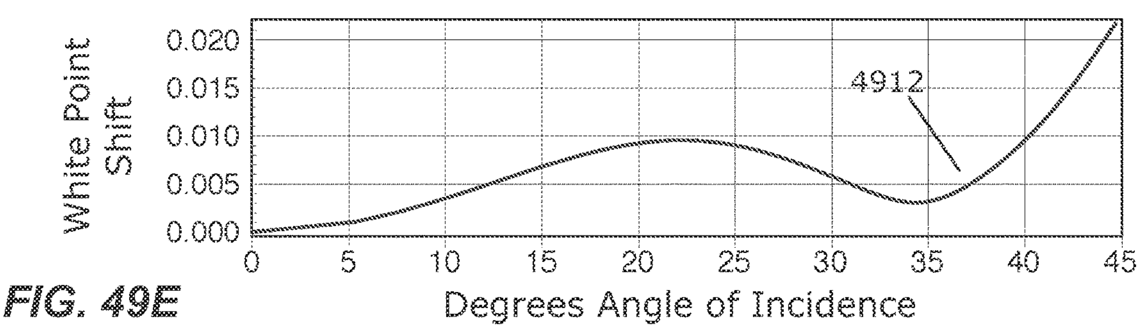
Figure 50A:
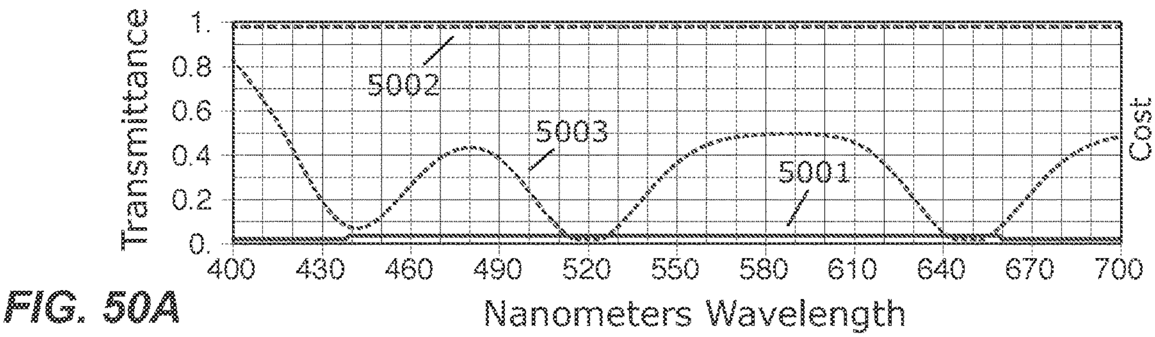
FIGS. 50A, 50B, 50C, 50D, 50E: Graph of the transmittance constraints and cost function used to design a neodymium-containing filter for enhancing red-green color discrimination for an observer with mild deuteranomaly and providing stable color appearance over a range of angles of incidence (FIG. 50A). Graph of the spectral transmittance of components of the filter (FIG. 50B). Graph of a manufacturing specification for the filter (FIG. 50C). Graph of the percent gamut area increase with respect to the Farnsworth D-15 reference colors and with respect to selected natural world reference colors provided by the filter per degree angle of incidence (FIG. 50D). Graph of white-point shift of daylight provided by the filter per degree angle of incidence (FIG. 50E).
Figure 50B:
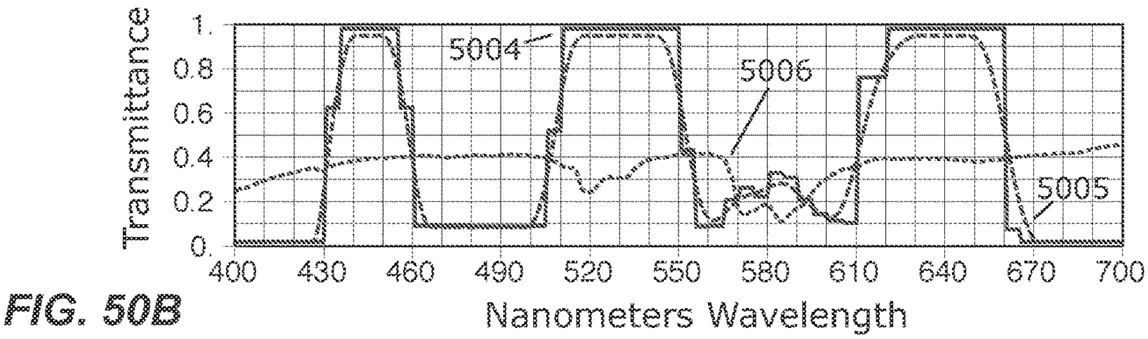
Figure 50C:
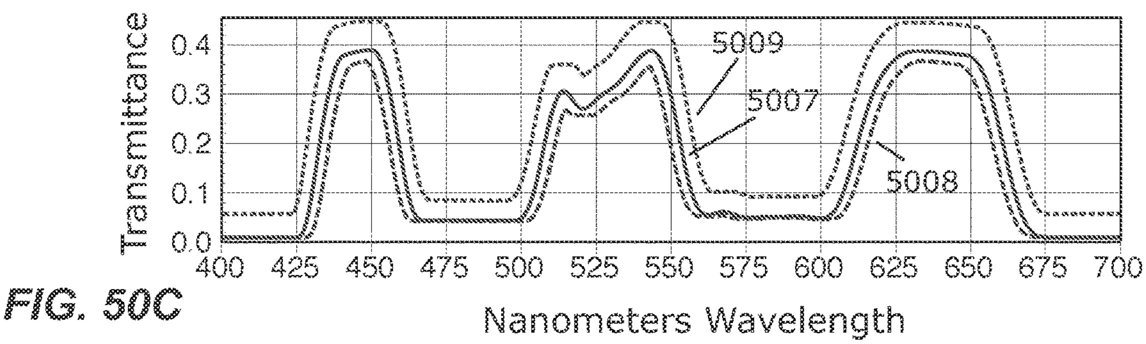
Figure 50D:
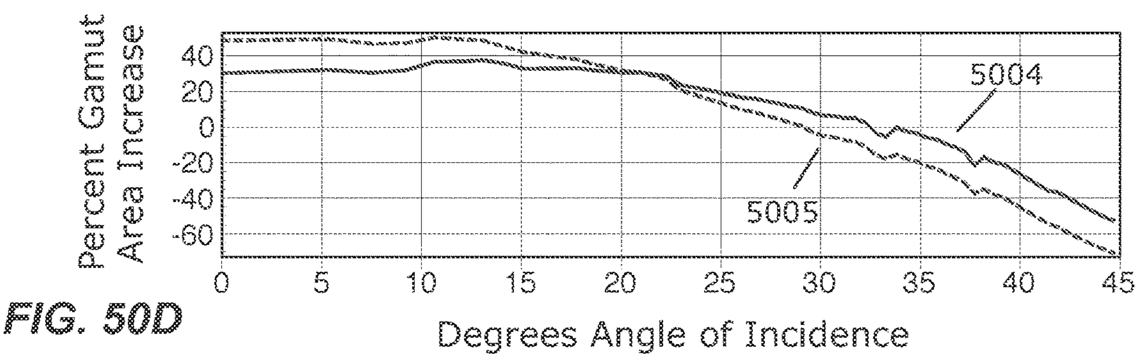
Figure 50E:
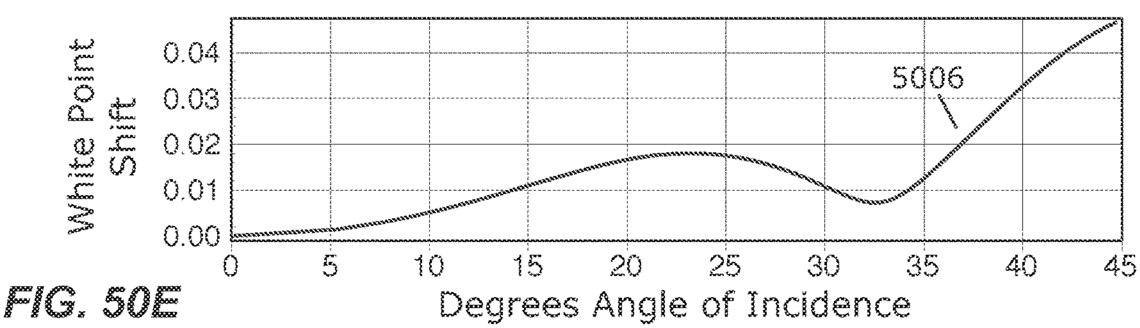
Figure 51A:
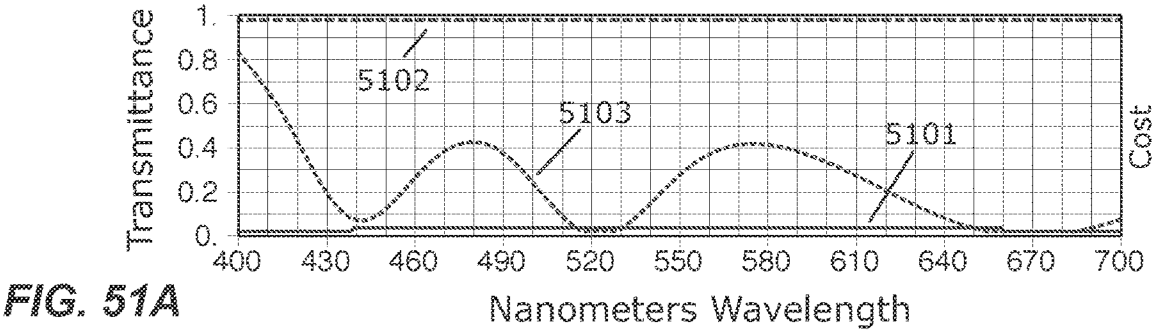
FIGS. 51A, 51B, 51C, 51D, 51E: Graph of the transmittance constraints and cost function used to design a neodymium-containing filter for enhancing red-green color discrimination for an observer with moderate deuteranomaly and providing stable color appearance over a range of angles of incidence (FIG. 51A). Graph of the spectral transmittance of components of the filter (FIG. 51B). Graph of a manufacturing specification for the filter (FIG. 51C). Graph of the percent gamut area increase with respect to the Farnsworth D-15 reference colors and with respect to selected natural world reference colors provided by the filter per degree angle of incidence (FIG. 51D). Graph of white-point shift of daylight provided by the filter per degree angle of incidence (FIG. 51E).
Figure 51B:
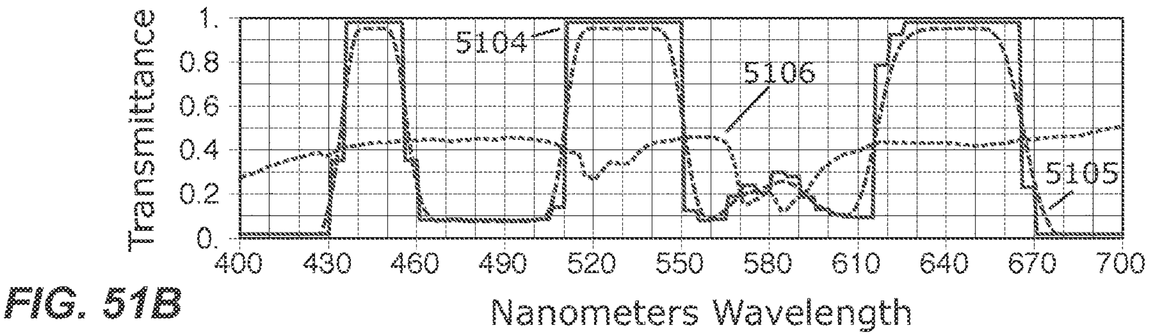
Figure 51C:
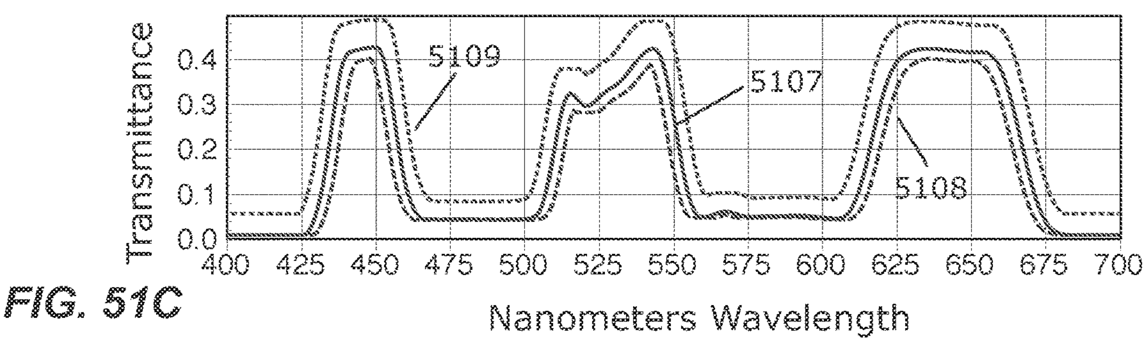
Figure 51D:
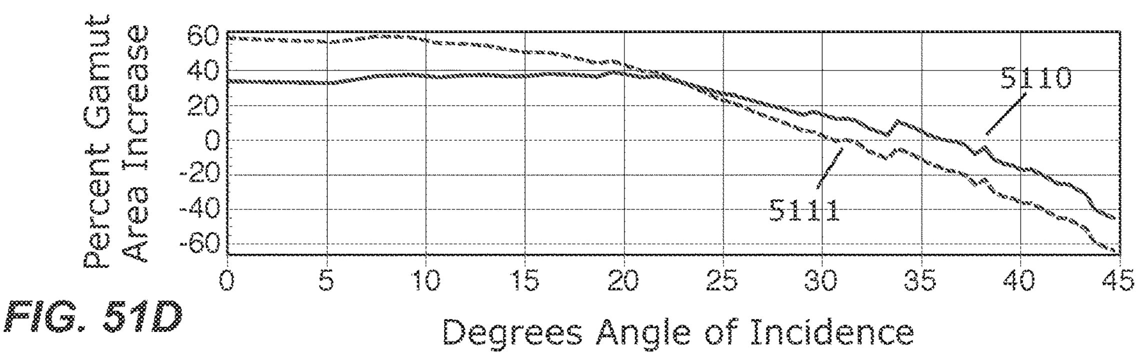
Figure 51E:
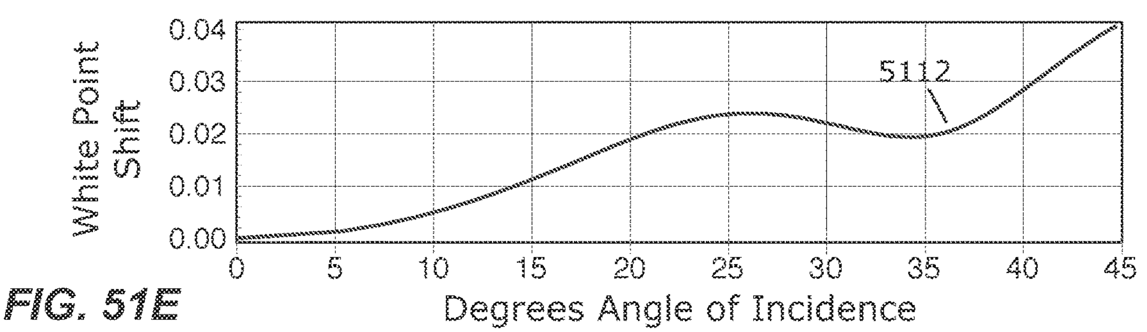
Figure 52A:
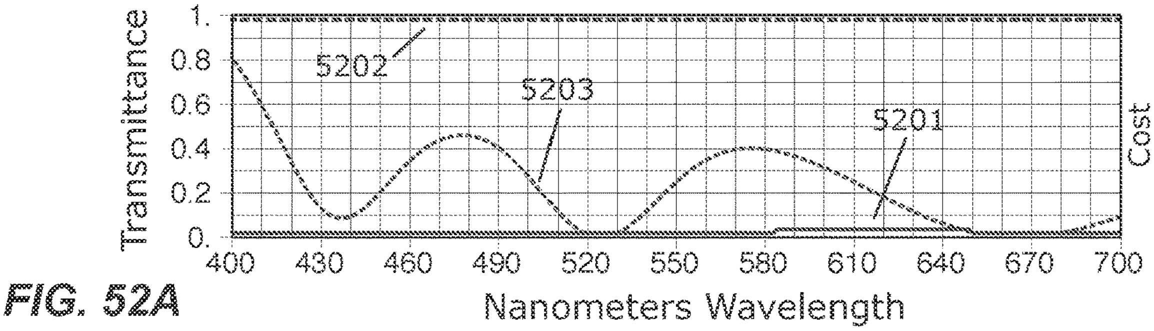
FIGS. 52A, 52B, 52C, 52D, 52E: Graph of the transmittance constraints and cost function used to design a neodymium-containing filter for enhancing red-green color discrimination for an observer with severe deuteranomaly and providing stable color appearance over a range of angles of incidence (FIG. 52A). Graph of the spectral transmittance of components of the filter (FIG. 52B). Graph of a manufacturing specification for the filter (FIG. 52C). Graph of the percent gamut area increase with respect to the Farnsworth D-15 reference colors and with respect to selected natural world reference colors provided by the filter per degree angle of incidence (FIG. 52D). Graph of white-point shift of daylight provided by the filter per degree angle of incidence (FIG. 52E).
Figure 52B:
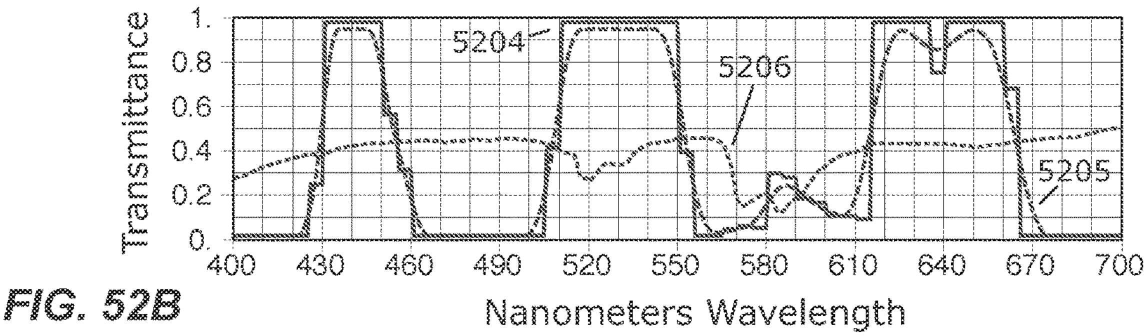
Figure 52C:
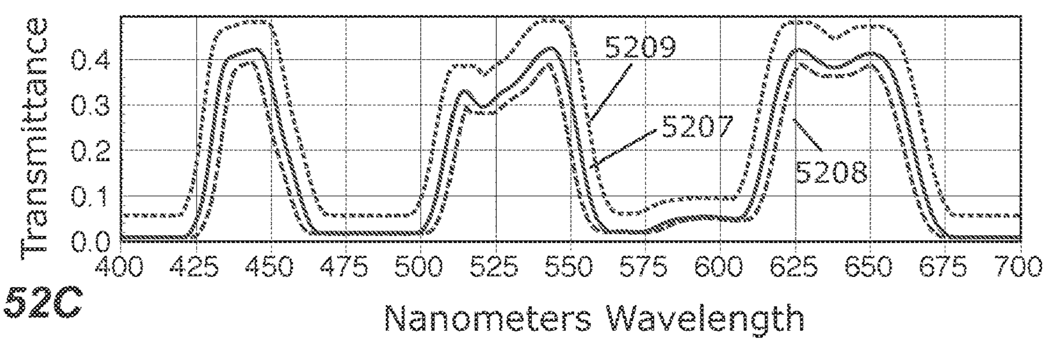
Figure 52D:
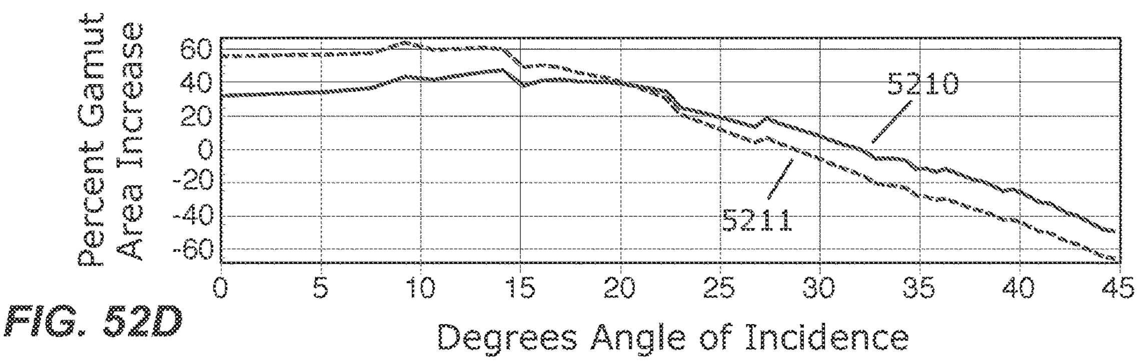
Figure 52E:
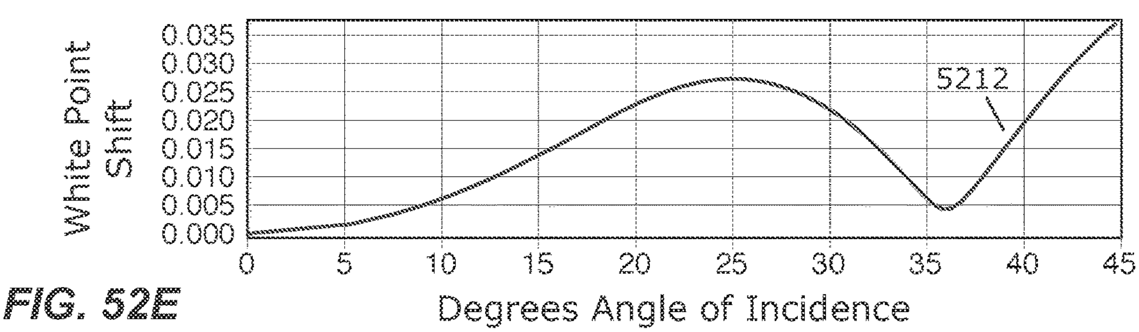
Figure 53A:
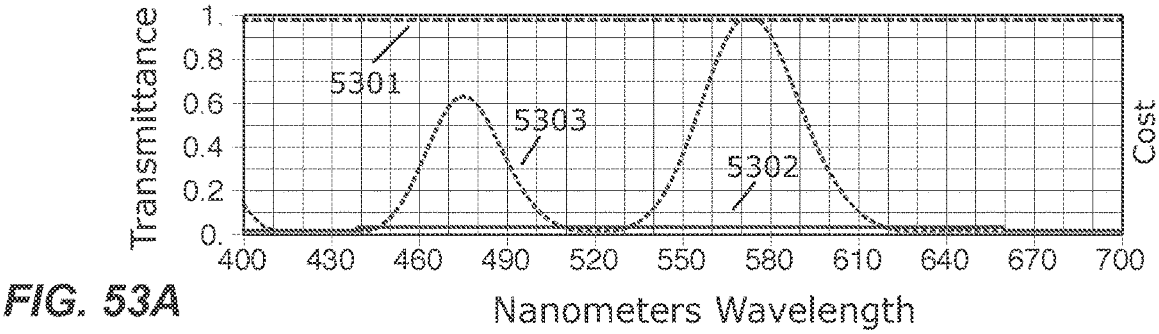
FIGS. 53A, 53B, 53C, 53D, 53E: Graph of the transmittance constraints and cost function used to design a neodymium-containing filter for enhancing red-green color discrimination for an observer with protanomaly and providing stable color appearance over a range of angles of incidence (FIG. 53A). Graph of the spectral transmittance of components of the filter (FIG. 53B). Graph of a manufacturing specification for the filter (FIG. 53C). Graph of the percent gamut area increase with respect to the Farnsworth D-15 reference colors and with respect to selected natural world reference colors provided by the filter per degree angle of incidence (FIG. 53D). Graph of white-point shift of daylight provided by the filter per degree angle of incidence (FIG. 53E).
Figure 53B:
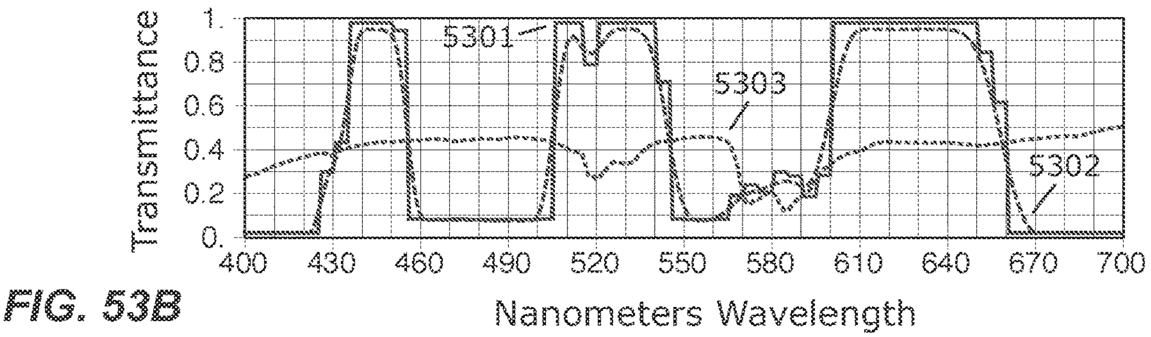
Figure 53C:
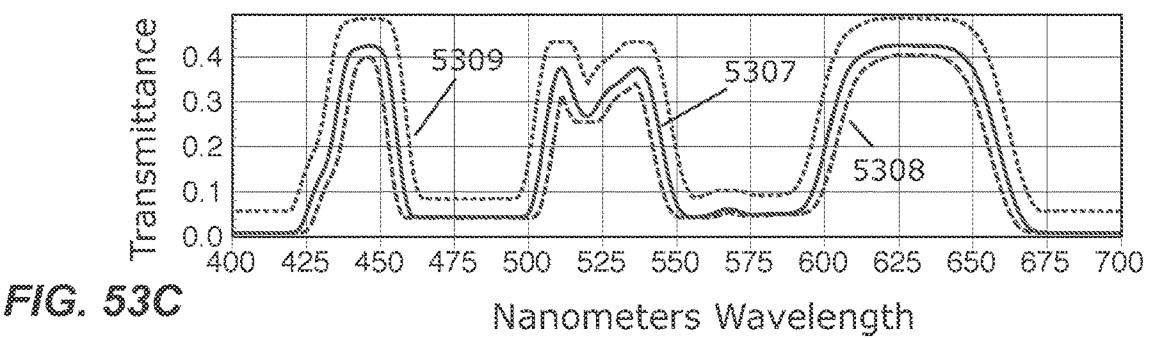
Figure 53D:
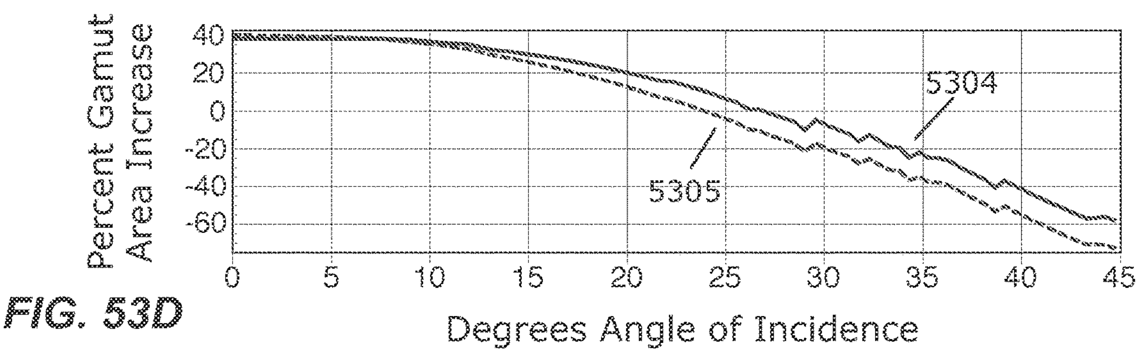
Figure 53E:
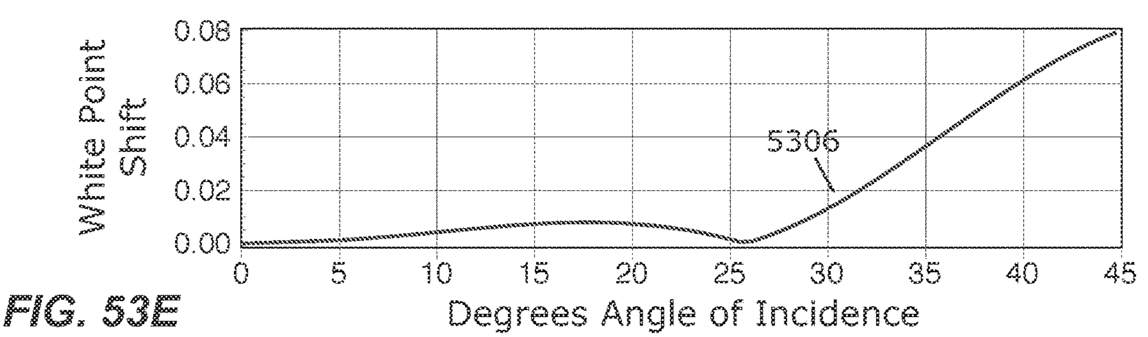

Glass lenses containing neodymium are known to provide a mild enhancement to color discrimination. For example the spectral transmittance of a 1.5 millimeter thick ACE Improved lens (manufactured by Barberini GmbH) is shown by the solid curve 4705 in FIG. 47C. The color discrimination property of the filter may be analyzed by comparison against a best-fit reference filter Munsell 7.5B 8/4, which is given by the spectral transmittance curve at 4704 in FIG. 47C. The appearance of selected Munsell colors provided by the ACE Improved lens are shown along the solid contours in the chromaticity diagram of FIG. 47A at 4702, and the appearance of the selected Munsell colors of the reference filter are shown along the dashed contours at 4701. The neodymium-containing filter produces an increase in gamut area enclosed by the contours. However the increase is primarily concentrated around the reddish color samples which is not balanced by an increase in apparent purity of greenish color samples. More preferably, a lens comprising neodymium may be used as the optical substrate for deposition of an interference filter and/or attenuation coatings, for example as described in FIGS. 46A and 46B. The resulting composite filter may then provide the pass-bands and stop-bands by configuration of the interference filter to operation in conjunction with the narrow-band absorptive filter. Such composite filters may be designed using the method of linear programming as disclosed herein by appropriate configuration of the pre-filter p with the spectral transmittance of the optical substrate to be used in the construction. Such composite filters may provide, on average, better performance by the PGAI or $PGAI_{IW}$ measures and are generally less sensitive to changes in angle of incidence when compared to multi-band filters having pass-bands provided by interference filtering alone.

Several embodiments of filter designs incorporating a neodymium-containing absorptive element are disclosed hereafter along with detailed description of FIGS. 48A-53E and additionally in FIGS. 57A-57E. All of these embodiments represent variations on previously disclosed embodiments, and thus do not require significant additional detailed discussion. A general observation regarding such variations is that multi-band filters containing neodymium may offer a somewhat improved angular width of the field of view within which color enhancement is provided. For example, for an embodiment comprising only absorptive filters of the neutral density type wherein the PGAI is greater than zero up to about 25 degrees, the variation on such a filter additionally comprising neodymium may provide a PGAI greater than zero up to about 30 degrees. However such variations tend to incur compromise in other areas, for example in some variations the ophthalmic lens incorporating such a filter may have a greater luminous reflectance on the side of the lens towards the eye.

A first embodiment of a filter incorporating a neodymium absorptive element, which is a variation on the design shown in FIGS. 33A-33E, is disclosed in FIGS. 48A-48E and corresponding tables in FIGS. 72A, 72B-1, and 72B-2. The filter provides increased red-green color discrimination for normal observers. The variation provides a wider field of view by about 5 degrees within which the color enhancement is effective. However, the importance-weighted percent gamut area increase is substantially identical between the variation and its related embodiment.

A further embodiment of a filter incorporating a neodymium absorptive element, which is a variation on the design shown in FIGS. 34A-34E, is disclosed in FIGS. 49A-49E and corresponding tables in FIGS. 73A, 73B-1, and 73B-2. The filter provides increased blue-yellow color discrimination for normal observers. The variation provides a wider field of view by about 5 degrees within which the color enhancement is effective. However, the importance-weighted percent gamut area increase is substantially identical between the variation and its related embodiment.

A further embodiment of a filter incorporating a neodymium absorptive element, which is a variation on the design shown in FIGS. 36A-36E, is disclosed in FIGS. 50A-50E and corresponding tables in FIGS. 74A, 74B-1, and 74B-2. The filter provides increased red-green color discrimination for observers with mild deuteranomaly. The variation provides a wider field of view by about 5 degrees within which the color enhancement is effective. However, the importance-weighted percent gamut area increase is substantially identical between the variation and its related embodiment.

A further embodiment of a filter incorporating a neodymium absorptive element, which is a variation on the design shown in FIGS. 37A-37E, is disclosed in FIGS. 51A-51E and corresponding tables in FIGS. 75A, 75B-1, and 75B-2. The filter provides increased red-green color discrimination for observers with moderate deuteranomaly. The variation provides a wider field of view by about 5 degrees within which the color enhancement is effective. However, the importance-weighted percent gamut area increase is substantially identical between the variation and its related embodiment.

A further embodiment of a filter incorporating a neodymium absorptive element, which is a variation on the design shown in FIGS. 38A-38E, is disclosed in FIGS. 52A-52E and corresponding tables in FIGS. 76A, 76B-1, and 76B-2. The filter provides increased red-green color discrimination for observers with severe deuteranomaly. The variation provides a wider field of view by about 5 degrees within which the color enhancement is effective. However the importance-weighted percent gamut area increase is substantially identical between the variation and its related embodiment.

A further embodiment of a filter incorporating a neodymium absorptive element, which is a variation on the design shown in FIGS. 39A-39E, is disclosed in FIGS. 53A-53E and corresponding tables in FIGS. 77A, 77B-1, and 77B-2. The filter provides increased red-green color discrimination for observers with protanomaly. The variation provides a substantially improved color discrimination function, which is due to the optimal positioning of the primary absorption band providing favorable conditions with respect to the shift stability constraints, whereby the long wavelength pass-band can be effectively red-shifted by about 10 nanometers, thereby widening the spectral aperture without compromising other design criteria.

Figure 54A:
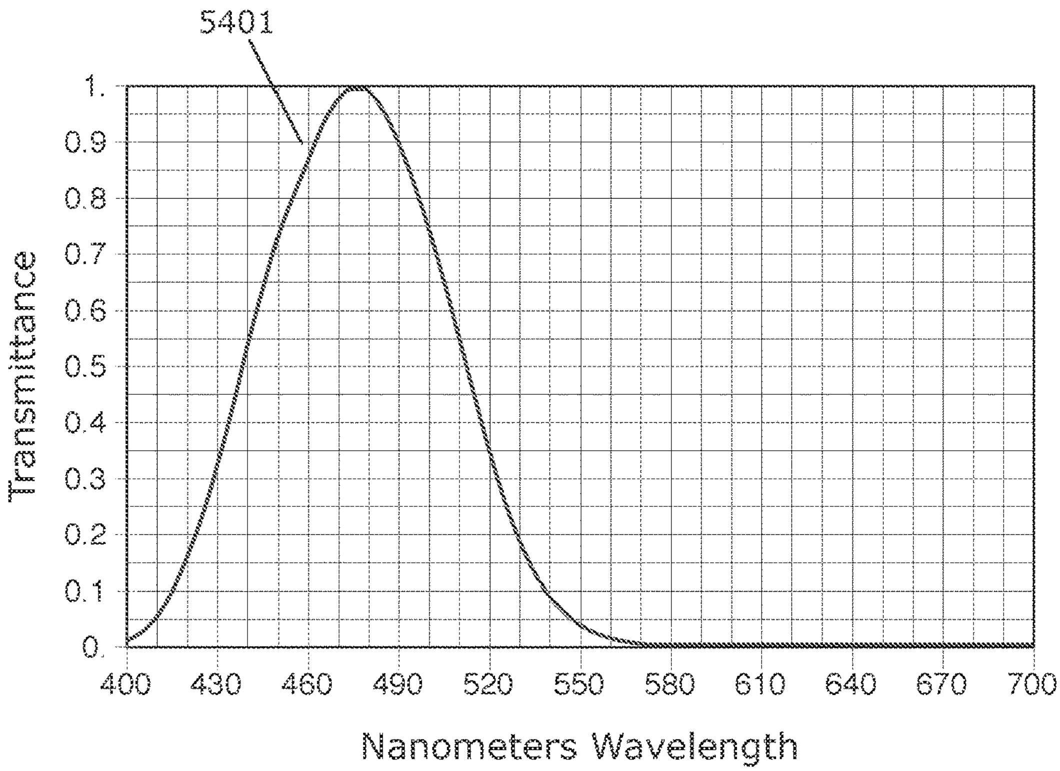
FIGS. 54A, 54B: Graph of approximate spectral absorptance of the retinal ganglion cell.
Figure 54B:
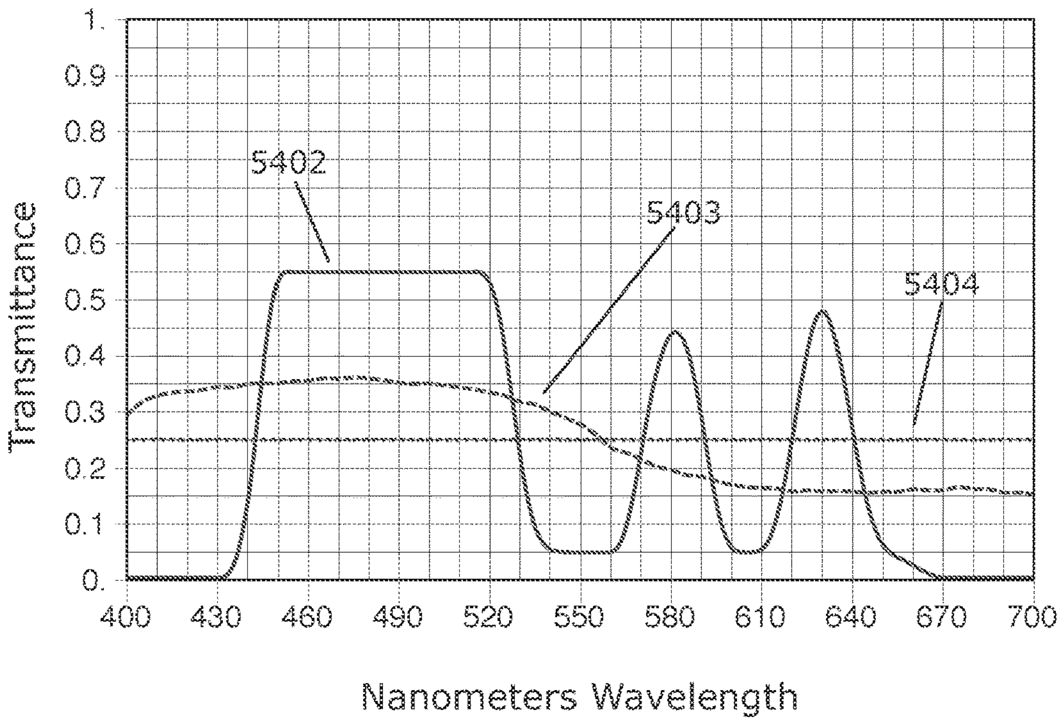

A further application of multi-band filters considers their utility in increasing the absorption of blue and cyan light by the eye. In particular the reception of light between about 450 nanometers and about 490 nanometers may stimulate the retinal ganglion cells. These cells are not involved in color vision, but rather in the suppression of melatonin and the synchronization of circadian rhythms to the phases of daylight. Reception of such light may have therapeutic benefit, for example in treating of seasonal affective disorder, sleep disorders and other health issues. An estimated spectral absorption of the retinal ganglion cell is shown in FIG. 54A at 5401, wherein the absorption profile is derived by shifting a retinal photopigment template to a peak wavelength of about 480 nanometers. To better understand the effect of filters on the energetic stimulation of the ganglion cell, the examples shown in the graph of FIG. 54B are instructive. Firstly, a neutral density filter as shown at 5404 has essentially no effect on ganglion cell absorption—for a reasonable range of such luminous transmittance of a filter, for example between about 20 percent and about 100 percent, the dilation or contraction of the pupil ensures that the amount of light (i.e., number of photons per second) reaching the retina is approximately constant (for example the area ratio between a open pupil and a small pupil is about 5:1). A broad-band blue-tinted filter, for example as shown at 5403, has a mean transmittance between about 460 nanometers and about 490 nanometers that is greater than the luminous transmittance of the filter. The luminosity of light (e.g. daylight) affects pupil dilation, and whereas the luminous sensitivity is greatest at about 555 nanometers, and the retinal ganglion cell absorptance is greatest between about 460 nanometers and about 490 nanometers, it follows that a filter that substantially transmits more light at around 480 nanometers relative to the transmittance at around 555 nanometers may cause the pupil to dilate so that the number of photons absorbed by the ganglion cells is increased. However, broad-band filters such as the blue-tinted example shown do not provide a substantial gain. Such blue tinted filters may improve ganglion cell stimulation by about 30 percent. However, the increase can be substantially increased by a multi-band filter, for example as shown at 5402. Such a filter may improve ganglion cell stimulation by up to about 80 percent.

Figure 55A:
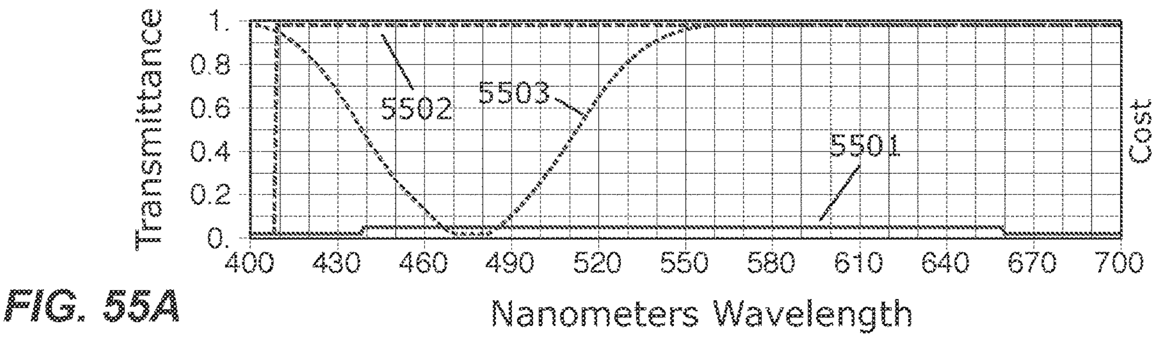
FIGS. 55A, 55B, 55C, 55D, 55E: Graph of the transmittance constraints and cost function used to design a filter for enhancing reception of optical power by the retinal ganglion cells (FIG. 55A). Graph of the spectral transmittance of components of the filter (FIG. 55B). Graph of a manufacturing specification for the filter (FIG. 55C). Graph of the percent gamut area increase with respect to the Farnsworth D-15 reference colors and with respect to selected natural world reference colors provided by the filter per degree angle of incidence (FIG. 55D). Graph of white-point shift of daylight provided by the filter per degree angle of incidence (FIG. 55E).
Figure 55B:
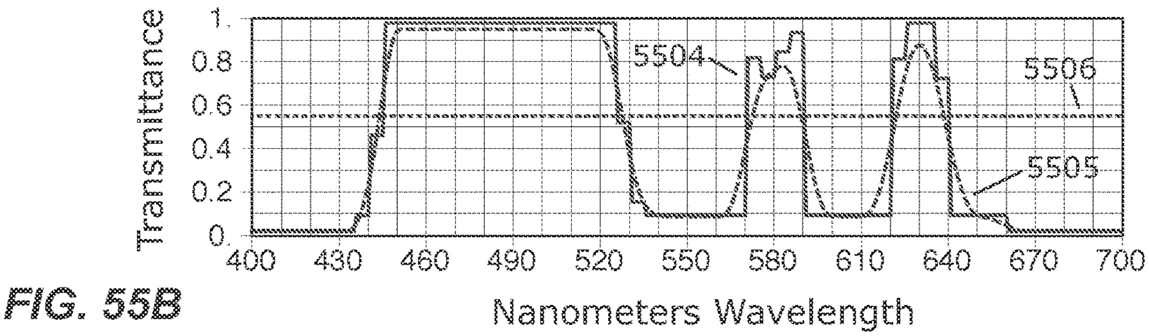
Figure 55C:
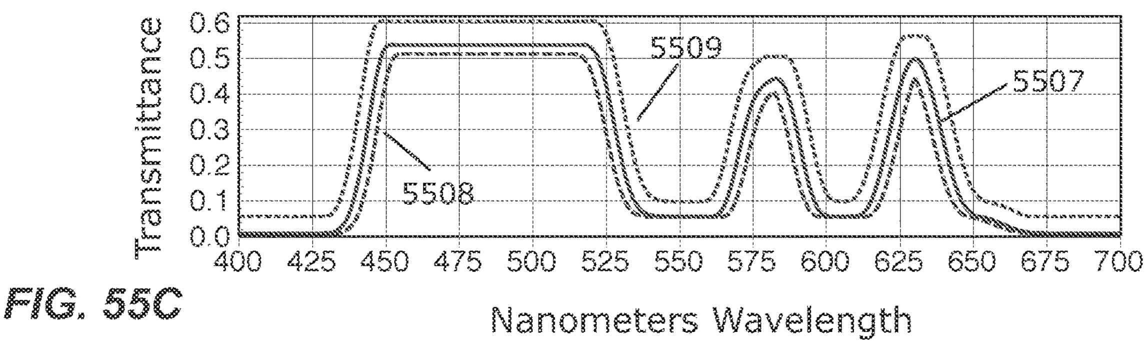
Figure 55D:
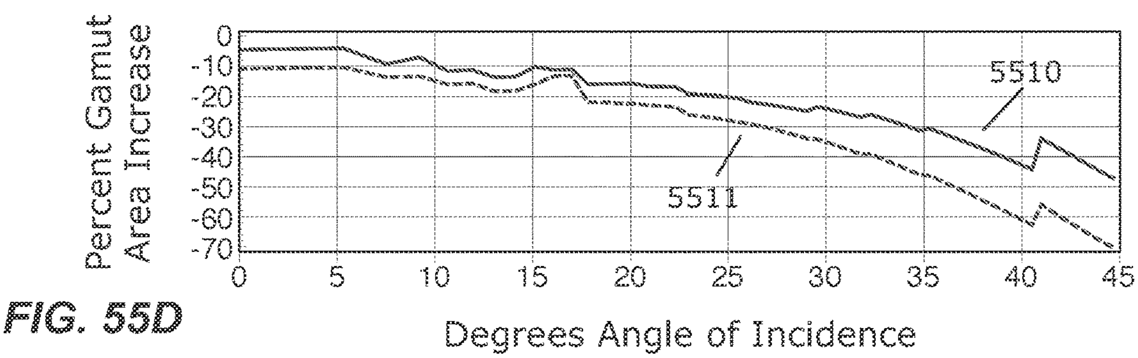
Figure 55E:
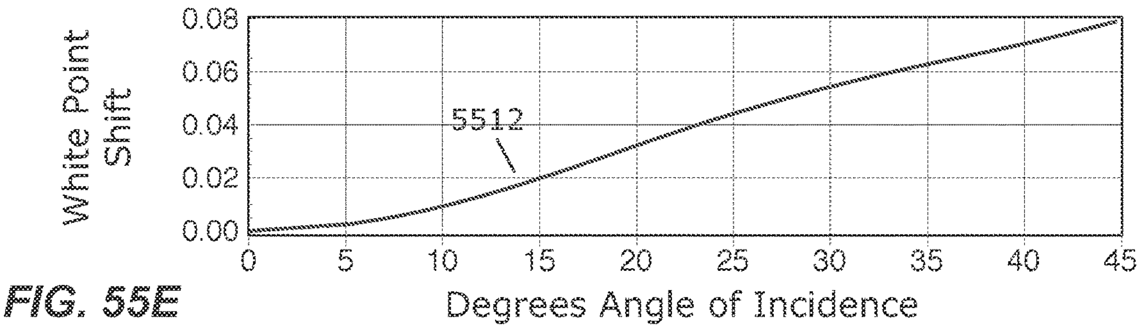

A first embodiment for improving ganglion cell stimulation is disclosed in FIGS. 55A-55E and corresponding tables in FIGS. 78A, 78B-1, and 78B-2. The embodiment provides such an increase in ganglion cell stimulation of about 80 percent, i.e., the ratio of the mean transmittance between 460 nanometers and 490 nanometers to the luminous transmittance of the filter is about 1.8. However, the embodiment does not feature a stable white-point. As shown by the graph of FIG. 55E at 5512, the appearance of the white-point shifts rapidly towards blue with increase in angle of incidence.

Figure 56A:
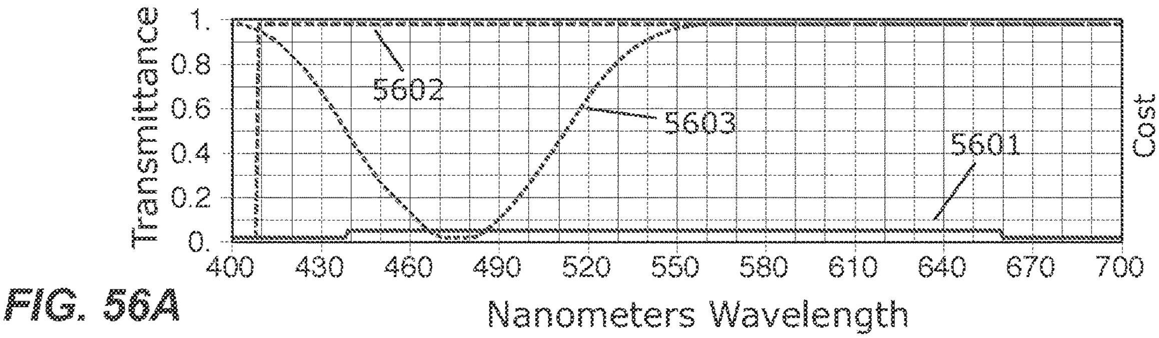
FIGS. 56A, 56B, 56C, 56D, 56E: Graph of the transmittance constraints and cost function used to design a filter for enhancing absorption of optical power by the retinal ganglion cells and providing stable color appearance over a range of angles of incidence (FIG. 56A). Graph of the spectral transmittance of components of the filter (FIG. 56B). Graph of a manufacturing specification for the filter (FIG. 56C). Graph of the percent gamut area increase with respect to the Farnsworth D-15 reference colors and with respect to selected natural world reference colors provided by the filter per degree angle of incidence (FIG. 56D). Graph of white-point shift of daylight provided by the filter per degree angle of incidence (FIG. 56E).
Figure 56B:
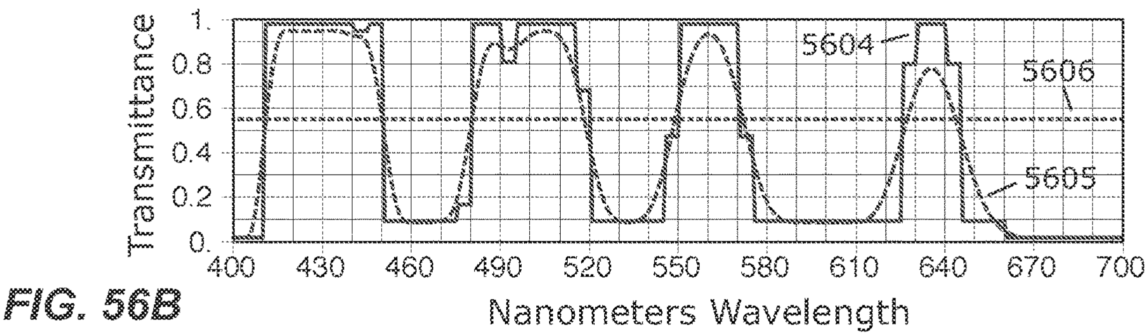
Figure 56C:
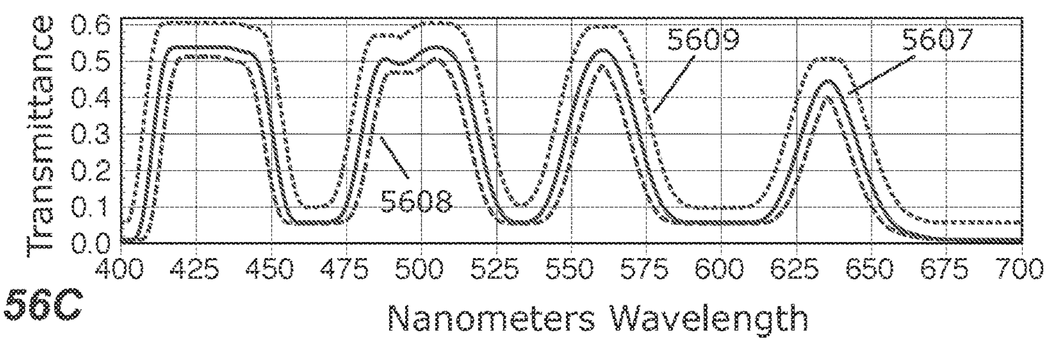
Figure 56D:
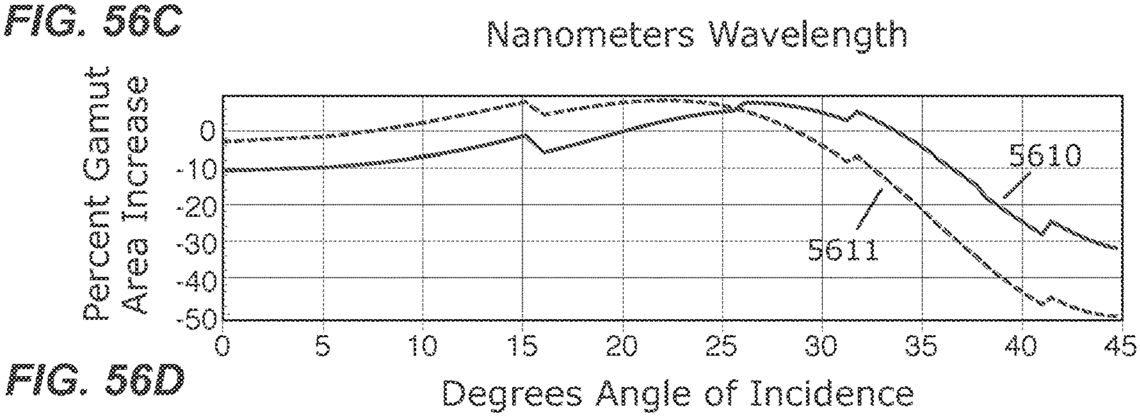
Figure 56E:
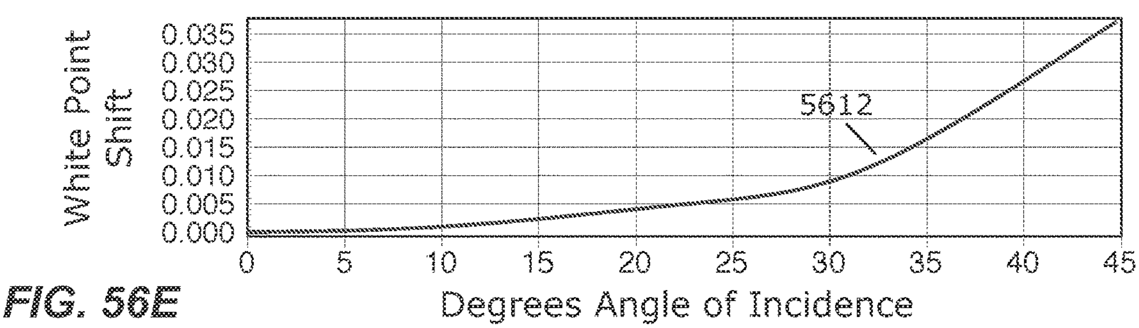

A further embodiment for improving ganglion cell stimulation is disclosed in FIGS. 56A-56E and corresponding tables in FIGS. 79A, 79B-1, and 79B-2. The embodiment provides such an increase in ganglion cell stimulation of about 50 percent. The embodiment also features a stable white-point, as shown by the graph of FIG. 56E at 5612. The white point shift is less than about 0.01 units for angles of incidence up to about 30 degrees. Additionally. as shown in FIG. 56D, the PGAI is essentially zero for angles of incidence up to about 30 degrees, demonstrating that the filter provides essentially normal color appearances. However, the filter design is relatively complex having four pass-bands and the improvement in ganglion cell stimulation is not outstanding.

Figure 57A:
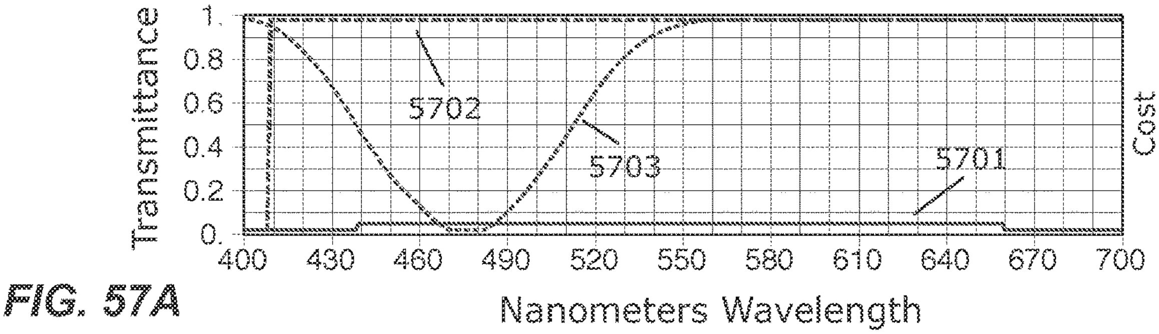
FIGS. 57A, 57B, 57C, 57D, 57E: Graph of the transmittance constraints and cost function used to design a neodymium-containing filter for enhancing reception of optical power by the retinal ganglion cells and providing stable color appearance over a range of angles of incidence (FIG. 57A). Graph of the spectral transmittance of components of the filter (FIG. 57B). Graph of a manufacturing specification for the filter (FIG. 57C). Graph of the percent gamut area increase with respect to the Farnsworth D-15 reference colors and with respect to selected natural world reference colors provided by the filter per degree angle of incidence (FIG. 57D). Graph of white-point shift of daylight provided by the filter per degree angle of incidence (FIG. 57E).
Figure 57B:
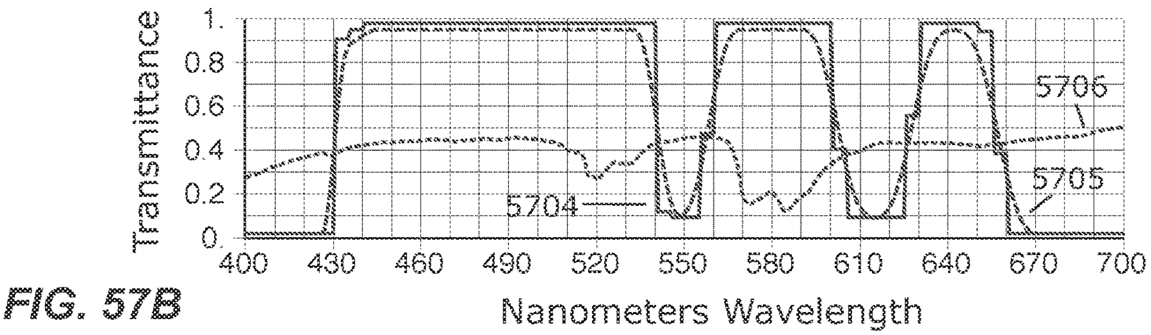
Figure 57C:
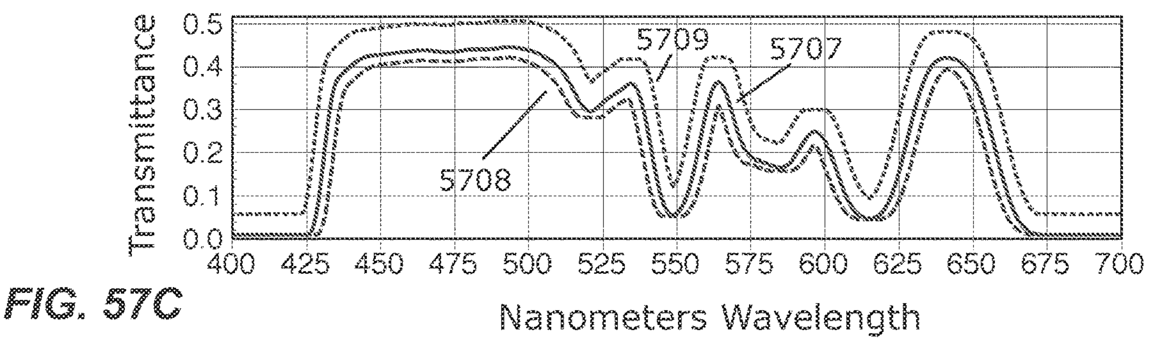
Figure 57D:
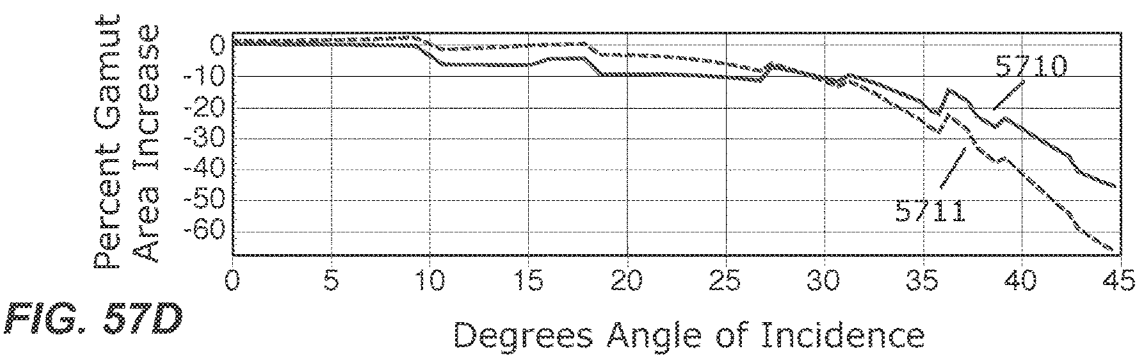
Figure 57E:
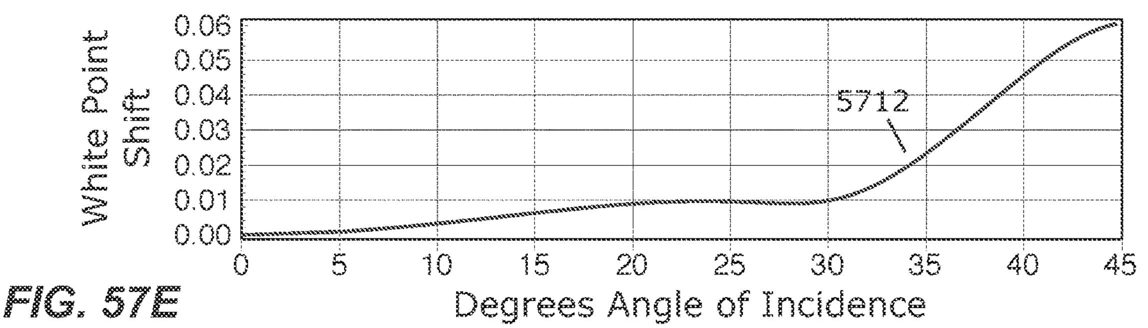

A further embodiment for improving ganglion cell stimulation is disclosed in FIGS. 57A-57E and corresponding tables in FIGS. 80A, 80B-1, and 80B-2. The embodiment provides such an increase in ganglion cell stimulation of about 65 percent in combination with a stable white-point. The improved performance under these conditions is assisted by design of the filter to incorporate a neodymium absorptive element. As shown by the graph of FIG. 57E at 5712, the white point shift is less than about 0.01 units for angles of incidence up to about 30 degrees. Additionally, as shown in FIG. 57D, the PGAI is essentially zero for angles of incidence up to about 30 degrees, demonstrating that the filter provides essentially normal color appearances.

In further embodiments, a filter may be designed for incorporation into a lamp assembly in which the filter, manufactured as a multilayered dielectric coating, for example, provides a beam-splitting function by which the transmitted and reflected components of light emitted by a light source within the lamp are configured to have a white-point that is identical.

Matching of reflected and transmitted white-points may enable the use of both beam components for illumination, thus not wasting energy by filtering. Furthermore the transmitted component of the beam may be configured to provide a color enhancing effect, so that a lamp assembly can be constructed where, for example, the center region of the beam provides an enhanced quality of light (see additional discussion below with respect to FIG. 27B). A contrary action on color appearance may be observed in the reflected light, where the relative gamut area as rendered by the reflected illuminant may be reduced in an opposing action compared to the increase in relative gamut area as rendered by the transmitted illuminant, i.e., the mean gamut area of the beams recombined is unity.

Figure 25A:
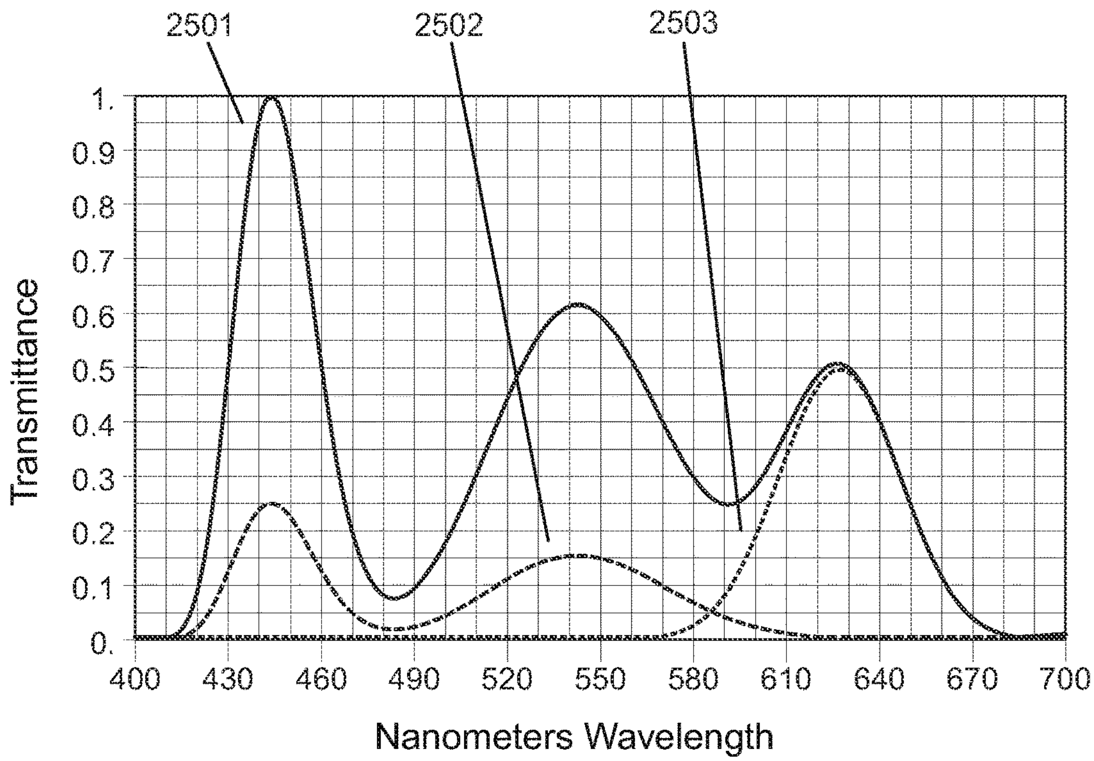
FIGS. 25A, 25B: Graph of the spectral radiant flux of a white light formed by combination of phosphor-based white light emitting diodes and red light emitting diodes (FIG. 25A), and the spectral transmittance of a filter designed to enhance color appearance of objects illuminated by light transmitted through the filter and to provide good color appearance of objects illuminated by light reflected by the filter (FIG. 25B).

A lamp assembly containing such a filter preferably includes a broad-band illuminant. In one embodiment it may be preferable to use light emitting diodes for illumination. If white LEDs comprising LED driven phosphors do not alone provide sufficiently broad band emission for good color appearance, white and red LEDs may be combined, nominally in a ratio of about 4:1, for example, to produce a broadband illuminant that is approximately the same color temperature and spectral width as daylight. The spectral radiant flux 2501 of such a composite illuminant is shown in FIG. 25A, along with the spectral radiant flux 2502 of a white LED and the spectral radiant flux 2503 of a red LED. Such illuminants may have a color temperature between about 5000K and about 7000K and a CRI of between about 80 and 90. In a further example, an illuminant comprising LEDs simulating daylight may include white, red and blue or cyan LEDs, in a ratio of about 4:1:2, for example, to produce a broadband illuminant having a color temperature between about 5000K and about 7000K and a CRI of between about 90 and 100.

Figure 25B:
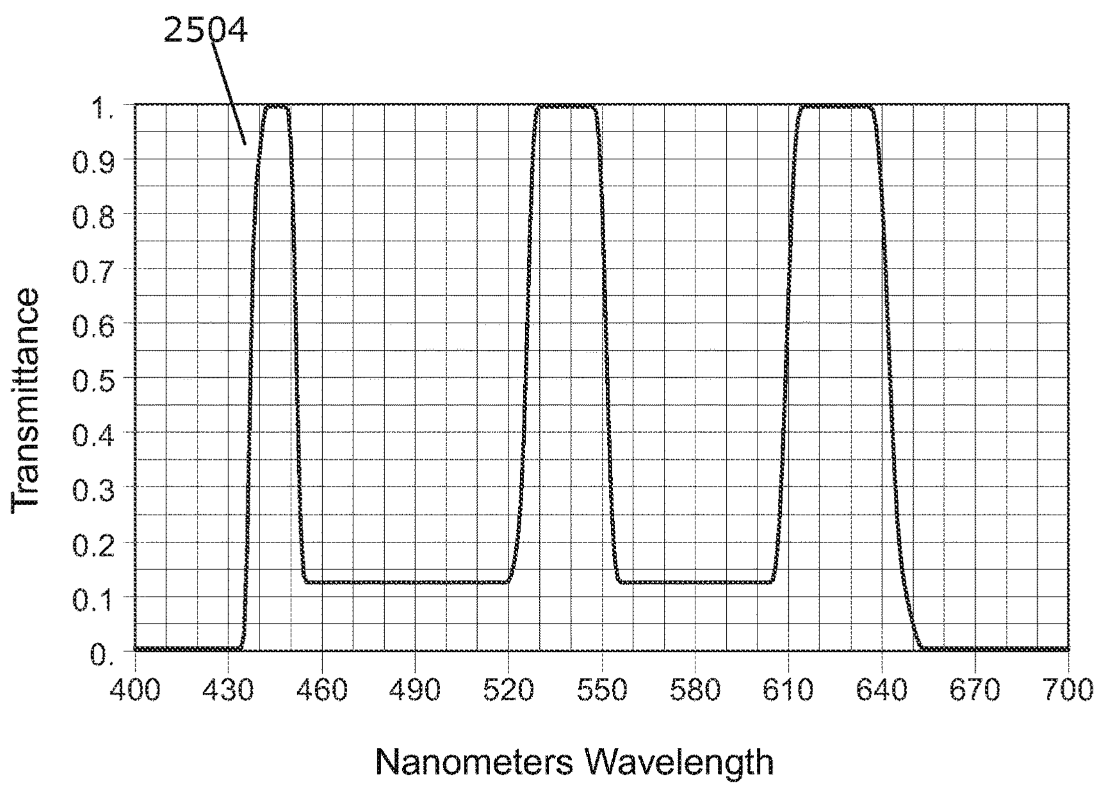

A filter with spectral transmittance 2504 as shown in FIG. 25B may perform the described spectral beam-splitting. Such filters are also referred to as dichroic filters or dichroic reflectors. The design criteria for this filter may include, for example, a cost vector configured to maximize relative gamut area, an LED mixture as described above as illuminant, and a reference filter that is the neutral filter so that the white-point of the illuminant under the filter is identical to the illuminant under the neutral filter and to the white-point of the reflected filter. Additionally the white-point constraints may preferably specify the white-point at angles of incidence off-normal of up to about 20 degrees. This accommodates potential difficulty in perfectly collimating the incident light. A 20 degree beam width is readily achievable with a small-footprint collimating lens. Furthermore it may be preferable to specify the filter with a minimum spectral transmittance of about 10 percent across the visible wavelengths, which may serve to regulate the amount of gamut area increase to reduce the appearance of non-uniformity of color appearance in the mixing region of the split beams when they are recombined spatially.

Figure 26A:
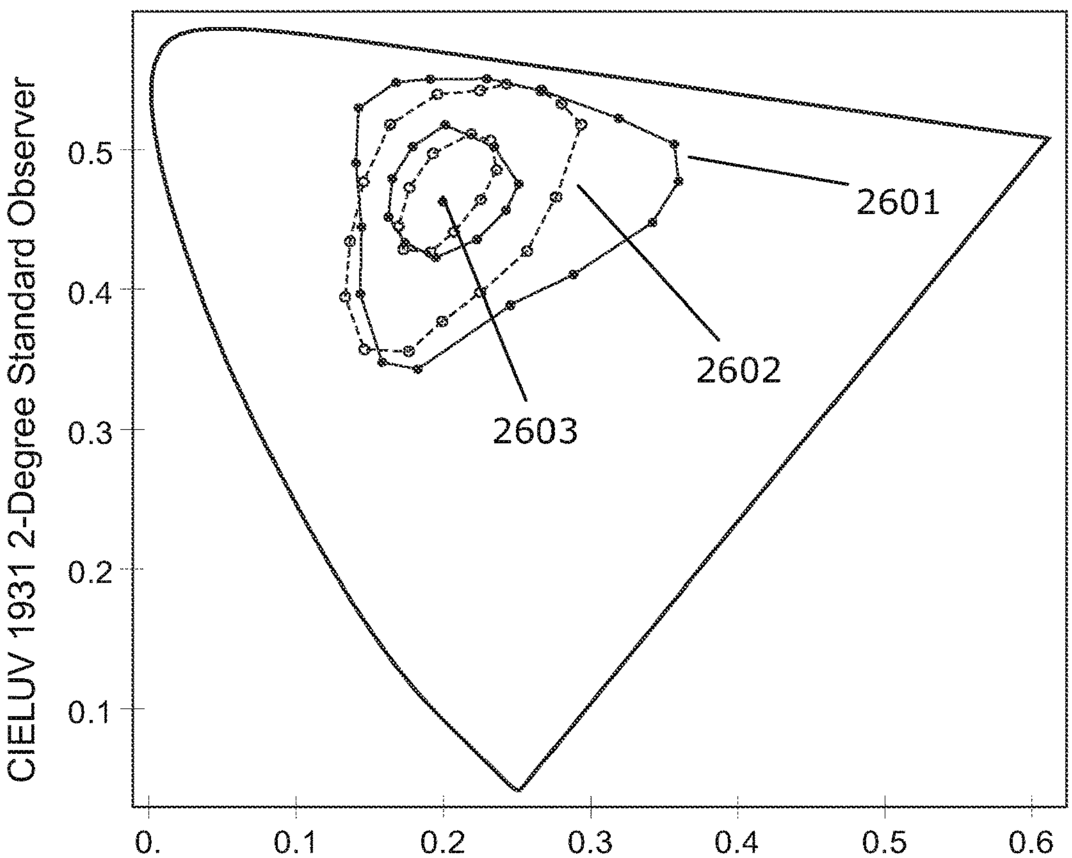
FIGS. 26A, 26B, 26C: Chromaticity diagram of the color appearance of selected Munsell colors under illumination by a combination of white and red LEDs as viewed when the illuminant is transmitted through a filter and as viewed when the illuminant is reflected by the filter (FIG. 26A), the spectral radiant flux of the illuminant (FIG. 26B), and graphs of the spectral transmittance of the filters (FIG. 26C).
Figure 26B:
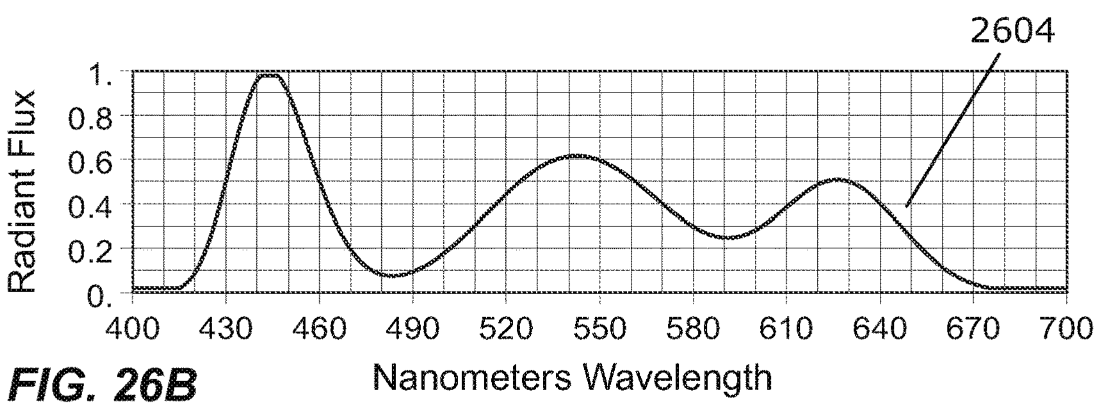
Figure 26C:
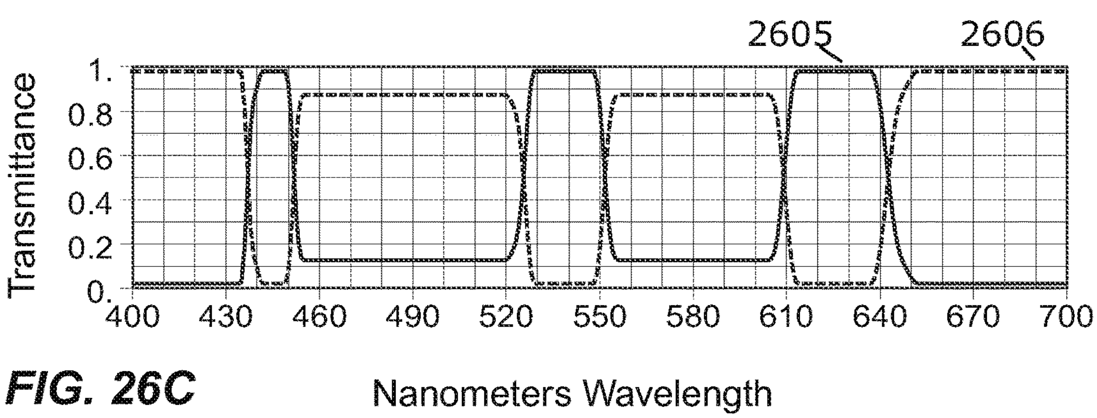

The spectral transmittance 2605 of the illuminant beam-splitting filter appears again in FIG. 26C along with its inverse (reflection) 2606. The spectral radiant flux of the mixture of LEDs illuminant 2604 is shown again in FIG. 26B. The chromaticity coordinate of the white-point of the filter and the inverse filter are shown at point 2603 in the chromaticity diagram of FIG. 26A. The chromaticity coordinates of selected Munsell colors are at 2601 for the filter and at 2602 for the inverse filter. The contrary effect on gamut area is readily seen in these contours, whereby the illuminant transmitted through the filter increases gamut area but the illuminant reflected through the filter decrease gamut area in response.

Figure 27A:
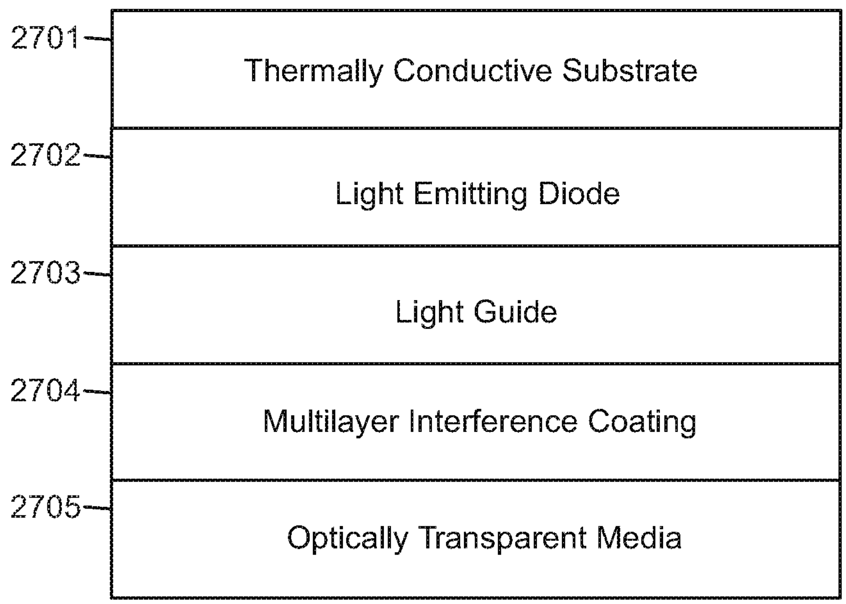
FIGS. 27A, 27B: Schematic diagram of a lamp assembly containing a light emitting diode, an interference filter and a beam forming element providing a composite beam wherein the central region of the beam comprises light transmitted through the filter and the annular region of the beam comprises light reflected by the filter (FIG. 27A), and a diagram showing the operation of the lamp assembly incorporating the filter (FIG. 27B).
Figure 27B:
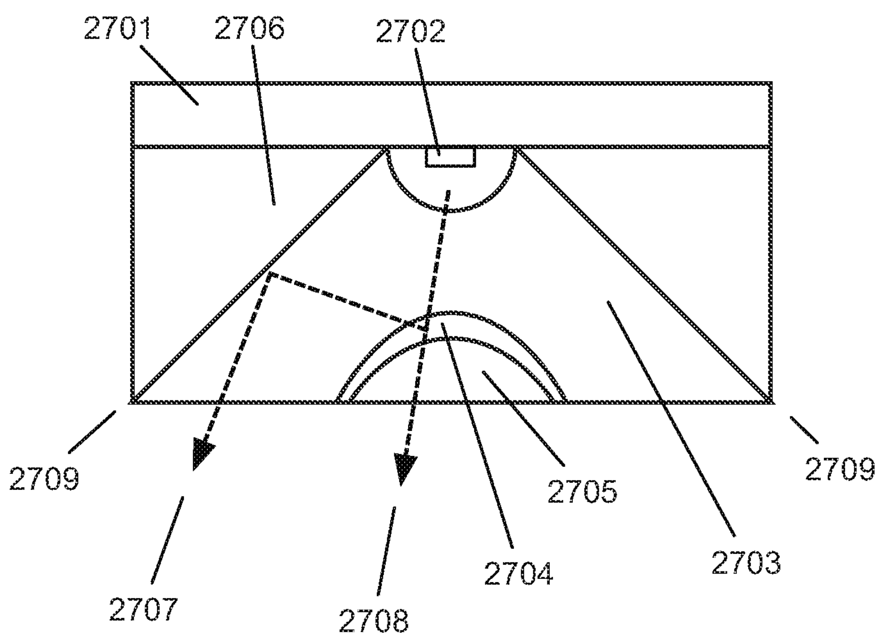

A possible arrangement of components to form a lamp assembly including such a beam-splitting filter is shown in FIG. 27A and FIG. 27B. Here the assembly may be arranged as a stack including a thermally conductive substrate 2701 such as a metal circuit board, a light emitting diode 2702, a beam-forming optical light guide 2703, and a multilayer interference coating which may be deposited onto the surface of an optically transparent substrate such as glass.

Referring now particularly to FIG. 27B, in one example arrangement a ray of light emitted by the LED 2702 is collimated to a beam width of about 20 degrees by optic (e.g., light guide) 2703, and is then incident on the interference filter 3004. Thereafter the transmitted component of light emerges in the central portion of the output beam 3008, and the reflected portion is re-directed by the light-guide, for example by internal reflection at the boundary indicated along 2709, and then emitted along the annular portion of the output beam 2707. The arrangement as shown enables the lamp assembly to incorporate a color-enhancing filter without compromising luminous efficiency, as the light not transmitted by the filter is radiated back into the environment where it is still useful for general illumination, whereas an absorptive filter would reduce the efficiency of the lamp, the interference filter has a near unit efficiency.

Such illuminants may be usefully employed indoors to provide improved color discrimination for deuteranomalous and protanomalous observers. In such configurations the illuminant may also be used in conjunction with filters incorporated in eyewear as previously disclosed.

Given the spectral transmittance per wavelength of any filter disclosed above in this specification, a method for calculating the center locations and widths of the pass-bands and stop-bands comprises: applying a Gaussian smoothing kernel to the spectral transmittance curve (e.g. by convolution of the kernel with the transmittance data series), wherein the width of the kernel is wide enough to essentially remove any insignificant variations in the curve (such as, for example, transients, ripple, noise or other artifacts not considered essential to the filter of interest); then normalizing the curve so that the maximum transmittance is equal to 100 percent, and then rounding each transmittance value to either 0 percent or 100 percent, so that each contiguous spectral region wherein the rounded value is 0 percent corresponds to the band boundaries of a stop-band, and each contiguous spectral region wherein the rounded value is 100 percent correspond to the band boundaries of a pass-band.

Given the band boundaries calculated according to this method, the mean transmittance within each pass-band and each stop-band may be calculated with respect to the original curve. The width of a pass-band or stop-band is equal to the distance between the lower and upper band boundary, and the center of a pass-band or stop-band is equal to the midpoint between the lower and upper band boundary.

Preferably, for any such calculated collection of pass-band and stop-band boundaries, for each interleaved stop-band, the mean transmittance of the stop-band is at most one half of the mean transmittance of an adjacent pass-band. If this condition does not hold then the variation among the pass-bands and stop-bands may be essentially insignificant, in which case the width of the smoothing kernel may be increased and the calculation carried out iteratively until a suitable smoothing width is determined.

For most of the filters of interest in this disclosure, a smoothing kernel having a half-maximum width of about 20 nanometers is adequate for the purpose of this calculation.

For most of the filters described in this disclosure, the stated valued concerning band boundary locations, band center locations, and band widths may be given in units of wavelength rounded to the nearest 5 nanometers. The teachings herein are sufficient to specify filters with greater spectral resolution. However, a greater spectral resolution is not necessarily required to practice the invention.

The above portion of this specification discloses methods for producing multi-band optical filters for affecting color vision in a desired manner, including methods of designing a filter specification that satisfies constraints related to the intended use of the filter, methods of evaluating the performance of the filter specification and for adjusting the design to further improve performance of the filter specification with respect to the desired effect to arrive at specification for a preferred embodiment of such a filter, methods of manufacturing the filter and/or of providing machine specifications adequate to have the filter manufactured by another, and methods of incorporating the filter into an ophthalmic lens or a lamp assembly to produce a preferred embodiment of a device that provides the desired effect on color vision.

The range of effects on color vision enabled by inventions of this disclosure include maintenance of normal color discrimination (which is also referred to as providing "good color discrimination" in this disclosure); increasing color discrimination (also sometimes referred to as "enhancing" or "improving" color discrimination in this disclosure), which without further qualification may be assumed to provide improvement in color discrimination that is about equal between red and green colors as between blue and yellow colors; increasing red-green color discrimination, wherein the desired effect maximizes the improvement in discrimination between red and green colors; and increasing blue-yellow color discrimination, wherein the desired effect maximizes the improvement in discrimination between blue and yellow colors.

Maintenance of normal color discrimination is generally desirable for filters that also provide additional functions such as specified minimum and/or maximum spectral transmittance over one or more regions in the visible spectrum, wherein achieving the equivalent spectral transmittance limits by conventional methods would result in a filter providing a poor quality of color discrimination. For example, a conventional notch filter or cut filter produced as an interference filter may cause significant changes in the chromatic appearance of certain colors and/or may cause the appearance of some colors to change with respect to variable viewing angles in a manner that is uncomfortable to the viewer when the filter is incorporated into eyewear. In a further example, absorptive means of affecting spectral transmittance may result in the filter having a low luminous transmittance and/or a strongly colored white point, as the concentration of the absorbing material needed to achieve the spectral transmittance limit may significantly affect the transmittance over a broad region of the visible spectrum.

The methods disclosed herein enable the design, specification and manufacture of filters that maintain normal color discrimination over a wide range of viewing angles in addition to providing useful limits with respect to spectral transmittance. Specific variations of such filters and products incorporating such filters disclosed herein include: filters that block blue light between about 380 nanometers and about 450 nanometers, filters that block blue light between about 380 nanometers and about 450 nanometers while simultaneously ensuring high spectral transmittance of light at about 589 nanometers over a wide range of viewing angles, filters that block green light at about 532 nanometers over a wide range of viewing angles, and filters that provide a high mean transmittance of light between about 460 nanometers and about 490 nanometers relative to luminous transmittance of light. Filters within this family of embodiments all comprise three pass-bands interleaved with two stop-bands. However, many such filters comprise four pass-bands interleaved with three stop-bands wherein one or more of the stop-bands and/or one or more of the pass-bands provides the desired spectral transmittance limit.

Further variations on the methods disclosed herein enable the design, specification and manufacture of filters that increase color discrimination over a wide range of viewing angles, including filters that increase red-green color discrimination, filters that increase blue-yellow color discrimination, or both. The filters may be configured to increase color discrimination for observers with normal color vision, or may be configured to increase color discrimination for observers with color vision deficiency, including deuteranomalous color vision deficiency, protanomalous color vision deficiency, and tritanomalous color vision deficiency. Configuration of a filter towards use by a particular observer may provide a preferred embodiment of a filter for affecting color vision in a desired manner. However, such configuration does not necessarily preclude other observers from experiencing some or all of the intended effect.

Applications of filters that increase red-green color discrimination include use as optical aids for deuteranomalous and protanomalous observers. These forms of color vision deficiency are characterized by a sensitivity to variations among red and green colors that is lower than that of normal observers. Filters that increase red-green color discrimination may also be used in other applications including general purpose eyewear (e.g. sunglasses) for normal observers as well as activity-specific eyewear such as for use with certain sports including golf.

Filters that increase blue-yellow color discrimination may be useful for tritanomalous observers, and also have other applications including enhancement of luminance contrast, the simulation of red-green color vision deficiency, and the detection of camouflaged objects.

Filters providing a balanced increase in color discrimination between both red and green colors and between blue and yellow colors may be preferable for use by observers with normal color vision, where such filters when incorporated into eyewear provide a general improvement to the quality of vision.

Filters within these families of embodiments all comprise three pass-bands interleaved with two stop-bands. However, some such filters may comprise four pass-bands interleaved with three stop-bands. Typically, the fourth pass-band has a center located at greater than about 660 nanometers and is configured so that the filter maintains a substantially invariant white point at extreme angles of incidence.

Filters that are configured to increase color discrimination may be classified according to the center location of the second pass-band. For center locations between about 520 nanometers and about 540 nanometers, the filter primarily provides an emphasis on improvement in discrimination between red and green colors. For center locations between about 545 nanometers and about 550 nanometers the filter provides an about equal improvement in discrimination between red and green colors and between blue and yellow colors. For center locations between about 555 nanometers and about 580 nanometers the filter provides an emphasis on improvement in discrimination between blue and yellow colors.

For a filter that is configured for increasing blue-yellow color discrimination, the preferable center location of the second pass-band is about 580 nanometers, which corresponds with the monochromatic wavelength that is uniquely considered yellow by most observers. However, a filter having a second pass-band center location at 580 nanometers may be impractical, as it may cause the appearance of colors to be dichromatic and correspondingly all discrimination between red and green colors would be lost. It is therefore useful to constrain such filters, for example by ensuring that the chromaticity coordinate of a green traffic signal is within a defined boundary giving its acceptable limits. As such the most preferable filter for maximizing discrimination between blue and yellow colors at the expense of color discrimination between red and green colors may be found having a second pass-band location less than or equal to about 560 nanometers.

For a filter that is configured to increase discrimination between red and green colors, the most preferred center location of the second pass-band varies depending on the color set of interest. With respect to the Munsell color samples and/or the Farnsworth D-15 colors the optimal choice of center location is about 530 nanometers. However, with respect to samples of the natural world the more preferable location is about 540 nanometers. Thus the choice of 535 nanometers may give the best average-case choice for such a filter that may be used in a mixed environment.

With respect to a filter configured to increase red-green color discrimination for a deuteranomalous observer, the preferred embodiment may depend on the sub-class among this type of observer. For mild deuteranomalous observers, a moderate contrast ratio between pass-band to stop-band mean transmittance may be adequate, for example about 4:1. For a moderate deuteranomalous observer a ratio of at least about 6:1 may be preferred. For a severe deuteranomalous observer a ratio of at least 8:1 may be preferred.

For filters having a pass-band to stop-band contrast ratio greater than about 6:1, it may be preferable to limit the filter specification to provide a minimum spectral transmittance of at least about one fifth of the luminous transmittance between about 580 nanometers and about 620 nanometers, and/or between about 560 nanometers and about 580 nanometers. This may be the case to ensure that the filter is adequate for general use, for example while operating a motor vehicle where adequate visibility of certain narrow-band yellow lights, including light emitting diodes and low pressure sodium lamps, is required. In such variations it may be preferable to limit the filter to constrain the chromaticity coordinate of a yellow traffic signal within a particular region, so that such lights are not mistaken for orange or red, for example.

With respect to a filter configured to increase red-green color discrimination for a protanomalous observer, a variance on the above ranges applies with respect to the second pass-band center location. Due to the retinal physiology associated with the anomaly, the preferable wavelengths are all blue-shifted by about 5 nanometers, e.g. the choice of 535 nanometers is modified to about 530 nanometers. Furthermore it should be noted that with respect to configuration of filters for use by protanomalous observers the center location of the third pass-band are preferably at most between about 610 nanometers and about 625 nanometers, as use of longer wavelengths may cause reduced visibility of red colors by such observers.

Filters within the above families of embodiments for enhancing color discrimination all comprise three pass-bands interleaved with two stop-bands.

Regarding the configuration of filters for color vision, such filters preferably provide, generally, a luminous transmittance within some reasonable range, for example at least about 8 percent, and preferably also provide a white-point (i.e., the chromaticity coordinate of average daylight as viewed through the filter) that is not strongly colored.

The selection of a constraining white point region to provide an essentially neutral tint may be preferable as filters having a white-point that is moderately or strongly tinted may not provide adequate brightness of some colors. Furthermore the imposition of a limitation so that the white-point remains within a relatively small region over a range of viewing angles is preferable as such filters provide the most comfortable viewing experience when incorporated into eyewear, and enable tolerance for misalignment and beam divergence when incorporated into lamp assemblies.

The use of CIELUV (u',v') chromaticity coordinates for such calculations is preferred since according to this scale the ellipse defining the just-noticeable-difference between colors is nearly circular for the range of white-points of interest. The (u',v') coordinates may be calculated either with respect to the CIE 1931 2-degree Standard Observer, or the CIE 1964 10-degree Standard Observer, wherein the former gives better prediction of apparent color for objects at a distance and the latter gives better prediction of apparent color for objects subtending a larger portion of the field of view.

With respect to filters configured for use by observers with normal color vision, the white-point constraint region may have a radius of about 0.02 units on the (u',v') chromaticity diagram. More preferably the region may have a radius of about 0.01 units, and still more preferably, the range of angles of incidence between which the filter white-point is compliant with the limitation may extend from zero degrees to at least about 25 degrees, and more preferably from zero degrees to at least about 35 degrees.

With respect to filters configured for use by observers with color vision deficiency, it may be preferable to define the constraining region to be an elliptical region, e.g., with the major axis of the ellipse oriented along the confusion line corresponding to the type of color vision deficiency. As such, the properties of such filters when analyzed according to a circular constraining region may be characterized by a white-point that exits the constraining region over some range of intermediate angles, and then enters the constraining region again at a steeper angle, where the steeper angle is typically between about 20 degrees and about 40 degrees. In some embodiments this may provide a filter that appears to provide a good stability of the white-point when viewed by the intended observer, although an observer with normal color vision may not perceive the same degree of stability. With respect to mild and moderate deuteranomalous observers, the white point constraint region may be preferably limited to a radius of about 0.01 units. With respect to severe deuteranomalous observers a relaxed region having a radius of about 0.02 units may be preferable. With respect to protanomalous observers, the range of angles over which the constraint is considered may be reduced, for example between zero degrees and about 20 degrees.

A first method for designing a filter for increasing color discrimination comprises: selecting the desired center location of the second pass-band in accordance with the desired effect as described in the above, selecting a minimum necessary width of the second pass-band that is appropriate to the desired luminous transmittance of the filter (note that this preference also implies the mean transmittance of the second pass-band is as high as possible), and then selecting appropriate center locations and widths of the first and third pass-bands. The center of the first pass-band is preferably located at the shortest possible wavelength and the center of the third pass-band is preferably located at the longest possible wavelength, where the possible range of center locations and widths is constrained by limitations regarding the white-point of the filter, including the desired chromaticity coordinate of the white-point at normal incidence and the region within which the chromaticity coordinate of the white-point is to be contained with respect to a range of viewing conditions at off-normal angles of incidence. Next, the mean transmittance within the three pass-bands is preferably selected to the maximum possible value (which may be less than 100 percent if the filter is specified for incorporation with an absorptive filter, for example), and the mean transmittance of the interleaving stop bands may be preferably selected over a range of values corresponding to contrast ratios of mean transmittance among the pass-bands to stop-bands of between about 2:1 and about 10:1 or greater. Higher contrast ratios may produce stronger enhancement in color discrimination. Such high ratios may also be associated with unusual and/or unstable color appearance of certain lights such as narrow-band lamps.

The above description regarding the preferred selection of pass-band center locations and pass-band to stop-band contrast ratios, in combination with methods of designing filters disclosed herein provides adequate teachings to design filters that are members of the families identified above. For example, to arrive at such a filter by an exhaustive search procedure, the center location and width of the second pass-band may be fixed along with the pass-band to stop-band contrast ratio, for example in accordance with the ranges called out associated with the effect on color vision as described above, then all possible combinations of center locations and widths of the first and third pass-bands enumerated, and then each filter within the enumerated set evaluated using a computer to select the preferred member. The preferred member satisfies the desired design constraints subject to maximizing a performance metric with respect to color discrimination. The enumerated set may comprise many thousands of members, and the resulting calculations may require considerable computation time depending on the number of bands under consideration and the spectral resolution of the calculations.

More preferably, the method disclosed herein for designing such filters by means of solving a linear program may be employed—whereby the design constraints are transformed into a well-formed linear program that defines the limits on feasible filter designs as a geometric abstraction that is best described as a generalized multi-dimensional convex polyhedron. By means of guidance using a cost vector as described in the teachings of this invention, a linear program solver may rapidly locate the filter member on the boundary of the feasible set that maximizes the given constraints in the direction indicated by the cost vector. The method of linear programming as disclosed herein enables the trial filter specification to be determined nearly instantaneously, such that the most preferable method of practicing the invention may be to guide the cost vector and/or design constraints interactively so that the performance tradeoffs involved in a particular trial filter may be evaluated by an operator in real time. The linear programming method also enables the design of composite filters, for example comprising an interference filter and a narrow-band absorptive filter such as a neodymium-containing optical substrate, wherein the linear program solver determines the transmittance specification for the interference filter to operate in conjunction with the absorptive filter to produce the desired effect. The set of feasible filters considered by the linear program solver may comprise essentially arbitrary spectral transmittance curves that are difficult or impossible to reach by enumeration of bands or iterative local search procedures. Since the linear program solver is not strictly limited to designing a multi-band filter that is a sequence of pass-bands interleaved by stop-bands, it may be used to design a filter that achieves a multi-band spectral transmittance when used in combination with another specified filter, including accounting for constraining criteria with respect to the properties of such composite filters over a range of angles of incidence.

Given any trial filter specification, for example as produced by the methods just described, further methods disclosed herein enable the prediction of the effect of the trial filter on color discrimination.

For example, in one embodiment, a method involves determining a best-fit broad-band reference filter, then calculating the chromaticity coordinates of a set of reference colors as viewed through the trial filter and through the reference filter, and comparing the ratio in area enclosed by the coordinates under both conditions.

In a another embodiment, a best-fit broad-band reference filter is determined, then calculating the chromaticity coordinates of a set of reference colors as viewed through the trial filter and through the reference filter, and then projecting the chromaticity coordinates onto an axis of color space and comparing the relative standard deviations of the sets of coordinates along that axis. Preferably the axes may include one or more of the tritan, deutan and protan confusion lines, so that the computed ratio corresponds to an increase, decrease or maintenance of color discrimination in the corresponding direction wherein, the tritan confusion line generally corresponds with discrimination between blue and yellow colors, and the deutan and protan confusion lines generally correspond with the discrimination between red and green colors.

More preferably, such performance analysis calculations are carried out with respect to the trial filter as viewed over a range of off-normal angles of incidence between about zero degrees and at least about 25 degrees. The average performance over those angles may be used to estimate the overall effectiveness of the product, for example when incorporated into an ophthalmic lens such that the filter performance must be considered over to a wide range of viewing angles. Even more preferably such analysis may account for the curvature and orientation of the lens within an eyeglass frame, and/or the geometry of the eye and/or the estimated distribution of orientations of the eye which may rotate in the socket.

Preferably such performance evaluations with respect to reference colors may consider colors representative of the conditions under which the product may be used, for example with eyewear the reference colors should include both samples from the natural world as well as man-made color pigments, whereas for filters configured for incorporation into indoor lamp assemblies the reference colors may comprise only the man-made color pigments.

Given a preferable trial filter specification, the filter may be manufactured, for example as an interference filter fabricated by physical vapor deposition of a stack of dielectric materials onto an optical substrate. The trial filter specification may be bounded by minimum and maximum transmittance curves, for example, to provide a machining tolerance specification that is adequate to enable the filter to be manufactured by an operator that is skilled in the art of such production methods.

Some embodiments of filters disclosed herein may be manufactured as high-order interference filters comprising, for example, about 100 layers of dielectric material and having a total thickness of about 6 microns.

With respect to some embodiments, in particular those wherein only a moderate contrast ratio between mean transmittance of pass-bands and stop-bands is desired, for example having a ratio of between about 2:1 and about 4:1, the number of layers and thickness can be significantly reduced, for example to require at most about 50 layers and/or having a total thickness of about 3 microns, wherein such limits may be achieved by applying a smoothing kernel to the filter specification, for example such a kernel preferably having a Gaussian shape and a half-maximum of at least about 20 nanometers. The resulting simplified design may then benefit from a shorter machining time, compatibility with lower precision processes and lower overall production cost.

Some of the classes represented by filter embodiments disclosed herein may benefit from construction as composite filter designs, for example as comprising an interference filter and an absorptive filter where the absorptive filter comprises neodymium. For example with respect to red-green color enhancing filters having a constrained white-point over a range of angles, such composite designs are possible wherein the position of the third pass-band may be selected at a longer wavelength than would be possible given the same constraint criteria without the neodymium absorptive component. Whereas the longer wavelength center location is preferable as described previously, this may cause the composite filter design to further increase color discrimination. Furthermore, such composite designs may provide improved stability of colors, for example when analyzed for performance over a range of angles, a composite design comprising neodymium may retains a gamut area ratio greater than 1:1 up to an angle 5 degrees greater than that of an equivalent filter design not comprising neodymium. However the improved angular stability is typically found to be compromised by a slightly lower peak performance, arising from an undesirable secondary absorption band present in neodymium-containing filters, the second pass-band of such the resulting filter is slightly wider than is most preferable. Still, such composite designs comprising neodymium may be preferable for filters incorporated into eyewear where the overall visual comfort is a factor.

Other narrow-band absorbers may be used as alternative to, or in addition to neodymium, including narrow band organic dyes, and other rare-earth elements such as praseodymium and holmium, whereby some such combinations of narrow-band absorbers may provide a composite filter design comprising an interference filter that exhibits improved angular stability and/or reduced luminous reflectance. Such combinations may be designed using the method of linear programming as disclosed herein, for example.

When any of the disclosed filters are manufactured as interference filters, the high reflectance of such filters must be considered. For incorporation into eyewear, it is preferable that the ratio of luminous transmittance to luminous reflectance on the interior surface of the lens is at most about 2:1. With respect to filters wherein the interference filter has a high luminous transmittance, for example over 60 percent, the reflectivity of the interference filter may be sufficiently small as to be inconsequential. Such filters may be preferably combined with a linear polarizer, or with a photochromic absorptive filter, which are both forms of absorptive filters that potentially do not significantly reduce luminous reflectance when disposed in combination with an interference filter. With respect to filters wherein the interference filter has a luminous transmittance that is less than about 60 percent, the management of reflectivity on the interior surface of the lens is a considerable problem. A first approach is to apply a neutral density absorber to the back side of the lens, leveraging the fact that reflected light must pass through the absorber twice, this may restore the contrast ratio to an acceptable level. However the neutral density absorber also reduces the maximum spectral transmittance of the lens, which in turn implies a necessary reduction in the mean transmittance contrast ratio among the pass-bands and stop-bands, which may reduce the effective color discrimination improvement provided, for example.

In one embodiment, a circular polarizer may be applied to the interior surface, and configured so that the linear polarizing element absorbs the backside reflections. This construction may achieve a very high contrast ratio. Alternatively, a metal attenuation coating may be incorporated into the interference filter, where for example, the interference filter comprises layers of titanium oxide and silicon oxide (TiO2 and SiO2) and the metal layer comprises pure titanium. Due to the properties of such metal layers when incorporated into interference filters, the arrangement may significantly outperform an equivalent neutral density filter with respect to attenuation of reflectance. Further, due to the good material compatibility between metal and metal oxides, such an arrangement may provide for a robust product that is also economical to produce and provides the desired effect on color vision.

A further concern related to the reflectance of interference filters is regarding their placement in the ophthalmic lens assembly, wherein if such filters are disposed on the interior surface, visible artifacts may be present caused by internal reflections within the substrate; these are preferably mitigated by means of a high quality anti-reflection coating on the opposite surface of the lens.

Regarding the incorporation of filter configured for increasing color discrimination into lamp assemblies, wherein they may be also referred to as dichroic reflectors, the most preferable embodiments thereof may consider the efficiency of such assemblies as well as the quality of color discrimination provided by both the transmitted and reflection components of the illuminant. In some embodiments the illuminant may be a broad-band source, wherein the transmitted component enhances discrimination between red and green colors and the reflected component enhances discrimination between blue and yellow colors, for example. More preferably the illuminant may be a multi-band source, such as an array of red, green and blue light-emitting diodes, so that the transmitted component provides increased color discrimination and the reflected component maintains normal color discrimination. Preferable arrangements of the lamp assembly exist wherein both the transmitted and reflected components of light are used for illumination.

The filter design methods disclosed herein may be implemented, for example, on a computer having a 2.3 GHz Intel Core i7 processor and 8 GB of RAM using the commercially available computational software program Mathematica® (including its linear program solvers) available from Wolfram Research, Inc. It should be understood by those of ordinary skill in the art, however, that the methods disclosed herein are not limited to the above implementation and are independent of the computer/system architecture. Accordingly, the methods may equally be implemented on other computing platforms, use other computational software (whether commercially available or coded specifically for the filter design methods), and also may be hard-wired into a circuit or other computational component.

This disclosure is illustrative and not limiting. Further modifications will be apparent to one skilled in the art in light of this disclosure. For example, where methods and steps described above indicate certain events occurring in certain order, those of ordinary skill in the art will recognize that the ordering of certain steps may be modified and that such modifications are in accordance with the inventions disclosed herein. Additionally, certain of the steps may be performed concurrently in a parallel process when possible, as well as performed sequentially as described above. Acts referred to herein as operations in a method or process may also be understood as "steps" in the method or process. Therefore, to the extent there are variations of the inventions disclosed herein, which are within the spirit of this disclosure or equivalent to the inventions disclosed herein, it is the intent that this disclosure and the claims it supports will cover those variations as well. All publications and patent applications cited in this disclosure are incorporated herein by reference in their entirety as if each individual publication or patent application were specifically and individually put forth herein.

What is claimed is:

1. A method for increasing red-green color discrimination for an observer with deuteranomalous or protanomalous color vision deficiency, the method comprising: providing the observer a multi-band optical filter through which to view colored objects, the optical filter having a spectral transmittance curve comprising:

a plurality of pass-bands and stop-bands partitioning the visible spectrum, including, three or more pass-bands interleaved with two or more stop-bands, wherein each pass-band has a center, a width, a lower band boundary equal to the center minus half the width, an upper band boundary equal to the center plus half the width, and a mean transmittance, each stop-band has a center, a width, a lower band boundary equal to the center minus half the width, an upper band boundary equal to the center plus half the width, and a mean transmittance, the lower band boundary of each interleaved stop-band is the same as the upper band boundary of an adjacent pass-band, the upper band boundary of each interleaved stop-band is the same as the lower band boundary of an adjacent pass-band, each pass-band center is located between about 400 nanometers and about 700 nanometers and each pass-band width is between about 10 nanometers and about 110 nanometers, each stop-band center is located between about 410 nanometers and about 690 nanometers and each stop-band width is between about 10 nanometers and about 80 nanometers, and each of the interleaved stop-bands has a mean transmittance that is less than one half of the mean transmittance of an adjacent pass-band, and a step feature on a side of one of the plurality of pass-bands, the step feature located between 580 nanometers and 610 nanometers, a spectral transmittance of the step feature is at least one fifth of a luminous transmittance of the optical filter, where the luminous transmittance is an average spectral transmittance of light through the optical filter weighted by the CIE 1924 photopic luminosity function, the optical filter configured to increase red-green color discrimination for the observer with deuteranomalous or protanomalous color vision deficiency.

2. The method of claim 1, wherein the optical filter is configured to increase red-green color discrimination for observers with deuteranomalous color vision deficiency, the optical filter comprises a first pass-band having a center located between about 440 nanometers and about 455 nanometers and a width of between about 20 and about 40 nanometers, a second pass-band having a center located between about 525 nanometers and about 545 nanometers and a width of between about 20 and about 50 nanometers, and a third pass-band having a center located between about 610 nanometers and about 640 nanometers and a width of between about 30 and about 80 nanometers, wherein each of the interleaved stop-bands has a width of at least about 40 nanometers and a mean transmittance that is less than about one fourth of the mean transmittance of an adjacent pass-band, and a minimum spectral transmittance of the filter between about 475 nanometers and about 580 nanometers is at most about one fifth of the luminous transmittance of the filter.

3. The method of claim 2, wherein the first pass-band center is located at less than or equal to about 450 nanometers.

4. The method of claim 2, wherein the first pass-band center is located at less than or equal to about 445 nanometers.

5. The method of claim 2, wherein the third pass-band center is located at greater than or equal to about 625 nanometers.

6. The method of claim 2, wherein the third pass-band center is located at greater than or equal to about 635 nanometers.

7. The method of claim 2, wherein the second pass-band width is at most about 40 nanometers.

8. The method of claim 2, wherein the second pass-band width is at most about 35 nanometers.

9. The method of claim 2, wherein the second pass-band width is at most about 30 nanometers.

10. The method of claim 2, wherein the second pass-band center is located between about 535 nanometers and about 540 nanometers.

11. The method of claim 2, wherein the second pass-band center is located at about 535 nanometers.

12. The method of claim 2, wherein the minimum spectral transmittance of the filter between about 475 nanometers and about 580 nanometers is less than about one fifth of the luminous transmittance.

13. The method of claim 2, wherein the minimum spectral transmittance of the filter between about 475 nanometers and about 580 nanometers is less than about one tenth of the luminous transmittance.

14. The method of claim 2, wherein each of the interleaved stop-bands has a mean transmittance that is less than about one eighth of the mean transmittance of an adjacent pass-band.

15. The method of claim 2, wherein each of the interleaved stop-bands has a mean transmittance that is less than about one tenth of the mean transmittance of an adjacent pass-band.

16. The method of claim 2, wherein each of the interleaved stop-bands has a mean transmittance that is greater than about one sixteenth of the mean transmittance of an adjacent pass-band.

17. The method of claim 2, wherein the first pass-band has a center located at about 445 nanometers and a width of about 25 nanometers, the second pass-band has a center located at about 530 nanometers and a width of about 45 nanometers, the third pass-band has a center located at about 635 nanometers and a width of about 50 nanometers, each of the interleaved stop-bands has a mean transmittance that is about one sixth of the mean transmittance of an adjacent pass-band.

18. The method of claim 17, wherein the optical filter is configured to increase red-green color discrimination for observers with mild deuteranomalous color vision deficiency.

19. The method of claim 2, wherein the first pass-band has a center located at about 445 nanometers and a width of about 25 nanometers, the second pass-band has a center located at about 530 nanometers and a width of about 40 nanometers, the third pass-band has a center located at about 640 nanometers and a width of about 50 nanometers, each of the interleaved stop-bands has a mean transmittance that is about one eighth of the mean transmittance of an adjacent pass-band.

20. The method of claim 19, wherein the optical filter is configured to increase red-green color discrimination for observers with moderate deuteranomalous color vision deficiency.

21. The method of claim 2, wherein the first pass-band has a center located at about 440 nanometers and a width of about 25 nanometers, the second pass-band has a center located at about 530 nanometers and a width of about 45 nanometers, the third pass-band has a center located at about 640 nanometers and a width of about 50 nanometers, each of the interleaved stop-bands has a mean transmittance that is about one eighth of the mean transmittance of an adjacent pass-band.

22. The method of claim 21, wherein the optical filter is configured to increase red-green color discrimination for observers with severe deuteranomalous color vision deficiency.

23. The method of claim 2, wherein the optical filter provides an (x,y) chromaticity coordinate that is at least about 0.05 units away from any point on the boundary of the average daylight color limit region defined according to industrial standard ANSI Z80.3-2010 section 4.6.3.1.

24. The method of claim 2, wherein the optical filter provides an (x,y) chromaticity coordinate of the yellow traffic signal that is within about 0.05 units of the point (0.313, 0.620), as defined by industrial standard ANSI Z80.3-2005 sections 5.6.3.1 and 4.6.3.1.

25. The method of claim 1, wherein the optical filter is configured to increase red-green color discrimination for observers with protanomalous color vision deficiency, the optical filter comprises a first pass-band having a center located between about 440 nanometers and about 455 nanometers and a width of between about 20 and about 40 nanometers, a second pass-band having a center located between about 525 nanometers and about 545 nanometers and a width of between about 20 and about 45 nanometers, a third pass-band having a center located between about 610 nanometers and about 640 nanometers and a width of between about 30 and about 80 nanometers, and each of the interleaved stop-bands has a width of at least about 30 nanometers and a mean transmittance that is less than about one fourth of the mean transmittance of an adjacent pass-band, a minimum spectral transmittance of the filter between about 475 nanometers and about 580 nanometers is at most about one fifth of the luminous transmittance of the filter.

26. The method of claim 25, wherein the first pass-band center is located at less than or equal to about 450 nanometers.

27. The method of claim 25, wherein the first pass-band center is located at less than or equal to about 445 nanometers.

28. The method of claim 25, wherein the first pass-band center is located at less than or equal to about 440 nanometers.

29. The method of claim 25, wherein the third pass-band center is located at greater than or equal to about 615 nanometers.

30. The method of claim 25, wherein the third pass-band center is located at greater than or equal to about 625 nanometers.

31. The method of claim 25, wherein the second pass-band width is at most about 40 nanometers.

32. The method of claim 25, wherein the second pass-band width is at most about 35 nanometers.

33. The method of claim 25, wherein the second pass-band width is at most about 30 nanometers.

34. The method of claim 25, wherein the second pass-band center is located between about 525 nanometers and about 535 nanometers.

35. The method of claim 25, wherein the second pass-band center is located about 530 nanometers.

36. The method of claim 25, wherein the minimum spectral transmittance of the filter between about 475 nanometers and about 580 nanometers is less than about one fifth of the luminous transmittance.

37. The method of claim 25, wherein the minimum spectral transmittance of the filter between about 475 nanometers and about 580 nanometers is less than about one tenth of the luminous transmittance.

38. The method of claim 25, wherein each of the interleaved stop-bands has a mean transmittance that is less than about one eighth of the mean transmittance of an adjacent pass-band.

39. The method of claim 25, wherein each of the interleaved stop-bands has a mean transmittance that is less than about one tenth of the mean transmittance of an adjacent pass-band.

40. The method of claim 25, wherein each of the interleaved stop-bands has a mean transmittance that is greater than about one sixteenth of the mean transmittance of an adjacent pass-band.

41. The method of claim 25, wherein the first pass-band has a center located at about 445 nanometers and a width of about 20 nanometers, the second pass-band has a center located at about 525 nanometers and a width of about 40 nanometers, the third pass-band has a center located at about 630 nanometers and a width of about 55 nanometers, each of the interleaved stop-bands has a mean transmittance that is about one eighth of the mean transmittance of an adjacent pass-band.

42. The method of claim 25, wherein the optical filter provides an (x,y) chromaticity coordinate that is at least about 0.05 units away from any point on the boundary of the average daylight color limit region defined according to industrial standard ANSI Z80.3-2010 section 4.6.3.1.

43. The method of claim 25, wherein the optical filter provides an (x,y) chromaticity coordinate of the yellow traffic signal that is within about 0.05 units of the point (0.313, 0.620), as defined by industrial standard ANSI Z80.3-2005 sections 5.6.3.1 and 4.6.3.1.

* * * * *